United States Patent [19]

Hill et al.

[11] 4,292,666

[45] Sep. 29, 1981

[54] PROGRAMMABLE CONTROLLER

[75] Inventors: Lawrence W. Hill, Arlington; Thomas J. Stoodley III, Lowell; Ronald Malcolm, Andover, all of Mass.

[73] Assignee: Modicon Div. Gould Inc., Andover, Mass.

[21] Appl. No.: 895,581

[22] Filed: Apr. 12, 1978

[51] Int. Cl.[3] .............................................. G06F 15/46

[52] U.S. Cl. ...................................... 364/104; 364/900

[58] Field of Search ... 364/104, 107, 120, 200 MS File, 364/900 MS File

[56] References Cited

U.S. PATENT DOCUMENTS

| | | | |
|---|---|---|---|
| 3,686,639 | 8/1972 | Fletcher | 364/200 |
| 3,868,648 | 2/1975 | Levin | 364/120 X |
| 3,930,233 | 12/1975 | Morley et al. | 364/900 |
| 3,944,984 | 3/1976 | Morley et al. | 364/900 |
| 3,964,026 | 6/1976 | Vamauchi et al. | 364/900 X |
| 3,975,622 | 8/1976 | Horn et al. | 364/120 X |
| 3,976,981 | 8/1976 | Bowden | 364/120 X |
| 4,021,783 | 5/1977 | Highberger | 364/900 |
| 4,038,533 | 7/1977 | Dummermuth et al. | 364/104 |
| 4,115,853 | 9/1978 | Dummermuth | 364/900 |

FOREIGN PATENT DOCUMENTS

| | | | |
|---|---|---|---|
| 2744434 | 2/1979 | Fed. Rep. of Germany | 364/900 |

OTHER PUBLICATIONS

Allen-Bradley, "Users Manual for the PLC-2 Programmable Controller," Bulletin 1722, Catalog 1772-UM, Part No. 634873-50, (Fourth Edition Jan. 17, 1978) pp. 3-79, 3-82, 3-83.

Instruments and Control Systems, May 1978, "ICS Guide to Programmable Controllers," pp. 25-27, 31, 38, 39.

Jeffery et al., "Retrofitting with CNC," 15th Numerical Control Society Annual Meeting & Technical Conference, Apr. 9-12, 1978, Chicago, pp. 194-205, 197-200.

*Primary Examiner*—Joseph F. Ruggiero
*Attorney, Agent, or Firm*—Mattern, Ware, Stoltz & Fressola

[57] ABSTRACT

A small, low cost, programmable controller is described capable of solving user programs represented in networks having up to seven rows and eleven columns. A column solver is utilized to provide efficient and fast solution of the user control network. The programmable controller also solves calculate functions having multiple outputs to facilitate use of the output information in the control program.

A programming panel using a CRT display shows one or more selected control networks and, in conjunction with the central processing unit of the programmable controller, provides for the insertion of networks between two existing networks. Since the networks are solved by the controller mainframe in a sequential fashion, this network insertion allows the user to optimize his or her control program when solution order of the networks is important.

The output coil numbers of network rows may also be assigned by the user independent of their placement in the control program to further facilitate programming the controller. The programming panel includes a movable cursor on the CRT display which, in conjunction with a light-emitting diode (LED), allows the user to monitor the real-time power flow at any particular point in the displayed ladder diagram network. Specialized search features can also be specified by the user to simplify monitoring and de-bugging the control program.

18 Claims, 106 Drawing Figures

FIG. 1A
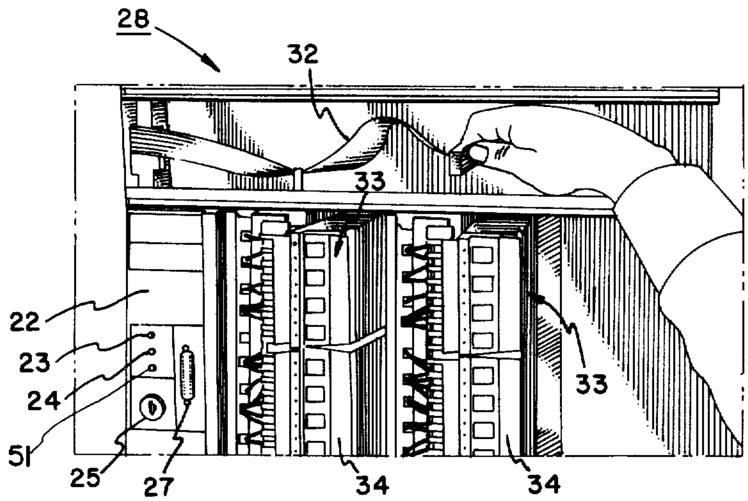
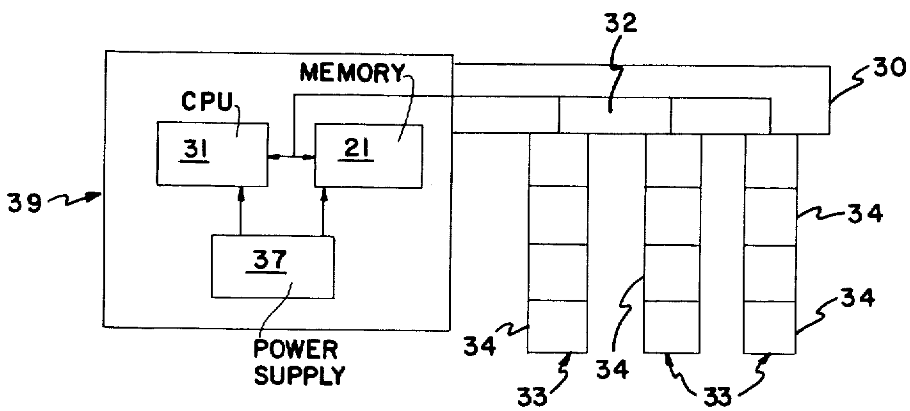
FIG. 1B

```
CCCCV  EEEEEEEEEEEE  STEP#  USED  REF  NNNN NNNN NNNN NNNN NNNN NNNN
RRRRV  S AAAAAAAAAA  NNNN   XX    VAL
```

FIG. 6A

```
-] [+                STEP#  USED  REF  4101 4021 4051 0002 1010 2001
1023|                0031   40
```

FIG. 6B

```
-] [-                STEP#  USED  REF  4001 1010 0001 0002
1001      START      0001   97
```

FIG. 6C

```
-] [-   MEM PROTECT  STEP#  USED  REF       1008 4025 0100       1100
1123                 0342   83    VAL
```

FIG. 6D

LEGEND

CCCC: CONTACT TYPE
EEEEEEEEEEEE: ERROR MESSAGE
VV: VERTICAL CONNECTOR
S: SHIFT ON
AAAAAAAAAA: ADVISORY MESSAGE

DISPLAY FORMAT & ASSEMBLY/STATUS EXAMPLES

FIG. 6E

1 – CHANGE REFERENCE NUMBER, CONTACT TYPE VERTICAL.
2 – CHANGE REFERENCE NUMBER
3 – CHANGE CONTACT TYPE
4 – CHANGE VERTICAL
5 – CHANGE REFERENCE NUMBER, CONTACT TYPE
6 – CHANGE CONTACT TYPE VERTICAL
7 – CHANGE REFERENCE NUMBER, VERTICAL

ASSEMBLY AREA

SEARCH

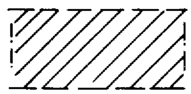

SEARCH FOR FIRST NODE

FIG. 8A

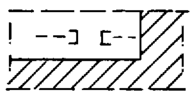

SEARCH FOR FIRST OCCURRENCE OF THAT CONTACT TYPE

FIG. 8B

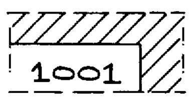

SEARCH FOR FIRST OCCURRENCE OF THAT REFERENCE NUMBER

FIG. 8C

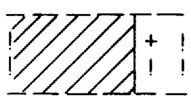

SEARCH FOR FIRST OCCURRENCE OF THAT VERTICAL CONNECTOR

FIG. 8D

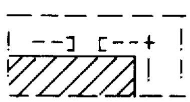

SEARCH FOR FIRST OCCURRENCE OF THAT CONTACT TYPE AND VERTICAL

FIG. 8E

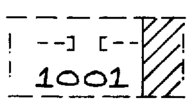

SEARCH FOR FIRST OCCURRENCE OF THAT CONTACT TYPE AND REFERENCE NUMBER

FIG. 8F

SEARCH FOR FIRST OCCURRENCE OF THAT REFERENCE NUMBER AND VERTICAL

FIG. 8G

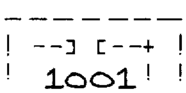

SEARCH FOR THE FIRST OCCURRENCE OF THAT NODE

FIG. 8H

FIG. 10A
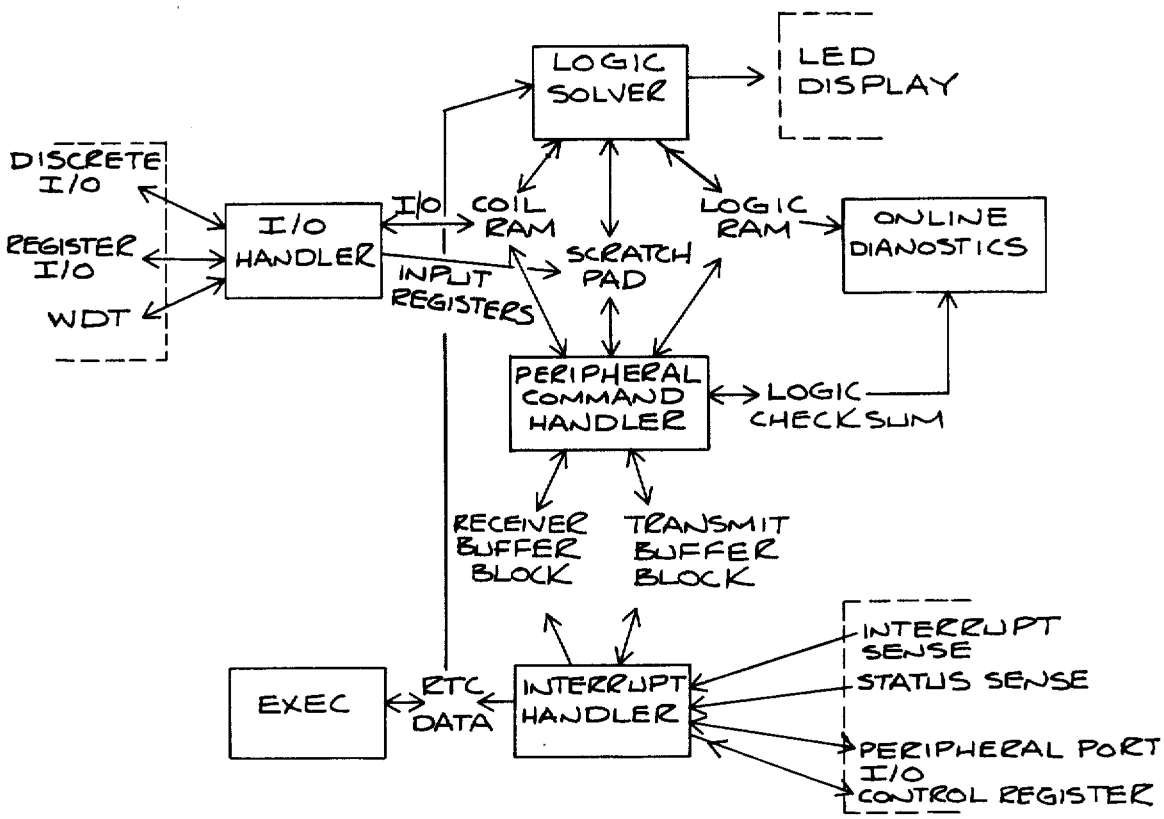
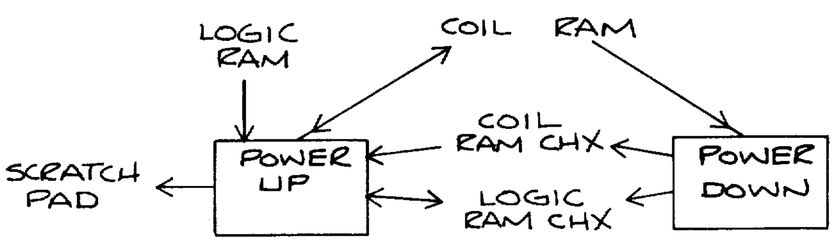
FIG. 10B

| | |
|---|---|
| FIG. 14A | FIG 14B |
| FIG. 14C | FIG. 14D |

FIG. 14E

| | |
|---|---|
| FIG. 16A | FIG. 16B |
| FIG. 16C | FIG. 16D |

FIG. 16E

| | |
|---|---|
| FIG. 13A | FIG. 13B |
| FIG. 13C | FIG. 13D |

FIG. 13E

| | |
|---|---|
| FIG. 15A | FIG. 15B |
| FIG. 15C | FIG. 15D |

FIG. 15E

PROGRAMMABLE CONTROLLER

BACKGROUND OF THE INVENTION

1. Field of the Invention

The present invention relates to programmable controllers used in industrial control applications such as those found to control material handling, metal cutting, packaging, assembly, batch sequencing, grinding, welding, polymer blending and handling, as well as energy management.

2. Description of the Prior Art

Since the advent of programmable controllers in the early 1970's (such as that disclosed in U.S. Pat. No. 3,686,639), these devices have been able to replace the hard wire relay logic control systems used in many industrial control applications. In the ensuing years, they have become more powerful, replacing not only relay ladder-type control programs, but also performing non-relay functions such as timing and counting, as well as performing data manipulation and transfer such as that disclosed in U.S. Pat. No. 3,930,233. Indeed, programmable controllers have become so powerful in recent years, controlling virtually thousands of outputs and performing many diverse and complicated data manipulation and transfer operations that they in many circumstances can replace the minicomputer for controlling complex industrial control systems. The Modicon 1084 Programmable Controller disclosed in pending U.S. patent applications Ser. No. 646,412 filed Jan. 2, 1976, now abandoned, and divisional application Ser. No. 873,407 filed Jan. 30, 1978, now U.S. Pat. No. 4,162,536 are characteristic of these large, high-powered controllers/data processors.

It has also been found during the relatively short history of the programmable controller that a need existed for small, low cost programmable controllers to replace control programs that would normally utilize eight or more hard-wired relays. It has further been found that it is at times desirable to allow the control engineer to program not only ladder-type control programs with each rung of the ladder representing an electrical circuit line having one or more nodes or contacts and a coil output which may be referenced to other nodes, but also a network of logic lines with interconnections between nodes of adjacent lines. Some companies such as Texas Instruments and Allen-Bradley have provided programmable controllers with programming panels capable of being programmed with control networks which can have interconnections between adjacent lines within the network. However, it has been found that, due to the type of solution employed by these programmable controllers, constraints had to be placed upon the user in terms of the number of vertical connections that could be placed between adjacent lines as well as the number of nodes that could be encompassed within two vertical lines of the control program. The present invention eliminates these problems in prior art programmable controllers by providing a control network without any limitations on the user in terms of the number of vertical interconnections that can be made within the network nor in the arrangement of nodes between vertical interconnections of the network. This is achieved by the utilization of what is called a "column solver" which for each network solves the vertical power flow in both the up and down directions for each node in a column.

The present invention also provides a programmable controller with improvements not found in prior art programmable controllers, such as the capability of inserting one or more networks between two existing networks so as to effectively re-number the remaining networks and thereby insure correct sequential solution of the networks where such a solution is desired.

The output point in the I/O system to which the coil output of a user line references, is assignable by the user and not dictated by line number. This further reduces the constraints placed on the user in formulating his or her control program.

The present invention also provides a programmable controller that has multiple discrete outputs on some calculate functions. These multiple outputs facilitate use of the result of the calculate function by the control engineer. Furthermore, the present invention not only provides for discrete input/output but also register input/output on the same I/O modules for the transferral of data to and from the programmable controller and interconnected devices such as other programmable controllers in a hierarchical control arrangement. In addition, the present invention provides a cursor display on its CRT which allows the user to have the real-time display of power status at any particular node in any selected line of the ladder-diagram network. Specialized search features are also present to the user.

In addition, the present programmable controller is housed in a unique modular arrangement suitable to a rugged industrial environment. The various features of the mechanical aspects of the present invention are disclosed and claimed in a co-pending patent application filed simultaneously with the present patent application; namely, U.S. patent application Ser. No. 883,277, filed May 3, 1978, U.S. Pat. No. 4,215,386.

All of the improvements synergistically combine to provide a low cost, flexible, and easily viable programmable controller.

SUMMARY OF THE INVENTION

An improved programmable controller according to the present invention comprises a power supply and central processing unit (CPU) and memory forming a mainframe enclosed in a first housing, and an input/output assembly having an input/output (I/O) bus interconnected to the mainframe at one end and to one or more I/O housings in a daisy chain fashion. Depending on their length, each I/O housing has from one to four or from one to eight I/O modules. Each I/O module has either four discrete input points or four discrete output points. There are separate I/O modules for AC and DC inputs and outputs. The I/O bus is housed in an I/O duct which provides easy installation as well as effective electromagnetic interference (EMI) protection.

Insertion of a user generated control program is performed by an interconnectable programming panel which allows for the generation of electrical ladder diagram networks up to seven rows in length and eleven columns in width, representing up to 77 nodes. The programming panel in conjunction with the mainframe allows the user to move a cursor to any node in the network with an associated light-emitting diode (LED) on the programming panel indicating the real-time power status of that node.

The CPU further comprises a column solver which solves the vertical power status between adjacent nodes in different lines or rows on a column-by-column basis interacting with the solution of the nodes by other portions of the mainframe.

The programming panel allows the user to insert one or more networks between two existing networks in such a manner that the networks below the inserted network are effectively pushed down not only on the CRT display but also in the solution order as performed by the mainframe. This feature coupled with the user assignability of coil outputs to any I/O point allows for more effective user programming, especially where solution order of the program is important.

Finally, the programming panel in conjunction with the memory has a percentage memory feature and an associated check count which is stored during a power-down sequence and compared with the count obtained during a power-up sequence in order to prevent the operation of the controller in solving the user networks if the two check counts do not match. This prevents the use of incorrectly stored data in memory in a power-up sequence.

OBJECTS OF THE INVENTION

Therefore, it is a principal object of the present invention to provide an improved programmable controller which is able to generate and solve multi-node electrical ladder-diagram networks in conjunction with a column solver for the rapid and efficient columnar solving of interconnections between adjacent lines of the ladder-diagram network;

It is a further object of the present invention to provide an improved programmable controller of the above description utilizing a CRT programming panel which displays the user generated ladder-diagram networks and which has a user movable cursor that can be placed at any node within the ladder-diagram network for displaying on an associated LED the real-time power status of that node as it is solved by the CPU;

Another object of the present invention is to provide an improved programmable controller of the above character capable of performing calculate functions with multiple outputs so as to facilitate use of the resultant output in other portions of the control program;

A still further object of the present invention is to provide an improved programmable controller of the above character in which the I/O system incorporates one or more I/O housings, each housing connecting with one or more input or output modules which can communicate with the mainframe not only discrete input/output data but also register input/output data for data processing purposes;

Another object of the present invention is to provide an improved programmable controller of the above description which has a programming panel and associated mainframe which allows the user to insert networks between existing networks and which provides for the sequential solution of the inserted networks;

An additional object of the present invention is to provide a programmable controller of the above character having coil I/O assignability independent of its line and network location;

Another object of the present invention is to provide a programmable controller of the above character having specialized search techniques to facilitate monitoring and de-bugging of the user program.

A still further object of the present invention is to provide a programmable controller of the above character which generates a check count during a power-down sequence indicative of the contents of memory and to generate a second check count during a power-up sequence representative of the same status of the memory and to prevent operation of the controller if the two check counts are not the same;

Other objects of the present invention will in part be obvious and will in part appear hereinafter.

THE DRAWINGS

For a fuller understanding of the nature and objects of the present invention, reference should be made to the following detailed description and the accompanying drawings, in which:

FIG. 1 is a perspective view of the programmable controller according to the present invention illustrating the housing enclosing the mainframe comprising the central processing unit, memory and power supply, the I/O duct housing the I/O bus for communicating between the CPU and the illustrated I/O housings interconnected to the I/O bus and in turn housing up to eight I/O modules, each module being either an input or an output module and intercommunicating at four points with external devices, and further illustrating the programming panel interconnected to the mainframe housing by a front mounted connector for user monitoring, programming and debugging of the control program as generated by the user on the programming panel;

FIG. 6A illustrates the CRT format for both the user network and status/assembly areas;

FIG. 6B illustrates the status/assembly area for a normally open contact with a vertical interconnection;

FIG. 6C illustrates the status/assembly area for a normally open contact and a START function;

FIG. 6D illustrates the status/assembly area for a normally open contact with memory protect;

Figure 1:
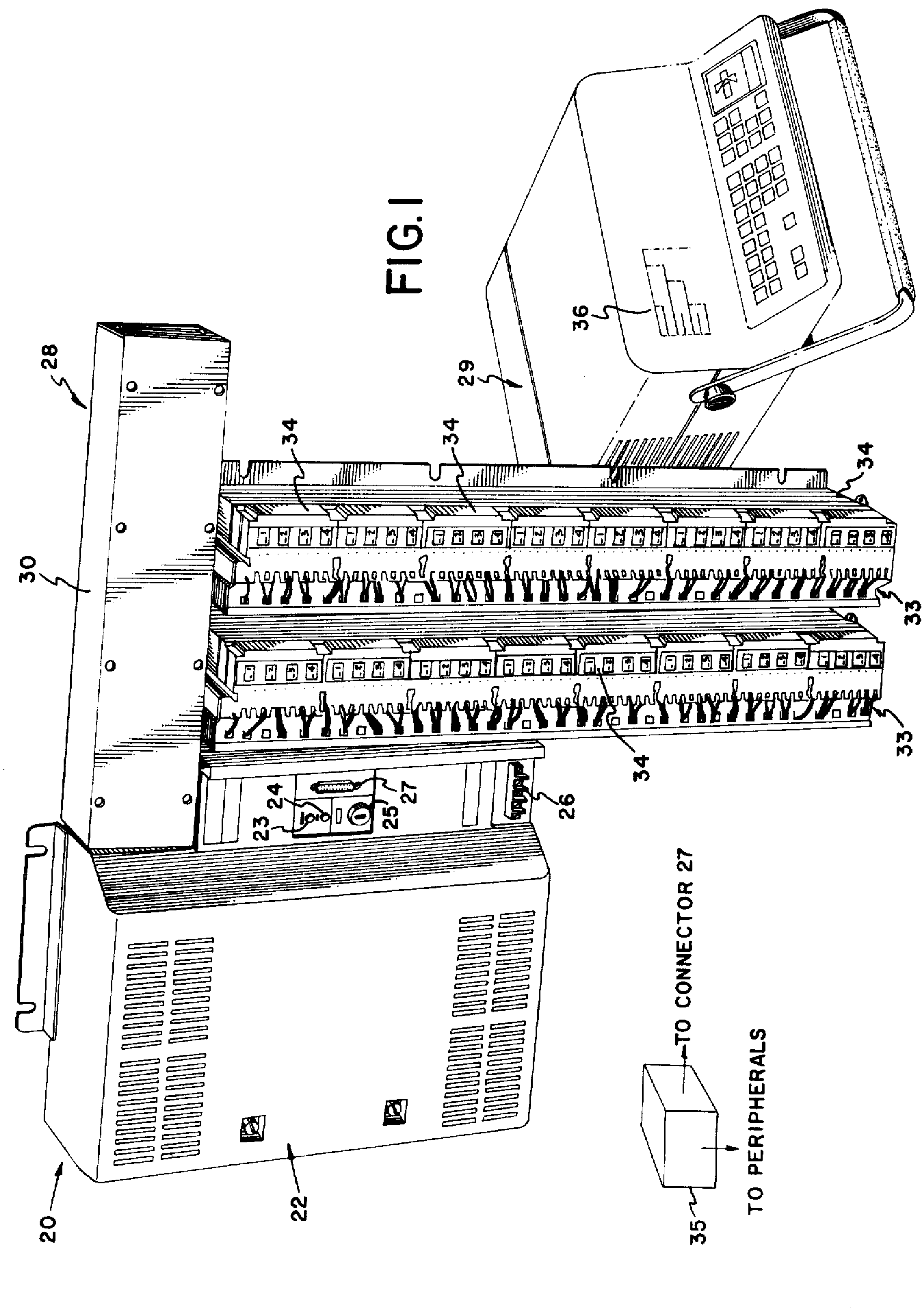
FIG. 1A is a perspective view of a portion of the mainframe housing and I/O system showing the I/O duct with its front cover removed and illustrating interconnection of the I/O bus with the I/O housings.
FIG. 1B is a diagrammatic block diagram of the programmable controller shown in FIG. 1.
Figure 7:
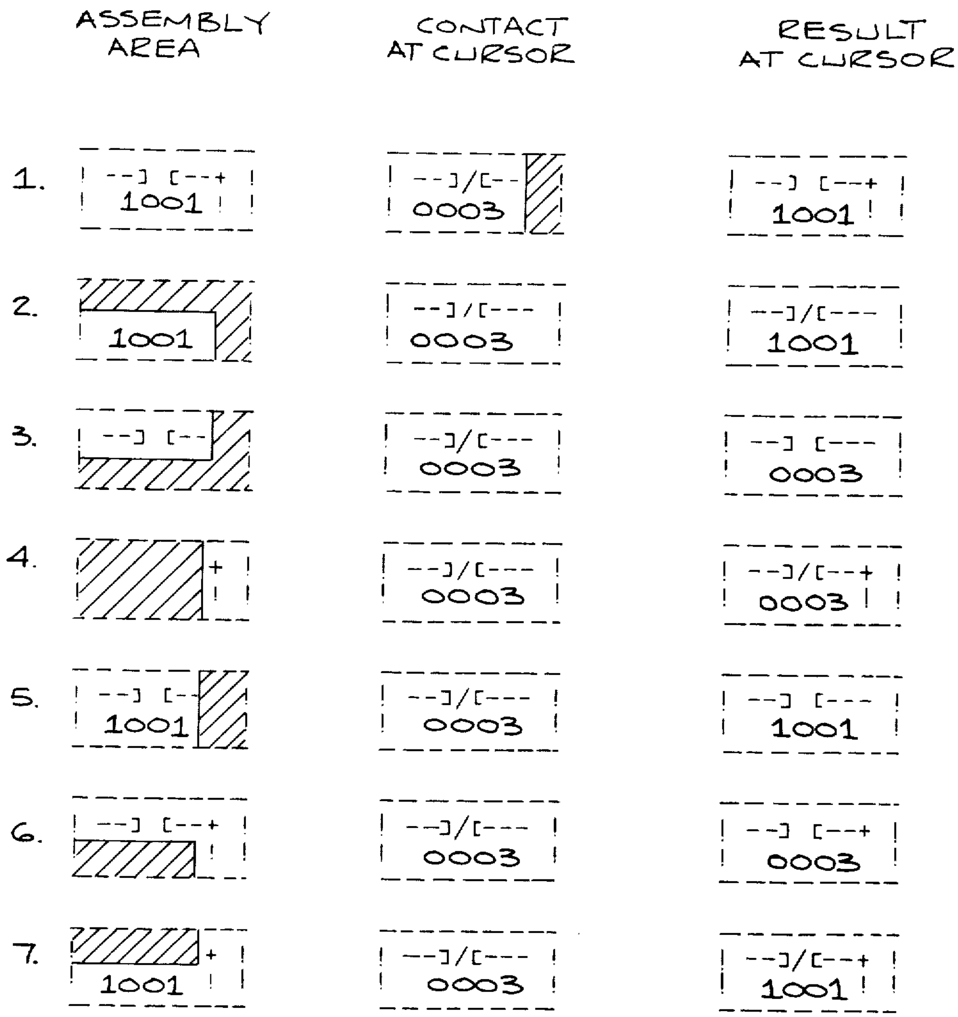
Figure 9:
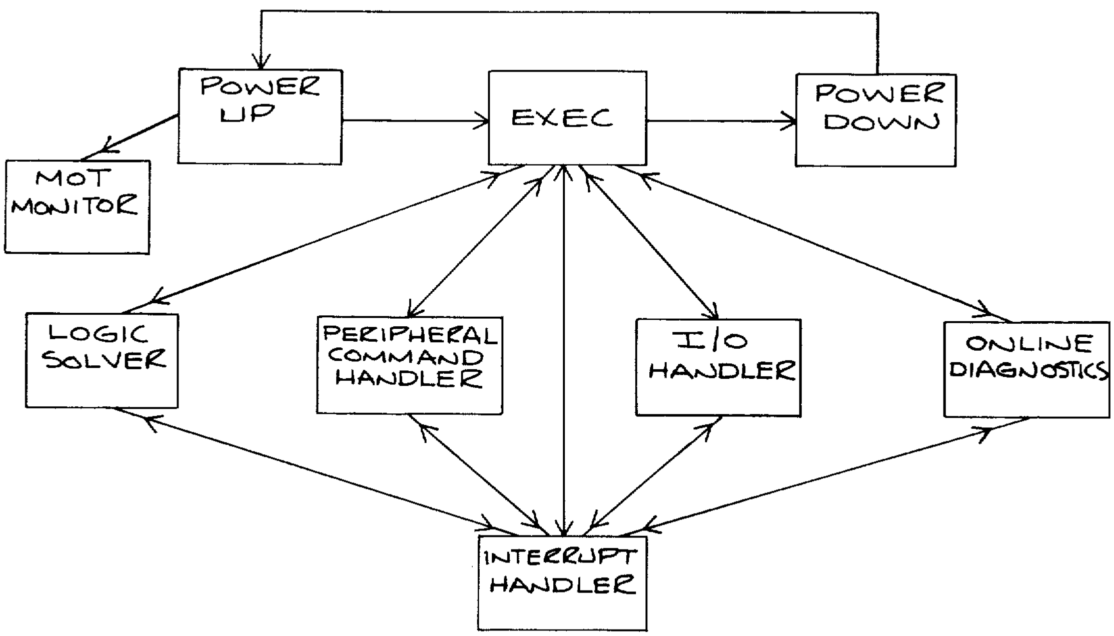
Figure 11:
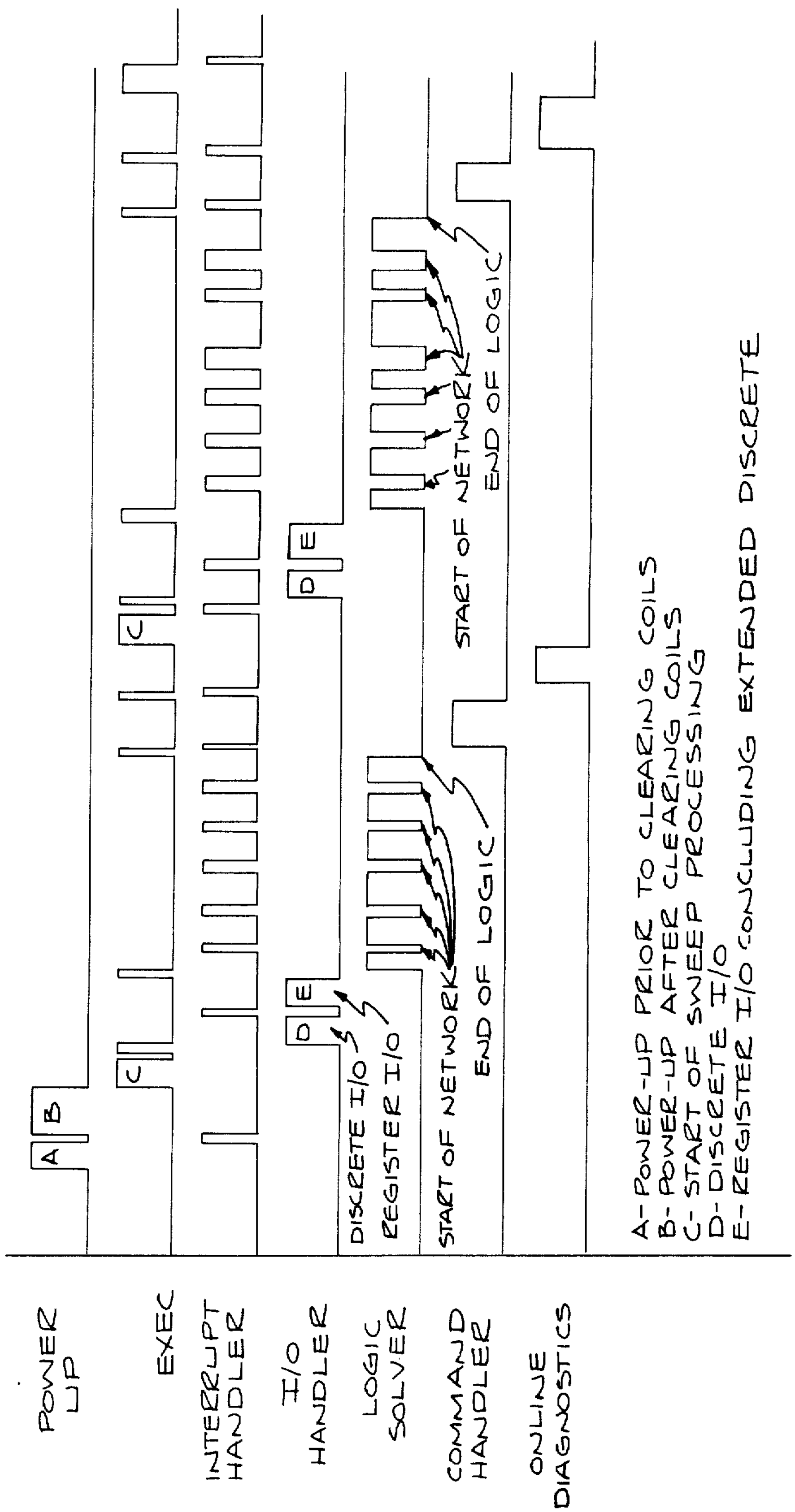
Figure 12:
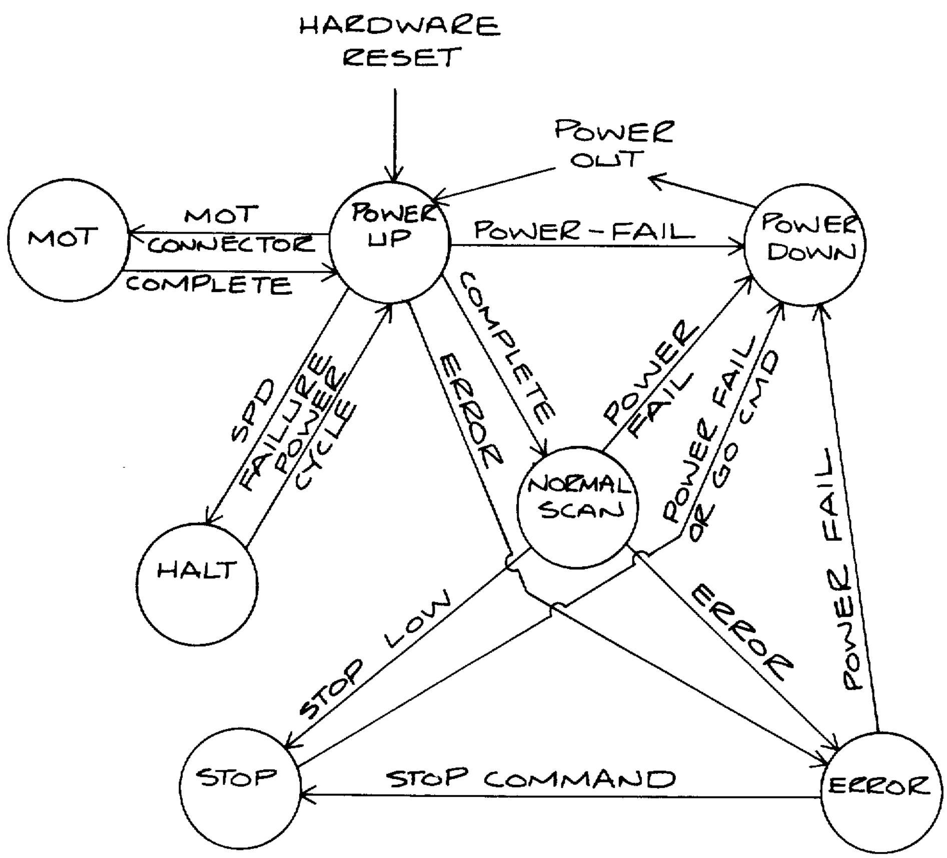
Figure 13A:
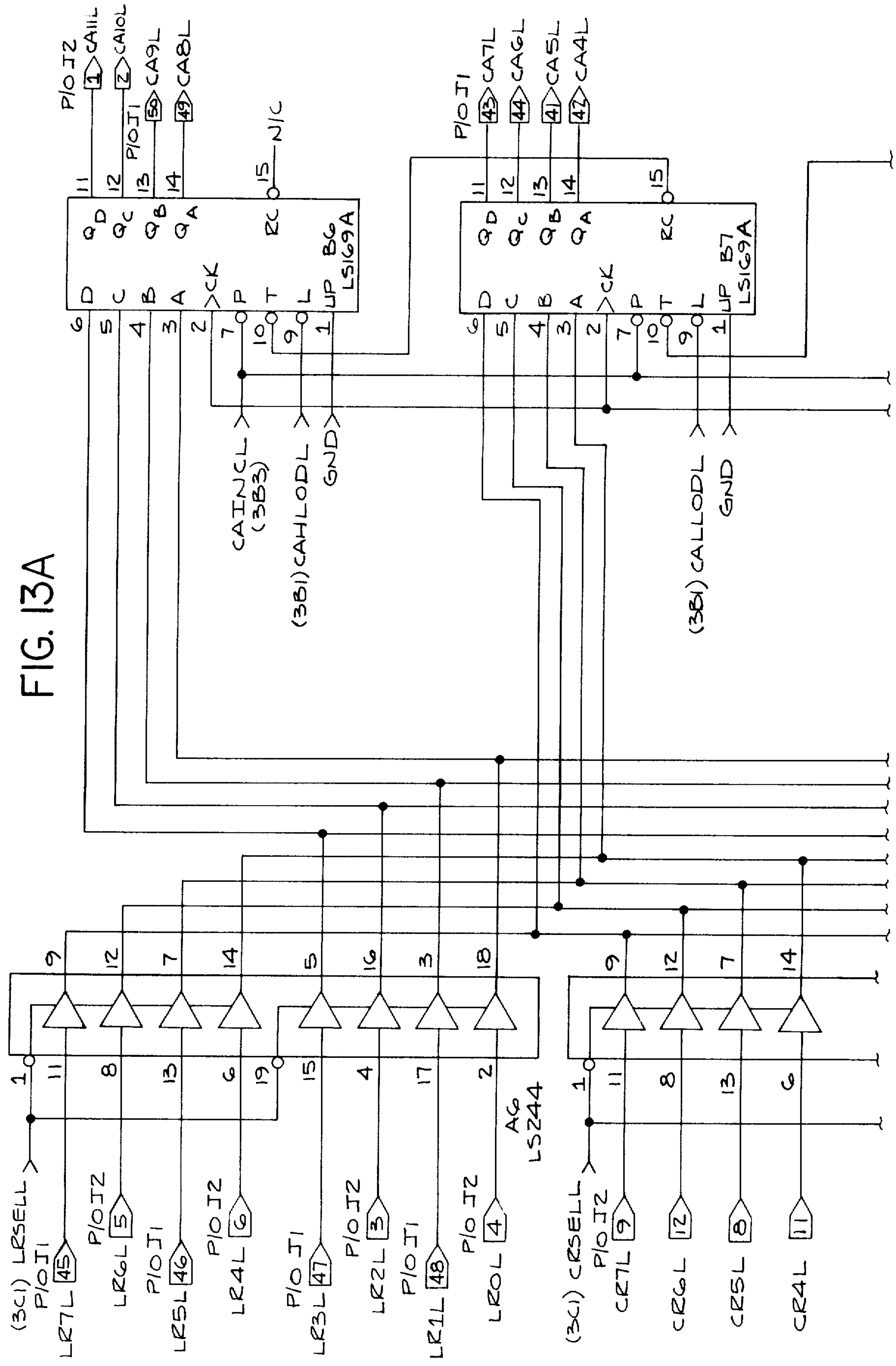
Figure 13B:
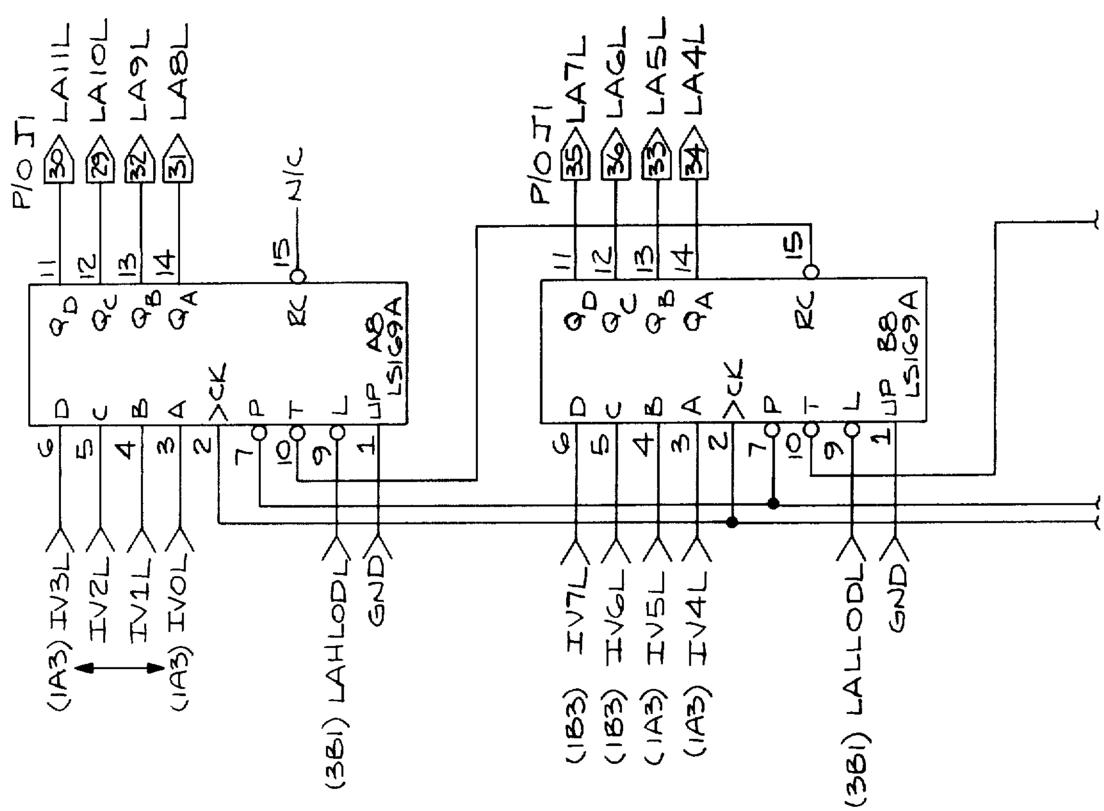
Figure 13C:
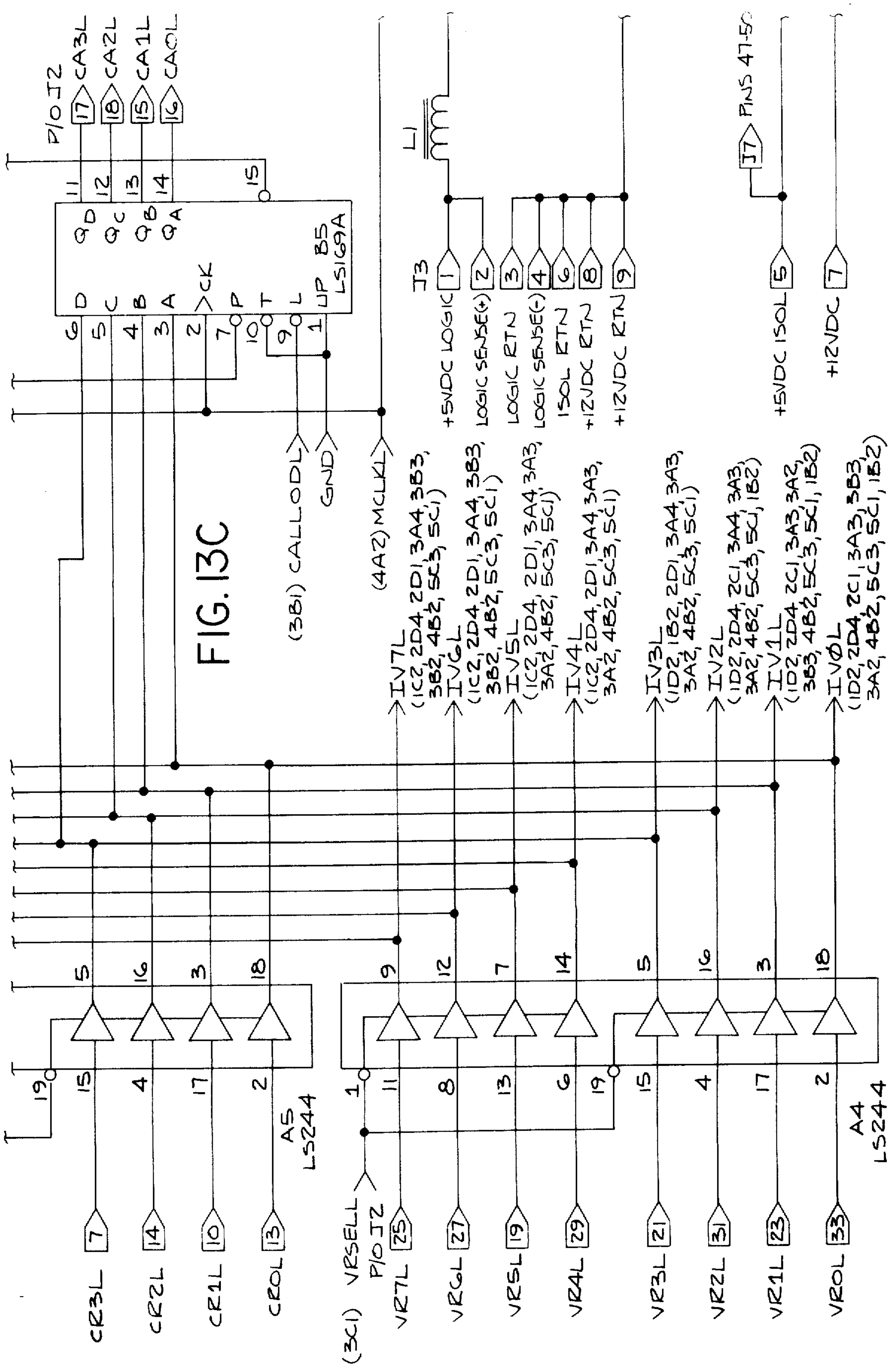
Figure 13D:
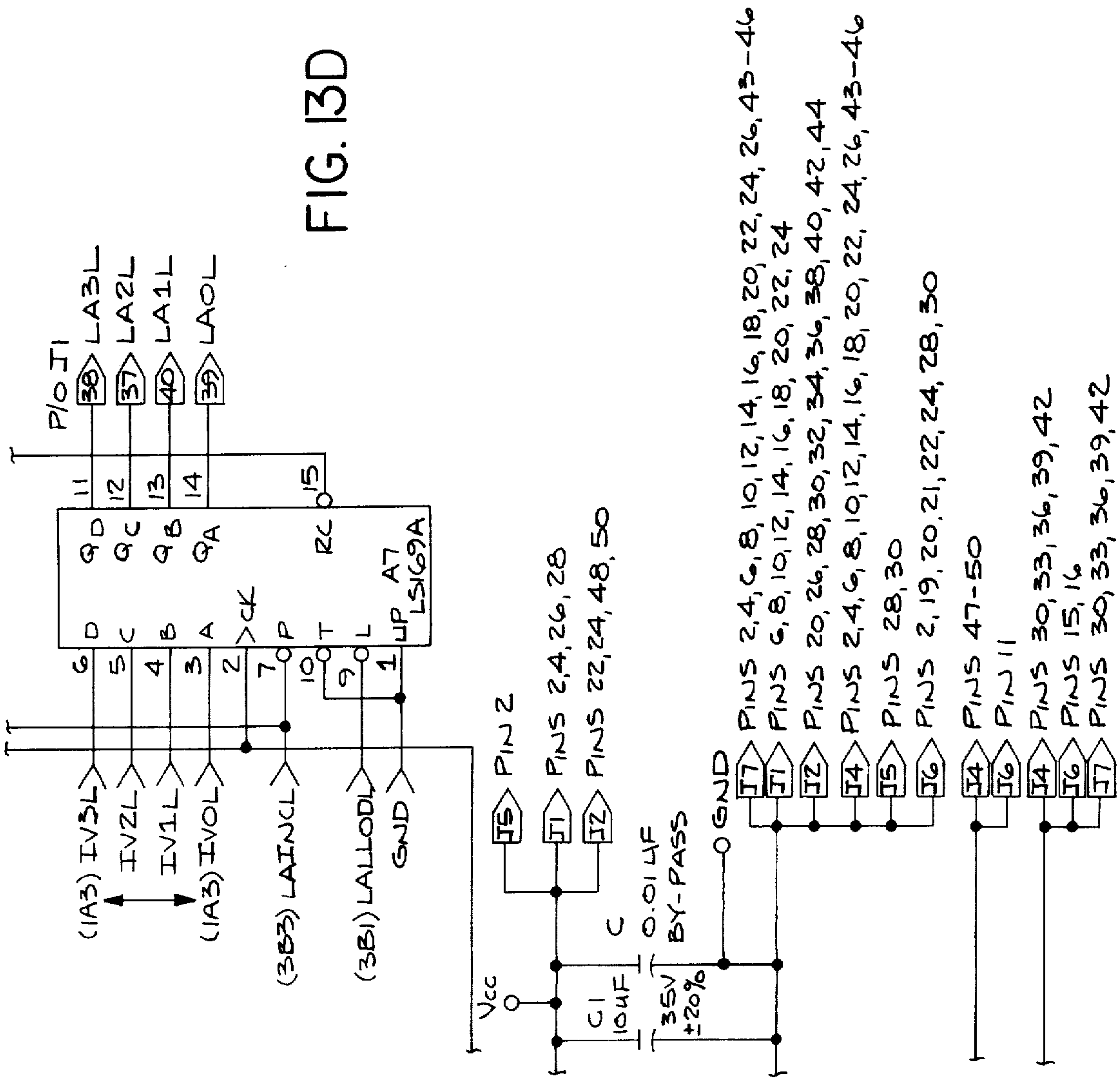
Figure 14A:
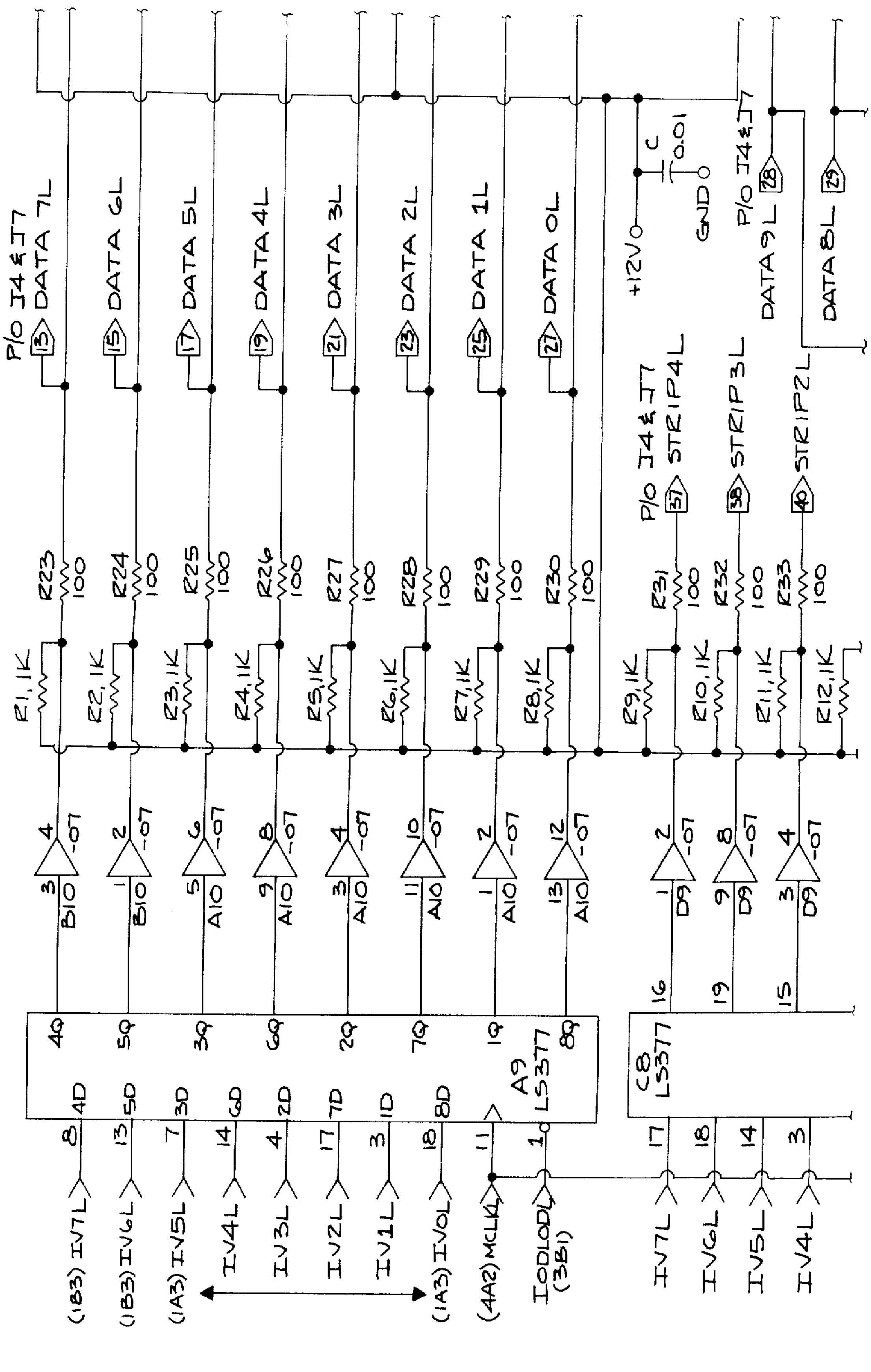
Figure 15A:
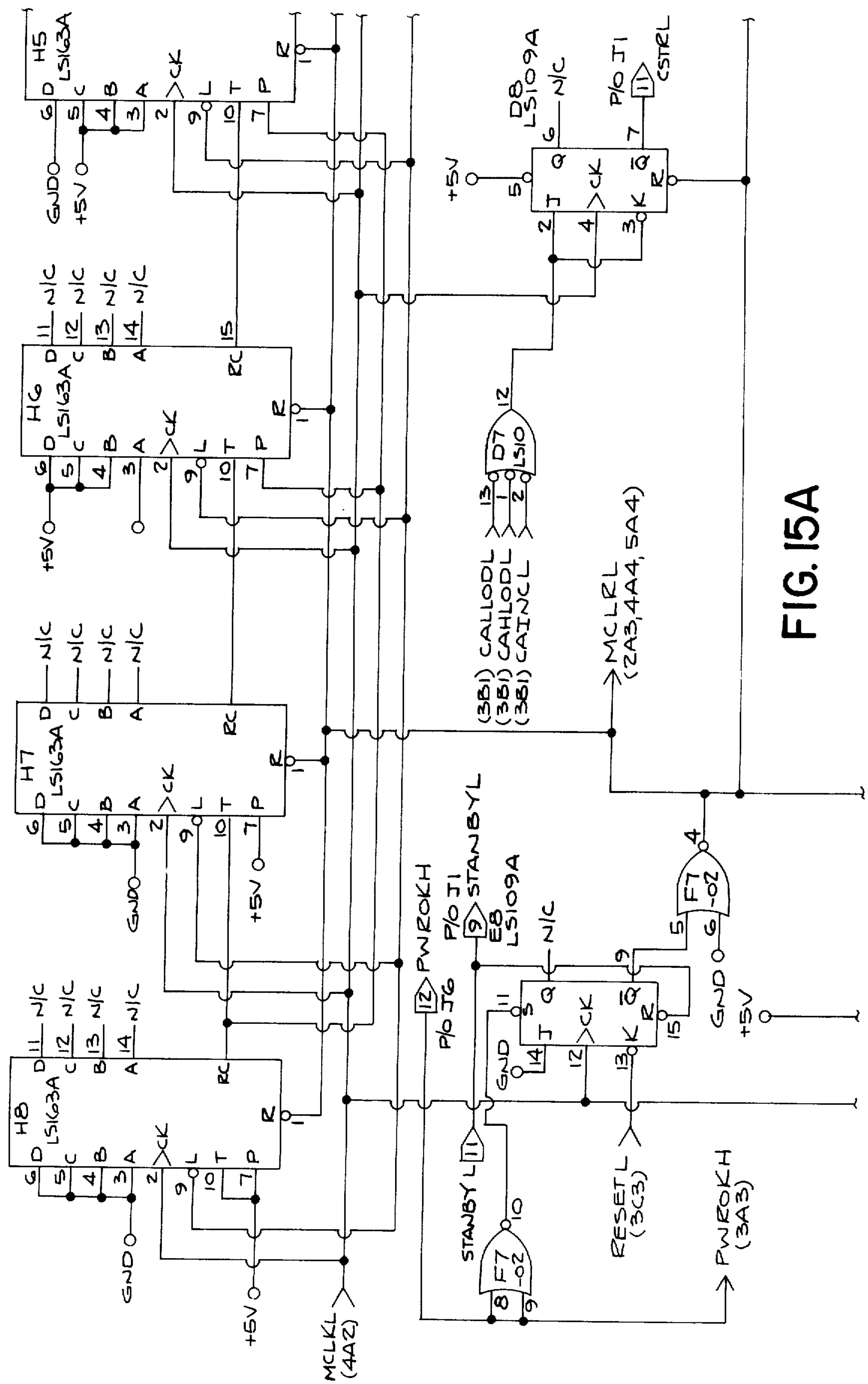
Figure 16A:
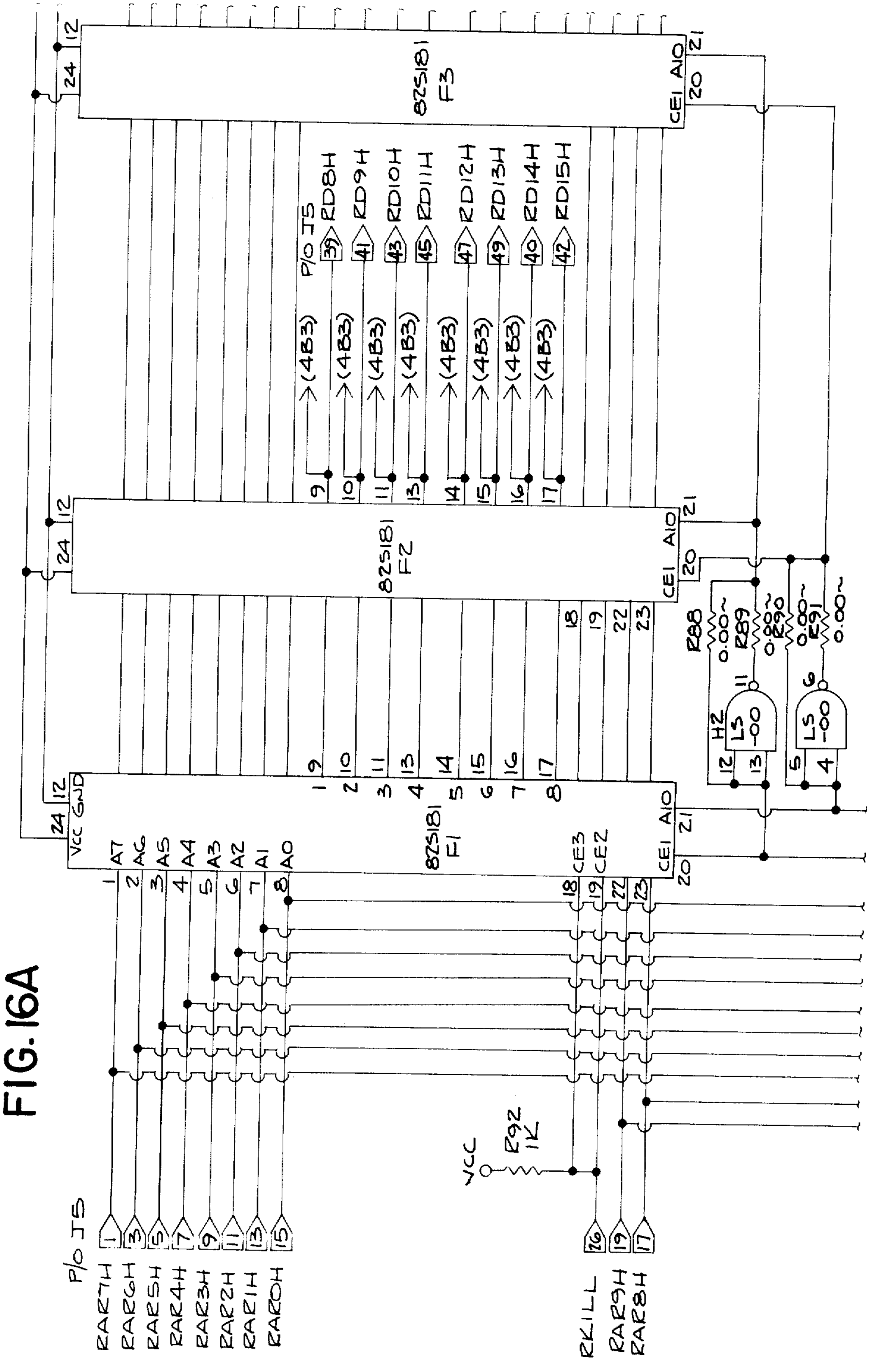
Figure 16B:
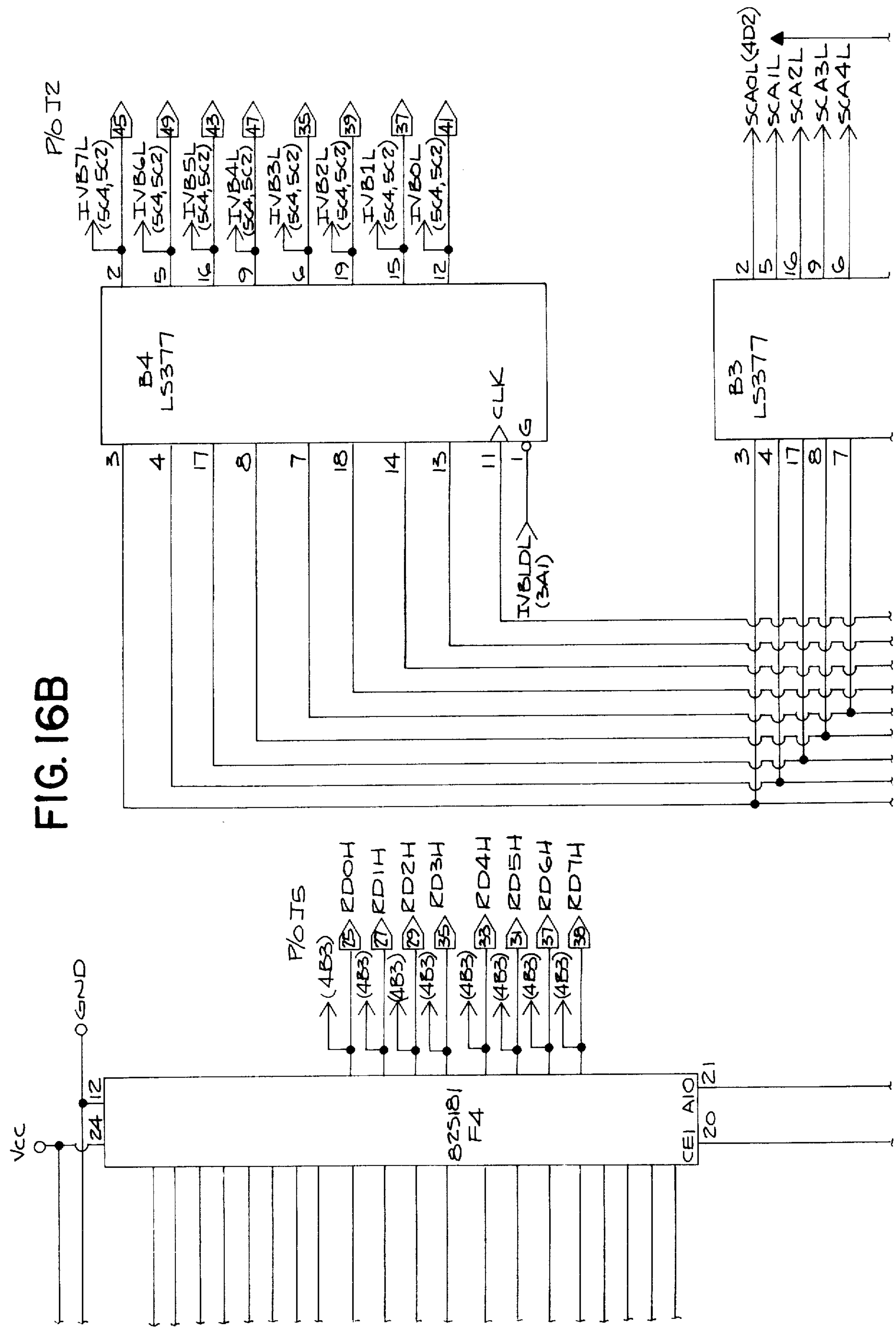
Figure 17A:
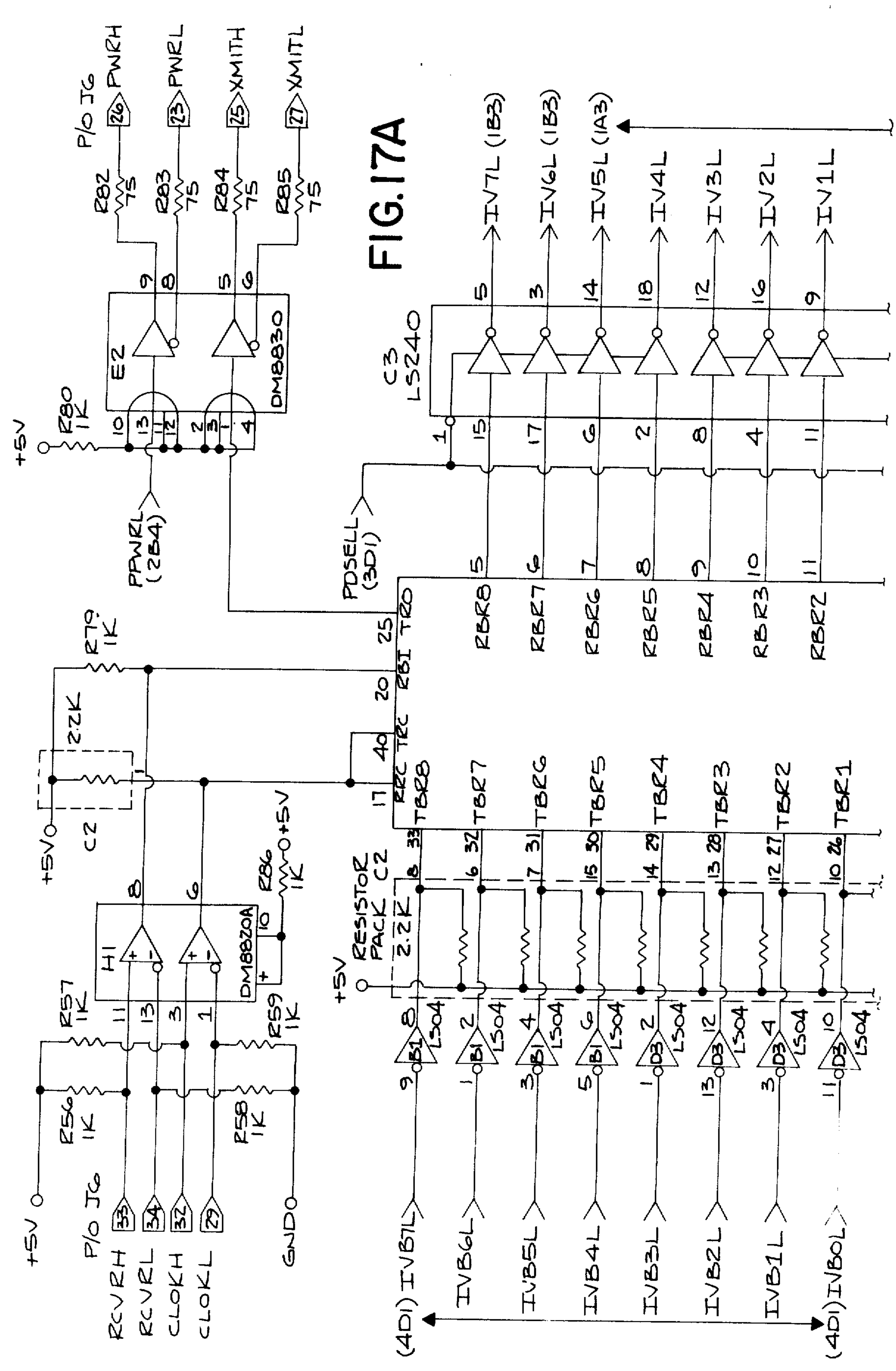
Figure 17B:
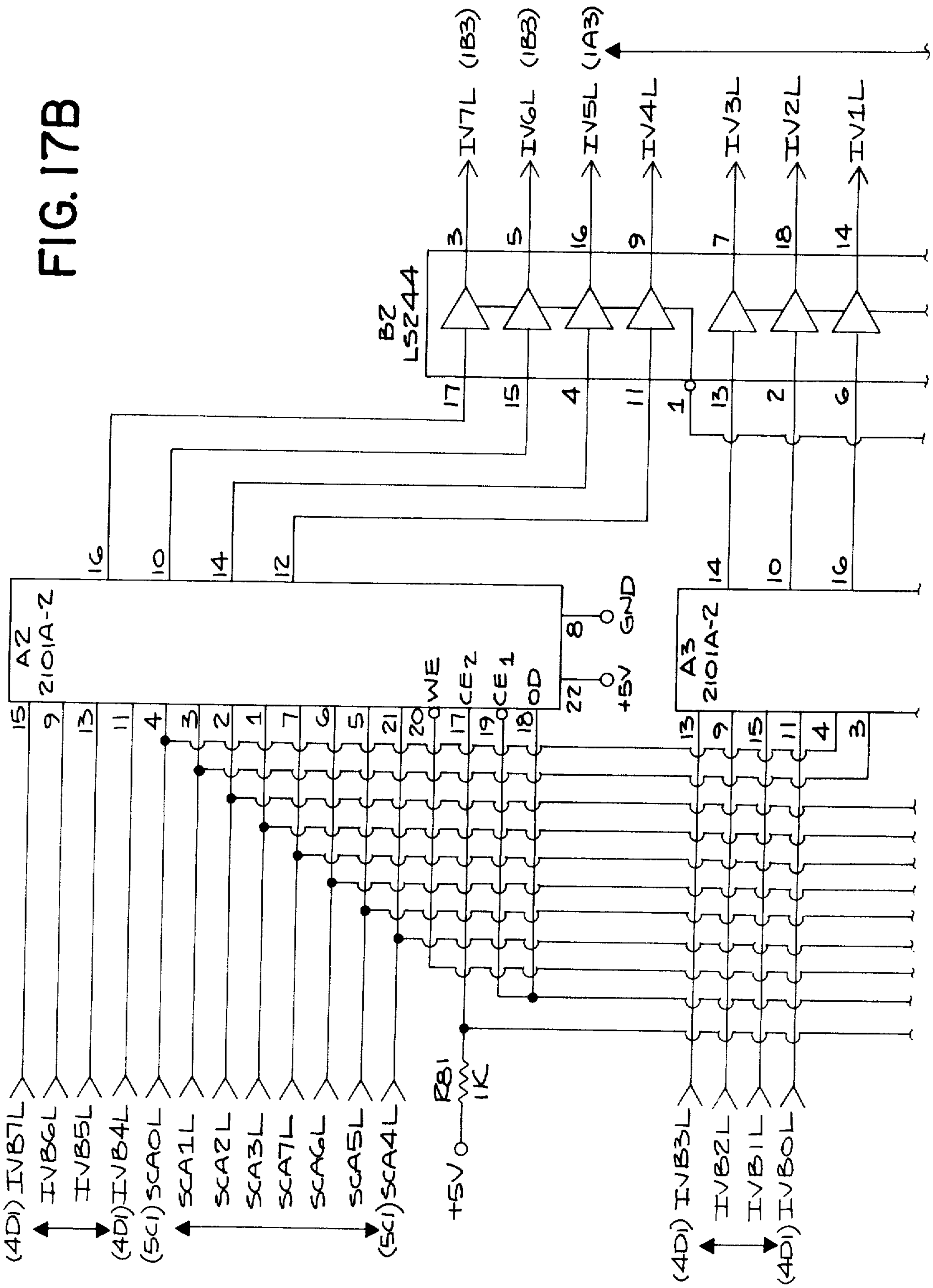
Figure 17C:
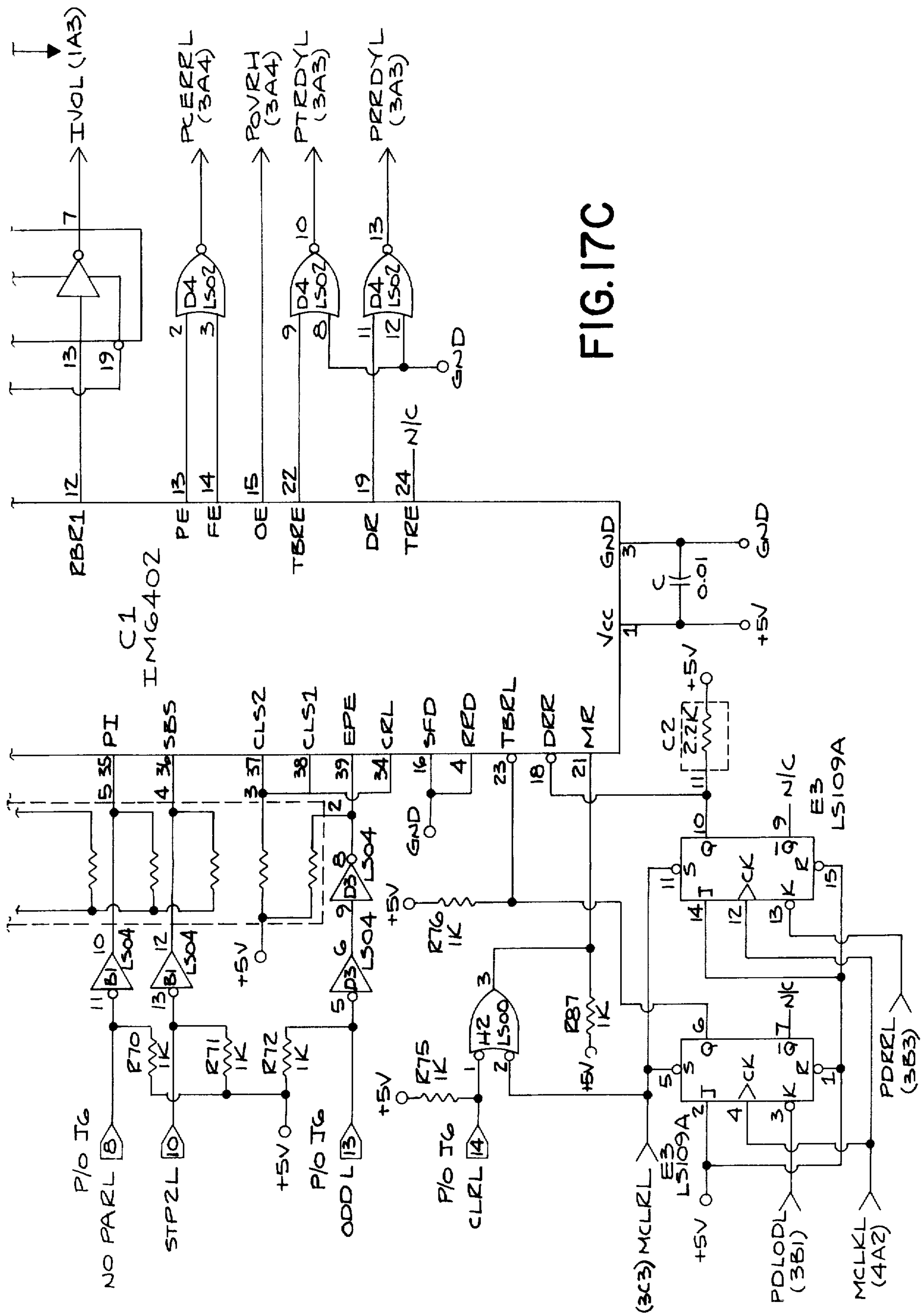
Figure 17D:
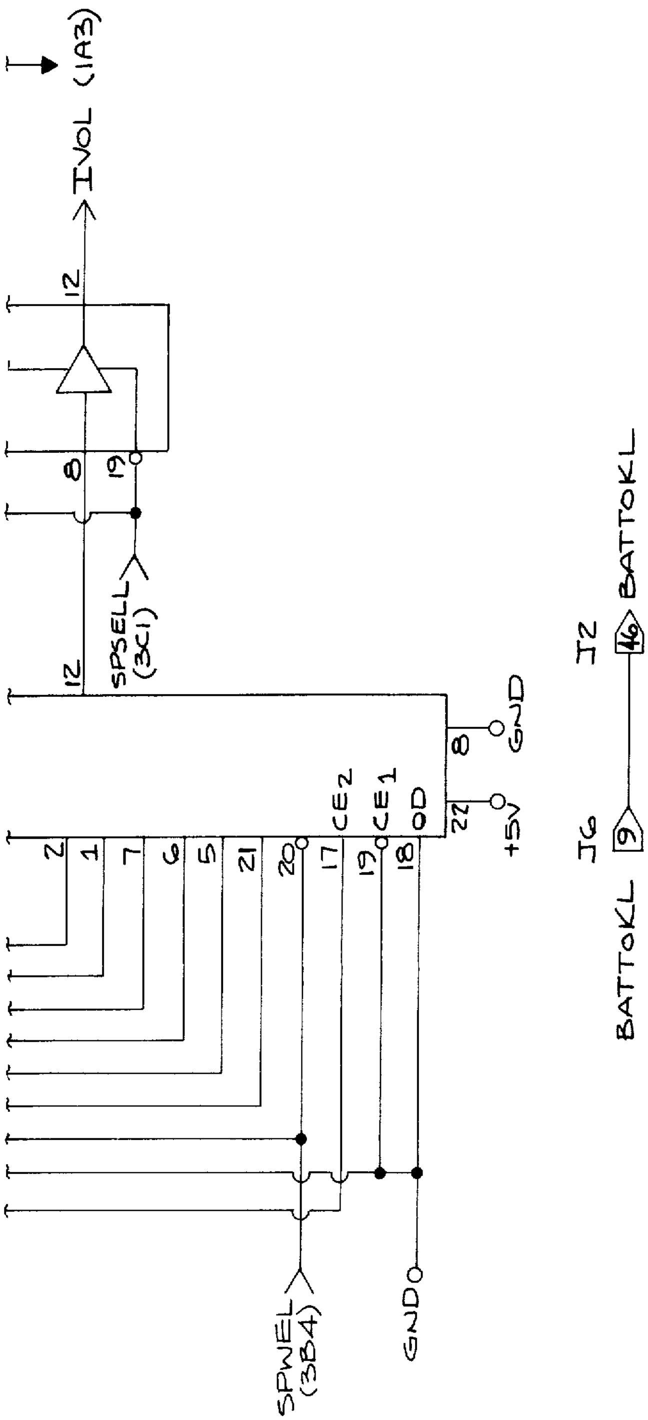
Figure 17E:
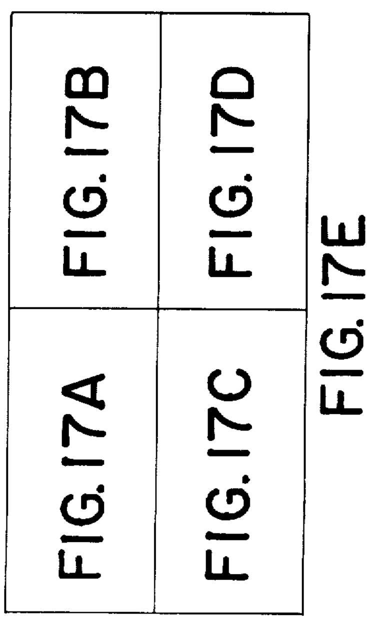
Figure 18E:
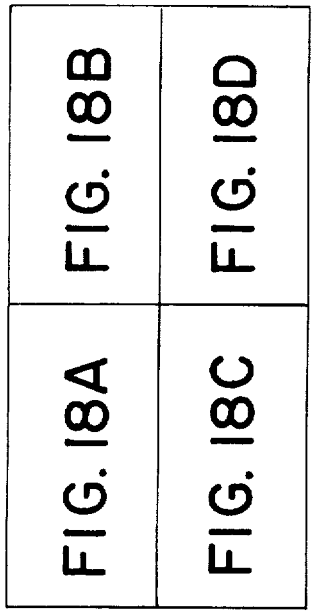
Figure 19E:
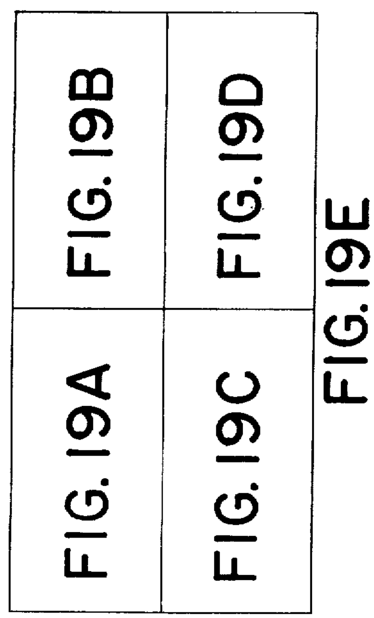
Figure 20E:
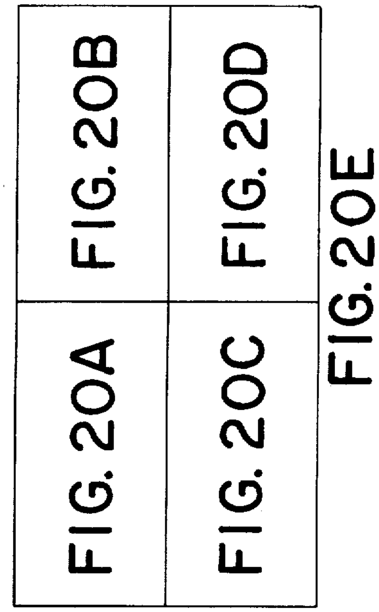
Figure 18A:
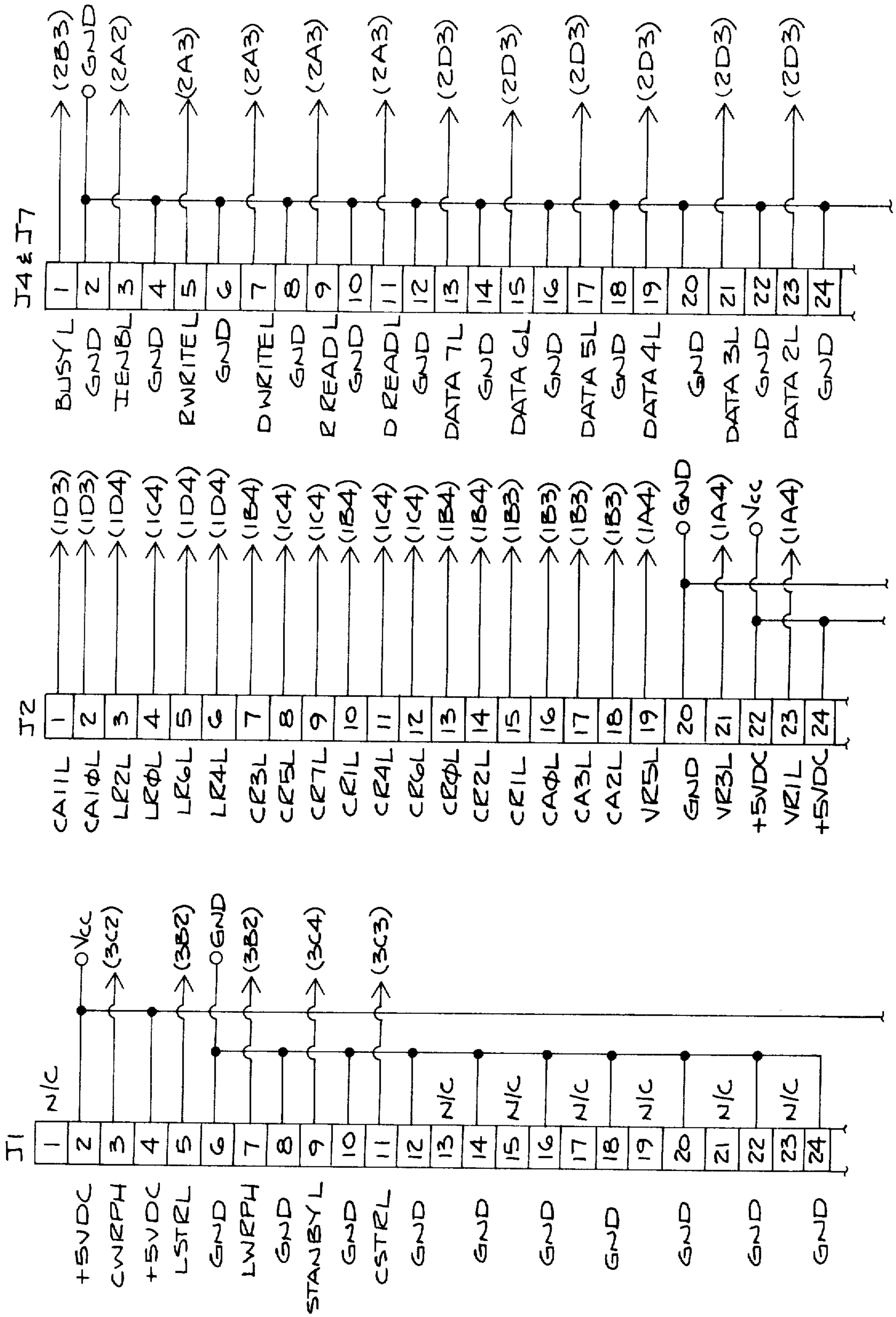
Figure 18B:
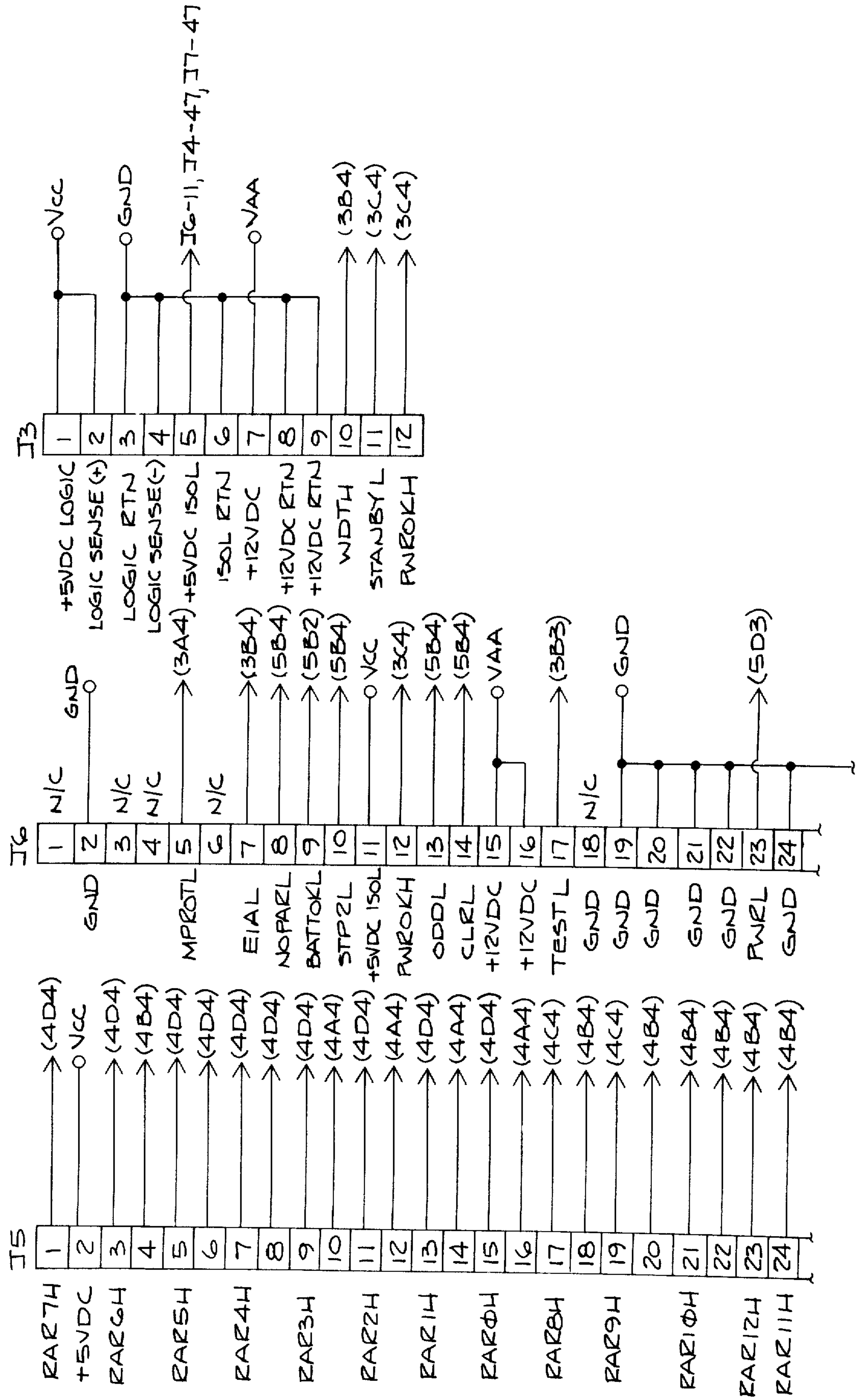
Figure 18C:
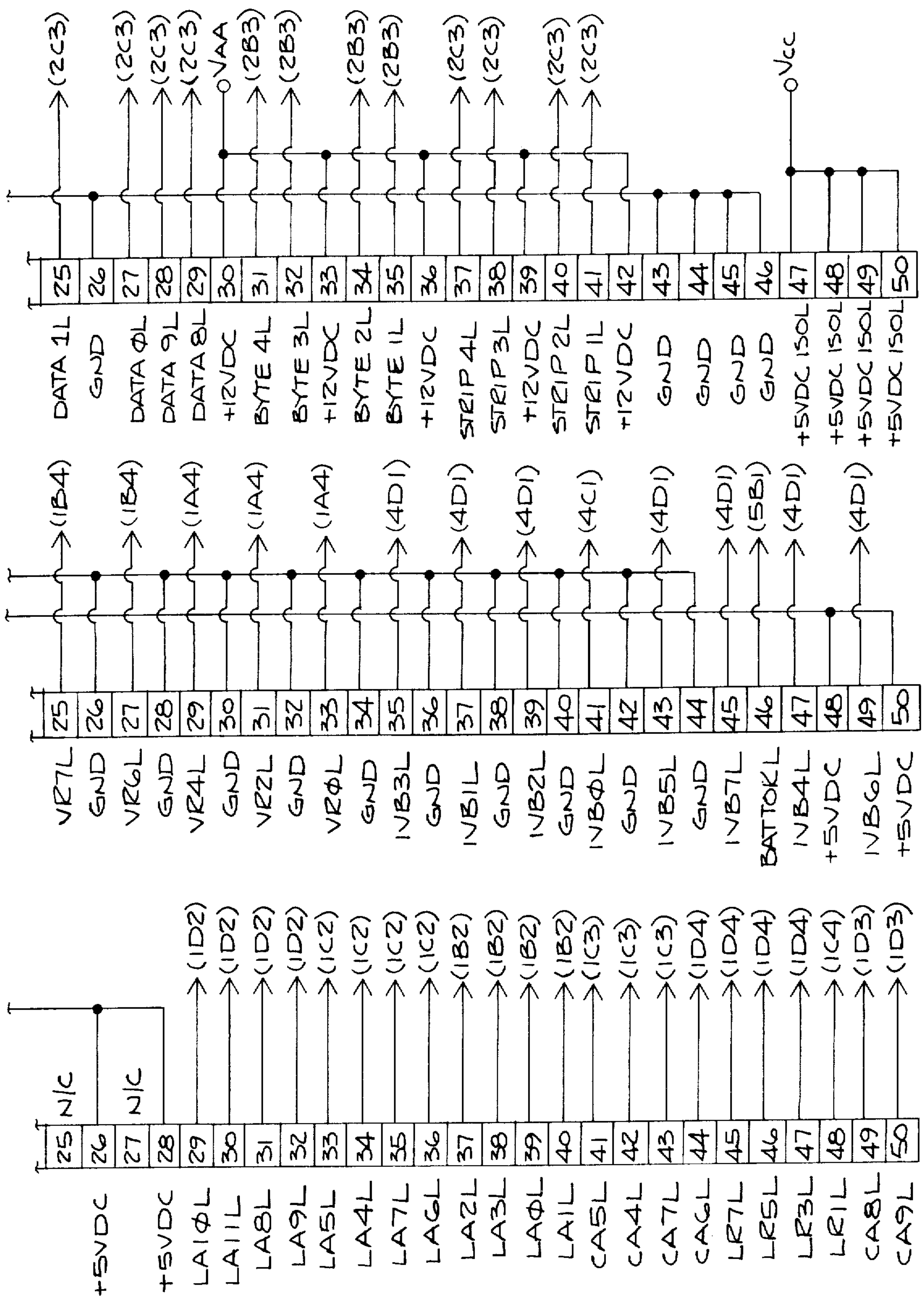
Figure 18D:
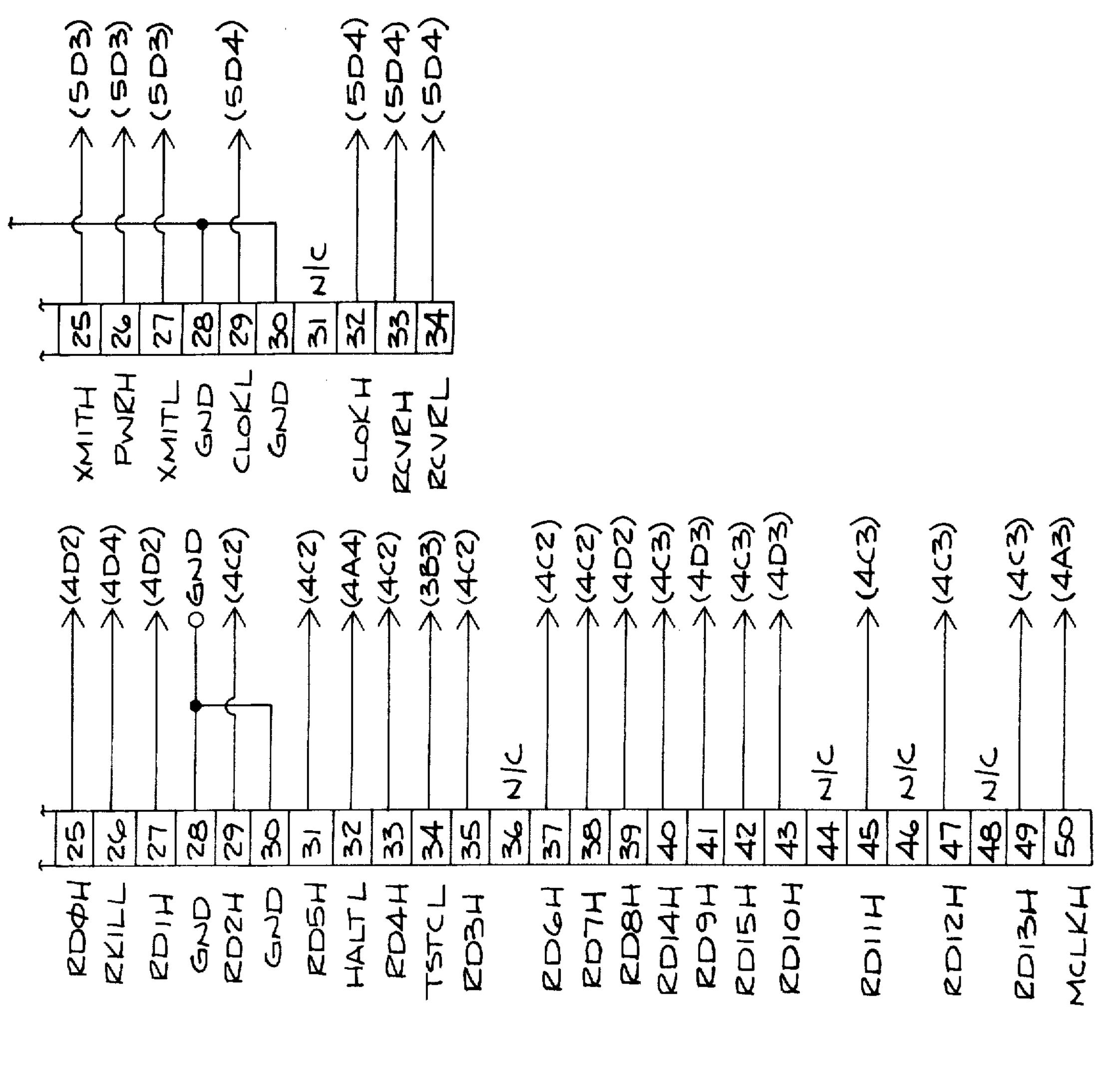
Figure 19A:
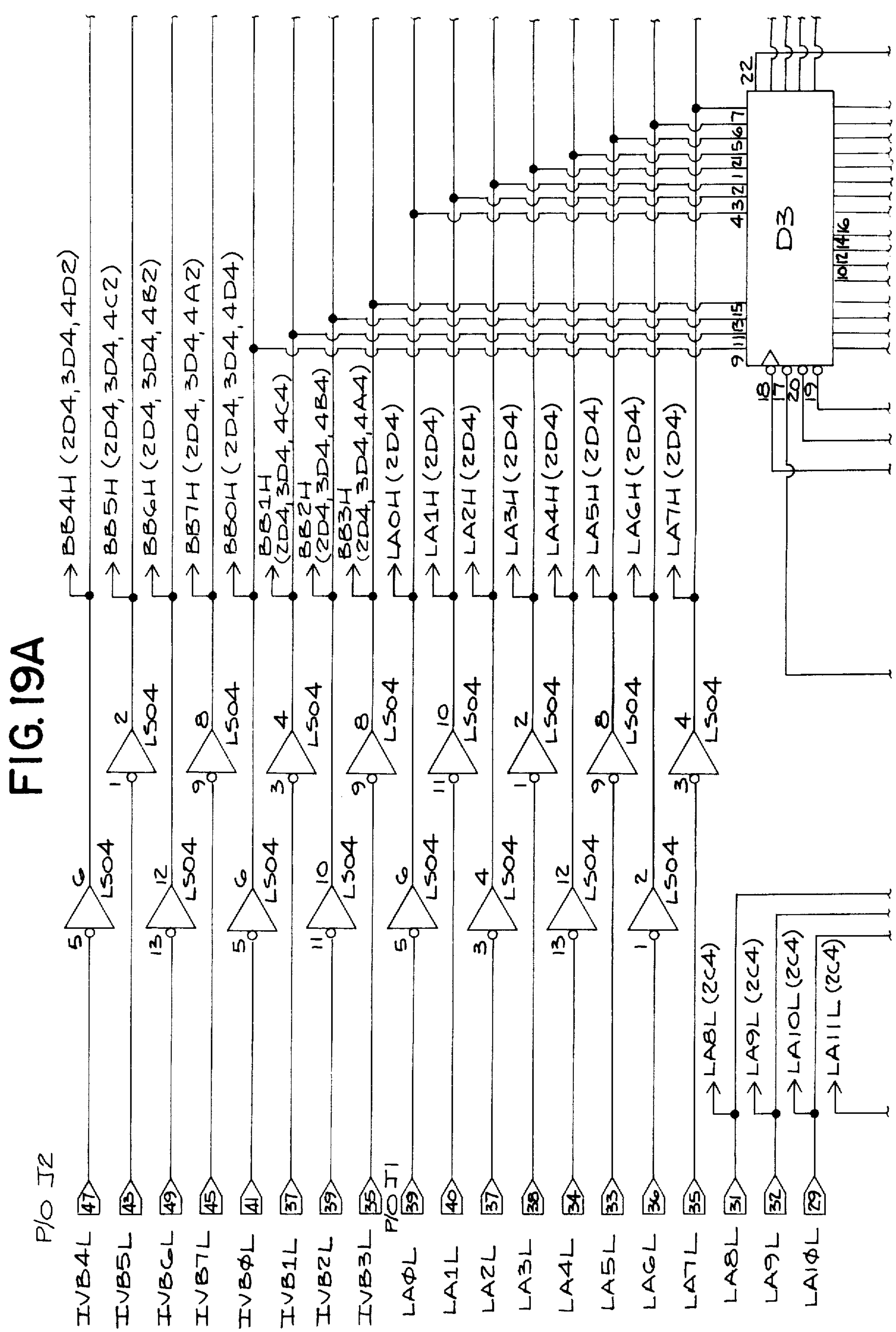
Figure 19B:
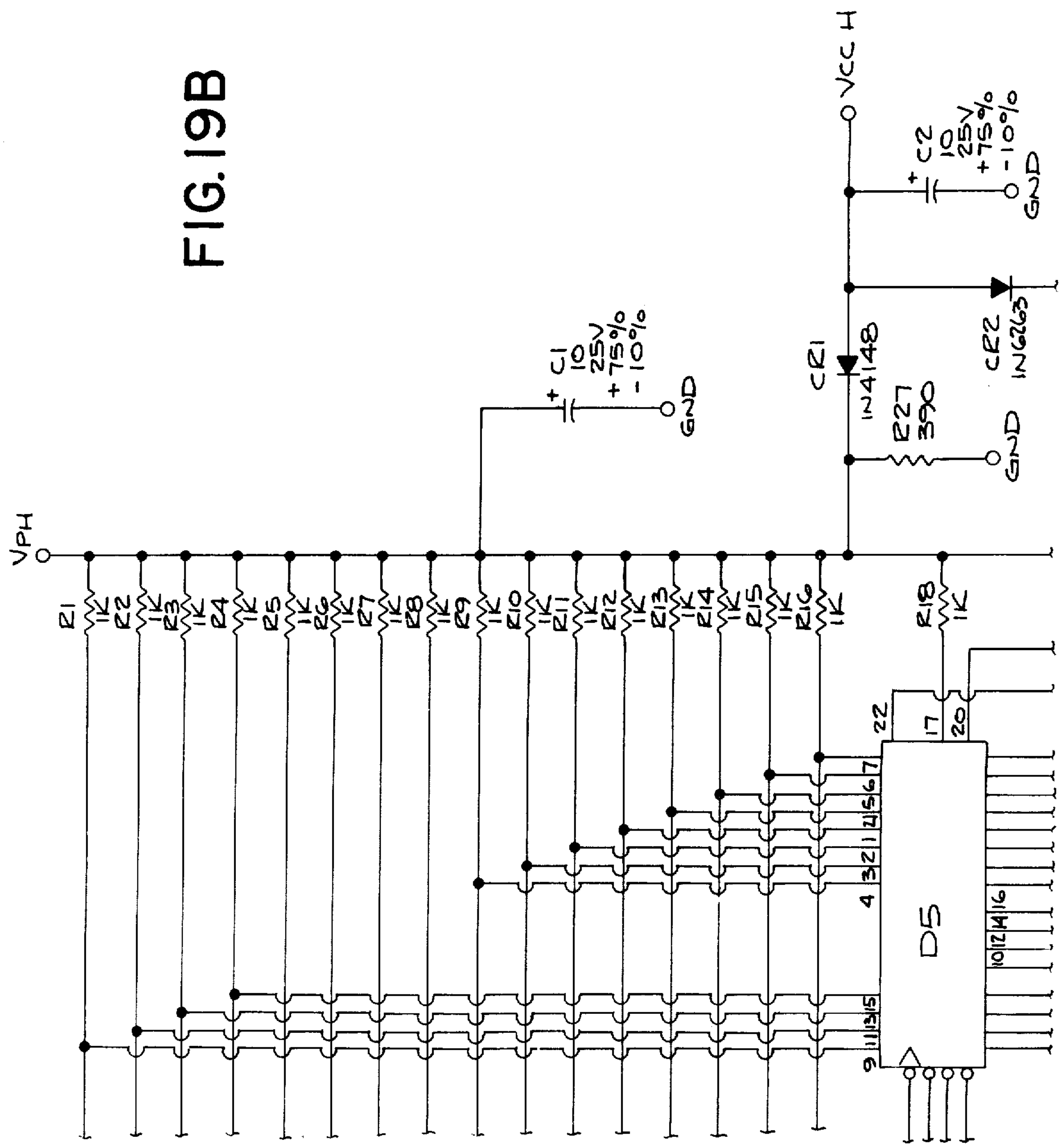
Figure 19C:
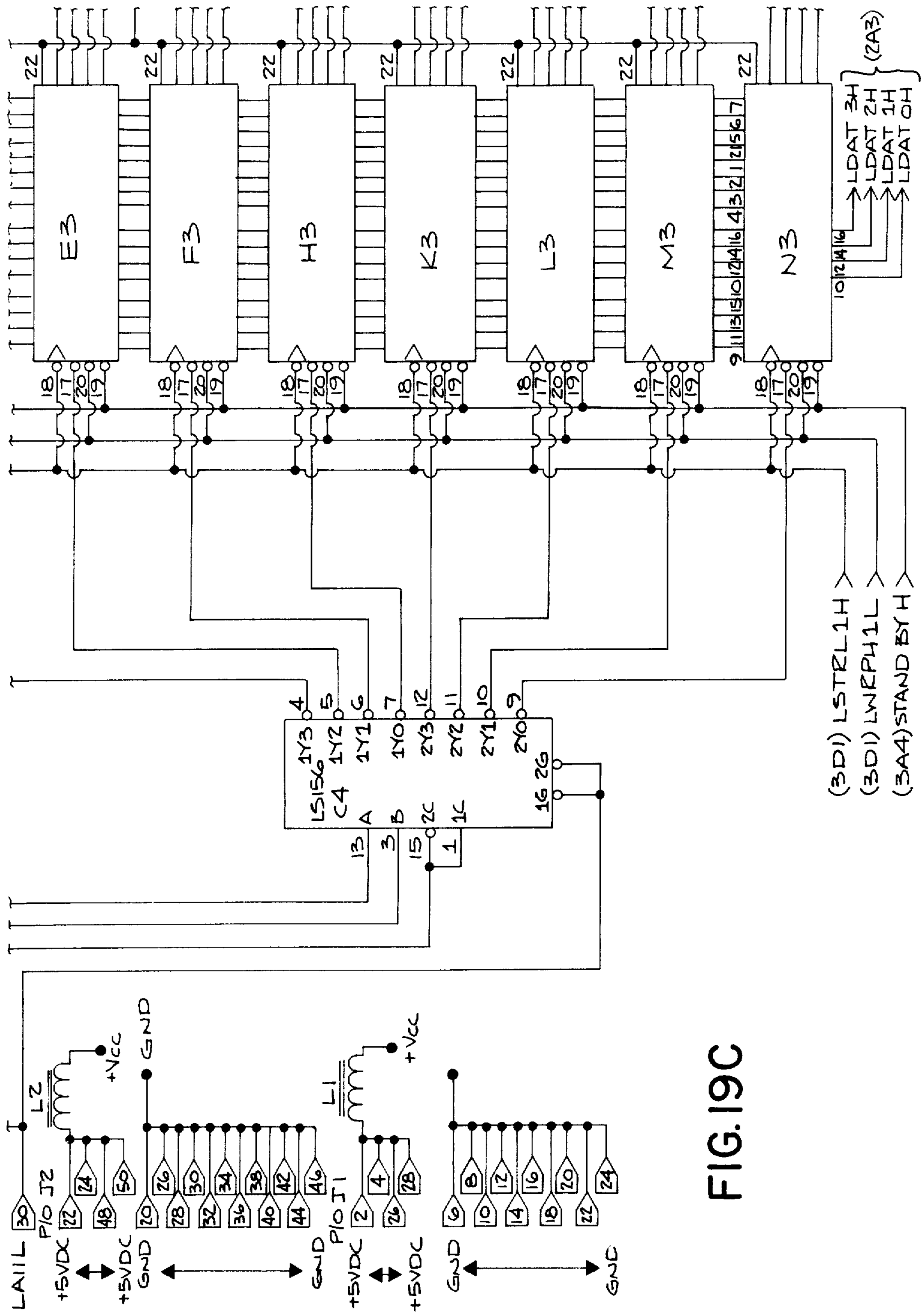
Figure 19D:
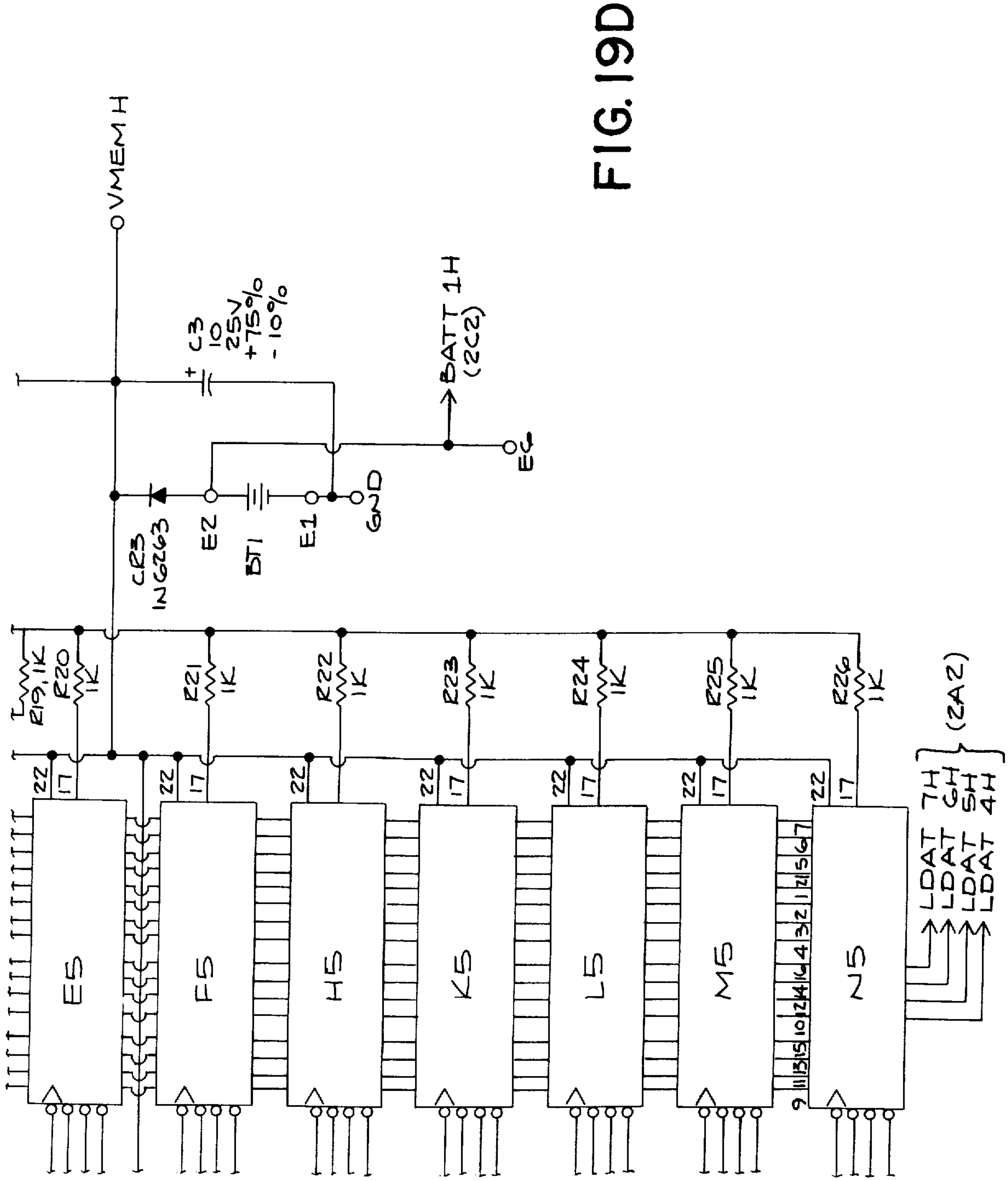
Figure 20A:
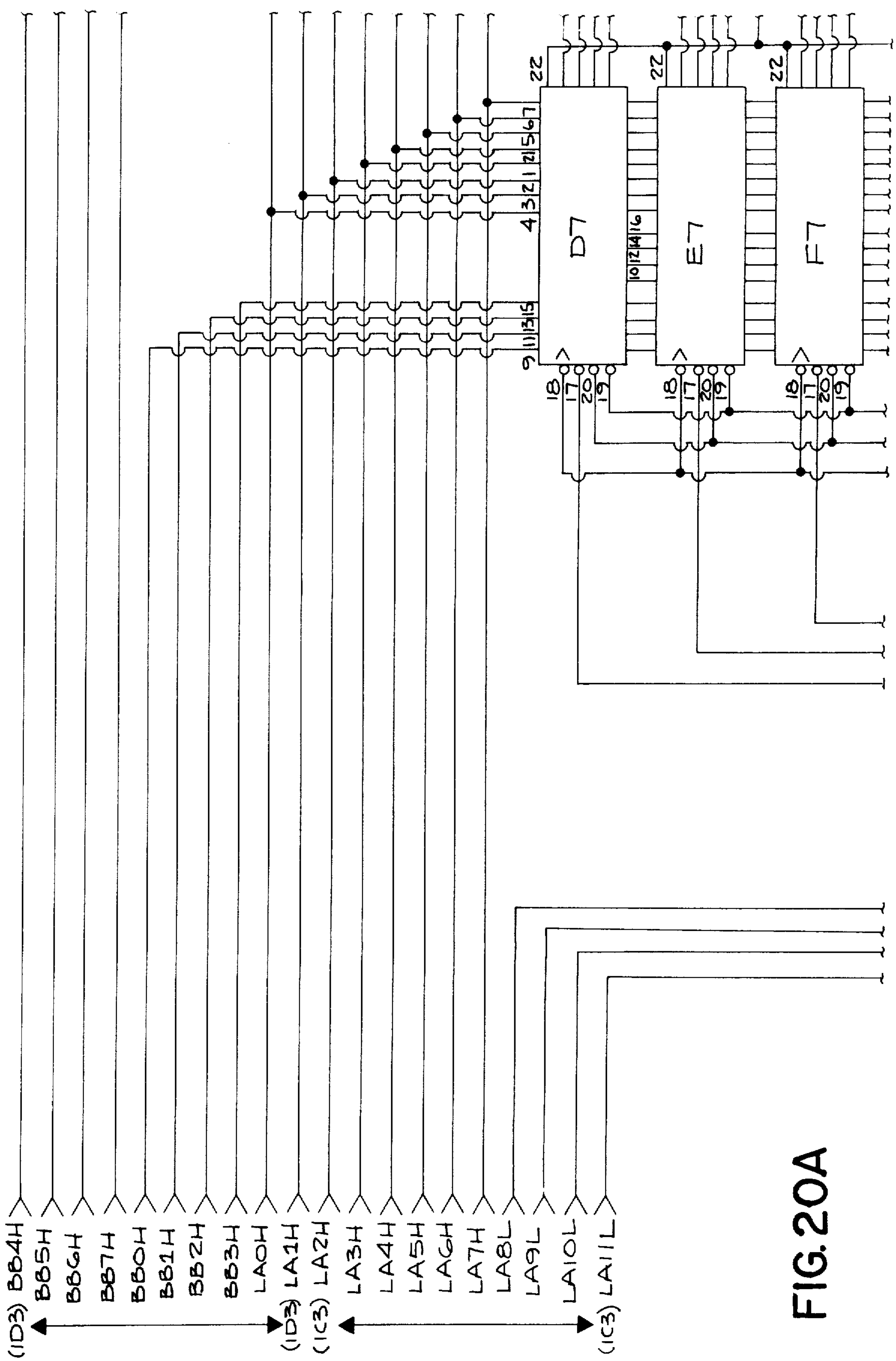
Figure 20B:
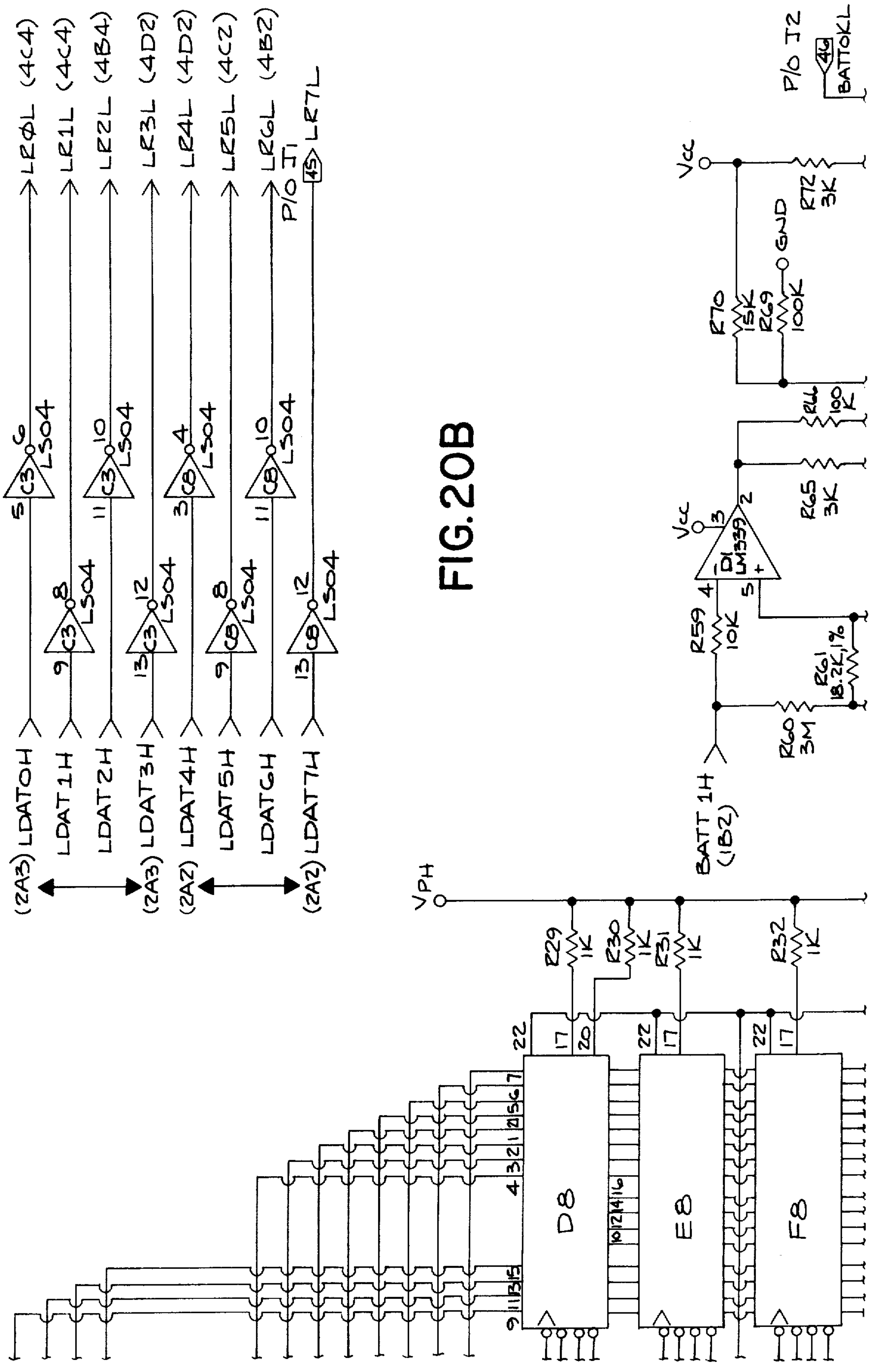
Figure 20C:
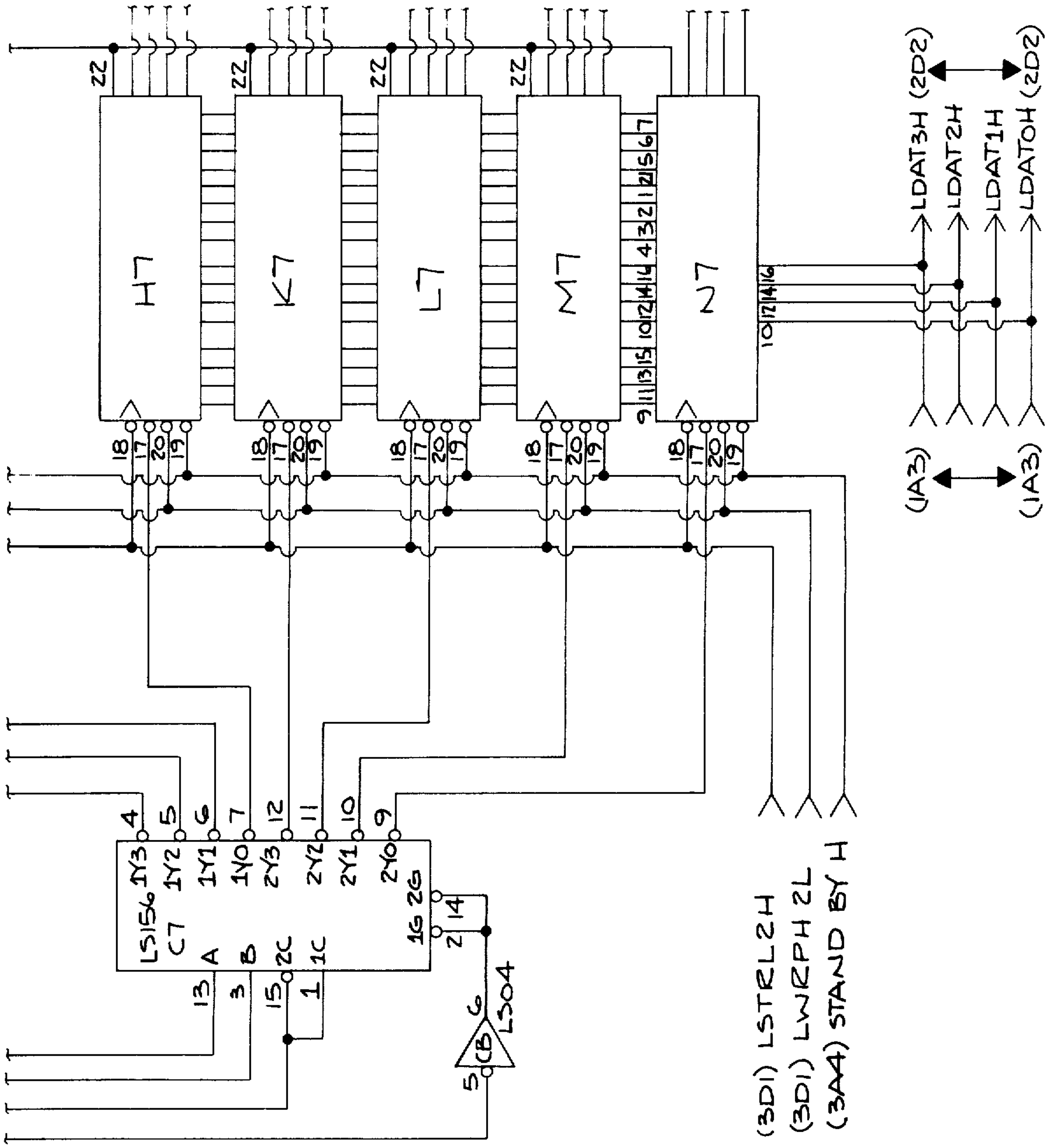
Figure 20D:
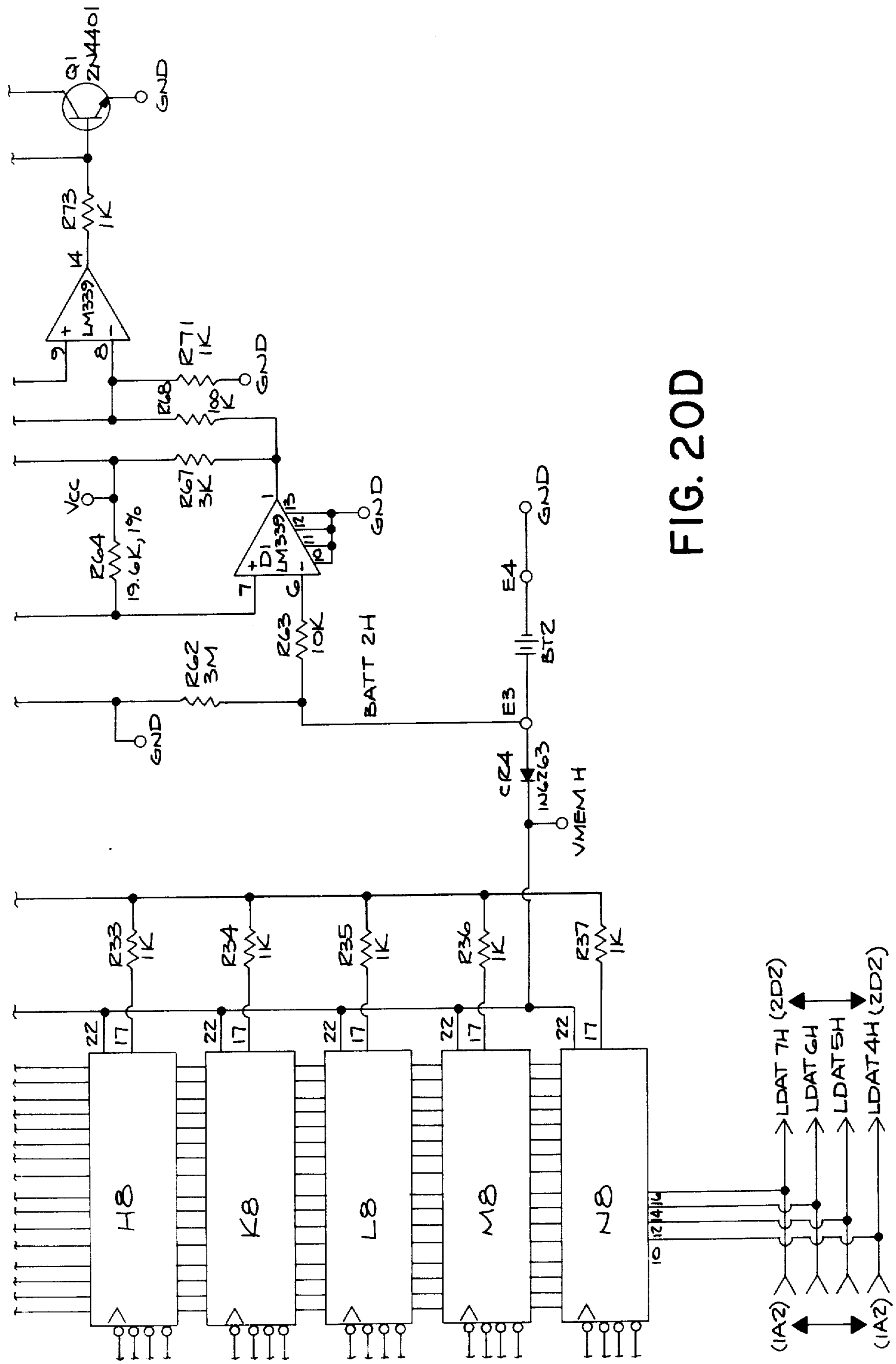
Figure 21A:
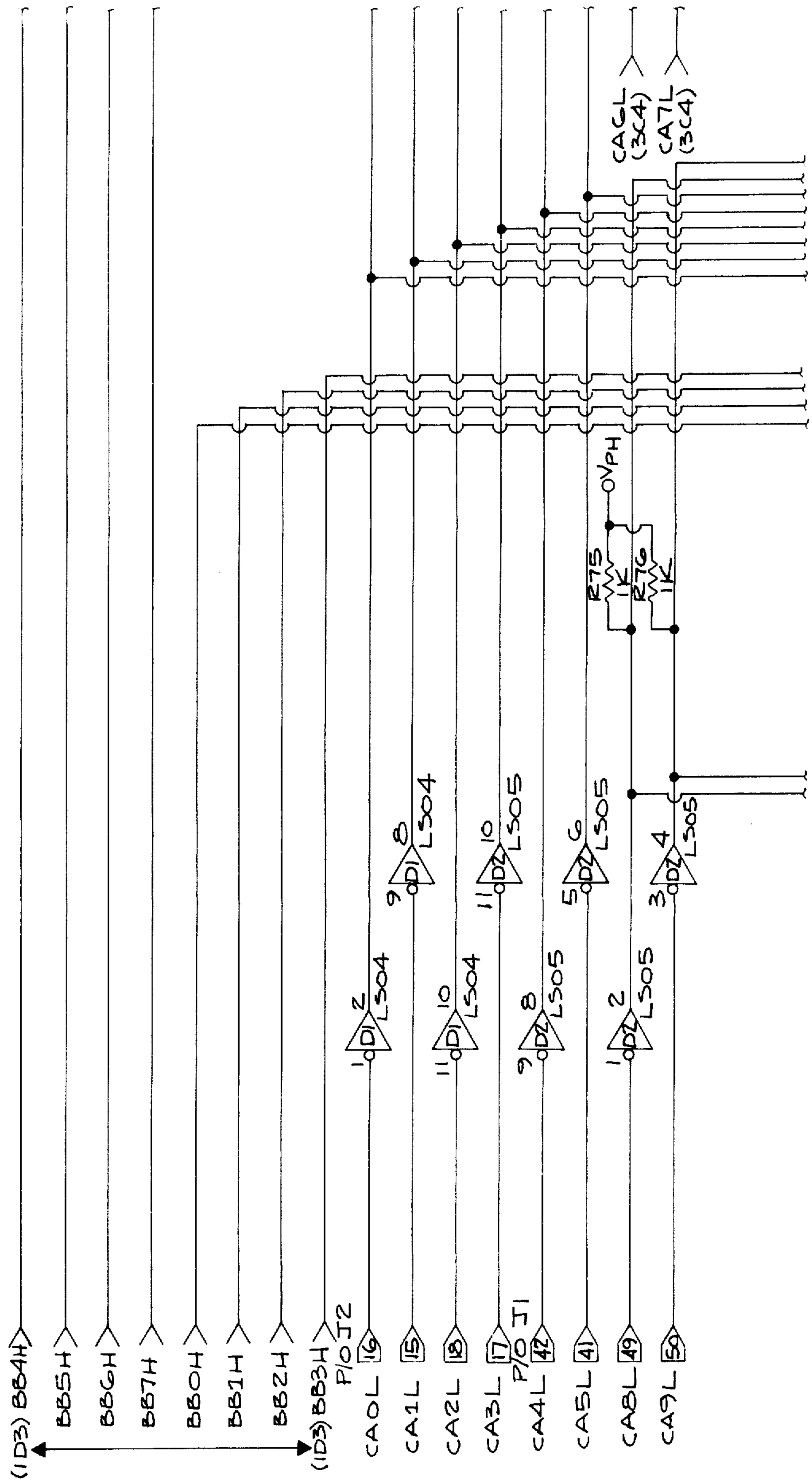
Figure 21B:
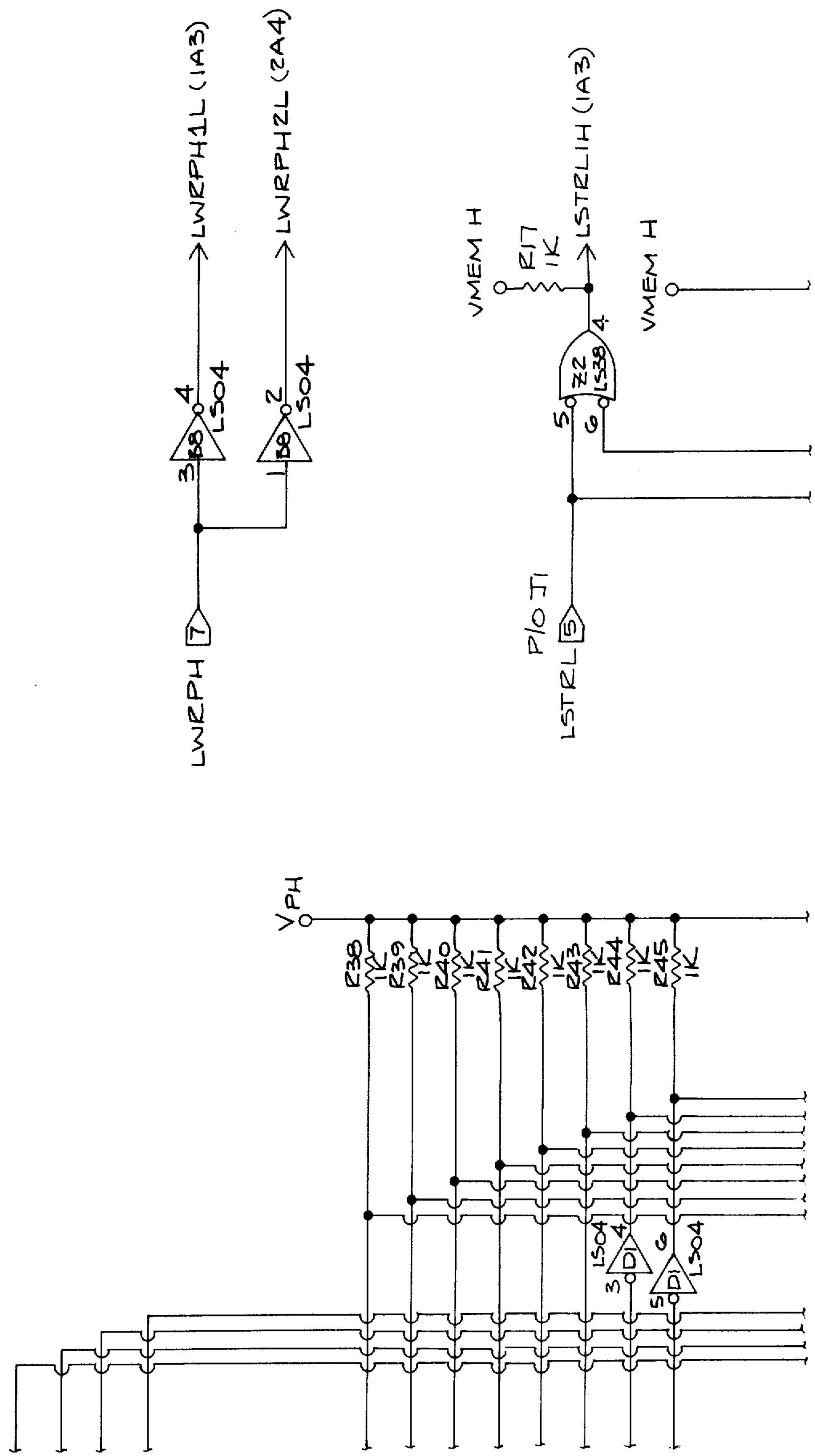
Figure 21C:
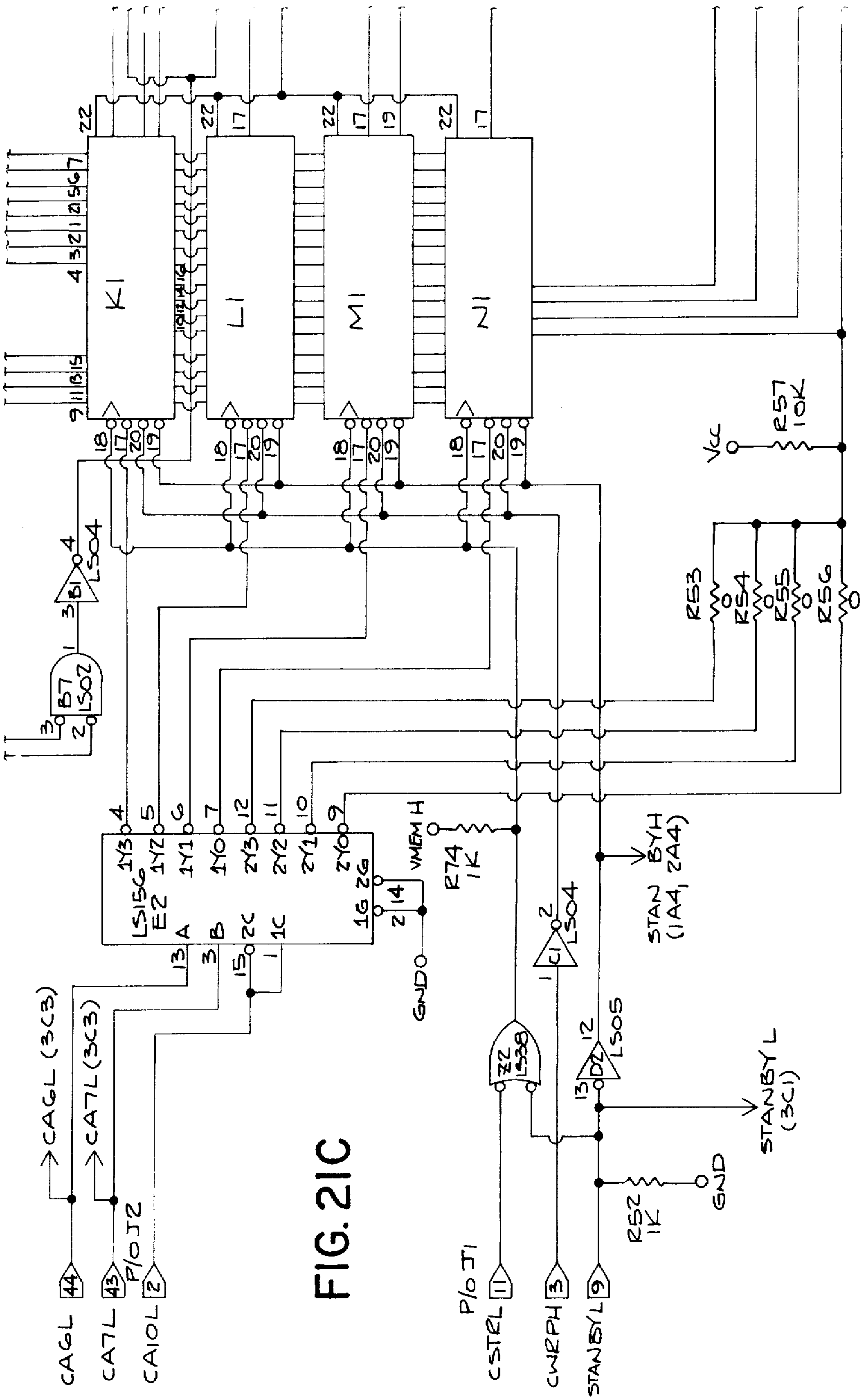
Figure 21D:
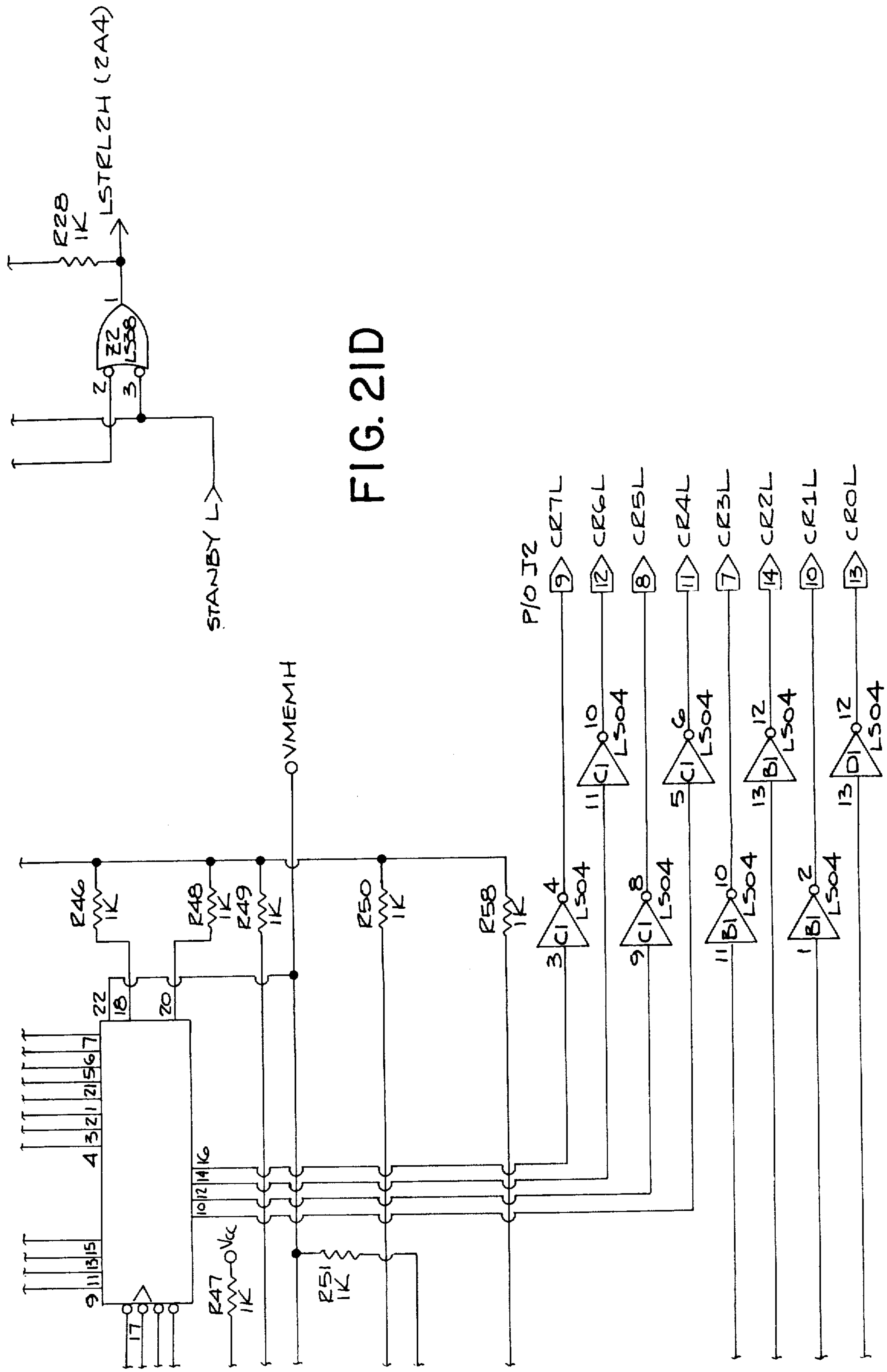
Figure 24E:
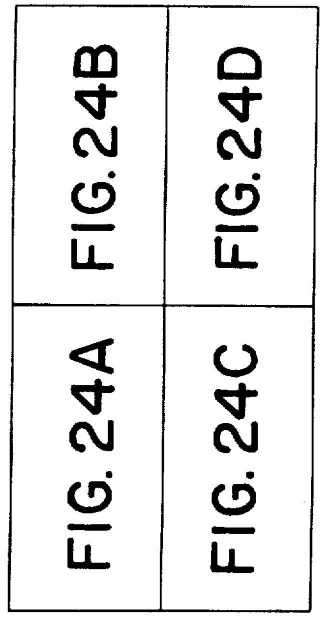
Figure 21E:
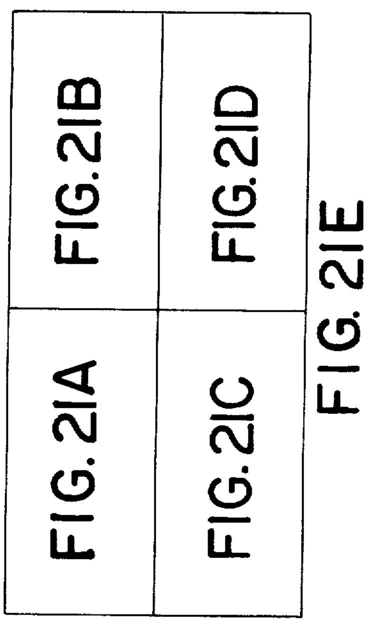
Figure 23C:
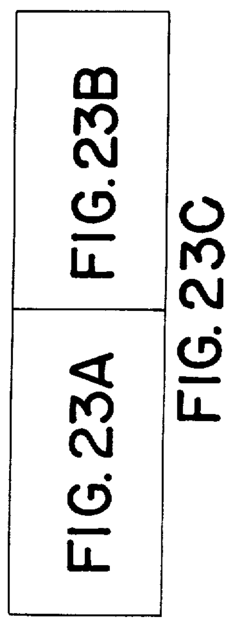
Figure 29:
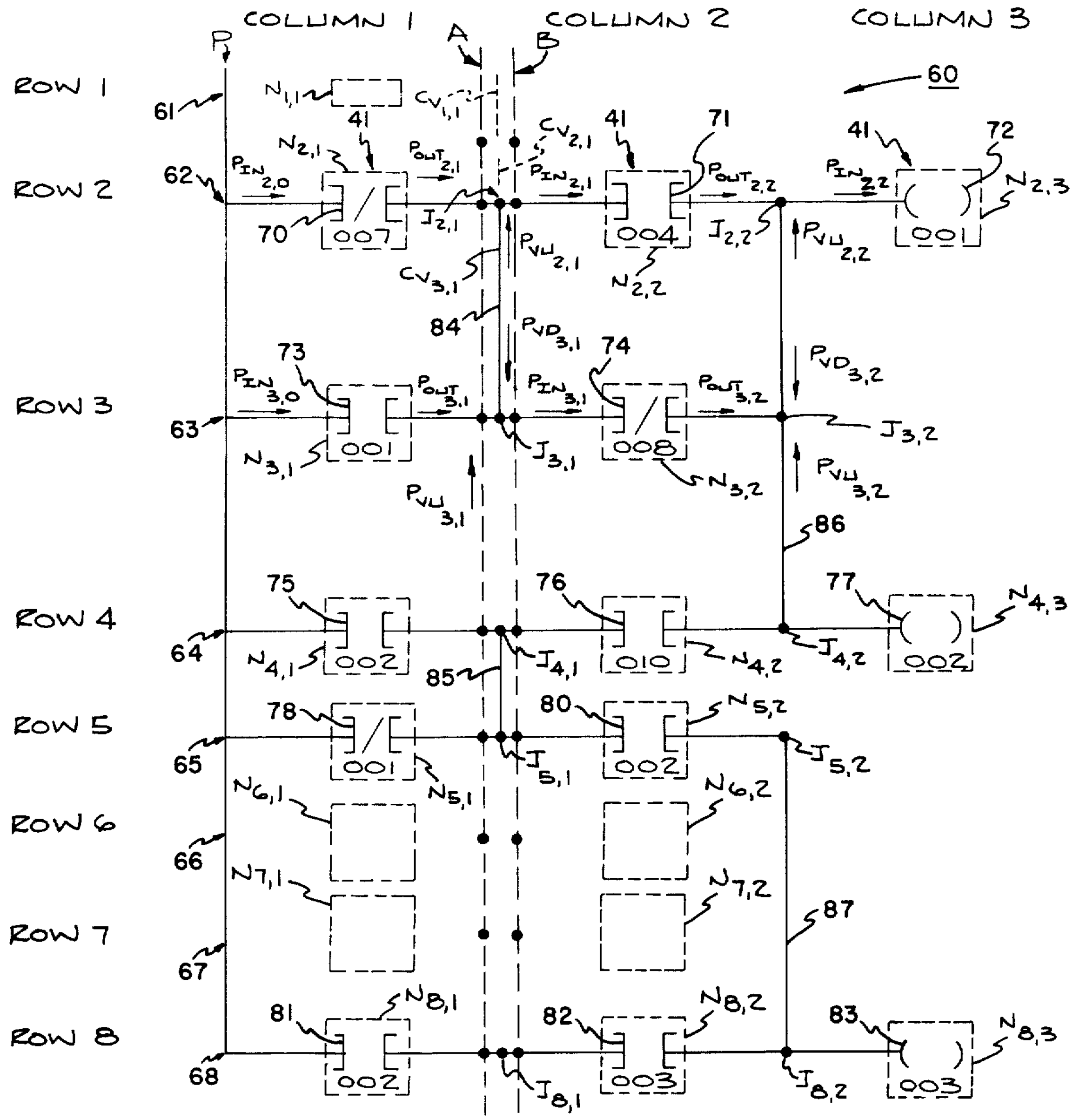
Figure 30:
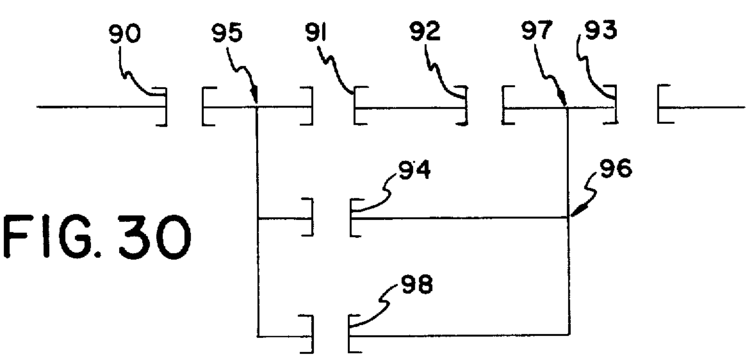

FIG. 6E sets forth the legend for the symbols used in FIGS. 6A–6D;

FIG. 7 illustrates the displays generated by the programming panel CRT for a selected node when various changes to the node are made by the user;

FIGS. 8A–8H illustrate the assembly portion of the CRT display when a search function is desired utilizing various parameters of the control program;

FIG. 9 is a control flow diagram of the mainframe software of the programmable controller shown in FIG. 1;

FIG. 10A is a data flow diagram of the mainframe software during normal operation of the programmable controller following startup;

FIG. 10B, is a data flow diagram similar to that shown in FIG. 10A representing the data flow during power-down and power-up operations;

FIG. 11 is a timing diagram for the mainframe of the programmable controller shown in FIG. 1;

FIG. 12 is a software state diagram for the mainframe of the programmable controller shown in FIG. 1;

FIGS. 13A-13D are schematic diagrams of the memory addressing counters and read gates of the central processing unit shown in FIG. 1;

FIG. 13E is a diagram showing how FIGS. 13A-13D are placed together;

FIGS. 14A-14D are schematic diagrams of the I/O interface of the CPU;

FIG. 14E is a diagram showing how FIGS. 14A-14D are placed together;

FIGS. 15A-15D are schematic diagrams of the control select logic of the CPU;

FIG. 15E is a diagram showing how FIGS. 15A-15D are placed together;

FIGS. 16A-16D are schematic diagrams of the processor and program ROM interface of the CPU;

FIG. 16E is a diagram showing how FIGS. 16A-16D are placed together;

FIGS. 17A-17D are schematic diagrams of the peripheral port and scratchpad of the CPU; and FIG. 17E is a diagram showing how FIGS. 17A-17D are placed together;

FIGS. 18A-18D are schematic diagrams of the connectors used in the central processing unit shown in FIG. 1;

FIG. 18E is a diagram showing how FIGS. 18A-18D are placed together;

FIGS. 19A-19D, 20A-20D, 21A-21D, 22A-22D, and 23A-23B are schematic diagrams of the memory boards for storing the user ladder-diagram network, coil data and register data, this memory schematic diagram forming a portion of the central processing unit of the programmable controller shown in FIG. 1;

FIGS. 19E, 20E, 21E, 22E, and 23C are diagrams showing how FIGS. 19A-19D, 20A-20D, 21A-21D, 22A-22D, and 23A-23B are respectively put together;

FIGS. 24A-24D, 25A-25D, 26A-26D, 27A-27D, and 28A-28D are schematic diagrams of the programming panel shown in FIG. 1;

FIGS. 24E, 25E, 26E, 27E, and 28E are diagrams showing how FIGS. 24A-24D, 25A-25D, 26A-26D, 27A-27D, and 28A-28D are respectively put together;

FIG. 29 is a diagrammatic view of a user network illustrating how the column solver functions; and FIG. 30 is a diagrammatic view of another user network which can pose difficulties for prior art programmable controllers.

DETAILED DESCRIPTION

GENERAL DESCRIPTION

As best seen in FIGS. 1-1A, 1B and 2, a programmable controller 20 according to the present invention includes a housing 22 enclosing a mainframe 39 comprising a central processing unit 31, memory 21, and a power supply 37 for providing DC power to the remainder of the programmable controller. The housing includes a power indicator 23, a run indicator 24, a memory protect key lock switch 25, a utility AC connector 26, and a peripheral port connector 27. As shown on FIG. 1A, a battery low light 51 may also be used to show when battery backup power is low. The peripheral port connector provides intercommunication between the programmable controller and a programming panel 29 by means of a cable (not shown).

The programmable controller further includes an I/O system 28 comprising an I/O duct 30, I/O bus 32, I/O housings 33, and I/O modules 34. I/O duct 30 houses the input/output bus 32 (see FIGS. 1A and 1B) which interconnects the mainframe with each of the interconnected I/O housings 33 depending from the I/O duct. Each I/O housing incorporates from one to eight I/O modules 34 each module being an input module or output module for either AC or DC voltages. Each I/O module has four output points or input points for interconnection with discrete external devices or, when operating in a register I/O mode, with data processing devices such as minicomputers or hierarchical programmable controllers. The programmable controller in its maximum configuration can control 256 discrete outputs and respond to up to 256 discrete inputs. These additional I/O points are provided by additional I/O modules housed on additional I/O housings not shown in FIG. 1. Indeed, the duct 30 may be extended on both the sides shown in FIG. 1 as well a below housing 22 in order to provide for the additional I/O housings and modules. In addition to the programming panel 29 that may be interconnected to the peripheral port connector 27, a tape loader, other CRT programming panels, and a monitoring computer may all be connected through connector 27 by means of a peripheral port adapter 35.

Figure 3:
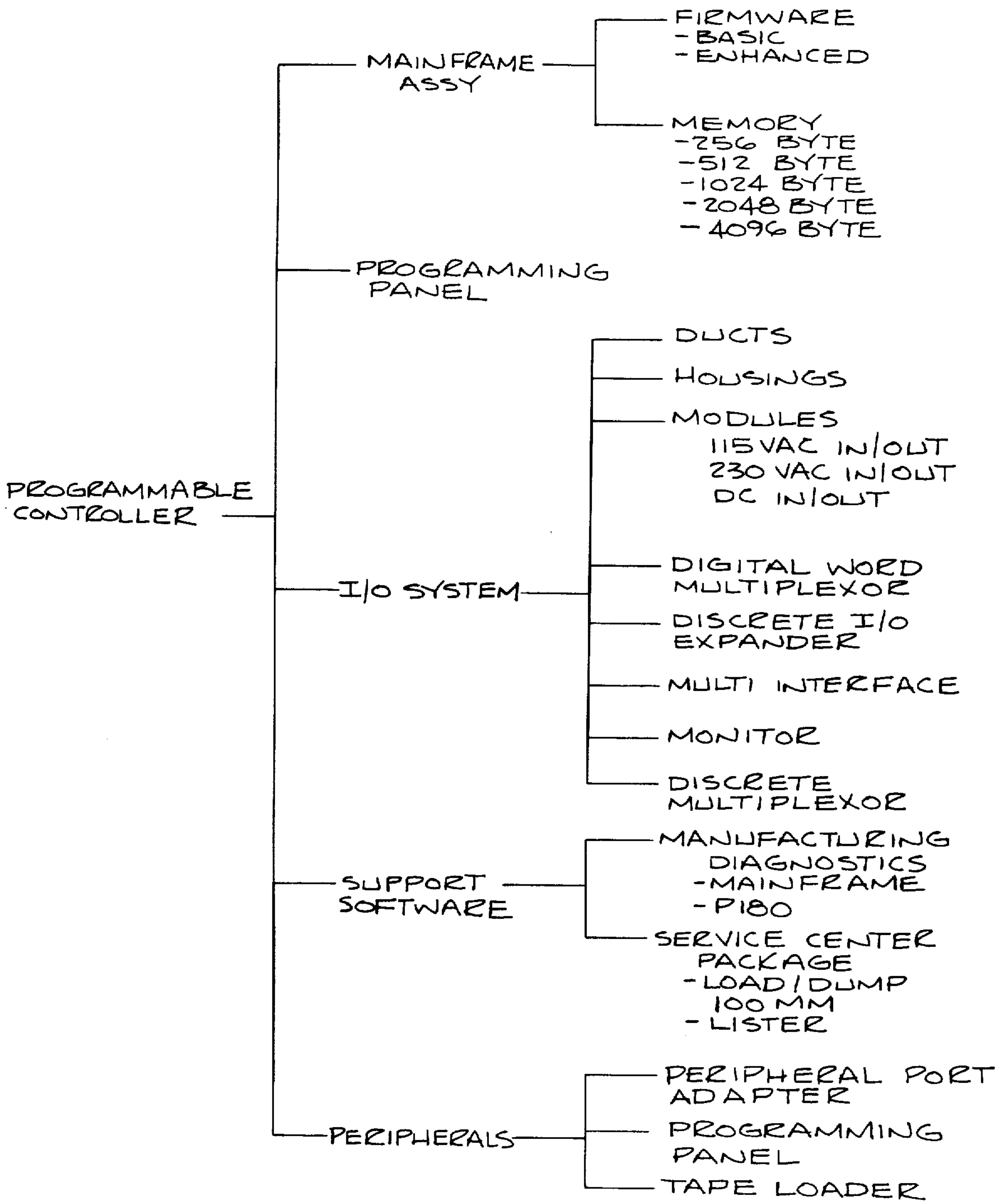
FIG. 3 is an illustration of the top level subsystem hierarchy of the programmable controller shown in FIG. 1.

The full range of the programmable controller is diagrammatically shown in FIG. 3 which illustrates the various subsystems of the controller and the various interconnections between the subsystems and the external world.

Figure 2:
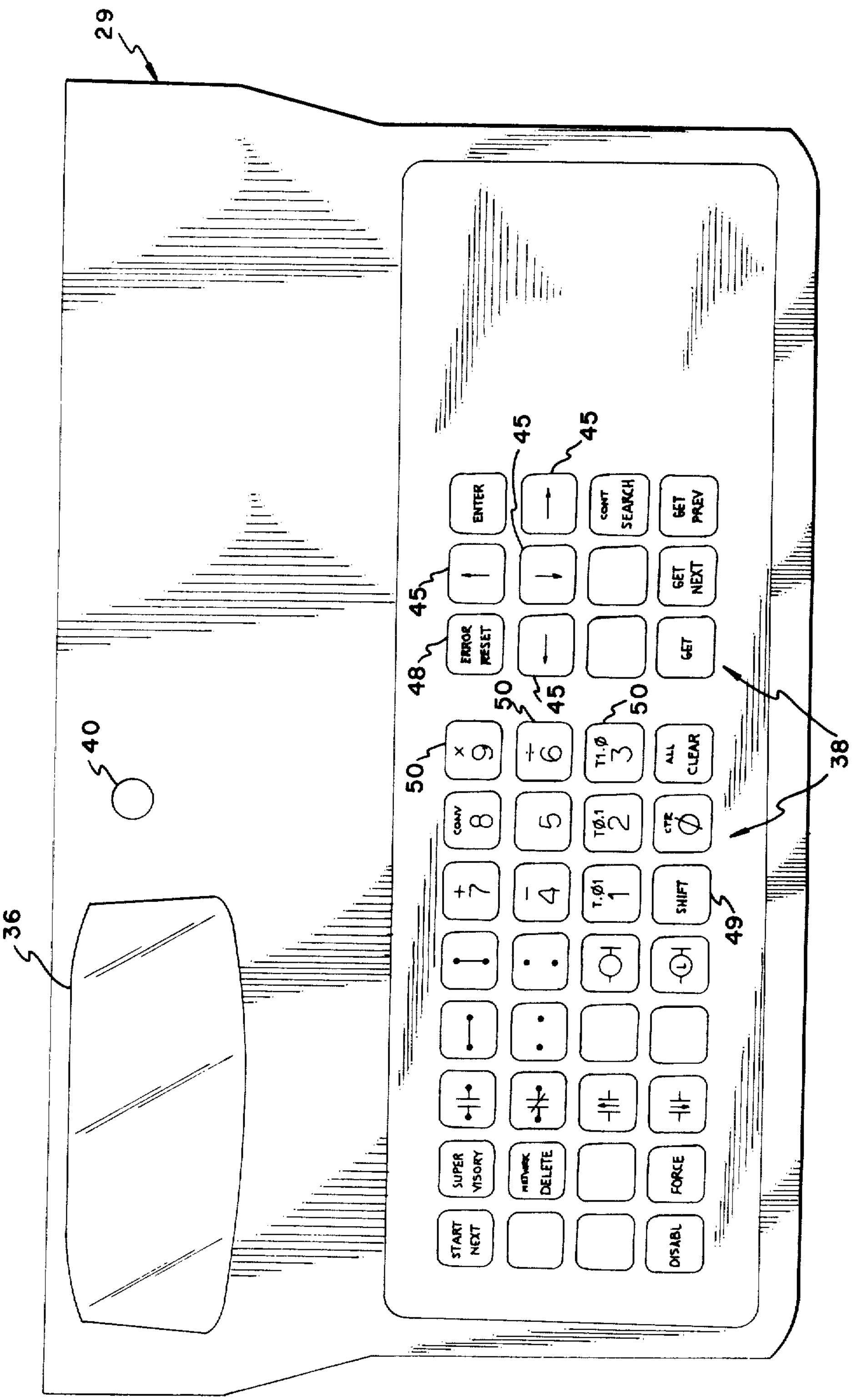
FIG. 2 is a plan view of the keyboard, LED, and portion of the CRT display of the programming panel shown in FIG. 1.
Figure 4:
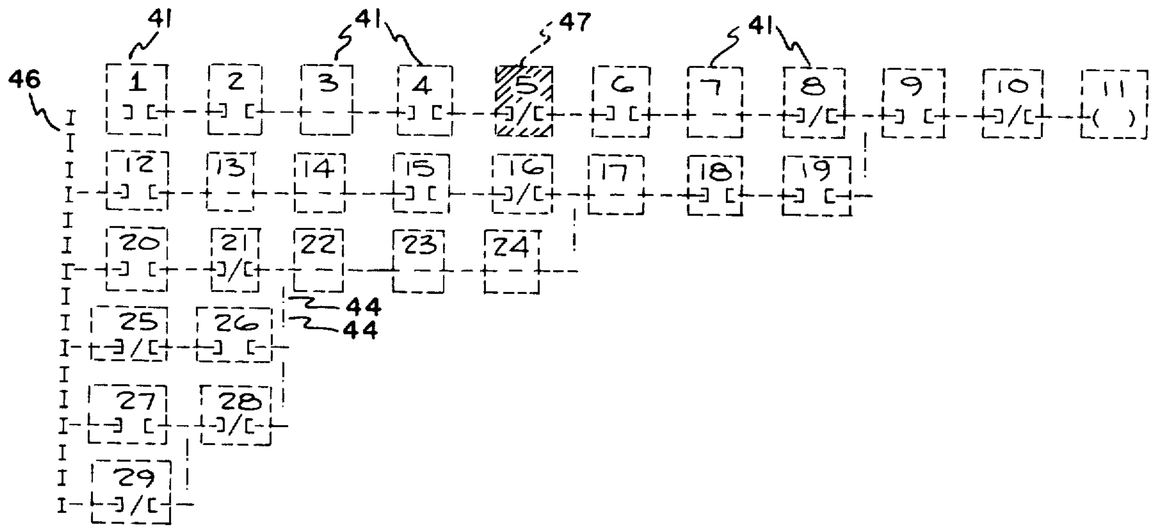
FIG. 4 illustrates a typical electrical ladder-diagram network that may be programmed by a control engineer with the programming panel shown in FIG. 1.
Figure 5:
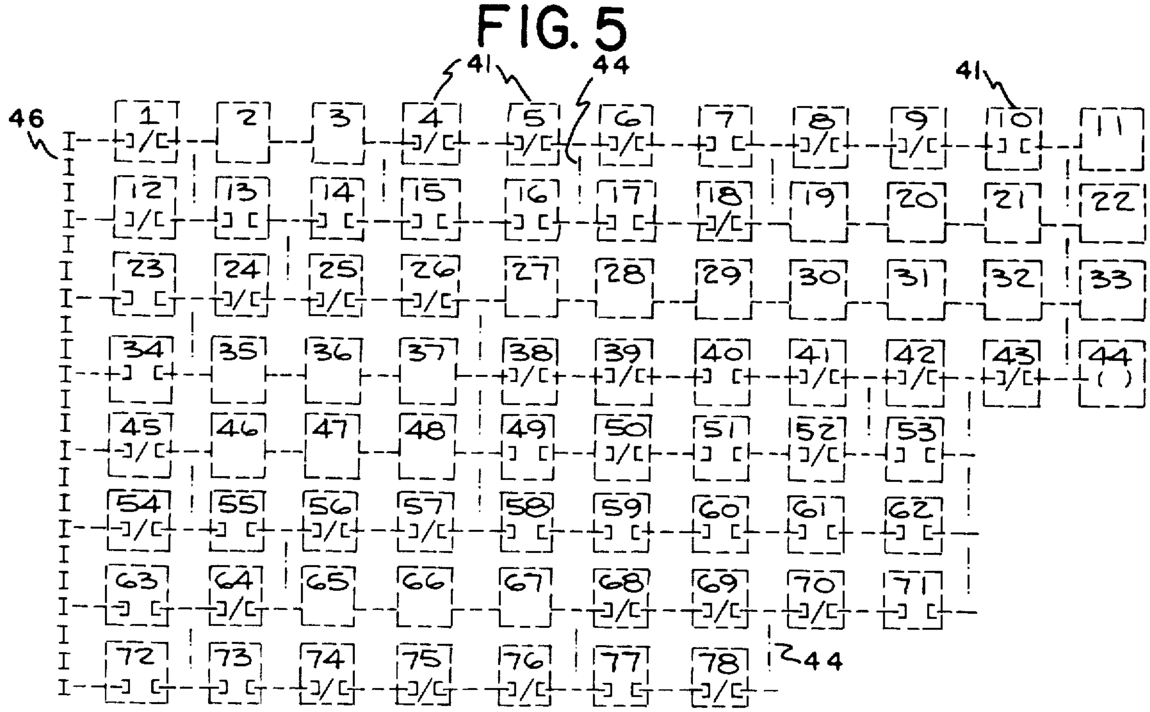
FIG. 5 illustrates another typical electrical ladder-diagram network that may be programmed on the programming panel.

The mainframe is an integral assembly within housing 22 containing a processor, E5 (see FIGS. 16A-16D), read-only memory (ROM), a resident executive program, battery backed up random access memory (RAM), a resident user program and interfaces to the I/O programming panel 29, other peripheral devices and to the I/O system 28. As best seen in FIGS. 1 and 2, the programming panel 29 consists of a cathode ray tube (CRT) 36, a keyboard 38, and an LED power status light 40, all of which is supported by a microprocessor (see FIGS. 22A-28D) as more fully discussed later. The programming panel displays the user generated program in terms of one or more networks such as shown in FIGS. 4 and 5, each network comprising up to seven electrical ladder-diagram rows or rungs containing nodes comprising user selected elements which may be interconnected vertically as more fully described later. The programming panel further displays the power status and register contents and permits changes to the control program.

Thus, the basic programmable controller according to the present invention performs logic solution processing which interfaces to I/O, a programming panel and other peripherals. The mainframe memory 21 includes a minimum of 256 bytes of user memory which allows the user to nominally program 96 nodes in his or her electrical ladder-diagram networks including 64 discrete inputs, 64 discrete outputs, 64 internal coils, and 62 holding registers. Registers are represented as 12-bit binary quantities in the CPU and are converted to three decimal digits for display on programming panel 29 and to three binary coded decimal digits (BCD) for I/O via a register multiplexer. For limited register data transferral discrete I/O modules may be used with the CPU software making the necessary BCD to binary and binary to BCD conversions. The user instruction set includes relays, latches, timers, counters, all represented on a multi-node seven row by eleven column program format per network as best seen in typical networks shown in FIGS. 4 and 5. The programmable controller can additionally perform register I/O up to 32 iput and 32 output registers and transitional contacts sensing true to false or false to true transitions as well as calculate functions with multiple outputs and step sequencers. The user memory can also be extended from 256 bytes up to 4,096 bytes.

Functional Description

CONTROLLER MAINFRAME

The controller mainframe 39 within housing 22 performs the processing necesary to convert inputs to outputs in accordance with the user's control program. It contains an interface to the I/O bus 32 and a serial interface 27 for communication with peripherals such as programming panel 29. Control and indicators consist of the run light 24, a power O.K. light 23, a battery low light 51 and a memory protect switch 25. Physically, the mainframe is approximately six inches deep, fifteen inches wide and eighteen inches high and can hang vertically from mounting screws and is normally intended for installation within an eight inch NEMA cabinet. It is packaged in a drip-proof enclosure and cooled by convection; thereby making it suitable for harsh industrial environments. The mainframe CPU scans and solves the user program once every twenty milliseconds maximum, and the system can support up to 256 discrete inputs, 256 discrete outputs and register I/O. The CPU software, as described more fully later, cycles continuously. Appendix A sets forth the entire mainframe software.

In each cycle it reads all field inputs, executes a logical transfer function defined by the user entered program which relates inputs to outputs, and generates field outputs accordingly. In addition, the software interfaces the CPU to the programming panel and/or additional EIA devices via the peripheral port adapter 35. This interface accommodates changes to the user entered program and provides output status information for display on the programming panel 29. The user program represented on the programming panel is in the form of a relay ladder-diagram network having nodes including normally open and normally closed switches, open and shorted connections both vertically and horizontally, timers and counters, transitional contacts, arithmetic functions including add, subtract, multiply and divide, sequencers, and binary-to-BCD and BCD-to-binary converts.

The field inputs consist of up to 256 discrete points, four per input module 34, each with a state of ON or OFF, plus of up to 32 words of register data. Each word of register date represents a binary number in the range of $\phi$ to 999 (base 10). These values are read into the controller from the I/O bus 32. BCD to binary conversion is made by the register multiplexer. All inputs are read at least once every 20 milliseconds.

Field outputs consist of up to 256 discrete points each with the state ON or OFF plus up to 32 ten-bit words of register data. These values are sent from the controller to the I/O bus 32 and are generated at least once every 20 milliseconds based on completing execution of the user program.

The mainframe contains a peripheral port 27 whose purpose is to interface to the programming panel or via a peripheral port adapter 35 to any EIA protocol device. The CPU accepts commands and data from this port whose purpose is to modify the user program residing in the controller, to alter the controller's state or to extract data from the controller. This data may either be a portion of the user program or the state of the programmable controller.

For all transfers of information, the peripheral device such as the programming panel 29 initiates a command and the controller mainframe responds thereto. This is true even for power data. Redundant bits are transmitted to aid in detecting transmission errors.

In addition, the mainframe displays operational and non-operational status via the run light 24. This light is ON whenever the executive program within the controller is being executed properly and is OFF when the executive program is halted due to a power failure, failure of onboard diagnostics, or other intermediate failures. All discrete outputs are turned OFF in the event of such failure and remain OFF until primary power has been cycled on in the power-up sequence.

The mainframe senses the status of the memory protect keylock switch 25. If the memory protect is engaged, attempts to change the user program by the programming panel are not permitted and result in transmission of error code.

The mainframe displays proper power supply output via the power O.K. light 23.

The basic CPU processing can be set forth in five systems:

(1) power-up, power-down, (2) logic solving;

(3) peripheral port I/O handling;

(4) field I/O handling; and (5) onboard diagnostics.

Upon power-up, the CPU executes a set of appropriate diagnostic tests to insure that the hardware is functioning properly. If these tests fail, the system halts, leaving data in predetermined locations of memory identifying what has failed. If these tests are passed, then the following sequence occurs:

(1) all outputs are set OFF with the exception of latches and disabled outputs which were ON when power was last removed, these outputs retain their ON state;

(2) read all inputs; and (3) illuminate the run light 24 and start solving the user logic.

Upon an indication of imminent power failure, appropriate parameters are stored to permit orderly start-up of the programmable controller.

The CPU interprets the user program data base and generates field outputs based on field inputs as determined by the contents of the data base. The instruction set and syntax of the interpretive language used to represent the user's relay ladder-diagram networks in the data base is set forth below. Details of the operation and representation of various instructions, addressing conventions, and range constraints also appear below.

INSTRUCTION SET

The instruction set of the programmable controller includes the following:

(1) relays-normally open, relays-normally closed, horizontal open, horizontal short, vertical short, vertical open;

(2) timers, 0.1 second, 1 second, and $\phi$. $\phi$1 seconds, 3 BCD digit magnitude;

(3) counters, 3 BCD digit magnitude;

(4) coil, latched or unlatched; may be disabled ON or OFF;

(5) transitional relay contacts conduct ON with a transition from OFF and ON or conduct ON on a transition from OFF to ON of the designated reference;

(6) sequencer stepping switches;

(7) binary-to-BCD and BCD-to-binary converts;

(8) calculate $B+C=D$;

(9) calculate; $B-C=D$; three discrete outputs; one output ON if B greater than C, a second output ON if $B=C$, a third output ON if B is less than C;

(10) $B\times C=D$; one discrete output always equal to the logical value of input I1; (see Table 10C)

(11) $B\div C=D$; one discrete output ON if the division is proper, a second discrete output ON if there is a dividend overlfow, and a third discrete is ON if the divisor is equal to zero.

The syntax for the instructions is a ladder-diagram network of a maximum size of eleven column by seven rows as best seen in FIGS. 4 and 5. Coils appear only in the right-most column of the network on any or all of the rows. All coils are latchable and coils and inputs may be disabled ON and OFF from the programming panel. Coil designations for output I/O points is independent of the line or network number.

An important aspect of the present invention is the order of solution of the user program. The user program is solved in a sequential network basis and is from left to right by column within each network. Ths left-to-right column solution is performed in part by a column solver described more fully later which defines the input power status to the next node in a line based upon the output power from the node to its immediate left as well as any power transferred by vertical interconnections to that line from adjacent lines.

The I/O serviced at the end of each scan solving all of the user networks and includes an update of both inputs and outputs. The network order is under the control of the user and thus, a network may be inserted between networks in a situation where the sequential order of the solving of the networks is important to the control engineer.

The CPU performs data validity checking necessary to insure that all register values, address, and reference number values are within valid ranges and that all operation codes are valid. An invalid instruction is prevented from being entered into the user memory by the CPU. If, in the process of executing the user program an invalid instruction or an invalid random access memory check sum or a stuck I/O bit is encountered, the CPU processing is halted; i.e., discrete outputs are dropped and logic solution ceases.

PROGRAMMING PANEL SUBSYSTEM

As shown in FIG. 1, the programming panel 29 provides the primary operator/user interface for determining the functions to be performed by the programmable controller. The programming panel is a small portable device having a rugged CRT display 36 and a small dedicated function keyboard 38. The CRT displays one or more networks representing relay ladder-diagrams. The display shows a seven by eleven array of nodes containing contacts or function blocks. The system provides near real-time power display for one network at a time; however, since the network is updated less frequently than the scan time of the CPU for solving the network, it is possible that beating between the CRT refresh rate and the scan rate can result in spurious displays of power for an oscillating contact. This is overcome by the programming panel having a true real-time power display light-emitting diode (LED) 40 which displays the power for a selected contact in the displayed network as selected by the user with a cursor. The network includes a numeric key pad and a set of function buttons enabling the user to enter, edit and delete portions of his or her program.

The programming panel enables the user to enter, modify and delete logic networks as well as to monitor registers and discrete I/O points.

FIGS. 4 and 5 illustrate how a network of the control program is displayed on the CRT. Each line of the userlogic program uses two rows of display on the CRT. The lower of the two rows indicates the contact type inserted at a particular column within a particular line by the user. The two lines define a series of nodes 41, each node including a contact type element such as normally open contact 42 in the lowermost row of the display and a reference number to that contact in the uppermost row such as the number 1 shown for the upper left-handmost node of FIG. 4. The references to the elements within nodes 41 can be any coil and need not be in the sequential order shown in FIGS. 4 and 5. Horizontal connections between adjacent nodes is made by dashed lines 43 while vertical interconnections between adjacent nodes in different lines is made by dashed vertical lines 44. By use of the dashed vertical lines, it is readily apparent that user programs need not have a coil output for each line but may reference nodes from one line to vertically higher or lower nodes of other lines.

A cursor 47 (shown by dashed slanted lines) is available under user control by means of switches 45 (see FIG. 2) to move the cursor from node to node on the network. The cursor is displayed by a reverse shading with respect to the remainder of the CRT display. The "current network" is defined as that network on the programming panel CRT which is identified by having the cursor positioned somewhere within the network. If the cursor is not positioned on any network, no network is current. Power flow is indicated by an intensified vertical and horizontal power connections and is displayed for the current network. The start of a network as indicated by a break in the left hand power rail 46 as shown in FIGS. 4 and 5.

It is readily apparent that networks need not be rectangular in shape due to the vertical interconnections available. However, they will occupy a rectangular area on the CRT display. Thus, a network whose largest column is five elements deep (that is it includes five rows) requires an eleven-by-five array on the screen. Unused elements in a network are displayed as blank areas. Vertical opens and horizontal opens are defined as used elements.

Networks are displayed on the screen only if the entire network can fit on the screen. As scrolling causes networks to shift on the screen, any network than cannot be completely displayed is blanked out from the screen.

The programmable controller does not allow the user to insert via the programming panel more data than the controller has memory to hold. Any attempt to do so results in an error code displayed on the CRT.

The lower two lines of the CRT screen form the status/assembly area. The status/assembly area consists of seven sections; all sections arranged vertically. Typical status assembly area format is shown in FIGS. 6A, 6B, 6C, 6D and 6E.

As also shown in FIGS. 6A–6E, one of the status/assembly areas displays discrete data which allows up to a maximum of six data values to be displayed from the programmable controller as shown by the six groups of NNNN. The first line is labeled "REF" and contains the reference numbers for the items being displayed. The second line is the current value of those reference elements and is labeled "VAL". Reference elements may be holding registers, input registers, discrete inputs and outputs, or internal coils. If the reference is for a register value, the current contents of the register are displayed as a four digit value. If the reference is for an I/O point, the first position of the value field contains either a D or a blank. The D indicates that the contact is disabled. The other three characters in the field are either OFF or ON which is the state of the contact. References are placed in the discrete display area via the cursor which may be placed on any of the six reference locations.

A second status/assembly area is designated "USED" with a number beneath it which indicates the number of bytes of memory that is filled by the user's control program. This number is automatically updated as changes are made in the user data base.

Another of the seven areas displays a step number (Step #) and is the position or number of the current network shown on the CRT display. It indicates the order of solution of this user network with respect to the other networks. A step number of "N" implies that there are "N−1" networks which precede this network in the data base and in the solution order.

A fourth area is the error field. It is normally blank. It is used only when the panel has an error message to display as shown in the status/assembly area by "EEEEEEEEEEEE". The error field is cleared by the first error reset key 48 shown in FIG. 2. A fifth area is the advisory field shown by "AAAAAAAAAA". It is used to display a status message. The message indicates to the user that activity is taking place during extended execution time such as a search or enter function as explained later in this description. It also indicates that the programming panel is waiting on the availability of a peripheral port. The advisory field is cleared when the message is no longer applicable.

The SHIFT field is a sixth area of the status/assembly and is shown by "S" which is normally blank. It contains the letter "S" only after the shift key 49 (FIG. 2) has been struck. It remains on the screen for only the next key stroke. It indicates that the next key stroke will be interpreted as a shifted key stroke as shown by the upper level indicia on some of the keys of keyboard 38.

The last area is the assembly area. This area is on the extreme lower left-hand side of a six-by-two character array which is used to build the contact-type, reference number and vertical connections of a node. It is shown in FIG. 6A as "CCCCVRRRRV"; as defined in the legend of FIG. 6E.

The LED 40 shown in FIG. 2 generates a real-time display of the status of the power output of any one node in the current network as selected by the cursor position.

As shown in FIG. 2, the keyboard 38 is the user input device of the programming panel. It consists of a set of dedicated keys and a set of keys which may be used in conjunction with shift key 49. The keys may be divided into three basic types; data keys, 40, cursor control keys 45, control keys 52 and function keys 54.

DATA KEYS

The data keys 50 shown in FIG. 2 are defined as those keys which are entered into the assembly area. They consist of contact types and numbers. The data keys are set forth in Table 1 with an indication of the key that is used, its name and the symbol on the CRT display.

The assembly area is a six-ty-two array of characters which represents the contact, reference number and vertical connection currently being keyed by the user. The assembly area is not entered into the controller memory until a proper FUNCTION key is struck.

Data is keyed into the assembly area in a simple manner. Numerics cause the current reference number to be shifted left one position and a new character to enter the least significant digit. Contact-type and vertical connectors replace the current value in the assembly area for that type. The data in the assembly area is retentive; i.e., it is not cleared unless the CLEAR key is struck. The reference data area is filled with leading zeros when a new numeric key is depressed following operation of any function key that uses a numeric argument from the assembly area as discussed later in this specification.

TABLE 1

| KEY | NAME | SYMBOL |
|---|---|---|
| 0–9 | Numeric | 0–9 |
| -[ ]- | Normally Open Relay | -[ ]- |
| -[   ]- | Normally Closed Relay | -[   ]- |
| -[ ↑ ]- | Positive Going Contact | -[ ↑ ]- |
| -[ ↓ ]- | Negative Going Contact | -[ ↓ ]- |
| -( )- | Coil | -( )- |
| -(L)- | Latch | -(L)- |
| : | Vertical Open | : |
| ! | Vertical Short | ! |
| . . | Horizontal Open | . . |
| .-. | Horizontal Short | .-. |
| Shift 0 | Counter | CTR |
| Shift 1 | Timer - 0.01 sec. | T.01 |
| Shift 2 | Timer - 0.10 sec. | T 0.1 |
| Shift 3 | Timer - 1.0 sec. | T 1.0 |
| Shift 7 | Add | + |
| Shift 4 | Subtract | − |
| Shift 9 | Multiply | × |
| Shift 6 | Divide | ÷ |
| Shift 8 | Convert | CON |

CURSOR CONTROL KEYS 45

The programming panel supports four cursor control keys as set forth in Table 2 below.

The cursor 41 (see FIG. 4) wraps around horizontally on the CRT screen but does not have vertical wraparound.

If the cursor crosses from one network to another, the new network is re-fetched from the controller and becomes the current network.

Unrestricted cursor movement is permitted throughout the uer logic display and the discrete display area. The cursor location is indicated by a reverse video image of the cursor location. Each cursor position is a six-by-two array of characters on the screen.

FUNCTION KEYS

Function keys cause activity to occur within the programmable controller. Table 3 describes the function keys and the key stroke or keystrokes used to generate them.

The ENTER function moves data from the assembly area to the cursor position on the screen and updates the controller memory. No changes are made on the screen until the change is made in the controller memory. Three restrictions are imposed:

(1) reference numbers must be valid for the node type and controller capacity;

(2) certain node replacements are not valid; and (3) placement of nodes along a network has certain restrictions.

TABLE 2

| KEY | NAME |
|---|---|
| ↑ | Move cursor up one position |
| ↓ | Move cursor down one position |
| •Move cursor right one position | |
| • Move cursor left one position | |

TABLE 3

| KEY | FUNCTION | SYMBOL |
|---|---|---|
| ENTER | Move data from assembly area to position indicated by cursor. | ENTER |
| START NEXT | Create a new network in the controller following the current network. | START |
| DELETE | Delete node at cursor position. | DELETE NODE |
| SHIFT DELETE | Delete current network from data base. | DELETE NETWORK |
| SEARCH | Using data in assembly area, search for a match beginning with the first network. | SEARCH |
| SHIFT SEARCH | Using data in assembly area, search for a match beginning at the current cursor position and network. | SEARCH CONTINUE |
| GET NEXT | Fetch the network following the current network to the panel. | GET NEXT |
| GET PREV | Fetch the network preceding the current network to the panel. | GET PREVIOUS |
| CLEAR | Blank the assembly area. | CLEAR |
| SHIFT CLEAR | Blank the entire screen. | CLEAR ALL |
| GET | Fetch the status of the contact or register specified by reference part of the assembly area. | GET |
| DISABLE | Invert the status of the enable/disable flag for an input, output coil, or internal coil indicated by the cursor. | ENABLE/ DISABLE |
| FORCE | Invert the state of the contact specified by the cursor if disabled. | CHANGE STATE |

TABLE 3-continued

| KEY | FUNCTION | SYMBOL |
|---|---|---|
| SUPERVISORY | Enter supervisory state. | SUPERVISORY |
| ERROR RESET | Resets error condition. | ERROR RESET |

When a modification of an existing node is attempted, only that data currently in the assembly area is used. A field which has not been defined is not modified. An undefined field is maintained as null reversed video in the assembly area. A defined field reverts to normal video at the start of entry. FIG. 7 illustrates the display in the assembly area, the contact at the cursor, and the result at the cursor when modifications to an existing node are made.

Reference numbers must be valid for the node type and the controller capacity. For example, if a controller has 62 registers and an attempt is made to reference register 4063, an error code is generated. Valid references are defined for discrete I/O and register space for each programmable controller. The controller validates all changes before changing any user logic. Changing contact types is allowed under the rules set forth in Table 4.

Because programming is performed on line (that is, while the controller is operating) and because even partially entered programs must be interpretable by the controller, there are some restrictions on the order of entering nodes in a network. Thus, the first node programmed must always be at the top left-hand corner of the network. The next node programmed may be either adjacent below or adjacent to the right of the first node. Programming thus continues, observing the following rules:

TABLE 4

| OLD CONTACTS | NEW CONTACTS | RULES |
|---|---|---|
| Non-CTR/TMR/CALC | Non-CTR/TMR/CALC | No Restrictions |
| Non-CTR/TMR/CALC | CTR/TMR/CALC | Allowed at node (row) if node (I + 1,J) and node (I + 2,J)* are blank horizontal open, or horizontal short and 1 + 2.LE.8. |
| CTR/TMR/CALC | Non-CTR/TMR/CALC | Not Allowed |
| CTR/TMR/CALC | CTR/TMR/CALC | One for one replacement allowed. |

*for CALC only (1) there may be no unprogrammed nodes to the left of the rightmost programmed node in the top row;

(2) for any programmed node in the top row, a column may be extended below it without regard for the presence of nodes in the column to the right or left.

If the cursor is positioned in the reference display area of the screen, the ENTER key will move the reference number to the VALUE area and update the reference register in the controller. ENTER may be used only with a register already referenced in the reference area. The ENTER key does not function if memory protect is enabled.

START NEXT

The START NEXT key is used to create a new network in the controller memory. Networks are inserted into the data base after the current network. If the cursor is on a network whose network (step) number is N, the network number of the new network is N+1. Networks are inserted at the beginning of the logic data base by using the CLEAR key to reset the network number and then the START NEXT places the new network at the start of the data base. The new network has a network number of 1. When START is depressed, the START INDICATOR in the status area is loaded with the word "START" and space is made on the CRT display for the new network. If the insertion takes place at other than the start of logic, the network is built on the screen after the current network. A blank line is preserved with the cursor pointing to the leftmost position of the line. If there is a network on the screen after the old current network having a step number that does not immediately follow the old current network, it is shifted down one line if possible. If this causes part of the network to disappear, this entire network is removed. If the old network is at the bottom of the screen and occupies the last row, the screen is shifted up to create space. Only if the old current network occupies seven rows is it removed from the screen. Insertions at the start of the data base have an empty screen on which to compose logic as this is accomplished by the CLEAR key.

When a new network is created, the network number on the CRT is updated and the new network is then designated the current network for power display purposes. The START key does not function if memory protect is enabled.

DELETE

The DELETE key removes the current node from the data base in the controller. Nodes may be deleted only at the bottom of a column. A node in the top row may be deleted if there are no contacts to the right of it. This is necessary to preserve the integrity of the data base. Deleting a multi-node contact (TIMER/COUNTER/CALCULATE) results in all the nodes of that contact being deleted. The deletion may take place only in the PRESET node for timers and counters and the "B" node for calculate functions.

A user may delete all contacts in a network and still not delete the network itself. The DELETE NETWORK function must be used to delete the entire network. A network with no nodes is displayed as a line with a START OF NETWORK indicator and null nodes across the remainder of screen. A null network occupies one line on the screen. The DELETE key does not function if memory protect is enabled.

DELETE NETWORK

The DELETE NETWORK function removes the current network from the logic data base. The current network is removed from the data base and the area on the screen occupied by the network is blank. The cursor remains in the blank space. The remainder of the screen is not altered. The network number is set to zero. The DELETE NETWORK key does not function when memory protect is enabled.

SEARCH

The SEARCH function is used to fetch networks satisfying specified parameters to the panel. The SEARCH function is implemented using the contents of the assembly area to form a mask and object data. SEARCH commences at the start of the logic data base and continues sequentially until either a match is found or the end of user logic is reached. The elements of the assemly area form the search arguments. Any element left blank is assumed to be not important in finding a match. The elements which are defined are compared against the user logic until a match is found. Examples of assembly areas that are used to clarify these SEARCH functions are set forth in FIGS. 8A-8H and indicate that a search can be made for the first node, for the first occurrence of a particular contact-type, for the first occurrence of a particular reference number, for the first occurrence of a vertical connector, for the first occurrence of a contact-type having a vertical connector, for the first occurrence of a contact-type with a particular reference number, for the first occurrence of a particular reference number with a vertical interconnection, and for the first occurrence of a particular node.

If the SEARCH is successful, the network containing the matched node is put on the bottom of the CRT screen along with its network number. The network is designated as the current network and a power display is activated for it. The screen display of other networks is shifted upwards to make room for the new network. The cursor is placed on the node which was the match for the search. If the search fails, an error code is displayed in the error code section of the CRT/assembly area.

The SEARCH function thus provides a powerful tool to the control engineer when a control program is first generated and for later monitoring and de-bugging. It is an improvement over prior art controllers that allowed the user to scroll through the control program lines or to trace to a line to which a node in a current line was referenced. Such trace and scroll functions are disclosed in U.S. Pat. No. 3,944,984.

SEARCH CONTINUE

The SEARCH CONTINUE function performs the same function as the SEARCH function except that the search is started at the cursor position. The search operates in a top-to-bottom scan down each column and moves from left to right in a network. All search arguments and return codes are the same as for the SEARCH function.

GET NEXT

The GET NEXT key causes the network following the current network in sequence of solution to be fetched to the panel and treated as the current network. If there are no networks on the screen, the first network in the data base is retrieved.

A check is first made to ascertain whether the network to be fetched is already on the screen. If it is, the cursor is placed on that network. It is also re-fetched from the controller to verify its contents. If the network is not already on the screen, it is fetched from the controller data base. If there are no more networks in the controller, an error code is returned. Placement of the next network on the screen is determined by the following rules:

Unless already on the screen, the next network is placed below the old current network on the screen. If any network exists on the screen below the old current network having a step number (network number) that does not immediately follow the old current network, it is pushed downward to make room. If any part of this network disappears, the entire network is removed from the screen. If the next network fills the portion of the screen below the old current network and more space is required, the old current network and any networks above it on the screen are pushed upward. Only complete networks are allowed on the screen.

The GET NEXT function causes the network number to be updated on the screen. Power display is made for the network. The cursor is placed in the upper-left-hand corner of the network.

GET PREVIOUS

The GET PREVIOUS key causes the network before the current network in sequence solution to be fetched to the panel and treated as the current network. If there are no networks on the screen, the last network in the data base is fetched. A check is first made to ascertain whether the network to be fetched is already on the screen. If it is, the cursor is moved to that network. The network is also re-fetched from the data base to verify its contents. If the network is not already on the screen, it is fetched from the controller data base. If the current network is the first network, an error code is generated to indicate that there are no more previous networks. Placement of the new work on the screen follows this rule:

Unless it is already on the screen, the previous network is placed on the screen above the old current network. If any networks exist on the screen above the old current network having a step number that does not immediately precede the old current network, they are shifted upward to make room. If any part of these networks disappear, the entire network is removed from the screen. If the previous network fills the space above the old current network, the old current network and any networks beneath it are shifted down. If any part of these networks disappear, the entire network is removed from the screen. As mentioned earlier, only complete networks are displayed.

The GET PREVIOUS key causes the network number to be updated on the screen. The power display for the new network is initiated. The cursor is placed in the upper-lefthand corner of the network.

CLEAR

The CLEAR key is used to blank the assembly register. All previous contents of the composition area are removed. The assembly register is returned to reversed video, nulled condition. No other portion of the display is affected.

SHIFT CLEAR

The SHIFT CLEAR key is used to reset the entire display. The assembly area is blank. The error code is cleared. The user logic space on the screen is set to all blank. The network number is set to zero. The cursor is placed in the top left corner of the screen.

Following a SHIFT CLEAR key depression, certain keys have different functions as defined in TABLE 5.

The SHIFT CLEAR key has no affect on the controller data base. It is a panel command only that returns it to a virgin state.

TABLE 5

| Key | Function |
|---|---|
| START NEXT | Insert network at start of data base. |
| GET NEXT | Fetches first network from data base. |
| GET PREV | Fetches last network from data base. |

TABLE 6

| |
|---|
| 1 - EXIT |
| 2 - STOP |
| 3 - GO |
| 4 - INITIALIZE |
| 5 - DUMP |
| 6 - LOAD |
| 7 - VERIFY |

GET

The GET key permits references to be monitored. The GET key requires that a proper reference number exist in the reference portion of the status/assembly area. The reference number is moved to the discrete display REF line specified by the cursor and the referenced value is then updated at the screen refresh rate. The GET function does not change any data base values. The cursor must be positioned in the discrete display area or an error code is generated. The display of sequences step references (2xxx) is not allowed, althought the sequencer register may be monitored. If the reference is to a register (3xxx or 4xxx), the number below is the contents of the register. If the reference is to a contact, a "D" in the first position indicates that the point is disabled. The words ON or OFF then refer to the current state of the contact.

DISABLE

The DISABLE key is used to enable and disable discrete I/O points. Each input point and each output point may be enabled or disabled. If a point is enabled, its state is that which is determined by the controller. An input is the sense of the input channel as determined during the I/O sweep.

A disabled point cannot be changed automatically by the system. It may be changed via the FORCE key. Disabled points retain their state through power failure. Disabled coils are indicated by a "⌣" in the network. An input point enabled/disabled is enabled/disabled globably.

The DISABLE key complements the disable state of the point. If the point was enabled, it is disabled. If the point was disabled, it is enabled. The point is indicated by the cursor. The cursor must be pointing to an I/O reference in the discrete display area. All points are initially enabled. The DISABLE key does not function if memory protect is enabled.

FORCE

The FORCE key is used to change the state of discrete I/O points. It is designed to be used with the DISABLE key. An I/O point may be forced unless it is disabled. Enabled points are redefined by the next controller I/O sweep.

FORCE complements the state (ON/OFF) of the discrete point indicated by the cursor. It works only on relay or coil type nodes. Reference to other node types or to relays not disabled causes an error code to be generated.

If the discrete point is ON it is turned OFF. If the discrete point is OFF it is turned ON. FORCE does not function if memory protect is enabled.

SUPERVISORY

The SUPERVISORY key places the programming panel in a supervisory state. Table 6 is displayed on the CRT display when the SUPERVISORY key is depressed. The programming panel remains in the supervisory state until an exit function is executed. A function is executed by striking the numeric key corresponding to the function. All other keys are invalid.

ERROR RESET

When the programming panel detects an error during normal operations, a message is displayed in the error message portion of the status/assembly area (see FIGS. 6A and 6E). The keyboard is then locked out from the user until the ERROR RESET key is struck. This clears the error message and allows normal processing to resume.

REFERENCE NUMBER CONVENTIONS

Reference numbers are used to identify I/O points, internal coils, sequencer states, input registers, and holding registers. By convention, the reference number is four digits long except when used as a constant in which case it is three digits long. Table 7 defines the reference number conventions.

PROGRAMMING PANEL NODE TYPES

Relays/Coils/Shorts/Opens/Sequencers

Relays, coils, shorts, opens and sequencers are single node elements in the programmable controller. They are called single node elements because all information about them is expressed in one node in the data base. Tables 8A through 8H respectively define a normally open relay, a normally closed relay, a positive transitional relay, a negative transitional relay, a coil, a latch, a horizontal short, and a horizontal open.

TABLE 7

| RANGE | USE |
|---|---|
| 0001-0256 | DISCRETE OUTPUTS |
| 0257-0512 | INTERNAL COILS |
| 1001-1256 | DISCRETE INPUTS |
| 2YXX | SEQUENCER STATES - STEP XX OF SEQUENCER Y. |
| 3XXX | INPUT REGISTERS - NUMBER XXX |
| 4XXX | HOLDING REGISTERS - NUMBERS XXY |

TABLE 8A

RELAY - Normally Open

| Symbol: --] [-- XXXX | Input Power | XXXX State | Result |
|---|---|---|---|
| | 0 | 0 | 0 |
| | 0 | 1 | 0 |
| | 1 | 0 | 0 |
| | 1 | 1 | 1 |

XXXX = 0001-0256 DISCRETE OUTPUT*
0257-0512 INTERNAL COIL
1001-1256 DISCRETE INPUT
2YXX SEQUENCER STATE

TABLE 8B 3.5.4.1.2 RELAY - Normally Closed

| Symbol: --] [-- XXXX | Input Power | XXXX State | Result |
|---|---|---|---|
| | 0 | 0 | 0 |
| | 0 | 1 | 0 |
| | 1 | 0 | 1 |
| | 1 | 1 | 0 |

TABLE 8B-continued 3.5.4.1.2 RELAY - Normally Closed

| Symbol: --] [-- XXXX | Input Power | XXXX State | Result |
|---|---|---|---|

XXXX = 0001-0256 DISCRETE OUTPUT
0257-0512 INTERNAL COIL
1001-1255 DISCRETE INPUT
2YXX SEQUENCER STATE

TABLE 8C

RELAY - Positive Transitional

| Symbol: | --] ↑ [-- XXXX | Input Power | XXXX State | XXXX Previous State | Result |
|---|---|---|---|---|---|
| | | 0 | X | X | 0 |
| | | 1 | 0 | X | 0 |
| | | 1 | 1 | 0 | 1 |
| | | 1 | 1 | 1 | 0 |

XXXX = 0001-0256 DISCRETE OUTPUTS
0257-0512 INTERNAL COILS
1001-1256 DISCRETE INPUTS
2XXX SEQUENCER STATE

TABLE 8D

RELAY - Negative Transitional

| Symbol: | --] ↓ [-- XXXX | Input Power | XXXX State | XXXX Previous State | Result |
|---|---|---|---|---|---|
| | | 0 | X | X | 0 |
| | | 1 | 0 | 0 | 0 |
| | | 1 | 0 | 1 | 1 |
| | | 1 | 1 | X | 0 |

XXXX = 0001-0256 DISCRETE OUTPUTS
0257-0512 INTERNAL COILS
1001-1256 DISCRETE INPUTS
2YXX SEQUENCER STATE

TABLE 8E

COIL

| Symbol: | Enabled -( )- XXXX<br>Disabled -\\-( )- XXXX | Input Power | Result |
|---|---|---|---|
| | | 0 | 0 |
| | | 1 | 1 |

XXXX = 0001-0256 DISCRETE OUTPUT
0257-0512 INTERNAL COIL

TABLE 8F

LATCH

| Symbol: | Enabled -(L)- XXXX<br>Disabled -\\-(L)- XXXX | Input Power | Result |
|---|---|---|---|
| | | 0 | 0 |
| | | 1 | 1 |

XXXX = 0001-0256 DISCRETE OUTPUT
0257-0512 INTERNAL COIL

TABLE 8G

HORIZONTAL SHORT
Symbol: -.-

| | Input Power | Result |
|---|---|---|
| | 0 | 0 |
| | 1 | 1 |

TABLE 8H

HORIZONTAL OPEN
Symbol: . .

| | Input Power | Result |
|---|---|---|
| | 0 | 0 |
| | 1 | 0 |

SEQUENCER REFERENCE

Normally opened, normally closed, and relay transitional contacts may refer to a sequencer. The referencing of sequencers is in the following form:

2YXX where Y, in the range of 1 to 8 represents the sequencer register (405Y). The XX is in the range of 01 to 32 and is the sequence step. 8 sequencer registers are provided in the programmable controller numbered 4051 through 4058.

When a reference to a sequencer is encountered, the "XX" portion of the node is compared to the proper sequencer register (defined by "Y"). If the two values are equal, the solution is true (normally open nodes pass power, normally closed nodes do not pass power). Otherwise the solution is false (normally open nodes do not pass power, normally closed nodes do pass power). If the contents of the sequencer register is zero or is greater than 32, all references are false.

TIMERS AND COUNTERS

Timers and counters are 2-node elements. The symbol for the counter is shown in Table 9A and the symbol for the timer is shown in Table 9B. The nodes are arranged vertically. The top node is the preset value while the bottom node is the holding register where counts are accumulated. Each element has two inputs and two outputs. When input EI is activated the holding register is incremented for a counter and clock pulses accumulated for a timer. Input RI is the reset line. When RI is false, the holding register is cleared regardless of the state of EI. Output EO is true if the contents of the holding register is greater than or equal to the preset value. Output RO is always false.

TABLE 9A

COUNTER
Symbol:

```
BI—┤ XXXX ├—BO
   │ CTR  │
RI—┤ 4XXX ├—RO
```

| RI | BI | REGISTER ACTION | Ro Eo |
|---|---|---|---|
| 0 | X | 4XXX ⟵ O | 0 0 |
| 1 | 0 | No Change | 0 0 |
| | | | 0 0 1 if 4XXX . GE . Preset |
| 1 | 1 | 4XXX ⟵ 4XXX + 1 | 0 0 If 4XXX . LT . Preset |
| | | | 0 1 If 4XXX . GE . Preset |

PRESET XXXX = 0000–0999 NUMERIC CONSTANT
3XXX INPUT REGISTER
4XXX HOLDING REGISTER

If PRESET is a numeric content, it is compared directly against the contents of the holding register.
If PRESET is a register (3XXX or 4XXX), the contents of the register are compared against the contents of the holding register.

TABLE 9B

TIMER
Symbol:

```
BI—┤ XXXX ├—EO
   │ TXXX │
RI—┤ 4XXX ├—RO
```

| RI | BI | REGISTER ACTION | Ro Eo |
|---|---|---|---|
| 0 | X | 4XXX ⟵ O | 0 0 |
| 1 | 0 | No Change | 0 0 |
| | | | 0 0 1 if 4XXX . GE . Preset |
| 1 | 1 | 4XXX + No. of ticks since Last pass | 0 0 If 4XXX . LT . Preset |
| | | | 0 1 If 4XXX . GE . Preset |

PRESET XXXX = 0000–0999 NUMERIC CONSTANTS
3XXX INPUT REGISTER
4XXX HOLDING REGISTER
HOLDING REGISTER = 4XXX
TIMER VALUE TXXX = 1.0 One Second Timer
0.1 Tenth Second Timer
.01 Hundredths Second Timer If PRESET is a numeric value, it is compared directly against the contents of the holding register.
If PRESET is a register value, its contents are compared against the contents of the holding register.

CALCULATE FUNCTIONS

All calculate functions (add, subtract, multiply and divide) are 3-node elements. Tables 10A, 10B, 10C and 10D describe the add, subtract, multiply and divide functions respectively. The top node of each function is the "B-node" and must reference a register. The middle or "C-node" may be either a register or a constant. The bottom or "D-node" is a register reference. The general format for a calculate function is that the B node is operated on by the C node with the result placed in the D node.

Each element has three possible input lines and three possible discrete output lines. Input I1, when true, activates the function. Inputs 2 and 3 are ignored. Such multiple output calculate functions are unique in the programmable controller art. By use of multiple discrete outputs the user is able to more easily and definitively utilize the result of a calculate function in his or her control program. Thus, for example, in the subtract mode, the three discrete outputs—only one of which may be true at any particular time depending upon the result of the subtract operation—may be used to indicate to other portions of the control program the result of the calculation by means of binary on and off states.

Similarly, in the division function the first output indicates whether the division was proper while the second and third outputs indicate whether or not various kinds of input errors have occurred. When output 2 is true there is a dividend overflow and when output 3 is true the divisor equals zero. Thus the multiple outputs gives the user more information than just the value of the result of the calculate function as stored in the D register.

TABLE 10A

ADD
Symbol:

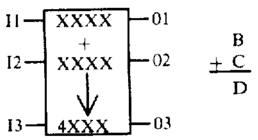

01 = 0 = > B + C . LE . 999
= 1 = > B + C . GT . 999
02 = No function, always false
03 = No function, always false

| | | |
|---|---|---|
| B-Node = | ϕXXX | NUMERIC CONSTANT |
| | 3XXX | INPUT REGISTER |
| | 4XXX | HOLDING REGISTER |
| C-NODE = | 0XXX | NUMERIC CONSTANT |
| | 3XXX | INPUT REGISTER |
| | 4XXX | HOLDING REGISTER |
| D-NODE = | 4XXX | HOLDING REGISTER |

If B + C >999, the D-Node register receives the result module 1000. For example:

| | | | |
|---|---|---|---|
| B | = 700 | B | = 700 |
| C | = 450 | C | = 291 |
| B + C | = 1150 | B + C | = 991 |
| D | = 150 | D | = 991 |
| 01 | = 1 | 01 | = 0 |

TABLE 10B

SUBTRACT
Symbol:

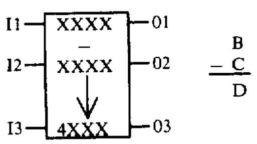

01 = 0 = B . LE . C
= 1 = B . G . T . C .
02 = 0 = B . NE . C
= 1 = B . EG . C
03 = 0 = B . GE . C
= 1 = B . LT . C

| | | |
|---|---|---|
| B-NODE = | 0XXX | NUMERIC CONTACT |
| | 3XXX | INPUT REGISTER |
| | 4XXX | HOLDING REGISTER |
| C-NODE = | 0XXX | NUMERIC CONSTANT |
| | 3XXX | INPUT REGISTER |
| | 4XXX | HOLDING REGISTER |
| D-NODE = | 4XXX | HOLDING REGISTER |

If B . LT . C, the D-Node register contains the absolute value of the result. For example:

| | | | | | |
|---|---|---|---|---|---|
| B | = 700 | B | = 450 | B | = 300 |
| C | = 450 | C | = 700 | C | = 300 |
| B − C | = 250 | B − C | = 250 | B − C | = 0 |
| D | = 250 | D | = 250 | D | = 0 |
| 01 | = 1 | 01 | = 0 | 01 | = 0 |
| 02 | = 0 | 02 | = 0 | 02 | = 1 |
| 03 | = 0 | 03 | = 1 | 03 | = 0 |

TABLE 10C

MULTIPLY
Symbol:

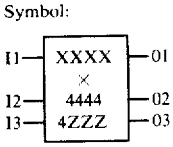

B - Multiplicand
C - Multiplier
D - Product

| | | | |
|---|---|---|---|
| Multiplicand: | XXXX = | 000-999 | NUMERIC CONSTANT |
| | = | 3XXX | INPUT REGISTER |
| | = | 4XXX | HOLDING REG. |

If MULTIPLICAND is a NUMERIC CONSTANT, it's value is used in the multiply. If it is a REGISTER, the contents of the REGISTER are used in the multiply.

TABLE 10C-continued

| | | | |
|---|---|---|---|
| Multiplier: | YYYY = | 000-999 | NUMERIC CONSTANT |
| | | 3YYY | INPUT REGISTER |
| | | 4YYY | HOLDING REGISTER |

If MULTIPLIER is a NUMERIC CONSTANT, it's value is used directly in the multiply. If it is a REGISTER, the contents of the REGISTER are used in the multiply.

Product 4ZZZ Specifies the first of 2 consecutive HOLDING REGISTERS which will contain the Product. Must be HOLDING REGISTER, can NOT BE THE LAST HOLDING REGISTER. The 484/P180 will disallow entry of the Last HOLDING REGISTER as the product register on the multiply node.

01 is always equal to I1. I2, I3, 02, and 03 are unused.

Function: When I1 is ON (= 1), multiply the Single Register MULTIPLICAND VALUE by the Single Register MULTIPLIER VALUE. This yields a Double Register (Double Precision) PRODUCT. The most significant three digits (with leading zeros) are stored in REGISTER 4ZZZ, the least significant three digits are stored in REGISTER 4ZZZ + 1.

When I1 is OFF (0) the product is uneffected.

TABLE 10D

DIVIDE
Symbol:

B-Dividend (Numerator)
C-Divisor (Denominator)
D-Quotient

Dividend: The DIVIDEND is a Double Precision (double register) Value.

| | | |
|---|---|---|
| XXXX | = 000-999 | NUMERIC CONSTANT |
| | = 3XXX | INPUT REGISTER |
| | = 4XXX | HOLDING REGISTER |

If the DIVIDEND is a NUMERIC CONSTANT, the value is used as the LOW ORDER DIVIDEND, with the High ORDER DIVIDEND assumed to be ZERO (0). (i.e. a NUMERIC CONSTANT DIVIDEND is in the range 000000-000999, inclusive.)

If the DIVIDEND is a REGISTER (3XXX or 4XXX), then the REGISTER specified is the first of two REGISTERS to contain the Double Precision DIVIDEND. The first REGISTER (3XXX or 4XXX) contains the HIGH ORDER DIVIDEND (the most significant three digits), the second REGISTER (3XXX + 1 or 4XXX + 1) contain the LOW ORDER DIVIDEND (the least significant three digits). The REGISTER specified CAN NOT be the last INPUT REGISTER or the last HOLDING REGISTER. The 484/P180 will disallow their use as the Dividend Register on Dividend Node.

Divisor: The DIVISOR is a Single Precision (single register) Value.

| | | |
|---|---|---|
| YYYY | = 000-999 | NUMERIC CONSTANT |
| | = 3YYY | INPUT REGISTER |
| | = 4YYY | HOLDING REGISTER |

Quotient: 4ZZZ = HOLDING REGISTER only. The QUOTIENT is a Single Precision.

I1 is ENABLE, I2 and I3 are unused.
01 is DIVISION OR.
02 is DIVIDEND Overflow.
03 is DIVISOR = 0.

FUNCTION: When I1 is ON (1), DIVIDE the Double Precision DIVIDEND by the Single Precision DIVISOR, giving a Single Precision QUOTIENT. No remainder or fractional part is kept.

RULES: The DIVISOR × 1000 must be greater than the DIVIDEND. AND, The DIVISOR must be NON-ZERO.

TABLE 10D-continued

Output indications when I1 is ON:
01 = 1 if DIVIDE performed OK.
02 = 1 if DIVISOR × 1000 . LE . DIVIDEND, QUOTIENT ← 0.
03 = 1 if DIVISOR . EQ . 0. QUOTIENT ← 0.
If I1 is OFF, the Quotient will be uneffected, and 01, 02, and 03 will be OFF (0).

ERROR CODES

Error codes are displayed in the error section of the screen. A code is displayed when the programming panel detects an error condition. The code is displayed until the RESET key is struck. The error section on the screen is normally blank (see FIGS. 6A and 6E).

On power-up the programming panel performs certain internal diagnostics to verify that it is capable of functioning. The system software is verified via a ROM check sum test. The RAM in the programming panel is tested via several diagnostics. A mini-instruction test is also performed. If any of these tests fail, the system keeps the screen blank and attempts to sound the system alarm.

SYSTEM ERROR CODE

Systems errors are defined as those error conditions which are internal to the programmable controller and not the result of any user action. They are displayed when they are detected. Table 11 defines the system error codes.

TABLE 11

| Code | Meaning |
|---|---|
| CN | Controller not resonding; two seconds have elapsed without a response to a command from the controller. |
| CE | Communications error; a hard communications failure (16 retries) exist. |
| TE | Trap error; an internal processor error has been detected. |
| IK | Illegal keystroke; an illegal keystroke has been sensed. |

FUNCTION KEY ERRORS

The function key errors have a lower priority than system level errors. They indicate a malfunction with an attempted function key operation. Table 12 defines the function key errors.

Thus the functionality of the programmable controller according to the present invention has been defined in the preceeding pages. It is readily apparent that this programmable controller not only performs those functions found earlier in the programmable controller art but also is able to perform several new functions such as the search function, the multiple output calculate function, the real time power display of a selected node on the CRT panel, and the ability to allow the user to form a multi-node control program with minimal constraints on the format of the network. The circuitry and software necessary for allowing the programmable controller and programming panel to perform these functions is next described.

TABLE 12

| Function Key | Code | Meaning |
|---|---|---|
| ENTER | MP | Memory protect; memory protect feature is enabled. |
| | IR | Illegal reference number; the reference number is illegal for the node type. |
| | NC | Not configured; the element referenced is not configured in the controller. |
| | BR | Bad replacement; the element type in the assembly area can not be used as a replacement for the element type at the cursor. |
| | DI | Date incomplete; an attempt to replace a null node with a contact has failed because the contact was not fully defined. |
| | BP | Bad position; an attempt to replace a null node with a contact has failed because the column is not defined fully above the cursor. |
| | FU | Full; the controller data base is full and no further inserts may be made until some logic is deleted. |
| | TC | Two coils; an attempt has been made to place a second coil or a line. |
| START NEXT | MP | Memory protect; see ENTER key. |
| | FU | Full; see ENTER key. |
| | DI | Data incomplete; see ENTER key. |
| DELETE | MP | Memory protect; see ENTER key. |
| | MC | Middle of column; deletion not allowed in middle of columns. |
| | MN | Middle of Node; deletion not allowed in middle of calculate or timer/counter nodes. |
| DELETE NTEWORK | MP | Memory protect; see ENTER key. |
| SEARCH | NF | Not found; target data was not found in data base. |
| SEARCH CONTINUE | NF | Not found; target data was not found in portion of data base searched. |
| GET NEXT | EL | End of Logic; user is at end of logic data base. |
| GET PREV | BL | Beginning of Logic; user is at beginning of logic data base. |
| CLR | | No codes. |
| SHIFT CLR | | No codes. |
| GET | IR | Illegal reference number; see ENTER key. |
| | NC | Not configured; see ENTER key. |
| DISB | MP | Memory protect; see ENTER key. |
| | IN | Illegal contact; contact type at cursor may not be disabled. |
| FORCE | IN | Illegal contact; see DISB key. |
| LOAD REG | TL | Too Large; value is greater than 999. |
| | NR | No register; no register has been specified in the register display area. |

MAINFRAME HARDWARE DESCRIPTION

The central processing unit and memory which in conjunction with the power supply form the mainframe enclosed within housing 22 shown in FIG. 1 is set forth in detail in FIGS. 13A-18D for the CPU and FIGS. 19A-23D for the memory. The power supply is not detailed since its implementation would be well known to one of ordinary skill in electronics. The only requirements on the power supply are that it provide the necessary direct current power to drive the CPU and memory. The schematic diagrams for the CPU and memory, and programming panel schematics (FIGS. 24A-28D), designate each component with a reference number and further identify the values of discrete components and identify the type of integrated circuits used (for example discrete capacitor C5 shown in FIG. 16C). Inputs and outputs are identified so that all interconnections between the various figures is readily ascertainable. Unless otherwise noted, all resistive values are in ohms, ¼ watt, 5%, all capacitors are in microfarads, 50 VDC, 20%, all IC's are of the 74 series except components E2, F2-F4, C1, C2, C11, C12, E5, A2, A3, and H1 for the CPU schematics and components D3-N3, D5-N5, D7-N7, D8-D8, H1 and N1 for the memory boards. These components are identified with other numbers well known to those skilled in the art so as to specify the type of integrated circuit component used.

Destination of interrupted circuit runs are indicated in parentheses in the schematic drawings by a sheet number and zone. The sheet number must be increased by the numbers set forth in Table 13 in order to find the proper drawing to which the signal is directed to or from. The zone number is a letter followed by a number within the parentheses which corresponds to the perimeter letters and numbers about the figures. The zone number is used to find the precise location for that signal, similar to finding a geographical location in an atlas.

Thus, referring to FIG. 13A at its upper lefthand corner, the signal LRSELL is from a location designated as "(3Cl)". Thus, the sheet number within the parentheses is "3". Referring to Table 13, this number is converted to 15, representing FIG. 15A-D. Referring to FIGS. 15A-D, it is seen that zone "C1" refers to FIG. 15B where the signal "LRSELL" is found having designated destination (1D4) corresponding to the upper lefthand corner of FIG. 13A.

References to components within these schematic diagrams is made by the part number associated with schematic diagram. Thus, referring to FIG. 13D, capacitor C1 refers to the 10 microfarad 35 volt capacitor shown in the lefthand portion hereof. Integrated circuit components are referred to by the letter-number combination shown within or near the block designating the IC component. Again referring to FIG. 13D, an integrated circuit is shown having outputs LA3L through LA0L designated as "A7".

TABLE 13

| FIGURE | NUMBER TO BE ADDED TO PARENTHESIS SHEET NUMBER |
|---|---|
| 13A-18D | 12 |
| 19A-23D | 18 |
| 24A-28D | 23 |

This IC component is of the "74" series with component number "LS169A". For designating integrated circuit components with multiple components within the IC component, reference is made to the output lead number of that particular component within the integrated circuit component. Thus in FIG. 13A, integrated circuit component H6 has eight drivers. If the uppermost driver is referred to, it would be identified as H6-9; the number "9" referring to lead 9 of the output associated with that driver.

In addition, logic gates are defined by the part number and output line. Referring to FIG. 15C, the lower lefthand nand gate would be referred to as H2-8.

MAINFRAME HARDWARE

FIGS. 13A-18D are schematic diagrams fully illustrating the central processing unit 31 (see FIG. 1B) utilized in the mainframe 39 of programmable controller 20. As best.seen in FIG. 16B, a signetics 8X300 microprocessor E5 serves as the processor. A 1K by 16-bit program ROM (components F1, F2, F3 and F4) contains the control software. Additional functionality can be provided by replacing the 1K ROM with a larger ROM. The contents of the program ROM is not directly accessible to the control software. It is available at test points for diagnostic and system testing.

INTERFACE VECTORS

The Signetics 8X300 has no random storage as an integral part of the processor. All interfacing to the processor E5 is done via the interface vectors (IV) on interface vector lines IV0-IV7. There are two sets of inerfaces vectors, one on the "left bank" and one on the "right bank". Each bank can support 256 vectors. The right bank is used for the scratchpad memory, logic RAM read and coil RAM low address. The scratchpad memory is shown in FIGS. 17B and 17C as integrated circuit components A2 and A3 and driver B2. The left bank of the interface vectors have the registers, status and control information, the column solver (discussed later), and the peripheral port interface. Since the architecture of processor E5 allows for simultaneous input and output port utilization, interbank data movement is possible on the same instruction. That is, data can be moved from the left bank to the right bank, or vise versa during the instruction.

SCRATCHPAD RAM

As noted above, the scratchpad RAM is shown in FIGS. 17B and 17C as integrated circuit components A2 and A3 and driver B2. The scratchpad RAM provides 256 bytes of temporary data storage. It is not retentive through a power failure. It is located on the right interface vector bank register. The following timing restrictions are applicable to accessing the scratchpad:

| | |
|---|---|
| Load address register to read data | 1 Instruction Wait |
| Write data to load address register | 1 Instruction Wait |
| Write data to read data | 2 Instruction Wait |
| Write data to write data | 1 Instruction Wait |

LOGIC RAM

The logic RAM is fully shown in FIGS. 19A-19B and 20A-20D. In addition to the actual RAM memory shown by integrated circuit components D3, D5, E3, E5, F3, F5, H3, H5, K3, K5, L3, L5, M3, M5, N3, N5 in FIGS. 19A-D and components D7, D8, E7, E8, F7, F8, H7, H8, K7, K8, L7, L8, M7, M8, N7, N8 in FIGS. 20A-D, the other addressing and driving circuitry shown in FIGS. 19A-D and 20A-D all comprise what is broadly called the logic RAM.

The logic RAM is used to store the user program. It resides on the left bank for writing and right bank for reading. It has two address registers which are concatenated to form the physical address. A signal to increment the address registers is available. The contents of the logic RAM are retentive through power failure.

The following timing restrictions apply to the logic RAM:

| | |
|---|---|
| Load address register to read data | 3 Instruction Wait |
| Load address register to write data | 1 Instruction Wait |
| Write data to read data | 2 Instruction Wait |
| Write data to Write data | 1 Instruction Wait |

COIL/REGISTER RAM

The coil/register RAM is shown in FIGS. 21A-21D. Like the logic RAM, the coil/register RAM in addition to the memory integrated circuit components K1, H1, L1, M1 and N1 also encompasses addressing and buffer circuitry as shown in FIGS. 21A through 21D. The coil/register RAM is used to store input, output data, and register values. Its data is retentive through a power failure, and it has two address registers which are concatenated to form the physical address. There is a memory address increment function available. The basic size of the coil/register RAM is 256 by 4 bits. The coil/register RAM is on the left bank and it has the same timing restrictions as the logic RAM.

REAL-TIME CLOCK

Figure 15B:
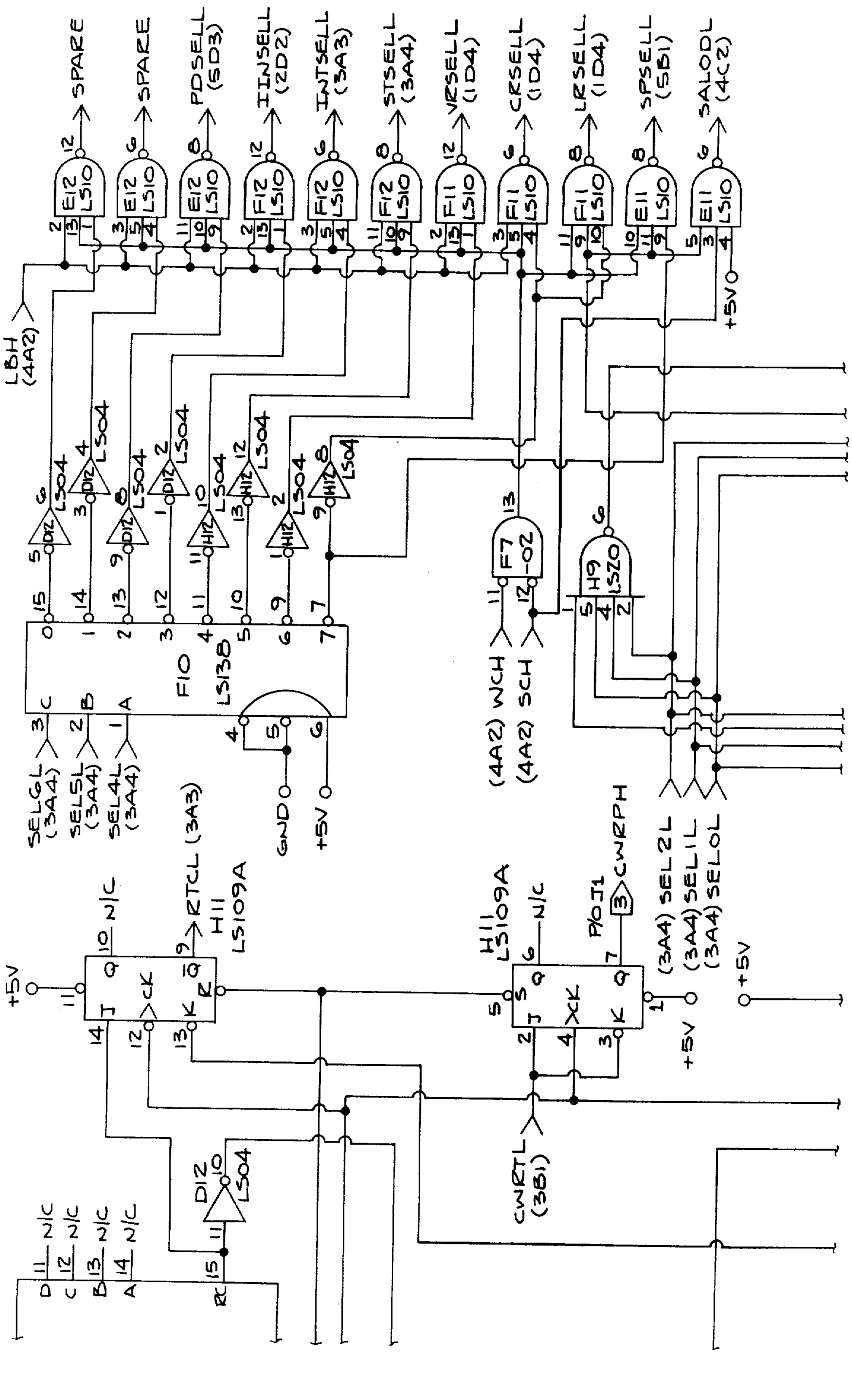
Figure 15C:
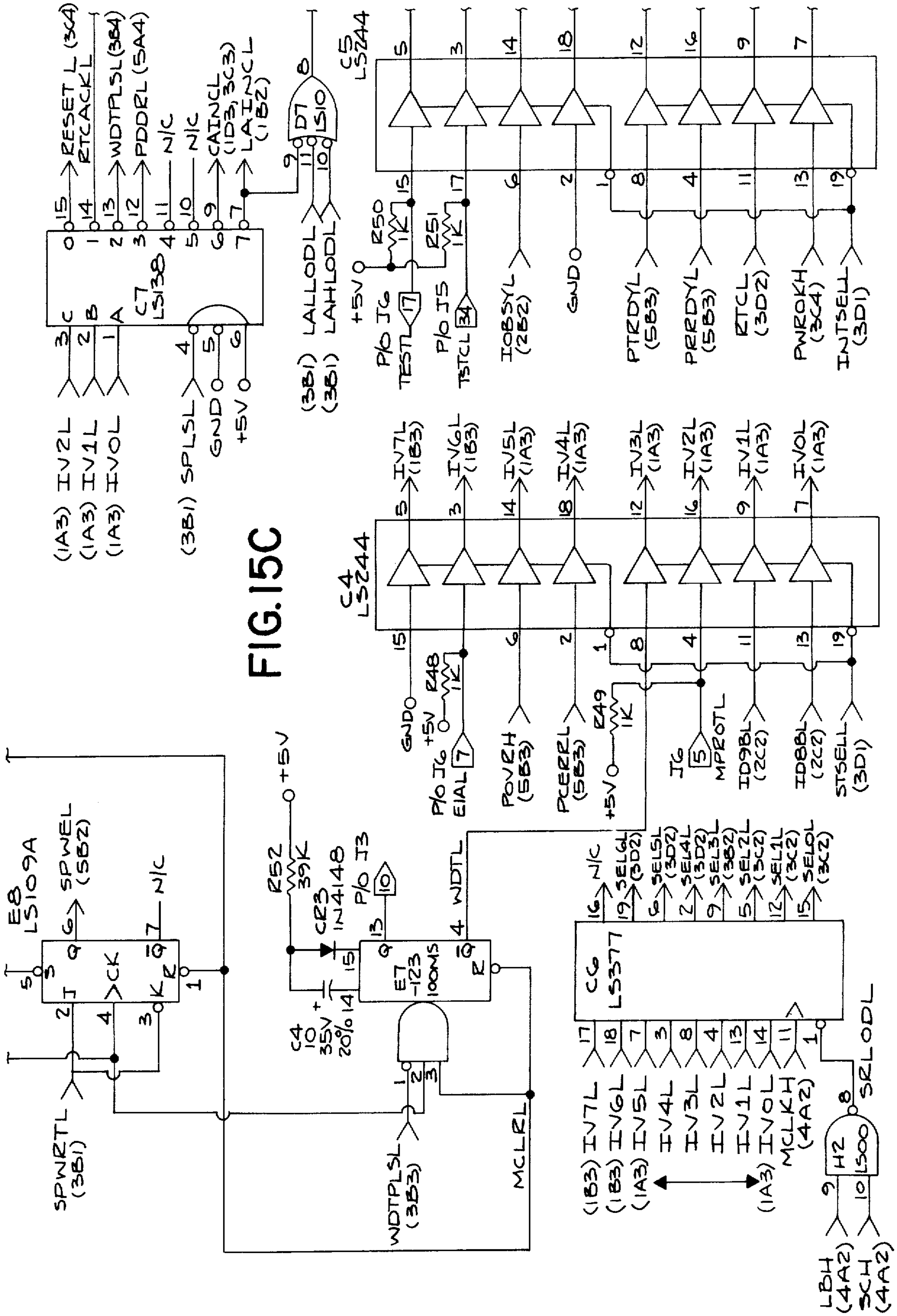

The real-time clock is shown in FIGS. 15A and 15B and comprises integrated circuit components H8, H7, H6, H5 and H11. This real-time clock generates a pulse at a fixed rate of once every ten milliseconds. The pulse sets a bit in the status sense register (discussed later). The software within the processor acknowledges the real-time clock via the control register (discussed later). The clock continues to generate pulses regardless of whether it is acknowledged.

WATCHDOG TIMER

The watchdog timer is shown in FIG. 15C as integrated circuit component E7 and generates a watchdog timer signal (WDTH) which is enabled by the software as part of the end-of-sweep (or scan) processing. If the software fails to enable the watchdog timer signal at least once every 50 milliseconds, the mainframe run light 24 (see FIG. 1) goes off and the I/O outputs are shut down. The state of the watchdog timer is also available through the status sense register.

PERIPHERAL PORT INTERFACE

The peripheral port interface shown in FIGS. 17A and 17C provides a serial input to the mainframe. This interface is used by the programming panel 29 and a peripheral port adapter 35 (see FIG. 1). Status information is available on the interrupt sense register and the status sense register. The peripheral port adapter provides input data from peripherals and transmits data back to those peripherals.

INPUT/OUTPUT

Figure 14B:
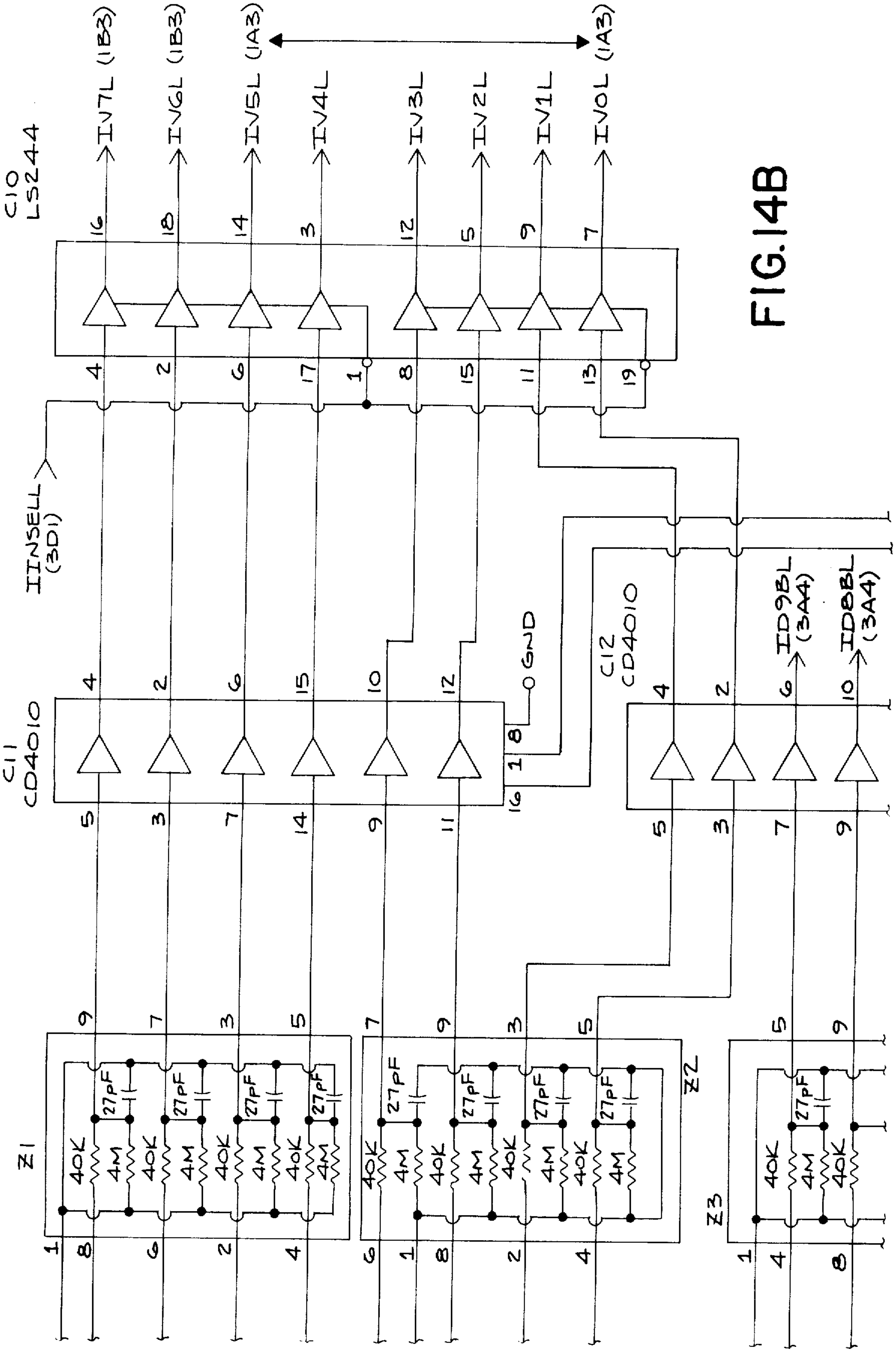
Figure 14C:
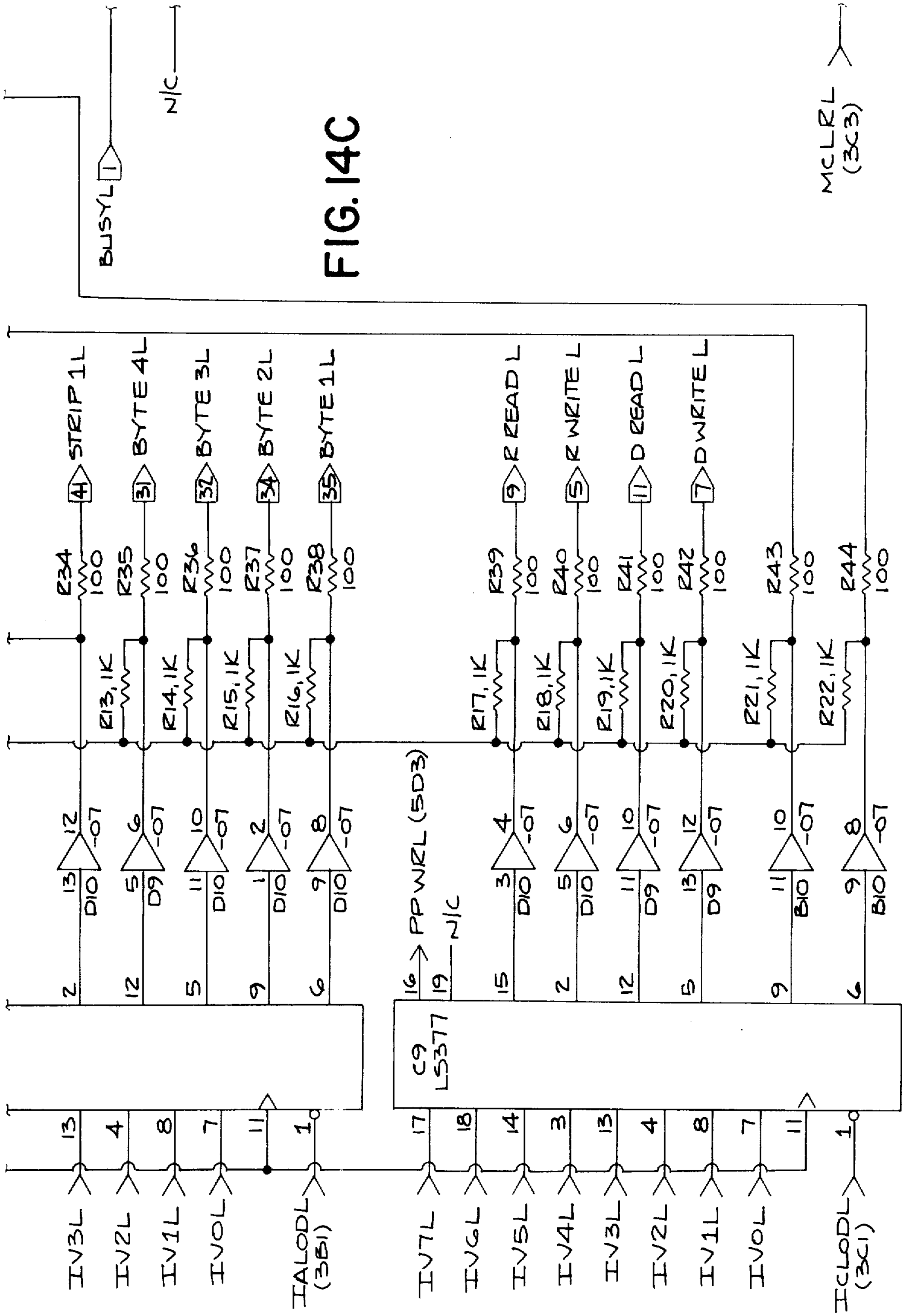
Figure 14D:
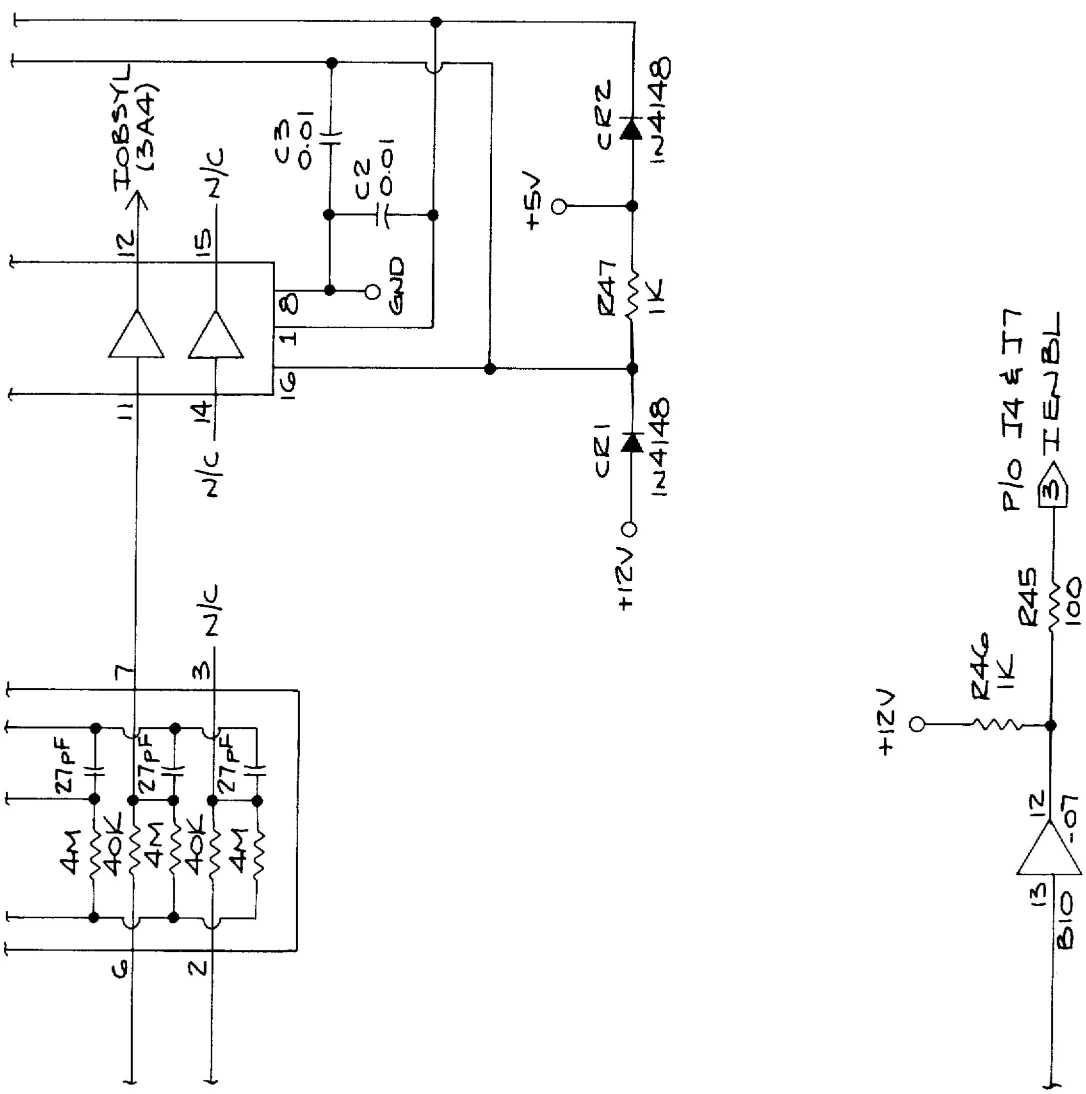

FIGS. 14A-14B show the electrical circuitry for performing input/output transferrals of data from the mainframe to the I/O bus 32 forming part of the I/O system 28 (see FIG. 1). There are two types of I/O in the programmable controller. Discrete I/O is used to interface to input points and output points on the I/O bus via the I/O modules. Word I/O can be obtained by use of the discrete I/O modules and converted from typical binary coded decimal (BCD) format to the binary format utilized by the controller for reading data from external registers. Binary output data is also converted by software to BCD data for writing data into external registers. The higher level code describing the conversions is shown in Table 32. Register I/O in 10 bit words can also be accommodated by the controller via Register Multiplexer Modules.

SYSTEM CONTROL

The system includes the control register and interrupt sense register and is shown in FIGS. 15 A, B, C and D as integrated circuit components C6, E9, D8, H11, F10, F9, F8, H10, H9, D4, E12, F12, F11, and E11. The system control including the control register is used to trigger control pulses which are signals activated when the control register is loaded. The contents of the control register is decoded as follows:

| Code | Pulse |
|---|---|
| 7 | Reset Processor |
| 6 | Acknowledge Real-Time Clock |
| 5 | Watchdog Timer |
| 4 | Clear peripheral port interface receiver ready |
| 3 | Not used |
| 2 | Not used |
| 1 | Increment coil address register and 0 increment logic register |

Interrupt Sense Register

Figure 15D:
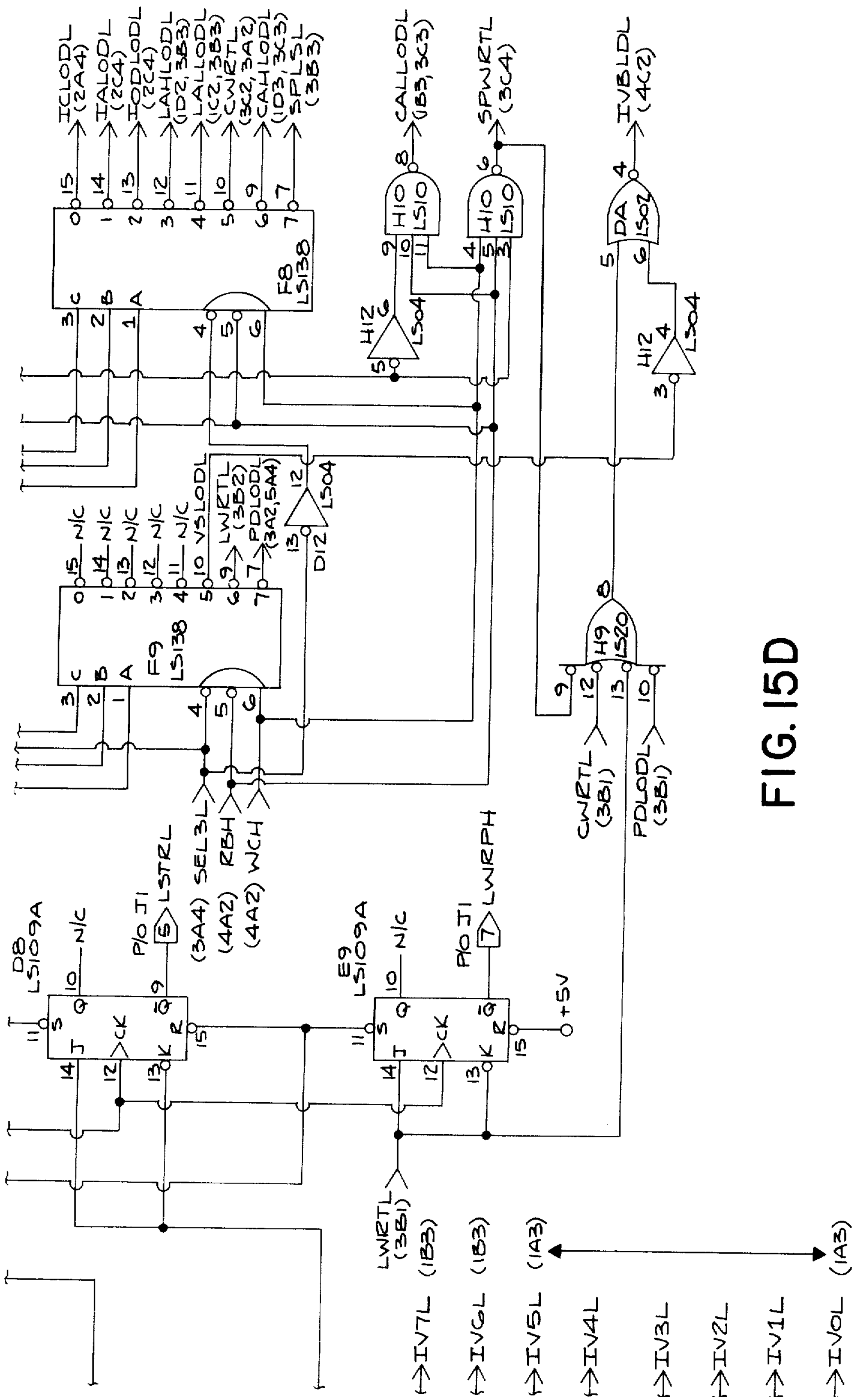

The interrupt sense register is shown in FIGS. 15C and 15D as integrated circuit components C4 and C5. The interrupt sense register is used to provide a sensory mechanism for the four real-time system activities; power-failure detection, real-time clock tick, peripheral port interface receiver ready, and peripheral port interface transmitter ready. There is no true interrupt structure in that software must check for any of these conditions at an interval which guarantees that data will not be lost (See Appendix A).

The interrupt sense register provides two additional signals which indicate when the I/O test connector and the CPU tester (MOT) are attached. The interrupt sense register is decoded as follows:

| Bit | Condition |
|---|---|
| 7 | I/O tester connected |
| 6 | CPU tester connected |
| 5 | I/O busy |
| 4 | Not used |
| 3 | Peripheral port interface transmitter ready |
| 2 | Peripheral port interface receiver data ready |
| 1 | Real-time clock (100 hertz) |
| 0 | Power failure |

Status Sense Register

The status sense register utilizes the same integrated circuit components as the interrupt sense register and is part of the interrupt sense system. The status sense register is used to provide hardware status information to the mainframe software. The contents of the status sense register are decoded as follows:

| Bit | Status |
|---|---|
| 7 | Not used |

-continued

| Bit | Status |
|---|---|
| 6 | Peripheral port interface status (EIA = 1) |
| 5 | No overrun error in peripheral port interface |
| 4 | Parity/framing error in peripheral port interface |
| 3 | Watchdog timer RUN (WDT RUN = 1) |
| 2 | Memory protect |
| 1 | Register I/O Input - Bit 9 |
| 0 | Register I/O Input - Bit 8 |

Software Overview

The mainframe software overview is presented in its entirety in Appendix A. The software block diagram is shown in FIG. 9. It indicates that the executive program (EXEC) stored in the microprocessor ROM communicates with the logic solver, peripheral port handler, I/O handler and on-line diagnostics as well as power up and power down sequences. Likewise, the interrupt handler communicates to and from the logic solver peripheral port handler, I/O handler and on-line diagnostics. The power up sequence also communicates with the CPU tester (MOT monitor).

FIGS. 10A and 10B show the data flow paths for the software. FIG. 10A is directed to the normal operation of the programmable controller while FIG. 10B illustrates the software data flow paths during power up and power down sequences.

FIG. 11 illustrates the general timing during power up, executive, interrupt handling, I/O handling, logic solving, command handling, and on-line diagnostics with information in letters within pulses explained at the bottom portion of FIG. 11.

FIG. 12 is a state diagram of the software, showing the interrelationship of the powerup and power down sequences, the normal scan in which the users' networks are solved, the error stop and halt routines as well as the CPU tester (MOT).

The actual executive program for the processor E5 (FIG. 16C) as stored in the control ROM is set forth in Appendix A to this patent application. This software in conjunction with the mainframe hardware and programming panel hardware (FIGS. 24A–28D) and programming panel software (Appendix B) performs the functions of the programmable controller as set forth in Table 14.

TABLE 14

| | |
|---|---|
| 1. | Power-up diagnostics |
| 2. | Power-down functions |
| 3. | Executive |
| 4. | I/O interrupt handling including a real-time clock, peripheral port interface and power-down, |
| 5. | Logic solutions using a multi-node 7 × 11 format including |
| | (A) relays, normally open, normally closed, and transitional contacts, |
| | (B) coils, latches, internal coils, disabled coils, and disabled latches, |
| | (C) counters, |
| | (D) timers, 1.0, 0.1, 0.01 seconds, |
| | (E) calculate with multiple outputs (add, subtract, multiply and divide) and |
| | (F) sequencers |
| 6. | I/O handling, 128 inputs and outputs, register I/O, and extension to 256 discrete inputs and outputs. |
| 7. | Peripheral port interface for the programming panel and the peripheral port adapter for other types of peripherals including a computer interface. |

TABLE 14-continued

| | |
|---|---|
| 8. | On-line diagnostics. |

Scan Time

The maximum scan time including logic solution, I/O handling and peripheral port service and on-line diagnostics is no more than 20 milliseconds.

I/O Service Time

All field I/O is serviced once per scan.

Peripheral Port Interface Response Time

All characters are read before data overrun occurs. Data overrun is a system error condition. Once a command has been received, a response is initiated in no more than 1 second after receipt of a complete request.

INPUTS

This section describes the inputs to the mainframe software.

User Logic

User logic is the input to the logic solution module. It consists of the user program formed as entered via the programming panel or other peripheral device. All entries in the user logic data consist of two-byte nodes, each byte having 8 bits. Node format is described later. The user logic is solved sequentially by the logic solver with processing beginning with the first node and terminating with the end-of-logic node.

Discrete Inputs

A discrete input is the state of an input point which is located on an I/O input module interconnected to the I/O bus (see FIG. 1). It is either true or false which is indicated by a "1" or a "0" respectively. Discrete inputs are specified in a user program by reference designation 1 followed by three X's. A discrete input may be disabled which means that its state is not updated during each I/O scan.

Register Input

Register inputs of a limited number can be transferred to the mainframe by the discrete I/O modules. Mainframe software performs the conversion from BCD to binary and binary to BCD for reading and writing register information to and from external devices. Register I/O Modules transfer 10 bit binary words to and from the mainframe directly, allowing a greater number of I/O registers.

Communication Peripherals

The peripheral port interface allows a set of devices to be interfaced to the mainframe. A programming panel 29 and the peripheral port adaptor 35 interface directly to the mainframe. A tape loader and other types of programming panels can be interfaced to the peripheral port adaptor. An EIA type computer interface may also be interconnected to the peripheral port adaptor. These devices communicate using the mainframe communications protocol.

Real-Time Clock

A real-time clock operating at 100 hertz frequency provides an interrupt signal via the interrupt sense register. The clock is used to provide a time base for timers and internal clocking functions.

Power-Failure Sense

The power failure sensing is available in the interrupt status register. Five milliseconds of power are required to execute the power-down fail routine. Following completion of power failure processing, the reset processor command is issued via the control register.

Watch-Dog Timer Sense

The watch-dog timer sense provides a mechanism for checking the satus of the watch-dog timer. If the software fails to enable the watch-dog timer at least once every 50 milliseconds, it expires and causes the outputs to shut down and the run light to turn off.

OUTPUTS

This section covers the outputs generated by the controller's software in response to inputs and internal processing.

Discrete Outputs

A discrete output is the state of an output point on an I/O output module interconnected to the I/O bus 34 (see FIG. 1). This state is determined in one of two ways: first, the state of the coil as determined by the network driving the coil; and second, a disabled coil is not changed by the logic. A coil that is latched maintains its state through power failure. Discrete outputs are updated once per scan.

Register Outputs

A set of register values may be transferred to the discrete I/O modules via the software which converts the binary data used in the mainframe processing to BCD data for use with data processing external devices. Register I/O modules receive 10 bit binary register values directly from the mainframe allowing a greater number of output registers.

Communication Peripherals

Via the peripheral port interface, the mainframe sends data to peripherals attached to it. These communications take place using the mainframe communications protocol.

Real-Time Clock Acknowledge

This is a signal which clears the real-time clock sense bit in the interrupt sense register enabling the next clock pulse to be detected.

Watch-Dog Timer

The watch-dog timer pulse (WDT) is a control signal issued by the processor once per scan to indicate that the system is running. Before issuing a watch-dog timer pulse, the controller checks the watch-dog timer sense input to verify that the system is still functioning properly. The watch-dog timer controls all discrete outputs in that it must be on for outputs to be electronically enabled.

DATA BASE

Address Assignments

The address assignments are set forth in Appendix A.

External Access Conventions

This section defines the mechanisms and conventions used to access the various memories, data registers, address registers, and control registers in the mainframe.

Interface Vector Bus

Figure 16C:
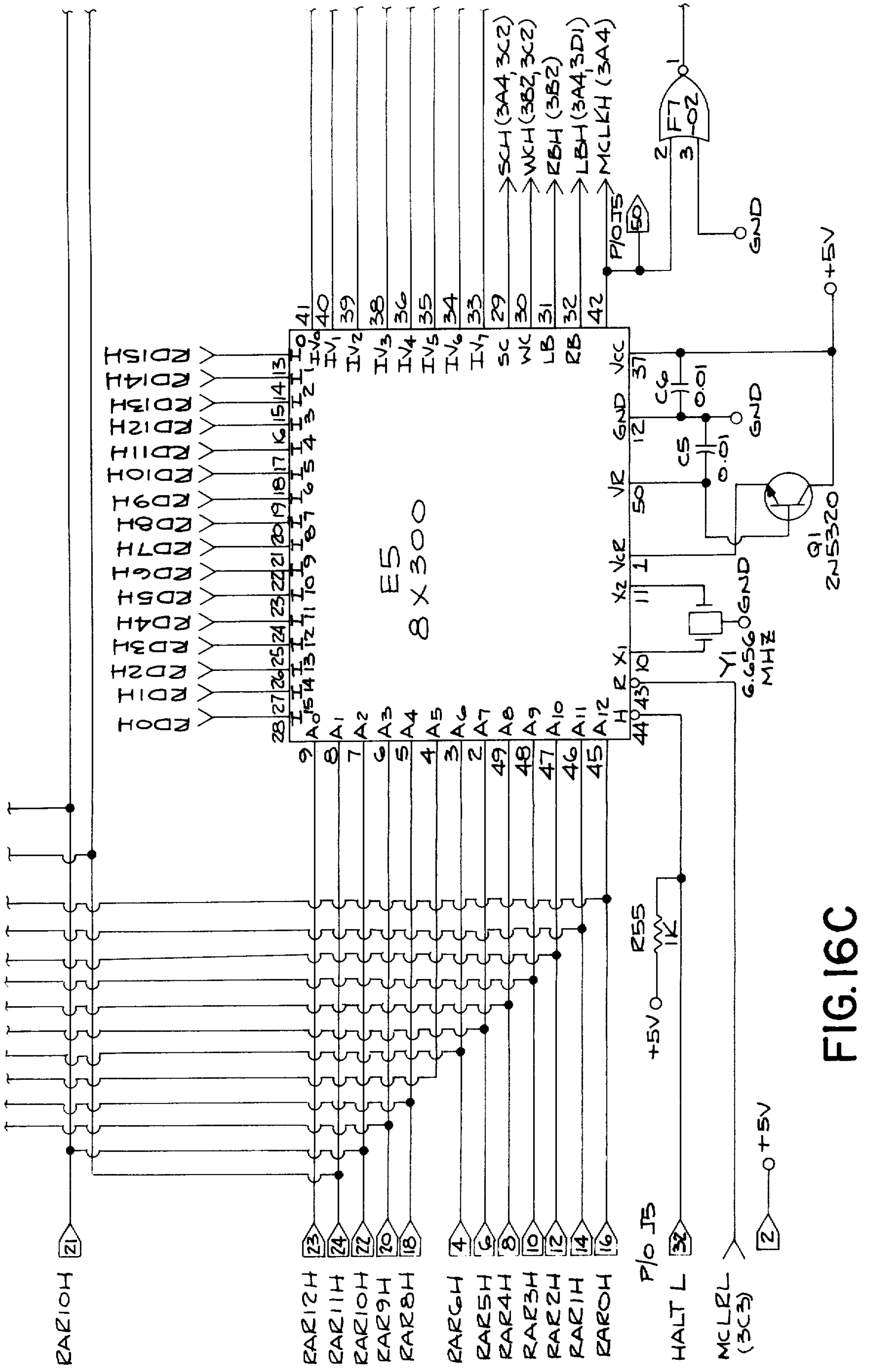
Figure 16D:
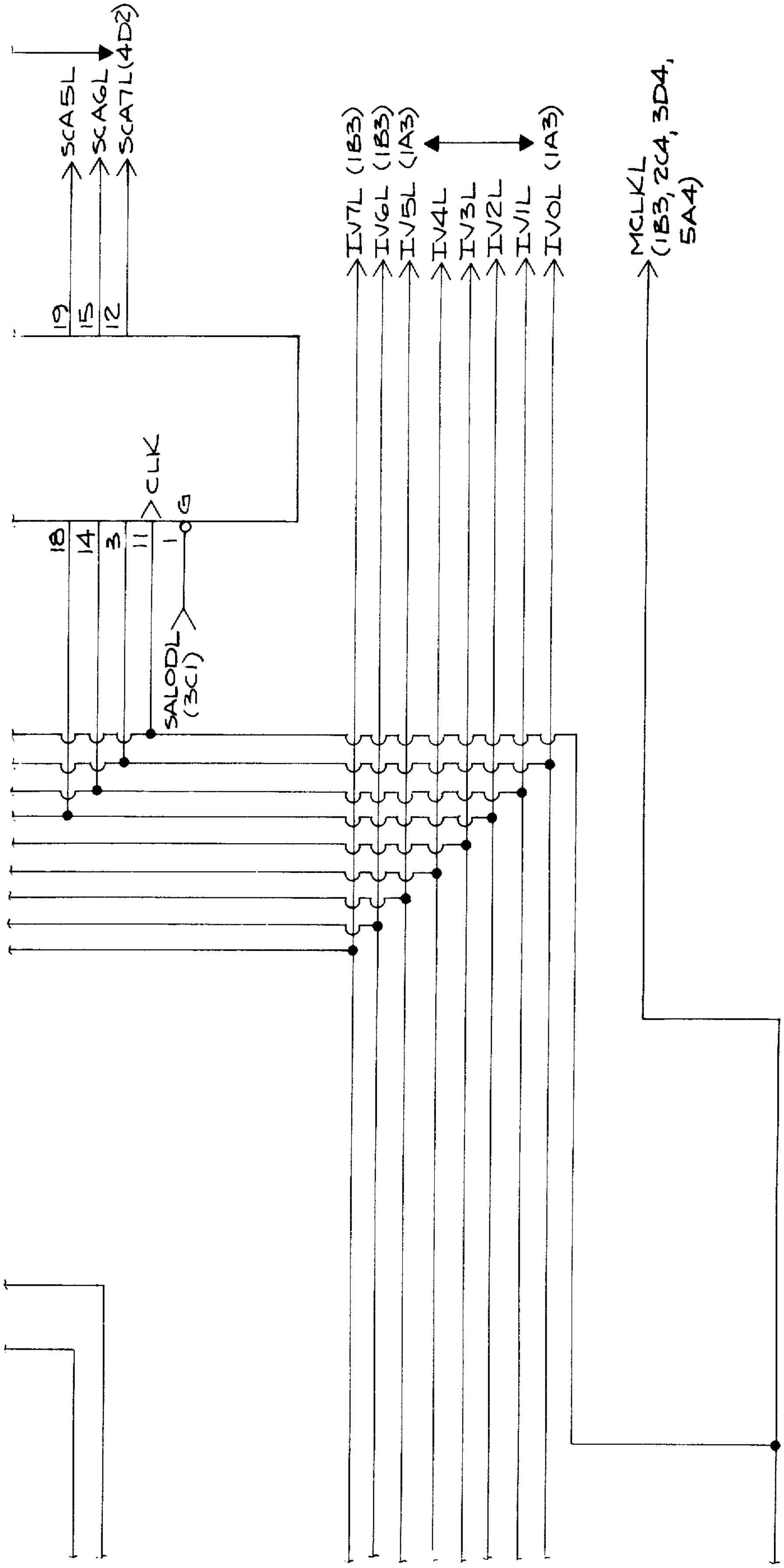

All activity takes place on the interface vector (IV) bus (see processor E5, FIG. 16C). Addressing on the IV bus is via the IV left bank and registers. IVL (interface vector left) and IVR (interface vector right) select one of the 256 address locations on the left bank and the right bank respectively.

The mainframe's architecture permits 4 points to be selected simultaneously: input left, output left, input right, and output right. This is controlled via the IVL selection mechanism. Once the IVL or IVR address is loaded, the data is avaiable on the left bank (LB) and the right bank (RB) or in sub fields as defined by the instruction set.

Scratchpad Access

Scratchpad access is by the right IV bank. The IV register must be loaded with the proper select information to allow either scratchpad read or scratchpad write as needed. Once the IV register has been loaded with the address, a "1" instruction wait time is needed to allow the address and data to settle on the bus for the operation to be read. A write takes place on the next operation with no wait. Example:

| | | | | |
|---|---|---|---|---|
| Read | XMT | ADDR, IVR | | Load Address |
| | XMT | 00010000B, | IVL | Select Read (wait cycle) |
| | MOV | RB, R1 | | Read Data |
| Write | XMT | 00000001B, | IVL | Select Write |
| | XMT | ADDR, IVR | | Load Address |
| | MOV | R1, LB | | Write Data |

Logic RAM and Coil/Register RAM Access

The access mechanisms for the logic RAM and the coil/register RAM are similar. First, the address to be accessed is loaded into the memory address register. The memory address register is loaded in two pieces, the lower eight bits and the upper eight bits. This is done using the IVL select to locate the proper item on the bus. When the address has been loaded, a three instruction wait is required for read operation and the one instruction wait for the write operation. An example is shown in Table 15.

Peripheral Port Interface

The peripheral port interface is a serial data channel offering full duplex communications. During the interrupt sense check, the state of the two peripheral port interface status lines are checked. If the receiver ready signal (INTRRCVR) is true, the peripheral port interface has a character ready for processing and the receiver handler is used to read the data from the interface so as to do some preliminary processing of the data prior to buffering the character. If the transmitter ready signal (INTRXMIT) it true, the transmitter is capable of sending a character. If there is data in the transmitter buffer, the next character is loaded to the interface.

TABLE 15

| | | | | |
|---|---|---|---|---|
| Read | XMT | 00000011B, | IVL | Select Lo-order Addr |
| | XMT | ADDRLO, LB | | Load Addr. Low |
| | XMT | 00000100B | IVL | Select High-order Addr |
| | XMT | ADDRHI, LB | | Load ADDR High |
| | XMT | 00000000B, | IVL | Select Logic Input |
| | MOP | | | Wait 2 |
| | NOP | | | Wait 3 |
| | MOV | RE, RI | | READ DATA |
| Write | XMT | 00000011B, | IVL | Select Lo-Order Addr |
| | XMT | ADDRLO, LB | | Load Addr. Low |
| | XMT | 00000100B, | IVL | Select High-order Addr |
| | XMT | ADDRHI, LB | | Load Addr. High |
| | XMT | 00001001B, | IVL | Select Output Data |
| | MOV | DATA, LB | | Write Data |

Discrete I/O

Discrete I/O is serviced once per scan for each I/O address on the I/O bus. Once the I/O address register is loaded, the input enable is turned on. A wait of 35 instructions is required before data is available. During this time period, the output data is assembled from the coil/register RAM and packed into a byte for the output points corresponding to the input points. The input data is read and output data is loaded. The output enable is turned on and the output strobe follows 17 instructions later. During this time, the input data is decoded and stored in the coil/register RAM. The output strobe is cleared and the output enable is turned off. This cycle is repeated for each of the 8 I/O points in the system.

Register I/O

Register I/O follows the same sequence as discrete I/O except the register enables are used. Similar timing inserts are used.

Memory Organization

Scratchpad

The scratchpad organization is set forth in Appendix A.

Logic RAM Organization

The first ten bytes of the logic RAM are reserved for system status information as set forth in Table 16.

Coil/Register RAM Organization

The I/O information is allocated one 4 bit nibble per I/O point as set forth in Table 17. This table also sets forth the history extension and the register information arrangement.

Node Types

Node type arrangement is set forth in Table 18 and the node format set forth in Table 19.

Communications Protocol

I/O Assignments

The I/O assignments are set forth below:

| Bit | Pinout |
|---|---|
| 0 | 1 |
| 1 | 2 |
| 3 | 2 |
| 3 | 4 |
| 4 | 5 |
| 5 | 6 |
| 6 | 7 |
| 7 | 8 |

Strip and byte select on the I/O bus is a 1-of-4 code as set forth in Table 20.

This format gives a maximum of 16 data byte addresses with 8 points per data byte; i.e., 128 I/O points.

TABLE 16

MAIN MICROCONTROLLER CROSS ASSEMBLER VER 1.1

```
       *
       ***LOGIC RAM BIT ASSIGNMENTS
       *
       *
       ***SYSCONF1
       *
       ***MASK DEFINITIONS
       *
000200 SYS4096M   EQU  10000000B  4096 BYTE LOGIC RAM
000100 SYS2048M   EQU  01000000B  2048 BYTE LOGIC RAM
000040 SYS1024M   EQU  00100000B  1024 BYTE LOGIC RAM
000020 SYS0512M   EQU  00010000B  0512 BYTE LOGIC RAM
000010 SYS0256M   EQU  00001000B  0256 BYTE LOGIC RAM
       *          EQU  00000100B  NOT USED
       *          EQU  00000010B  NOT USED
       *          EQU  00000001B  NOT USED
       *
       ***BIT DEFINITIONS
       *
000 7 1 SYS4096B  RIV  0,7,1      4096 BYTE LOGIC RAM
000 6 1 SYS2048B  RIV  0,6,1      2048 BYTE LOGIC RAM
000 5 1 SYS1024B  RIV  0,5,1      1024 BYTE LOGIC RAM
000 4 1 SYS0512B  RIV  0,4,1      0512 BYTE LOGIC RAM
000 3 1 SYS0256B  RIV  0,3,1      0256 BYTE LOGIC RAM
       *          RIV  0,2,1      NOT USED
       *          RIV  0,1,1      NOT USED
       *          RIV  0,0,1      NOT USED
       *
       ***SYSCONF2
       *
       ***MASK DEFINITIONS
```

TABLE 16-continued

```
MAIN  MICROCONTROLLER CROSS ASSEMBLER VER 1.1
        *
000200  SYSC256M   EQU  10000000B  256 I/O POINTS
000100  SYSC192M   EQU  01000000B  192 I/O POINTS
000040  SYSC128M   EQU  00100000B  128 I/O POINTS
000020  SYSC064M   EQU  00010000B  064 I/O POINTS
        *          EQU  00001000B  NOT USED
000004  SYSTRANM   EQU  00000100B  TRANSITIONAL OPTION
000002  SYSENHM    EQU  00000010B  ENHANCED EXECUTIVE
        *          EQU  00000001B  NOT USED
        *
        ***BIT DEFINITIONS
        *
000 7 1 SYSC256B   RIV  0,7,1      256 I/O POINTS
000 6 1 SYSC192B   RIV  0,6,1      192 I/O POINTS
000 5 1 SYSC128B   RIV  0,5,1      128 I/O POINTS
000 4 1 SYSC064B   RIV  0,4,1      064 I/O POINTS
        *          RIV  0,3,1      NOT USED
000 2 1 SYSTRANB   RIV  0,2,1      TRANSITIONAL OPTION
000 1 1 SYSENHB    RIV  0,1,1      ENHANCED EXECUTIVE
        *          RIV  0,0,1      NOT USED
        *
        ***STATE VECTOR
        *
        ***MASK DEFINITIONS
        *
000200  SYSSRUNM   EQU  10000000B  RUN STATE
000100  SYSSPUPM   EQU  01000000B  POWER-UP STATE
000040  SYSSPDNM   EQU  00100000B  POWER-DOWN STATE
000020  SYSSTOPM   EQU  00010000B  STOP STATE
000017  SYSCODEM   EQU  00001111B  ERROR CODE MASK
        *
        ***BIT DEFINITIONS
        *
000 7 1 SYSSRUNB   RIV  0,7,1      RUN STATE
000 6 1 SYSSPUPB   RIV  0,6,1      POWER-UP STATE
000 5 1 SYSSPDNB   RIV  0,5,1      POWER-DOWN STATE
000 4 1 SYSSTOPB   RIV  0,4,1      STOP STATE
000 0 4 SYSCODEB   RIV  0,0,4      ERROR STATE CODE
        *          RIV  0,2,0
        *          RIV  0,1,0
        *          RIV  0,0,0
        *
        ***ERROR STATE CODES
        *
000001  SYSEOVR    EQU  1          COMMUNICATIONS OVERRUN
000002  SYSELCHK   EQU  2          MEMORY CHECKSUM FAILED
000003  SYSENODE   EQU  3          INVALID NODE TYPE FOUND
000004  SYSEIO     EQU  4          I/O PORT ERROR
000005  SYSESPD    EQU  5          SCRATCHPAD DIAGNOSTIC FAILED
000006  SYSECCHK   EQU  6          COIL RAM CHECKSUM FAILED
000007  SYSEDIAG   EQU  7          CPU DIAGNOSTIC FAILED
000010  SYSEMEM    EQU  8          ILLEGAL MEMORY CONFIGURATION
000011  SYSERTC    EQU  9          REAL-TIME CLOCK NOT FUNCTIONING
000012  SYSEWDT    EQU  10         WATCH-DOG TIMER EXPIRED
000013  SYSECOL    EQU  11         ILLEGAL COLUMN DETECTED
000014  SYSEEOL    EQU  12         NO END-OF-LOGIC NODE
        *          EQU  13         NOT USED
        *          EQU  14         NOT USED
        *          EQU  15         NOT USED
```

TABLE 17

I/O information is allocated one nibble per I/O point as follows:

| Bit | Name | Use |
|---|---|---|
| 3 | CRINDISB | Input disable (1=DISABLED, 0=ENABLED) |
| 2 | CRINPUT | Input state (1=ON, 0=OFF) |
| 1 | CROUTPUT | Output State (1=ON, 0=OFF) |
| 0 | CRINTRNL | Internal Coil State (1=ON, 0=OFF) |

History extension is as follows:

| Bit | Name | Use |
|---|---|---|
| 7 | — | Not Used |
| 6 | CRINHIS | Input History (1=ON, 0=OFF) |
| 5 | CROUTHIS | Output History (1=ON, 0=OFF) |
| 4 | CRINTHIS | Internal History (1=ON, 0=OFF) |

Register information is arranged in three 4-bit nibble

TABLE 17-continued as follows:

| Nibble | Name | Use |
|---|---|---|
| n | CRREGHI | Register value - Bits 11-8 |
| r+256 | CRREGMID | Register value - Bits 7-4 |
| r+512 | CRREGLOW | Register value - Bits 3-0 |

TABLE 18

| Index | Name | Use |
|---|---|---|
| 0 | NODESON | Start of network |
| 1 | NODEEOL | End-of-Logic |
| 2 | NODEEOC | End-of-column |
| 3 | NODENULL | Null node |
| 4 | NODESKIP | Skip node |
| 5 | NODEOREL | Normally-open relay |
| 6 | NODECREL | Normally-closed relay |

TABLE 18-continued

| Index | Name | Use |
|---|---|---|
| 7 | NODEPOST | Positive-going transitional |
| 8 | NODENEGT | Negative-going transitional |
| 9 | NODECOIL | Coil |
| 10 | NODELATC | Latch |
| 11 | NODEDCOL | Disabled coil |
| 12 | NODEDLAT | Disabled latch |
| 13 | NODEHOZO | Horizontal Open |
| 14 | NODEHOZS | Horizontal Short |
| 15 | NODECPRE | Preset constant |
| 16 | NODERPRE | Preset register value |
| 17 | NODECTR | Counter |
| 18 | NODET100 | Timer - 1.00 secs |
| 19 | NODET010 | Timer - 0.10 secs |
| 20 | NODET001 | Timer - 0.01 secs |
| 21 | NODEBCON | Calculate - B node constant |
| 22 | NODEBREG | Calculate - B node register |
| 23 | NODECCON | Calculate - C node constant |
| 24 | NODECREG | Calculate - C node register |
| 25 | NODECALC | Calculate node |
| 26 | | |
| 27 | | |
| 28 | | |
| 29 | | |
| 30 | | |
| 31 | | |

TABLE 19

Node Format

| 7 | 6 | 5 | 4 | 3 | 2 | 1 | 0 | |
|---|---|---|---|---|---|---|---|---|
| X | Y | Y | Y | Y | Y | Z | Z | BYTE 0 |
| Z | Z | Z | Z | Z | Z | Z | Z | BYTE 1 |

X- 1 ⟹ End-of-Column

0 ⟹ Not End-of-Column

YYYYY- Node Type

ZZZZZZZZZZ- Operand

TABLE 20

| Bit | Select | Name |
|---|---|---|
| 7 | STRIP D | IOSTRIPD |
| 6 | STRIP C | IOSTRIPC |
| 5 | STRIP B | IOSTRIPB |
| 4 | STRIP A | IOSTRIPA |
| 3 | BYTE 3 | IOBYTE3 |
| 2 | BYTE 2 | IOBYTE2 |
| 1 | BYTE 1 | IOBYTE1 |
| 0 | BYTE 0 | IOBYTE0 |

Register I/O and extended discrete I/O can take place through the register address space as set forth in Table 21.

DATA FORMAT CONVENTIONS

The low order bit of all address and data buses is numbered "0" with the number increasing by 1 for each higher order bit. Thus, the high order bit of the several buses are:

IV Bus=7

Instruction Data=15

Instruction Address=12

This is not consistent with the Signetics 8X300 processor manufacturing conventions and is consequently compensated for in the CPU hardware (See FIGS. 13A-18D).

BUS ASSIGNMENTS

When the destination address field of an instruction defines the IVR Register (17), the eight bit operand is loaded into the scratchpad addressing register. All future references to the scratchpad memory are made to the word (1) of 256) selected by this operand.

IV Bus Addressing

Instructions specifying the IVL register (07) as the destination address send an eight bit operand to the IV select register. This operand specifies which registers and data ports are to be accessed on the IV bus by the CPU on all future references to registers 2N and 3N.

TABLE 21

| Bit | Name | Use |
|---|---|---|
| 7-0 | IOWORDSL | Word Select |

The CPU instructions read from either the "left bank" (2N) or the "right bank" (3N). The four choices are defined by the eight bit operand sent to the IVL register.

Output Assignments

The output assignments are set forth in Table 22.

IV Input Assignments

The IV input assignments are set forth in Table 23.

Control Pulse, Bit Assignments

The control pulses are decoded from the low order three bits of the control register as set forth in Table 24.

Status Input Assignments, Interrupt Sense

The status input assignments, interrupt sense is set forth in Table 25.

Status Sense

The status sense assignments are set forth in Table 26.

MEMORY TIMING

The scratchpad, logic, and coil RAM's operate at lower speeds than the CPU and thus require wait cycles (instructions not affecting the memory) between some operations. The instructions affecting memory are address (A), read (R), and write (W). The wait cycles are set forth in Table 27.

The address cycles are those that load the scratchpad address, or increment or load either the byte of the coil address or the logic address.

TABLE 22

| IVL Register | Left Bank (Reg 2N) | Right Bank (Reg 3N) |
|---|---|---|
| X XXX 0000 | Control Pulses | Coil Low Address |
| X XXX 0001 | Coil High Address | Scratchpad Write |
| X XXX 0010 | Coil Write Data | " |
| X XXX 0011 | Logic Low Address | " |
| X XXX 0100 | Logic High Address | " |
| X XXX 0101 | Interface Data | " |
| X XXX 0110 | Interface Address | " |
| X XXX 0111 | Interface Control | " |
| X XXX 1000 | Peripheral Data | " |
| X XXX 1001 | Logic Write Data | " |
| X XXX 1010 | Column Solver Pwr | " |
| X XXX 1011 | | " |
| X XXX 1100 | | " |
| X XXX 1101 | | " |
| X XXX 1110 | | " |
| X XXX 1111 | | |

TABLE 23

| IVL Register | Left Bank (Reg 3N) | Right Bank (Reg 3N) |
|---|---|---|
| X 000 XXXX | Coil Read Data | Logic Read Data |

TABLE 23-continued

| IVL Register | Left Bank (Reg 3N) | Right Bank (Reg 3N) |
|---|---|---|
| X 001 XXXX | Column Solver | Scratchpad Read |
| X 010 XXXX | Status Sense | " |
| X 011 XXXX | Interrupt Sense | " |
| X 100 XXXX | Interface Input | " |
| X 101 XXXX | Peripheral Data | " |
| X 110 XXXX | | " |
| X 111 XXXX | | " |

TABLE 24

| Code | | Pulse |
|---|---|---|
| 7 | = | Reset Processor |
| 6 | = | Acknowledge RTC |
| 5 | = | Pulse WDT |
| 4 | = | Clear Prog. Pnl. ROV Ready |
| 3 | = | |
| 2 | = | |
| 1 | = | Increment Coil Address |
| 0 | = | Increment Logic Address |

TABLE 25

| Bit # | | Input |
|---|---|---|
| 7 | = | I/O Tester Connected |
| 6 | = | CPU Tester Connected |
| 5 | = | I/O Busy |
| 4 | = | |
| 3 | = | Peripheral XMT Ready |
| 2 | = | Peripheral RCV Ready |
| 1 | = | Real Time Clock (100 HZ) |
| 0 | = | Power Down Warning |

TABLE 26

| Bit # | | Input |
|---|---|---|
| 7 | = | |
| 6 | = | EIA Peripheral Device |
| 5 | = | Peripheral Not Overrun |
| 4 | = | Peripheral Comm Err |
| 3 | = | WDT Run |
| 2 | = | Memory Protect |
| 1 | = | Interface Data Bit 9 |
| 0 | = | Interface Data Bit 8 |

TABLE 27

| | A to R | A to W | A to A | W to A | W to R | W to W | R to A | R to W | R to R |
|---|---|---|---|---|---|---|---|---|---|
| Logic/Coil | 3 | 1 | 0 | 0 | 2 | 1 | 0 | 0 | 0 |
| Scratchpad | 1 | 0 | 0 | 1 | 2 | 1 | 0 | 0 | 0 |

The write cycle to any one of the three memories, the peripheral interface, or vertical column solver has at least one wait cycle before another write cycle to any of these devices.

POWER DOWN

A warning signal is provided to the status sense whenever power has turned off or a failure on the power line occurs. The controller is able to function for five milliseconds after the warning occurs. The software completes its pass within five milliseconds of the warning signal and issues a "reset processor" instruction.

During a power dip, the warning signal may go on and off several times with a warning occurring during the power up routine. For this reason, the maximum time from power up to the time the warning is polled plus the power down routine time is less than five milliseconds.

On power up the instruction in location zero of the instruction ROM is executed immediately after power up stabilization. If a "reset processor" instruction is executed when the warning signal is off, the instruction is treated as a non-operation. Due to this treatment, and due to the possibility of bounce on the warning signal, the instruction after "reset processor" is the jump instruction to zero.

WATCHDOG TIMER

The watchdog timer (WDT) drives the run light 24 (see FIG. 1) and allows the interface outputs to turn on. The WDT remains enabled as long as the CPU updates it with the "pulsed WDT" control pulse more often than once every 50 milliseconds.

INTERFACE CONTROL

The interface control register is loaded by the CPU with an 8 bit byte as set forth in Table 28.

TABLE 28

| | | |
|---|---|---|
| Bit #7 | = | Programming Panel Power Light |
| 6 | = | |
| 5 | = | Register Input Enable |
| 4 | = | Register Output Strobe |
| 3 | = | Discrete Input Enable |
| 2 | = | Discrete Output Strobe |
| 1 | = | Interface Data Bit |
| 0 | = | Interface Data Bit |

VERTICAL COLUMN SOLVER

As shown in FIGS. 4, 5, and 29 the user networks allow for vertical interconnections between adjacent nodes in adjacent lines. The solving of the user networks by the mainframe of the programmable controller incorporates both hardware and software so as to perform the solution on a column-by-column basis from left to right. After the power flow is determined across each node from left to right; that is, whether or not a particular contact is passing power due to the condition of the reference element, the vertical conductivity power flow is determined by a hardwired vertical column solver 60 shown in FIGS. 22A–22D inclusively. This vertical column solving could, like any other logical operation, be performed by an appropriately programmed data processor.

This vertical column solver is shown in detail in FIGS. 22A–22D for a typical relay logic ladder diagram network such as that shown in FIG. 29. The user's ladder diagram is programmed into the controller in the form of a nodal matrix or network where each node 41 embodies some logic element in the user's diagram. The nodes in FIG. 29 are uniquely identified by their row and column position in the network. For example, the node in the second row and first column is identified as "$N_{2,1}$". In general, each node is identified as "$N_{i,j}$", where "i" is an integer representing the row number and "j" is an integer representing the column number of the node. These logic elements can comprise, among others, normally-closed or normally-open contacts or switches, counters, timers or coils. The logical solution of each line of the ladder diagram or each row of the matrix is displayed in an output coil node corresponding to that line. Any node within the matrix can be referenced to any output coil in order to utilize the logical state of that output coil as an input to a node. The nodal matrix in the preferred embodiment of the present invention has a maximum size of eight rows and elevan columns. Of course, it would be obvious to use either a larger or smaller network nodal matrix size.

The method of solving of the relay logic ladder diagram will now be described. Referring to FIG. 29, there is shown a typical programmed relay logic ladder diagram network 60 comprising eight rows 61, 62, 63, 64, 65, 66, 67 and 68. Logic Rows through 68 each comprise a series of nodes 41 where each node comprise an input, an output and a logic element of the type previously described, located between the input and the output. The output of one node connects to the input of the next sequential node in a junction area.

Row 61 has not been programmed and consequently is blank. Row 62 comprises a normally closed contact 70 in node $N_{2,1}$, normally open contact 71 in node $N_{2,2}$ and coil 72 in node $N_{2,3}$. Row 63 comprises normally open contact 73 in node $N_{3,1}$ and normally closed contact 74 in node $N_{3,2}$. Row 64 comprises normally open contact 75 in node $N_{4,1}$, normally open contact 76 in node $N_{4,2}$ and coil 77 in node $N_{4,3}$. Row 65 comprises normally closed contact 78 in node $N_{5,1}$ and normally open contact 80 in node $N_{5,2}$. Rows 66 and 67 are blank, and row 68 comprises normally open contact 81 in node $N_{8,1}$, normally open contact 82 in node $N_{8,2}$ and coil 83 in node $N_{8,3}$. Each of the previously described contacts and coils represents a logic element of a node in the relay logic ladder diagram. It should be noted that many more nodes may be programmed into each row.

Additionally, each row may be interconnected with adjacent rows. Such interconnections occur within the junction areas between nodes. In FIG. 29 there is shown a connection 84 between rows 62 and 63, a connection 85 between rows 64 and 65, a connection 86 between rows 62, 63, and 64 and a connection 87 between rows 65, 66, 67 and 68. These connections can be referred to by their placement in the network. Thus connections 84 can be referred to as the logic true state for variable "$C_{V3,1}$"; that is, a connection between the output of node $N_{3,1}$ and $N_{2,1}$.

As shown in FIGS. 22A-D, the CPU of the programmable controller uses a hardward column solver 59 for performing an algorithm to solve equations for the power flow across a nodal junction area on a column-by-column basis for the entire network. Thus power flow equations for the nodal junctions in the first column are solved first followed by the nodal junctions, in the second column etc. This column solving approach is unique to the present invention and provides high speed network solving.

The column solver incorporated into the CPU of the programmable controller employs a concept called connectivity in solving the network power flow equations; that is whether variable $C_V$ is true between adjacent nodes in the same column. Connectivity defines whether there is a connection between adjacent rows in the same column. If there is connectivity, power can flow in either direction; i.e., from the upper row line to the lower row or from the lower row to the upper row. Since the connections between rows occur at the juction between nodes of the network, the CPU solves the power flow equations for each line by determining whether or not power is present just to the right of each nodal junction $J_{i,j}$, where "i" and "j" define the junction location by row and column respectively. Thus for example, the power input status to node $N_{2,2}$ is defined by discrete variable $P_{IN2,1}$; that is, the power input status from node $N_{2,1}$ taking into account any vertical power flow. The presence of power is determined as a function of the power status just to the left of the nodal junction; that is "$P_{OUT}$" from the node, logically ORed with the connectivity power state relating to power flow from interconnected lines.

In FIG. 29, in order to illustrate the column solving technique, phantom line A is placed just to the left of the first column's nodal junctions and represents the power output status for each node in column 1. Line B is placed just to the right of the first column's nodal junctions and represents the power input status for each node to the right from the node to the left in combination with any vertical power flow. If we assume that power is applied to all lines at power rail P shown in FIG. 29 and that normally open contacts close when their reference is ON and open when their reference is OFF; it is seen that $P_{OUT}$ from a node is true if there is input power to the node and the node contact is closed. This can be stated generally by the following equation: $P_{OUTi,j}=P_{INi,j-1}\cdot C_{i,j}$, where $C_{i,j}$ is the conductivity state of node $N_{i,j}$. Other elements in the nodes conduct depending upon the states of their references. Thus a normally closed switch conducts if the reference is OFF, etc. These conducting states are set forth in Tables 8A-8H, 9A-9B, and 10A-10D. The output power from the node is coupled with the vertical output status at the junction between two adjacent nodes in the same column. Thus the junction between nodes $N_{3,1}$ and node $N_{3,2}$ is junction $J_{3,1}$. The power to junction $J_{3,1}$ is the power output from node $N_{3,1}$—that is, $P_{OUT3,1}$—plus the vertical power down—that is $P_{VD3,1}$—due to vertical connector 84 (alternatively designated $C_{V3,1}$) and vertical power up—that is $P_{VU3,1}$ —. Vertical power up or down is true if there is a corresponding vertical connection and if a power out is true to the connection from an interconnected node. Thus for junction $J_{3,1}$ vertical power down—$P_{VD3,1}$ is true because a connector 84 ($C_{V3,1}$) exists (is true) and power out from node $N_{2,1}$ is true assuming element 70 is conducting).

Thus the power in from node $N_{3,1}$ is the power out from node $N_{3,1}$ ($P_{OUT3,1}$) logically ORed with the vertical down power ($P_{VD3,1}$) and the vertical up power ($P_{VU3,1}$). In Boolean logic, this statement can be set forth for any node in the user network by the following equation:

$$P_{INi,j}=P_{OUTi,j}+P_{VUi,j}+P_{VDi,j} \tag{1}$$

where $$P_{OUTi,j}=P_{INi,j-1}\cdot C_{i,j} \tag{2}$$

where $C_{i,j}$ is the conductivity state, of node $N_{i,j}$, where $$P_{VUi,j}=P_{INi+1,j}\cdot C_{Ui,j} \tag{3}$$

where $C_{Ui,j}$ is the connectivity state between the output of node $N_{i,j}$ and node $N_{i+1,j}$, and where $$P_{VDi,j}=P_{INi-1,j}\cdot C_{Di,j}, \tag{4}$$

where $C_{Di,j}$ is the connectivity state between the output of node $N_{i,j}$ and node $N_{i-1,j}$;

Alternatively, since power vertical is equal to the logically "anding" of power out and vertical connectors, the following Boolean equations can define the power input to the next horizontal node from the node to its left:

$$P_{IN_{i,j}} = P_{OUT_{i,j}} + P_{OUT_{i-1,j}} \cdot C_{V_{i,j}} + P_{OUT_{i-2,j}} \cdot C_{V_{i-1,j}} \cdot C_{V_{i,j}} + \ldots + P_{OUT_{1,j}} \cdot C_{V_{2,j}} \cdot C_{V_{3,j}} \cdots C_{V_{i,j}} + P_{OUT_{i+1,j}} \cdot C_{V_{i+1,j}} + P_{OUT_{i+2,j}} \cdot C_{V_{i+2,j}} \cdot C_{V_{i+1,j}} + \ldots + P_{OUT_{I,j}} \cdot C_{V_{I,j}} \cdot C_{V_{I-1,j}} \cdots C_{V_{i+1,j}} \quad (1)$$

Visually, the power status for each of the lines 61 through 68 at line A shown in FIG. 29 is determined as follows: in this discussion a "1" indicates the presence of power and "0" indicates the absence of power. The power status of row 61 at line A is obviously 0 since no connection exists between the power rail P and line A in row 61. Since the normally closed contact 70 of row 62 is false if reference "007" is true, the power status at line A ($P_{OUT2,1}$) for row 62 is also 0. The normally open contact 73 in row 63 will close when reference 001 is true. Since power in ($P_{IN3,0}$) is true, the power out status ($P_{OUT3,1}$) at line A will be 1. Similarly, the power status at line A for row 64 will also be 1 if reference 002 is true. Row 65 is similar to row 62, and the power status at line A will be 0 if reference 001 is true. The power status at line A will also be 0 for lines 66 and 67 since no nodes exist. Row 68 is similar to rows 63 and 64 and therefore the power status at point A will be 1 if reference 002 is true. This resultant series of 1's and 0's is the output power status at point A and is referred to as a power byte. This power byte is generated by the software within the mainframe and is transferred to the column solver 59 (FIGS. 22A-22D) as signals BB0H through BB7H. The power byte at line A is shown in Table 29 for rows 1-8 from left to right.

TABLE 29

0 0 1 1 0 0 0 1

The next step is to determine the connectivity between the rows for the first column. In determining connectivity a 1 indicates a connection to the row above the row in question, and a 0 indicates no connection to the row above. Referring again to FIG. 29, it can be seen that for row 61 there is no row above so consequently the connectivity status for row 61 at column one ($C_{V11}$) is always zero and therefore is shown as a blank on Table 30 below. It can be seen that there is no connection between rows 62 and 61 so the connectivity status of row 62 ($C_{V2,1}$) is 0. The connectivity status of row 63, however, is 1 since there is a connection to row 62. Similarly, the connectivity for row 64 is a 0, for row 65 is a 1, and for rows 66, 67, and 68 are all 0. This result is illustrated in TABLE 30 for rows 1-8 from left to right. The previous data comprising the power status at line A and connectivity is determined by the software of the programmable controller.

TABLE 30

- 0 1 0 1 0 0 0

This data is stored as part of the logic data within the mainframe and is transferred to the column solver (FIGS. 22A-22D) as signals LR0L through LR6L.

The CPU of the controller then solves the power flow equations for each row at phantom line B. Power can be present at line B for each row in one of three ways. (1) power can flow directly through the row from line A if the node is in the conducting state. (2) power can flow from line A of a row above through a connection to the row being solved; and (3) power can flow from line A of a row below through a connection to the row being solved. In the example shown in FIG. 29 is can be seen that the power status at line B of row 61 is 0. The power status at line B of row 62, however, is 1 since power can flow from line A of row 63 up through connection 84. The power status at line B of row 64 is 1 since power flows directly from line A to line B if contact 73 is closed (reference 001 is true). Power also flows from line A of row 64 down through connector 85 to line B of row 65 making the power status at line B of row 65 also 1. Since it can be seen that no connections exist, the power status at line B of rows 66 and 67 is 0. It can also be seen that the power status at line B of row 68 is 1 since power can flow directly from line A to line B of row 68. The solution to the power flow equation for each column is an input power byte, such as that shown in Table 31 for rows 1 through 8 from left to right.

TABLE 31

0 1 1 1 1 0 0 1

This data is generated by the column solver 59 shown in FIGS. 22A-22D on output lines VR0L through VR7L.

The software of the programmable controller (Appendix A) furnishes the column solver with information of the power input to the left of the nodal junction and the connectivity data relating to connections between lines. The column solver then determines the input power byte just to the right of the nodal junction. The software then uses this input power byte to determine power flow through the next node, in order to get the power input at the following nodal junction. The column solver of the controller continues to solve the lines in this columnar manner in a left to right fashion until the overall power status of the network is determined, resulting in a power byte for each output coil for the entire network (nodes $N_{2,3}$,$N_{4,2}$,and $N_{8,3}$ for FIG. 29).

Figure 22E:
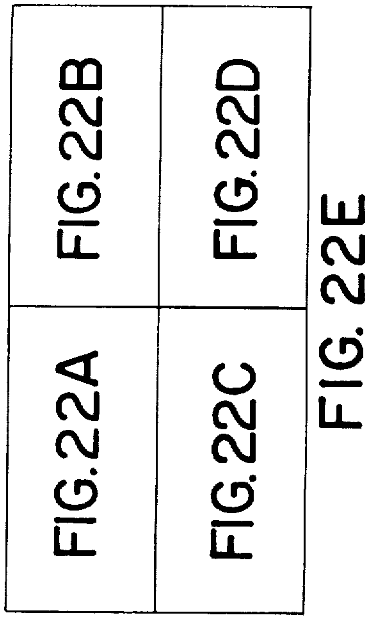
Figure 22A:
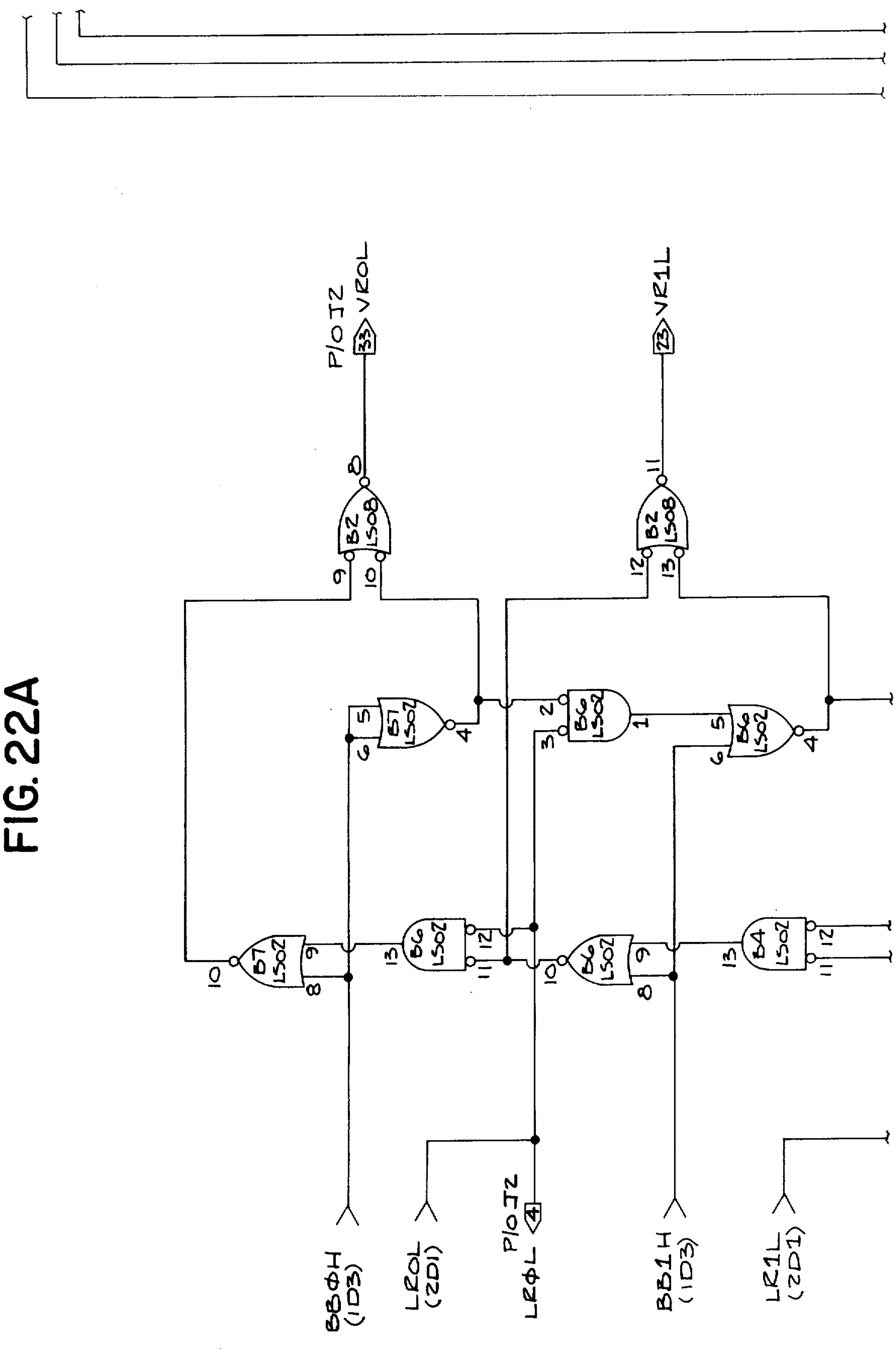
Figure 22B:
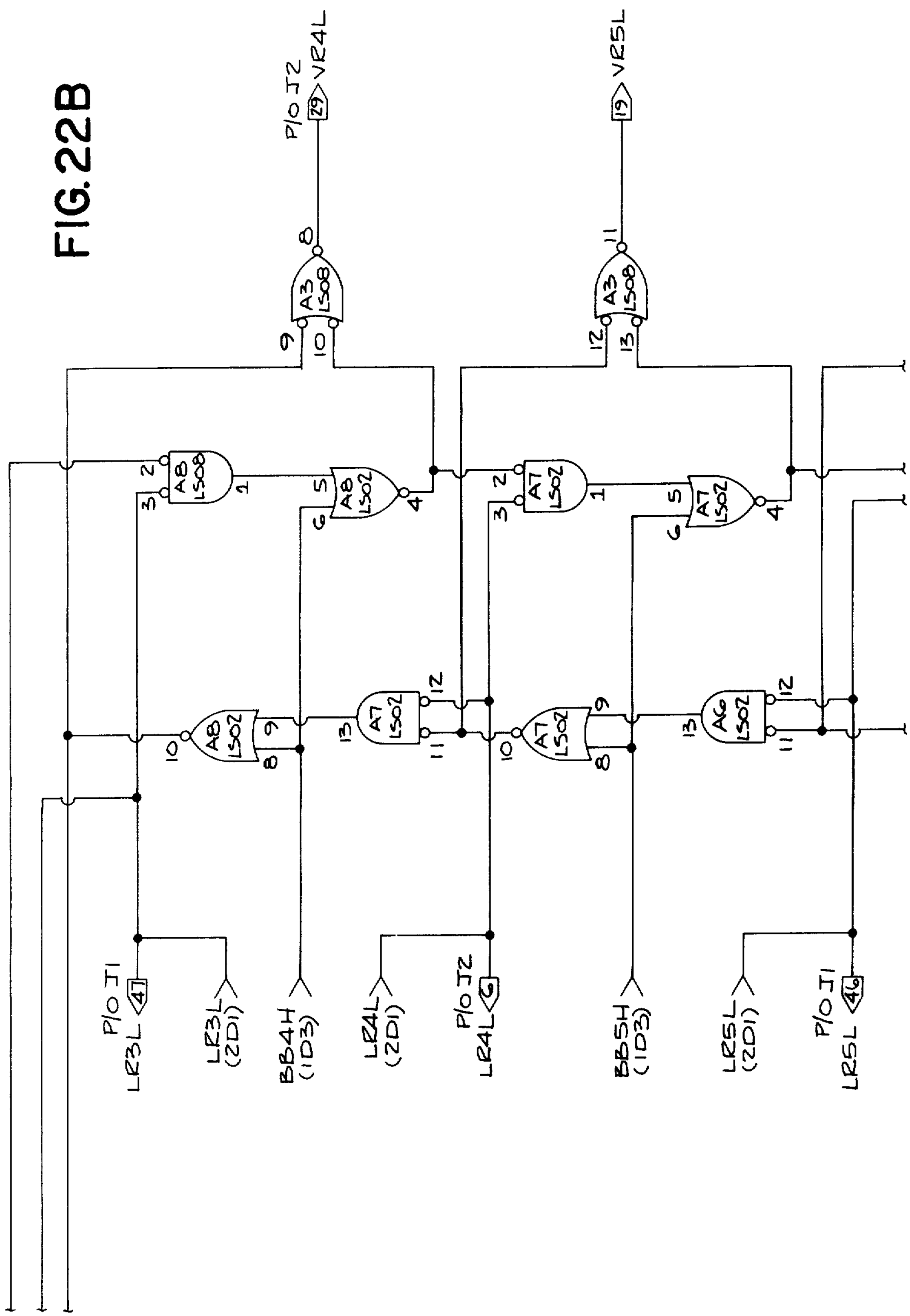
Figure 22C:
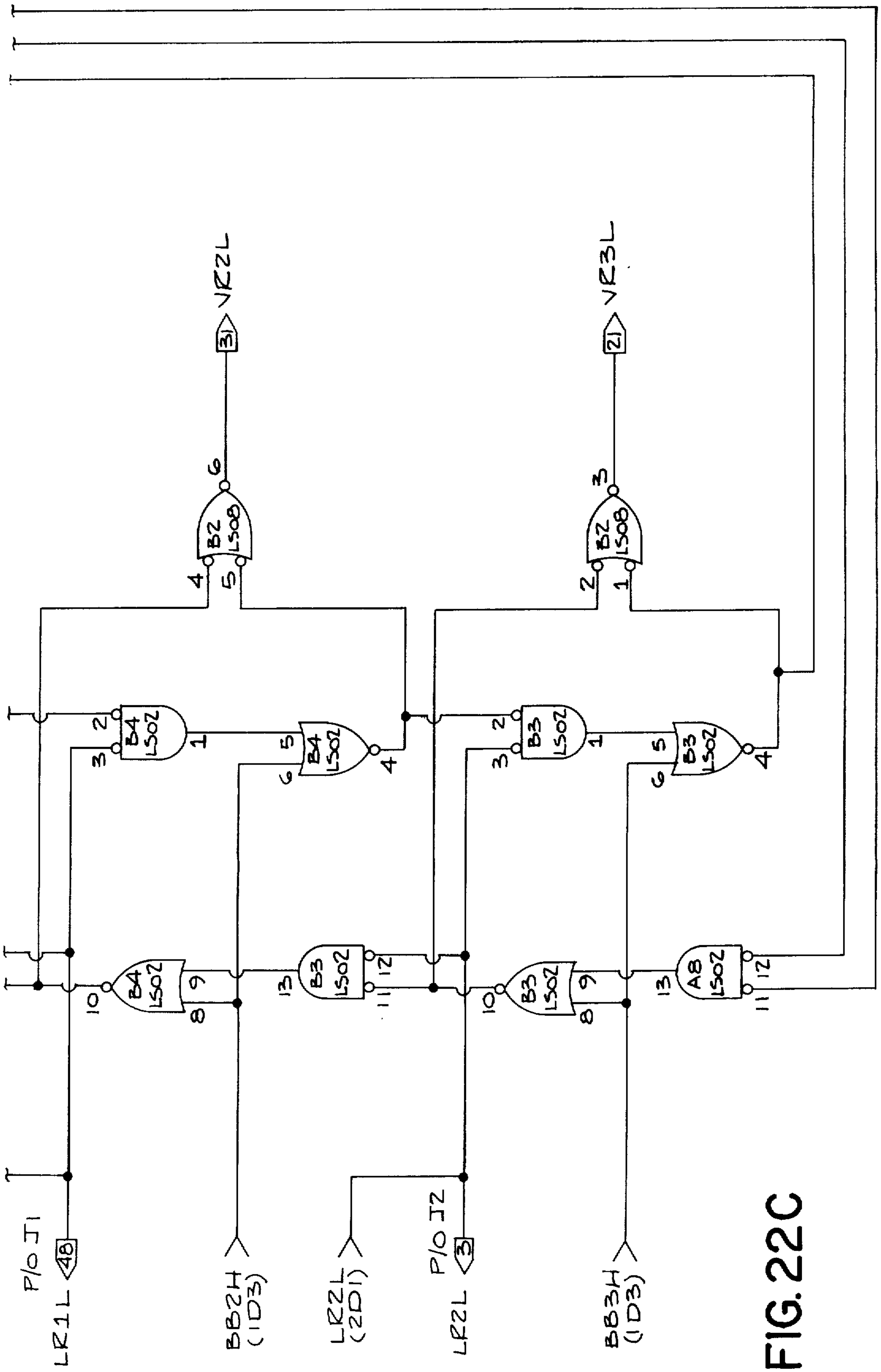
Figure 22D:
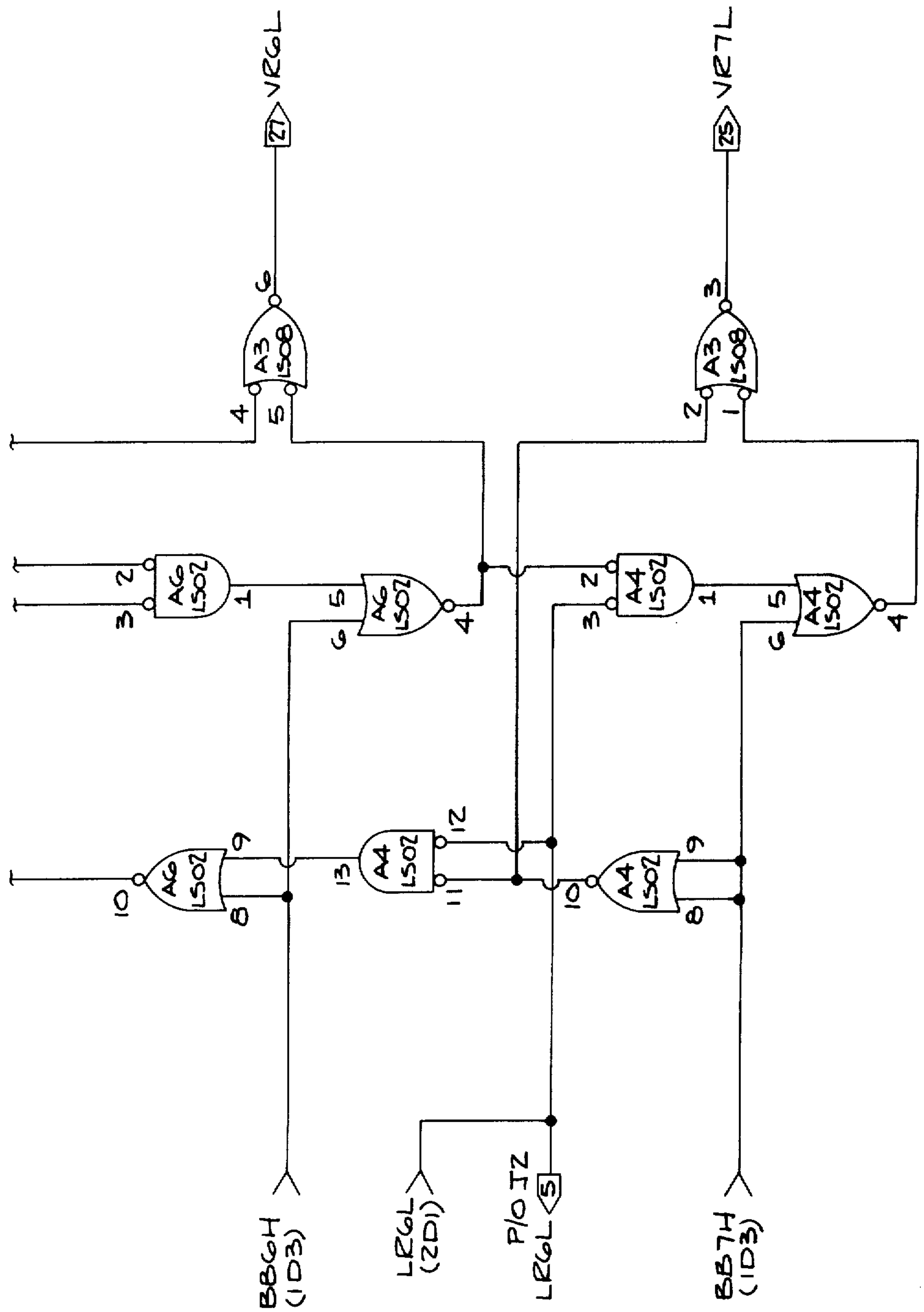
Figure 23A:
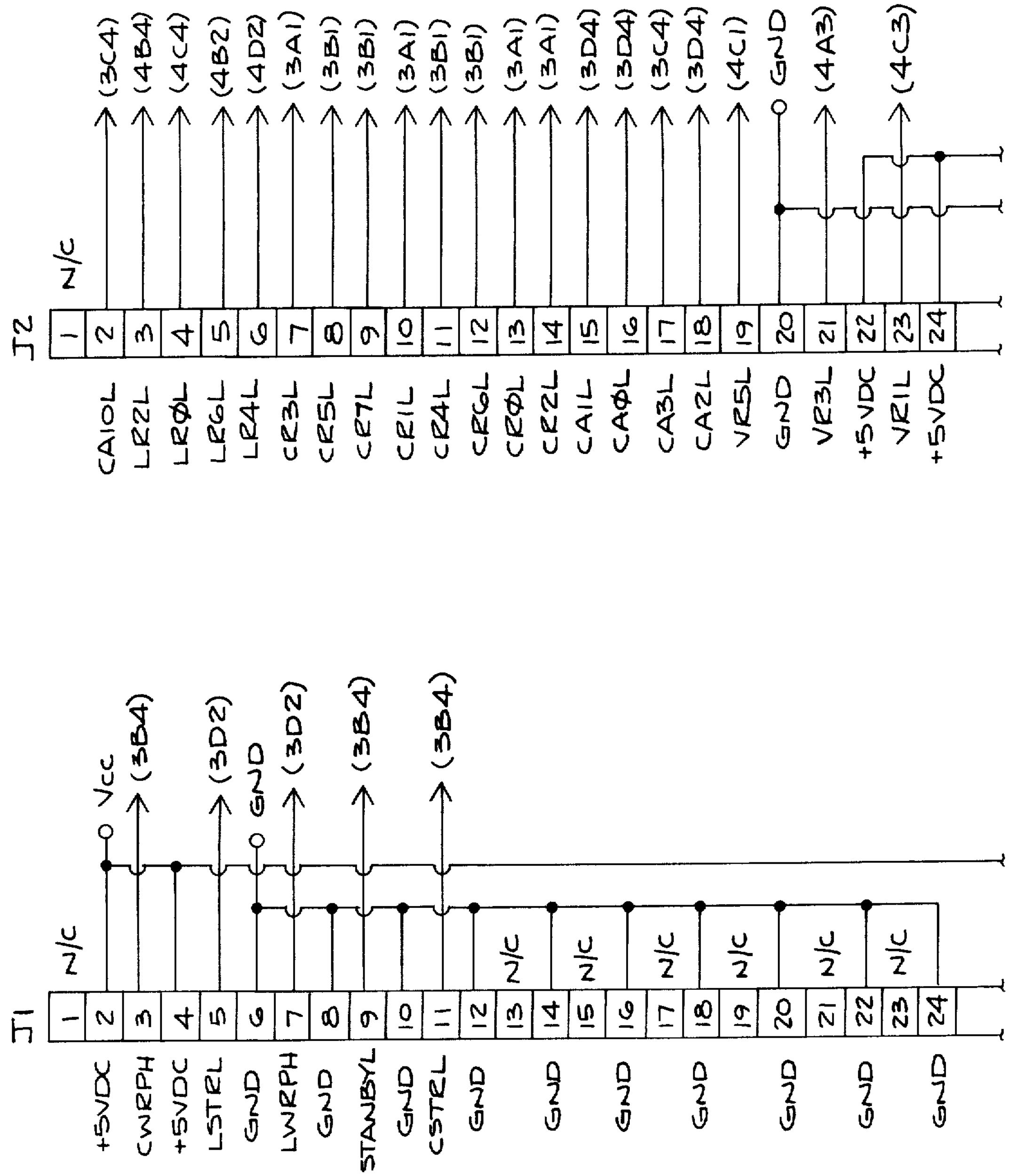
Figure 23B:
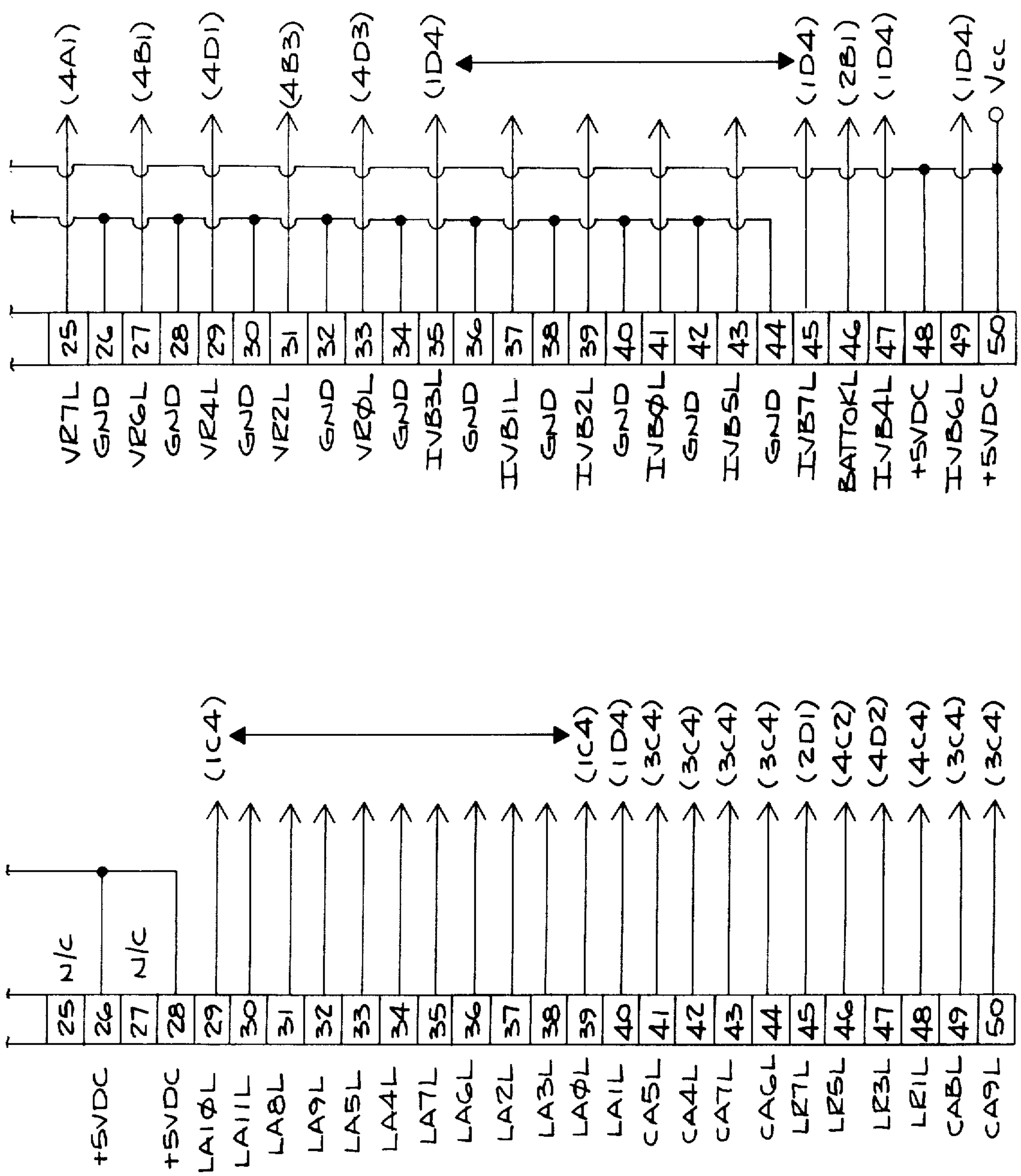

The logic hardware implementation that performs the column solving is shown in FIGS. 22A-D. For the sake of simplicity, only the logic steps involved in determining the output for one line of any particular column is described. Referring to FIG. 22C, there is shown a number of logic elements or gates. Lines to and from the logic gates are referred to by an alphanumeric number comprising the component and the input or output line number. Also shown in FIG. 22C are input lines BB2H, BB3H, LR1L and LR2L and output lines VR2L and VR3L. Input line BB2H carries the input power data for row 2. Input line BB3H carries the input power data for row 3. Line LR6L carries the connectivity data relating to connectivity between rows 1 and 2, and line LR5L carries connectivity data relating to connectivity between rows 2 and 3. In terms of this particular logic arrangement, a logical 1 on lines BB2H and BB3H indicates power and a logical 0 on lines LR1L and LR2L indicates connectivity between the respective lines. Line VR6L carries the output power data relating to row 2 and shows a logical 0 when power is present. The input power data and connectivity data is supplied to the hardware column solver from the software of the CPU.

The method of determining the power status on output line VR2L will now be described. From the previous discussion, it is apparent that output line VR2L can exhibit a logical 0 indicating the presence of power when any of three situations occurs: (1) when power flows directly from input line BB2H; (2) when power flows down from the row above; or (3) when power flows up from a row below. The case where power is present on input line BB2H will now be examined. If power is present on line BB2H, a logical 1 will appear on line B4-6. When either line B4-6 or line B4-5 is a logical 1, line B4-4 becomes a logical 0. This output also appears on line B2-5. Whenever the status of line B2-4 or B2-5 or both is a logical 0, line B2-6 becomes a logical 0. In that way, it can be seen that when input line BB2H carries a logical 1, output line VR2L will be a logical 0 indicating power is present.

The case of power flowing down from a row above will now be examined. It can be seen that when the input line BB3H carries a logical 1, line B3-10 will be a logical 0 making line B3-11 also a logical 0. Line B3-12 is connected to input line LR2L which carries the connectivity data relating to connectivity between rows 6 and 5. If connectivity exists, this line will carry a logical 0 also making line B3-12 a logical 0. When both lines B3-11 and B3-12 are a logical 0, line B3-13 becomes a logical 1. It can be seen that when power exists at input line BB3H, and there is connectivity between that line and line BB2H, the presence of the logical 1 on line B3-13 also applied to line B4-9, will in turn cause a logical 0 at the output VR2L indicating the presence of power.

In a similar fashion, lines B4-1 and B4-4 determine whether there is a connection to the row below and also whether there is power flowing in that row. It is clear that both conditions of power flowing and connection between rows must be true in order for the output line VR2L to show a logical 0 indicating the presence of power.

It should be noted that the column solver is not limited to the specific hardware implementation shown, or to any hardware implementation. The function of the column solver could easily be done by a software program or by other hardware construction.

Any software program or hardware implementation that performs the following logic algorithm would accomplish the result of the column solver of the present invention.

$$D_n = O_{n+1} \cdot D_{n+1} + P_n$$

$$U_n = O_{n-1} \cdot U_{n-1} + P_n$$

ti $O_n = D_n + U_n$ where $D_n$ = power flowing up from below to line n.
$U_n$ = power flowing down from above to line n.
$O_n$ = power output on line n.
$O_{n+1}$ = power output on line below (line n+1)
$D_{n+1}$ = connectivity from line below (line n+1)
$O_{n-1}$ = power output on line above (line n−1)
$U_{n-1}$ = connectivity from line above (line n−1)
$P_n$ = power input on line n.

The concept of column solving as embodied in the present invention is superior to other techniques utilized by other programmable controllers in the solving of network ladder diagrams. Prior to the present invention, ladder diagrams were solved on a line-by-line basis. This technique would often create problems for the programmer who would often have to rewrite his ladder diagrams in order to conform to a specified programming format.

FIG. 30 illustrates a network that is easily solvable by the column solver of the present invention, but presents difficulties to the conventional line solver controller.

A conventional controller using prior art line solving technology would solve the relay logic ladder diagram shown in FIG. 30 in the following fashion. The power flow for node 90 would be solved first followed by the solving of nodes 91 and 92. Prior to solving nodes 91 and 92, however, the results of the power flow through node 90 would be stored in a register for later use. This stored value would correspond to the power status at point 95. The power flow solution to nodes 91 and 92 would also have to be stored in a register. This value would correspond to the power status at point 97. After storing the status of point 97, the conventional controller would return to point 95 and using the previously stored power status value, it would then solve for node 94. This value would be stored for the power status at point 96, and the controller would return to solve for node 98. The solution to node 98 would be basically ORed with the stored value at point 96 and the resultant value ORed with the value at point 97. The results from this would be then used to solve the power flow for node 93. It is quite apparent that for a complicated network having many node branches, a large amount of registe storage is required in order to hold intermediate power status values while other nodes are solved. This storage space requirement in prior art controllers necessitates limitations on the format of the user network so as to limit the number of logically ORed nodes. The column solver of the present invention, however, is not adversely affected in its execution of such logic functions and is therefore faster and more efficient than prior art controllers.

NETWORK INSERTION

The programmable controller via its software allows for the insertion of networks between two sequentially adjacent existing networks. Since the networks are solved sequentially in the order of their step number (see the status/assembly area in FIG. 6A), the sequential solution order of the programmable controller can be altered by network insertion. The portion of the software for implementing this network insertion is set forth in Appendix A.

COIL DESIGNATION

The programmable controller not only allows the user to insert networks between two existing networks in his or her control program but also allows the user to designate any desired output point in the I/O system for any line within any network. Thus user lines may be inserted anywhere within the control program without affecting other lines within the control program or their coil numbers. In prior art programmable controllers employing the user line concept, each user line had a fixed coil number representing its logical output state. Thus for example it was not possible to change user line "6" to have an output coil designated "9" or any other number, other than "6".

TABLE 32

```
/* Convert Node */
/* Direction and Type of Convert is Specified in
   Bits 1-0 of R1 */
/* IF R1(1-0) = 00B, Discrete Source Node */
/* IF R1(1-0) = 01B, Register Source Node */
/* IF R1(1-0) = 10B, Convert to BCD, Store in Discrete */
/* IF R1(1-0) = 11B, Convert to Binary, Store in Register */
```

TABLE 32-continued

```
/* Discrete Source is always a Discrete Input */
/* Discrete Destination is always a Discrete Output
   (i.e. Not an Internal Coil) */
/* Registers are always Holding Registers */
/* GET Type of Convert Node */
R11 = R1.AND.3
/* Vector OFF R11 */
/* If R11 = 00, then Discrete Source Node */
/* Coil ADDR REG has been Loaded */
/* GET Coil Increment Code */
R11 = CTR LINCC
/* Clear Assembly Area for Data */
[R5,R6] = 0
/* Set Up Count */
R2 = -12₁₀
FOR I = 1, 12 (using R2 for counting).
/* SHIFT Discrete Bits */
[R5,R6] = [R5,R6].Rotate Left. 1
/* Bring in Next Discrete Input */
[R5,R6] = [R5,R6].OR.CRINPUT
IVOCTRL < = R11
NEXT I
/* Store Source Data *
[CONVSRCH, CONVSRCL] = [R5,R6]
Go To Logic 020 /* Solve Next Node */
/* If R11 = 01B, Then Register Source Node */
/* Save R1 */
Save R1 = R1
Call REGVAL
/* Save Source Data */
[CONVSRCH, CONVSRCL] = [R5,R6]
/* Solve Next Node */
/* If R11 = 10B, Then Discrete Destination, with Binary
   to BCD Convert */
/* Save R1 */
Save R1 = R1
Save R3,R4 = Save R3, Save R4
/* GET Binary Source Data */
[R5,R6]= [CONVSRCH, CONVSRCL]
/* Set Up Count A */
BCD Value = 0, [R3,R4] = 0
R1 = -4
Do R1 To 0, Step 1
/* Set Up Count B */
R2 = -4
Multiply BCD Value By 2, [R3,R4] = 2.*[R3,R4]
Do R2 to 0, Step 1
/* Subtract 800 from BIN Value */
[Aux,R11] = [R5,R6] -800₁₀
If [Aux,R11].GE.0
Then Do
/* Replace BIN Value */
[R5,R6] = [Aux,R11]
/* Add one to BCD Value */
[R3,R4] = [R3,R4] + 1
Else:
ENDIF
ENDDO
/* Divide BCD Value By 16 */
[R3,R4] = [R3,R4].Rotated Right.4
/* Mult BIN Value By 10 */
[R5,R6] = [R5,R6] * 10
ENDDO
/* BCD Value is In [R3,R4]
/* Future Rotates with [R3,R4] will be Wrap-Around
   With Carryout = > Carryin */
/* Coil Addr Reg is set, GET INCR Code */
R11 = CTRLINCC
/* Set Count */
R2 = -12₁₀
/* Rotate First Bit into Position */
[R5,R6] = [R5,R6].Rotate Left 5
DO R2 to 0 Step 1
    /* Output a Bit */
    CROUTPUT = [R4]
    /* Rotate Next Bit into Position */
    [R3,R4] = [R3,R4].Rotate Left.1
ENDDO
/* Restore Registers */
R1 = Save R1
R3 = Save R3
R4 = Save R4
```

TABLE 32-continued

```
/* Set Power */
R3 = (R3.AND.3̄).OR.2
/* Solve Next Node */
/* If R11 = 11B, Register Destination with BCD to
   Binary Convert */
/* Save R1, R2, R3, and R4 */
Save R1 = R1
Save R2 = R2
Save R3 = R3
Save R4 = R4
/* Get Source Data */
[R1,R2] = [CONVSRCH, CONVSRCL]
/* Set Bin to 0 ]
[R3,R4] = 0
1 Set Count */
R11 = -3
Do R11 to 0, Step 1
  /* Multiply Bin Value by 10 */
    [R3,R4] = [R3,R4] * 10
  /* Add Next Digit to Bin Value */
    [R3,R4] = [R3,R4] + R1
  /* Move next Digit into Position */
    [R1,R2] = [R1,R2]. Rotate Left. 4. AND.7777
ENDDO
/* Save Bin Data */
[CONVSRCH, CONVSRCL] = [R3,R4]
/ Restore R1, R2 */
R1 = Save R1
R2 = Save R2
/ GET REG ADDR */
CALL REGVAL
/ GET Bin Data */
[R1,R2] = [CONVSRCH, CONVSRCL]
CALL STORE
/* Restore Registers */
R1 = Save R1
R3 = Save R3
R4 = Save R4
/* Set Power */
R3 = (R3.AND.NOT.3).OR.2
/* Solve Next Node */
```

In the present invention, the output coil of any user line is identifiable with any number within the output address state of the I/O system. Thus it is not necessary that the coil numbers of outputs within user networks be equal to the number of the line in that network, For example, in network number one (step number one) the first line output can reference any I/O point from "1" to the maximum number of I/O points in the I/O system; typically, 256. Similarly, the second line of that network need not have a coil output numbered "2" but can be any number within the I/O output field. Therefore, the present invention is unlike prior art programmable controllers where the solution order of the user program was the same as the line number order. In the present programmable controller, the line number order can be designated arbitrarily by the user while the solution order of his or her program is by the step number (network number) of the networks in the control program. The software for programming the user line outputs is set forth in Appendix B while the software used by the mainframe 39 to solve the user program and setting output points in the I/O system is set forth in Appendix A.

PROGRAMMING PANEL

Figure 24A:
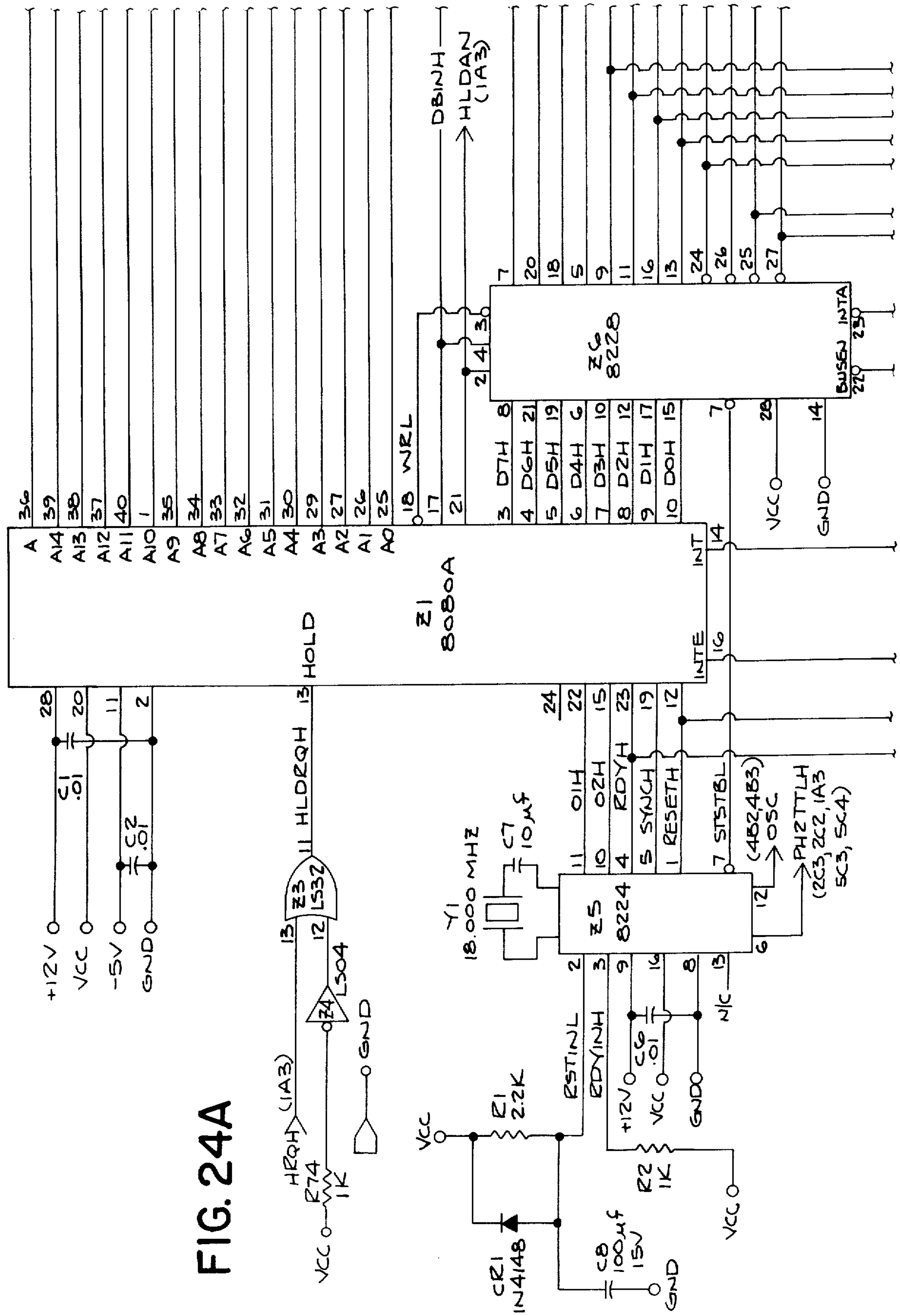
Figure 24B:
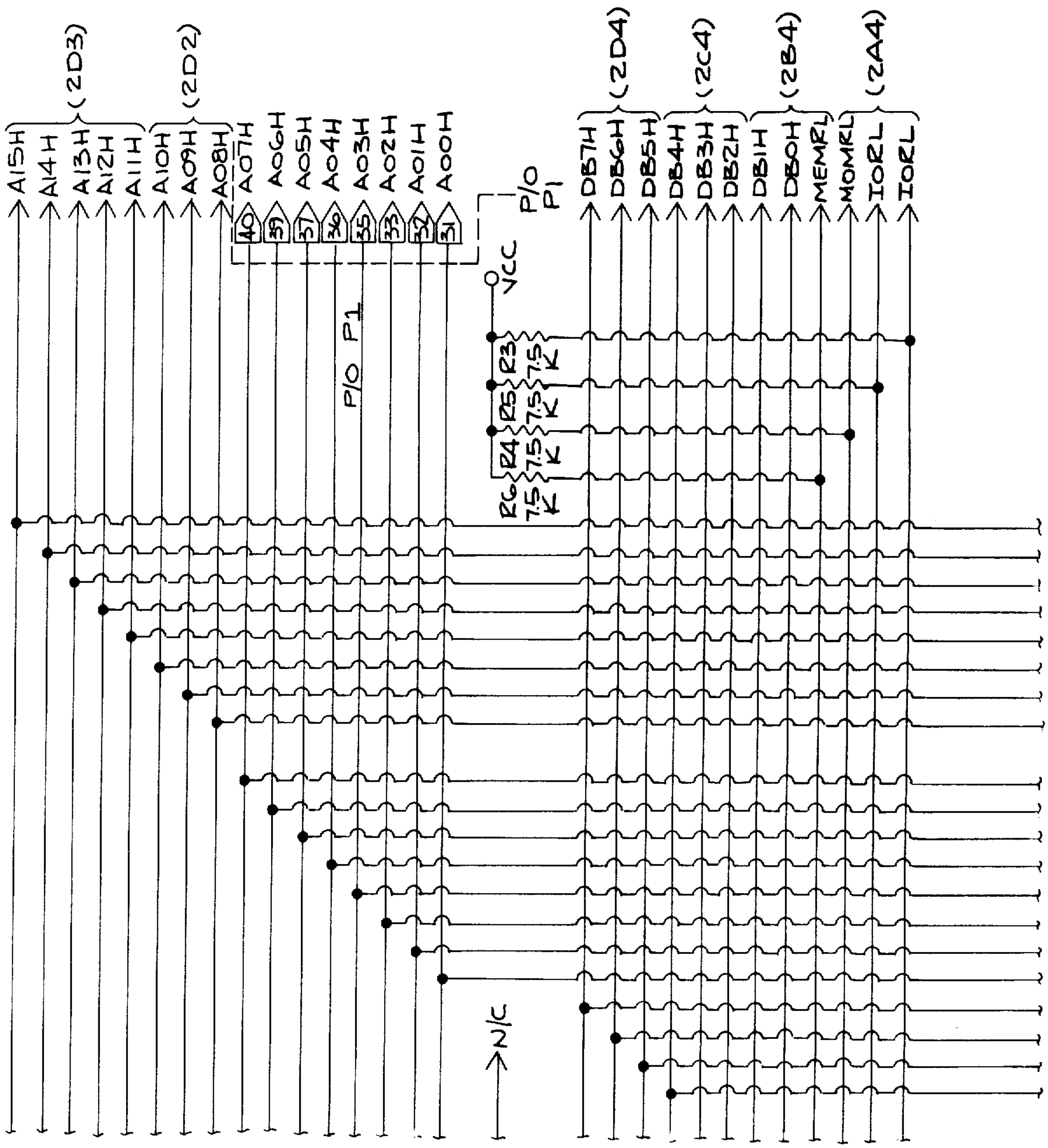
Figure 24C:
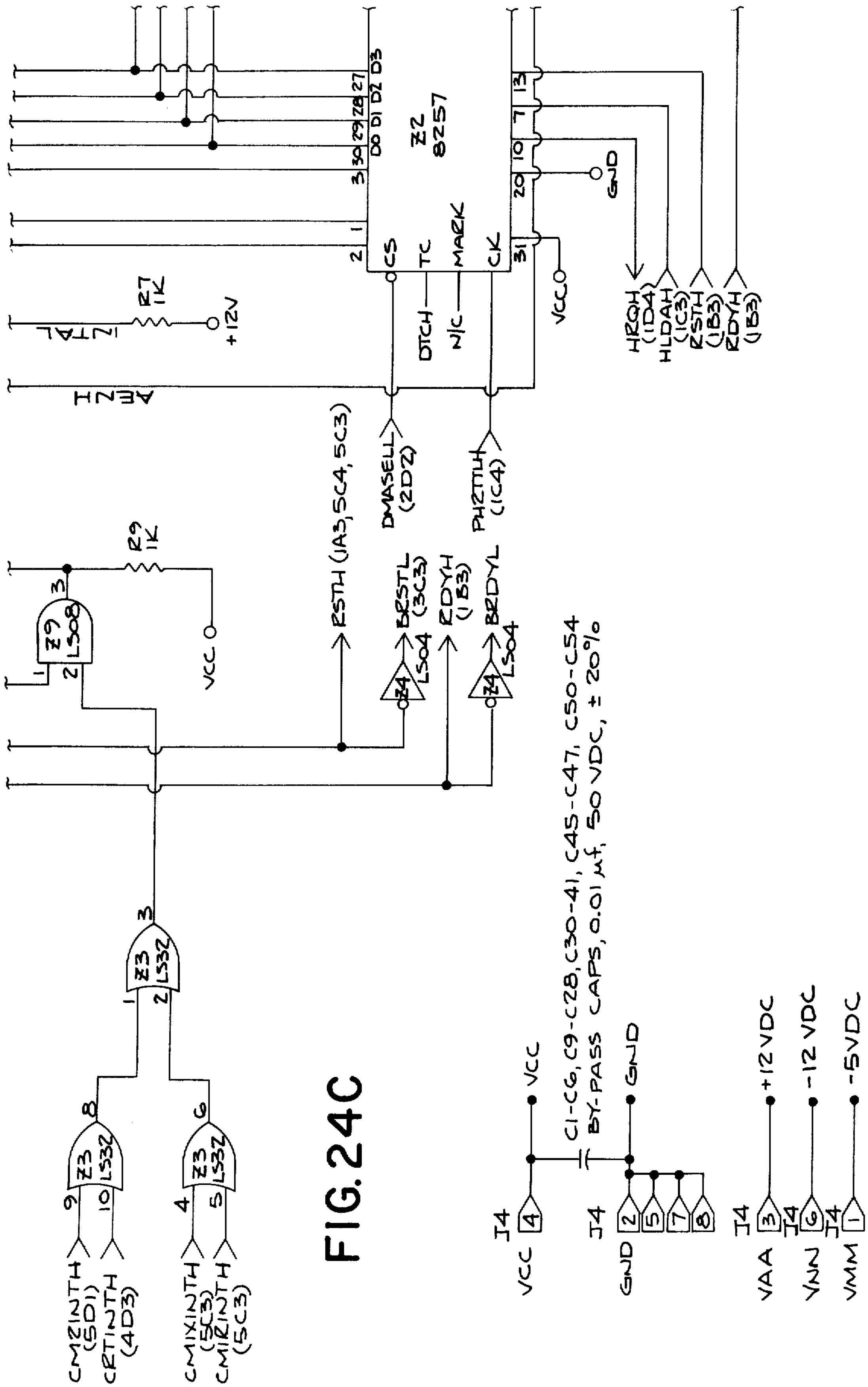
Figure 24D:
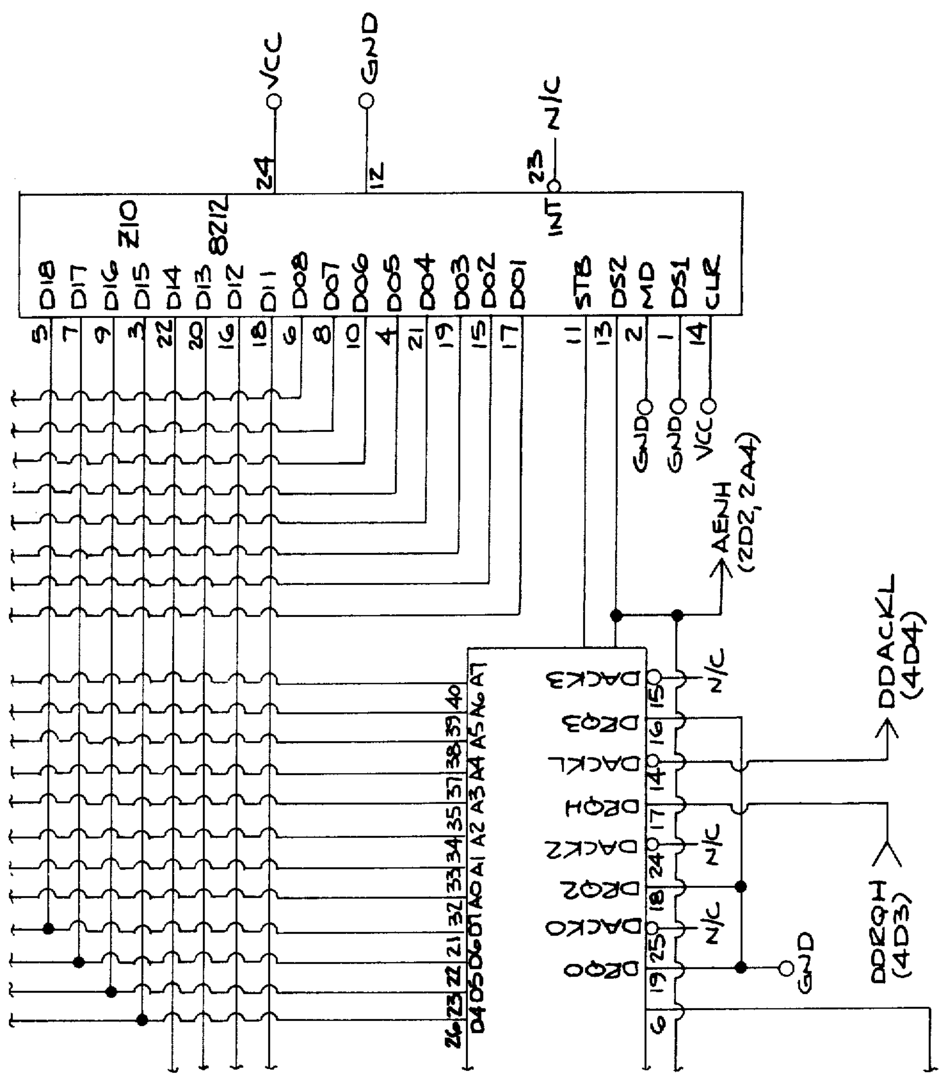
Figure 25A:
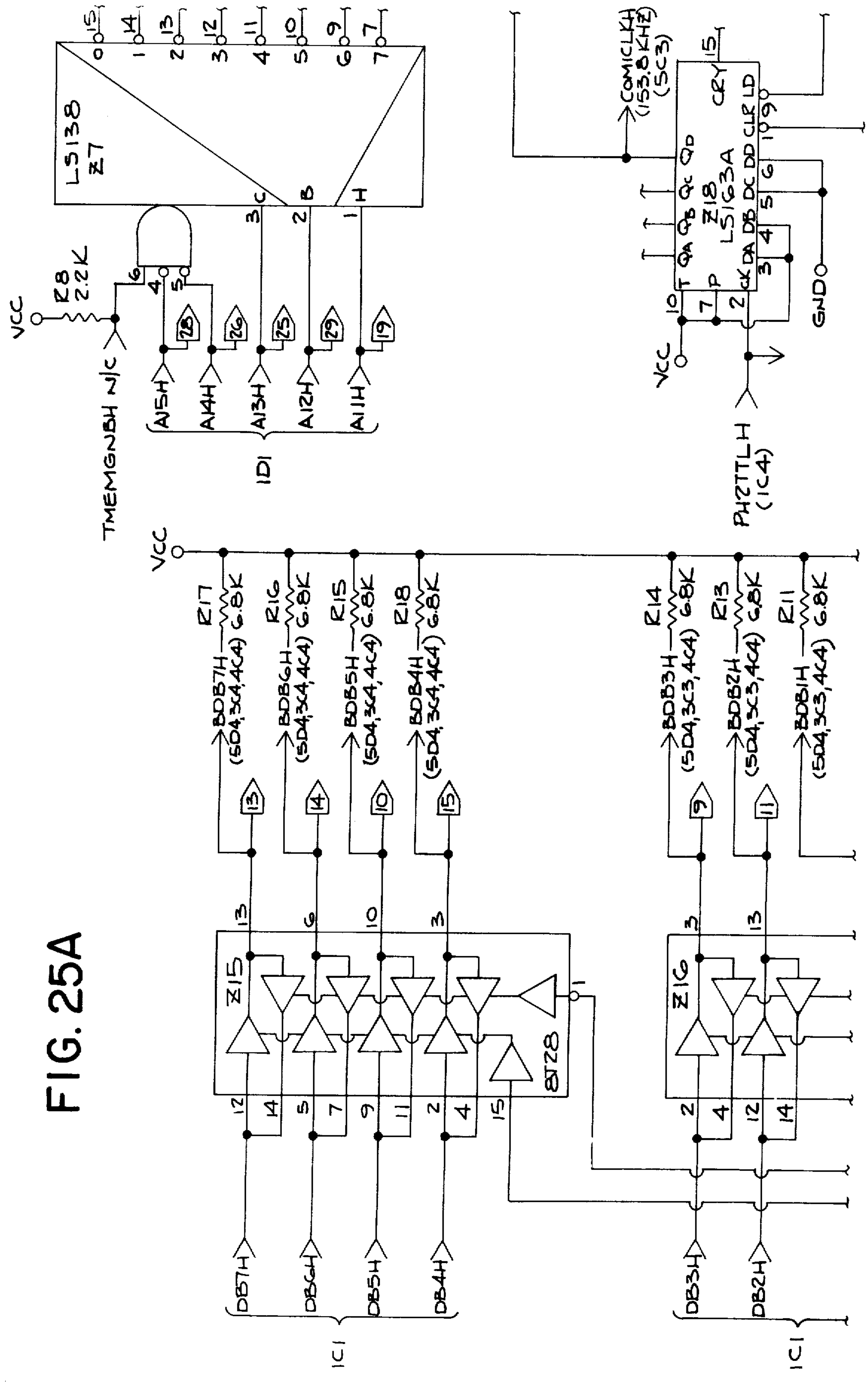
Figure 25B:
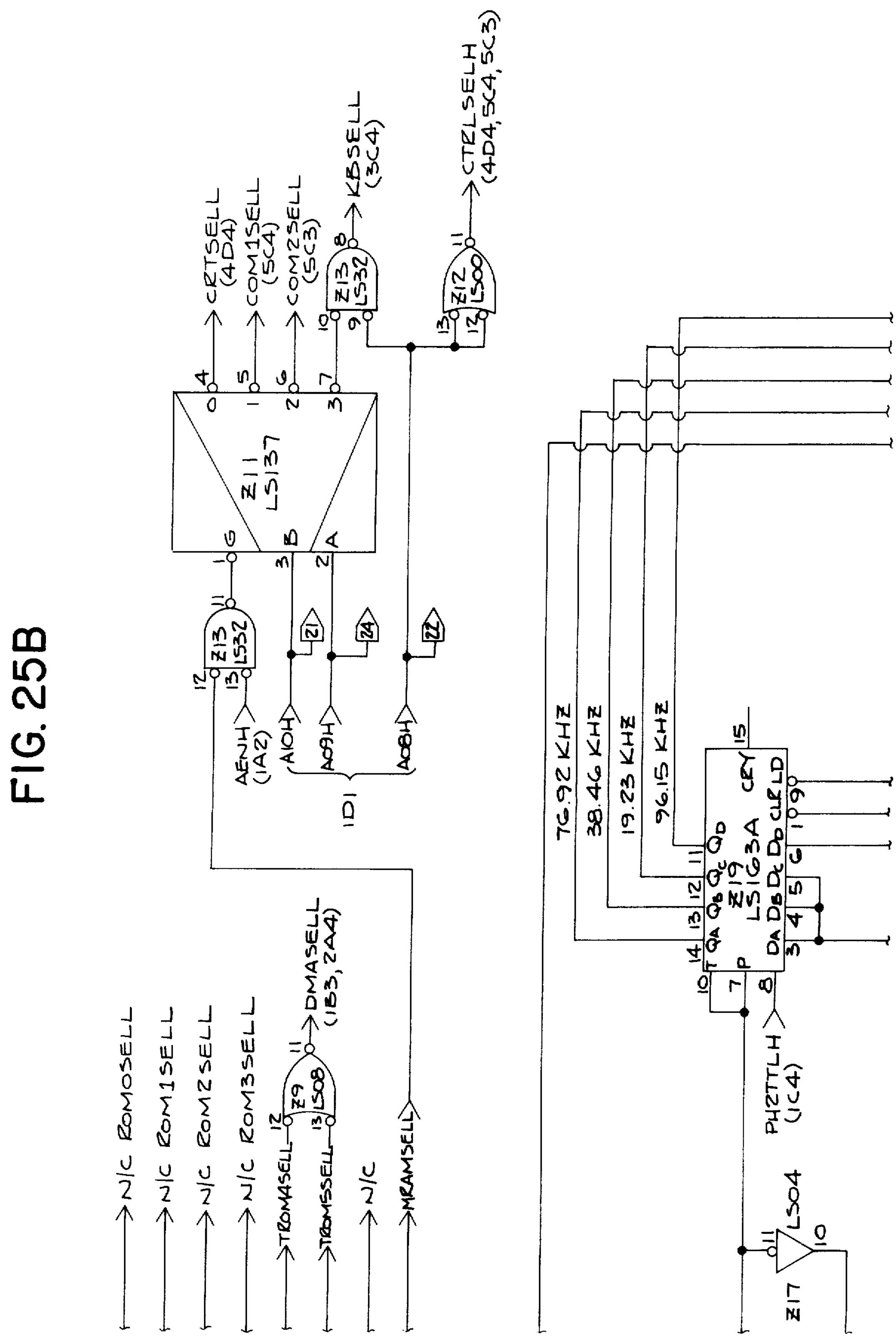
Figure 25C:
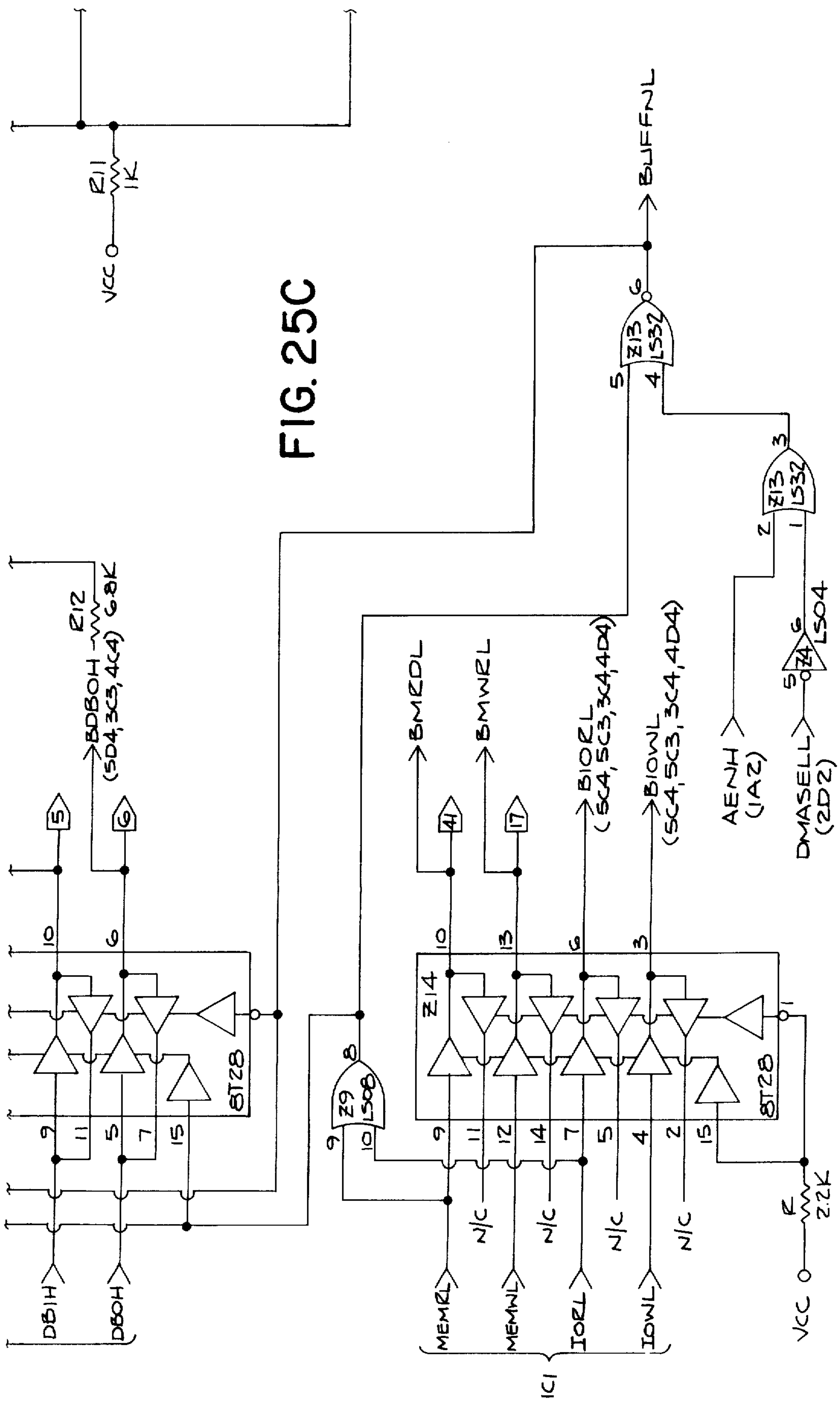
Figure 25D:
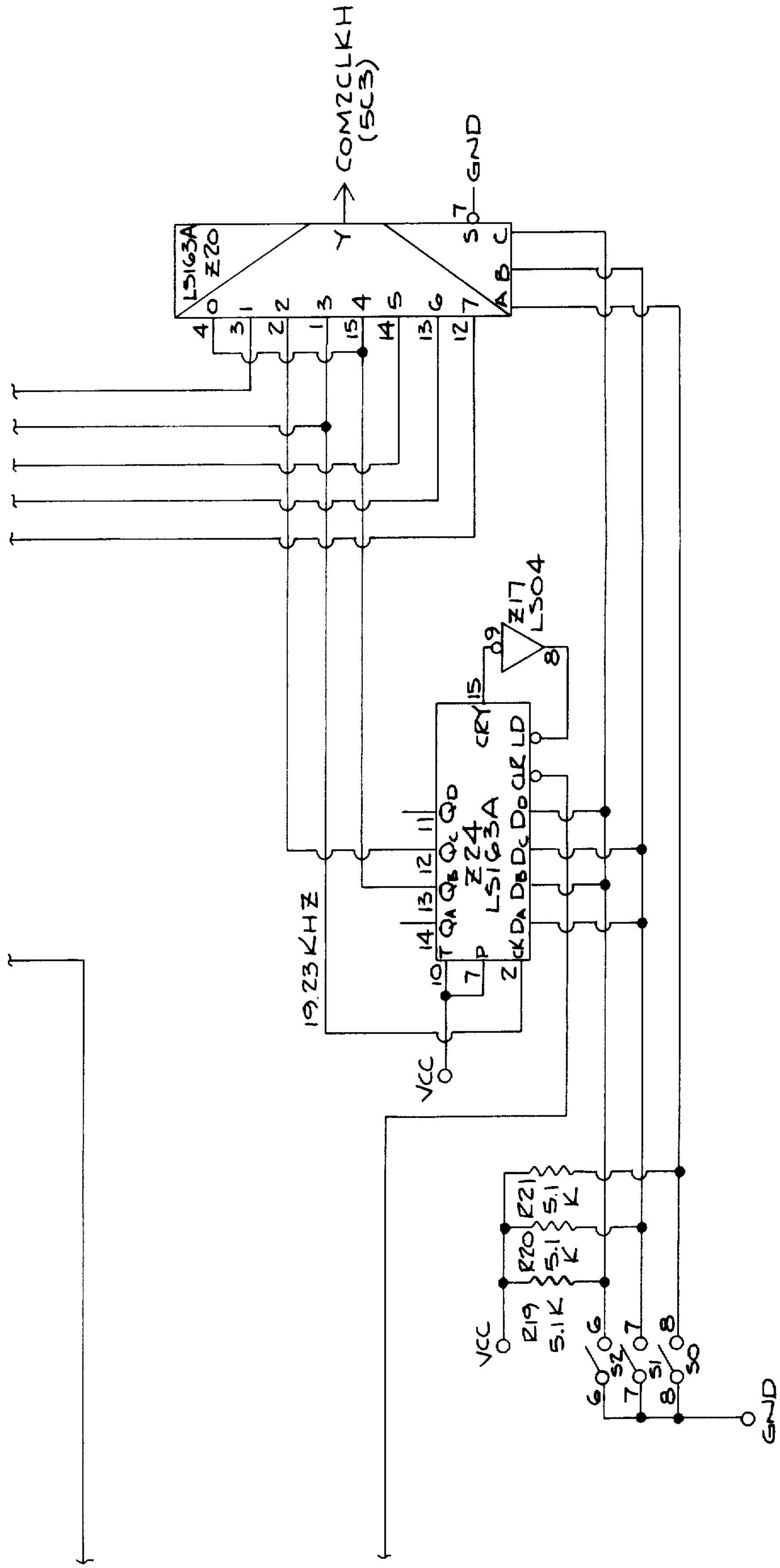
Figure 26E:
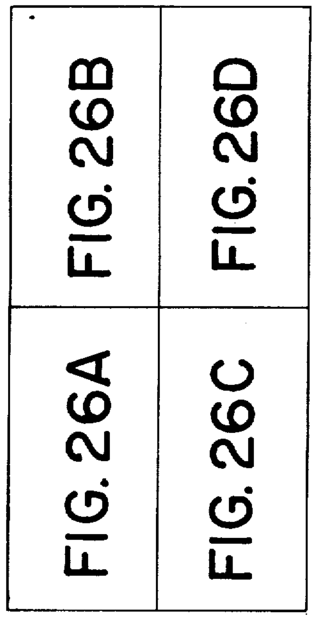
Figure 28E:
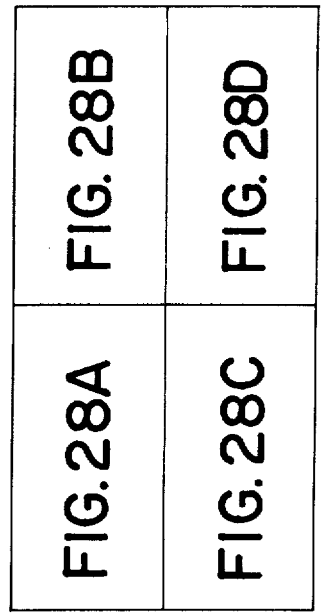
Figure 25E:
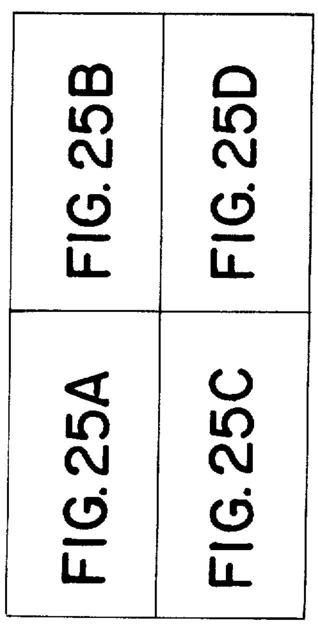
Figure 27E:
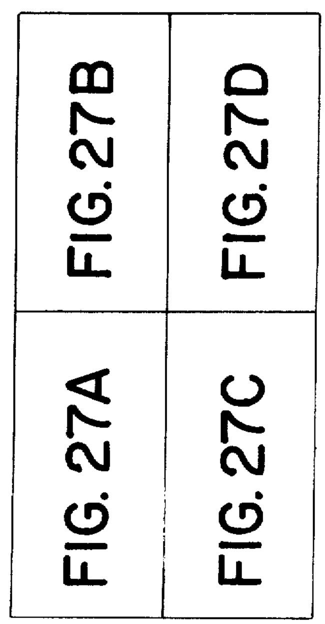
Figure 26A:
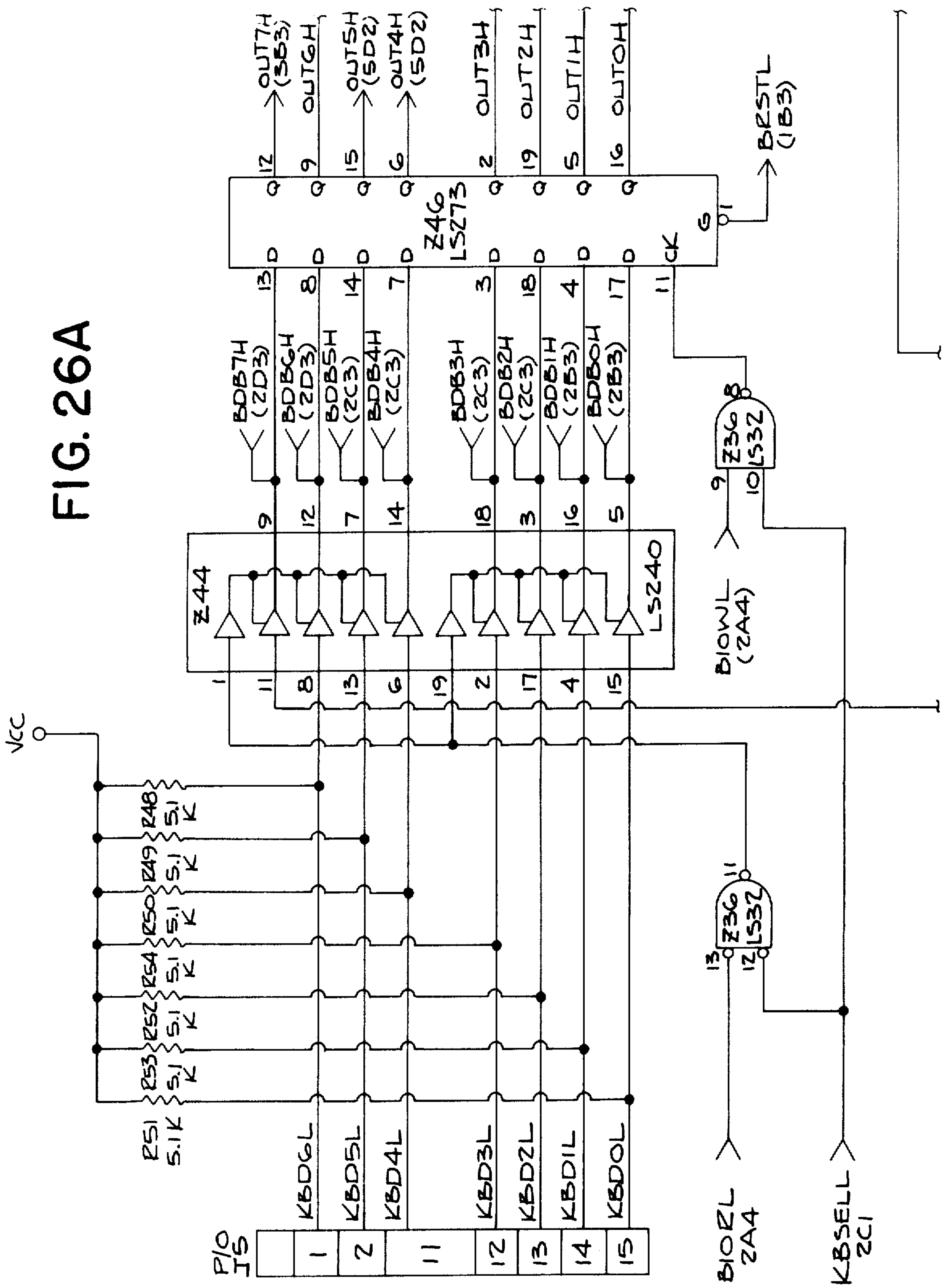
Figure 26B:
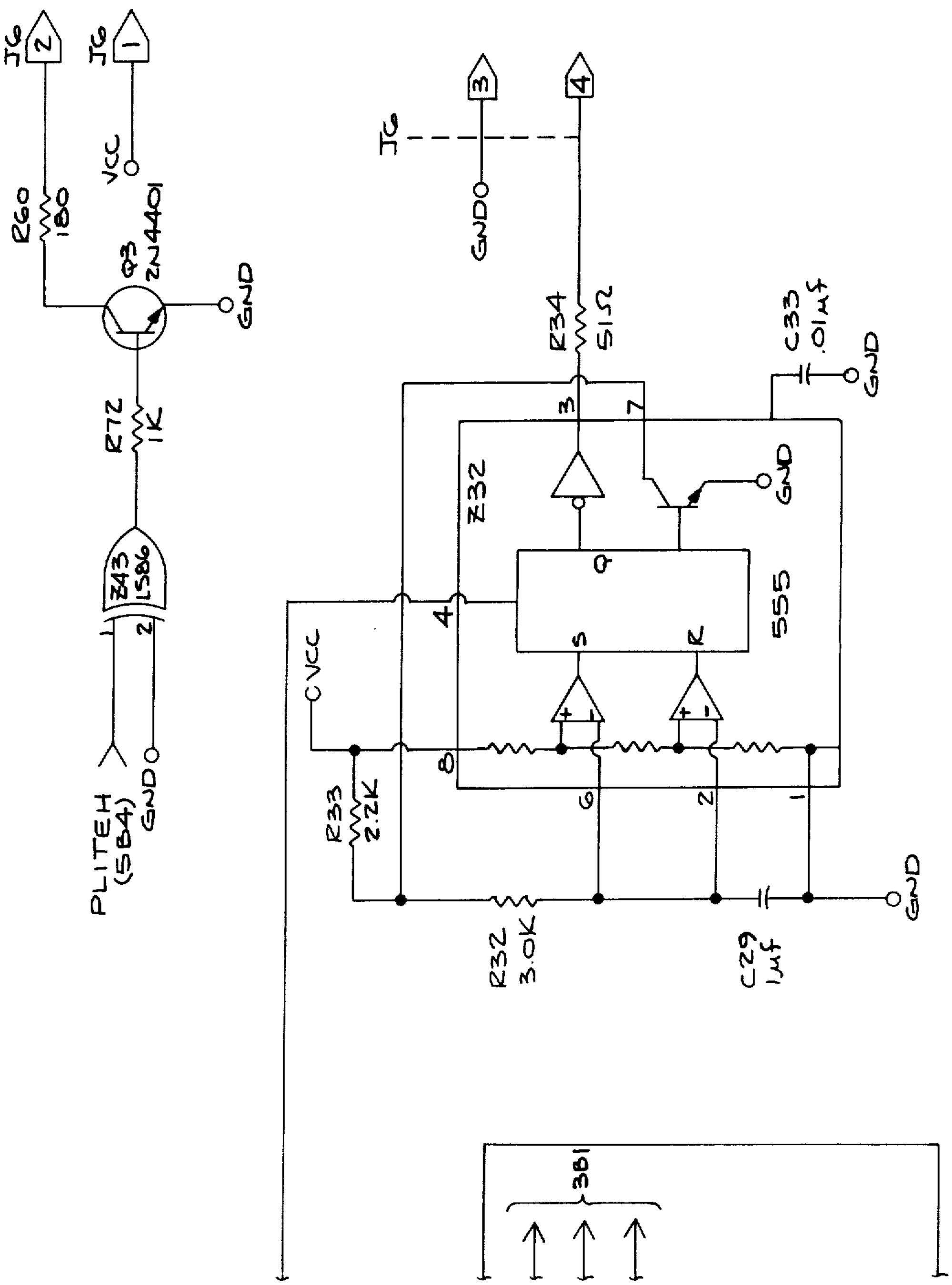
Figure 26C:
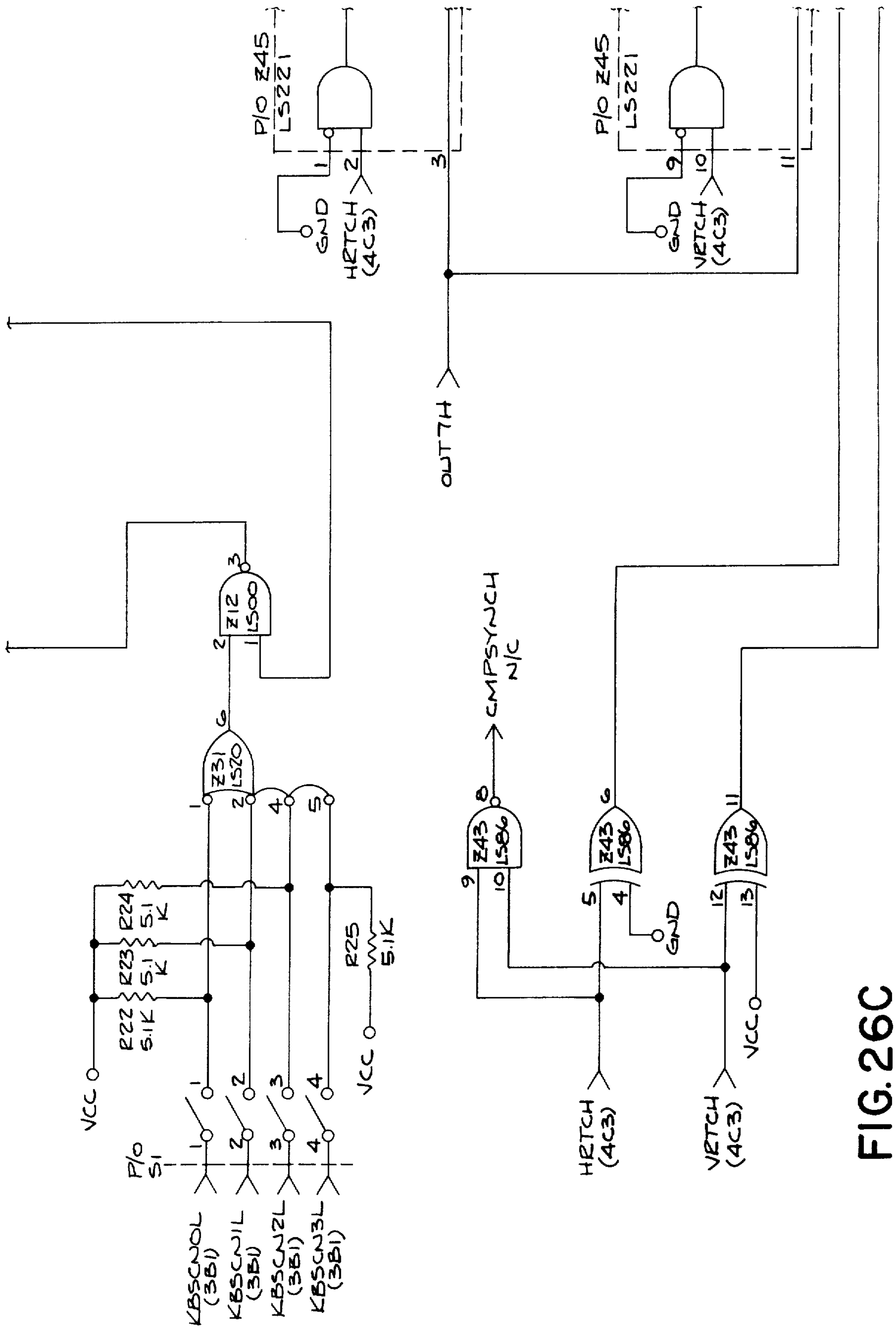
Figure 26D:
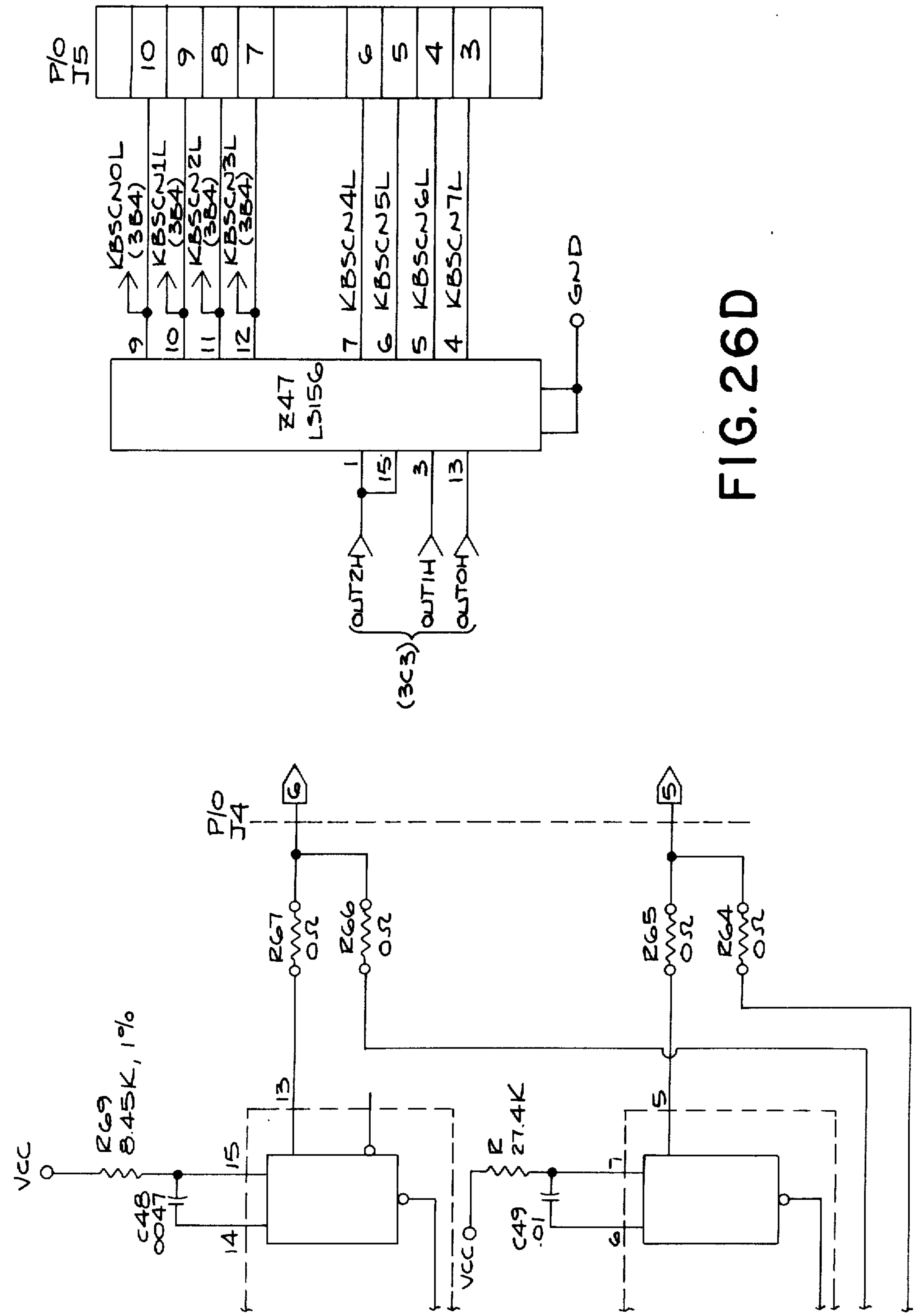
Figure 27A:
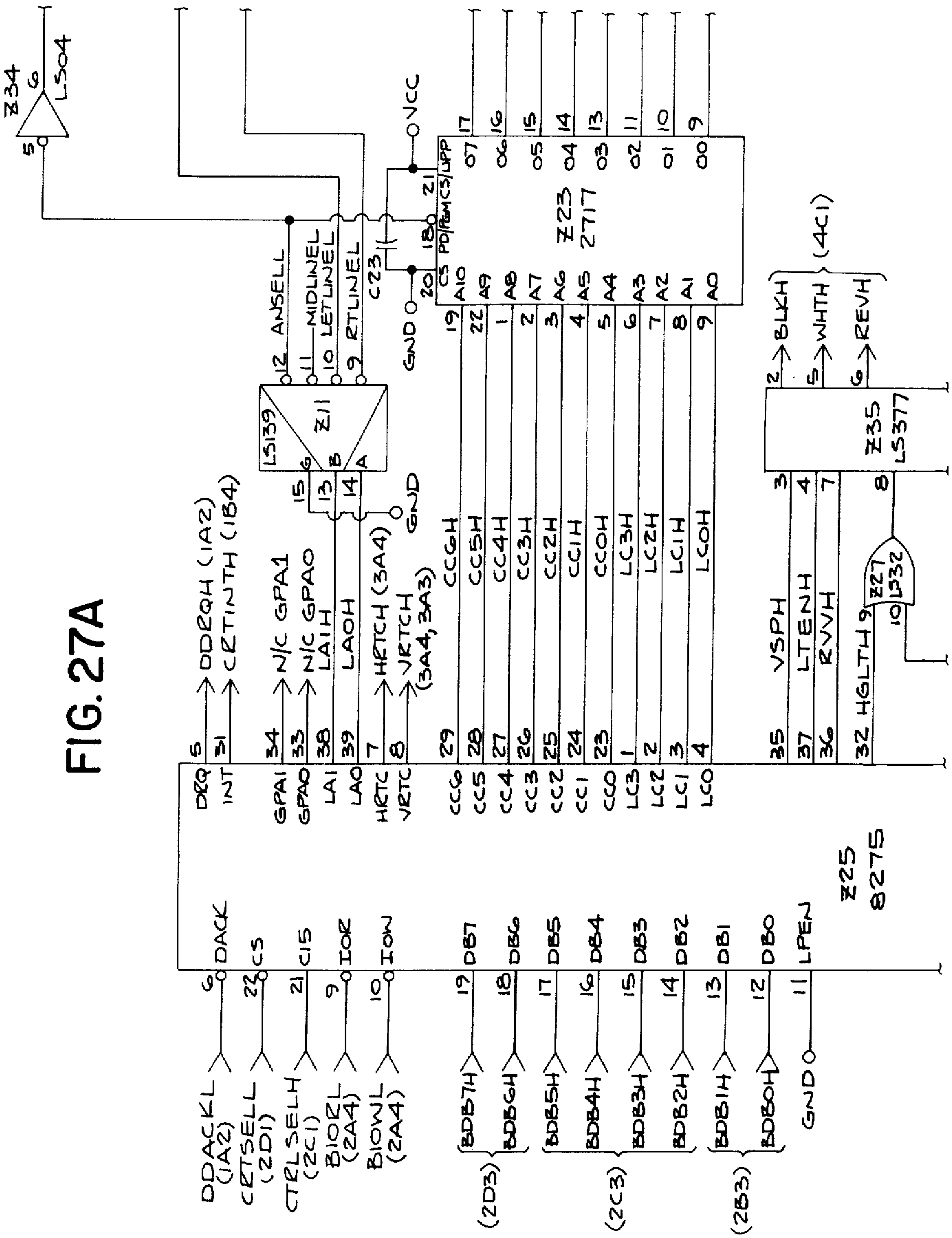
Figure 27B:
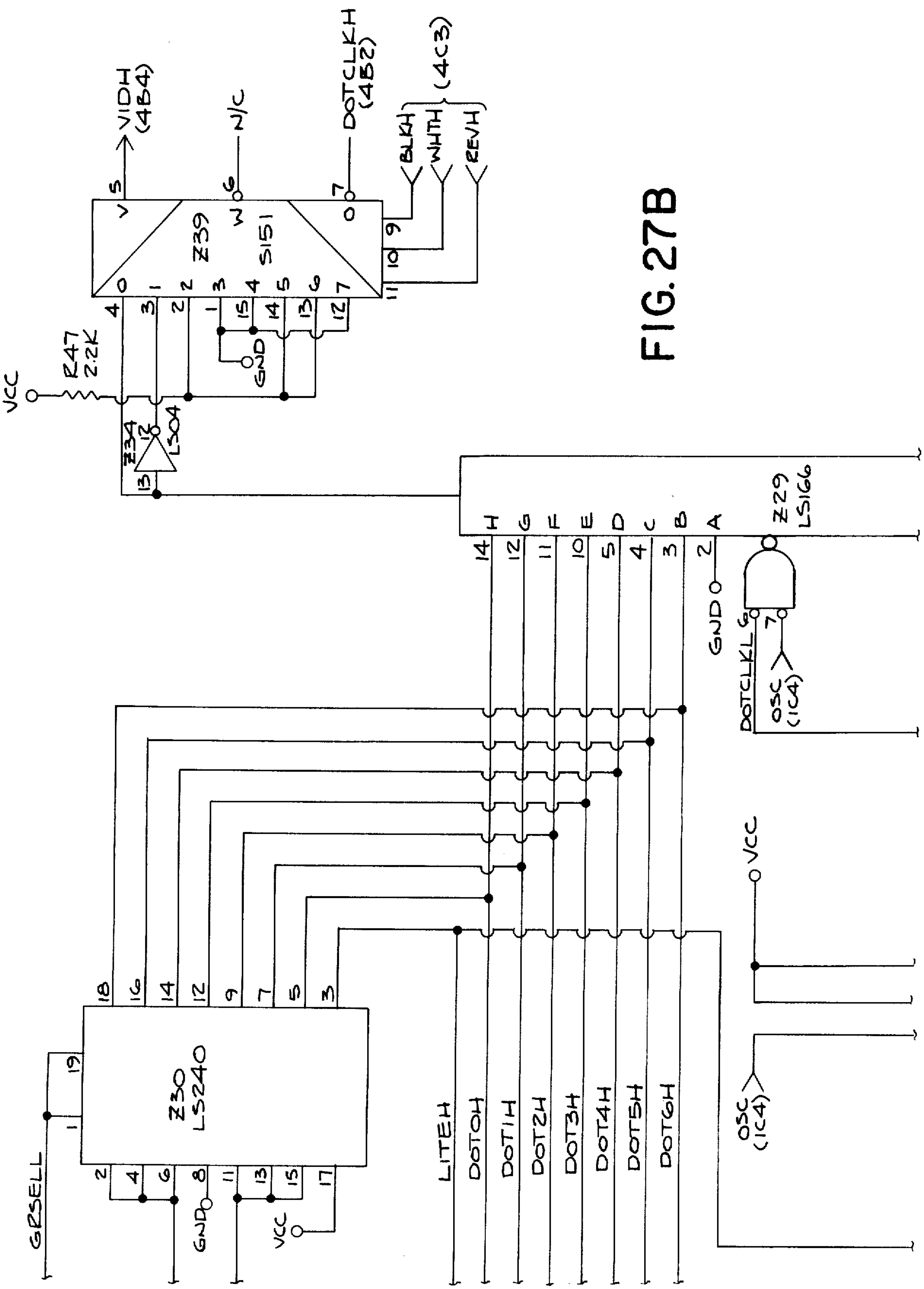
Figure 27C:
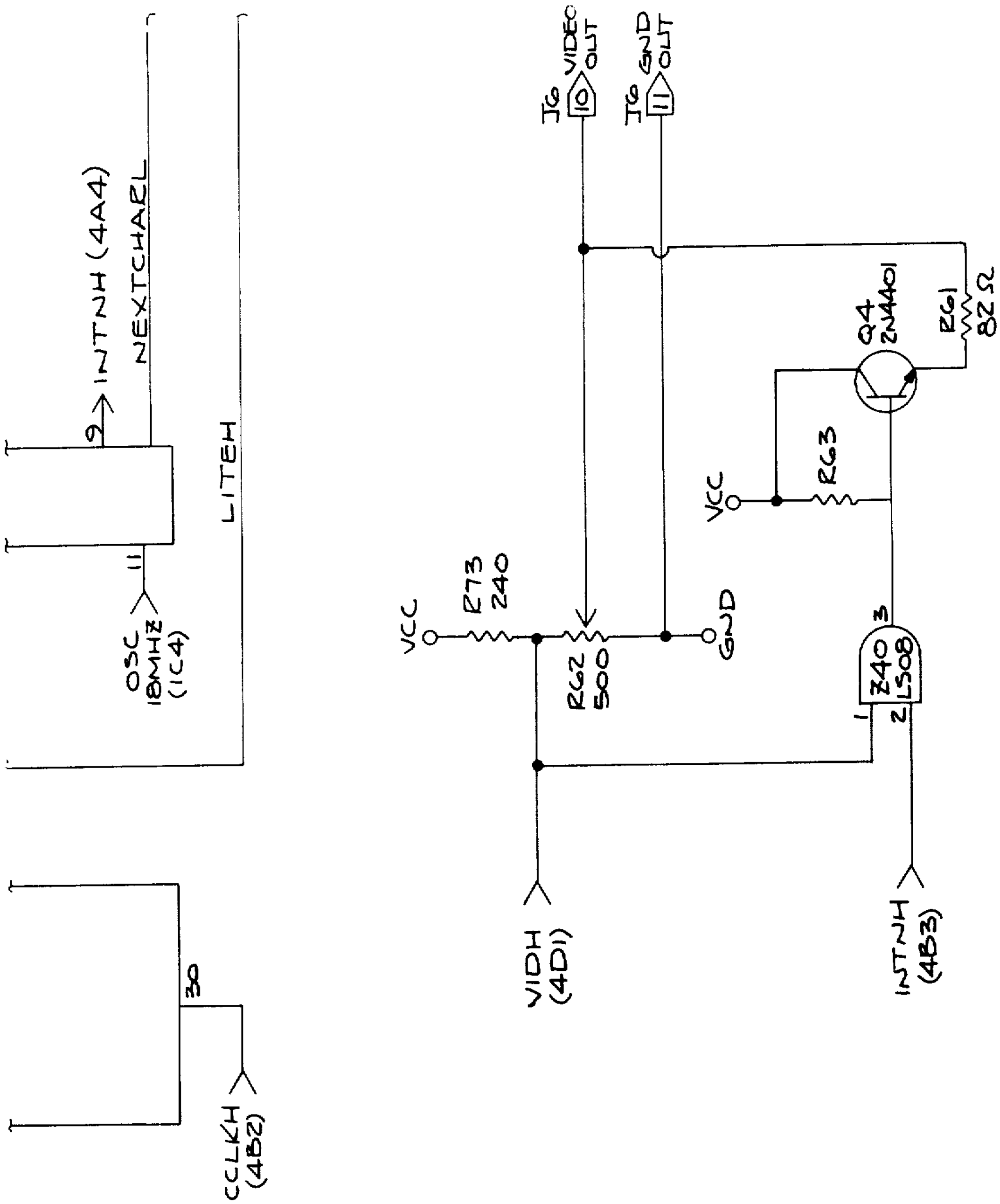
Figure 27D:
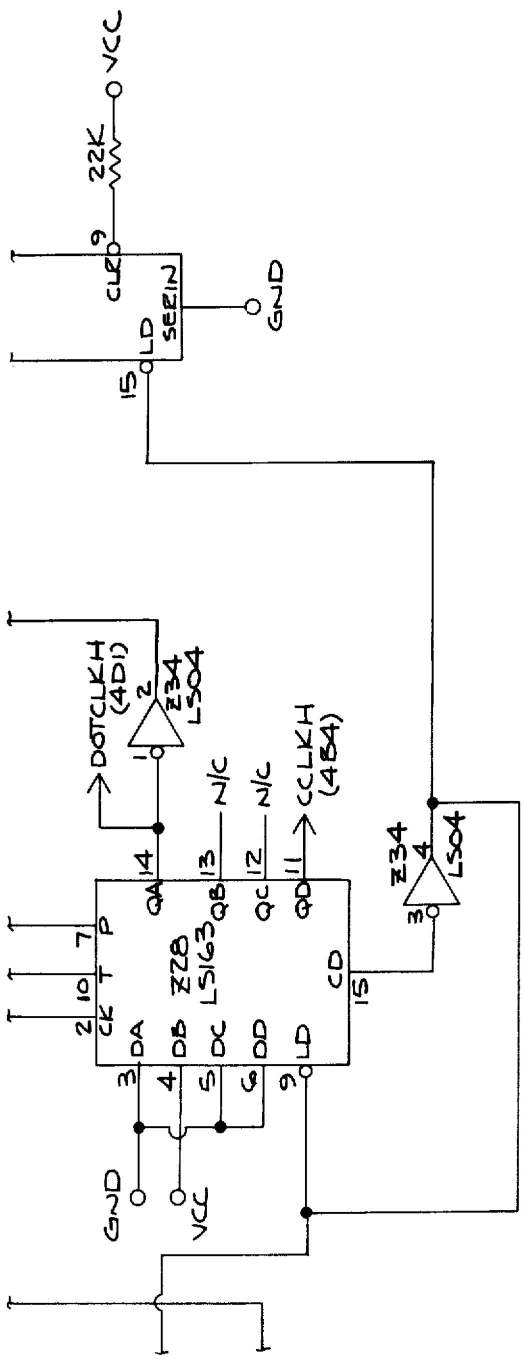
Figure 28A:
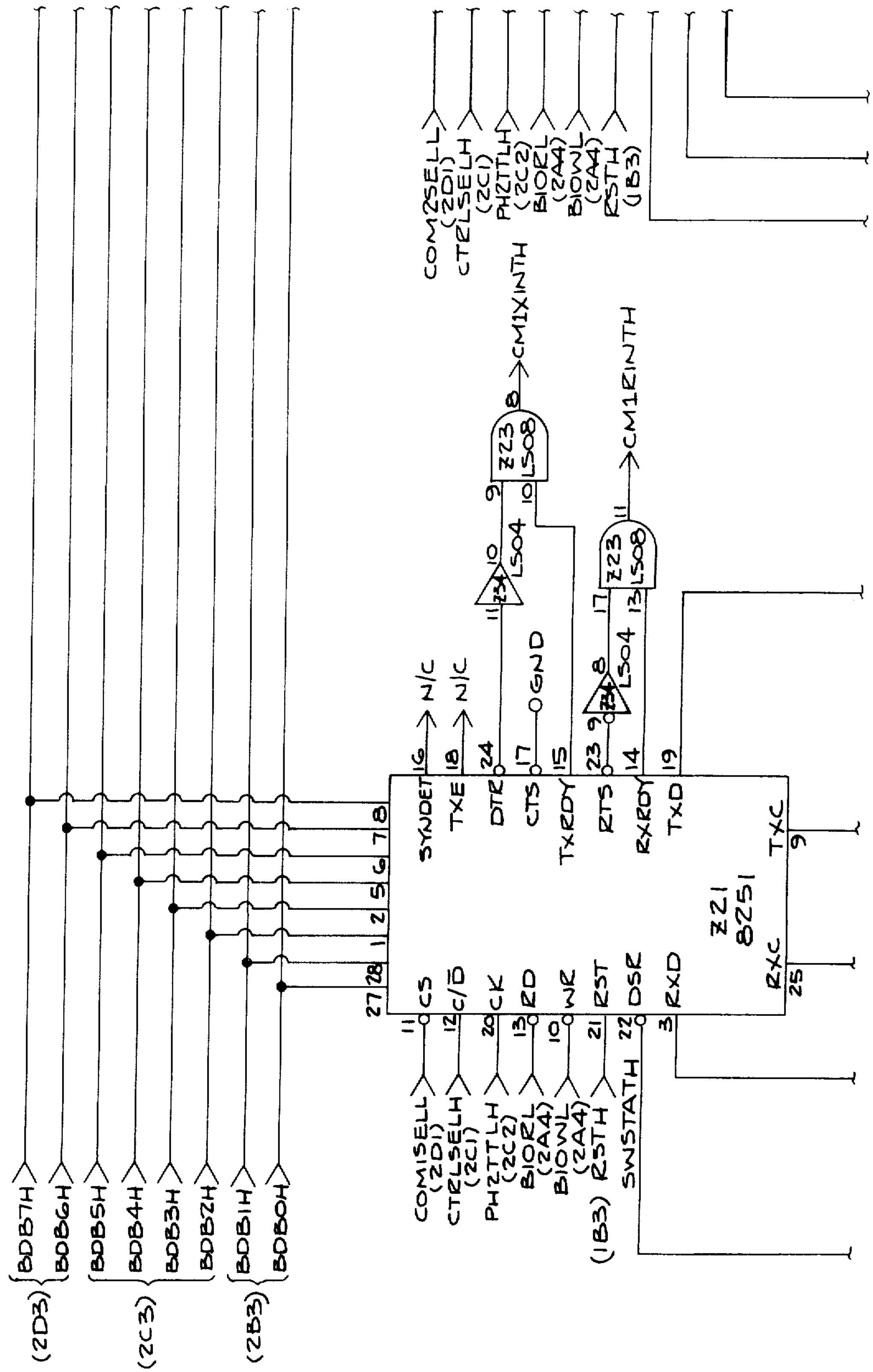
Figure 28B:
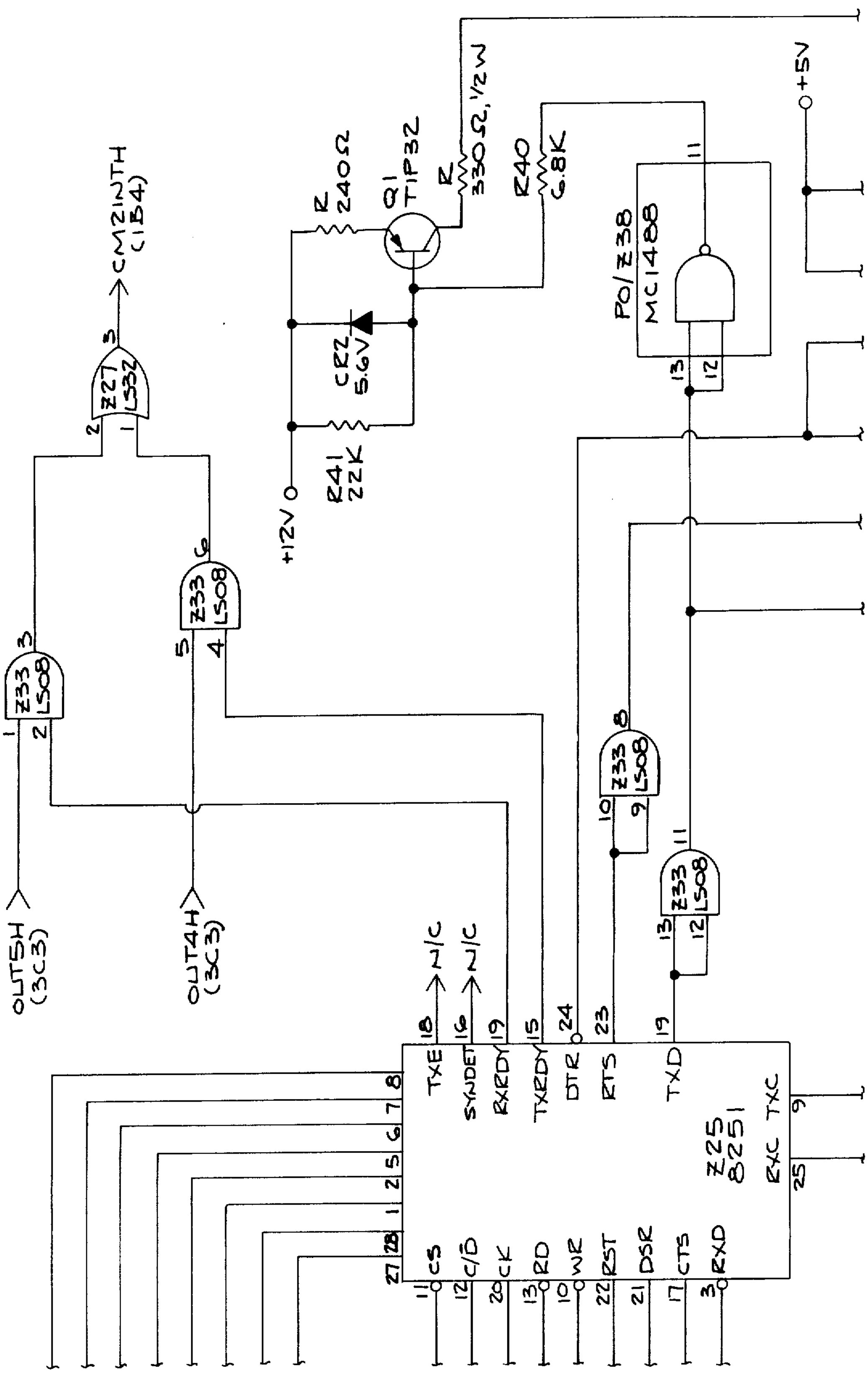
Figure 28C:
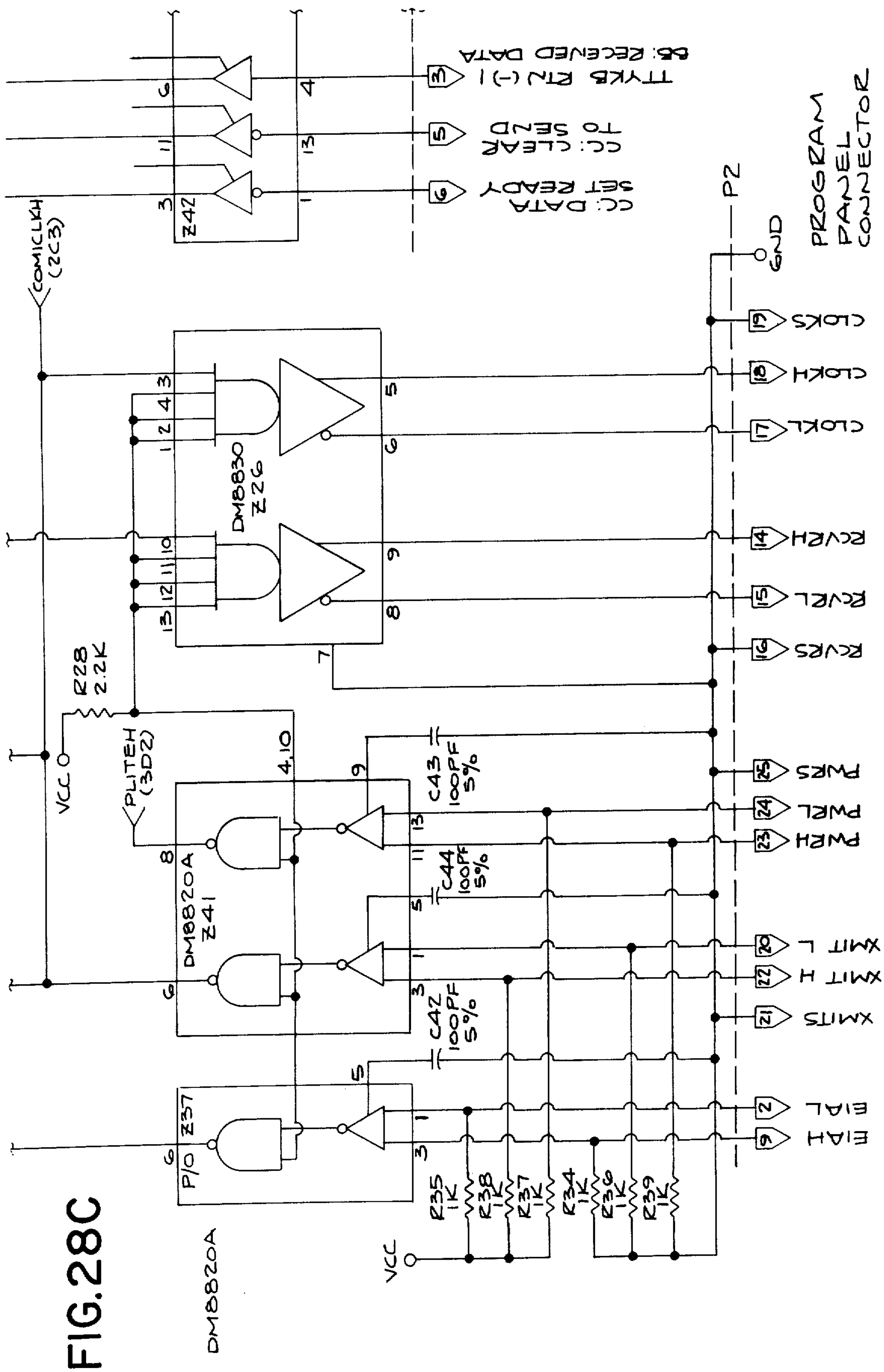
Figure 28D:
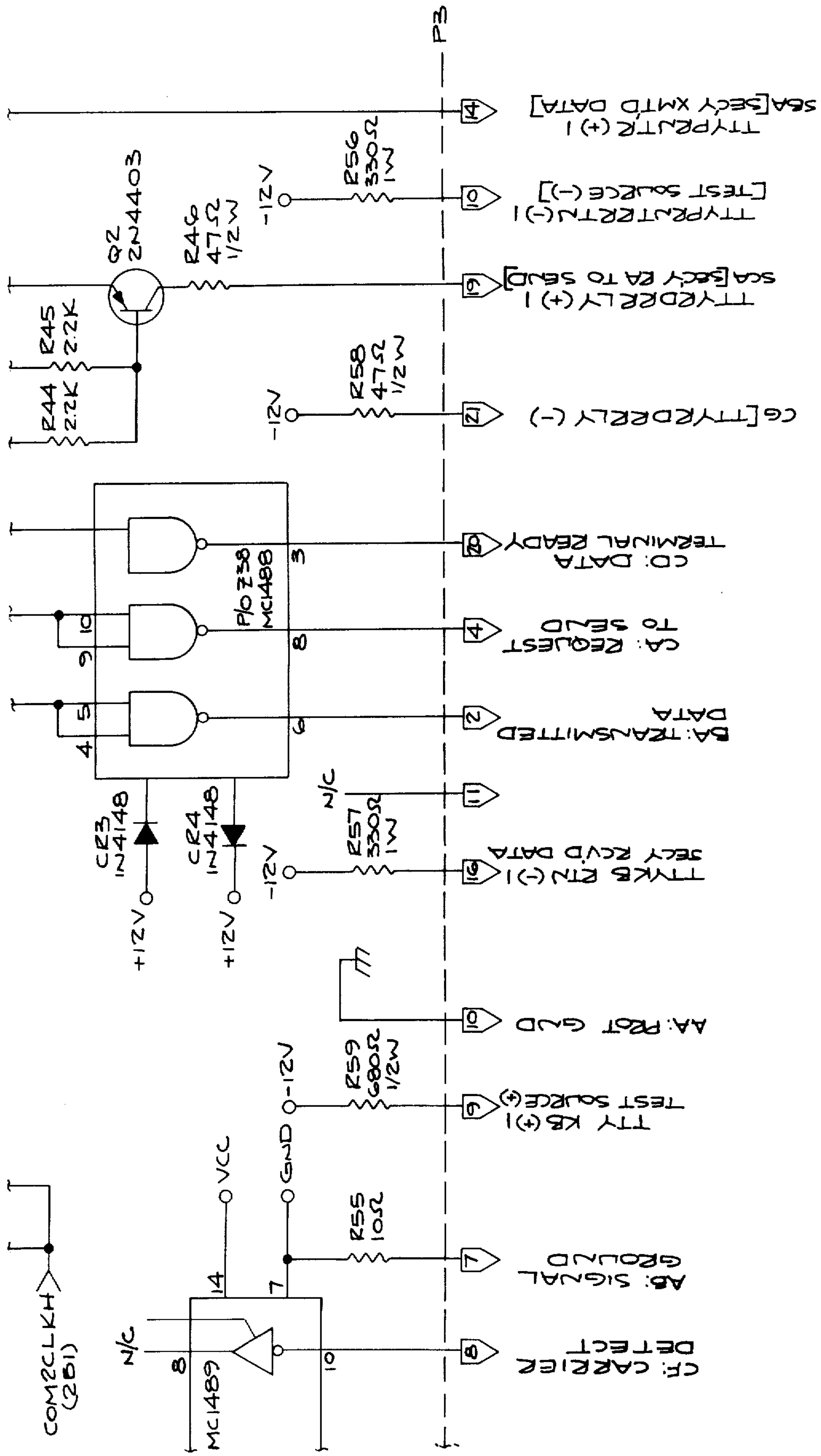

The programming panel 29 shown in FIG. 1 is presented in detail in FIGS. 24A-28D. As shown in FIG. 24A and 24C, it incorporates an Intel 8080A microprocessor Z1 and associated circuitry. The software controlling the microprocessor is set forth in Appendix B. The resultant programming panel in conjunction with the hardware and software of the mainframe allow the user to program, monitor and debug his or her control program. Furthermore, the programming panel in conjunction with the mainframe allows for the realtime display of a node as selected by the cursor control keys of the programming panel, the insertion of networks between two existing networks within the control program as well as allowing the user to assign the coil output state of any line within any network without being constrained by the line number of the line within the network. The programming panel in combination with the mainframe provides a real-time output on LED (see FIG. 1) for any node or CRT screen 36 as selected by cursor 47 (see FIGS. 2, 4, and 5). It also allows the user to perform specialized searches of the control program.

Thus what has been described is an improved, low cost programmable controller intended to replace from 8 to 256 hardwired relays used in typical industrial control applications.. This improved programmable controller allows the user to enter his or her control program via a programming panel having a CRT display and utilizing networks comprising up to seven rows by eleven columns of user selected elements. The solution order of the control program is performed in sequence by the network number associated with each of the user networks. In this manner, in situations where the solution order is important to the proper functioning of the control system, the user can have the programmable controller perform the solution of one network before another network. This capability is enhanced by the programmable controller, in conjunction with its programming panel, allowing the user to insert a network between two existing networks in the control program.

Furthermore, the programmable controller described in this application allows the user to designate the output coil associated with a user line without being constrained by the line number of the user line. This gives the user more freedom in generating the control program since the output coil numbers are not fixed by the line numbers of the control program. This, in conjunction with the capability of inserting networks between existing networks within the control program, further helps the user obtain a desired control system.

In addition, the programmable controller described in this application allows the networks of the user control programs to have vertical interconnection between adjacent lines in the network. Although such vertical connections have existed in prior art programmable controllers, the present invention overcomes a problem in the prior programmable controllers in having a column solver which eliminates most of the constraints on the user in setting up the network and also which greatly reduces the hardware and software requirements of the programmable controller to solve the network. The present programmable controller thus solves each user network on a column-by-column basis with one portion of the solution being the state of the element within the nodes within a particular column of the network and the next step being the determination of vertical power flow from any line to any adjacent line due to vertical interconnections.

Lastly, the programmable controller as described in this application has a CRT display which utilizes a cursor which when placed on any node of the user generated networks displays on an LED the real-time power status of that node. Furthermore, the programming panel in conjunction with the mainframe of the programmable controller allows the user to perform various search operations of the user program so as to facilitate monitoring and debugging of the user program.

The combination of these various features and improvements yields an advance in the state of the art of programmable controllers.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Appendix A includes a listing of mainframe software and Appendix B includes a listing of program panel software.

```
         PROG    MAIN                          MCAP 8X3 MOD 01 REV B

                 PROG    MAIN
                 LIST    S,C,F
*
***OBJECT FORMAT STATEMENT HERE (DEFAULT IS 'M' FORMAT).
*
*
*
*
*        COPYRIGHT, (C) 1978, GOULD CORP., MODICON DIV.,
*        ALL RIGHTS RESERVED. NO PART OF THIS PROGRAM MAY
*        BE REPRODUCED IN ANY FORM WITHOUT THE EXPRESS
*        WRITTEN PERMISSION OF MODICON CORPORATION.
*
*
*
*
*
*
*****************************************************************
*
*        A-4    [illegible]
*
*         1.  [illegible]  FIRST ASSEMBLY
*                          [illegible] - C[illegible]
*                          [illegible] - C[illegible]
*                          EXEC   - C[illegible]
*                          INTPT  - C[illegible]
*                          LOGIC  - ST[illegible]
*                          FL[illegible] - ST[illegible]
*                          C[illegible]  - ST[illegible]
*                          DI[illegible] - ST[illegible]
*                          SU[illegible] - C[illegible]
```

```
*
*     02.  10/07/77  REARRANGED PWRUP TO SAVE CODE CLEARING INPUT REGISTERS
*                    ADD ERROR HALT ON SCRATCHPAD DIAGNOSTIC FAILURE
*                    T. STOODLEY
*
*     03.  10/22/77  PWRUP - CODE
*                    PWRDN - CODE
*                    EXEC  - CODE
*                    INTRP - CODE
*                    LOGIC - CODE
*                    FLDIO - STUB
*                    CMDS  - STUB
*                    DIAGS - STUB
*                    SUBS  - CODE
*                    NEW CODE RAM CHECKSUM
*                    NEW LOGIC RAM CONFIGURATION
*                    T. STOODLEY
*
*     04.  11/03/77  PWRUP - CODE
*                    PWRDN - CODE
*                    EXEC  - CODE
*                    FLDIO - CODE
*                    LOGIC - CODE
*                    CMDS  - STUB
*                    DIAGS - STUB
*                    INTRP - CODE
*                    SUBR  - CODE
*
*                    ADDED FIELD I/O MODULE
*                    T. STOODLEY
*
*     05.  11/09/77  PWRUP - CODE
*                    PWRDN - CODE
*                    EXEC  - CODE
*                    FLDIO - CODE
*                    LOGIC - CODE
*                    CMDS  - STUB
*                    DIAGS - CODE
*                    INTRP - CODE
*                    SUBR  - CODE
*
*                    ADDED DIAGNOSTIC MODULE
*                    T. STOODLEY
*
*
*
*     06.  11/18/77  PWRUP - CODE
*                    PWRDN - CODE
*                    EXEC  - CODE
*                    FLDIO - CODE
*                    LOGIC - CODE
*                    CMDS  - STUB
*                    DIAGS - CODE
*                    INTRP - CODE
*                    SUBR  - CODE
*                    CHANGES TO LOGIC, GLOBAL AND INTRP
*                       GLOBAL- TO DEFINE NEW CONSTANTS FOR LOGIC
*                       LOGIC- TO CORRECT BUGS
*                       INTRP- TO CORRECT PAGING ERRORS IN 9021 USAGE
*
*                    J.VAN SCHALKWYK
*
*
*     07.  11/23/77  PWRUP - CODE
*                    PWRDN - CODE
*                    EXEC  - CODE
*                    FLDIO - CODE
*                    LOGIC - CODE
*                    CMDS  - STUB
*                    DIAGS - CODE
*                    INTRP - CODE
*                    SUBR  - CODE
*                    MORE CLEANUP ON INTRP FOR PAGING ERRORS
*                    JVS
*
*     08.  12/05/77  PWRUP - CODE
*                    PWRDN - CODE
*                    EXEC  - CODE
*                    FLDIO - CODE
*                    LOGIC - CODE
*                    CMDS  - CODE
*                    DIAGS - CODE
*                    INTRP - CODE
*                    SUBR  - CODE
*
*                    ADDED CMDS MODULE
*                    T. STOODLEY
*
*     09.  12/06/77  MODIFIED CMDS MODULE
*                    T. STOODLEY
*
*     10.  12/09/77  MODIFIED CMDS MODULE
*                    FIXES TO INTRP
```

```
*                         SOME NEW DEFINITIONS IN GLOB
*                         T. STOODLEY
*
*
*         11.   12/10/77  MODIFY LOGIC MODULE
*                         J.VAN SCHALKWYK
*
*         12.   12/13/77  NEW COMMAND HANDLER
*
*                         ADDITIONAL SUBROUTINES
*                         T. STOODLEY
*
*
*         13.   12/15/77  MODIFY LOGIC AND GLOBAL TO ALLOW
*                         CONDITIONAL ASSEMBLY OF ENHANCED INSTRUCTION SET.
*                         FLAG 'ENHANCE' IS SET TO '0' FOR BASIC SET,
*                         SET TO '1' FOR ENHANCED SET.
*                         J VAN SCHALKWYK
*
*
*         14.   12/19/77  MODIFY LOGIC TO HAVE SEQUENCER REFERENCES
*                         INCLUDED IN CONDITIONAL ASSEMBLY
*                         J. VAN SCHALKWYK
*
*         15.   12/27/77  ALLOW PROPER WAIT STATES FOR SCRATCHPAD WRITE
*                         CHANGES TO CMOS MODULE
*                         T. STOODLEY
*
*         16.   12/29/77  TIMING PROBLEMS WITH SCRATCHPAD ACCESS
*                         T. STOODLEY
*
*         17.   12/30/77  CLEAN-UP FOR DEMO
*                         T. STOODLEY
*
*         18.    1/18/78  CLEAN UP TIMER/COUNTER IN LOGIC MODULE
*                         J.VAN SCHALKWYK
*
*         19.    1/30/78  EDITS AND MORE EDITS
*                         ALL UPDATED FILES CHANGED TO '.1' EXTENSIONS
*                         T. STOODLEY
*
*         20.    1/31/77  ADDITIONAL EDITS
*                         GLOBAL, LOGIC, AND SUBROUTINE ARE AT .2 LEVEL
*                         -JVS-
*
*
*         21.   02/14/78  CHANGE SCRATCH PAD ALLOCATION,
*                         MULTIPLY AND DIVIDE AT DOUBLE PRECISION
*                         ALL CURRENT REVISION MODULES WILL BE AT '.0'
*                         EXTENTION LEVEL, OLDER REVS WILL GO TO '.1' , '.2' , ECT
*                         -JVS-
*
*
*         22.   02/23/78  CHANGE COMMAND HANDLER AND INTERRUPT HANDLER
*                         TO USE NEW PROTOCOL.
*                         -RAD-
*
*                         CHANGE VALIDATE NODE TO USE CONDITIONAL ASSEMBLY TO
*                         DISTINGUISH BASIC SET FROM ENHANCED SET.
*                         JVS
*
*
*         24.   03/22/78  DELETE NULLS ON POWER UP
*                         SLIGHT CHNAGE TO VALIDATE NODE
*                         -RAD-  -JVS-
*
*
**********************************************************************
***LOAD FLOW
*
*  MODULE NAME: GLOBAL
*
*  THIS MODULE SUPPLIES THE GLOBAL DEFINITIONS FOR THE 484 CONTROLLER
*
*
*  LEFT BANK/RIGHT BANK
*
  000020     LB        EQU    20H                 LEFT BANK
  000030     RB        EQU    30H                 RIGHT BANK
*
*   DEFINE BITS FOR EACH BANK
*
  000 0 1    LBBIT0    LIV    0,0,1               LEFT BANK - BIT 0
  000 1 1    LBBIT1    LIV    0,1,1               LEFT BANK - BIT 1
  000 2 1    LBBIT2    LIV    0,2,1               LEFT BANK - BIT 2
  000 3 1    LBBIT3    LIV    0,3,1               LEFT BANK - BIT 3
  000 4 1    LBBIT4    LIV    0,4,1               LEFT BANK - BIT 4
  000 5 1    LBBIT5    LIV    0,5,1               LEFT BANK - BIT 5
  000 6 1    LBBIT6    LIV    0,6,1               LEFT BANK - BIT 6
  000 7 1    LBBIT7    LIV    0,7,1               LEFT BANK - BIT 7
*
  000 0 1    RBBIT0    RIV    0,0,1               RIGHT BANK - BIT 0
  000 1 1    RBBIT1    RIV    0,1,1               RIGHT BANK - BIT 1
  000 2 1    RBBIT2    RIV    0,2,1               RIGHT BANK - BIT 2
  000 3 1    RBBIT3    RIV    0,3,1               RIGHT BANK - BIT 3
  000 4 1    RBBIT4    RIV    0,4,1               RIGHT BANK - BIT 4
```

```
 000 5 1     RBBIT5   RIV     0,5,1                RIGHT BANK - BIT 5
 000 6 1     RBBIT6   RIV     0,6,1                RIGHT BANK - BIT 6
 000 7 1     RBBIT7   RIV     0,7,1                RIGHT BANK - BIT 7
             *
             ***ENHANCED INSTRUCTION SET INDICATOR.
             *
  000001     ENHANCE  EQU     1
             *
             *   SET 'ENHANCE' TO '0' FOR BASIC INSTRUCTION SET.
             *   SET 'ENHANCE' TO '1' FOR ENHANCED SET.
             *   THIS IS USED IN CONDITIONAL ASSEMBLY STATEMENTS.
             *
             *
             *  STARTING ADDRESS OF MACHINE OPEN TEST (MOT)
             *
             *  THE MOT WILL START AT LOCATION 4001 (OCTAL).
             *  MCSIM WILL NOT ALLOW ILLEGAL REFERENCES.
             *  MOT WILL CAUSE A JMP * TO BE EXECUTED
             *
  004001     MOTTEST  EQU     4001H                START OF MOT
             *
             *  IVL REGISTER DEFINITION
             *
             *  OUTPUT CONTROL (BITS 3-0)
  000000     IVOCTRL  EQU     00000000B            CONTROL PULSES                   LEFT
  000000     IVOCRLO  EQU     00000000B            COIL ADDRESS LOW                 RIGHT
  000001     IVOCRHI  EQU     00000001B            COIL ADDRESS HIGH                LEFT
  000001     IVOSPD   EQU     00000001B            SCRATCHPAD OUTPUT DATA           RIGHT
  000002     IVOCRDAT EQU     00000010B            COIL WRITE DATA                  LEFT
  000003     IVOLRLO  EQU     00000011B            LOGIC ADDRESS LOW                LEFT
  000004     IVOLRHI  EQU     00000100B            LOGIC ADDRESS HIGH               LEFT
  000005     IVOIDATA EQU     00000101B            I/O INTERFACE DATA               LEFT
  000006     IVOIADDR EQU     00000110B            I/O INTERFACE ADDRESS            LEFT
  000007     IVOICTRL EQU     00000111B            I/O INTERFACE CONTROL            LEFT
  000010     IVOPPDAT EQU     00001000B            PERIPHERAL PORT OUTPUT DATA      LEFT
  000011     IVOLRDAT EQU     00001001B            LOGIC RAM WRITE DATA             LEFT
  000012     IVOCOL   EQU     00001010B            COLUMN SOLVER                    LEFT
             *        EQU     00001011B            NOT USED
             *        EQU     00001100B            NOT USED
             *        EQU     00001101B            NOT USED
             *        EQU     00001110B            NOT USED
             *
             ***INPUT CONTROL (BITS 6-4)
             *
  000000     IVICRDAT EQU     00000000B            COIL RAM READ DATA               LEFT
  000000     IVILRDAT EQU     00000000B            LOGIC RAM READ DATA              RIGHT
  000020     IVICOLIN EQU     00010000B            COLUMN SOLVER INPUT DATA         LEFT
  000020     IVISPD   EQU     00010000B            SCRATCHPAD INPUT DATA            RIGHT
  000040     IVISTAT  EQU     00100000B            STATUS SENSE REGISTER            LEFT
  000060     IVIINTRP EQU     00110000B            INTERRUPT SENSE REGISTER         LEFT
  000100     IVIIDATA EQU     01000000B            I/O INTERFACE INPUT DATA         LEFT
  000120     IVIPPDAT EQU     01010000B            PERIPHERAL PORT INPUT DATA       LEFT
             *        EQU     01100000B            NOT USED
             *        EQU     01110000B            NOT USED
             *
             ***BIT 7 NOT USED
             *
             *
             ***CONTROL REGISTER VALUES
             *
  000000     CTRLINCL EQU     00                   INCREMENT LOGIC RAM ADDRESS
  000001     CTRLINCC EQU     01                   INCREMENT COIL RAM ADDRESS
             *        EQU     02                   NOT USED
             *        EQU     03                   NOT USED
  000004     CTRLRCLR EQU     04                   CLEAR PERIPHERAL PORT RECEIVER READY
  000005     CTRLWDT  EQU     05                   PULSE WATCHDOG TIMER
  000006     CTRLRTC  EQU     06                   ACKNOWLEDGE REAL-TIME CLOCK
  000007     CTRLPROC EQU     07                   RESET PROCESSOR
             *
 000 0 3     CTRLREG  LIV     IVOCTRL,0,3          IVOCTRL IS A 3 BIT REGISTER AND CAN BE
             *                                     XMITTED TO
             *
             ***INTERRUPT SENSE REGISTER DEFINITIONS
             *
             ***MASK DEFINITIONS
             *
  000001     INTRPWFM EQU     00000001B            POWER-FAIL WARNING
  000002     INTRRTCM EQU     00000010B            REAL-TIME CLOCK
  000004     INTRRRYM EQU     00000100B            PERIPHERAL PORT RECEIVER READY
  000010     INTRTRYM EQU     00001000B            PERIPHERAL PORT TRANSMITTER READY
             *        EQU     00010000B            NOT USED
  000040     INTRIOBM EQU     00100000B            I/O BUSY
  000100     INTRMOTM EQU     01000000B            CPU TESTER (MOT) ATTACHED
  000200     INTRIOTM EQU     10000000B            I/O TESTER (IOT) ATTACHED
             *
             ***BIT DEFINITIONS
             *
 000 0 1     INTRPWFB LIV     0,0,1                POWER-FAIL WARNING
 000 1 1     INTRRTCB LIV     0,1,1                REAL-TIME CLOCK
 000 2 1     INTRRRYB LIV     0,2,1                PERIPHERAL PORT RECEIVER READY
 000 3 1     INTRTRYB LIV     0,3,1                PERIPHERAL PORT TRANSMITTER READY
             *        LIV     0,4,1                NOT USED
 000 5 1     INTRIOBB LIV     0,5,1                I/O BUSY
 000 6 1     INTRMOTB LIV     0,6,1                CPU TESTER (MOT) ATTACHED
 000 7 1     INTRIOTB LIV     0,7,1                I/O TESTER (IOT) ATTACHED
```

```
                *
                ***STATUS SENSE REGISTER DEFINITIONS
                *
                ***MASK DEFINITIONS
                *
000001          STATINSM EQU    0000000010      WORD INPUT - BIT 8
000002          STATINSM EQU    0000000100      WORD INPUT - BIT 9
000004          STATMEMM EQU    0000001000      MEMORY PROTECT ENABLED (1 => ENABLED)
000010          STATWDTM EQU    0000010000      WDT RUN                (1 => RUN)
000020          STATERRM EQU    0000100000      PARITY/FRAMING ERROR   (1 => ERROR)
000040          STATOVRM EQU    0001000000      NO OVERRUN ERROR       (0 => ERROR)
000100          STATEIAM EQU    0010000000      EIA STATUS             (1 => EIA)
                *        EQU    1000000000      NOT USED
                *
                ***BIT DEFINITIONS
                *
000 0 1         STATIN8B LIV    0,0,1           WORD INPUT - BIT 8
000 1 1         STATIN9B LIV    0,1,1           WORD INPUT - BIT 9
000 2 1         STATMEMB LIV    0,2,1           MEMORY PROTECT ENABLED (1 => ENABLED)
000 3 1         STATWDTB LIV    0,3,1           WDT RUN                (1 => RUN)
000 4 1         STATERRB LIV    0,4,1           PARITY/FRAMING ERROR   (1 => ERROR)
000 5 1         STATOVRB LIV    0,5,1           NO OVERRUN ERROR       (0 => ERROR)
000 6 1         STATEIAB LIV    0,6,1           EIA STATUS             (1 => EIA)
                *        LIV    0,7,1           NOT USED
                *
                ***I/O INTERFACE CONTROL REGISTER
                *
000001          IOCROUT8 EQU    0000000010      WORD OUTPUT - BIT 8
000002          IOCROUT9 EQU    0000000100      WORD OUTPUT - BIT 9
000004          IOCRDOUT EQU    0000001000      DISCRETE OUTPUT ENABLE
000010          IOCRDIN  EQU    0000010000      DISCRETE INPUT ENABLE
000020          IOCRWOUT EQU    0000100000      WORD OUTPUT ENABLE
000040          IOCRWIN  EQU    0001000000      WORD INPUT ENABLE
                *        EQU    0010000000      NOT USED
000200          IOCRLED  EQU    1000000000      PROGRAMMING PANEL LED DISPLAY CONTROL
                *

                *
                ***SCRATCHPAD ALLOCATION
                *
                *
                ***CALCULATE SPACE
                *
000000          CALCBHI  EQU    0               CALCULATE : B-VALUE HI / PRESET HI
000001          CALCBLO  EQU    CALCBHI+1       CALCULATE : B-VALUE LO / PRESET LO
000002          CALCCHI  EQU    CALCBLO+1       CALCULATE : C-VALUE HI
000003          CALCCLO  EQU    CALCCHI+1       CALCULATE : C-VALUE LO
000004          CALCDHI  EQU    CALCCLO+1       CALCULATE : D-VALUE HI
000005          CALCDLO  EQU    CALCDHI+1       CALCULATE : D-VALUE LO
000006          CALBADRH EQU    CALCDLO+1       CALCULATE : DIVIDEND NODE HI
000007          CALBADRL EQU    CALBADRH+1      CALCULATE : DIVIDEND NODE LO
000010          CALCNT   EQU    CALBADRL+1      CALCULATE : SCRATCH COUNTER AND MASK
000011          DIVDX1KH EQU    CALCNT+1        CALCULATE : PARTIAL HI DIVIDEND
000012          DIVDX1KM EQU    DIVDX1KH+1      CALCULATE : PARTIAL MIDDLE DIVIDEND
000013          DIVDX1KL EQU    DIVDX1KM+1      CALCULATE : PARTIAL LO DIVIDEND
000014          DIVDFLAG EQU    DIVDX1KL+1      DIVIDEND OK FLAG FOR VALIDATE NODE
                *
                ***SYSTEM TIMERS
                *
000015          MSTRCLK  EQU    DIVDFLAG+1      MASTER CLOCK
000016          TIMER001 EQU    MSTRCLK+1       TIMER ADDER - 0.01 SECS
000017          TIMER010 EQU    TIMER001+1      TIMER ADDER - 0.10 SECS
000020          TIMER100 EQU    TIMER010+1      TIMER ADDER - 1.00 SECS
000021          TMR010   EQU    TIMER100+1      COUNTER - 0.10 TICKS
000022          TMR100   EQU    TMR010+1        COUNTER - 1.00 TICKS
                *
                ***REGISTER SAVE SPACE
                *
000023          SAVER1   EQU    TMR100+1        SAVE LOCATION- R1
000024          SAVER2   EQU    SAVER1+1        SAVE LOCATION- R2
000025          SAVER3   EQU    SAVER2+1        SAVE LOCATION- R3
000026          SAVER4   EQU    SAVER3+1        SAVE LOCATION- R4
000027          SAVER5   EQU    SAVER4+1        SAVE LOCATION- R5
000030          SAVER6   EQU    SAVER5+1        SAVE LOCATION - R6
000031          SAVER11  EQU    SAVER6+1        SAVE LOCATION - R11
000032          SAVERET  EQU    SAVER11+1       SAVE LOCATION - LINKAGE
000033          SAVSTATE EQU    SAVERET+1       SAVE STATE - USED BY CMDS
                *
                ***DIAGNOSTIC ALLOCATION
                *
000034          DIAGSHI  EQU    SAVSTATE+1      ADDRESS HI
000035          DIAGSLO  EQU    DIAGSHI+1       ADDRESS LO
000036          DIAGCHK  EQU    DIAGSLO+1       CHECKSUM
000037          DIAGCTR  EQU    DIAGCHK+1       LOOP COUNTER
                *
                ***POWER DATA
                *
000040          POWERHI  EQU    DIAGCTR+1       NETWORK NUMBER FOR POWER HI
000041          POWERLO  EQU    POWERHI+1       NETWORK NUMBER FOR POWER LO
000042          NETWORKH EQU    POWERLO+1       CURRENT NETWORK NUMBER HI
000043          NETWORKL EQU    NETWORKH+1      CURRENT NETWORK NUMBER LO
000044          POWER    EQU    NETWORKL+1      POWER FLAG FOR CURRENT NETWORK
000045          POWER1   EQU    POWER+1         POWER OUTPUT - COLUMN 1
000046          POWER2   EQU    POWER1+1        POWER OUTPUT - COLUMN 2
000047          POWER3   EQU    POWER2+1        POWER OUTPUT - COLUMN 3
000050          POWER4   EQU    POWER3+1        POWER OUTPUT - COLUMN 4
000051          POWER5   EQU    POWER4+1        POWER OUTPUT - COLUMN 5
000052          POWER6   EQU    POWER5+1        POWER OUTPUT - COLUMN 6
```

```
000053   POWER7    EQU   POWER6+1            POWER OUTPUT - COLUMN 7
000054   POWER8    EQU   POWER7+1            POWER OUTPUT - COLUMN 8
000055   POWER9    EQU   POWER8+1            POWER OUTPUT - COLUMN 9
000056   POWER10   EQU   POWER9+1            POWER OUTPUT - COLUMN 10
000057   POWER11   EQU   POWER10+1           POWER OUTPUT - COLUMN 11
000060   POWERPTR  EQU   POWER11+1           POINTER TO POWER ARRAY
         *
         ***I/O DATA
         *
000061   FRSTPASS  EQU   POWERPTR+1          FLAG - FIRST I/O PASS
000062   LEDSTATE  EQU   FRSTPASS+1          LED OUTPUT STATE
000063   LEDLOC    EQU   LEDSTATE+1          LED COORDINATES (ROW/COL)
000064   COILADDR  EQU   LEDLOC+1            CURRENT COIL ADDR
         *
         ***MISCELLANEOUS
         *
000065   EOLHI     EQU   COILADDR+1          END OF LOGIC ADDRESS HI
000066   EOLLO     EQU   EOLHI+1             END OF LOGIC ADDRESS LO
000067   CNTRPWR   EQU   EOLLO+1             COUNTER POWER
000070   REG4000H  EQU   CNTRPWR+1           DUMMY REGISTER HI
000071   REG4000L  EQU   REG4000H+1          DUMMY REGISTER LO
         *
         ***COMMUNICATIONS SPACE
         *
000072   CMDCOUNT  EQU   REG4000L+1          COMMAND COUNT
000073   MSGCHECK  EQU   CMDCOUNT+1          MESSAGE CHECKSUM
000074   MSGCOUNT  EQU   MSGCHECK+1          MESSAGE BYTE COUNT
         *
000075   RCVRBLK   EQU   MSGCOUNT+1          RECEIVER BLOCK
         *
000075   RCVRBASE  EQU   RCVRBLK              BUFFER BASE
000076   RCVRIPTR  EQU   RCVRBASE+1          INPUT POINTER
000077   RCVROPTR  EQU   RCVRIPTR+1          OUTPUT POINTER
000100   RBUFFLEN  EQU   RCVROPTR+1          BUFFER LENGTH
000101   RCVRCNT   EQU   RBUFFLEN+1          BYTE COUNT
000102   RCVRSTAT  EQU   RCVRCNT+1           STATUS
000103   RCVRLEN   EQU   RCVRSTAT+1          LENGTH LEFT
         *
000104   XMITBLK   EQU   RCVRLEN+1         TRANSMITTER BLOCK
         *
000104   XMITBASE  EQU   XMITBLK             BUFFER BASE
000105   XMITIPTR  EQU   XMITBASE+1          INPUT POINTER
000106   XMITOPTR  EQU   XMITIPTR+1          OUTPUT POINTER
000107   XBUFFLEN  EQU   XMITOPTR+1          BUFFER LENGTH
000110   XMITCNT   EQU   XBUFFLEN+1          BYTE COUNT
000111   XMITSTAT  EQU   XMITCNT+1           STATUS
         *
000050   RCVRBLEN  EQU   40                  RECEIVER BUFFER LENGTH
000050   XMITBLEN  EQU   40                  TRANSMITTER BUFFER LENGTH
         *
000112   RCVRBUFF  EQU   XMITSTAT+1        RECEIVER BUFFER
         *
000162   XMITBUFF  EQU   RCVRBUFF+RCVRBLEN TRANSMIT BUFFER
         *
000232   CMD01     EQU   XMITBUFF+XMITBLEN CURRENT COMMAND - BYTE 1
000233   CMD02     EQU   CMD01+1             CURRENT COMMAND - BYTE 2
000234   CMD03     EQU   CMD02+1             CURRENT COMMAND - BYTE 3
000235   CMD04     EQU   CMD03+1             CURRENT COMMAND - BYTE 4
000236   CMD05     EQU   CMD04+1             CURRENT COMMAND - BYTE 5
000237   CMD06     EQU   CMD05+1             CURRENT COMMAND - BYTE 6
000240   CMD07     EQU   CMD06+1             CURRENT COMMAND - BYTE 7
000241   CMD08     EQU   CMD07+1             CURRENT COMMAND - BYTE 8
000242   CMD09     EQU   CMD08+1             CURRENT COMMAND - BYTE 9
000243   CMD10     EQU   CMD09+1             CURRENT COMMAND - BYTE 10
000244   CMD11     EQU   CMD10+1             CURRENT COMMAND - BYTE 11
000245   CMD12     EQU   CMD11+1             CURRENT COMMAND - BYTE 12
000246   CMD13     EQU   CMD12+1             CURRENT COMMAND - BYTE 13
000247   CMD14     EQU   CMD13+1             CURRENT COMMAND - BYTE 14
000250   CMD15     EQU   CMD14+1             CURRENT COMMAND - BYTE 15
000251   CMD16     EQU   CMD15+1             CURRENT COMMAND - BYTE 16
000252   CMD17     EQU   CMD16+1             CURRENT COMMAND - BYTE 17
000253   CMD18     EQU   CMD17+1             CURRENT COMMAND - BYTE 18
000254   CMD19     EQU   CMD18+1             CURRENT COMMAND - BYTE 19
000255   CMD20     EQU   CMD19+1             CURRENT COMMAND - BYTE 20
000256   CMD21     EQU   CMD20+1             CURRENT COMMAND - BYTE 21
000257   CMD22     EQU   CMD21+1             CURRENT COMMAND - BYTE 22
000260   CMD23     EQU   CMD22+1             CURRENT COMMAND - BYTE 23
000261   CMD24     EQU   CMD23+1             CURRENT COMMAND - BYTE 24
000262   CMDCONT   EQU   CMD24+1             COMMAND CONTINUATION BYTE
000263   NOWPAGE   EQU   CMDCONT+1           INSERT AND DELETE FUNCTION PAGE POINTER
000264   INPAGE    EQU   NOWPAGE+1           INSERT PAGE #
000265   INNUM     EQU   INPAGE+1            INSERT AND DELETE FUNCTION PARAMETER
000265   DLNUM     EQU   INNUM               ***MUST BE EQU INNUM***
000263   SADDRHI   EQU   NOWPAGE             SEARCH ADDRESS
000264   SADDRLO   EQU   INPAGE              SEARCH ADDRESS
         *
         ***SYSTEM CONFIGURATION
         *
000275   SYSSTATE  EQU   189                 CURRENT SYSTEM STATE
000276   SPDCONF1  EQU   SYSSTATE+1          CONFIGURATION BYTE 1
000277   SPDCONF2  EQU   SPDCONF1+1          CONFIGURATION BYTE 2
         *
         *  INPUT REGISTER SPACE
         *
```

```
000300   REG3001H EQU   192           INPUT REGISTER - 3001 HIGH
000301   REG3001L EQU   REG3001H+1    INPUT REGISTER - 3001 LOW
000302   REG3002H EQU   REG3001L+1    INPUT REGISTER - 3002 HIGH
000303   REG3002L EQU   REG3002H+1    INPUT REGISTER - 3002 LOW
000304   REG3003H EQU   REG3002L+1    INPUT REGISTER - 3003 HIGH
000305   REG3003L EQU   REG3003H+1    INPUT REGISTER - 3003 LOW
000306   REG3004H EQU   REG3003L+1    INPUT REGISTER - 3004 HIGH
000307   REG3004L EQU   REG3004H+1    INPUT REGISTER - 3004 LOW
000310   REG3005H EQU   REG3004L+1    INPUT REGISTER - 3005 HIGH
000311   REG3005L EQU   REG3005H+1    INPUT REGISTER - 3005 LOW
000312   REG3006H EQU   REG3005L+1    INPUT REGISTER - 3006 HIGH
000313   REG3006L EQU   REG3006H+1    INPUT REGISTER - 3006 LOW
000314   REG3007H EQU   REG3006L+1    INPUT REGISTER - 3007 HIGH
000315   REG3007L EQU   REG3007H+1    INPUT REGISTER - 3007 LOW
000316   REG3008H EQU   REG3007L+1    INPUT REGISTER - 3008 HIGH
000317   REG3008L EQU   REG3008H+1    INPUT REGISTER - 3008 LOW
000320   REG3009H EQU   REG3008L+1    INPUT REGISTER - 3009 HIGH
000321   REG3009L EQU   REG3009H+1    INPUT REGISTER - 3009 LOW
000322   REG3010H EQU   REG3009L+1    INPUT REGISTER - 3010 HIGH
000323   REG3010L EQU   REG3010H+1    INPUT REGISTER - 3010 LOW
000324   REG3011H EQU   REG3010L+1    INPUT REGISTER - 3011 HIGH
000325   REG3011L EQU   REG3011H+1    INPUT REGISTER - 3011 LOW
000326   REG3012H EQU   REG3011L+1    INPUT REGISTER - 3012 HIGH
000327   REG3012L EQU   REG3012H+1    INPUT REGISTER - 3012 LOW
000330   REG3013H EQU   REG3012L+1    INPUT REGISTER - 3013 HIGH
000331   REG3013L EQU   REG3013H+1    INPUT REGISTER - 3013 LOW
000332   REG3014H EQU   REG3013L+1    INPUT REGISTER - 3014 HIGH
000333   REG3014L EQU   REG3014H+1    INPUT REGISTER - 3014 LOW
000334   REG3015H EQU   REG3014L+1    INPUT REGISTER - 3015 HIGH
000335   REG3015L EQU   REG3015H+1    INPUT REGISTER - 3015 LOW
000336   REG3016H EQU   REG3015L+1    INPUT REGISTER - 3016 HIGH
000337   REG3016L EQU   REG3016H+1    INPUT REGISTER - 3016 LOW
000340   REG3017H EQU   REG3016L+1    INPUT REGISTER - 3017 HIGH
000341   REG3017L EQU   REG3017H+1    INPUT REGISTER - 3017 LOW
000342   REG3018H EQU   REG3017L+1    INPUT REGISTER - 3018 HIGH
000343   REG3018L EQU   REG3018H+1    INPUT REGISTER - 3018 LOW
000344   REG3019H EQU   REG3018L+1    INPUT REGISTER - 3019 HIGH
000345   REG3019L EQU   REG3019H+1    INPUT REGISTER - 3019 LOW
000346   REG3020H EQU   REG3019L+1    INPUT REGISTER - 3020 HIGH
000347   REG3020L EQU   REG3020H+1    INPUT REGISTER - 3020 LOW
000350   REG3021H EQU   REG3020L+1    INPUT REGISTER -3021 HIGH
000351   REG3021L EQU   REG3021H+1    INPUT REGISTER - 3021 LOW
000352   REG3022H EQU   REG3021L+1    INPUT REGISTER - 3022 HIGH
000353   REG3022L EQU   REG3022H+1    INPUT REGISTER - 3022 LOW
000354   REG3023H EQU   REG3022L+1    INPUT REGISTER - 3023 HIGH
000355   REG3023L EQU   REG3023H+1    INPUT REGISTER - 3023 LOW
000356   REG3024H EQU   REG3023L+1    INPUT REGISTER - 3024 HIGH
000357   REG3024L EQU   REG3024H+1    INPUT REGISTER - 3024 LOW
000360   REG3025H EQU   REG3024L+1    INPUT REGISTER - 3025 HIGH
000361   REG3025L EQU   REG3025H+1    INPUT REGISTER - 3025 LOW
000362   REG3026H EQU   REG3025L+1    INPUT REGISTER - 3026 HIGH
000363   REG3026L EQU   REG3026H+1    INPUT REGISTER - 3026 LOW
000364   REG3027H EQU   REG3026L+1    INPUT REGISTER - 3027 HIGH
000365   REG3027L EQU   REG3027H+1    INPUT REGISTER - 3027 LOW
000366   REG3028H EQU   REG3027L+1    INPUT REGISTER - 3028 HIGH
000367   REG3028L EQU   REG3028H+1    INPUT REGISTER - 3028 LOW
000370   REG3029H EQU   REG3028L+1    INPUT REGISTER - 3029 HIGH
000371   REG3029L EQU   REG3029H+1    INPUT REGISTER - 3029 LOW
000372   REG3030H EQU   REG3029L+1    INPUT REGISTER - 3030 HIGH
000373   REG3030L EQU   REG3030H+1    INPUT REGISTER - 3030 LOW
000374   REG3031H EQU   REG3030L+1    INPUT REGISTER - 3031 HIGH
000375   REG3031L EQU   REG3031H+1    INPUT REGISTER - 3031 LOW
000376   REG3032H EQU   REG3031L+1    INPUT REGISTER - 3032 HIGH
000377   REG3032L EQU   REG3032H+1    INPUT REGISTER - 3032 LOW
                  *
                  *   COMPUTE AVAILABLE SCRATCHPAD SPACE
                  *
000013   SPDAVAIL EQU   SYSSTATE-INNUM
                  *
                  ***RECEIVER AND TRANSMITTER STATUS
                  *
                  *
                  ***MASK DEFINITIONS
                  *
000200   RCVREIAM EQU   10000000B     EIA ACTIVE
000100   RCVRMSGM EQU   01000000B     MESSAGE IN PROGRESS
000040   RCVROVFM EQU   00100000B     BUFFER OVERFLOW
000020   RCVRFCNM EQU   00010000B     FUNCTION CODE READ
000010   RCVRLENM EQU   00001000B     LENGTH CODE READ
                  *
000040   XMITOVF  EQU   00100000B     BUFFER OVERFLOW
                  *
102 7 1  RCVREIAR BIV   RCVRSTAT,7,1  EIA ACTIVE
102 6 1  RCVRMSGR BIV   RCVRSTAT,6,1  MESSAGE IN PROGRESS
102 5 1  RCVROVFR BIV   RCVRSTAT,5,1  BUFFER OVERFLOW
102 4 1  RCVRFCNR BIV   RCVRSTAT,4,1  FUNCTION CODE READ
102 3 1  RCVRLENR BIV   RCVRSTAT,3,1  LENGTH CODE READ
                  *
                  ***TRANSMIT STATUS
                  *
                  *        BIV   XMITSTAT,7,1  NOT USED
                  *        BIV   XMITSTAT,6,1  NOT USED
111 5 1  XMITOVFR BIV   XMITSTAT,5,1  BUFFER OVERFLOW
                  *        BIV   XMITSTAT,4,1  NOT USED
                  *        BIV   XMITSTAT,3,1  NOT USED
```

```
                 *         RIV    XMITSTAT,2,1        NOT USED
                 *         RIV    XMITSTAT,1,1        NOT USED
                 *         RIV    XMITSTAT,0,1        NOT USED
                 *
                 ***BUFFER DEFINITIONS
                 *
        000000   BFBASE    EQU    0                   BASE ADDRESS
        000001   BFIPTR    EQU    BFBASE+1            INPUT POINTER
        000002   BFOPTR    EQU    BFIPTR+1            OUTPUT POINTER
        000003   BFLEN     EQU    BFOPTR+1            BUFFER LENGTH
        000004   BFUSE     EQU    BFLEN+1             USAGE COUNT
                 *
                 *** INSERT AND DELETE COMMAND FLAGS
                 *
        263 7 1  ENT1STR   RIV    NOWPAGE,7,1         FIRST ENTRY FLAG
        263 6 1  PASS1STR  RIV    NOWPAGE,6,1         FIRTST PAGE MOVE FLAG
        263 0 6  NOWPAGER  RIV    NOWPAGE,0,6         PAGE BEING WORKED ON
        000200   ENT1STM   EQU    10000000B
        000100   PASS1STM  EQU    01000000B
                 *
                 ***LOGIC RAM SYSTEM ALLOCATION
                 *
        000000   SYSLRCHK  EQU    0                   LOGIC RAM CHECKSUM
                 *
                 ***LOGIC RAM ADDRESS ASSIGNMENTS
                 *
        000000   SYSLRCHH  EQU    0                   LOGIC RAM CHECKSUM
        000000   SYSLRCHL  EQU    0
                 *
        000000   SYSUSERH  EQU    0                   START OF USER LOGIC
        000002   SYSUSERL  EQU    2
                 *
                 ***COIL RAM ADDRESS ASSIGNMENTS
                 *
                 ***10/25/77
                 *
        000001   SYSCRCHH  EQU    1                   COIL RAM CHECKSUM
        000000   SYSCRCHL  EQU    0
                 *
        000001   SYSSTATH  EQU    SYSCRCHH            SYSTEM STATE
        000001   SYSSTATL  EQU    SYSCRCHL+1
                 *
                 ***BASE OF REGISTER SPACE
                 *
        000001   SYSREGHI  EQU    1                   COIL [256]
        000002   SYSREGLO  EQU    2
                 *
                 ***LOGIC RAM BIT ASSIGNMENTS
                 *
                 *
                 ***SYSCONF1
                 *
                 ***MASK DEFINITIONS
                 *
        000200   SYS4096M  EQU    10000000B           4096 BYTE LOGIC RAM
        000100   SYS2048M  EQU    01000000B           2048 BYTE LOGIC RAM
        000040   SYS1024M  EQU    00100000B           1024 BYTE LOGIC RAM
        000020   SYS0512M  EQU    00010000B           0512 BYTE LOGIC RAM
        000010   SYS0256M  EQU    00001000B           0256 BYTE LOGIC RAM
                 *         EQU    00000100B           NOT USED
                 *         EQU    00000010B           NOT USED
                 *         EQU    00000001B           NOT USED
                 *
                 ***BIT DEFINITIONS
                 *
        000 7 1  SYS4096B  RIV    0,7,1               4096 BYTE LOGIC RAM
        000 6 1  SYS2048B  RIV    0,6,1               2048 BYTE LOGIC RAM
        000 5 1  SYS1024B  RIV    0,5,1               1024 BYTE LOGIC RAM
        000 4 1  SYS0512B  RIV    0,4,1               0512 BYTE LOGIC RAM
        000 3 1  SYS0256B  RIV    0,3,1               0256 BYTE LOGIC RAM
                 *         RIV    0,2,1               NOT USED
                 *         RIV    0,1,1               NOT USED
                 *         RIV    0,0,1               NOT USED
                 *
                 ***SYSCONF2
                 *
                 ***MASK DEFINITIONS
                 *
        000200   SYSC256M  EQU    10000000B           256 I/O POINTS
        000100   SYSC192M  EQU    01000000B           192 I/O POINTS
        000040   SYSC128M  EQU    00100000B           128 I/O POINTS
        000020   SYSC064M  EQU    00010000B           064 I/O POINTS
                 *         EQU    00001000B           NOT USED
        000004   SYSTRANM  EQU    00000100B           TRANSITIONAL OPTION
        000002   SYSENHM   EQU    00000010B           ENHANCED EXECUTIVE
                 *         EQU    00000001B           NOT USED
                 *
                 ***BIT DEFINITIONS
                 *
        000 7 1  SYSC256B  RIV    0,7,1               256 I/O POINTS
        000 6 1  SYSC192B  RIV    0,6,1               192 I/O POINTS
        000 5 1  SYSC128B  RIV    0,5,1               128 I/O POINTS
        000 4 1  SYSC064B  RIV    0,4,1               64 I/O POINTS
                 *         RIV    0,3,1               NOT USED
```

```
000 2 1      SYSTRANB RIV      0,2,1         TRANSITIONAL OPTION
000 1 1      SYSENHB  RIV      0,1,1         ENHANCED EXECUTIVE
             *        RIV      0,0,1         NOT USED
             *
             ***STATE VECTOR
             *
             ***MASK DEFINITIONS
             *
000200       SYSSRUNM EQU      10000000B     RUN STATE
000100       SYSSPUPM EQU      01000000B     POWER-UP STATE
000040       SYSSPDNM EQU      00100000B     POWER-DOWN STATE
000020       SYSSTOPM EQU      00010000B     STOP STATE
000017       SYSCODEM EQU      00001111B     ERROR CODE MASK
             *
             ***BIT DEFINITIONS
             *
000 7 1      SYSSRUNB RIV      0,7,1         RUN STATE
000 6 1      SYSSPUPB RIV      0,6,1         POWER-UP STATE
000 5 1      SYSSPDNB RIV      0,5,1         POWER-DOWN STATE
000 4 1      SYSSTOPB RIV      0,4,1         STOP STATE
000 0 4      SYSCODEB RIV      0,0,4         ERROR STATE CODE
             *        RIV      0,2,0
             *        RIV      0,1,0
             *        RIV      0,0,0
             *
             ***ERROR STATE CODES
             *
000001       SYSEOVR  EQU      1             COMMUNICATIONS OVERRUN
000002       SYSELCHK EQU      2             MEMORY CHECKSUM FAILED
000003       SYSENODE EQU      3             INVALID NODE TYPE FOUND
000004       SYSEIO   EQU      4             I/O PORT ERROR
000005       SYSESPD  EQU      5             SCRATCHPAD DIAGNOSTIC FAILED
000006       SYSECCHK EQU      6             COIL RAM CHECKSUM FAILED
000007       SYSEDIAG EQU      7             CPU DIAGNOSTIC FAILED
000010       SYSEMEM  EQU      8             ILLEGAL MEMORY CONFIGURATION
000011       SYSERTC  EQU      9             REAL-TIME CLOCK NOT FUNCTIONING
000012       SYSEWDT  EQU      10            WATCH-DOG TIMER EXPIRED
000013       SYSECOL  EQU      11            ILLEGAL COLUMN DETECTED
000014       SYSEEOL  EQU      12            NO END-OF-LOGIC NODE
             *        EQU      13            NOT USED
             *        EQU      14            NOT USED
             *        EQU      15            NOT USED
             *
             ***COIL RAM BIT ASSIGNMENTS
             *
000 3 1      CRINDISB LIV      0,3,1         INPUT DISABLE
000 2 1      CRINPUT  LIV      0,2,1         INPUT STATE
000 1 1      CROUTPUT LIV      0,1,1         OUTPUT COIL STATE
000 0 1      CRINTRNL LIV      0,0,1         INTERNAL COIL STATE
             *
             ***TRANSITIONAL EXTENSION
             *
             *        LIV      0,7,1         NOT USED
000 6 1      CRINHIS  LIV      0,6,1         INPUT HISTORY
000 5 1      CROUTHIS LIV      0,5,1         OUTPUT HISTORY
000 4 1      CRINTHIS LIV      0,4,1         INTERNAL COIL HISTORY
             *
             ***SYSTEM CONFIGURATION SENSE ADDRESS DATA
             *
000000       SYSCONLO EQU      00CH          LOW-ORDER ADDRESS
000004       SYSCONHI EQU      004H          HIGH-ORDER ADDRESS
000100       SYSCONIN EQU      100H          INCREMENT TO LOW-ORDER ADDRESS
             *
             ***NODE TYPE DEFINITION
             *
000000       NODESON  EQU      00            START OF NETWORKS
000001       NODEEOL  EQU      01            END OF LOGIC
000002       NODEEOC  EQU      02            END OF COLUMN
000003       NODEOREL EQU      03            NORMALLY OPEN RELAY
000004       NODECREL EQU      04            NORMALLY CLOSED RELAY
000005       NODEPOST EQU      05            POSITIVE-GOING TRANSITIONAL
000006       NODENEGT EQU      06            NEGATIVE-GOING TRANSITIONAL
000007       NODECOIL EQU      07            COIL
000010       NODELATC EQU      08            LATCH
000011       NODEDCOL EQU      09            DISABLED COIL
000012       NODEDLAT EQU      10            DISABLED LATCH
000013       NODEHOZO EQU      11            HORIZONTAL OPEN
000014       NODEHOZS EQU      12            HORIZONTAL SHORT
000015       NODECPRE EQU      13            PRESET/CALCULATE-B-NODE CONSTANT
000016       NODERPRE EQU      14            PRESET/CALCULATE-B-NODE REGISTER
000017       NODECTR  EQU      15            COUNTER
000020       NODET100 EQU      16            TIMER - 1.00 SEC
000021       NODET010 EQU      17            TIMER - 0.10 SEC
000022       NODET001 EQU      18            TIMER - 0.01 SEC
000023       NODECON  EQU      19            CONVERT
000024       NODECCON EQU      20            C NODE CONSTANT
000025       NODECREG EQU      21            C NODE REGISTER
000026       NODECALC EQU      22            CALCULATE
000027       NODENULL EQU      23            NULL NODE
             *        EQU      24            NOT USED
             *        EQU      25            NOT USED
             *        EQU      26            NOT USED
             *        EQU      27            NOT USED
             *        EQU      28            NOT USED
             *        EQU      29            NOT USED
             *        EQU      30            NOT USED
             *        EQU      31            NOT USED
```

```
                    *
                    ***NODE INFORMATION
                    *
        000200      NODEEOCM EQU      10000000B        END-OF-COLUMN FLAG
        000 7 1     NODEEOCB RIV      0,7,1            END-OF-COLUMN BIT
                    *
        000037      NODETYPM EQU      00011111B        MASK FOR NODE TYPE, RIGHT JUSTIFIED
        000003      NODEHMSK EQU      00000011B        MASK FOR HIGH-ORDER OPERAND
                    *
        000000      FLAGINP  EQU      0                INPUT
        000001      FLAGOUT  EQU      1                COIL/LATCH
        000002      FLAGINT  EQU      2                INTERNAL COIL/LATCH
        000003      FLAGSEQ  EQU      3                SEQUENCER
                    *
        000000      FLAGHREG EQU      0                HOLDING REGISTER
        000001      FLAGIREG EQU      1                INPUT REGISTER
        000002      FLAGDREG EQU      2                DUMMY REGISTER (4000)
                    *
                    ***COUNTER POWER HISTORY
        000375      CTRPWRM1 EQU      11111101B        MASK
        000002      CTRPWRM2 EQU      00000010B        MASK
        000 1 1     CTRPWRHY RIV      0,1,1            TO GET POWER BIT, RIGHT JUSTIFIED
        023 2 5     SAVENODE RIV      SAVER1,2,5       NODE TYPE
                    *
                    ***SEQUENCER MODE DATA
                    *
                    ***MASK DEFINITIONS
                    *
        000340      SEQREGM  EQU      11100000B        REGISTER ID
        000037      SEQSTEPM EQU      00011111B        SEQUENCER STEP
                    *
                    ***BIT DEFINITIONS
                    *
        000 5 3     SEQREGB  RIV      0,5,3            REGISTER ID
        000 0 5     SEQSTEPB RIV      0,0,5            SEQUENCER STEP
                    *
        000005      SEQSHIFT EQU      5                ROTATE TO ISOLATE REGISTER
                    *
        000063      SEQBASE  EQU      51               BASE SEQUENCER REGISTER
                    *
        000 0 4     REGDATA  LIV      0,0,4            NIBBLE OF HOLDING REGISTER DATA
        000001      REGBASEH EQU      01H              BASE ADDRESS OF REGISTER SPACE - HIGH
        000002      REGBASEL EQU      02H              BASE ADDRESS OF REGISTER SPACE - LOW
                    *
        000000      CALCADD  EQU      00B              ADD
        000001      CALCSUB  EQU      01B              SUBTRACT
        000002      CALCMPX  EQU      10B              MULTIPLY
        000003      CALCDIV  EQU      11B              DIVIDE
                    *
                    ***I/O ASSIGNMENTS
                    *
                    ***STRIP/BYTE SELECT
                    *
        000001      IOBYTE0  EQU      00000001B        BYTE 0
        000002      IOBYTE1  EQU      00000010B        BYTE 1
        000004      IOBYTE2  EQU      00000100B        BYTE 2
        000010      IOBYTE3  EQU      00001000B        BYTE 3
        000020      IOSTRIPA EQU      00010000B        STRIP A
        000040      IOSTRIPB EQU      00100000B        STRIP B
        000100      IOSTRIPC EQU      01000000B        STRIP C
        000200      IOSTRIPD EQU      10000000B        STRIP D
                    *
                    ***REGISTER I/O ADDRESS SPACE
                    *
        000 5 3     IOUNITID LIV      0,5,3            UNIT ID
        000 1 4     IOWORDSL LIV      0,1,4            WORD SELECT
        000 0 1     IOBYTESL LIV      0,0,1            BYTE SELECT
                    *
                    ***  IT ID
                    *
                    *        EQU      0                NOT USED
        000001      IOUNITDS EQU      1                EXTENDED DISCRETE I/O
        000002      IOUNITR1 EQU      2                REGISTER MUX 1
        000003      IOUNITR2 EQU      3                REGISTER MUX 2
                    *        EQU      4                NOT USED
                    *        EQU      5                NOT USED
                    *        EQU      6                NOT USED
                    *        EQU      7                NOT USED
                    ***
                    *
                    ***ASCII CHARACTERS
                    *
        000002      ASCSTX   EQU      002H             STX
        000320      ASCNAK   EQU      320H             NAK
                    *
                    ***COMMUNICATIONS DEFINTIONS
                    *
                    *
                    ***COMMANDS
                    *
        000020      REDCMD   EQU      00010000B        READ
        000040      WRTCMD   EQU      00100000B        WRITE COMMAND
        000060      SCHCMD   EQU      00110000B        SEARCH
        000100      PWRCMD   EQU      01000000B        POWER
        000120      INSCMD   EQU      01010000B        INSERT
        000140      DELCMD   EQU      01100000B        DELETE
```

```
          000140    LEDCMD   EQU    01100000B          LED
          000200    STPCMD   EQU    10000000B          STOP
          000220    GOCMD    EQU    10010000B          GO
          000240    INICMD   EQU    10100000B          INITIALIZE
          000260    INCCMD   EQU    10110000B          INSERT AT END-OF-COLUMN
          000300    DECCMD   EQU    11000000B          DELETE AT END-OF-COLUMN
                    *
                    * COMMAND CONTINUATIONS
                    *
          000001    SRCHCONT EQU    1                  SEARCH CONTINUE
          000002    INSTCONT EQU    2                  INSERT CONTINUE
          000003    DELTCONT EQU    3                  DELETE CONTINUE
          000004    PWRCONT  EQU    4                  POWER CONTINUE
                    *
                    ***MASKS
                    *
          000360    CMDMSK   EQU    11110000B          COMMAND MASK
          000017    CNTMSK   EQU    00001111B          COUNT MASK
          000340    ADRMSK   EQU    11100000B          ADDRESS FIELD MASK
                    *
          235 5 3   ADRFLD   RIV    CMD(4,5,3          ADDRESS FIELD IN COMMAND
          233 0 4   LENFLD   RIV    CMD(2,0,4          LENGTH FIELD IN COMMAND BYTE
                    *
                    ***ERROR CODES
                    *
          000001    ERRPAR   EQU    1                  PARITY/FRAMING ERROR
          000002    ERROVR   EQU    2                  OVERRUN ERROR
          000003    ERRCHK   EQU    3                  CHECKSUM ERROR
          000004    ERRADR   EQU    4                  ADDRESS OUT-OF-RANGE
          000005    ERRADI   EQU    5                  INVALID ADDRESS
          000006    ERRCMD   EQU    6                  INVALID COMMAND
          000007    ERRTIM   EQU    7                  TIMEOUT
          000010    ERRMSK   EQU    8                  INVALID MASK
          000011    ERRSEQ   EQU    9                  INVALID STEP NUMBER
          000012    ERRNOD   EQU    10                 INVALID NODE
          000013    ERRMEM   EQU    11                 MEMORY PROTECT
          000014    ERRSTP   EQU    12                 SYSTEM NOT IN STOP STATE
          000015    ERRLEN   EQU    13                 LENGTH ERROR
          000016    ERRCON   EQU    14                 NODE NOT A CONTACT
          000017    ERRNPD   EQU    15                 NODE NOT IN POWER DISPLAY
          000020    ERRSUP   EQU    16                 NODE NOT SUPPORTED
          000021    ERRFUL   EQU    17                 MEMORY FULL
                    *
                    ***VARIOUS CONSTANTS
                    *
          000374    NEG1000H EQU    11111100B          -1000 HI
          000030    NEG1000L EQU    00011000B          -1000 LO
          000003    CALCTYPM EQU    011B               CALCULATE TYPE MASK
          000003    K1000HI  EQU    011B               1000 DE   AL HI
          000350    K1000LO  EQU    11101000B          1000 DE      LO
          000374    NEG800HI EQU    11111100B          -800 HI
          000340    NEG800LO EQU    11100000B          -800 LO
                    ***********************************************************************
                    *
                    *        MACRO FILE - 484 CPU MAINFRAME
                    *
                    ***********************************************************************
                    *
                    ***CLR MACRO - CLEAR A REGISTER
                    *
                    ***R <- 0
                    *
                    CLR      MACRO  R                  R = REGISTER TO BE CLEARED
                             XMT    0,R
                             ENDM                      END-OF-MACRO
                    *
                    ***NOP MACRO - WAIT INSTRUCTION
                    *
                    NOP      MACRO                     NO PARAMETERS
                             MOV    AUX,AUX
                             ENDM                      END-OF-MACRO
                    *
                    ***WSP MACRO - WRITE TO SCRATCHPAD
                    *
                    ***SCRATCH(A) <- D
                    *
                    WSP      MACRO  A,D                A = ADDRESS, D = SOURCE REGISTER
                             XMT    IVISPD+IVOSPD,IVL  SELECT SPD READ/WRITE
                             XMT    A,IVR              LOAD ADDRESS
                             MOV    D,RO               WRITE DATA
                             ENDM                      END-OF-MACRO
                    *
                    ***RSP MACRO - READ SCRATCHPAD
                    *
                    ***D <- SCRATCH(A)
                    *
                    RSP      MACRO  A,D                A = ADDRESS, D = DESTINATION REGISTER
                             XMT    A,IVR              LOAD ADDRESS
                             XMT    IVISPD+IVOSPD,IVL  *1 - SELECT SPD READ
                             MOV    RR,D               READ DATA
                             ENDM                      END-OF-MACRO
                    *
                    ***OR MACRO - LOGICAL OR
                    *
                    ***A.OR.AUX -> T
```

```
                         *
                         OR        MACRO   A,B                 A = SOURCE, B = DESTINATION
                                   XOR     A,B                 SET NON-DUPLICATE BITS
                                   AND     A,AUX               ISOLATE DUPLICATE BITS
                                   XOR     B,B                 SET DUPLICATE BITS
                                   ENDM                        END-OF-MACRO
                         *
                         ***POWER-UP ROUTINE
                         *
                         ***       CHECK FOR POWER-DOWN FLAG AND MOT FLAG
                         *
00000   6 07060          PWRUP     XMT     IVIINTRP,IVL        SELECT INTERRUPT SENSE REGISTER
00001   5 27100                    NZT     INTRPWFR,PWRUP      TEST FOR POWER-FAIL TRUE
00002   5 21104                    NZT     INTRMOTF,PWRUP010   BRANCH IF MOT TESTER CONNECTED
00003   7 00005                    JMP     PWRUP020            NORMAL POWER-UP SEQUENCE
                         *
00004   7 00004          PWRUP010  JMP     PWRUP010            ***TEMPORARY FOR MCSIM USE***
00005   6 07001          PWRUP020  XMT     IVOCRHI,IVL         SELECT COIL ADDRESS HIGH
00006   6 01004                    XMT     SYSCONHI,R1         R1 <- CONFIGURATION ADDR HIGH
00007   0 01027                    MOV     R1,LB               LOAD ADDRESS REGISTER
00010   6 07000                    XMT     IVOCRLO+IVICRDAT,IVL   SELECT COIL ADDR LOW + COIL INPUT
00011   6 01000                    XMT     SYSCONLO,R1         R1 <- CONFIGURATION ADDR LOW
00012   0 01037                    MOV     R1,RB               LOAD ADDRESS REGISTER
                                   CLR     R3                  *1 - CLEAR R3
00013   6 03000          +         XMT     0,R3
00014   6 04004                    XMT     SYSTRANM,R4         *2 - R4 <- TRANSITION OPTION FLAG
00015   6 02003                    XMT     3,R2                *3 - R2 <- LOOP COUNTER
00016   5 27120                    NZT     LBBITO,PWRUP030     BRANCH IF NO TRANSITION OPTION
                                   CLR     R4                  CLEAR FLAG
00017   6 04000          +         XMT     0,R4
                         *
00020   6 05004          PWRUP030  XMT     100B,R5             R5 <- BIT PATTERN
                                   CLR     R6                  RESET R6
00021   6 06000          +         XMT     0,R6
                         *
00022   6 00100          PWRUP040  XMT     SYSCONIN,AUX        AUX <- INCREMENT
00023   1 01001                    ADD     R1,R1               UPDATE LOW-ORDER COIL ADDRESS
00024   0 01037                    MOV     R1,RB               LOAD ADDRESS REGISTER
00025   0 05000                    MOV     R5,AUX              *1 - AUX <- MASK
00026   3 06006                    XOR     R6,R6               *2 - SET BIT
00027   0 05105                    MOV     R5(1),R5            *3 - ROTATE MASK
00030   5 27132                    NZT     LBBITO,PWRUP050     BRANCH IF BIT SET
00031   3 06006                    XOR     R6,R6               CLEAR BIT
                         *
00032   6 00377          PWRUP050  XMT     -1,AUX              AUX <- DECREMENT
00033   1 02002                    ADD     R2,R2               DECREMENT COUNTER
00034   5 02022                    NZT     R2,PWRUP040         R2.NE.0 => CONTINUE
00035   4 06046                    XEC     PWRUTAB1(R6),8      EXECUTE LOAD INSTRUCTION
00036   3 03003                    XOR     R3,R3               SET LOGIC RAM SIZE
00037   3 04004                    XOR     R4,R4               SET COIL RAM SIZE
00040   6 00010                    XMT     SYSC256M,AUX        AUX <- MASK
00041   2 03000                    AND     R3,AUX              AUX.NE.0 => 256-BYTE LOGIC RAM
00042   1 04004                    ADD     R4,R4               SHIFT FLAG IN SYSCONF, IF NECESSARY
                         *
                         ***CONDITIONAL ASSEMBLY TO SET ENHANCED INSTRUCTION SET FLAG
                         ***IN SYSCONF2.
                         *
                                   IF      ENHANCE-1
                                   ENDIF
                         *
                                   IF      ENHANCE
00043   6 00002                    XMT     SYSENHM,AUX         AUX <- MASK
                                   ENDIF
                         *
00044   3 04004                    XOR     R4,R4               SET/CLEAR FLAG AS REQUIRED
00045   7 00056                    JMP     PWRUP060            SKIP TABLE
                         *
                         ***POWER-UP TABLE FOR SYSTEM CONFIGURATION
                         *
00046   6 00010          PWRUTAB1  XMT     SYS0256M,AUX        256 BYTE LOGIC RAM
00047   6 00020                    XMT     SYS0512M,AUX        512 BYTE LOGIC RAM
00050   7 00327                    JMP     PWRUPE10            768 BYTE LOGIC RAM - ILLEGAL
00051   6 00040                    XMT     SYS1024M,AUX        1024 BYTE LOGIC RAM
00052   7 00327                    JMP     PWRUPE10            1536 BYTE LOGIC RAM - ILLEGAL
00053   6 00100                    XMT     SYS2048M,AUX        2048 BYTE LOGIC RAM
00054   7 00327                    JMP     PWRUPE10            3072 BYTE LOGIC RAM - ILLEGAL
00055   6 00200                    XMT     SYS4096M,AUX        4096 BYTE LOGIC RAM
                         *
                         ***SCRATCHPAD MARCHING ZEROS TEST
                         *
                         ***THIS TEST ENHANCED TO RUN LOOP EIGHT TIMES AND THUS CLEAR THE
                         ***ENTIRE SCRATCHPAD.  ROTATE OF PATTERN IS CHANGED TO AN ADD WHICH
                         ***DOES THE SHIFT AND EVENTUALLY CLEARS THE SCRATCHPAD.
                         *
00056   6 11001          PWRUP060  XMT     00000001B,R11       R11 <- INITIAL PATTERN
                                   CLR     R1                  R1 IS SCRATCHPAD ADDRESS
00057   6 01000          +         XMT     0,R1
00060   6 07021                    XMT     IVOSPD+IVISPD,IVL   SELECT SCRATCHPAD IN AND OUT
00061   6 00001                    XMT     1,AUX               AUX <- INCREMENT
                         *
00062   0 01017          PWRUP070  MOV     R1,IVB              LOAD SCRATCHPAD ADDRESS
00063   0 11037                    MOV     R11,RB              WRITE TO SCRATCHPAD
00064   1 01001                    ADD     R1,R1               *1 - INCREMENT ADDRESS
00065   5 01062                    NZT     R1,PWRUP070         R1.NE.0 => CONTINUE
                         *
```

```
00066  6 02010              XMT    M,R2                 R2 <- LOOP COUNTER
00067  0 11705              MOV    R11(7),R5            R5 <- NEXT PATTERN
                   *
00070  0 01017     PWRUPD80 MOV    R1,IVR               LOAD ADDRESS REGISTER
00071  0 11000              MOV    R11,AUX              *1 - AUX <- PATTERN
00072  3 37000              XOR    RB,AUX               AUX <- MATCH TEST
00073  5 00331              NZT    AUX,PWRUPE20         AUX.NE.0 => TEST FAILED
00074  0 05037              MOV    R5,RB                WRITE NEW PATTERN
00075  6 00001              XMT    1,AUX                AUX <- INCREMENT
00076  1 01001              ADD    R1,R1                INCREMENT ADDRESS
00077  5 01070              NZT    R1,PWRUPD80          R1.NE.0 => CONTINUE
00100  0 11000              MOV    R11,AUX              AUX <- CURRENT PATTERN
00101  1 11011              ADD    R11,R11              ROTATE MASK
00102  0 05000              MOV    R5,AUX               UPDATE PATTERN
00103  1 05005              ADD    R5,R5                USING ADD FOR SHIFT
00104  6 00377              XMT    -1,AUX               AUX <- DECREMENT
00105  1 02002              ADD    R2,R2                R2 <- R2 - 1
00106  5 02070              NZT    R2,PWRUPD80          R2.NE.0 => CONTINUE
                   *
                   ***LOAD CONFIGURATION DATA TO SCRATCHPAD
                   *
00107  6 07001              XMT    IVOSPD,IVL           SELECT SCRATCHPAD WRITE
00110  6 17276              XMT    SPDCONF1,IVR         LOAD ADDRESS
00111  0 03037              MOV    R3,RB                WRITE SYSCONF1
                            NOP                         *1 - WAIT
00112  0 00000     +        MOV    AUX,AUX
00113  6 17277              XMT    SPDCONF2,IVR         LOAD ADDRESS
00114  0 04037              MOV    R4,RB                WRITE SYSCONF2
                   *
                   ***INITIALIZE PERIPHERAL PORT INTERFACE
                   *
                   ***NOTE: PREVIOUS SCRATCHPAD DIAGNOSTIC CLEARED ENTIRE SCRATCHPAD
                   ***      TO ZEROS THUS RESETTING ALL CONSTANTS IN PPI AREA.
                   *
00115  6 01005              XMT    RCVRBLK,R1           R1 <- BLOCK ADDRESS
00116  6 02112              XMT    RCVRBUFF,R2          R2 <- BUFFER ADDRESS
00117  6 03050              XMT    RCVRBLEN,R3          R3 <- BUFFER LENGTH
00120  6 11000              CALL   BUFFINIT             INITIALIZE RECEIVER BUFFER
00121  7 05500
00122  6 01104              XMT    XMITBLK,R1           R1 <- BLOCK ADDRESS
00123  6 02162              XMT    XMITBUFF,R2          R2 <- BUFFER ADDRESS
00124  6 03050              XMT    XMITBLEN,R3          R3 <- BUFFER LENGTH
00125  6 11001              CALL   BUFFINIT             INITIALIZE BUFFER
00126  7 05500
                   *
                   ***CLEAR PERIPHERAL PORT RECEIVER
                   *
00127  6 07000              XMT    IVOCTRL,IVL          SELECT CONTROL
00130  6 27304              XMT    CTRLRCLR,CTRLREG
                   *
                   ***VALIDATE LOGIC RAM CHECKSUM
                   *
00131  6 11002              CALL   LRCHK                COMPUTE CHECKSUM
00132  7 05426
00133  6 01000              XMT    SYSLRCHH,R1          R1 <- CHECKSUM ADDRHI
00134  6 07004              XMT    IVOLRHI,IVL          SELECT LOGIC ADDRHI
00135  0 01027              MOV    R1,LB                LOAD ADDRESS
00136  6 01000              XMT    SYSLRCHL,R1          R1 <= CHECKSUM ADDRLO
00137  6 07003              XMT    IVOLRLO,IVL          SELECT LOGIC ADDRLO
00140  0 01027              MOV    R1,LB                LOAD ADDRESS
00141  6 07000              XMT    IVILRDAT,IVL         *1 - SELECT PORT
00142  0 06000              MOV    R6,AUX               *2 - AUX <- COMPUTED CHECKSUM
                            NOP                         *3 - WAIT
00143  0 00000     +        MOV    AUX,AUX
00144  3 37000              XOR    RB,AUX               AUX.EQ.0 => CHECKSUM OKAY
00145  5 00332              NZT    AUX,PWRUPE30         AUX.NE.0 => BAD CHECKSUM
                   *
                   ***COIL RAM CHECKSUM
                   *
00146  6 11003     PWRUP100 CALL   INTRP                DO AN INTERRUPT CHECK
00147  7 05103
00150  5 01000              NZT    R1,PWRUP             RETRY ON ERROR
00151  6 11004              CALL   CRCHK                DO CHECKSUM ON COIL RAM
00152  7 05350
                   *
                   ***FETCH CHECKSUM STORED IN COIL RAM
                   *
00153  6 01000              XMT    SYSCRCHL,R1          R1 <- COIL CHECKSUM ADDR LOW
00154  6 07000              XMT    IVOCRLO,IVL          SELECT COIL ADDR LOW
00155  0 01037              MOV    R1,RB                LOAD ADDRESS REGISTER
00156  6 01002              XMT    SYSCRCHH+1,R1        R1 <- COIL CHECKSUM ADDR HIGH
00157  6 07001              XMT    IVOCRHI,IVL          SELECT COIL ADDR HIGH
00160  0 01027              MOV    R1,LB                LOAD ADDRESS REGISTER
00161  0 06000              MOV    R6,AUX               *1 - AUX <- CALCULATED CHECKSUM
00162  6 07001              XMT    IVOCRHI+IVICRDAT,IVL *2 - SELECT PORTS
00163  6 01001              XMT    SYSCRCHH,R1          *3 - R1 <- NEXT ADDRESS
00164  0 27011              MOV    LB,R11               R11 <- HIGH-ORDER CHECKSUM
00165  0 01027              MOV    R1,LB                LOAD ADDRESS
00166  6 00360              XMT    11110000B,AUX        *1 - AUX <- PATTERN
00167  2 11411              AND    R11(4),R11           *2 - ISOLATE HIGH-ORDER CHECKSUM
00170  0 00400              MOV    AUX(4),AUX           *3 - ROTATE PATTERN
00171  2 27000              AND    LB,AUX               AUX <- LOW-ORDER CHECKSUM
00172  3 11000              XOR    R11,AUX              AUX <- CHECKSUM
00173  3 06000              XOR    R6,AUX               AUX.EQ.0 => GOOD CHECKSU
00174  5 00374              NZT    AUX,PWRUPE40         AUX.NE.0 => ERROR, BAD CHECKSUM
```

```
                          *
                          ***VALIDATE NODES AND CLEAR COILS
                          *
                          ***CHECK INSERTED TO LOOK FOR END OF MEMORY
                          *
                                    RSP   SPDCONF1,R3        R3 <- SYSTEM CONFIGURATION
00175  6 17276     *                XMT   SPDCONF1,IVR            LOAD ADDRESS
00176  6 07021     *                XMT   IVISPD+IVOSPD,IVL  *1 - SELECT SPD READ
00177  0 37003     *                MOV   RB,R3               READ DATA
00200  6 00037                      XMT   00011111B,AUX      AUX <- MASK
00201  2 03303                      AND   R3(3),R3           R3 <- SHIFTED SYSCONF1
00202  6 04177                      XMT   128-1,R4           R4 <- COUNTER FOR FIRST 256 BYTES
00203  6 01002                      XMT   SYSUSERL,R1        R1 <- START OF LOGIC LOW
00204  6 07003                      XMT   IVOLRLO,IVL        SELECT LOGIC ADDR LOW
00205  0 01027                      MOV   R1,LP              LOAD REGISTER
00206  6 01000                      XMT   SYSUSERH,R1        R1 <- START OF LOGIC HIGH
00207  6 07004                      XMT   IVOLRHI,IVL        SELECT LOGIC ADDR HIGH
00210  0 01027                      MOV   R1,LR              LOAD ADDRESS REGISTER
                                    CLR   R1                 *1 - R1 <- 0
00211  6 01000     *                XMT   0,R1
00212  6 07001                      XMT   IVOCRHI,IVL        *2 - SELECT COIL ADDR HIGH
00213  0 01027                      MOV   R1,LR              *3 - CLEAR COIL ADDR HIGH
00214  5 07001                      XMT   IVOSPD,IVL         SELECT SPD WRITE
00215  6 17065                      XMT   EOLHI,IVR          INITIALIZE EOLHI TO 0
00216  0 01037                      MOV   R1,RB
00217  6 01002                      XMT   2,R1               *1
00220  6 17066                      XMT   EOLLO,IVR
00221  0 01037                      MOV   R1,RB              INITIALIZE EOLLO TO 2
                          *
00222  6 37000            PWRUP110  XMT   IVILRDAT+IVOCTRL,IVL   SELECT PORTS
00223  0 37001                      MOV   RB,R1              R1 <- BYTE 0 OF NODE
00224  6 27300                      XMT   CTRLINCL,CTRLREG
00225  6 00037                      XMT   00011111B,AUX      *1 - AUX <- MASK
00226  2 01206                      AND   R1(2),R6           *2 - R6 <- NODE TYPE
00227  6 07021                      XMT   IVISPD+IVOSPD,IVL  SELECT SPD READ/WRITE
00230  6 17066                      XMT   EOLLO,IVR          LOAD ADDRESS
00231  6 00002                      XMT   2,AUX              *1
00232  1 37037                      ADD   RB,RB              UPDATE EOL ADDRESS
00233  0 10000                      MOV   OVF,AUX            *1
00234  6 17065                      XMT   EOLHI,IVR          LOAD ADDRESS
                                    NOP                      *1 - WAIT
00235  0 00000     *                MOV   AUX,AUX
00236  1 37037                      ADD   RB,RB
00237  6 07000                      XMT   IVILRDAT+IVOCTRL,IVL   *3 - SELECT PORTS
00240  0 37002                      MOV   RB,R2              R2 <- BYTE 1 OF NODE
00241  6 27300                      XMT   CTRLINCL,CTRLREG   INCREMENT ADDRESS REGISTER
00242  6 00007                      XMT   NODECOIL,AUX       *1 - AUX <- MASK
00243  3 06000                      XOR   R6,AUX             *2 - AUX.EQ.0 => COIL
00244  5 00253                      NZT   AUX,PWRUP120       *3 - AUX.NE.0 => NOT A COIL
00245  0 02037                      MOV   R2,RP              LOAD COIL ADDR LOW
00246  6 00003                      XMT   00000011B,AUX      *1 - AUX <- MASK
00247  2 01006                      AND   R1,R6              *2 - R6 <- COIL TYPE
00250  4 06302                      XEC   PWRUTAB2(R6),4     *3 - LOAD MASK
00251  6 07002                      XMT   IVICRDAT+IVOCRDAT,IVL   SELECT PORTS
00252  2 27027                      AND   LB,LB              TURN OFF COIL
                          *
00253  6 11005            PWRUP120  CALL  VALIDATE           VALIDATE NODE [R1,R2]
00254  7 06702
00255  6 00037                      XMT   00011111B,AUX      AUX <- MASK
00256  2 01206                      AND   R1(2),R6           R6 <- NODE TYPE
00257  6 00001                      XMT   NODEEOL,AUX        AUX <- MASK
00260  3 06006                      XOR   R6,R6              R6.EQ.0 => END OF LOGIC
00261  5 06263                      NZT   R6,PWRUP130        R6.NE.0 => END OF LOGIC
00262  7 00306                      JMP   PWRUP160           GO TO NEXT POWER-UP FUNCTION
                          *
00263  6 00377            PWRUP130  XMT   -1,AUX             AUX <- MASK
00264  3 01000                      XOR   R1,AUX             CHECK FOR INVALID NODE (R1.EQ.-1)
00265  5 00271                      NZT   AUX,PWRUP140       AUX.NE.0 => CONTINUE
00266  7 00336                      JMP   PWRUPE50           AUX.EQ.0 => ERROR
                          *
00267  6 01040            PWRUP150  XMT   SYSSPDNM,R1        SET POWER FAIL FLAG
00270  7 00453                      JMP   EXEC               GO TO EXECUTIVE
                          *
00271  6 00377            PWRUP140  XMT   -1,AUX             AUX <- DECREMENT
00272  1 04004                      ADD   R4,R4              DECREMENT MODULE COUNTER
00273  5 04222                      NZT   R4,PWRUP110        R4.NE.0 => CONTINUE
00274  6 07060                      XMT   IVIINTRP,IVL       SELECT INTERRUPT STATUS
00275  5 27127                      NZT   INTRP*FB,PWRUP150  BRANCH ON POWER-FAIL
00276  6 04200                      XMT   128,R4             SET UP R4 FOR NEXT MODULE
00277  1 03003                      ADD   R3,R3              DECREMENT LOOP COUNTER
00300  5 03222                      NZT   R3,PWRUP110        R3.NE.0 => CONTINUE
00301  7 00340                      JMP   PWRUPE70           NO END-OF-LOGIC NODE
                          *
                          ***EXECUTE TABLE
                          *
00302  6 00377            PWRUTAB2  XMT   11111111B,AUX      LOAD MASK
00303  6 00375                      XMT   11111101B,AUX      LOAD MASK
00304  6 00376                      XMT   11111110B,AUX      LOAD MASK
00305  6 00377                      XMT   11111111B,AUX      LOAD MASK
                          *
                          ***REAL-TIME CLOCK TEST
                          *
         000306           PWRUP160  EQU   *
00306  6 00377                      XMT   -1,AUX             SET UP FOR TIMING LOOP
```

```
00307  6 06112              XMT    74,R6
00310  6 11054              XMT    44,R11              LOOP SHOULD LAST FOR 10 MSEC
00311  6 07060              XMT    IVIINTRP+IVOCTRL,IVL SELECT INTERRUPTS AND CONTROL REGISTER
00312  6 27306              XMT    CTRLRTC,CTRLREG     MAKE SURE RTC BIT CAN GO DOWN
00313  5 26115              NZT    INTRRTCE,PWRUP165 JUMP IF STILL UP
00314  7 00317              JMP    PWRUP170            ELSE DO TIMING LOOP
00315  6 27306    PWRUP165  XMT    CTRLRTC,CTRLREG     KNOCK IT DOWN AGAIN
00316  5 26124              NZT    INTRRTCE,PWRUPE60 IF STILL UP, ERROR
00317  5 26126    PWRUP170  NZT    INTRRTCE,PWRUP180 TIME HOW LONG TO GO UP
00320  1 06006              ADD    R6,R6               LOOP
00321  5 06317              NZT    R6,PWRUP170
00322  1 11011              ADD    R11,R11
00323  5 11317              NZT    R11,PWRUP170        IF FALL THRU, ERROR
                  *
00324  6 01011    PWRUPE60  XMT    SYSIRTC,R1          SET ERROR CODE
00325  7 00453              JMP    EXEC
                  *
00326  7 00353    PWRUP180  JMP    PWRUP190            SHORT BRANCH PROBLEM
                  *
                  ***ERROR HANDLERS
                  *
00327  6 01010    PWRUPE10  XMT    SYSEMEM,R1          ILLEGAL MEMORY CONFIGURATION
00330  7 00453              JMP    EXEC                EXIT TO EXEC
                  *
00331  7 00331    PWRUPE20  JMP    PWRUPE20            SCRATCHPAD DIAGNOSTIC FAILED
                                                       DIE IMMEDIATELY
                  *
                  *
00332  6 01002    PWRUPE30  XMT    SYSELCHK,R1         LOGIC RAM CHECKSUM FAILED
00333  7 00453              JMP    EXEC                EXIT TO EXEC
                  *
00334  6 01006    PWRUPE40  XMT    SYSECCHK,R1         COIL RAM CHECKSUM FAILED
00335  7 00453              JMP    EXEC                EXIT TO EXEC
                  *
00336  6 01003    PWRUPE50  XMT    SYSENODE,R1         ILLEGAL NODE FOUND
00337  7 00453              JMP    EXEC                EXIT TO EXEC
                  *
00340  6 01014    PWRUPE70  XMT    SYSEEOL,R1          NO END-OF-LOGIC NODE
00341  7 00453              JMP    EXEC                EXIT TO EXIT

                  *
                  ***REMOVE NULL NODES FROM LOGIC MEMORY
                  *
                  *
00342  6 00002    PWRUP220  XMT    2,AUX               INCREMENT TO NEXT NODE
00343  1 04004              ADD    R4,R4
00344  0 10000              MOV    OVF,AUX
00345  1 03003              ADD    R3,R3
00346  0 02000              MOV    R2,AUX              SEE IF DONE SEARCHING FOR NULLS
00347  3 03000              XOR    R3,AUX              IF SO, R3 = R2
00350  5 00361              NZT    AUX,PWRUP200
                  *
                  ***EXIT TO EXEC
                  *
00351  6 01200    PWRUPX    XMT    SYSSRUNM,R1         SET RUN STATE
00352  7 00453              JMP    EXEC                EXIT TO EXEC
                  *
                  * CODE UP THERE DUE TO SHORT BRANCH PROBLEM
                  *
         00353    PWRUP190  EQU    *
00353  6 17065              XMT    EOLHI,IVR           GET EOL ADDRHI
00354  6 07021              XMT    IVISPD+IVOSPD,IVL *1 - SELECT SPD READ/WRITE
00355  6 00001              XMT    1,AUX
00356  1 37002              ADD    RB,R2               R2<- EOLHI+1
00357  6 03000              XMT    SYSUSERH,R3         (R3,R4) <- USER LOGIC BEGIN ADDR
00360  6 04002              XMT    SYSUSERL,R4
                  *
00361  6 07004    PWRUP200  XMT    IVOLRHI,IVL         SET LOGIC ADDRHI
00362  0 03027              MOV    R3,LB
00363  6 07003              XMT    IVOLRLO+IVILRDAT,IVL SELECT LOGIC ADDRLO AND LOGIC READ
00364  0 04027              MOV    R4,LB               SET LOGIC ADDRLO
00365  6 00134              XMT    NODENULL.L.2,AUX    *1 - AUX<- NULLHI
                            NOP                        *2 - WAIT
00366  0 00000  +           MOV    AUX,AUX
                            NOP                        *3 - WAIT
00367  0 00000  +           MOV    AUX,AUX
00370  3 37000              XOR    RB,AUX              SEE IF WE HAVE A NULL NODE
00371  5 00342              NZT    AUX,PWRUP220        NO, BRANCH
00372  0 03001              MOV    R3,R1               SAVE R3 IN R1
00373  0 04011              MOV    R4,R11              SAVE R4 IN R11
00374  6 00002              XMT    2,AUX               FROMADDR = TOADDR+2
00375  1 04006              ADD    R4,R6               (R5,R6) <- FROMADDR
00376  0 10000              MOV    OVF,AUX
00377  1 03005              ADD    R3,R5
00400  6 07004    PWRUP210  XMT    IVOLRHI,IVL         SELECT LOGIC ADDRHI
00401  0 05027              MOV    R5,LB               SET FROMADDR HI
00402  6 07003              XMT    IVOLRLO+IVILRDAT,IVL SELECT ADDRLO AND LOGIC READ
00403  0 06027              MOV    R6,LB
00404  6 00001              XMT    1,AUX               *1 - FOR INCREMENTING
00405  1 06006              ADD    R6,R6               *2 - BUMP FROMADDR
00406  0 10000              MOV    OVF,AUX             *3
00407  1 05005              ADD    R5,R5
00410  0 37000              MOV    RB,AUX              AUX <- DATA
00411  0 04027              MOV    R4,LB               SET TOADDR LO
00412  6 07004              XMT    IVOLRHI,IVL
00413  0 03027              MOV    R3,LB               SET TOADDR HI
00414  6 07011              XMT    IVOLRDAT,IVL        *1 - SELECT LOGIC WRITE
```

```
00415  0 00027             MOV   AUX,LB              WRITE DATA
00416  6 00001             XMT   1,AUX
00417  1 04004             ADD   R4,R4               BUMP TOADDR
00420  0 10000             MOV   OVF,AUX
00421  1 03003             ADD   R3,R3
00422  0 02000             MOV   R2,AUX              SEE IF WE ARE THRU MOVING DATA
00423  3 05000             XOR   R5,AUX              IF SO, R5 = R2
00424  5 00000             NZT   AUX,PWRUP210        LOOP UNTIL COMPRESSED ALL
00425  0 01003             MOV   R1,R3               RESTORE R3 AND R4
00426  0 11004             MOV   R11,R4
00427  7 00361             JMP   PWRUP200
                   *
                   ***POWER-DOWN ROUTINE
                   *
00430  6 11006     PWRDN   CALL  CKCHK               CALCULATE COIL RAM CHECKSUM
 0431  7 05350
00432  6 07000             XMT   IVOCRLO,IVL         SELECT COIL ADDRESS LOW
00433  6 02000             XMT   SYSCRCHL,R2         R2 <- LOW-ORDER ADDRESS
00434  0 02037             MOV   R2,RB               LOAD ADDRESS
00435  6 07001             XMT   IVOCRHI,IVL         SELECT COIL ADDRESS HIGH
00436  6 02001             XMT   SYSCRCHH,R2         R2 <- HIGH-ORDER ADDRESS
00437  0 02027             MOV   R2,LB               LOAD ADDRESS
00440  6 07002             XMT   IVOCRDAT,IVL        *1 - SELECT COIL WRITE
00441  0 06027             MOV   R6,LB               WRITE OUT CHECKSUM
00442  6 02002             XMT   SYSCRCHH+1,R2       R2 <- ADDRESS
00443  6 07001             XMT   IVOCRHI,IVL         SELECT PORT
00444  0 02027             MOV   R2,LB               LOAD ADDRESS
00445  0 06406             MOV   R6(4),R6            *1 - ROTATE CHECKSUM
00446  6 07002             XMT   IVOCRDAT,IVL        SELECT COIL WRITE
00447  0 06027             MOV   R6,LB               WRITE OUT CHECKSUM
                   *
                   ***PROCESSOR RESET
                   *
00450  6 07000             XMT   IVOCTRL,IVL         SELECT CONTROL PORT
00451  6 27307             XMT   CTRLPROC,CTRLREG     RESET THE PROCESSOR
00452  7 00000             JMP   PWRUP               EXIT TO POWER-UP FUNCTION
                   *
                   ***SYSTEM EXECUTIVE
                   *
                   *
                   ***INITIAL ENTRY ALWAYS CHANGES SYSTEM STATE
                   ***NEW STATE IN R1
                   *
00453  6 07000     EXEC    XMT   IVOCRLO,IVL         SELECT COIL ADDRESS LOW
00454  6 02001             XMT   SYSSTATL,R2         R2 <- ADDRESS
00455  0 02037             MOV   R2,RB               LOAD ADDRESS
00456  6 07001             XMT   IVOCRHI,IVL         SELECT COIL ADDRESS HIGH
00457  6 02001             XMT   SYSSTATH,R2         R2 <- ADDRESS
00460  0 02027             MOV   R2,LB               LOAD ADDRESS
00461  6 07002             XMT   IVOCRDAT,IVL        *1 - SELECT PORT
00462  0 01027             MOV   R1,LB               WRITE DATA
00463  6 02002             XMT   SYSSTATH+1,R2       R2 <- ADDRESS
00464  6 07001             XMT   IVOCRHI,IVL         SELECT PORT
00465  0 02027             MOV   R2,LB               LOAD ADDRESS
00466  0 01401             MOV   R1(4),R1            ROTATE STATE
00467  6 07002             XMT   IVOCRDAT,IVL        SELECT PORT
00470  0 01027             MOV   R1,LB               WRITE HIGH-ORDER STATE VECTOR
00471  0 01401             MOV   R1(4),R1            ROTATE STATE BACK
00472  6 00040             XMT   SYSSPDNM,AUX        AUX <- POWER-DOWN MASK
00473  3 01000             XOR   R1,AUX              AUX <- POWER-DOWN CHECK
00474  5 00076             NZT   AUX,EXEC005         AUX.NE.0 => NOT POWER-DOWN
00475  7 00430             JMP   PWRDN               AUX.EQ.0 => POWER-DOWN
                   *
                   EXEC005 WSP   SYSSTATE,R1         LOAD NEW STATE TO SCRATCHPAD
00476  6 07021     +       XMT   IVISPD+IVOSPD,IVL   SELECT SPD READ/WRITE
00477  6 17275     +       XMT   SYSSTATE,IVR                 LOAD ADDRESS
00500  0 01037     +       MOV   R1,RB                WRITE DATA
00501  6 02001             XMT   1,R2                R2 <- VALUE
00502  6 17061             XMT   FRSTPASS,IVR        SET FIRST I/O PASS ON STATE CHANGE
00503  0 02037             MOV   R2,RB               SET FLAG
                   *
00504  6 11007     EXEC010 CALL  INTRP               DO INTERRUPT CHECK
00505  7 05103
00506  5 01113             NZT   R1,EXEC015          R1.NE.0 => ERROR STATE
00507  6 17275             XMT   SYSSTATE,IVR        LOAD ADDRESS OF STATE VECTOR
00510  6 07020             XMT   IVISPD,IVL          SELECT PORT
00511  5 30114             NZT   SYSSRUNB,EXEC020    BRANCH ON RUN STATE
00512  7 02626             JMP   EXEC030             BRANCH ON NON-RUN STATE
                   *
00513  7 00453     EXEC015 JMP   EXEC
                   *
         00514     EXEC020 EQU   *                   FIELD I/O
                   *
                   ***FIELD I/O MODULE
                   *
                   ***PERFORM NON-BUS TEST
                   *
00514  6 17062     FLDIO   XMT   LEDSTATE,IVR       LOAD SCRATCHPAD ADDRESS
00515  6 07027             XMT   IVISPD+IVOICTRL,IVL SELECT PORTS
00516  6 00003             XMT   IOCROUT8+IOCROUT9,AUX AUX <- MASK
00517  0 37011             MOV   RB,R11             R11 <- LED STATE
00520  3 11027             XOR   R11,LB             LOAD CONTROL REGISTER
00521  6 00377             XMT   11111111B,AUX      AUX <- PATTERN
00522  6 07005             XMT   IVOIDATA,IVL       SELECT PORT
```

```
00523 0 00027               MOV    AUX,LB             WRITE BUS TEST DATA
                         *
                         ***WAIT OF 19 INSTRUCTIONS REQUIRED
                         *
                            CLR    R1                 *1 - R1 <- FIRST COIL RAM ADDRESS
00524 6 01000   +           XMT    0,R1
                            WSP    COILADDR,R1        *2 - WRITE TO SCRATCHPAD
00525 6 07021   +           XMT    IVISPD+IVOSPD,IVL  SELECT SPB READ/WRITE
00526 6 17064   +           XMT    COILADDR,IVR            LOAD ADDRESS
00527 0 01037   +           MOV    R1,RB               WRITE DATA
00530 6 07000               XMT    IVOCRLO,IVL        *5 - SELECT COIL ADDRESS LOW
00531 0 01037               MOV    R1,RB              *6 - LOAD ADDRESS
00532 6 07001               XMT    IVOCRHI,IVL        *7 - SELECT COIL ADDRESS HIGH
00533 0 01027               MOV    R1,LB              *8 - LOAD ADDRESS
00534 6 01021               XMT    IOSTRIPA+IOBYTEO,R1 *9 - R1 <- INITIAL I/O ADDRESS
00535 6 17277               XMT    SPDCONF2,IVR       *10 - LOAD SCRATCHPAD ADDRESS
00536 6 07020               XMT    IVISPD,IVL         *11 - SELECT PORT
00537 6 06002               XMT    2,R6               *12 - R6 <- LOOP COUNTER
00540 5 33102               NZT    SYSCO648,FLDIO010  *13 - SKIP IF ONLY 64 I/O POINTS
00541 6 06004               XMT    4,R6               *14 - SET LOOP COUNTER FOR 128 I/O
00542 6 07100     FLDIO010  XMT    IVIIDATA,IVL       *15 - SELECT PORT
00543 6 00377               XMT    11111111B,AUX      *16 - AUX <- MASK
                            NOP                       *17 - WAIT
00544 0 00000   +           MOV    AUX,AUX
                            NOP                       *18 - WAIT
00545 0 00000   +           MOV    AUX,AUX
                            NOP                       *19 - WAIT
00546 0 00000   +           MOV    AUX,AUX
                            NOP                       *20 - WAIT PRECAUTION
00547 0 00000   +           MOV    AUX,AUX
00550 3 27000               XOR    LB,AUX             TEST LOW-ORDER BITS FOR ONES
00551 5 00176               NZT    AUX,FLDIO040       AUX.NE.0 => ERROR
00552 6 07047               XMT    IVISTAT+IVOICTRL,IVL SELECT PORTS
00553 0 27003               MOV    LB,R3              R3 <- STATUS SENSE
00554 6 00003               XMT    STATIN8M+STATIN9M,AUX AUX <- MASK
00555 2 03003               AND    R3,R3              ISOLATE BITS
00556 3 03000               XOR    R3,AUX             AUX.EQ.0 => OKAY
00557 5 00176               NZT    AUX,FLDIO040       AUX.NE.0 => ERROR
00560 0 11027               MOV    R11,LB             CLEAR HIGH-ORDER BITS
00561 6 07005               XMT    IVOIDATA,IVL       SELECT PORT
00562 0 00027               MOV    AUX,LB             CLEAR LOW-ORDER BITS
                         *
                         ***WAIT OF 19 INSTRUCTIONS REQUIRED
                         *
00563 6 07040               XMT    IVISTAT,IVL        *1 - SELECT PORT
00564 6 02011               XMT    9,R2               CREATE WAIT LOOP
00565 6 00377               XMT    -1,AUX             AUX <- DECREMENT
00566 1 02002     FLDIO030  ADD    R2,R2              DECREMENT COUNTER
00567 5 02166               NZT    R2,FLDIO030        LOOP UNTIL DONE
00570 6 00003               XMT    STATIN8M+STATIN9M,AUX AUX <- MASK
00571 2 27003               AND    LB,R3              R3 <- HIGH-ORDER BITS
00572 5 03176               NZT    R3,FLDIO040        R3.NE.0 => ERROR
00573 6 07106               XMT    IVIIDATA+IVOIADDR,IVL SELECT PORTS
00574 5 27036               NZT    LB,FLDIO040        BRANCH ON ERROR
00575 7 00600               JMP    FLDIO050           CONTINUE
                         *
00576 6 01004     FLDIO040  XMT    SYSEIO,R1          I/O TEST FAILED
00577 7 00727               JMP    FLDIOX             GO TO COMMON EXIT
                         *
                         ***MAIN PROCESSING LOOP
                         *
00600 0 01027     FLDIO050  MOV    R1,LB              LOAD I/O ADDRESS
00601 6 17062               XMT    LEDSTATE,IVR       LOAD SCRATCHPAD ADDRESS
00602 6 07027               XMT    IVOICTRL+IVISPD,IVL SELECT I/O CONTROL
00603 6 00010               XMT    IOCRDIN,AUX        AUX <- DISCRETE INPUT ENABLE
00604 3 37027               XOR    RB,LB              ENABLE DISCRETE INPUTS
                         *
                         ***WAIT OF 26 INSTRUCTIONS REQUIRED
                         ***BUILD FIRST OUTPUT NIBBLE
                         *
                            CLR    R3                 INITIALIZE OUTPUT BYTE
00605 6 03000   +           XMT    0,R3
00606 6 11010               CALL   OUTPUT             BUILD FIRST NIBBLE
00607 7 05646
00610 6 07100               XMT    IVIIDATA,IVL       SELECT PORT
00611 0 27004               MOV    LB,R4              R4 <- INPUT BYTE
00612 6 17062               XMT    LEDSTATE,IVR       LOAD SCRATCHPAD ADDRESS
00613 6 07027               XMT    IVISPD+IVOICTRL,IVL SELECT PORTS
00614 0 37027               MOV    RB,LB              TURN OFF STROBE
00615 6 11011               CALL   OUTPUT             BUILD SECOND NIBBLE
00616 7 05646
00617 6 07005               XMT    IVOIDATA,IVL       SELECT I/O WRITE
00620 0 03027               MOV    R3,LB              LOAD DATA TO BUS
                         *
                         ***WAIT OF 19 INSTRUCTIONS REQUIRED
                         *
00621 6 17064               XMT    COILADDR,IVR       LOAD SCRATCHPAD ADDRESS REGISTER
00622 6 07020               XMT    IVISPD+IVOCRLO,IVL SELECT PORTS
00623 0 37037               MOV    RB,RB              LOAD COIL ADDRESS LOW
00624 6 11012               CALL   INPUT              UNLOAD FIRST NIBBLE
00625 7 05663
00626 6 07007               XMT    IVOICTRL,IVL       SELECT CONTROL
00627 6 30004               XMT    IOCRDOUT,AUX       AUX <- CONTROL PULSE
00630 0 00027               MOV    AUX,LB             ENABLE OUTPUT STROBE
                         *
                         ***WAIT OF 10 INSTRUCTIONS REQUIRED
```

```
                                    *
                                            WSP     SAVER1,R1           SAVE I/O ADDRESS
        00631   6 07021             +       XMT     IVISPD+IVOSPD,IVL SELECT SPD READ/WRITE
        00632   6 17023             +       XMT     SAVER1,IVR                LOAD ADDRESS
        00633   0 01037             +       MOV     R1,RB                WRITE DATA
                                            WSP     SAVER6,R6           SAVE COUNTER
        00634   6 07021             +       XMT     IVISPD+IVOSPD,IVL SELECT SPD READ/WRITE
        00635   6 17030             +       XMT     SAVER6,IVR                LOAD ADDRESS
        00636   0 06037             +       MOV     R6,RB                WRITE DATA
                                            WSP     SAVER4,R4
        00637   6 07021             +       XMT     IVISPD+IVOSPD,IVL SELECT SPD READ/WRITE
        00640   6 17026             +       XMT     SAVER4,IVR                LOAD ADDRESS
        00641   0 04037             +       MOV     R4,RB                WRITE DATA
        00642   6 11013                     CALL    INTRP               CHECK INTERRUPTS
        00643   7 05123
        00644   5 01327                     NZT     R1,FLDIOX           EXIT ON ERROR
                                            RSP     SAVER4,R4
        00645   6 17026             +       XMT     SAVER4,IVR                LOAD ADDRESS
        00646   6 07021             +       XMT     IVISPD+IVOSPD,IVL *1 - SELECT SPD READ
        00647   0 37004             +       MOV     RB,R4                READ DATA
                                            RSP     SAVER1,R1           RESTORE I/O ADDRESS
        00650   6 17023             +       XMT     SAVER1,IVR                LOAD ADDRESS
        00651   6 07021             +       XMT     IVISPD+IVOSPD,IVL *1 - SELECT SPD READ
        00652   0 37001             +       MOV     RB,R1                READ DATA
                                            RSP     SAVER6,R6           RESTORE COUNTER
        00653   6 17030             +       XMT     SAVER6,IVR                LOAD ADDRESS
        00654   6 07021             +       XMT     IVISPD+IVOSPD,IVL *1 - SELECT SPD READ
        00655   0 37006             +       MOV     RB,R6                READ DATA
        00656   6 17062                     XMT     LEDSTATE,IVR        LOAD SCRATCHPAD ADDRESS
        00657   6 07027                     XMT     IVISPD+IVOICTRL,IVL SELECT CONTROL
        00660   0 37027                     MOV     RB,LB               DISABLE OUTPUT STROBE
                                    *
                                    ***WAIT OF 20 INSTRUCTIONS REQUIRED
                                    *
        00661   6 11014                     CALL    INPUT               UNLOAD SECOND NIBBLE
        00662   7 05660
        00663   6 17064                     XMT     COILADDR,IVR        SELECT COIL ADDRESS
        00664   6 00010                     XMT     8,AUX               AUX <- INCREMENT
        00665   6 07021                     XMT     IVISPD+IVOSPD,IVL SELECT SCRATCHPAD WRITE AND READ
        00666   1 37037                     ADD     RB,RB               UPDATE ADDRESS
        00667   6 00017                     XMT     IOBYTE0+IOBYTE1+IOBYTE2+IOBYTE3,AUX AUX <- PATTERN
        00670   2 01003                     AND     R1,R3               ISOLATE BYTE ID
        00671   2 03703                     AND     R3(7),R3            SHIFT LEFT AND MASK
        00672   5 03303                     NZT     R3,FLDIO070         BRANCH IF STILL ON THIS STRIP
        00673   6 03001                     XMT     IOBYTE0,R3          SET UP FOR BYTE 0 AGAIN
        00674   6 00377                     XMT     -1,AUX              AUX <- DECREMENT
        00675   1 06006                     ADD     R6,R6               DECREMENT STRIP COUNTER
        00676   5 06300                     NZT     R6,FLDIO060         BRANCH IF STILL WORKING
        00677   7 00713                     JMP     FLDIO080            FINISHED DISCRETE I/O
                                    *
        00700   6 00360             FLDIO060 XMT    IOSTRIPA+IOSTRIPB+IOSTRIPC+IOSTRIPD,AUX AUX <- MASK
        00701   2 01001                     AND     R1,R1               ISOLATE STRIP SELECT
        00702   0 01701                     MOV     R1(7),R1            SELECT NEXT STRIP
                                    *
        00703   6 00360             FLDIO070 XMT    IOSTRIPA+IOSTRIPB+IOSTRIPC+IOSTRIPD,AUX AUX <- MASK
        00704   2 01000                     AND     R1,AUX              AUX <- STRIP SELECT
        00705   3 03001                     XOR     R3,R1               R1 <- NEW ADDRESS
                                            CLR     R3                  RESET OUTPUT STATE
        00706   6 03000             +       XMT     0,R3
        00707   6 07005                     XMT     IVOIDATA,IVL        SELECT I/O OUTPUTS
        00710   0 03027                     MOV     R3,LB               CLEAR LOW-ORDER DATA
        00711   6 07006                     XMT     IVOIADDR,IVL        SELECT I/O ADDRESS
        00712   7 00600                     JMP     FLDIO050            CONTINUE PROCESSING
        00713   6 07040             FLDIO080 XMT    IVISTAT+IVOCTRL,IVL SELECT PORTS
        00714   5 24122                     NZT     STATWDTB,FLDIO090 BRANCH IF WDT RUNNING
        00715   6 17061                     XMT     FRSTPASS,IVR        LOAD SCRATCHPAD ADDRESS
        00716   6 07020                     XMT     IVISPD+IVOCTRL,IVL SELECT PORTS
        00717   5 37022                     NZT     RB,FLDIO090         FRSTPASS.NE.0 => TURN ON I/O
        00720   6 01012                     XMT     SYSEWDT,R1          FRSTPASS.EQ.0 =>  EXPIRED - ERROR
        00721   7 00727                     JMP     FLDIOX              GO TO EXIT
                                    *
        00722   6 27305             FLDIO090 XMT    CTRLWDT,CTRLREG      CTRLREG <- WDT PULSE
                                            CLR     R1                  INDICATE SUCCESS
        00723   6 01000             +       XMT     0,R1
                                            WSP     FRSTPASS,R1         CLEAR FRSTPASS FLAG
        00724   6 07021             +       XMT     IVISPD+IVOSPD,IVL SELECT SPD READ/WRITE
        00725   6 17061             +       XMT     FRSTPASS,IVR              LOAD ADDRESS
        00726   0 01037             +       MOV     R1,RB                WRITE DATA
                                    *
        00727   5 01331             FLDIOX  NZT     R1,FLDIOX10         ERROR IF R1 .NE. 0
        00730   7 00732                     JMP     FLDIOX20
                                    *
        00731   7 00453             FLDIOX10 JMP    EXEC                CHANGE STATE
                                    *
                000732              FLDIOX20 EQU    *
                                    *
                                    *   LOGIC MODULE
                                    *
        00732   6 00000             LOGIC000 XMT    SYSUSERH,AUX        START OF LOGIC ADDR -> LOGIC ADDR REG
        00733   6 07004                     XMT     IVOLRHI,IVL
        00734   0 00027                     MOV     AUX,LB
        00735   6 00002                     XMT     SYSUSERL,AUX
        00736   6 07003                     XMT     IVOLRLO,IVL
        00737   0 00027                     MOV     AUX,LB
                                            CLR     AUX                 *1  0->AUX
```

```
00740  6 00000   *           XMT    0,AUX
00741  6 17042               XMT    NETWORKH,IVR         *2 CLEAR NETWORK #
00742  0 00037               MOV    AUX,RB               *3
00743  6 07001               XMT    IVOCRHI,IVL          *1 SELECT COIL ADDR HI
00744  6 17043               XMT    NETWORKL,IVR
00745  0 00037               MOV    AUX,RB               0->NETWORKL
00746  0 00027               MOV    AUX,LH               0->COIL ADDR HI
                 *
00747  6 07000   LOGIC005 XMT    IVICRDAT+IVOCTRL,IVL  SELECT LOGIC READ & CONTRL PULSE
                 *
00750  0 37001   LOGIC010 MOV    RB,R1                GET FIRST BYTE OF NODE
00751  6 27300               XMT    CTRLINCL,CTRLREG     INCREMENT LOGIC ADDR
00752  6 00037               XMT    NODETYPM,AUX         *1
00753  2 01205               AND    R1(2),R5             *2 NODE TYPE->R5
00754  6 00003               XMT    NODEHMSK,AUX         *3 - AUX <- MASK FOR REFERENCE TYPE
00755  0 37002               MOV    RB,R2                GET 2ND BYTE OF NODE
00756  0 02037               MOV    R2,RB                LOAD COIL ADDR LO
00757  0 03703               MOV    R3(7),R3             ROTATE POWER.
00760  7 00760               JMP    LOGIC035             JMP TO XEC TO SOLVE PAGING PROBLEM
                 *
00761  6 07000   LOGIC020 XMT    IVICRDAT+IVOCTRL,IVL  SELECT LOGIC RAM READ, CONTROL REG
00762  6 27300               XMT    CTRLINCL,CTRLREG     INCREMENT LOGIC ADDR
00763  6 00200               XMT    NODEEOCM,AUX         *1
00764  2 01011               AND    R1,R11               *2 CHECK FOR END OF COLUMN MARK
00765  6 00377               XMT    -1,AUX               *3 PREPARE TO SUBTRACT FROM ROW COUNT
00766  5 11373               NZT    R11,LOGIC030         IF END OF COLUMN THEN GOTO LOGIC 030
00767  1 04004               ADD    R4,R4                ELSE, SUBTRACT FROM ROW COUNT
00770  5 04350               NZT    R4,LOGIC010          IF ROW COUNT.NE.0 THEN GOTO LOGIC010
00771  6 01013               XMT    SYSECOL,R1           ELSE, ERROR, COLUMN TOO LONG
00772  7 02623               JMP    LOGICX
                 *
00773  6 11015   LOGIC030 CALL   PWROTATE             ROTATE AND MASK POWER
00774  7 06546
00775  7 00747               JMP    LOGIC005             ELSE SOLVE NEXT NODE.
                 *
00776  7 01000               ORG    32,256
01000  4 05001               XEC    LOGICTAB(R5),32      VECTOR THRU JUMP TABLE TO SOLVE NODE
                                                         RETURN TO LOGIC020 WHEN NODE SOLVED
                 *
                 *
01001  7 01042   LOGICTAB JMP    LOG00000             START OF NETWORK
01002  7 01111               JMP    LOG01000             END OF LOGIC
01003  7 01143               JMP    LOG02000             END OF COLUMN
01004  7 01157               JMP    LOG03000             NORMALLY-OPEN RELAY
01005  7 01224               JMP    LOG04000             NORMALLY-CLOSED RELAY
01006  7 01271               JMP    LOG05000             POSITIVE-GOING TRANSITIONAL
01007  7 01271               JMP    LOG06000             NEGATIVE-GOING TRANSITIONAL
01010  7 01327               JMP    LOG07000             COIL
01011  7 01327               JMP    LOG08000             LATCHED COIL
01012  7 01337               JMP    LOG09000             DISABLED COIL
01013  7 01337               JMP    LOG10000             DISABLED LATCHED COIL
01014  7 01350               JMP    LOG11000             HORIZONTAL OPEN
01015  7 00761               JMP    LOG12000             HORIZONTAL CLOSED
01016  7 01353               JMP    LOG13000             PRESET/CALCULATE-B-NODE CONSTANT
01017  7 01365               JMP    LOG14000             PRESET/CALCULATE-B-NODE REGISTER
01020  7 01407               JMP    LOG15000             COUNTER
01021  7 01500               JMP    LOG16000             TIMER 1.00
01022  7 01500               JMP    LOG17000             TIMER 0.10
01023  7 01500               JMP    LOG18000             TIMER 0.01
01024  7 01534               JMP    LOG19000             CONVERT NODE
01025  7 02065               JMP    LOG20000             CALCULATE-C-NODE CONSTANT
01026  7 02074               JMP    LOG21000             CALCULATE-C-NODE REGISTER
01027  7 02112               JMP    LOG22000             CALCULATE - D NODE
01030  7 02617               JMP    LOG23000             NULL NODE
01031  7 02622               JMP    LOG24000             UNASSIGNED - ERROR
01032  7 02622               JMP    LOG25000             UNASSIGNED - ERROR
01033  7 02622               JMP    LOG26000             UNASSIGNED - ERROR
01034  7 02622               JMP    LOG27000             UNASSIGNED - ERROR
01035  7 02622               JMP    LOG28000             UNASSIGNED - ERROR
01036  7 02622               JMP    LOG29000             UNASSIGNED - ERROR
01037  7 02622               JMP    LOG30000             UNASSIGNED - ERROR
01040  7 02622               JMP    LOG31000             UNASSIGNED - ERROR
                 *
                 *   START OF NETWORK NODE
                 *
01041  7 02623   LOG00005 JMP    LOGICX               ERROR EXIT
                 *
01042  6 11016   LOG00000 CALL   INTRP                CALL INTERUPT PROCESSOR
01043  7 05103
01044  5 01041               NZT    R1,LOG00005          BRANCH ON ERROR
                 *
01045  6 07021   LOG00006 XMT    IVISPD+IVOSPD,IVL    SELECT SCRATCHPAD READ/WRITE
01046  6 17043               XMT    NETWORKL,IVR
01047  6 00001               XMT    1,AUX                *1
01050  1 37006               ADD    RB,R6                INCREMENT NETWORK #
01051  0 06037               MOV    R6,RB
01052  0 10003               MOV    OVF,AUX              *1 GET OVERFLOW
01053  6 17042               XMT    NETWORKH,IVR         ADD OVERFLOW TO NETWORK HI
01054  6 04011               XMT    9,R4                 *1 RESET ROW COUNTER
01055  1 37005               ADD    RB,R5                NETWORKH+OVF->R5
01056  0 05037               MOV    R5,RB
                             CLR    R11                  *1 CLEAR R11 FOR LATER USE
01057  6 11000   *           XMT    0,R11
01060  6 17040               XMT    POWERHI,IVR          CHECK FOR POWER DISPLAY
01061  0 05000               MOV    R5,AUX               *1 NETWORKH->AUX
01062  3 37000               XOR    RB,AUX               COMPARE POWERHI TO NETWORKH
```

```
                                ORG   10,32
01063  5 00101                  NZT   AUX,LOG00020       IF NETWORKH.NE.POWERHI THEN GO LOGCOC20
01064  6 17041                  XMT   POWERLO,IVR        ELSE COMPARE LOW ORDER
01065  0 06000                  MOV   R6,AUX             *1 NETWORKL->AUX
01066  3 37006                  XOR   RB,R6              COMPARE POWERLO TO NETWORKL
01067  5 06101                  NZT   R6,LOG00020        IF NETWORKL.NE.POWERLO THEN GGO LOG00020
                        *                                ELSE, CLEAR POWER DISPLAY BUFFER TABLE
01070  6 00001                  XMT   1,AUX              INCREMENT => AUX
01071  6 11365                  XMT   -11,R11            COUNT => R11
01072  6 05045                  XMT   POWER1,R5          TABLE START => R5
01073  0 05017         LOG00010 MOV   R5,IVR             GET TABLE WORD
01074  0 06037                  MOV   R6,RB              CLEAR IT.
01075  1 05005                  ADD   R5,R5              *1 STEP TO NEXT WORD
01076  1 11011                  ADD   R11,R11            COUNT DOWN
01077  5 11073                  NZT   R11,LOG00010       LOOP UNTIL R11.EQ.0
01100  6 11001                  XMT   1,R11              SET POWER DISPLAY FLAG
                        *
01101  6 00045         LOG00020 XMT   POWER1,AUX
01102  6 17060                  XMT   POWERPTR,IVR       INITIALIZE POWERPTR
01103  0 00037                  MOV   AUX,RB
01104  6 11001                  XMT   1,R11              *1
01105  6 17044                  XMT   POWER,IVR
01106  0 11037                  MOV   R11,RB
01107  6 03377                  XMT   -1,R3              INIT POWER BITS
01110  7 00761                  JMP   LOGIC020           SOLVE NEXT NODE
                        *
                        *   END OF LOGIC NODE
                        *
                        *           UPDATE LED STATE.
01111  6 17063         LOG01000 XMT   LEDLOC,IVR          GET COORDINATES
01112  6 07021                  XMT   IVOSPD+IVISPD,IVL
01113  0 37005                  MOV   RB,R5
01114  5 05116                  NZT   R5,LOG01010
01115  7 01124                  JMP   LOG01020            IF COORDINATES.EQ.[0,0] THEN LED <= 0
01116  6 00017         LOG01010 XMT   01111B,AUX          ELSE, GET ROW => R6
01117  2 05406                  AND   R5(4),R6
01120  2 05005                  AND   R5,R5               COLUMN => R5
01121  6 00044                  XMT   POWER1-1,AUX
01122  1 05017                  ADD   R5,IVR              POWER WORD ADDR => IVR
01123  4 06133                  XEC   LOG01TAB(R6),8       *1 LED STATE => R5
01124  6 17062         LOG01020 XMT   LEDSTATE,IVR        SAVE LED STATE
01125  0 05105                  MOV   R5(1),R5            PUT LED STATE IN BIT 7
01126  0 05037                  MOV   R5,RB
01127  6 07007                  XMT   IVOICTRL,IVL        *1 SELECT I/O CONTROL REGISTER
01130  0 05027                  MOV   R5,LB               STROBE LED
                                CLR   R1                  CLEAR ERROR INDICATOR
01131  6 01000         +        XMT   0,R1
01132  7 02623                  JMP   LOGICX              EXIT TO EXEC
                        *
                        *
                        *   EXECUTION TABLE TO GET LED STATE
                        *
01133  6 05000         LOG01TAB XMT   0,R5                ROW.EQ.0  SET LED.EQ.0
01134  0 20105                  MOV   LBBIT7,R5           ROW.EQ.1  ROW 1 POWER BIT => R5(0)
01135  0 21105                  MOV   LBBIT6,R5           ROW.EQ.2  ROW 2 POWER BIT => R5(0)
01136  0 22105                  MOV   LBBIT5,R5           ROW.EQ.3  ROW 3 POWER BIT => R5(0)
01137  0 23105                  MOV   LBBIT4,R5           ROW.EQ.4  ROW 4 POWER BIT => R5(0)
01140  0 24105                  MOV   LBBIT3,R5           ROW.EQ.5  ROW 5 POWER BIT => R5(0)
01141  0 25105                  MOV   LBBIT2,R5           ROW.EQ.6  ROW 6 POWER BIT => R5(0)
01142  0 26105                  MOV   LBBIT1,R5           ROW.EQ.7  ROW 7 POWER BIT => R5(0)
                        *
                        *
                        *   END OF COLUMN NODE
                        *
01143  6 00001         LOG02000 XMT   1,AUX
01144  1 04004                  ADD   R4,R4
01145  0 03103                  MOV   R3(1),R3
01146  6 11017                  CALL  PWROTATE            ROTATE AND MASK POWER
01147  7 06546
01150  6 07032                  XMT   IVOCOL+IVICOLIN,IVL SELECT PORTS
01151  0 03027                  MOV   R3,LB               COLUMN SOLVER <- POWER BITS
01152  6 04011                  XMT   9,R4                *1 - R4 <- COLUMN COUNT
                                NOP                       *2 - WAIT
01153  0 00000         +        MOV   AUX,AUX
                                NOP                       *3 - WAIT
01154  0 00000         +        MOV   AUX,AUX
01155  0 27003                  MOV   LB,R3               R3 <- UPDATED POWER
01156  7 00761                  JMP   LOGIC020            SOLVE NEXT COLUMN
                        *
                        *   NORMALLY OPEN NODE
                        *
01157  2 01005         LOG03000 AND   R1,R5               GET REFERENCE TYPE TO R5
01160  6 00376                  XMT   11111110B,AUX       MASK -> AUX
01161  4 05164                  XEC   LOG03TAB(R5),4      SOLVE NODE
01162  2 03003                  AND   R3,R3               UPDATE POWER
01163  7 00761                  JMP   LOGIC020            SOLVE NEXT NODE
                        *
01164  3 25100         LOG03TAB XOR   CRINPUT,AUX         INPUT TYPE REFERENCE
01165  3 26100                  XOR   CROUTPUT,AUX        OUTPUT TYPE REFERENCE
01166  3 27100                  XOR   CRINTRNL,AUX        INTERNAL COIL REFERENCE
                        *
                        *       CONDITIONAL ASSEMBLY FOR ENHANCED SET
                        *       IF ENHANCED SET, SEQUENCER REFFERENCE ARE ALLOWED
                        *       IF NOT ENHANCED SET, ASSEMBLE A NOP FOR SEQ REF.
                                IF    ENHANCE-1
                                ENDIF
```

```
                               *
                                        IF      ENHANCE
01167   7 01170                         JMP     LOG03010          SEQUENCER TYPE REFERENCE
                               *
01170   6 07021      LOG03010  XMT      IVOSPD+IVISPD,IVL SELECT SCRATCH PAD READ/WRITE
01171   6 17023                XMT      SAVER1,IVR
01172   0 01037                MOV      R1,RB             SAVE 1ST BYTE OF NODE
01173   6 01000                XMT      0,R1              *1
01174   6 17024                XMT      SAVER2,IVR
01175   0 02037                MOV      R2,RB             SAVE 2ND BYTE OF NODE
01176   6 00340                XMT      SEQREGM,AUX       MASK TO GET SEQ GROUP
01177   2 02502                AND      R2(SEQSHIFT),R2
01200   6 00063                XMT      SEQBASE,AUX       BASE OF SEQUENCER REGISTERS
01201   1 02002                ADD      R2,R2
01202   6 11020                CALL     REGVAL            GET DATA FROM REGISTER
01203   7 05700
01204   6 07021                XMT      IVOSPD+IVISPD,IVL SELECT SCRATCH PAD READ/WRITE
01205   6 17024                XMT      SAVER2,IVR        GET 2ND BYTE OF NODE
01206   6 00037                XMT      SEQSTEPM,AUX      *1
01207   2 37000                AND      RB,AUX            GET SEQUENCE REF #
01210   6 11001                XMT      1,R11             MAKE SEQ REF # RELATIVE TO '1'
01211   1 11000                ADD      R11,AUX
01212   3 02000                XOR      R2,AUX            COMPARE WITH SEQ REGISTER VALUE
01213   5 00217                NZT      AUX,LOG03020      IF MISCOMPARE OR
01214   5 01217                NZT      R1,LOG03020       IF R1.NE.0 TURN NODE OFF (NO POWR)
01215   6 00377                XMT      11111111B,AUX     ELSE NODE IS PASSING POWER, SET MASK
01216   7 01220                JMP      LOG03030
01217   6 00376      LOG03020  XMT      11111110B,AUX     NODE NOT PASSING POWER, SET MASK
                               *
01220   6 17023      LOG03030  XMT      SAVER1,IVR        GET 1ST BYTE OF NODE
01221   2 03003                AND      R3,R3             *1 UPDATE POWER WITH SOLUTION OF NODE
01222   0 37001                MOV      RB,R1             RECOVER 1ST BYTE
01223   7 00761                JMP      LOGIC020          SOLVE NEXT NODE
                                        ENDIF
                               *
                               *    NORMALLY CLOSED NODE
                               *
01224   2 01005      LOG04000  AND      R1,R5             REFERENCE TYPE -> R5
01225   6 00377                XMT      11111111B,AUX     MASK -> AUX
01226   4 05231                XEC      LOG04TAB(R5),4    SOLVE NODE
01227   2 03003                AND      R3,R3             UPDATE POWER
01230   7 00761                JMP      LOGIC020          SOLVE NEXT NODE
                               *
01231   3 25100      LOG04TAB  XOR      CRINPUT,AUX       INPUT TYPE REFERENCE
01232   3 26100                XOR      CROUTPUT,AUX      OUTPUT TYPE REFERENCE
01233   3 27100                XOR      CRINTRNL,AUX      INTERNAL COIL REFERENCE
                               *        CONDITIONAL ASSEMBLY FOR ENHANCED SET
                               *        ASSEMBLE SEQUENCER REFERENCE CODE IF ENHANCED SET
                               *        ASSEMBLE NOP IF NOT ENHANCED SET
                                        IF      ENHANCE-1
                                        ENDIF
                                        IF      ENHANCE
01234   7 01235                         JMP     LOG04010          SEQUENCER TYPE REF
                               *
01235   6 07021      LOG04010  XMT      IVOSPD+IVISPD,IVL  SELECT SCRATCH PAD READ/WRITE
01236   6 17023                XMT      SAVER1,IVR
01237   0 01037                MOV      R1,RB             SAVE 1ST BYTE OF NODE
01240   6 01000                XMT      0,R1              *1
01241   6 17024                XMT      SAVER2,IVR
01242   0 02037                MOV      R2,RB             SAVE 2ND BYTE OF NODE
01243   6 00340                XMT      SEQREGM,AUX       MASK TO GET SEQ GROUP
01244   2 02502                AND      R2(SEQSHIFT),R2
01245   6 00063                XMT      SEQBASE,AUX       BASE OF SEQUENCER REGS
01246   1 02002                ADD      R2,R2
01247   6 11021                CALL     REGVAL            GET CONTENTS OF SEQUENCER REGISTER
01250   7 05700
01251   6 07021                XMT      IVOSPD+IVISPD,IVL SELECT SCRATCH PAD READ/WRITE
01252   6 17024                XMT      SAVER2,IVR        GET SECOND BYTE OF NODE
01253   6 00037                XMT      SEQSTEPM,AUX      *1
01254   2 37000                AND      RB,AUX            GET SEQ REF #
01255   6 11001                XMT      1,R11             MAKE SEQ REF. # RELATIVE TO '1'
01256   1 11000                ADD      R11,AUX
01257   3 02000                XOR      R2,AUX            COMPARE WITH REGISTER CONTENTS
01260   5 00264                NZT      AUX,LOG04020      IF MISCOMPARE OR
01261   5 01264                NZT      R1,LOG04020       IF R1.NE.0 THEN NODE PASSING POWER
                               *
01262   6 00176                XMT      1111110B,AUX      ELSE NODE NOT PASSING POWER SET MASK
01263   7 01265                JMP      LOG04030
                               *
01264   6 00377      LOG04020  XMT      11111111B,AUX     NODE PASSING POWER, SET MASK
                               *
01265   6 17023      LOG04030  XMT      SAVER1,IVR        GET FIRST BYTE OF NODE
01266   2 03003                AND      R3,R3             UPDATE POWER WITH SOLUTION OF NODE
01267   0 37001                MOV      RB,R1             RECOVER R1
01270   7 00761                JMP      LOGIC020          SOLVE NEXT NODE
                                        ENDIF
                               *
                               ***ASSEMBLE TRANSITIONAL NODES ONLY IF ENHANCED INSTRUCTION SET.
                               *
                                        IF      ENHANCE
                               *
                               *    TRANSITIONAL NODES
                               *    BOTH UP AND DOWN TRANSITIONALS ARE HANDLED HERE
                               *    DIFFERENCES BETWEEN THE TWO ARE HANDLED BY EXECUTION TABLES
                               *
                               *    TRAN UP = (.NOT.HISTORY).AND.CURRENT
                               *    TRAN DOWN = (.NOT.CURRENT).AND.HISTORY
                               *
```

```
                           *      REFERENCES TO INPUTS, OUTPUTS, AND INTERNAL COILS ALLOWED.
                           *      SEQUENCER REFERENCES NOT ALLOWED (NODE SET TO 'NOT PASSING
                           *      POWER ON SEQ REF)
                           *
           001271          LOG05000 EQU    *
01271   2 01005            LOG06000 AND    R1,R5              R5 <- REFERENCE TYPE
01272   6 07021                     XMT    IVISPD+IVOSPD,IVL  SELECT SCRATCHPAD READ/WRITE
01273   6 17277                     XMT    SPDCONF2,IVR
01274   6 00000                     XMT    SYSTRANB,AUX        *1 CHECK IF TRANSITIONALS ARE ALLOWED
01275   2 37000                     AND    RB,AUX
01276   6 07000                     XMT    IVICRDAT+IVOCTRL,IVL  SELECT COIL RAM DATA READ
01277   5 00301                     NZT    AUX,LOG05020        IF TRANS ALLOWED THEN GO TO LOG05020
01300   6 05003                     XMT    00000011B,R5       SET 'REFERENCE TYPE' TO SEQUENCER
                           *
01301   4 05307            LOG05020 XEC    LOG05TAB(R5),8
01302   4 05317                     XEC    LOG06TAB(R5),8
01303   6 11376                     XMT    11111110B,R11      MASK SO THAT OTHER BITS ARE NOT ALTERED
01304   3 11000                     XOR    R11,AUX
01305   2 03003                     AND    R3,R3              UPDATE POWER WITH SOLUTION OF NODE
01306   7 00761                     JMP    LOGIC020
                           *
01307   3 25100            LOG05TAB XOR    CRINPUT,AUX        000 TRAN DOWN INPUT REF 'NOT CURRENT'
01310   3 26100                     XOR    CROUTPUT,AUX       001 TRAN DWN OUTPUT REF 'NOT CURRENT'
01311   3 27100                     XOR    CRINTRNL,AUX       010 TRAN DOWN INTRNL REF 'NOT CURRENT'
01312   6 00000                     XMT    0,AUX              011 SEQUENCER REF 0-> AUX
01313   3 21100                     XOR    CRINHIS,AUX        100 TRAN UP INPUT REF 'NOT HISTORY'
01314   3 22100                     XOR    CROUTHIS,AUX       101 TRAN UP OUTPUT REF 'NOT HISTORY'
01315   3 23100                     XOR    CRINTHIS,AUX       110 TRAN UP INTRNL REF 'NOT HISTORY'
01316   6 00000                     XMT    0,AUX              111 SEQUENCER REF 0-> AUX
                           *
01317   2 21100            LOG06TAB AND    CRINHIS,AUX        000 TRAN DWN INPUT REF 'AND HISTORY'
01320   2 22100                     AND    CROUTHIS,AUX       001 TRAN DWN OUTPUT REF 'AND HISTORY'
01321   2 23100                     AND    CRINTHIS,AUX       010 TRAN DWN INTRNL REF 'AND HISTORY'
                                    NOP                       011 SEQUENCER REF.
01322   0 00000            +        MOV    AUX,AUX
01323   2 25100                     AND    CRINPUT,AUX        100 TRAN UP INPUT REF 'AND CURRENT'
01324   2 26100                     AND    CROUTPUT,AUX       101 TRAN UP OUTPUT REF 'AND CURRENT'
01325   2 27100                     AND    CRINTRNL,AUX       110 TRAN UP INTRNL REF 'AND CURRENT'
                                    NOP                       111 SEQUENCER REF.
01326   0 00000            +        MOV    AUX,AUX
                           *
                                    ENDIF
                           ***END OF TRANSITIONAL NODE AREA.
                           *    IF ENHANCED SET IS NOT USED, THIS AREA WILL NOT ASSEMBLE
                           *    AND THE NODE VECTORING WOULD GO TO THE UNASSIGNED NODE TYPE
                           *    AREA (WHICH HAS CONDITIONAL ASSEMBLY FEATURES AS WELL)
                           *
                           *
                           *     COIL AND LATCHED COIL NODES
                           *
           001327          LOG07000 EQU    *
01327   6 07002            LOG08000 XMT    IVOCRDAT+IVICRDAT,IVL  SELECT COIL RAM WRITE
01330   2 01005                     AND    R1,R5              GET REFFERENCE TYPE
01331   4 05333                     XEC    LOG07TAB(R5),4
01332   7 00761                     JMP    LOGIC020           SOLVE NEXT NODE
                           *
                           LOG07TAB NOP                       INPUT REFFERENCE
01333   0 00000            +        MOV    AUX,AUX
01334   0 03126                     MOV    R3,CROUTPUT        OUTPUT COIL REF
01335   0 03127                     MOV    R3,CRINTRNL        INTERNAL COIL REF
                                    NOP                       SEQUENCER REF
01336   0 00000            +        MOV    AUX,AUX
                           *
                           *    DISABLED COIL OR DISABLED LATCHED COIL
                           *
           001337          LOG09000 EQU    *
01337   2 01005            LOG10000 AND    R1,R5              GET REFERENCE TYPE
01340   6 00376                     XMT    11111110B,AUX
01341   2 03003                     AND    R3,R3              SET POWER OFF
01342   4 05344                     XEC    LOG09TAB(R5),4     GET POWER STATE
01343   7 00761                     JMP    LOGIC020           SOLVE NEXT NODE
                           *
                           LOG09TAB NOP                       INPUT REFERENCE
01344   0 00000            +        MOV    AUX,AUX
01345   3 26103                     XOR    CROUTPUT,R3        OUTPUT REFERENCE
01346   3 27103                     XOR    CRINTRNL,R3        INTERNAL REFERENCE
                                    NOP                       SEQUENCER REFERENCE
01347   0 00000            +        MOV    AUX,AUX
                           *
                           ***HORIZONTAL OPEN
                           *
01350   6 00376            LOG11000 XMT    11111110B,AUX      AUX <- MASK
01351   2 03003                     AND    R3,R3              SHORT STOPS POWER
01352   7 00761                     JMP    LOGIC020           CONTINUE
                           *
                           ***HORIZONTAL SHORT
                           *
           000761          LOG12000 EQU    LOGIC020           ALWAYS PASSES POWER
                           *

                           *
                           *    CALCULATE B NODE CONSTANT
                           *
01353   6 07021            LOG13000 XMT    IVOSPD+IVISPD,IVL  SELECT SCRATCH PAD R
01354   6 17000                     XMT    CALCBHI,IVR        STORE HI ORDER
01355   2 01037                     AND    R1,RB
```

```
                                NOP                            *1
01356   0 00000   +             MOV     AUX,AUX
01357   6 17001                 XMT     CALCBLO,IVR
01360   0 02037                 MOV     R2,RB
01361   6 00377                 XMT     -1,AUX                 *1
01362   6 17006                 XMT     CALBADRH,IVR           SET DIVIDEND SINGLE PRECISION FLAG
01363   0 00037                 MOV     AUX,RB                 USED FOR DIVIDE NODE
01364   7 00761                 JMP     LOGIC020
                  *
                  *     CALCULATE B NODE REGISTER
                  *
                  LOG14000 WSP  CALBADRH,R1                    SAVE NODE DATA FOR DIVIDE NODE
01365   6 07021   +             XMT     IVISPD+IVOSPD,IVL      SELECT SPD READ/WRITE
01366   6 17006   +             XMT     CALBADRH,IVR                   LOAD ADDRESS
01367   0 01037   +             MOV     R1,RB                   WRITE DATA
                                WSP     CALBADRL,R2
01370   6 07021   +             XMT     IVISPD+IVOSPD,IVL      SELECT SPD READ/WRITE
01371   6 17007   +             XMT     CALBADRL,IVR                   LOAD ADDRESS
01372   0 02037   +             MOV     R2,RB                   WRITE DATA
01373   6 11022                 CALL    REGVAL                 GET REGISTER DATA
01374   7 05700
01375   6 07021                 XMT     IVOSPD+IVISPD,IVL      SELECT SCRATCH PAD READ/WRITE
01376   6 17000                 XMT     CALCBHI,IVR            SAVE HIGH ORDER DATA
01377   0 01037                 MOV     R1,RB
                                NOP                            *1
01400   0 00000   +             MOV     AUX,AUX
01401   6 17006                 XMT     CALBADRH,IVR
                                NOP                            *1
01402   0 00000   +             MOV     AUX,AUX
01403   0 37001                 MOV     RB,R1                  RESTORE 1ST BYTE OF NODE
01404   6 17001                 XMT     CALCBLO,IVR
01405   0 02037                 MOV     R2,RB                  SAVE LOW ORDER REGISTER VALUE
01406   7 00761                 JMP     LOGIC020               SOLVE NEXT NODE
                  *     COUNTER NODE
                  *         PARTS OF THIS NODE SOLVE (FROM LOG15020) ARE
                  *         USED BY TIMER NODE SOLVE.
                  *
01407   6 07021   LOG15000 XMT  IVOSPD+IVISPD,IVL              SELECT SCRATCH PAD READ/WRITE
01410   6 17023                 XMT     SAVER1,IVR             SAVE 1ST BYTE OF NODE
01411   0 01037                 MOV     R1,RB
01412   6 11023                 CALL    REGVAL                 GET REGISTER VALUE, ADDRESS
01413   7 05700
01414   6 17067                 XMT     CNTRPWR,IVR            GET COUNTER POWER HISTORY
01415   6 07021                 XMT     IVOSPD+IVISPD,IVL      SELECT SCRATCH PAD READ/WRITE
01416   0 36100                 MOV     CTRPWRHY,AUX           POWER HISTORY, RIGHT JUSTIFIED -> AUX
01417   3 03100                 XOR     R3(1),AUX              HIS POW (HP).XOR.CURRENT POWER (CP)
01420   2 03100                 AND     R3(1),AUX              TRANS UP = CP.AND.(CP.XOR.HP)
01421   6 11001                 XMT     1,R11
01422   2 11000                 AND     R11,AUX                LSB ONLY
01423   1 02002                 ADD     R2,R2                  ADD TRANS UP PULSE TO COUNT
01424   0 10000                 MOV     OVF,AUX
01425   1 01001                 ADD     R1,R1
01426   6 00375                 XMT     CTRPWRM1,AUX           RESET POWER HISTORY, MASK => AUX
01427   2 37011                 AND     RB,R11                 CLEAR 'OLD' HISTORY BIT
01430   6 00002                 XMT     CTRPWRM2,AUX           AUX SINGLE OUT 'NEW' HISTORY
01431   2 03000                 AND     R3,AUX
01432   3 11037                 XOR     R11,RB                 UPDATE HISTORY
                                CLR     R11
01433   6 11000   +             XMT     0,R11
01434   6 00001                 XMT     1B,AUX                 CHECK FOR RESET
01435   2 03000                 AND     R3,AUX
01436   5 00042                 NZT     AUX,LOG15020           IF.NOT.RESET THEN GOTO LOG15020
                                CLR     R1                     ELSE CLEAR COUNT
01437   6 01000   +             XMT     0,R1
                                CLR     R2
01440   6 02000   +             XMT     0,R2
01441   7 01455                 JMP     LOG15021
01442   6 07021   LOG15020 XMT  IVOSPD+IVISPD,IVL              SELECT SCRATCH PAD READ WRITE
                  *                                            COUNT (OR TIME) IS IN [R1,R2]
                  *                                            PRESET IS IN SCRATCH PAD
                  *                                            [CALCBHI,CALCBLO]
                  *                                            POWER IS IN R3
                  *                                            IF COUNT.GE.PRESET
                  *                                                THEN
                  *                                                    COUNT <- PRESET
                  *                                                    POWER <- POWER.AND.(.NOT.3)
                  *                                                    POWER <- POWER.OR.00000010B
                  *                                                 ELSE
                  *                                                    POWER <- POWER.AND.(.NOT.3)
                  *                                                    POWER <- POWER.OR.00000001B
                  *
                  *                                            TO DETERMINE IF COUNT.GE.PRESET
                  *                                            SET AUX=.NOT.COUNTLO           (R2)
                  *                                            SET AUX= AUX + CALCBLO
                  *                                            SET R11= OVERFLOW LOW
                  *                                            SET AUX=.NOT.COUNTHI           (R1)
                  *                                            SET AUX= AUX + CALCBHI
                  *                                            SET R11= AUX + OVERFLOW LOW    (R11)
                  *
                  *                                            IF R11(7)=1, THEN COUNT.GT.PRESET
                  *
                  *                                            IN REGISTERS, THIS FLOW IS:
                  *                                            AUX=.NOT.R2
                  *                                            AUX= AUX + SP[CALCBLO]
                  *                                            R11= OVF
                  *                                            AUX=.NOT.R1
```

```
                         *                          AUX= AUX + SP[CALCBHI]
                         *                          R11= AUX + R11
                         *
01443  6 17001                XMT    CALCBLO,IVR
01444  6 00377                XMT    -1,AUX         *1
01445  3 02000                XOR    R2,AUX         AUX=.NOT.COUNTLO
01446  1 37000                ADD    RB,AUX         AUX= AUX + CALCBLO
01447  0 10011                MOV    OVF,R11        R11= OVERFLOW LOW
01450  6 17000                XMT    CALCBHI,IVR
01451  6 00377                XMT    -1,AUX         *1
01452  3 01000                XOR    R1,AUX         AUX=.NOT.COUNTHI
01453  1 37000                ADD    RB,AUX         AUX= AUX + CALCBHI
01454  1 11011                ADD    R11,R11        R11= AUX + OVERFLOW LOW
01455  6 00374       LOG15021 XMT    11111100B,AUX
01456  2 03003                AND    R3,R3          SET POWER TO OFF
01457  6 00001                XMT    01B,AUX
01460  3 03003                XOR    R3,R3          SET POWER TO COUNT.LT.PRESET
01461  6 00200                XMT    10000000B,AUX  CHECK SIGN OF R11
01462  2 11011                AND    R11,R11
01463  5 11065                NZT    R11,LOG15025   IF COUNT.LT.PRESET THEN GOTO LOG15030
01464  7 01472                JMP    LOG15030
01465  0 37001       LOG15025 MOV    RB,R1          ELSE, SET COUNT.EQ.PRESET
01466  6 17001                XMT    CALCBLO,IVR    GET LOW ORDER
01467  6 00003                XMT    00000011B,AUX
01470  3 03003                XOR    R3,R3          SET POWER, R3(2)<-1
01471  0 37002                MOV    RB,R2
                         *
01472  6 11024       LOG15030 CALL   STORE          STORE NEW COUNT/TIME
01473  7 05777
01474  6 17023                XMT    SAVER1,IVR
01475  6 07021                XMT    IVOSPD+IVISPD,IVL SELECT SCRATCH PAD READ/WRITE
01476  0 37001                MOV    RB,R1          RESTORE 1ST BYTE OF NODE
01477  7 00761                JMP    LOG10020       SOLVE NEXT NODE
                         *    TIMERS NODE
                         *       DIFFERENCES IN TIME BASE HANDLED BY EXECUTION TABLE
                         *
         001500      LOG16000 EQU    *
         001500      LOG17000 EQU    *
01500  6 07021       LOG18000 XMT    IVOSPD+IVISPD,IVL SELET SCRATCH PAD READ/WRITE
01501  6 17023                XMT    SAVER1,IVR
01502  0 01037                MOV    R1,RB          SAVE 1ST BYTE OF NODE
01503  6 11025                CALL   REGVAL         GET DESTINATION REG ADDR & DATA
01504  7 05700
01505  6 07021                XMT    IVOSPD+IVISPD,IVL SELECT SCRATCH PAD READ/WRITE
01506  6 00001                XMT    1,AUX          CHECK FOR RESET
01507  2 03000                AND    R3,AUX
01510  5 00115                NZT    AUX,LOG16010   IF .NOT.RESET THEN GOTO LOG 18010
                              CLR    R1             ELSE, CLEAR TIME
01511  6 01000       +        XMT    0,R1
                     *        CLR    R2
01512  6 02000       +        XMT    0,R2
                              CLR    R11            SET COUNT.LT.PRESET FLAG
01513  6 11000       +        XMT    0,R11
01514  7 01455                JMP    LOG15021
                         *
01515  2 03100       LOG16010 AND    R3(1),AUX      CHECK FOR ENABLE
01516  5 00120           *    NZT    AUX,LOG16020   IF ENABLED THEN GOTO LOG16020
01517  7 01442                JMP    LOG15020       ELSE, TIME REMAINS SAME, COMPARE PRSET
                         *
01520  6 17023       LOG16020 XMT    SAVER1,IVR     GET NODE TYPE
01521  6 00360                XMT    -NODET100,AUX  *1 MAKE IT RELATIVE: TIMERS TO 0
01522  1 35500                ADD    SAVENODE,AUX
                              ORG    10,32
01523  4 00131                XEC    LOG16TAB(AUX),3 GET TIME IN PROPER BASE
01524  0 02000                MOV    R2,AUX         *1
01525  1 37002                ADD    RB,R2          ADD TO ACCUMULATED TIME
01526  0 10000                MOV    OVF,AUX
01527  1 01001                ADD    R1,R1
01530  7 01442                JMP    LOG15020       COMPARE TIME VS. PRESET
                         *
                         *    EXECUTION TABLE FOR TIMER NODES
                         *    SELECT PROPER SCRATCH PAD LOCATION
                         *    CONTAINING TIME IN THE PROPER BASE
                         *
01531  6 17020       LOG16TAB XMT    TIMER100,IVR
01532  6 17017                XMT    TIMER010,IVR
01533  6 17016                XMT    TIMER001,IVR
                     ***CONDITIONAL ASSEMBLY FOR CALCULATE NODES
                     *   CALCULATE NODES WILL ASSEMBLE ONLY IF THIS IS
                     *   THE ENHANCED INSTRUCTION SET, AS DEFINED BY 'ENHANCE'
                     *   IN THE GLOBAL MODULE.
                              IF     ENHANCE
                     *
                     *
                     *
                     ***CONVERT NODE
                     *
                     *
01534  2 01011       LOG19000 AND    R1,R11         NODE TYPE => R11
01535  4 11136                XEC    LOG19TAB(R11),4 VECTOR TO CONVERT NODE
                     *
01536  7 01542       LOG19TAB JMP    LOG19100       DISCRETE SOURCE NODE
01537  7 01572                JMP    LOG19200       REGISTER SOURCE NODE
01540  7 01577                JMP    LOG19300       BINARY => BCD, DISCRETE DESTINATION
```

```
2181  01541  7 01742              JMP    LOG19400             BCD => BINARY, REGISTER DESTINATIN
2182                      *
2183                      *
2185                      *
2186                      *
2187  01542  6 07000      LOG19100 XMT    IVOCTRL+IVICRDAT,IVL SELECT CONTROL PULSE & COIL RAM READ
2188                               CLR    R5                   CLEAR ASSEMBLY REGISTERS
2188  01543  6 05000  +            XMT    0,R5
2189                               CLR    R6
2189  01544  6 06000  +            XMT    0,R6
2190  01545  6 00377               XMT    -1,AUX
2191  01546  3 02000               XOR    R2,AUX               CHECK FOR DUMMY REFFERENCE
2192  01547  5 02151               NZT    R2,LOG19110
2193  01550  7 01563               JMP    LOG19130             IF DUMMY REFERENCE, GOTO LOG19130
2194  01551  6 02364      LOG19110 XMT    -12,R2               ELSE, SET COUNT
2195  01552  0 06000      LOG19120 MOV    R6,AUX               SHIFT BITS LEFT
2196  01553  1 06006               ADD    R6,R6                [R5,R6]<=[R5,R6].ROTATE LEFT.1
2197  01554  0 10000               MOV    OVF,AUX
2198  01555  1 05705               ADD    R5(7),R5
2199                      *
2200  01556  0 25100               MOV    CRINPUT,AUX
2201  01557  1 06006               ADD    R6,R6                BRING IN NEXT BIT
2202                      *
2203  01560  6 00001               XMT    1,AUX                COUNT DOWN
2204  01561  1 02002               ADD    R2,R2
2205  01562  5 02152               NZT    R2,LOG19120          LOOP UNTIL R2.EQ.0
2206                      *
2207                      LOG19130 WSP    CALCBLO,R6           STORE BCD VALUES
2207  01563  6 07021  +            XMT    IVISPD+IVOSPD,IVL    SELECT SPD READ/WRITE
2207  01564  6 17001  +            XMT    CALCBLO,IVR                  LOAD ADDRESS
2207  01565  0 06037  +            MOV    R6,RB                 WRITE DATA
2208                               WSP    CALCBHI,R5
2208  01566  6 07021  +            XMT    IVISPD+IVOSPD,IVL    SELECT SPD READ/WRITE
2208  01567  6 17000  +            XMT    CALCBHI,IVR                  LOAD ADDRESS
2208  01570  0 05037  +            MOV    R5,RB                 WRITE DATA
2209  01571  7 00761               JMP    LOGICD20             SOLVE NEXT NODE
2210                      *
2211                      *
2212                      *
2213                      *
2214                      ***REGISTER SOURCE NODE
2215                      *
2216  01572  6 00374      LOG19200 XMT    11111100B,AUX        SET REFERENCE TYPE TO
2217  01573  2 01001               AND R1,R1                   HOLDING REGISTER
2218  01574  6 00002               XMT    010B,AUX
2219  01575  3 01001               XOR    R1,R1
2220  01576  7 01365               JMP    LOG14000             COUNTER/TIMER PRESET CAN HANDLE REST
2221                      *
2222                      *
2224                      *
2225                      *
2226                      ***BINARY TO BCD CONVERT, DISCRETE DESTINATION
2227                      *
2228                      *
2229  01577  6 00002      LOG19300 XMT    010B,AUX             CHECK FOR ENABLE
2230  01600  2 03000               AND    R3,AUX
2231  01601  5 00205               NZT    AUX,LOG19310         IF ENABLED, GOTO LOG19310
2232  01602  6 00374               XMT    11111100B,AUX        ELSE, CLEAR POWER
2233  01603  2 03003               AND    R3,R3
2234  01604  7 01736               JMP    LOG19399             EXIT
2235                      *
2236  01605  6 00377      LOG19310 XMT    -1,AUX               CHECK FOR DUMMY REGISTERS
2237  01606  3 02000               XOR    R2,AUX
2238  01607  5 00211               NZT    AUX,LOG19320
2239  01610  7 01737               JMP    LOG19390             IF DUMMY REF, GOTO LOG19390
2240                      *
2241  01611  6 07021      LOG19320 XMT    IVOSPD+IVISPD,IVL    ELSE, SELECT SCRATCHPAD READ/WRITE
2242  01612  6 17025               XMT    SAVER3,IVR
2243  01613  0 03037               MOV    R3,RB                SAVE R3
2244                               CLR    R3                   *1 CLEAR HI BCD VALUE
2244  01614  6 03000  +            XMT    0,R3
2245  01615  6 17026               XMT    SAVER4,IVR
2246  01616  0 04037               MOV    R4,RB                SAVE R4
2247                               CLR    R4                   *1 CLEAR LO BCD VALUE
2247  01617  6 04000  +            XMT    0,R4
2248  01620  6 17023               XMT    SAVER1,IVR
2249  01621  0 01037               MOV    R1,RB                SAVE R1
2250  01622  6 01374               XMT    -4,R1                SET COUNT FOR LOOP A
2251  01623  6 17001               XMT    CALCBLO,IVR          GET BINARY VALUE
2252                               NOP
2252  01624  0 00000  +            MOV    AUX,AUX
2253  01625  0 37006               MOV    RB,R6                GET LO BINARY VALUE
2254  01626  6 17000               XMT    CALCBHI,IVR
2255                               NOP
2255  01627  0 00000  +            MOV    AUX,AUX
2256  01630  0 37005               MOV    RB,R5
2257                      *                                    START LOOP A
2258  01631  6 02374      LOG19330 XMT    -4,R2                SET COUNT FOR LOOP B
                                                               START LOOP B
2260                      *
2261  01632  0 04000      LOG19340 MOV    R4,AUX               ROTATE BCD VALUE LEFT ONCE
2262  01633  1 04004               ADD    R4,R4
2263  01634  0 10000               MOV    OVF,AUX              [R3,R4] <= [R3,R4].ROTATE LEFT.1
2264  01635  1 03703               ADD    R3(7),R3
2265  01636  6 00340               XMT    NEG800LO,AUX         SBTRACT 800 FROM BINARY VALUE
2266  01637  1 06011               ADD    R6,R11               [AUX,P11] <= [R5,R6] - 800
```

```
01640  6 00374                 XMT    NEG800HI,AUX
01641  1 10000                 ADD    OVF,AUX
01642  1 05000                 ADD    R5,AUX
01643  5 10245                 NZT    OVF,LOG19345
01644  7 01651                 JMP    LOG19350           IF [R5,R6].LT.800 GOTO LOG19350
                       *
01645  0 00005         LOG19345 MOV   AUX,R5             ELSE, [R5,R6] <= [R5,R6] - 800
01646  0 11006                 MOV    R11,R6
01647  6 00001                 XMT    1,AUX
01650  1 04004                 ADD    R4,R4              SET BCD BIT, R4(0) <= 1
                       *
01651  0 06000         LOG19350 MOV   R6,AUX             MULTIPLY BINARY VALUE BY 2
01652  1 06006                 ADD    R6,R6
01653  0 10000                 MOV    OVF,AUX
01654  1 05705                 ADD    R5(7),R5           [R5,R6] <= [R5,R6].ROTATE LEFT.1
01655  6 00001                 XMT    1,AUX              COUNT DOWN ON LOOP B
01656  1 02002                 ADD    R2,R2
01657  5 02232                 NZT    R2,LOG19340        LOOP UNTIL R2.EQ.0
                       *
                       *
01660  6 00017                 XMT    01111B,AUX         LOOP B FINISHED,
01661  2 05011                 AND    R5,R11             DIVIDE BINARY VALUE BY 16
01662  0 05405                 MOV    R5(4),R5           [R5,R6] <= [R5,R6].ROTATE RIGHT.4
01663  2 06400                 AND    R6(4),AUX
01664  3 11406                 XOR    R11(4),R6
                       *
01665  6 00374                 XMT    11111100B,AUX      MULTIPLY BIN VALUE BY 10
01666  2 06611                 AND    R6(6),R11
01667  2 05602                 AND    R5(6),R2
01670  6 00003                 XMT    011B,AUX           FIRST [R2,R11]<=[R5,R6].TIMES.4
01671  2 06600                 AND    R6(6),AUX
01672  3 02002                 XOR    R2,R2
                       *
01673  0 11000                 MOV    R11,AUX            SECOND,
01674  1 06006                 ADD    R6,R6              [R5,R6] <= [R5,R6] + [R2,R11]  OR,
01675  0 10000                 MOV    OVF,AUX            [R5,R6] <= [R5,R6].TIMES.5
01676  1 02000                 ADD    R2,AUX
01677  1 05005                 ADD    R5,R5
                       *
01700  0 06000                 MOV    R6,AUX             THIRD, MULTIPLY ALL THATT BY 2
01701  1 06006                 ADD    R6,R6              [R5,R6] <= [R5,R6].ROTATE LEFT.1
01702  0 10000                 MOV    OVF,AUX
01703  1 05705                 ADD    R5(7),R5
                       *
01704  6 00001                 XMT    1,AUX              COUNT DOWN ON LOOP A
01705  1 01001                 ADD    R1,R1
01706  5 01231                 NZT    R1,LOG19330        LOOP UNTIL R1.EQ.0
                       *                                 LOOP A FINISHED
                       *
01707  6 01364                 XMT    -12,R1             SET COUNT
01710  6 07002         LOG19360 XMT   IVOCRDAT,IVL       SELECT COIL RAM OUTPUT
01711  6 00001                 XMT    1,AUX
01712  2 03400                 AND    R3(4),AUX
01713  0 00126                 MOV    AUX,CROUTPUT       WRITE BCD BIT TO OUTPUT POINT
01714  6 07000                 XMT    IVOCTRL,IVL        SELECT CONTROL PULSE
01715  6 27301                 XMT    CTRLINCC,CTRLREG   INCREMENT COIL RAM ADDR
01716  0 04000                 MOV    R4,AUX             SHIFT NEXT BCD BIT INTO POSITION
01717  0 10000                 MOV    OVF,AUX
01720  1 03000                 ADD    R3,AUX             [R3,R4] <= [R3,R4].ROTATE LEFT.1
01721  1 03003                 ADD    R3,R3
01722  6 00001                 XMT    1,AUX              COUNT DOWN ON LOOP
01723  1 01001                 ADD    R1,R1
01724  5 01310                 NZT    R1,LOG19360        LOOP UNTIL R1.EQ.0
                       *
01725  6 17022                 XMT    SAVER1,IVR         RETRIEVE R1
01726  6 07021                 XMT    IVOSPD+IVISPD,IVL  *1 SELECT SCRATCH PAD READ/WRITE
01727  0 37001                 MOV    RB,R1
01730  6 17025                 XMT    SAVER3,IVR         RETRIEVE R3 (POWER)
01731  6 00376                 XMT    11111110B,AUX      *1 WITH BIT 0 <= 0
01732  2 37003                 AND    RB,R3
01733  6 17026                 XMT    SAVER4,IVR         RETRIEVE R4 (ROW COUNT)
                       *       NOP                       *1
01734  0 00000         +       MOV    AUX,AUX
01735  0 37004                 MOV    RB,R4
01736  7 00761         LOG19399 JMP   LOGIC020           SOLVE NEXT NODE
                       *
                       *
01737  6 00376         LOG19390 XMT   11111110B,AUX      DUMMY REF, SET POWER
01740  2 03003                 AND    R3,R3
01741  7 01736                 JMP    LOG19399
                       *
                       *
                       ***BCD TO BINARY CONVERT, REGISTER DESTINATION
                       *
                       *
01742  6 00002         LOG19400 XMT   010B,AUX           CHECK FOR ENABLE
01743  2 03000                 AND    R3,AUX
01744  5 00346                 NZT    AUX,LOG19405
01745  7 02062                 JMP    LOG19420           IF .NOT.ENABLED, GOTO LOG19420
                       *
                       LOG19405 WSP   SAVER1,R1          SAVE NODE
01746  6 07021         +       XMT    IVISPD+IVOSPD,IVL  SELECT SPD READ/WRITE
01747  6 17023         +       XMT    SAVER1,IVR              LOAD ADDRESS
01750  0 01037         +       MOV    R1,RB              WRITE DATA
                               WSP    SAVER2,R2
```

```
2360  01751  6 07021  +        XMT   IVISPD+IVOSPD,IVL SELECT SPD READ/WRITE
2360  01752  6 17024  +        XMT   SAVER2,IVR              LOAD ADDRESS
2360  01753  0 02037  +        MOV   R2,RB              WRITE DATA
2361                           WSP   SAVER3,R3         SAVE POWER
2361  01754  6 07021  +        XMT   IVISPD+IVOSPD,IVL SELECT SPD READ/WRITE
2361  01755  6 17025  +        XMT   SAVER3,IVR              LOAD ADDRESS
2361  01756  0 03037  +        MOV   R3,RB              WRITE DATA
2362                           WSP   SAVER4,R4         SAVE ROW COUNT
2362  01757  6 07021  +        XMT   IVISPD+IVOSPD,IVL SELECT SPD READ/WRITE
2362  01760  6 17026  +        XMT   SAVER4,IVR              LOAD ADDRESS
2362  01761  0 04037  +        MOV   R4,RB              WRITE DATA
2363  01762  6 11375           XMT   -3,R11            SET COUNT
2364  01763  6 17000           XMT   CALCBHI,IVR       GET BCD SOURCE DATA
2365                           CLR   R3                CLEAR BINARY VALUE
2365  01764  6 03000  +        XMT   0,R3
2366  01765  0 37001           MOV   RB,R1
2367  01766  6 17001           XMT   CALCBLO,IVR
2368                           CLR   R4
2368  01767  6 04000  +        XMT   0,R4
2369  01770  0 37002           MOV   RB,R2
2370                  *
2372                  *
2373  01771  6 00374  LOG1941D XMT   11111100B,AUX     MULTIPLY BINARY VALUE BY 10
2374  01772  2 04606           AND   R4(6),R6          FIRST, [R5,R6] <= [R3,R4].TIMES.4
2375  01773  2 03605           AND   R3(6),R5
2376  01774  6 00003           XMT   011B,AUX
2377  01775  2 04600           AND   R4(6),AUX
2378  01776  3 05005           XOR   R5,R5
2379                  *
2380  01777  0 06000           MOV   R6,AUX            SECOND, ADD THAT TO BIN VALUE
2381  02000  1 04004           ADD   R4,R4             [R3,R4] <= [R3,R4] + [R5,R6]
2382  02001  0 10000           MOV   OVF,AUX           OR, [R3,R4] <= [R3,R4].TIMES.5
2383  02002  1 05000           ADD   R5,AUX
2384  02003  1 03003           ADD   R3,R3
2385                  *
2386  02004  0 04000           MOV   R4,AUX            THIRD. MULTIPLY ALL THAT BY 2
2387  02005  1 04004           ADD   R4,R4             [R3,R4]<=[R3,R4].TIMES.2
2388  02006  0 10000           MOV   OVF,AUX
2389  02007  1 03703           ADD   R3(7),R3
2390                  *
2391  02010  0 01000           MOV   R1,AUX            ADD BCD DIGIT TO BINARY VALUE
2392  02011  1 04004           ADD   R4,R4
2393  02012  0 10000           MOV   OVF,AUX
2394  02013  1 03003           ADD   R3,R3
2395                  *
2396  02014  6 00017           XMT   01111B,AUX        MOVE NEXT BCD DIGIT INTO POSITION
2397  02015  2 02401           AND   R2(4),R1
2398  02016  0 02402           MOV   R2(4),R2
2399                  *
2400  02017  6 00001           XMT   1,AUX             COUNT DOWN ON LOOP
2401  02020  1 11011           ADD   R11,R11
2402  02021  5 11371           NZT   R11,LOG1941D      LOOP UNTIL R11.EQ.0
2404                  *
2405                           WSP   CALCDHI,R3        SAVE BINARY VALUE
2405  02022  6 07021  +        XMT   IVISPD+IVOSPD,IVL SELECT SPD READ/WRITE
2405  02023  6 17004  +        XMT   CALCDHI,IVR             LOAD ADDRESS
2405  02024  0 03037  +        MOV   R3,RB              WRITE DATA
2406                           WSP   CALCDLO,R4
2406  02025  6 07021  +        XMT   IVISPD+IVOSPD,IVL SELECT SPD READ/WRITE
2406  02026  6 17005  +        XMT   CALCDLO,IVR             LOAD ADDRESS
2406  02027  0 04037  +        MOV   R4,RB              WRITE DATA
2407                           NOP                     *1 - WAIT
2407  02030  0 00000  +        MOV   AUX,AUX
2408                           RSP   SAVER1,R1
2408  02031  6 17023  +        XMT   SAVER1,IVR              LOAD ADDRESS
2408  02032  6 07021  +        XMT   IVISPD+IVOSPD,IVL *1 - SELECT SPD READ
2408  02033  0 37001  +        MOV   RB,R1              READ DATA
2409                           RSP   SAVER2,R2
2409  02034  6 17024  +        XMT   SAVER2,IVR              LOAD ADDRESS
2409  02035  6 07021  +        XMT   IVISPD+IVOSPD,IVL *1 - SELECT SPD READ
2409  02036  0 37002  +        MOV   RB,R2              READ DATA
2410                           RSP   SAVER3,R3
2410  02037  6 17025  +        XMT   SAVER3,IVR              LOAD ADDRESS
2410  02040  6 07021  +        XMT   IVISPD+IVOSPD,IVL *1 - SELECT SPD READ
2410  02041  0 37003  +        MOV   RB,R3              READ DATA
2411                           RSP   SAVER4,R4
2411  02042  6 17026  +        XMT   SAVER4,IVR              LOAD ADDRESS
2411  02043  6 07021  +        XMT   IVISPD+IVOSPD,IVL *1 - SELECT SPD READ
2411  02044  0 37004  +        MOV   RB,R4              READ DATA
2412                  *
2413  02045  6 11026           CALL  PEGVAL            GET REG ADDR
      02046  7 05700
2414                  *
2415                           RSP   CALCDHI,R1        GET BINARY VALUE
2415  02047  6 17004  +        XMT   CALCDHI,IVR             LOAD ADDRESS
2415  02050  6 07021  +        XMT   IVISPD+IVOSPD,IVL *1 - SELECT SPD READ
2415  02051  0 37001  +        MOV   RB,R1              READ DATA
2416                           RSP   CALCDLO,R2
2416  02052  6 17005  +        XMT   CALCDLO,IVR             LOAD ADDRESS
2416  02053  6 07021  +        XMT   IVISPD+IVOSPD,IVL *1 - SELECT SPD READ
2416  02054  0 37002  +        MOV   RB,R2              READ DATA
2417                  *
2418  02055  6 11027           CALL  STORE
      02056  7 05777
2419                  *
2420                           RSP   SAVER1,R1         GET FIRST BYTE OF NODE
```

```
02057  6 17023  +            XMT   SAVER1,IVR             LOAD ADDRESS
02060  6 07021  +            XMT   IVISPD+IVOSPD,IVL *1 - SELECT SPD READ
02061  0 37001  +            MOV   RB,R1              READ DATA
02062  6 00376   LOG19420    XMT   11111110B,AUX      SET POWER
02063  2 03003               AND   R3,R3
02064  7 00761               JMP   LOGIC020           SOLVE NEXT NODE
                 *
                 *
                 *
                 *   CALCULATE C-NODE CONSTANT
                 *
02065  6 07021   LOG20000    XMT   IVOSPD+IVISPD,IVL SELECT SCRATCH PAD READ/WRITE
02066  6 17002               XMT   CALCCHI,IVR
02067  2 01037               AND   R1,RB              STORE HIGH ORDER
                             NOP                      *1
02070  0 00000  +            MOV   AUX,AUX
02071  6 17003               XMT   CALCCLO,IVR
02072  0 02037               MOV   R2,RB
02073  7 00761               JMP   LOGIC020           SOLVE NEXT NODE
                 *
                 *   CALCULATE C-NODE REGISTER
                 *
02074  6 07021   LOG21000    XMT   IVOSPD+IVISPD,IVL SELECT SCRATCH PAD READ/WRITE
02075  6 17023               XMT   SAVER1,IVR
02076  0 01037               MOV   R1,RB              SAVE 1ST BYTE OF NODE
02077  6 11030               CALL  REGVAL
02100  7 05700
02101  6 17023               XMT   SAVER1,IVR
02102  6 07021               XMT   IVOSPD+IVISPD,IVL SELECT SCRATCH PAD
02103  0 37005               MOV   RB,R5
02104  6 17000               XMT   CALCBHI,IVR
02105  0 01037               MOV   R1,RB              SAVE HI ORDER VALUE
02106  0 05001               MOV   R5,R1              RESTORE 1ST BYTE OF N
02107  6 17001               XMT   CALCBLO,IVR
02110  0 02037               MOV   R2,RB              SAVE LO ORDER VALUE
02111  7 00761               JMP   LOGIC020           SOLVE NEXT NODE
                 *
                 *   CALCULATE
                 *      ENTER HERE FOR ALL CLCULATE NODES
                 *      IF ENABLED, REGISTERS R1,R2,R3, & R4 WILL BE SAVED
                 *       THEN REGISTERS R3,R4 WILL BE GIVEN THE C-NODE VALUES
                 *       (ADDEND, SUBTRAHEND, MULTIPLIER, OR DIVISOR)
                 *       REGISTERS R1,R2 ARE GIVEN THE B-NODE VALUE
                 *       (AUGEND, MINUEND, MULTIPLICAND, OR DIVIDEND)
                 *       THE PROPER CALCULATION IS EFFECTED USING A EXECUTION TABLE,
                 *       VECTORING OFF THE NODE TYPE
                 *
                 *       THE CALCULATE ROUTINE LEAVES THE RESULT (THE SUM, THE
                 *       ABSOLUTE VALUE OF THE DIFFERENCE, THE PRODUCT, OR THE QUOTIENT)
                 *       IN REGISTERS R5,R6. AND LEAVES THE POWER (FOR R3(2-0))
                 *       IN REGISTER R11(2-0)
                 *
                 *       THE RESULT IS STORED IN SCRATCH PAD PRESTHI, CALCBLO AND
                 *       IN THE D NODE REGISTER. POWER (R3) IS UPDATED.  REGISTERS
                 *       (R1, UPDATED R3, AND R4) ARE RESTORED, AND EXIT IS MADE
                 *       TO SOLVE NEXT NODE.
                 *
02112  6 00144   LOG22000    XMT   00000100,AUX      TEST IF NODE IS ENABLED
02113  2 03000               AND   R3,AUX
02114  5 00120               NZT   AUX,LOG22010      IF NODE ENABLED THEN GOTO LOG22010
02115  6 00370               XMT   11111000B,AUX     ELSE, CLEAR POWER
02116  2 03003               AND   R3,R3
02117  7 00761               JMP   LOGIC020          SOLVE NEXT NODE
                 *
02120  6 07021   LOG22010    XMT   IVOSPD+IVISPD,IVL  SELECT SCRATCH PAD READ/WRITE
02121  6 17023               XMT   SAVER1,IVR        SAVE FIRST BYTE OF NODE
02122  0 01037               MOV   R1,RB
                             NOP                     *1
02123  0 00000  +            MOV   AUX,AUX
02124  6 17024               XMT   SAVER2,IVR        SAVE SECOND BYTE OF NODE
02125  0 02037               MOV   R2,RB
                             NOP                     *1
02126  0 00000  +            MOV   AUX,AUX
02127  6 17025               XMT   SAVER3,IVR        SAVE POWER BITS
02130  0 03037               MOV   R3,RB
                             NOP                     *1
02131  0 00000  +            MOV   AUX,AUX
02132  6 17026               XMT   SAVER4,IVR        SAVE ROW COUNT
02133  0 04037               MOV   R4,RB
                             NOP                     *1
02134  0 00000  +            MOV   AUX,AUX
02135  6 17001               XMT   CALCBLO,IVR       GET LOW ORDER B-NODE VALUE -> R4
02136  6 00003               XMT   CALCTYPM,AUX      *1 PREPARE TO EXTRACT NODE TYPE
02137  0 37002               MOV   RB,R2
02140  6 17000               XMT   CALCBHI,IVR       GET HIGH ORDER B-NODE VALUE -> R3
02141  2 01711               AND   R1(7),R11            *1 NODE TYPE -> R11
02142  0 37001               MOV   RB,R1
02143  6 17003               XMT   CALCCLO,IVR       GET LOW ORDER C-NODE VALUE -> R2
                             NOP                     *1
02144  0 00000  +            MOV   AUX,AUX
02145  0 37004               MOV   RB,R4
02146  6 17002               XMT   CALCCHI,IVR       GET HI ORDER C-NODE VALUE -> R1
                             NOP                     *1
02147  0 00000  +            MOV   AUX,AUX
02150  0 37003               MOV   RB,R3
02151  4 11152               XEC   LOG22TAB(R11),4   VECTOR TO DO CALCULATE
```

```
                         *
                         *         RETURN TO 'LOG22020' WITH RESULT IN [R5,R6]
                         *         AND POWER SETTING IN R11 (2-0)
                         *
                         *
02152   7 02217          LOG22TAB JMP    LOG22100          ADDITION NODE
02153   7 02241                   JMP    LOG22200          SUBTRACTION NODE
02154   7 02277                   JMP    LOG22300          MULTIPLICATION NODE
02155   7 02450                   JMP    LOG22400          DIVISION NODE
                         *
                         *
                         *
02156   6 07021          LOG22020 XMT    IVOSPD+IVISPD,IVL  SELECT SCRATCH PAD READ/WRITE
02157   6 17004                   XMT    CALCDHI,IVR       STORE RESULTS
02160   0 05037                   MOV    R5,RB
                                  NOP                      *1
02161   0 00000        +          MOV    AUX,AUX
02162   6 17005                   XMT    CALCDLO,IVR
02163   0 06037                   MOV    R6,RB             STORE LOW ORDER RESULTS
02164   6 00370                   XMT    11111000B,AUX     *1
02165   6 17025                   XMT    SAVER3,IVR        RETRIEVE POWER BITS
                                  NOP
02166   0 00000        +          MOV    AUX,AUX
02167   2 37000                   AND    RB,AUX            POWER.MASKED. -> AUX
02170   6 17026                   XMT    SAVER4,IVR        RETRIEVE ROW COUNT
02171   3 11003                   XOR    R11,R3            OR IN NEW POWER BITS
02172   0 37004                   MOV    RB,R4
02173   6 17023                   XMT    SAVER1,IVR        RETRIEVE 1ST BYTE OF NODE
                                  NOP                      *1
02174   0 00000        +          MOV    AUX,AUX
02175   0 37001                   MOV    RB,R1
02176   6 17024                   XMT    SAVER2,IVR        RETRIEVE 2ND BYTE OF NODE
                                  NOP                      *1
02177   0 00000        +          MOV    AUX,AUX
02200   0 37002                   MOV    RB,R2
02201   6 11031                   CALL   REGVAL             GET D-NODE REGISTER ADDR
02202   7 05700
02203   6 17004                   XMT    CALCDHI,IVR       GET RESULT VALUES
02204   6 07021                   XMT    IVOSPD+IVISPD,IVL  SELECT SCRATCH PAD READ/WRITE
02205   0 37001                   MOV    RB,R1
02206   6 17005                   XMT    CALCDLO,IVR       GET LOW ORDER RESULT
                                  NOP
02207   0 00000        +          MOV    AUX,AUX
02210   0 37002                   MOV    RB,R2
02211   6 11032                   CALL   STORE
02212   7 05777
02213   6 17023                   XMT    SAVER1,IVR        GET FIRST BYTE OF NODE
02214   6 07021                   XMT    IVOSPD+IVISPD,IVL
02215   0 37001                   MOV    RB,R1
02216   7 00761                   JMP    LOGIC020           SOLVE NEXT NODE
                         *
                         *
                         *    CALCULATE ADDITION NODE
                         *         AUGEND IN [R1,R2], ADDEND IN [R3,R4]
                         *         SUM GOES IN [R5,R6] (MODULO 1000)
                         *         POWER OUTPUT: R11(2)=1 IF SUM.GT.999.
                         *
02217   0 04000          LOG22100 MOV    R4,AUX            ADD LOW ORDER
02220   1 02006                   ADD    R2,R6              R4+R2 -> R6
02221   0 10000                   MOV    OVF,AUX           GET OVERFLOW
02222   1 03000                   ADD    R3,AUX            ADD HI ORDER
02223   1 01005                   ADD    R1,R5             OVF+R3+R1 -> R5
                         *
02224   6 00030          LOG22110 XMT    NEG1000L,AUX      TEST FOR OVERFLOW
02225   1 06002                   ADD    R6,R2             [R5,R6]-1000->[R1,R2]
02226   0 10000                   MOV    OVF,AUX
02227   6 01374                   XMT    NEG1000H,R1
02230   1 01000                   ADD    R1,AUX
02231   1 05001                   ADD    R5,R1
02232   6 00200                   XMT    10000000B,AUX     TEST [R1,R2] FOR NEGATIVITY
02233   2 01000                   AND    R1,AUX
02234   5 00240                   NZT    AUX,LOG22120      IF R1.LT.0 THEN NO OVERFLOW, EXIT
                         *
02235   6 11004                   XMT    00000100B,R11     ELSE, OVERFLOW OCCURED, SET POWER
02236   0 01005                   MOV    R1,R5             MAKE SUM MODULO 1000
02237   0 02006                   MOV    R2,R6
02240   7 02156          LOG22120 JMP    LOG22020          EXIT
                         *
                         *    CALCULATE SUBTFACT NODE
                         *         MINUEND IN [R1,R2]
                         *         SUBTRAHEND IN [R3,R4]
                         *         DIFFERENCE (ABSOLUTE VALUE) GOES INTO [R5,R6]
                         *         POWER OUTPUT:   R11(2)=1 IF MINUEND.LT.SUBTRAHEND
                         *                         R11(1)=1 IF MINUEND.EQ.SUBTRAHEND
                         *                         R11(0)=1 IF MINUEND.GT.SUBTRAHEND
                         *
                         *
02241   6 00377          LOG22200 XMT    -1,AUX            NEGATE SUBRAHEND
02242   3 03003                   XOR    R3,R3             [R3,R4]= -[R3,R4]
02243   3 04004                   XOR    R4,R4
02244   6 00001                   XMT    1,AUX
02245   1 04004                   ADD    R4,R4
02246   0 10000                   MOV    OVF,AUX
02247   1 03003                   ADD    R3,R3
```

```
                        *
02250  0 04000                 MOV    R4,AUX               ADD NEGATED SUBTRAHEND TO MINUEND
02251  1 02006                 ADD    R2,R6                [R5,R6]= [R3,R4]+[R1,R2]
02252  0 10000                 MOV    OVF,AUX
02253  1 03000                 ADD    R3,AUX
02254  1 01005                 ADD    R1,R5
02255  6 00200                 XMT    10000000B,AUX        TEST FOR NEGATIVE DIFFERENCE
02256  2 05000                 AND    R5,AUX
02257  5 00266                 NZT    AUX,LOG22220         IF DIFF.LT.0 THEN GOTO LOG22220
02260  5 05264                 NZT    R5,LOG22210          ELSE, CHECK IF DIFF.EQ.0
02261  5 06264                 NZT    R6,LOG22210          IF DIFF.GT.0 THEN GOTO LOG22210
02262  6 11002                 XMT    00000010B,R11        ELSE. DIFF.EQ.0, SET POWER
02263  7 02156                 JMP    LOG22020             EXIT
02264  6 11004       LOG22210  XMT    00000100B,R11        DIFF.GT.0, SET POWER
02265  7 02156                 JMP    LOG22020             EXIT
02266  6 11001       LOG22220  XMT    00000001B,R11        DIFF.LT.0, SET POWER
02267  6 00377                 XMT    -1,AUX               MAKE DIFFERENCE ABSOLUTE VALUE
02270  3 05005                 XOR    R5,R5                [R5,R6]= -[R5,R6]
02271  3 06006                 XOR    R6,R6
02272  6 00001                 XMT    1,AUX
02273  1 06006                 ADD    R6,R6
02274  0 10000                 MOV    OVF,AUX
02275  1 05005                 ADD    R5,R5
02276  7 02156                 JMP    LOG22020             EXIT
                        *
                        ***MULTIPLY NODE
                        *
                        *      [R1,R2] CONTAINS MULTIPLICAND
                        *      [R3,R4] CONTAINS MULTIPLIER
                        *
                        *      MULTIPLY, STORE LOW ORDER PRODUCT
                        *      EXIT TO CALCULATE MAIN WITH:
                        *      HI PRODUCT IN [R5,R6]
                        *      POWER R11 (2) = 1
                        *
02277  6 07021      LOG22300  XMT    IVOSPD+IVISPD,IVL   SELECT SCRATCH PAD READ/WRITE
02300  6 17000                 XMT    CALCBHI,IVR
                               CLR    R11                  CLEAR MULTIPLICAND EXTENTION
02301  6 11000      +          XMT    0,R11
02302  0 11037                 MOV    R11,RB
02303  6 00001                 XMT    1,AUX
02304  6 17010                 XMT    CALCNT,IVR
02305  0 00037                 MOV    AUX,RB               INIT MASK
                               CLR    R5                   CLEAR PRODUCT
02306  6 05000      +          XMT    0,R5
                               CLR    R6
02307  6 06000      +          XMT    0,R6
                        *
02310  0 37000      LOG22310  MOV    RB,AUX               COMPARE LOW MULTIPLIER
02311  2 04000      LOG22315  AND    R4,AUX               AGAINST MASK
02312  5 00314                 NZT    AUX,LOG22320         IF NO MATCH
02313  7 02331                 JMP    LOG22330             GOTO LOG22330
                        *
02314  6 17000      LOG22320  XMT    CALCBHI,IVR         ELSE
02315  0 02000                 MOV    R2,AUX               ADD MULTIPLICAND TO PRODUCT
02316  1 06006                 ADD    R6,R6
02317  0 10000                 MOV    OVF,AUX
02320  1 05005                 ADD    R5,R5
02321  0 10000                 MOV    OVF,AUX
02322  1 11011                 ADD    R11,R11
02323  0 01000                 MOV    R1,AUX
02324  1 05005                 ADD    R5,R5
02325  0 10000                 MOV    OVF,AUX
02326  1 37000                 ADD    RB,AUX
02327  6 17010                 XMT    CALCNT,IVR
02330  1 11011                 ADD    R11,R11
                        *
02331  0 37000      LOG22330  MOV    RB,AUX               GETMASK
02332  2 03000                 AND    R3,AUX               COMPARE TO HI MULTIPLIER
02333  5 00335                 NZT    AUX,LOG22340         IF NO MATCH
02334  7 02342                 JMP    LOG22350             THEN GOTO LOG22350
                        *
02335  0 02000      LOG22340  MOV    R2,AUX               ELSE, ADD LOW MULTIPLICAND
02336  1 05005                 ADD    R5,R5                TO HI PRODUCT
02337  0 10000                 MOV    OVF,AUX
02340  1 01000                 ADD    R1,AUX
02341  1 11011                 ADD    R11,R11
                        *
02342  6 17000      LOG22350  XMT    CALCBHI,IVR          MULTIPLY MULTIPLICAND BY 2
02343  6 00177                 XMT    01111111B,AUX
02344  2 37000                 AND    RB,AUX
02345  0 00700                 MOV    AUX(7),AUX           ROTATE HI ORDER
02346  0 01000                 MOV    R1,AUX
02347  1 01001                 ADD    R1,R1                ROTATE MIDDLE ORDER
02350  0 10000                 MOV    OVF,AUX
02351  1 37037                 ADD    RB,RB                MIDDLE OVERFLOW => HI
02352  0 02000                 MOV    R2,AUX
02353  1 02002                 ADD    R2,R2                ROTATE LOW ORDER
02354  0 10000                 MOV    OVF,AUX
02355  6 17010                 XMT    CALCNT,IVR
02356  1 01001                 ADD    R1,R1                LOW OVERFLOW => MIDDLE
02357  6 00200                 XMT    10000000B,AUX        CHECK IF LOOP COMPLETED
02360  2 37000                 AND    RB,AUX
02361  5 00366                 NZT    AUX,LOG22360         IF DONE LOOP, GOTO LOG22360
```

```
02362   0 37000            MOV    RB,AUX            ELSE, ROTATE MASK
02363   0 00700            MOV    AUX(7),AUX
02364   0 00037            MOV    AUX,RB
02365   7 02311            JMP    LOG22315          LOOP
                 *
02366   0 05001  LOG22360  MOV    R5,R1             MULTIPLICATION DONE
02367   0 06002            MOV    R6,R2             SET UP DIVIDE ROUTINE TO
02370   0 11006            MOV    R11,R6            SPLIT HI PRODUCT FROM LO PRODUCT
02371   6 03003            XMT    K1000HI,R3
02372   6 03350            XMT    K1000LO,R3
                 *
02373   6 11033            CALL   DIVIDE
02374   7 06605
                 *
                 *         RETURN WITH [REMAINDER,QUOTIENT] IN
                 *         [R6,R1,R2]. THIS CORESPONDS TO [LOW PRODUCT, HI PRODUCT]
                 *         LOW PRODUCT IS IN [R6(3-0),R1(7-2)]
                 *         HI PRODUCT IS IN [R1(1-0),R2]
                 *
02375   6 17005            XMT    CALCDLO,IVR       STORE HI PRODUCT
02376   0 02037            MOV    R2,RB
02377   6 00003            XMT    011B,AUX          *1
02400   6 17004            XMT    CALCDHI,IVR
02401   2 01037            AND    R1,RB
02402   2 06205            AND    R6(2),R5          LO PRODUCT => [R5,R6]
02403   2 06006            AND    R6,R6
02404   6 00077            XMT    00111111B,AUX
02405   2 01200            AND    R1(2),AUX
02406   6 17000            XMT    CALCBHI,IVR
02407   0 05037            MOV    R5,RB             STORE LO PROD IN [CALCBHI,CALCBLO]
02410   6 17001            XMT    CALCBLO,IVR
02411   3 06206            XOR    R6(2),R6
02412   0 06037            MOV    R6,RB
02413   6 00001            XMT    1,AUX
02414   6 17024            XMT    SAVER2,IVR        GET 2ND BYTE OF NODE
                           NOP
02415   0 00000  +         MOV    AUX,AUX
02416   1 37002            ADD    RB,R2             INCREMENT REFERENCE
02417   5 02023            NZT    R2,LOG22370       SCREEN OUT DUMMY REG REF
02420   6 02377            XMT    -1,R2             DUMMY REF REF. R2 <= -1
02421   6 01001            XMT    01B,R1            R1 <= HOLDING REG TYPE
02422   7 02426            JMP    LOG22375
02423   6 17023  LOG22370  XMT    SAVER1,IVR        GET 1ST BYTE OF NODE
                           NOP
02424   0 00000  +         MOV    AUX,AUX
02425   0 37001            MOV    RB,R1
                 *
02426   6 11034  LOG22375  CALL   REGVAL
02427   7 05700
                 *
                           RSP    CALCBHI,R1        LOW PRODUCT => [R1,R2]
02430   6 17000  +         XMT    CALCBHI,IVR             LOAD ADDRESS
02431   6 07021  +         XMT    IVISPD+IVOSPD,IVL *1 - SELECT SPD READ
02432   0 37001  +         MOV    RB,R1              READ DATA
                           RSP    CALCBLO,R2
02433   6 17001  +         XMT    CALCBLO,IVR             LOAD ADDRESS
02434   6 07021  +         XMT    IVISPD+IVOSPD,IVL *1 - SELECT SPD READ
02435   0 37002  +         MOV    RB,R2              READ DATA
02436   6 11035            CALL   STORE
02437   7 05777
                 *
                           RSP    CALCDHI,R5        GET HI PRODUCT
02440   6 17004  +         XMT    CALCDHI,IVR             LOAD ADDRESS
02441   6 07021  +         XMT    IVISPD+IVOSPD,IVL *1 - SELECT SPD READ
02442   0 37005  +         MOV    RB,R5              READ DATA
                           RSP    CALCDLO,R6
02443   6 17005  +         XMT    CALCDLO,IVR             LOAD ADDRESS
02444   6 07021  +         XMT    IVISPD+IVOSPD,IVL *1 - SELECT SPD READ
02445   0 37006  +         MOV    RB,R6              READ DATA
02446   6 11004            XMT    100B,R11          SET POWER
02447   7 02156            JMP    LOG22020          CLOSE OUT NODE
                 *
                 *         DIVIDE NODE
                 *
                 *         [R1,R2] CONTAINS DATA FROM B NODE REGISTER
                 *         [R3,R4] CONTAINS DIVISOR FROM C NODE REGISTER
                 *
                 *         IF SP[CALBADRH].EQ.-1 THEN DIVIDEND IS SINGLE PRECISION,
                 *                              AND IS ALREADY IN [R1,R2]
                 *
                 *         IF SP[CALBADRH].NE.-1 THEN DIVIDEND IS DOUBLE PRECISION.
                 *                              HI ORDER IS IN [R1,R2], LOW ORDER
                 *                              CAN BE FETCHED BY USING DATA FROM
                 *                              [CALBADRH,CALBADRL] (THE NODE DATA FOR THE
                 *                              THE B NODE CALCULATE). INCREMENTING
                 *                              CALBADRL.
                 *
                 *         EXIT WITH QUOTIENT IN [R5,R6]
                 *         POWER: R11(2)=1 IF DIVIDE OK.
                 *                R11(1)=1 IF DIVIDEND OVERFLOW.
                 *                R11(0)=1 IF DIVISOR = 0
                 *
02450   5 03056  LOG22400  NZT    R3,LOG22405       CHECK FOR DIVISOR = 0
02451   5 04056            NZT    R4,LOG22405       IF DIVR.NE.0 GOTO LOG22405
                           CLR    R5                ELSE, CLEAR QUOTIENT
```

```
02452  6 05000  +            XMT    0,R5
                             CLR    R6
02453  6 06000  +            XMT    0,R6
02454  6 11001               XMT    001B,R11          SET POWER
02455  7 02156               JMP    LOG22020          EXIT TO CLOSE OUT NODE
                *
02456  6 17006  LOG22405 XMT    CALBADRH,IVR      CHECK FOR DOUBLE PRECISION DIVIDEND
02457  6 07021               XMT    IVOSPD+IVISPD,IVL SELECT SCRATCH PAD READ/WRITE
02460  6 00377               XMT    -1,AUX
02461  3 37006               XOR    RB,R6
02462  5 06064               NZT    R6,LOG22410
02463  7 02610               JMP    LOG22460          IF DIVD IS DOUBLE PRECISION GOTO LOG22460
                *
02464  3 03005  LOG22410 XOR    R3,R5             ELSE, CHECK FOR DIVIDEND OVERFLOW
02465  3 04006               XOR    R4,R6             [R5,R6]<= -[R3,R4]
02466  6 00001               XMT    1,AUX
02467  1 06006               ADD    R6,R6
02470  0 10000               MOV    OVF,AUX
02471  1 05005               ADD    R5,R5
02472  0 06000               MOV    R6,AUX
02473  1 02006               ADD    R2,R6
02474  0 10000               MOV    OVF,AUX
02475  1 01000               ADD    R1,AUX
02476  1 05005               ADD    R5,R5
02477  5 10102               NZT    OVF,LOG22415      IF DIVDHI.GE.DIVR GOTO LOG22415
02500  6 11375               XMT    -3,R11            SET COUNT FOR LOOP TO
02501  7 02506               JMP    LOG22420          MULTIPLY DIVDHI BY 1000
                *
                *            HI DIVIDEND.GE.DIVISOR
                *            CLEAR QUOTIENT, SET POWER, EXIT
                *
                LOG22415 CLR    R5
02502  6 05000  +            XMT    0,R5
                             CLR    R5
02503  6 05000  +            XMT    0,R5
02504  6 11002               XMT    010B,R11
02505  7 02156               JMP    LOG22020          EXIT TO CLOSE OUT NODE
                *
                *
                *            LOOP TO MULTIPLY [R1,R2] BY 1000
                *            RESULT => [R11,R1,R2]
                *            COUNT FOR LOOP IS IN R11
                *
02506  6 00374  LOG22420 XMT    11111100B,AUX     MASK => AUX
02507  2 01605               AND    R1(6),R5
02510  2 02606               AND    R2(6),R6          [R5,R6]<=[R1,R2].TIMES.4
02511  6 00003               XMT    011B,AUX
02512  2 02600               AND    R2(6),AUX
02513  3 05005               XOR    R5,R5
                *
02514  6 00003               XMT    011B,AUX          CHECK FOR OVERFLOW FROM R1
02515  2 01600               AND    R1(6),AUX
02516  5 00131               NZT    AUX,LOG22430      LOG22430 IF R1 OVERFLOW.TRUE. END LOOP
                *
02517  0 06000               MOV    R6,AUX            [R1,R2]<=[R1,R2].TIMES.5
02520  1 02002               ADD    R2,R2             ([R1,R2]<=[R1,R2]+[R5,R6])
02521  0 10000               MOV    OVF,AUX
02522  1 01000               ADD    R1,AUX
02523  1 05001               ADD    R5,R1             CHECK FOR OVERFLOW
02524  5 10142               NZT    OVF,LOG22440      IF OVERFLOW.TRUE. GOTO LOG22440
02525  6 00001               XMT    1,AUX             ELSE, COUNT DOWN ON LOOP
02526  1 11011               ADD    R11,R11
02527  5 11106               NZT    R11,LOG22420      LOOP UNTIL R11 = 0
02530  7 02543               JMP    LOG22450
                *
                *
02531  0 00011  LOG22430 MOV    AUX,R11           CLOSE OUT LOOP
02532  0 06000               MOV    R6,AUX
02533  1 02002               ADD    R2,R2             ADD 100.TIMES.ORIGIONAL [R1,R2] TO
02534  0 10000               MOV    OVF,AUX           25 TIMES ORIGIONAL [R1,R2]
02535  1 01000               ADD    R1,AUX
02536  1 05001               ADD    R5,R1
02537  0 10000               MOV    OVF,AUX           ADD OVERFLOW TO R11
02540  1 11011               ADD    R11,R11
02541  7 02543               JMP    LOG22450
                *
02542  0 10011  LOG22440 MOV    OVF,R11           OVERFLOW => R11
                *
                *            [R11,R1,R2]<= 125.TIMES.ORIGIONAL [R1,R2]
                *            MULTIPLY THAT BY 8 TO GIVE 1000.TIMES.ORIGIONAL [R1,R2]
                *
                *
02543  0 11511  LOG22450 MOV    R11(5),R11        R11.TIMES.8 => R11
02544  6 00007               XMT    0111B,AUX
02545  2 02506               AND    R2(5),R6          R2 CARRYOUT => R6
02546  2 01500               AND    R1(5),AUX         R1 CARRYOUT => AUX
02547  3 11011               XOR    R11,R11           R11.OR.AUX(R1 CARRYOUT) => R11
02550  6 00370               XMT    11111000B,AUX
02551  2 02502               AND    R2(5),R2          R2.TIMES.8 => R2
02552  2 01500               AND    R1(5),AUX         R1.TIMES.8 => R1
02553  3 06001               XOR    R6,R1             OR IN R2 CARRYOUT => R1
                *
                             WSP    DIVDX1KH,R11      SAVE HI DIVIDEND, HI PART
02554  6 07021  +            XMT    IVISPD+IVOSPD,IVL SELECT SPD READ/WRITE
02555  6 17011  +            XMT    DIVDX1KH,IVR           LOAD ADDRESS
02556  0 11037  +            MOV    R11,RB               WRITE DATA
```

```
                          WSP    DIVDX1KM,R1        MIDDLE PART
02557  6 07021   +        XMT    IVISPD+IVOSPD,IVL SELECT SPD READ/WRITE
02560  6 17012   +        XMT    DIVDX1KM,IVR              LOAD ADDRESS
02561  0 01037   +        MOV    R1,RB               WRITE DATA
                          WSP    DIVDX1KL,R2        LOW PART
02562  6 07021   +        XMT    IVISPD+IVOSPD,IVL SELECT SPD READ/WRITE
02563  6 17013   +        XMT    DIVDX1KL,IVR              LOAD ADDRESS
02564  0 02037   +        MOV    R2,RB               WRITE DATA
                 *
02565  6 17006            XMT    CALBADRH,IVR
02566  6 07021            XMT    IVOSPD+IVISPD,IVL SELECT SCRATCH PAD READ/WRITE
02567  0 37001            MOV    RB,R1              GET B NODE DATA
02570  6 17007            XMT    CALBADRL,IVR
02571  6 00001            XMT    1,AUX              *1
02572  1 37002            ADD    RB,R2              STEP REF # TO POINT AT NEXT REG
                 *
02573  6 11036            CALL   REGVAL
02574  7 05700
                 *
                 *
                 *
02575  6 17013            XMT    DIVDX1KL,IVR
02576  6 07021            XMT    IVOSPD+IVISPD,IVL *1 SELECT SCRATCH PAD READ/WRITE
02577  0 37000            MOV    RB,AUX             GET HI DIVIDEND
02600  1 02002            ADD    R2,R2              ADD TO LOW DIVIDEND
02601  0 10000            MOV    OVF,AUX
02602  6 17012            XMT    DIVDX1KM,IVR
02603  1 01000            ADD    R1,AUX             *1
02604  1 37001            ADD    RB,R1
02605  6 17011            XMT    DIVDX1KH,IVR
02606  0 10000            MOV    OVF,AUX            *1
02607  1 37006            ADD    RB,R6
                 *
02610  6 11037   LOG22460 CALL   DIVIDE             DIVIDE [R6,R1,R2] BY [R3,R4]
02611  7 06605
                 *
                 *        RETURN WITH QUOTIENT IN [R1(1-0),R2]
                 *
02612  6 00003            XMT    011B,AUX
02613  2 01005            AND    R1,R5              MOV QUOTIENT TO [R5,R6]
02614  0 02006            MOV    R2,R6
02615  6 11004            XMT    0100B,R11          SET POWER
02616  7 02156            JMP    LOG22020           CLOSE OUT NODE
                          ENDIF
                 ***END OF CONDITIONAL ASSEMBLY AREA FOR ENHANCED INST SET.
                 *   IF THIS AREA DOES NOT ASSEMBLE, THE NODE VECTORS
                 *   WILL BE SENT TO THE UNDIFINED NODE TYPE AREA
                 *   WHICH IS ALSO CONTROLLED BY CONDITIONAL ASSEMBLY
                 *
                 ***NULL NODE
                 *
02617  6 00001   LOG23000 XMT    1,AUX              ADD 1 TO ROW COUNT
02620  1 04004            ADD    R4,R4              TO KEEP IT FROM DECREMENTING
02621  7 00761            JMP    LOGIC020           SOLVE NEXT NODE
                 *
                 ***UNDIFINED NODE TYPES
                 *
                 ***SET SYSTEM ERROR STATE AND EXIT TO EXEC TO CHANGE STATES
                 *
                 ***CONDITIONAL ASSEMBLY FOR NODE TYPES WHICH ARE
                 *   ALLOWED IN THE ENHANCED SET BUT NOT IN THE BASIC SET
                          IF     ENHANCE-1
                          ENDIF
        002622   LOG24000 EQU    *
        002622   LOG25000 EQU    *
        002622   LOG26000 EQU    *
        002622   LOG27000 EQU    *
        002622   LOG28000 EQU    *
        002622   LOG29000 EQU    *
        002622   LOG30000 EQU    *
02622  6 01003   LOG31000 XMT    SYSENODE,R1
                 *
                 ***COMMON EXIT FROM LOGIC MODULE
                 *
02623  5 01225   LOGICX   NZT    R1,LOGICX10        R1.NE.0 => CHANGE STATES
02624  7 02626            JMP    LOGICX20           R1.EQ.0 => GOOD EXIT
                 *
02625  7 00453   LOGICX10 JMP    EXEC               EXIT TO EXEC
                 *
        002626   LOGICX20 EQU    *                  CONTINUE
        002626   EXEC030  EQU    *
                 *
                 ***COMMAND HANDLER FOR PERIPHERAL PORT
                 *
                 CMDS000  CLR    R1                 R1 <- ERROR EXIT CODE
02626  6 01000   +        XMT    0,R1
02627  6 17033            XMT    SAVSTATE,IVR       LOAD ADDRESS
02630  6 07021            XMT    IVISPD+IVOSPD,IVL SELECT PORTS
02631  0 01037            MOV    R1,RB              LOAD ERROR EXIT CODE
                          NOP                       *1 - WAIT
02632  0 00000   +        MOV    AUX,AUX
02633  6 17262            XMT    CMDCONT,IVR        LOAD ADDRESS
                          NOP                       *1 - WAIT
02634  0 00000   +        MOV    AUX,AUX
02635  4 37036   +        XEC    CMDSTAB1(RB),4     *1 - EXECUTE VIA CONTINUATION CODE
```

```
                          *
02636  7 02643   CMDSTAB1 JMP   CMDS010           NO FUNCTION ACTIVE
02637  7 03522            JMP   CMD03075          CONTINUE SEARCH
02640  7 04112            JMP   CMD05900          CONTINUE INSERT
02641  7 04334            JMP   CMD06400          CONTINUE DELETE
02642  7 03606            JMP   CMD04010          CONTINUE POWER
                          *
                          ***NO FUNCTIONS ACTIVE
                          *
02643  6 17074   CMDS010  XMT   MSGCOUNT,IVR      LOAD ADDRESS
02644  6 07021            XMT   IVISPD+IVOSPD,IVL SELECT SPD READ AND WRITE
02645  6 00377            XMT   -1,AUX            AUX <- DECREMENT
02646  5 37010            NZT   RB,CMDS020        BRANCH OF COMMANDS PENDING
02647  7 04732            JMP   CMDSX             NO MESSAGES, GO TO EXIT
                          *
02650  1 37037   CMDS020  ADD   RB,RB             DECREMENT COMMAND COUNT
02651  6 02075            XMT   RCVRBLK,R2        R2 <- BUFFER BLOCK ADDR
02652  6 11040            CALL  UBFCH             GET COMMAND BYTE
02653  7 05565
02654  5 01256            NZT   R1,CMDS025        IF R1 = 0, SEND A NAK MESSAGE
02655  7 04651            JMP   CMDNAK00
02656  6 17233   CMDS025  XMT   CMD02,IVR         SAVE COMMAND BYTE
02657  0 01037            MOV   R1,RB
02660  6 11041            CALL  UBFCH             GET LENGTH BYTE
02661  7 05565
02662  6 00374            XMT   -4,AUX            LENGTH LEFT = LENGTH-4
02663  1 01005            ADD   R1,R5             R5<- LENGTH LEFT
02664  6 17234            XMT   CMD03,IVR         SAVE LENGTH BYTE
02665  0 01037            MOV   R1,RB
02666  6 06235            XMT   CMD04,R6          R6<-COMMAND BUFFER POINTER
02667  7 02701            JMP   CMDS035           GO TO TEST
                          *
02670  6 02075   CMDS030  XMT   RCVRBLK,R2        R2 <- BUFFER BLOCK ADDR
02671  6 11042            CALL  UBFCH             GET NEXT BYTE
02672  7 05565
02673  0 06017            MOV   R6,IVR            LOAD COMMAND ADDR
02674  0 01037            MOV   R1,RB             WRITE TO BUFFER
02675  6 00001            XMT   1,AUX             AUX <- INCREMENT
02676  1 06006            ADD   R6,R6             BUMP BUFFER POINTER
02677  6 00377            XMT   -1,AUX            AUX <- DECREMENT
02700  1 05005            ADD   R5,R5             DECREMENT COUNT
                          *
02701  5 05270   CMDS035  NZT   R5,CMDS030        LOOP IF NOT DONE
                          *
02702  6 17233   CMDS040  XMT   CMD02,IVR         LOAD ADDR
02703  6 07021            XMT   IVISPD+IVOSPD,IVL *1 - DO SELECTS
02704  0 33401            MOV   34H,4,R1          READ COMMAND ONLY
02705  4 01306            XEC   CMDSTAB2(R1),16 BRANCH TO COMMAND HANDLER
                          *
02706  7 04645   CMDSTAB2 JMP   CMD00000          NOT USED
02707  7 02726            JMP   CMD01000          READ COMMAND
02710  7 03066            JMP   CMD02000          WRITE COMMAND
02711  7 03350            JMP   CMD03000          SEARCH COMMAND
02712  7 03562            JMP   CMD04000          POWER COMMAND
02713  7 03625            JMP   CMD05000          INSERT COMMAND
02714  7 04121            JMP   CMD06000          DELETE COMMAND
02715  7 04362            JMP   CMD07000          LED COMMAND
02716  7 04372            JMP   CMD08000          STOP COMMAND
02717  7 04403            JMP   CMD09000          GO COMMAND
02720  7 04442            JMP   CMD10000          INITIALIZE COMMAND
02721  7 04550            JMP   CMD11000          INSERT AT END-OF-COLUMN
02722  7 04601            JMP   CMD12000          DELETE AT END-OF-COLUMN
02723  7 04645            JMP   CMD13000          NOT USED
02724  7 04645            JMP   CMD14000          NOT USED
02725  7 04645            JMP   CMD15000          NOT USED
                          *
                          ***READ COMMAND
                          *
02726  6 11043   CMD01000 CALL  ADRVAL            VALIDATE ADDRESS
02727  7 06041
                          * ADRVAL RETURNS WITH THE READ ADDR IN R5,R6 AND THE - LENGTH TO
                          * READ IN R2
02730  6 17234            XMT   CMD03,IVR      CALCULATE RESPONSE LENGTH
02731  6 00371            XMT   -7,AUX
02732  1 02003            ADD   R2,R3             R3<- -(LENGTH+7)
02733  6 00377            XMT   -1,AUX
02734  3 03000            XOR   R3,AUX            AUX<- LENGTH+6 = RESPONSE LENGTH
02735  0 00037            MOV   AUX,RB            PUT IN RESPONSE
02736  6 11237            XMT   CMD06,R11         R11<- DATA START ADDR
                          *
02737  4 01340   CMD01005 XEC   CMD01TAB(R1),4    EXECUTE OFF FIELD TYPE
                          *
02740  7 02744   CMD01TAB JMP   CMD01010          LOGIC SPACE
02741  7 02762            JMP   CMD01020          I/O SPACE
02742  7 03000            JMP   CMD01030          REGISTER SPACE
02743  7 03025            JMP   CMD01040          SCRATCHPAD
                          *
                          ***LOGIC RAM
                          *
02744  6 07004   CMD01010 XMT   IVOLRHI,IVL       SELECT LOGIC ADDRHI
02745  0 05027            MOV   R5,LB             LOAD ADDRESS
02746  6 07003            XMT   IVOLRLO,IVL       SELECT LOGIC ADDRLO
02747  0 06027            MOV   R6,LB             LOAD ADDRESS
02750  6 07000            XMT   IVILRDAT+IVOCTRL,IVL *1 - SELECT PORTS
02751  6 04000            XMT   CTRLINCL,R4       *2 - R4 <- INCREMENT
```

```
                               NOP                            *3
02752   0 00000   +            MOV    AUX,AUX
02753   0 37003                MOV    RB,R3                   R3 <- DATAHI
02754   0 04027                MOV    R4,LB                   BUMP ADDRESS
                               NOP                            *1 - WAIT
02755   0 00000   +            MOV    AUX,AUX
                               NOP                            *2 - WAIT
02756   0 00000   +            MOV    AUX,AUX
                               NOP                            *3 - WAIT
02757   0 00000   +            MOV    AUX,AUX
02760   0 37004                MOV    RB,R4                   R4 <- DATALO
02761   7 03034                JMP    CMD01100                CONTINUE
                  *
                  ***I/O SPACE
                  *
02762   6 07001   CMD01020     XMT    IVOCRHI,IVL             SELECT COIL ADDRHI
02763   0 05027                MOV    R5,LB                   LOAD ADDRESS
02764   6 07000                XMT    IVOCRLO,IVL             SELECT COIL
02765   0 06037                MOV    R6,RB                   LOAD ADDRESS
02766   6 04001                XMT    CTRLINCC,R4             *1 - R4 <- INCREMENT
02767   6 07000                XMT    IVICRDAT+IVOCTRL,IVL *2 - SELECT PORTS
                               NOP                            *3 - WAIT
02770   0 00000   +            MOV    AUX,AUX
02771   0 27003                MOV    LB,R3                   R3 <- DATAHI
02772   0 04027                MOV    R4,LB                   INCREMENT ADDRESS
                               NOP                            *1 - WAIT
02773   0 00000   +            MOV    AUX,AUX
                               NOP                            *2 - WAIT
02774   0 00000   +            MOV    AUX,AUX
                               NOP                            *3 - WAIT
02775   0 00000   +            MOV    AUX,AUX
02776   0 27004                MOV    LB,R4                   R4 <- DATALO
02777   7 03034                JMP    CMD01100                CONTINUE
                  *
                  ***REGISTER SPACE
                  *
03000   6 07000   CMD01030     XMT    IVOCRLO,IVL             SELECT COIL ADDRLO
03001   0 06037                MOV    R6,RB                   LOAD ADDRESS
03002   6 07001                XMT    IVOCRHI+IVICRDAT,IVL SELECT PORTS
03003   6 00001                XMT    1,AUX                   AUX <- INCREMENT
03004   1 05027                ADD    R5,LB                   BUMP HI-ORDER ADDR
03005   6 00002                XMT    2,AUX                   *1 - INCREMENT FOR ADDRHI
                               NOP                            *2 - WAIT
03006   0 00000   +            MOV    AUX,AUX
                               NOP                            *3 - WAIT
03007   0 00000   +            MOV    AUX,AUX
03010   0 27404                MOV    REGDATA,R4              R4 <- LOW-ORDER NIBBLE
03011   1 05027                ADD    R5,LB                   LOAD ADDR MIDDLE NIBBLE
03012   6 00003                XMT    3,AUX                   *1 - INC FOR NEXT ADDRHI
                               NOP                            *2 - WAIT
03013   0 00000   +            MOV    AUX,AUX
                               NOP                            *3 - WAIT
03014   0 00000   +            MOV    AUX,AUX
03015   0 27403                MOV    REGDATA,R3              R3 <- MIDDLE NIBBLE
03016   1 05027                ADD    R5,LB                   LOAD ADDR - HI NIBBLE
03017   0 03400                MOV    R3(4),AUX               *1 - AUX <- MIDDLE NIBBLE
03020   3 04004                XOR    R4,R4                   *2 - R4 <- LOW-ORDER BYTE
03021   6 00003                XMT    00000011B,AUX           *3 - AUX <- MASK
03022   0 27403                MOV    REGDATA,R3              R3 <- HIGH-ORDER NIBBLE
03023   2 03003                AND    R3,R3                   ISOLATE DATA
03024   7 03034                JMP    CMD01100                CONTINUE
                  *
                  ***SCRATCHPAD SPACE
                  *
03025   0 06017   CMD01040     MOV    R6,IVR                  LOAD ADDRESS
03026   6 07020                XMT    IVISPD,IVL              *1 - SELECT SCRATCHPAD READ
03027   0 37003                MOV    RB,R3                   R3 <- DATAHI
03030   6 00001                XMT    1,AUX                   AUX <- INCREMENT
03031   1 06017                ADD    R6,IVR                  BUMP ADDRESS
                               NOP                            *1 - WAIT
03032   0 00000   +            MOV    AUX,AUX
03033   0 37004                MOV    RB,R4                   R4 <- DATALO
                  *
03034   0 11017   CMD01100     MOV    R11,IVR                 LOAD ADDR OF RESPONSE
03035   6 07021                XMT    IVISPD+IVOSPD,IVL       DO SELECTS
03036   0 03037                MOV    R3,RB                   WRITE DATA HI
03037   6 00001                XMT    1,AUX                   *1 - INC FOR ADDR
03040   1 11017                ADD    R11,IVR                 LOAD ADDRESS
03041   0 04037                MOV    R4,RB                   WRITE DATA LO
03042   6 00002                XMT    2,AUX                   *1 - INC FOR ADDR
03043   1 11011                ADD    R11,R11                 INC RESPONSE ADDR
03044   4 01045                XEC    READCONT(R1),R4         EXECUTE CONTINUE OFF FIELD
                  *
03045   7 03051   READCONT     JMP    CMD01200                LOGIC
03046   7 03051                JMP    CMD01200                I/O SPACE
03047   7 03060                JMP    CMD01300                REGISTER SPACE
03050   7 03051                JMP    CMD01200                SPD
                  *
03051   1 02002   CMD01200     ADD    R2,R2                   INC LENGTH LEFT (AUX = 2)
03052   5 02054                NZT    R2,CMD01210
03053   7 04660                JMP    CMDRSP                  IF NONE LEFT, BUILD RESPONSE
03054   1 06006   CMD01210     ADD    R6,R6                   UPDATE ADDR LO
03055   0 10000                MOV    OVF,AUX
03056   1 05005                ADD    R5,R5                   UPDATE ADDR HI
03057   7 02737                JMP    CMD01005
```

```
                         *
03060  1 02002   CMD01300 ADD   R2,R2              INC LENGTH LEFT
03061  5 02063            NZT   R2,CMD01310
03062  7 04660            JMP   CMDRSP             IF NONE LEFT, BUILD RESPONSE
03063  6 00001   CMD01310 XMT   1,AUX              COIL ADDRLO GETS BUMPED BY 1
03064  1 06006            ADD   R6,R6
03065  7 03000          . JMP   CMD01030            CONTINUE COIL READ

                 *
                 ***WRITE COMMAND
                 *
03066  6 11044   CMD02000 CALL  PROTECT
03067  7 06541
03070  6 11045            CALL  ADRVAL
03071  7 06041
03072  6 00370            XMT   -8,AUX             WRITELENGTH = CMDLEN - 8, TELL LENVAL
03073  6 11046            CALL  LENVAL             VALIDATE LENGTH
03074  7 06171
03075  6 03237            XMT   CMD06,R3       R3<- WRITE DATA ADDR
03076  6 17234            XMT   CMD03,IVR      CALCULATE MASK ADDR
03077  6 00227            XMT   CMD01-3,AUX    *1
03100  1 37004            ADD   RB,R4              R4<- MASK ADDR
03101  4 01102            XEC   CMD02TAB(R1),4
                 * *
03102  7 03106   CMD02TAB JMP   CMD02010           LOGIC SPACE
03103  7 03257            JMP   CMD02020           I/O SPACE
03104  7 03314            JMP   CMD02030           REGISTER SPACE
03105  7 03344            JMP   CMD02040           SCRATCHPAD
                 *
                 ***LOGIC SPACE
                 *        *
                          ORG   8,256
03106  5 05116   CMD02010 NZT   R5,CMD02012        CHECK IF ADDRESS = (0,0)
03107  5 06116            NZT   R6,CMD02012
03110  6 00002            XMT   2,AUX              IF SO, DON'T DO WRITE, BUT DON'T COMPLAIN
03111  1 06006            ADD   R6,R6              BUMP LOGIC ADDR TO 2
03112  1 03003            ADD   R3,R3              BUMP COMMAND DATA ADDR
03113  1 02002            ADD   R2,R2              DEC LENGTH
03114  5 02116            NZT   R2,CMD02012        SEE IF ANY WRITING TO DO
03115  7 04660            JMP   CMDRSP             IF NOT, EXIT
03116  6 17024   CMD02012 XMT   SAVER2,IVR         SAVE LENGTH
03117  6 07021            XMT   IVISPD+IVOSPD,IVL
03120  0 02037            MOV   R2,RB
03121  0 02001            MOV   R2,R1              *1 - R1<- LENGTH TO VALIDATE
03122  6 17023            XMT   SAVER1,IVR         SAVE IT TOO
03123  0 01037            MOV   R1,RB
                          NOP                      *1 - WAIT
03124  0 00000   +        MOV   AUX,AUX
03125  6 17025            XMT   SAVER3,IVR         SAVE DATA ADDRESS
03126  0 03037            MOV   R3,RB
                          NOP                      *1 - WAIT
03127  0 00000   +        MOV   AUX,AUX
03130  6 17027            XMT   SAVER5,IVR         SAVE ADDRESSES
03131  0 05037            MOV   R5,RB
                          NOP                      *1
03132  0 00000   +        MOV   AUX,AUX
03133  6 17030            XMT   SAVER6,IVR
03134  0 06037            MOV   R6,RB
03135  6 07003            XMT   IVOLRLO,IVL        SELECT LOGIC ADDRLO
03136  0 06027            MOV   R6,LB              SET IT
03137  6 07024            XMT   IVOLRHI+IVISPD,IVL SELECT LOGIC ADDRHI AND SPD READ
03140  0 05027            MOV   R5,LB              SET LOGIC ADDRHI
03141  0 03017   CMD02013 MOV   R3,IVR             SET COMMAND DATA ADDR
03142  6 00001            XMT   1,AUX              *1
03143  0 37001            MOV   RB,R1              R1<- DATAHI
03144  0 04017            MOV   R4,IVR             SET MASK ADDR
03145  1 03003            ADD   R3,R3              *1 - INC DATA ADDR
03146  0 37000            MOV   RB,AUX             AUX<- MASKHI
03147  6 07000            XMT   IVILRDAT,IVL       SELECT LOGIC READ
03150  2 37000            AND   RB,AUX             MASK BITS
03151  3 01001            XOR   R1,R1              R1<- REPLACEMENT DATAHI
03152  6 07020            XMT   IVOCTRL+IVISPD,IVL  SELECT CONTROL REG AND SPD READ
03153  6 27300            XMT   CTRLINCL,CTRLREG    INC LOGIC ADDR
03154  0 03017            MOV   R3,IVR             SET DATA ADDR
03155  6 00001            XMT   1,AUX              *1
03156  0 37002            MOV   RB,R2              R2<- DATALO
03157  1 04017            ADD   R4,IVR             SET MASKLO ADDR
03160  1 03003            ADD   R3,R3              *1 - INC DATA ADDR
03161  0 37000            MOV   RB,AUX             AUX<- MASKLO
03162  6 07000            XMT   IVILRDAT,IVL       SELECT LOGIC READ
03163  2 37000            AND   RB,AUX             MASK BITS
03164  3 02002            XOR   R2,R2              R2<- REPLACEMENT DATALO
03165  6 11047            CALL  VALIDATE           SEE IF VALID NODE
03166  7 06702
03167  6 00377            XMT   -1,AUX             VALIDATE RETURNS WITH -1 IN R1
03170  3 01000            XOR   R1,AUX             IF BAD NODE
03171  5 00174            NZT   AUX,CMD02014
03172  6 01012            XMT   ERRNOD,R1          TAKE ERROR EXIT
03173  7 04646            JMP   CMDERR
03174  6 17023   CMD02014 XMT   SAVER1,IVR         CHCK IF MORE TO VALIDATE
03175  6 07021            XMT   IVISPD+IVOSPD,IVL
03176  6 00002            XMT   2,AUX
03177  1 37001            ADD   RB,R1
03200  0 01037            MOV   R1,RB              SAVE NEW VALUE
03201  6 07000            XMT   IVOCTRL,IVL        BUMP LOGIC ADDR NOW
03202  6 27300            XMT   CTRLINCL,CTRLREG   BUMP LOGIC ADDR NOW
03203  5 01141            NZT   R1,CMD02013        LOPP IF MORE
                          RSP   SAVER3,R3          ELSE, RESTORE DATA AND LOGIC ADDRS
```

```
03204   6 17025   +          XMT    SAVER3,IVR               LOAD ADDRESS
03205   6 07021   +          XMT    IVISPD+IVOSPD,IVL *1 - SELECT SPD READ
03206   0 37003   +          MOV    RB,R3                READ DATA
                             RSP    SAVER5,R5
03207   6 17027   +          XMT    SAVER5,IVR               LOAD ADDRESS
03210   6 07021   +          XMT    IVISPD+IVOSPD,IVL *1 - SELECT SPD READ
03211   0 37005   +          MOV    RB,R5                READ DATA
                             RSP    SAVER6,R6
03212   6 17030   +          XMT    SAVER6,IVR               LOAD ADDRESS
03213   6 07021   +          XMT    IVISPD+IVOSPD,IVL *1 - SELECT SPD READ
03214   0 37006   +          MOV    RB,R6                READ DATA
03215   0 03017   CMD02015   MOV    R3,IVR            LOAD ADDRESS
03216   6 00001              XMT    1,AUX             *1 - SET AUX TO INCREMENT
03217   0 37001              MOV    RB,R1             R1<- WRITE DATA
03220   0 04017              MOV    R4,IVR            LOAD MASK ADDR
03221   1 03003              ADD    R3,R3             *1 - INC DATA ADDR
03222   0 37000              MOV    RB,AUX            AUX<- MASK
03223   6 07004              XMT    IVOLRHI,IVL       SELECT LOGIC ADDRHI
03224   0 05027              MOV    R5,LB             LOAD ADDRHI
03225   6 07003              XMT    IVOLRLO,IVL       SELECT LOGIC ADDRLO
03226   0 06027              MOV    R6,LB             LOAD ADDRLO
03227   6 07011              XMT    IVILRDAT+IVOLRDAT,IVL *1 - SELECT LR READ/WRITE
                             NOP                      *2 - WAIT
03230   0 00000   +          MOV    AUX,AUX
                             NOP                      *3 - WAIT
03231   0 00000   +          MOV    AUX,AUX
03232   2 37000              AND    RB,AUX            MASK BITS
03233   3 01001              XOR    R1,R1
03234   6 11050              CALL   WRTUP             WRITE OUT DATA
03235   7 05456
03236   6 17024              XMT    SAVER2,IVR        LOAD ADDR OF -LENGTH
03237   6 07021              XMT    IVISPD+IVOSPD,IVL *1 - SELECT SPD READ/WRITE
03240   6 00001              XMT    1,AUX
03241   1 37037   *          ADD    RB,RB
03242   1 06006              ADD    R6,R6             *  INC LOGIC ADDRLO (HAVE TO WAIT)
03243   0 10000              MOV    OVF,AUX           *2 FOR INC'ING LOGIC ADDRHI
03244   5 37010              NZT    RB,CMD02016       IF MORE LEFT, CONTINUE
03245   6 11051              CALL   CLRDIAG           ELSE,CLEAR DIAGNOSTIC
03246   7 06214
03247   7 04660              JMP    CMDRSP            EXIT
03250   1 05005   CMD02016   ADD    R5,R5             SET LOGIC ADDRHI
03251   6 00001              XMT    1,AUX                K WHETHER TO USE MASKHI OR LO
03252   2 06000              AND    R6,AUX
03253   5 00255              NZT    AUX,CMD02017
03254   6 00377              XMT    -1,AUX            IF R6 ODD, GO FROM LO TO HI
03255   1 04004   CMD02017   ADD    R4,R4             ELSE HI TO LO
03256   7 03215              JMP    CMD02015
                  *
                  ***I/O SPACE
                  *
         003257   CMD02020   EQU    *
03257   6 07021   CMD02025   XMT    IVISPD+IVOSPD,IVL SELECT SPD READ/WRITE
03260   0 03017              MOV    R3,IVR            LOAD DATA ADDRESS
03261   6 00001              XMT    1,AUX             *1 - SET AUX FOR INCREMENT
03262   0 37001              MOV    RB,R1             R1<- WRITE DATA
03263   0 04017              MOV    R4,IVR            LOAD MASK ADDR
03264   1 03003              ADD    R3,R3             *1 - INC DATA ADDR
03265   0 37000              MOV    RB,AUX            AUX<- MASK
03266   6 07001              XMT    IVOCRHI,IVL       SELECT COIL ADDRHI
03267   0 05027              MOV    R5,LB             SET ADDRHI
03270   6 07000              XMT    IVOCRLO,IVL       SELECT COIL ADDRLO
03271   0 06037              MOV    R6,RB             SET ADDRLO
03272   6 07002              XMT    IVICRDAT+IVOCRDAT,IVL  *1 - SELECT COIL READ/WRITE
                             NOP                      *2 - WAIT
03273   0 00000   +          MOV    AUX,AUX
                             NOP                      *3 - WAIT
03274   0 00000   +          MOV    AUX,AUX
03275   2 27000              AND    LB,AUX            MASK BITS
03276   3 01027              XOR    R1,LB
03277   6 00001              XMT    1,AUX              INC -LENGTH LEFT
03300   1 02002              ADD    R2,R2
03301   5 02303              NZT    R2,CMD02026       IF MORE LEFT, CONTINUE
03302   7 04660              JMP    CMDRSP            EXIT
03303   1 06006   CMD02026   ADD    R6,R6         INC COIL ADDRESS
03304   0 10000              MOV    OVF,AUX
03305   1 05005              ADD    R5,R5
03306   6 00001              XMT    1,AUX         CHECK WHICH MASK TO USE
03307   2 06000              AND    R6,AUX
03310   5 00312              NZT    AUX,CMD02027 IF R6 ODD, GO FROM LO TO HI
03311   6 00377              XMT    -1,AUX        ELSE HI TO LO
03312   1 04004   CMD02027   ADD    R4,R4
03313   7 03257              JMP    CMD02025
                  *
                  ***REGISTER SPACE
                  *
         003314   CMD02030   EQU    *
03314   6 07021   CMD02035   XMT    IVISPD+IVOSPD,IVL SELECT SPD READ/WRITE
03315   6 17024              XMT    SAVER2,IVR    LOAD ADDRESS
03316   0 02037              MOV    R2,RB         SAVE -LENGTH
03317   6 00001              XMT    1,AUX         *1
03320   0 03017              MOV    R3,IVR        LOAD DATA ADDR
03321   1 03003              ADD    R3,R3         *1 - INC DATA ADDR
03322   0 37001              MOV    RB,R1         R1<- DATAHI
03323   0 03017              MOV    R3,IVR        NEXT DATA WORD
03324   1 03003              ADD    R3,R3         *1 - INC DATA ADDR
03325   0 37002              MOV    RB,R2         R2<- DATALO
```

```
03326  6 00003            XMT    00000011B,AUX ISOLATE DATA
03327  2 01001            AND    R1,R1
03330  6 05001            XMT    1,R5             STORE WANTS ADDRHI SET TO 1
03331  6 11052            CALL   STORE        WRITE DATA
03332  7 05777
03333  6 17024            XMT    SAVER2,IVR       INC LENGTH LEFT
03334  6 07021            XMT    IVISPD+IVOSPD,IVL
03335  6 00002            XMT    2,AUX
03336  1 37037            ADD    RB,RB
03337  6 00001            XMT    1,AUX            *1
03340  1 06006            ADD    R6,R6            *2 - INC COIL ADDR
03341  5 37003            NZT    RB,CMD02036      LOOP IF MORE TO WRITE
03342  7 04660            JMP    CMDRSP           ELSE, EXIT
03343  7 03314  CMD02036  JMP    CMD02035
                *
                ***SCRATCHPAD SPACE
                *
03344  6 01005  CMD02040  XMT    ERRADI,R1        NO WRITE ALLOWED TO SPD
03345  7 04646            JMP    CMDERR           ERROR EXIT
                *
                ***SEARCH COMMAND
                *
                * SEARCH MUST DO ITS OWN ADDRESS VALIDATION. IT CAN'T USE SUBROUTINE ADRVAL
                *
03346  6 01005  CMD03005  XMT    ERRADI,R1        ERROR EXIT
03347  7 04646            JMP    CMDERR
                *
03350  6 17235  CMD03000  XMT    CMD04,IVR        CHECK ADDRESS
03351  6 07021            XMT    IVOSPD+IVISPD,IVL SELECT SPD READ/WRITE
03352  0 37005            MOV    RB,R5            R5<- ADDRHI
03353  0 32301            MOV    ADRFLD,R1        R1<- FIELD
03354  5 01346            NZT    R1,CMD03005      ERROR IF NOT LOGIC SPACE
03355  6 17236            XMT    CMD05,IVR        SET ADDRLO ADDR
03356  6 00001            XMT    1,AUX            *1
03357  0 37006            MOV    RB,R6            R6<- ADDRLO
03360  2 06000            AND    R6,AUX           R6 SHOULD BE EVEN
03361  5 00346            NZT    AUX,CMD03005
03362  6 11053            CALL   LENZERO          CHECK THAT CMD-LEN = 0
03363  7 06205
                *
03364  5 05367  CMD03010  NZT    R5,CMD03011      ADRESS SHOULDN'T BE (0,0)
03365  5 06367            NZT    R6,CMD03011
03366  7 03346            JMP    CMD03005
03367  6 11000  CMD03011  XMT    0,R11
03370  6 17243            XMT    CMD10,IVR        USE CMD10 AND CMD11 FOR NETHI
03371  6 07001            XMT    IVOSPD,IVL       AND NETLO FOR NOW
03372  0 11037            MOV    R11,RB           CLEAR NETHI AND NETLO
                          NOP                     *1 - WAIT
03373  0 00000  +         MOV    AUX,AUX
03374  6 17244            XMT    CMD11,IVR
03375  0 11037            MOV    R11,RB
03376  6 00377  CMD03015  XMT    -1,AUX           *1
03377  6 17237            XMT    CMD06,IVR        LOAD ADDRESS
03400  6 07024            XMT    IVISPD+IVOLRHI,IVL *1 - DO SELECTS
03401  0 37001            MOV    RB,R1            R1<- DATAHI
03402  6 17240            XMT    CMD07,IVR
03403  0 05027            MOV    R5,LB            *1 - LOAD LOGIC ADDRHI
03404  0 37002            MOV    RB,R2            R2 <- DATALO
03405  6 17241            XMT    CMD08,IVR      LOAD ADDRESS
03406  6 07023            XMT    IVISPD+IVOLRLO,IVL *1 - DO SELECTS
03407  0 37003            MOV    RB,R3            R3 <- MASKHI
03410  6 17242            XMT    CMD09,IVR      LOAD ADDRESS
03411  0 06027            MOV    R6,LB            *1 - LOAD LOGIC ADDRLO
03412  0 37004            MOV    RB,R4            R4 <- MASKLO
03413  3 03003            XOR    R3,R3            COMPLEMENT MASKHI
03414  3 04004            XOR    R4,R4            COMPLEMENT MASKLO
                *
03415  6 07000  CMD03020  XMT    IVOCTRL+IVILRDAT,IVL DO SELECTS
03416  6 00000            XMT    NODESON.L.2,AUX   AUX <- MASK
03417  3 37000            XOR    RB,AUX           AUX.EQ.0 => START-OF-NETWORK NODE
03420  5 00032            NZT    AUX,CMD03030     AUX.NE.0 => NOT A START NODE
                *
03421  6 17244            XMT    CMD11,IVR      LOAD ADDRESS
03422  6 07021            XMT    IVISPD+IVOSPD,IVL *1 - DO SELECTS
03423  6 00001            XMT    1,AUX            AUX <- INCREMENT
03424  1 37037            ADD    RB,RB            NETLO <- NETLO + 1
03425  0 10000            MOV    OVF,AUX          AUX <- OVERFLOW
03426  6 17243            XMT    CMD10,IVR      LOAD ADDRESS
                          NOP                     *1 - WAIT
03427  0 00000  +         MOV    AUX,AUX
03430  1 37037            ADD    RB,RB            NETHI <- NETHI + OVF
03431  6 07000            XMT    IVOCTRL+IVILRDAT,IVL DO SELECTS
                *
03432  0 03000  CMD03030  MOV    R3,AUX           AUX <- MASKHI
03433  2 37000            AND    RB,AUX           ISOLATE NEEDED BITS
03434  6 27300            XMT    CTRLINCL,CTRLREG  INC LOGIC ADDR
03435  3 01000            XOR    R1,AUX           *1 - AUX.EQ.0 => MATCH
03436  5 00102            NZT    AUX,CMD03050     *2 - AUX.NE.0 => NO MATCH
                *
03437  0 04000            MOV    R4,AUX           *3 - AUX <- MASKLO
03440  2 37000            AND    RB,AUX           ISOLATE NEEDED BITS
03441  3 02000            XOR    R2,AUX           AUX.EQ.0 => MATCH
```

```
3386  03442  5 00102            NZT   AUX,CMD03050       AUX.NE.0 => NO MATCH
3387  03443  6 17235   CMD03040 XMT   CMD04,IVR       LOAD ADDRESS
3388  03444  6 07004            XMT   IVOLRHI,IVL        SELECT SPDOUT ALSO
3389  03445  0 05037            MOV   R5,RB              LOAD RESPONSE ADDRHI
3390  03446  0 05027     •      MOV   R5,LB              *1 - LOAD LOGIC ADDRHI
3391  03447  6 17236            XMT   CMD05,IVR       LOAD ADDRESS
3392  03450  6 07003            XMT   IVOLRLO,IVL        SELECT SPDOUT ALSO
3393  03451  0 06037            MOV   R6,RB              LOAD RESPONSE ADDRLO
3394  03452  0 06027            MOV   R6,LB              *1 - LOAD LOGIC ADDRLO
3395  03453  6 07001            XMT   IVILRDAT+IVOSPD,IVL *1 - DO SELECTS
3396  03454  6 17237            XMT   CMD06,IVR       *2 - LOAD ADDRESS
3397                            NOP                      *3 - WAIT
3397  03455  0 00000   +        MOV   AUX,AUX
3398  03456  0 37037            MOV   RB,RB              STORE DATAHI
3399  03457  6 07000            XMT   IVOCTRL,IVL        DO SELECT
3400  03460  6 27300            XMT   CTRLINCL,CTRLREG  INC LOGIC ADDR
3401  03461  6 07001            XMT   IVILRDAT+IVOSPD,IVL *1 - DO SELECTS
3402  03462  6 17240            XMT   CMD07,IVR       *2 - LOAD SPD ADDR
3403                            NOP                      *3 - WAIT
3403  03463  0 00000   +        MOV   AUX,AUX
3404  03464  0 37037            MOV   RB,RB              STORE DATALO
3405                            NOP                      *1 - WAIT
3405  03465  0 00000   +        MOV   AUX,AUX
3406  03466  6 17243            XMT   CMD10,IVR          NOW PUT NETHI AND NETLO
3407  03467  6 07021            XMT   IVISPD+IVOSPD,IVL *1 - WHERE THEY BELONG
3408  03470  0 37003            MOV   RB,R3
3409  03471  6 17241            XMT   CMD08,IVR
3410  03472  0 03037            MOV   R3,RB
3411                            NOP                      *1 - WAIT
3411  03473  0 00000   +        MOV   AUX,AUX
3412  03474  6 17244            XMT   CMD11,IVR
3413                            NOP                      *1 - WAIT
3413  03475  0 00000   +        MOV   AUX,AUX
3414  03476  0 37003            MOV   RB,R3
3415  03477  6 17242            XMT   CMD09,IVR
3416  03500  0 03037            MOV   R3,RB
3417  03501  7 04660            JMP   CMDRSP             GO TO COMMON EXIT
3418                   *
3419  03502  6 27300   CMD03050 XMT   CTRLINCL,CTRLREG    INCREMENT ADDRESS
3420  03503  6 00002            XMT   2,AUX              AUX <- DOUBLE INCREMENT
3421  03504  1 06006            ADD   R6,R6              ADDRLO <- ADDRLO + 2
3422  03505  5 10136            NZT   OVF,CMD03060       OVF.NE.0 => CHANGE FIELDS
3423  03506  6 00177            XMT   01111111B,AUX      SEE IF WE HAVE CHANGED 128 BYTE PAGES
3424  03507  2 06000            AND   R6,AUX
3425  03510  5 00015            NZT   AUX,CMD03020       NO, CONTINUE
3426                            WSP   SADDRHI,R5         SAVE ADDRESSES
3426  03511  6 07021   +        XMT   IVISPD+IVOSPD,IVL SELECT SPD READ/WRITE
3426  03512  6 17263   +        XMT   SADDRHI,IVR                LOAD ADDRESS
3426  03513  0 05037   +        MOV   R5,RB               WRITE DATA
3427                   •        WSP   SADDRLO,R6
3427  03514  6 07021   +        XMT   IVISPD+IVOSPD,IVL SELECT SPD READ/WRITE
3427  03515  6 17264   +        XMT   SADDRLO,IVR                LOAD ADDRESS
3427  03516  0 06037   +        MOV   R6,RB               WRITE DATA
3428  03517  6 11054            CALL  INTRP              CALL INTERRUPT HANDLER
      03520  7 05103
3429  03521  5 01131            NZT   R1,CMD03999        IF R1 .NE. 0, TROUBLES
3430                   CMD03075 RSP   SADDRLO,R6         RESTORE ADDRESSES
3430  03522  6 17264   +        XMT   SADDRLO,IVR                LOAD ADDRESS
3430  03523  6 07021   +        XMT   IVISPD+IVOSPD,IVL *1 - SELECT SPD READ
3430  03524  0 37006   +        MOV   RB,R6               READ DATA
3431                            RSP   SADDRHI,R5         AND CONTINUE SEARCH
3431  03525  6 17263   +        XMT   SADDRHI,IVR                LOAD ADDRESS
3431  03526  6 07021   +        XMT   IVISPD+IVOSPD,IVL *1 - SELECT SPD READ
3431  03527  0 37005   +        MOV   RB,R5               READ DATA
3432  03530  7 03376            JMP   CMD03015
3433                   *
3434  03531  6 00001   CMD03999 XMT   SRCHCONT,AUX       SET CONTINUATION BIT
3435                            WSP   CMDCONT,AUX
3435  03532  6 07021   +        XMT   IVISPD+IVOSPD,IVL SELECT SPD READ/WRITE
3435  03533  6 17262   +        XMT   CMDCONT,IVR                LOAD ADDRESS
3435  03534  0 00037   +        MOV   AUX,RB               WRITE DATA
3436  03535  7 00453            JMP   EXEC
3437                   *
3438  03536  0 10000   CMD03060 MOV   OVF,AUX            AUX <- OVF
3439  03537  1 05005            ADD   R5,R5              INCREMENT ADDRHI
3440  03540  6 17276            XMT   SPDCONF1,IVR       LOAD ADDRESS
3441  03541  6 07020            XMT   IVISPD,IVL         DO SELECT
3442  03542  0 34500            MOV   SYS0256B,5,AUX     AUX <- NUMBER OF LOGIC FIELDS
3443  03543  3 05000            XOR   R5,AUX             AUX.EQ.0 => SEARCH FAILED
3444  03544  5 00150            NZT   AUX,CMD03080       AUX.NE.0 => CONTINUE
3445  03545  6 05377            XMT   -1,R5              ADDRHI <- -1
3446  03546  6 06377            XMT   -1,R6              ADDRLO <- -1
3447  03547  7 03443            JMP   CMD03040           GO TO COMMON CODE
3448                   *
3449                   CMD03080 WSP   SADDRHI,R5         SAVE ADDRESSES
3449  03550  6 07021   +        XMT   IVISPD+IVOSPD,IVL SELECT SPD READ/WRITE
3449  03551  6 17263   +        XMT   SADDRHI,IVR                LOAD ADDRESS
3449  03552  0 05037   +        MOV   R5,RB               WRITE DATA
3450                            WSP   SADDRLO,R6
3450  03553  6 07021   +        XMT   IVISPD+IVOSPD,IVL SELECT SPD READ/WRITE
3450  03554  6 17264   +        XMT   SADDRLO,IVR                LOAD ADDRESS
3450  03555  0 06037   +        MOV   R6,RB               WRITE DATA
3451  03556  6 00001            XMT   SRCHCONT,AUX       *1 - SET SEARCH TO CONTINUE
3452  03557  6 17262            XMT   CMDCONT,IVR
3453  03560  0 00037            MOV   AUX,RB
3454  03561  7 04732            JMP   CMDSX
```

```
                                 *
                                 ***POWER COMMAND
                                 *
03562  6 11055                   CMD04000 CALL   LENZERO           CHECK THAT CMD-LEN = 0
03563  7 06205
03564  6 17235                            XMT    CMD04,IVR      LOAD ADDRESS
03565  6 07021                            XMT    IVISPD+IVOSPD,IVL *1 - DO SELECTS
03566  0 37003                            MOV    RB,R3             R3 <- POWERHI
03567  6 17040                            XMT    POWERHI,IVR       LOAD ADDRESS
03570  0 03037                            MOV    R3,RB             SET POWERHI
                                          NOP                      *1 - WAIT
03571  0 00000     *                      MOV    AUX,AUX
03572  6 17236                            XMT    CMD05,IVR      LOAD ADDRESS
                                          NOP                      *1 - WAIT
03573  0 00000     *                      MOV    AUX,AUX
03574  0 37003                            MOV    RB,R3             R3<- POWERLO
03575  6 17041                            XMT    POWERLO,IVR
03576  0 03037                            MOV    R3,RB             SET POWERLO
03577  6 00000                            XMT    0,AUX             *1
03600  6 17063                            XMT    LEDLOC,IVR        SET FOR NO LED OUTPUT
03601  0 00037                            MOV    AUX,RB
03602  6 00004                            XMT    PWRCONT,AUX       *1
03603  6 17262                            XMT    CMDCONT,IVR       SET POWER CONTINUATION
03604  0 00037                            MOV    AUX,RB
03605  7 04732                            JMP    CMDSX
                                 *
                                 * POWER CONTINUES HERE
                                 *
03606  6 02237                   CMD04010 XMT    CMD06,R2          R2 <- DESTINATION ADDRESS
03607  6 03365                            XMT    -11,R3            R3 <- COUNT
03610  6 01045                            XMT    POWER1,R1         BEGINNING POWER ADDRESS
03611  6 07021                            XMT    IVISPD+IVOSPD,IVL SELECT SPD READ/WRITE
03612  6 00001                            XMT    1,AUX             FOR INC'ING
03613  0 01017                   CMD04020 MOV    R1,IVR            LOAD ADDRESS
03614  1 01001                            ADD    R1,R1             *1 - BUMP POWER ADDR
03615  0 37004                            MOV    RB,R4             R4<- POWER BYTE
03616  0 02017                            MOV    R2,IVR            LOAD RESPONSE ADDR
03617  0 04037                            MOV    R4,RB             LOAD RESPONSE BUFFER
03620  1 02002                            ADD    R2,R2             BUMP RESPONSE ADDR
03621  1 03003                            ADD    R3,R3             BUMP COUNT
03622  5 03213                            NZT    R3,CMD04020       LOOP ON COUNT
03623  7 04660                            JMP    CMDRSP            BUILD RESPONSE
                                 *
                                 ***INSERT COMMAND
                                 *
                                 * PSEUDO-CODE DESCRIPTION
                                 * DEFINITIONS:
                                 *         PAGE - 128 BYTES
                                 *         PAGADR - ADDRESS OF BEGINNING OF THE PAGE
                                 *         NOWPAGE - THE PAGE INSERT IS NOW WORKING ON
                                 *         EOLPAGE - THE PAGE THE FIRST EOL IS ON
                                 *         LASTPAGE - THE LAST PAGE IN PHYSICAL MEMORY
                                 *         INPAGE - THE PAGE THE DATA WILL BE INSERTED ON
                                 *         INNUM - THE NUMBER OF BYTES BEING INSERTED
                                 *         EOLAD - END OF LOGIC ADDRESS
                                 *         INSTAD - ADDRESS PASSED IN THE INSERT COMMAND (INSERT START ADDRESS)
                                 *         PASS1STB - FIRST PASS FLAG
                                 *         ENT1STB - FIRST ENTRY FLAG
                                 * INSERT WILL MOVE ONE PAGE OF DATA, CALL INTRP, THEN MOVE ANOTHER
                                 * PAGE OF DATA. IT THEN EXITS AND SETS THE COMMAND CONTINUATION WORD
                                 * IF NECESSARY. INSERT MUST THEREFORE KNOW IF IT HAS MOVED ONE OR TWO
                                 * PAGES (PASS1STB). IT MUST ALSO KNOW IF IT HAS JUST STARTED FOR THE
                                 * FIRST TIME (ENT1STB).
                                 *
                                 *** INITIALIZE
                                 *
                                 * VALIDATE ADDRESS
                                 * CHECK MEMORY PROTECT
                                 * VALIDATE NODES TO INSERT
                                 * VALIDATE ENOUGH ROOM IN MEMORY
                                 *
                                 * EOLAD = EOLAD + INNUM
                                 * PASS1STB = 1
                                 * ENT1STB = 1
                                 *
                                 *** CONTINUE HERE AFTER INTRP OR EXIT
                                 *
                                 * IF INPAGE .EQ. NOWPAGE
                                 *   IF NOWPAGE .EQ. LASTPAGE
                                 *     COUNT = EOLAD - INSTAD - INNUM
                                 *     FROMADDR = EOLAD - INNUM - 1
                                 *     TOADDR = FROMADDR + INNUM
                                 *     ELSE
                                 *       COUNT = 128 - INSTAD(MOD(128))
                                 *       FROMADDR = PAGADR + 127
                                 *       TOADDR = FROMADDR + INNUM
                                 *   DO WHILE COUNT .GT. 0
                                 *     C(TOADDR) = C(FROMADDR)
                                 *     TOADDR = TOADDR - 1
                                 *     FROMADDR = FROMADDR - 1
                                 *     COUNT = COUNT - 1
                                 *   COUNT = -INNUM
                                 *   TOADDR = INSTAD
                                 *   FROMADDR = CMD04 (IN SPD)
                                 *   CHKPLUS = 0
```

```
                        *   DO WHILE COUNT .LT. 0
                        *     C(TOADDR) = C(FROMADDR)
                        *     CHKPLUS = CHKPLUS + C(FROMADDR)
                        *     TOADDR = TOADDR + 1
                        *     FROMADDR = FROMADDR + 1
                        *     COUNT = COUNT + 1
                        *   IF ENT1STB = 1
                        *     CHKMINUS = INNUM/2 * EOL
                        *     ELSE
                        *       CHKMINUS = INNUM/2 * NULL
                        *   LOGIC CHECKSUM = LOGIC CHECKSUM + CHKPLUS - CHKMINUS
                        *   JMP CMDRSP   -   DONE, BUILD RESPONSE
                        * IF INPAGE .NE. NOWPAGE
                        *   IF NOWPAGE .EQ. LASTPAGE
                        *     COUNT = EOLAD(MOD(128)) - INNUM
                        *     ELSE
                        *       COUNT = 128
                        *   FROMADDR = PAGADR + COUNT - 1
                        *   TOADDR = FROMADDR + INNUM
                        *   DO WHILE COUNT .GT. 0
                        *     C(TOADDR) = C(FROMADDR)
                        *     TOADDR = TOADDR - 1
                        *     FROMADDR = FROMADDR - 1
                        *     COUNT = COUNT - 1
                        *   COUNT = -INNUM
                        *   TOADDR = PAGADR
                        *   DO WHILE COUNT .LT. 0
                        *     C(TOADDR,TOADDR+1) = NULL
                        *     TOADDR = TOADDR + 2
                        *     COUNT = COUNT + 2
                        *   IF ENT1STB = 1
                        *     LRCHECKSUM = LRCHECKSUM + INNUM/2 * (NULL - EOL)
                        *   ENT1STB = 0
                        *   NOWPAGE = NOWPAGE - 1
                        *   IF PASS1STB = 1
                        *     CALL INTRP
                        *     PASS1STB = 0
                        *     CONTINUE
                        *     ELSE
                        *       PASSISTB = 1
                        *       SET INSERT CONTINUE
                        *       EXIT
                        *
03624  7 03773   CMD05101 JMP    CMD05500          SHORT BRANCH PROBLEM
                        *
03625  6 11056   CMD05000 CALL   INSTINIT            CALL INSERT INITIALIZE
03626  7 06224
                        *
                        * AT THIS POINT, R1 = NOWPAGE AND R2 = INPAGE
                        *
03627  6 07021   CMD05100 XMT    IVISPD+IVOSPD,IVL SELECT SPD READ/WRITE
03630  0 02000            MOV    R2,AUX            AUX<- INPAGE
03631  3 01000            XOR    R1,AUX            SEE IF NOWPAGE = INPAGE
03632  5 00224            NZT    AUX,CMD05101
03633  6 17276   CMD05102 XMT    SPDCONF1,IVR      LOAD ADDRESS
03634  6 00377            XMT    -1,AUX            *1
03635  1 35600            ADD    32H,6,AUX         AUX<- LASTPAGE
03636  3 01000            XOR    R1,AUX            SEE IF NOWPAGE = LASTPAGE IN MEM
03637  5 00261            NZT    AUX,CMD05150      IF NOT,JUMP
03640  6 17066            XMT    EOLLO,IVR         LOAD ADDRESS
03641  6 00377            XMT    -1,AUX            *1 - WE WANT (R5,R6)<- FROMADDR
03642  0 37006            MOV    RB,R6             WHERE FROMADDR = EOLAD - INNUM - 1
03643  6 17065            XMT    EOLHI,IVR         WE WANT (R3,R4) = TOADDR
03644  1 06004            ADD    R6,R4             *1 - WHERE TOADDR = EOLAD - 1
03645  0 37005            MOV    RB,R5
03646  6 17265            XMT    INNUM,IVR
03647  0 05003            MOV    R5,R3             *1
03650  3 37000            XOR    RB,AUX
03651  1 06006            ADD    R6,R6
03652  6 17236            XMT    CMD05,IVR      LOAD INSTAD ADDR
03653  6 00377            XMT    -1,AUX            *1
03654  3 37000            XOR    RB,AUX
03655  1 06001            ADD    R6,R1             R1<- COUNT = EOLAD - INSTAD - INNUM
03656  6 00002            XMT    2,AUX             IF COUNT = 0, INLOOP WILL TAKE CARE OF THINGS
03657  1 01001            ADD    R1,R1
03660  7 03702            JMP    CMD05200          DO THE DATA MOVE
                        *
03661  0 01105   CMD05150 MOV    R1(1),R5          HERE, NOWPAGE .NE. LASTPAGE
03662  6 00200            XMT    10000000B,AUX     SO, FROMADDR = PAGEADDR+127
03663  2 05006            AND    R5,R6             AND TOADDR = FROMADDR + INNUM
03664  6 00177            XMT    01111111B,AUX     AND COUNT = 128 - INSTAD(LO7BITS)
03665  1 06006            ADD    R6,R6             (R5,R6)<- FROMADDR
03666  6 17265            XMT    INNUM,IVR         GET INNUM
03667  2 05005            AND    R5,R5             *1
03670  0 37000            MOV    RB,AUX            AUX<- INNUM
03671  1 06004            ADD    R6,R4             (R3,R4)<- TOADDR
03672  0 10000            MOV    OVF,AUX
03673  1 05003            ADD    R5,R3
03674  6 17236            XMT    CMD05,IVR      GET LO 7 BITS OF INSTAD
03675  6 01177            XMT    -129,R1           *1
03676  0 37700            MOV    30H,7,AUX
03677  1 01001            ADD    R1,R1             R1<- COUNT
03700  6 00377            XMT    -1,AUX
03701  3 01001            XOR    R1,R1
03702  6 11057   CMD05200 CALL   INLOOP            MOVE THE DATA
```

```
                         *
                         * AT THIS POINT, THE PAGE HAS BEEN MOVED
                         * (R5,R6+1) = INSTAD
                         * NOW WE WANT TO MOVE IN THE INSERT DATA
                         *
03704  6 04237                   XMT    CMD06,R4       R4<- FROMADDR = CMD06
03705  6 17265                   XMT    INNUM,IVR           LOAD SPD ADDR
03706  6 07020                   XMT    IVISPD,IVL          SELECT SPD READ
03707  6 00377                   XMT    -1,AUX              *1
03710  3 37001                   XOR    RB,R1               R1<- COUNT = -INNUM
03711  6 00001                   XMT    1,AUX
03712  1 01001                   ADD    R1,R1
03713  6 07003                   XMT    IVOLRLO,IVL         LOGIC ADDRLO
03714  1 06027                   ADD    R6,LB               TOADDR = INSTAD = (R5,R6) + 1
03715  6 07004                   XMT    IVOLRHI,IVL         SELECT LOGIC ADDRHI
03716  0 05027                   MOV    R5,LB
03717  6 02000                   XMT    0,R2                *1 - R2<- CHKPLUS = 0
03720  0 04017         CMD05250  MOV    R4,IVR              *2 - LOAD SPD ADDRESS
03721  6 07031                   XMT    IVOLRDAT+IVISPD,IVL *3 - SELECT LR WRITE, SPD READ
03722  0 37027                   MOV    RB,LB               MOVE INSERT DATA
03723  0 37000                   MOV    RB,AUX
03724  1 02002                   ADD    R2,R2               UPDATE CHKPLUS
03725  6 00001                   XMT    1,AUX
03726  1 01001                   ADD    R1,R1               DEC COUNT
03727  6 07000                   XMT    IVOCTRL,IVL         SELECT CONTROL PULSE
03730  6 27300                   XMT    CTRLINCL,CTRLREG    INC LOGIC ADDR
03731  1 04004                   ADD    R4,R4               *1 - INC SPD ADDR
03732  5 01320                   NZT    R1,CMD05250         *2 - LOOP ON COUNT
                         *
                         * NOW WE HAVE TO UPDATE THE LOGIC CHECKSUM
                         * IF THIS IS THE FIRST ENTRY, LRCHKSUM = LRCHKSUM+CHKPLUS-INNUM/2*EOL
                         * IF NOT, LRCHKSUM = LRCHKSUM+CHKPLUS-INNUM/2*NULL
                         *
03733  6 17265                   XMT    INNUM,IVR           LOAD INNUM ADDRESS
03734  6 07021                   XMT    IVISPD+IVOSPD,IVL *1 - SELECT SPD READ/WRITE
03735  0 36704                   MOV    31H,7,R4            R4<- INNUM/2
03736  6 17263                   XMT    NOWPAGE,IVR         LOAD ADDRESS OF FLAGS
                                 NOP                        *1 - WAIT
03737  0 00000                   MOV    AUX,AUX
                                 ORG    11,32
03740  5 30113                   NZT    ENT1STB,CMD05300    JUMP IF THIS WAS THE FIRST ENTRY
03741  4 04342                   XEC    NULLTABI-1(R4),8    ELSE WE WANT TO SUBTRACT NULLS
03742  7 03765                   JMP    CMD05400            FROM THE CHECKSUM
                         *
                         * THE FOLLOWING TABLE MUST BE CHANGED IF NULLNODE .NE. 23!!!!!!!!
                         *
03743  6 00244         NULLTABI  XMT    244H,AUX            -(1*NULL)
03744  6 00110                   XMT    110H,AUX            -(2*NULL)
03745  6 00354                   XMT    354H,AUX            -(3*NULL)
03746  6 00220                   XMT    220H,AUX            -(4*NULL)
03747  6 00064                   XMT    064H,AUX            -(5*NULL)
03750  6 00330                   XMT    330H,AUX            -(6*NULL)
03751  6 00174                   XMT    174H,AUX            -(7*NULL)
03752  6 00040                   XMT    040H,AUX            -(8*NULL)
                         *
03753  4 04354         CMD05300  XEC    EOLTABI-1(R4),8     SUBTRACT EOL'S
03754  7 03765                   JMP    CMD05400
                         *
                         * THE FOLLOWING TABLE MUST BE CHANGED IF EOLNODE .NE. 1!!!!!!!!
                         *
03755  6 00374         EOLTABI   XMT    374H,AUX            -(1*EOL)
03756  6 00370                   XMT    370H,AUX            -(2*EOL)
03757  6 00364                   XMT    364H,AUX            -(3*EOL)
03760  6 00360                   XMT    360H,AUX            -(4*EOL)
03761  6 00354                   XMT    354H,AUX            -(5*EOL)
03762  6 00350                   XMT    350H,AUX            -(6*EOL)
03763  6 00344                   XMT    344H,AUX            -(7*EOL)
03764  6 00340                   XMT    340H,AUX            -(8*EOL)
                         *
03765  1 02000         CMD05400  ADD    R2,AUX              AUX<- CHKPLUS - CHKMINUS
03766  6 11060                   CALL   UPDTLCHK            UPDATE THE CHECKSUM
03767  7 06503
03770  6 11061         CMD05410  CALL   CLRDIAG             CLEAR DIAGNOSTIC
03771  7 06214
03772  7 04660                   JMP    CMDRSP              EXIT
                         *
                         * AT THIS POINT, INPAGE .NE. NOWPAGE, R1 = NOWPAGE
                         *
03773  6 17265         CMD05500  XMT    INNUM,IVR
03774  6 00377                   XMT    -1,AUX              * 1
03775  3 37003                   XOR    RB,R3               R3<- -INNUM-1
03776  6 17276                   XMT    SPDCONF1,IVR        LOAD ADDRESS
03777  6 00377                   XMT    -1,AUX              *1 - CALCULATE LAST PAGE IN MEMORY
04000  1 35600                   ADD    32H,6,AUX
04001  3 01000                   XOR    R1,AUX              SEE IF NOWPAGE = LASTPAGE
04002  5 00011                   NZT    AUX,CMD05510        IF NOT, BRANCH
04003  6 17066                   XMT    EOLLO,IVR           SET COUNT = EOLAD(LO7BIT) - INNUM
04004  6 00001                   XMT    1,AUX               *1
04005  1 37702                   ADD    30H,7,R2            R2<- EOLAD(LO7BIT) + 1
04006  0 03000                   MOV    R3,AUX              AUX<- -INNUM-1
04007  1 02002                   ADD    R2,R2               R2<- COUNT
04010  7 04012                   JMP    CMD05520
04011  6 02200         CMD05510  XMT    128,R2              R2<- COUNT = 128
04012  0 01105         CMD05520  MOV    R1(1),R5            (R5,R6)<- PAGADR
04013  6 00200                   XMT    10000000B,AUX
04014  2 05006                   AND    R5,R6
```

```
04015  6 00177            XMT   01111111B,AUX
04016  2 05005            AND   R5,R5
04017  6 00377            XMT   -1,AUX
04020  1 02000            ADD   R2,AUX            AUX<- COUNT - 1
04021  1 06006            ADD   R6,R6             (R5,R6)<- FROMADDR = PAGADR+COUNT-1
04022  6 00377            XMT   -1,AUX
04023  3 03000            XOR   R3,AUX            AUX<- INNUM
04024  1 06004            ADD   R6,R4             (R3,R4)<- TOADDR = FROMADDR+INNUM
04025  0 10000            MOV   OVF,AUX
04026  1 05003            ADD   R5,R3
04027  0 02001            MOV   R2,R1             R1<- COUNT
04030  6 11062            CALL  INLOOP            MOVE THE DATA
04031  7 06456
04032  6 00001            XMT   1,AUX             ON RETURN,(R5,R6+1) = PAGADR
04033  1 06006            ADD   R6,R6             SET (R5,R6) = PAGADR
04034  6 17265            XMT   INNUM,IVR         LOAD ADDRESS
04035  6 07020            XMT   IVISPD,IVL        *1 - SELECT SPD READ
04036  0 37001            MOV   RB,R1             R1 <- COUNT = INNUM
04037  0 01102            MOV   R1(1),R2          R2 <- INNUM/2
04040  6 11063            CALL NULLFILL           FILL WITH NULLS
04041  7 06431
                   *
                   * IF THIS IS THE FIRST ENTRY, LRCHKSUM = LRCHKSUM + INNUM/2*(NULL-EOL)
                   * IF NOT, THE CHECKSUM DOESN'T CHANGE
                   *
04042  6 17263            XMT   NOWPAGE,IVR       PICK UP THE FLAG
04043  6 07021            XMT   IVISPD+IVOSPD,IVL *1 - SELECT SPD READ/WRITE
04044  5 30106            NZT   ENT1STB,CMD05550
04045  7 04062            JMP   CMD05700          JMP IF NOT 1ST PAGE
04046  4 02047     CMD05550 XEC CHKTABI-1(R2),8    CALCULATE CHKPLUS
04047  7 04060            JMP   CMD05650
                   *
                   * THE FOLLOWING TABLE MUST BE CHANGED IF EOLNODE .NE. 1 OR IF
                   * NULLNODE .NE. 23!!!!!!!!!!
                   *
04050  6 00130     CHKTABI  XMT   130H,AUX        1*(NULL-EOL)
04051  6 00260              XMT   260H,AUX        2*(NULL-EOL)
04052  6 00010              XMT   010H,AUX        3*(NULL-EOL)
04053  6 00140              XMT   140H,AUX        4*(NULL-EOL)
04054  6 00270              XMT   270H,AUX        5*(NULL-EOL)
04055  6 00020              XMT   020H,AUX        6*(NULL-EOL)
04056  6 00150              XMT   150H,AUX        7*(NULL-EOL)
04057  6 00300              XMT   300H,AUX        8*(NULL-EOL)
                   *
04060  6 11064     CMD05650 CALL  UPDTLCHK        UPDATE THE CHECKSUM
04061  7 06503
                   *
04062  6 17263     CMD05700 XMT   NOWPAGE,IVR     CHECK IF WE MOVED 2 PAGES THIS SWEEP
04063  6 07021              XMT   IVISPD+IVOSPD,IVL *1 - SELECT SPD READ/WRITE
04064  0 31101              MOV   PASS1STB,R1     READ 1ST PASS FLAG
04065  5 01104              NZT   R1,CMD05750     JUMP IF ANOTHER PAGE TO MOVE
04066  6 00100              XMT   PASS1STM,AUX    SET 1ST PASS FLAG, ZERO 1ST
04067  1 37601              ADD   NOWPAGEB,R1     ENTRY FLAG,
04070  6 00377              XMT   -1,AUX          DECREMENT NOWPAGE
04071  1 01037              ADD   R1,RB
04072  6 01000              XMT   0,R1            CLEAR R1 TO DENOTE GOOD EXIT
04073  6 00002     CMD05705 XMT   INSTCONT,AUX    *1 AUX<- INSERT CONTINUE
04074  6 17262     CMD05710 XMT   CMDCONT,IVR
04075  6 07001              XMT   IVOSPD,IVL      MUST BE HERE FOR COMMON ENTRY
04076  0 00037              MOV   AUX,RB
04077  6 11065              CALL  CLRDIAG
04100  7 06214
04101  5 01103              NZT   R1,CMD05730     IF R1 .NE. 0, ERROR EXIT
04102  7 04732              JMP   CMDSX           EXIT
                   *
04103  7 00453     CMD05730 JMP   EXEC            ERROR EXIT
                   *
04104  0 37601     CMD05750 MOV   NOWPAGEB,R1     READ NOWPAGE
04105  6 00377              XMT   -1,AUX
04106  1 01037              ADD   R1,RB           DEC NOWPAGE, ZERO BOTH FLAGS
04107  6 11066              CALL  INTRP           CALL INTERRUPT HANDLER
04110  7 05103
04111  5 01073              NZT   R1,CMD05705     IF R1 .NE. 0, PROBLEMS
                   *
04112  6 17264     CMD05900 XMT   INPAGE,IVR      INSERT CONTINUES HERE
04113  6 07020              XMT   IVISPD,IVL      *1 - SELECT SPD READ
04114  0 37002              MOV   RB,R2           R2<- INPAGE
04115  6 17263              XMT   NOWPAGE,IVR
                            NOP                   *1 - WAIT
04116  0 00000     +        MOV   AUX,AUX
04117  0 37601              MOV   NOWPAGEB,R1     R1<- NOWPAGE
04120  7 03627              JMP   CMD05100        CONTINUE
                   *
                   ***DELETE COMMAND
                   *
                   * PSEUDO-CODE DESCRIPTION
                   * SEE INSERT FOR DEFINITIONS
                   * ADDITIONAL DEFINITIONS:
                   *        DLNUM - NUMBER OF BYTES TO DELETE
                   *        DLSTAD - ADDRESS TO START DELETING
                   *
                   ***INITIALIZE
                   *
                   * VALIDATE ADDRESS
                   * CHECK MEMORY PROTECT
                   *
```

```
                    * NOWPAGE = DLSTAD/128
                    * ENT1STB = 1
                    * PASS1STB = 1
                    * ADDR = DLSTAD
                    * CHKMINS = 0
                    * COUNT = DLNUM
                    * DO WHILE COUNT .GT. 0
                    *   CHKMINUS = CHKMINUS + C(ADDR)
                    *   ADDR = ADDR + 1
                    *   COUNT = COUNT - 1
                    * TOADDR = DLSTAD
                    * FROMADDR = TOADDR + DLNUM
                    * COUNT = FROMADDR(MOD(128)) - 128
                    *
                    ***CONTA - COME HERE AFTER DELETECONT
                    *
                    * DO WHILE COUNT .LT. 0
                    *   C(TOADDR) = C(FROMADDR)
                    *   TOADDR = TOADDR + 1
                    *   FROMADDR = FROMADDR + 1
                    *   COUNT = COUNT + 1
                    * TOADDR = PAGADR + 128 - DLNUM
                    * COUNT = -DLNUM
                    * IF NOWPAGE .EQ. EOLPAGE
                    *   EOLAD = EOLAD - DLNUM
                    *   VALUE = EOL
                    *   ELSE
                    *     VALUE = NULL
                    * DO WHILE COUNT .LT. 0
                    *   C(TOADDR,TOADDR+1) = VALUE
                    *   TOADDR = TOADDR + 2
                    *   COUNT = COUNT + 2
                    * LRCHECKSUM = LRCHECKSUM + DLNUM/2 * VALUE - CHKMINUS
                    * IF NOWPAGE .EQ. EOLPAGE
                    *   JMP CMDRSP   -   DONE, BUILD RESPONSE
                    *   ELSE
                    *     IF PASS1STB .EQ. 1
                    *       NOWPAGE = NOWPAGE + 1
                    *       PASS1STB = 0
                    *       ENT1STB = 0
                    *       CALL INTRP
                    *       GO TO DELETECONT
                    *       ELSE
                    *         PASS1STB = 1
                    *         ENT1STB = 0
                    *         NOWPAGE = NOWPAGE + 1
                    *         SET DELETE CONTINUE
                    *         EXIT
                    *
                    ***DELETECONT
                    *
                    * CHKMINUS = DLNUM/2 * NULL
                    * COUNT = -128
                    * FROMADDR = PAGADR
                    * TOADDR = FROMADDR - DLNUM
                    * GO TO CONTA
04121  6 11067      CMD06000 CALL   DLETINIT            INITIALIZE FOR DELETE
04122  7 06366
04123  6 07004      CMD06010 XMT    IVOLRHI,IVL         SELECT LOGIC ADDRHI
04124  0 03027               MOV    R3,LB               COMPUTE CHKMINUS, WHICH IS THE SUM
04125  6 07003               XMT    IVOLRLO+IVILRDAT,IVL OF THE DATA WE ARE DELETING
04126  0 04027               MOV    R4,LB
04127  6 05000               XMT    0,R5                *1 - R5<- CHKMINUS = 0
04130  6 11000               XMT    CTRLINCL,R11        *2 - LOGIC INCREMENT VALUE -> R11
04131  0 02001               MOV    R2,R1               *3 - R1<- COUNT = DLNUM
04132  0 37000      CMD06050 MOV    RB,AUX              AUX<- DATA
04133  6 07000               XMT    IVOCTRL+IVILRDAT,IVL SELECT CTRL AND LOGIC INPUT
04134  0 11027               MOV    R11,LB              INC LOGIC ADDR
04135  1 05005               ADD    R5,R5               *1 - NEW CHKMINUS
04136  6 00377               XMT    -1,AUX              *2
04137  1 01001               ADD    R1,R1               *3 - DECREMENT COUNT
04140  5 01132               NZT    R1,CMD06050
04141  0 02000               MOV    R2,AUX              AUX<- DLNUM
04142  6 17024               XMT    SAVER2,IVR
04143. 6 07021               XMT    IVOSPD+IVISPD,IVL   SELECT SPR READ/WRITE
04144  0 05037               MOV    R5,RB               SAVE CHKMINUS IN SAVER2
04145  1 04006               ADD    R4,R6               (R3,R4) = TOADDR
04146  0 10000               MOV    OVF,AUX             (R5,R6)<- FROMADDR = TOADDR + DLNUM
04147  1 03005               ADD    R3,R5
04150  6 00001               XMT    00000001B,AUX       CALCULATE NOWPAGE
04151  2 06700               AND    R6(7),AUX
04152  1 05701               ADD    R5(7),R1            R1<- NOWPAGE
04153  6 17263               XMT    NOWPAGE,IVR         SAVE NOWPAGE, AND SET 1ST ENTRY AND
04154  6 00300               XMT    ENT1STM+PASS1STM,AUX  1ST PASS FLAGS
04155  1 01037               ADD    R1,RB
04156  6 00177               XMT    01111111B,AUX       COUNT = HOW MUCH PAGE IS LEFT
04157  2 06001               AND    R6,R1               ABOVE DLEND (R6)
04160  6 00200               XMT    -128,AUX
04161  1 01001               ADD    R1,R1               R1<- COUNT
                    *
                    * MOVE DATA LOOP
                    *
04162  6 00001      CMD06075 XMT    1,AUX               SET AUX FOR INCING
04163  6 07004      DELOOP01 XMT    IVOLRHI,IVL         SELECT LOGIC ADDRHI
```

```
04164  0 05027                MOV    R5,LB               FROMADDR HI
04165  6 07003                XMT    IVOLRLO+IVILRDAT,IVL SELECT LOGIC ADDRLO
04166  0 06027                MOV    R6,LB               FROMADDR LO
04167  1 06006                ADD    R6,R6               *1 - INC FROMADDR (CAN'T OVERFLOW)
04170  1 01001                ADD    R1,R1               *2 - DEC LOOP COUNT
                              NOP                        *3 - WAIT
04171  0 00000       +        MOV    AUX,AUX
04172  0 37002                MOV    RB,R2               R2<- DATA
04173  0 04027                MOV    R4,LB               TOADDR LO
04174  6 07004                XMT    IVOLRHI,IVL         SELECT LOGIC ADDRHI
04175  0 03027                MOV    R3,LB               TOADDR HI
04176  1 04004                ADD    R4,R4               *1 - INC TOADDR LO
04177  5 04201              - NZT    R4,DELOOP02         *2 - CHECK FOR OVERFLOW
04200  1 03003                ADD    R3,R3               *3 - IF SO, INC TOADDR HI
04201  6 07011       DELOOP02 XMT    IVOLRDAT,IVL        SELECT LOGIC WRITE
04202  0 02027                MOV    R2,LB               WRITE OUT DATA
04203  5 01163                NZT    R1,DELOOP01         LOOP ON COUNT
                     *
04204  6 17265                XMT    DLNUM,IVR           PICK UP DLNUM
04205  6 07021                XMT    IVISPD+IVOSPD,IVL   SELECT SPD READ/WRITE
04206  0 37001                MOV    RB,R1               R1<- DLNUM
04207  6 00377                XMT    -1,AUX
04210  1 01002                ADD    R1,R2               R2<- DLNUM - 1
04211  3 02000                XOR    R2,AUX              AUX<- -DLNUM
04212  1 06006                ADD    R6,R6               (R5,R6)<- ADDR FOR EOLFILL OR NULLFILL
04213  6 17065                XMT    EOLHI,IVR           LOAD ADDRESS
04214  0 01102                MOV    R1(1),R2            *1 - R2<- DLNUM/2
04215  0 37003                MOV    RB,R3               R3<- EOLLOCHI
04216  6 17066                XMT    EOLLO,IVR
                              NOP                        *1 - WAIT
04217  0 00000       +        MOV    AUX,AUX
04220  0 30100                MOV    37H,1,AUX           AUX<- HI BIT OF EOLLOCLO
04221  1 03703                ADD    R3(7),R3            R3<- EOLPAGE
04222  6 17263                XMT    NOWPAGE,IVR         PICK UP NOWPAGE
                              NOP                        *1 - WAIT
04223  0 00000       +        MOV    AUX,AUX
04224  0 37600                MOV    NOWPAGEB,AUX        DON'T READ FLAGS
04225  3 03003                XOR    R3,R3               SEE IF NOWPAGE = EOLPAGE
04226  6 17025                XMT    SAVER3,IVR          SAVE ANSWER
04227  0 03037                MOV    R3,RB
04230  5 03260                NZT    R3,CMD06100         JUMP IF NOT EOLPAGE
04231  6 17066                XMT    EOLLO,IVR           UPDATE EOLAD
04232  0 02704                MOV    R2(7),R4            *1 - R4<- DLNUM
04233  6 00377                XMT    -1,AUX
04234  3 04004                XOR    R4,R4               R4<- -DLNUM - 1
04235  6 00001                XMT    1,AUX
04236  1 04000                ADD    R4,AUX              AUX<- -DLNUM
04237  1 37037                ADD    RB,RB               UPDATE EOLLOCLO
04240  5 10244                NZT    OVF,CMD06090        CHECK FOR UNDERFLOW
04241  6 17065       CMD06080 XMT    EOLHI,IVR
04242  6 00377                XMT    -1,AUX              *1
04243  1 37037                ADD    RB,RB
04244  6 11070       CMD06090 CALL   EOLFILL             FILL ENDOF PAGE WITH EOL'S
04245  7 06433
04246  4 02247                XEC    EOLTABD-1(R2),8     CALCULATE CHKPLUS + 1
04247  7 04274                JMP    CMD06200
                     *
                     *THE FOLLOWING TABLE MUST BE CHANGED IF EOLNODE .NE. 1!!!!!!
                     *
04250  6 03005       EOLTABD  XMT    5H,R3               1*EOL + 1
04251  6 03011                XMT    11H,R3              2*EOL + 1
04252  6 03015                XMT    15H,R3              3*EOL + 1
04253  6 03021                XMT    21H,R3              4*EOL + 1
04254  6 03025                XMT    25H,R3              5*EOL + 1
04255  6 03031                XMT    31H,R3              6*EOL + 1
04256  6 03035                XMT    35H,R3              7*EOL + 1
04257  6 03041                XMT    41H,R3              8*EOL + 1
                     *
04260  6 11071       CMD06100 CALL   NULLFILL            FILL ENDOFPAGE WITH NULLS
04261  7 06431
04262  4 02263                XEC    NULLTABD-1(R2),8 CALCULATE CHKPLUS+1
04263  7 04274                JMP    CMD06200
                     *
                     * THE FOLLOWING TABLE MUST BE CHANGED IF NULLNODE .NE. 23!!!!!!
                     *
04264  6 03135       NULLTABD XMT    135H,R3             1*NULL + 1
04265  6 03271                XMT    271H,R3             2*NULL + 1
04266  6 03025                XMT    025H,R3             3*NULL + 1
04267  6 03161                XMT    161H,R3             4*NULL + 1
04270  6 03315                XMT    315H,R3             5*NULL + 1
04271  6 03051                XMT    051H,R3             6*NULL + 1
04272  6 03205                XMT    205H,R3             7*NULL + 1
04273  6 03341                XMT    341H,R3             8*NULL + 1
                     *
04274  6 17024       CMD06200 XMT    SAVER2,IVR          SAVER2 CONTAINS CHKMINUS
04275  6 07021                XMT    IVISPD+IVOSPD,IVL   *1 - DO SELECTS
04276  6 00377                XMT    -1,AUX
04277  3 37000                XOR    RB,AUX              AUX<- -CHKMINUS - 1
04300  1 03000                ADD    R3,AUX              AUX<- CHKPLUS - CHKMINUS
04301  6 11072                CALL   UPDTLCHK            UPDATE THE CHECKSUM
04302  7 06503
04303  6 17025                XMT    SAVER3,IVR          IF SAVER3 = 0, WE ARE DONE
04304  6 07021                XMT    IVISPD+IVOSPD,IVL   *1
04305  5 37007                NZT    RB,CMD06250
04306  7 03770                JMP    CMD05410            GO TO COMMON CODE
                     *
```

```
04307  6 17263  CMD06250 XMT   NOWPAGE,IVR         SEE IF WE HAVE MOVED 2 PAGES
04310  6 00101           XMT   PASS1STM+1,AUX      *1 - THIS PASS
04311  5 31126           NZT   PASS1STB,CMD06300   JUMP IF NOT
04312  1 37037           ADD   RB,RB               INC NOWPAGE, SET 1ST PASS FLAG, CLR 1ST ENTRY
04313  6 01000           XMT   0,R1                SHOW GOOD EXIT
04314  6 00003  CMD06275 XMT   DLETCONT,AUX        AUX = DELCONT
04315  7 04074           JMP   CMD05710            GO TO COMMON CODE
                *
04316  6 03134  CHKTABD2 XMT   134H,R3             1*NULL
04317  6 03270           XMT   270H,R3             2*NULL
04320  6 03024           XMT   024H,R3             3*NULL
04321  6 03160           XMT   160H,R3             4*NULL
04322  6 03314           XMT   314H,R3             5*NULL
04323  6 03050           XMT   050H,R3             6*NULL
04324  6 03204           XMT   204H,R3             7*NULL
04325  6 03340           XMT   340H,R3             8*NULL
                *
04326  0 37601  CMD06300 MOV   NOWPAGEB,R1         READ NOWPAGE
04327  6 00001           XMT   1,AUX
04330  1 01037           ADD   R1,RB               INC NOWPAGE, CLEAR FLAGS
04331  6 11073           CALL  INTRP               CALL INTERRUPT HANDLER
04332  7 05103
04333  5 01314           NZT   R1,CMD06275         ERROR IF R1 .NE. 0
                *
                * DELETE CONTINUES HERE
                *
04334  6 17265  CMD06400 XMT   DLNUM,IVR
04335  6 07021           XMT   IVISPD+IVOSPD,IVL   DO SELECTS
04336  0 36702           MOV   31H,7,R2            R2<- DLNUM/2
04337  4 02315           XEC   CHKTABD2-1(R2),8    FAKE OUT OTHER ROUTINE
04340  6 17263           XMT   NOWPAGE,IVR         PICK UP NOWPAGE
04341  6 00200           XMT   10000000B,AUX       *1 - FOR ANDING LATER
04342  0 37601           MOV   30H,6,R1            R1<- NOWPAGE
04343  6 17024           XMT   SAVER2,IVR          BY SETTING CHKMINUS
04344  0 03037           MOV   R3,RB
04345  2 01706           AND   R1(7),R6            (R5,R6) <- FROMADDR = PAGADR
04346  6 00177           XMT   01111111B,AUX
04347  2 01105           AND   R1(1),R5
04350  6 00377           XMT   -1,AUX              (R3,R4)<- TOADDR = FROMADDR - DLNUM
04351  3 02703           XOR   R2(7),R3
04352  6 00001           XMT   1,AUX
04353  1 03000           ADD   R3,AUX              AUX<- -DLNUM
04354  1 06004           ADD   R6,R4
04355  6 00377           XMT   -1,AUX
04356  1 10000           ADD   OVF,AUX
04357  1 05003           ADD   R5,R3
04360  6 01200           XMT   -128,R1             R1<- COUNT = -128
04361  7 04162           JMP   CMD06075
                *
                *
                ***LED COMMAND
                *
04362  6 11074  CMD07000 CALL  LENZERO             CHECK THAT CMD-LEN = 0
04363  7 06205
04364  6 17235           XMT   CMD04,IVR           LOAD ROW/COL ADDR
04365  6 07021           XMT   IVISPD+IVOSPD,IVL   *1 - SELECT SPD READ/WRITE
04366  0 37003           MOV   RB,R3               R3 <- ROWCOL FOR LED
04367  6 17063           XMT   LEDLOC,IVR
04370  0 03037           MOV   R3,RB               SET LEDLOC
04371  7 04660           JMP   CMDRSP
                *
                ***STOP COMMAND
                *
04372  6 11075  CMD08000 CALL  LENZERO             CHECK THAT CMD-LEN = 0
04373  7 06205
04374  6 11076           CALL  PROTECT
04375  7 06541
04376  6 02020           XMT   SYSSTOPM,R2         R2 <- STOP STATE
                *
                CMD08010 WSP   SAVSTATE,R2         SAVE STATE VECTOR
04377  6 07021  +        XMT   IVISPD+IVOSPD,IVL   SELECT SPD READ/WRITE
04400  6 17033  +        XMT   SAVSTATE,IVR              LOAD ADDRESS
04401  0 02037  +        MOV   R2,RB                WRITE DATA
04402  7 04660           JMP   CMDRSP              DO RESPONSE
                *
                ***GO COMMAND
                *
04403  6 11077  CMD09000 CALL  LENZERO             CHECK THAT CMD-LEN = 0
04404  7 06205
04405  6 11100           CALL  PROTECT
04406  7 06541
04407  6 17275           XMT   SYSSTATE,IVR        LOAD SYSTEM STATE ADDRESS
04410  6 07020           XMT   IVISPD,IVL          SELECT SCRATCHPAD READ
04411  5 33115           NZT   SYSSTOPB,CMD09020   BRANCH ON STOP STATE
04412  5 37415           NZT   SYSCODEB,CMD09020   BRANCH ON ERROR STATE
                *
04413  6 01014  CMD09010 XMT   ERRSTP,R1           R1 <- ERROR CODE
04414  7 04646           JMP   CMDERR              GO TO ERROR CODE
                *
04415  6 01002  CMD09020 XMT   ASCSTX,R1
04416  6 02104           XMT   XMITBLK,R2          BUILD RESPONSE
04417  6 11101           CALL  BFCH
04420  7 05526           *
04421  6 01220           XMT   GOCMD,R1            COMMAND
04422  6 11102           CALL  BFCH
04423  7 05526
```

```
04424  6 01004            XMT   4,R1                    LENGTH OF RESPONSE
04425  6 11103            CALL  BFCH
04426  7 05526
04427  6 01225            XMT   ASCSTX+GOCMD+4-1,R1 CHECKSUM
04430  6 11104            CALL  BFCH
04431  7 05526
                 CMD09025 RSP   XMITCNT,R1              AS SOON AS RESPONSE IS DONE, GO TO PWRDN
04432  6 17110   +        XMT   XMITCNT,IVR                  LOAD ADDRESS
04433  6 07021   +        XMT   IVISPD+IVOSPD,IVL *1 - SELECT SPD READ
04434  0 37001   +        MOV   RB,R1                    READ DATA
04435  5 01037            NZT   R1,CMD09030
04436  7 00430            JMP   PWRDN
04437  6 11105   CMD09030 CALL  INTRP                   SEND ANOTHER RESPONSE CHAR
04440  7 05103
04441  7 04432            JMP   CMD09025
                 *
                 ***INITIALIZE COMMAND
                 *
04442  6 11106   CMD10000 CALL  PROTECT                 CHECK MEMORY PROTECT
04443  7 06541
04444  6 11107            CALL  LENZERO                 CHECK THAT CMD-LEN = 0
04445  7 06205
04446  6 17275            XMT   SYSSTATE,IVR            LOAD STATE VECTOR ADDRESS
04447  6 07020            XMT   IVISPD,IVL              SELECT SCRATCHPAD READ
                 *
                          ORG   5,32                    CONDITIONAL ORG FOR BRANCHES
                 *
04450  5 33113            NZT   SYSSTOPB,CMD10010 BRANCH ON STOP STATE
04451  5 37413            NZT   SYSCODEB,CMD10010 BRANCH ON ERROR STATE
04452  7 04413            JMP   CMD09010                BRANCH TO ERROR HANDLER
                 *
04453  6 17276   CMD10010 XMT   SPDCONF1,IVR            LOAD ADDRESS
04454  6 07024            XMT   IVISPD+IVOLRHI,IVL *1 - SELECT PORTS
04455  0 37001            MOV   RB,R1                   R1 <- LOGIC RAM CONFIGURATION
04456  6 02000            XMT   SYSUSERH,R2
04457  0 02027            MOV   R2,LB
04460  6 02002            XMT   SYSUSERL,R2
04461  6 07003            XMT   IVOLRLO,IVL
04462  0 02027            MOV   R2,LB
04463  0 01301            MOV   R1(3),R1
04464  6 03004            XMT   NODEEOL.L.2,R3
04465  6 04000            XMT   0,R4
04466  6 11377            XMT   -1,R11
                 *
04467  6 00002   CMD10020 XMT   2,AUX
04470  6 07011            XMT   IVOLRDAT,IVL
04471  0 03027            MOV   R3,LB
04472  6 07000            XMT   IVOCTRL,IVL
04473  6 27300            XMT   CTRLINCL,CTRLREG
04474  6 07011            XMT   IVOLRDAT,IVL
04475  0 04027            MOV   R4,LB
04476  6 07000            XMT   IVOCTRL,IVL
04477  6 27300            XMT   CTRLINCL,CTRLREG
04500  1 02002            ADD   R2,R2
04501  0 11000            MOV   R11,AUX
04502  1 03011            ADD   R3,R11
04503  5 02067            NZT   R2,CMD10020
04504  6 00377            XMT   -1,AUX
04505  1 01001            ADD   R1,R1
04506  5 01067            NZT   R1,CMD10020
04507  6 01000            XMT   SYSLRCHH,R1
04510  6 07004            XMT   IVOLRHI,IVL
04511  0 01027            MOV   R1,LB
04512  6 01000            XMT   SYSLRCHL,R1
04513  6 07003            XMT   IVOLRLO,IVL
04514  0 01027            MOV   R1,LB
04515  6 07011            XMT   IVOLRDAT,IVL
04516  0 11027            MOV   R11,LB
04517  6 11110            CALL  CLRDIAG                 CLEAR DIAGNOSTICS
04520  7 06214
04521  6 02000            XMT   SYSUSERH,R2             SET EOL ADDRESS IN SPD
04522  6 17065            XMT   EOLHI,IVR
04523  0 02037            MOV   R2,RB
04524  6 02002            XMT   SYSUSERL,R2             *1
04525  6 17066            XMT   EOLLO,IVR
04526  0 02037            MOV   R2,RB
                 *
                 ***CLEAR COIL RAM
                 *
                          CLR   R1                      R1 <- 0
04527  6 01000   +        XMT   0,R1
04530  6 07001            XMT   IVOCRHI,IVL             SELECT COIL ADDRHI
04531  0 01027            MOV   R1,LB                   LOAD ADDRESS
04532  6 07000            XMT   IVOCRLO,IVL             SELECT COIL ADDRLO
04533  0 01037            MOV   R1,RB                   LOAD ADDRESS
04534  6 02004            XMT   4,R2                    R2 <- COUNTER
                          CLR   R3                      R3 <- 0
04535  6 03000   +        XMT   0,R3
04536  6 00377            XMT   -1,AUX                  AUX <- DECREMENT
                 *
04537  6 07002   CMD10030 XMT   IVOCRDAT,IVL            SELECT COIL DATA OUT
04540  0 03027            MOV   R3,LB                   CLEAR LOCATION
04541  6 07000            XMT   IVOCTRL,IVL             SELECT CONTROL
04542  6 27301            XMT   CTRLINCC,CTRLREG
04543  1 01001            ADD   R1,R1                   DECREMENT COUNTER
04544  5 01137            NZT   R1,CMD10030             LOOP UNTIL DONE
```

```
04545  1 02002              ADD   R2,R2              DECREMENT LOOP COUNTER
04546  5 02137              NZT   R2,CMD10030        LOOP UNTIL DONE
                  *
04547  7 04660              JMP   CMDRSP
                  *
                  ***INSERT AT END OF COLUMN
                  *
04550  6 11111    CMD11000 CALL  INSTINIT            INITIALIZE FOR INSERT
04551  7 06224
04552  6 17030              XMT   SAVER6,IVR         SAVER5,SAVER6 CONTAIN THE INSTAD
04553  6 07020              XMT   IVISPD,IVL         *1 - SELECT SPD READ
04554  6 00376              XMT   -2,AUX             BACK UP ONE NODE
04555  1 37006              ADD   RB,R6
04556  6 17027              XMT   SAVER5,IVR         LOAD ADDRESS
04557  6 00377              XMT   -1,AUX             *1
04560  0 37005              MOV   RB,R5
04561  5 10163              NZT   OVF,CMD11010
04562  1 05005              ADD   R5,R5
04563  6 07004    CMD11010 XMT   IVOLRHI,IVL         SELECT LOGIC ADDRHI
04564  0 05027              MOV   R5,LB              LOAD ADDRESS
04565  6 07003              XMT   IVOLRLO,IVL        SELECT LOGIC ADDRLO
04566  0 06027              MOV   R6,LB              LOAD ADDRESS
04567  6 00177              XMT   -1-NODEEOCM,AUX    *1 - AUX <- MASK
04570  6 07011              XMT   IVILRDAT+IVOLRDAT,IVL *2 - SELECT PORTS
04571  0 01003              MOV   R1,R3              *3 - SAVE R1
04572  0 02004              MOV   R2,R4              SAVE R2
04573  2 37001              AND   RB,R1              CLEAR EOC BIT
04574  6 11112              CALL  WRTUP              WRITE IT OUT, UPDATE CHKSUM
04575  7 05456
04576  0 03001              MOV   R3,R1              RESTORE R1
04577  0 04002              MOV   R4,R2              RESTORE R2
04600  7 03627              JMP   CMD05100           GO TO COMMON CODE
                  *
                  ***DELETE AT END-OF-COLUMN
                  *
04601  6 11113    CMD12000 CALL  DLETINIT              INITIALIZE FOR DELETE
04602  7 06366
                  *
                  * (R3,R4) = DLSTAD ON RETURN
                  *
                  CMD12010 WSP   SAVER2,R2
04603  6 07021    +         XMT   IVISPD+IVOSPD,IVL  SELECT SPD READ/WRITE
04604  6 17024    +         XMT   SAVER2,IVR              LOAD ADDRESS
04605  0 02037    +         MOV   R2,RB               WRITE DATA
04606  6 07003              XMT   IVOLRLO,IVL        READ IN THE NODE WE ARE GOING
04607  6 00377              XMT   -1,AUX             TO TURN ON THE END OF COLUMN
04610  1 04027              ADD   R4,LB              ON IN
04611  1 10000              ADD   OVF,AUX
04612  6 07004              XMT   IVOLRHI,IVL        SELECT LOGIC ADDRHI
04613  1 03027              ADD   R3,LB
04614  6 00376              XMT   -2,AUX             *1 - SET R6 = PREVIOUS NODE
04615  1 04006              ADD   R4,R6              *2 - ADDRESS
                            NOP                      *3 - WAIT
04616  0 00000    +         MOV   AUX,AUX
04617  0 37002              MOV   RB,R2              R2<- DATALO
04620  6 07003              XMT   IVOLRLO,IVL
04621  0 06027              MOV   R6,LB              SET LOGIC ADDRLO
04622  6 00177              XMT   -1-NODEEOCM,AUX    *1 - SET MASK
04623  6 07000              XMT   IVILRDAT,IVL       *2 - SELECT LOGIC READ
                            NOP                      *3 - WAIT
04624  0 00000    +         MOV   AUX,AUX
04625  2 37001              AND   RB,R1
04626  6 00200              XMT   NODEEOCM,AUX
04627  3 01001              XOR   R1,R1              R1<- REPLACEMENT DATAHI
04630  6 11114              CALL  VALIDATE           VALIDATE NEW DATA
04631  7 06702
04632  6 00377              XMT   -1,AUX             IF R1 .EQ. -1, ERROR
04633  3 01000              XOR   R1,AUX             ELSE, R1 = DATAHI
04634  5 00237              NZT   AUX,CMD12030
04635  6 01012              XMT   ERRNOD,R1          SET ERROR CODE
04636  7 04646              JMP   CMDERR             EXIT
04637  6 11115    CMD12030 CALL  WRTUP               WRITE OUT DATA
04640  7 05456
                            RSP   SAVER2,R2          RESTORE R2
04641  6 17024    +         XMT   SAVER2,IVR              LOAD ADDRESS
04642  6 07021    +         XMT   IVISPD+IVOSPD,IVL  *1 - SELECT SPD READ
04643  0 37002    +         MOV   RB,R2               READ DATA
04644  7 04123              JMP   CMD06010           GO TO COMMON CODE
                  *
                  ***UNIMPLEMENTED COMMANDS
                  *
         004645   CMD00000 EQU   *
         004645   CMD13000 EQU   *
         004645   CMD14000 EQU   *
04645  6 01006    CMD15000 XMT   ERRCMD,R1           R1 <- ERROR CODE
                  *
         004646   CMDERR   EQU   *
04646  6 17235              XMT   CMD04,IVR          ERROR ADDRESS
04647  6 07001              XMT   IVOSPD,IVL         SELECT SPD WRITE
04650  0 01037              MOV   R1,RB
04651  6 01320    CMDNAK00 XMT   ASCNAK,R1           *1 - NAKCMD
04652  6 07001              XMT   IVOSPD,IVL         FOR ENTRY AT CMD13000
04653  6 17233              XMT   CMD02,IVR          FCN ADDR
04654  0 01037              MOV   R1,RB
04655  6 01005              XMT   5,R1               *1 - NAKLEN
04656  6 17234              XMT   CMD03,IVR
04657  0 01037              MOV   R1,RB
```

```
                           *
                           ***BUILD AND TRANSMIT RESPONSE
                           *
04660  6 07021   CMDRSP    XMT   IVISPD+IVOSPD,IVL SELECT SPD READ/WRITE
04661  6 17262             XMT   CMDCONT,IVR       CLEAR CONTINUE FLAGS
04662  6 00000             XMT   0,AUX
04663  0 00037             MOV   AUX,RB
04664  6 03002             XMT   ASCSTX,R3         *1 - R3<- STX CHAR
04665  6 17232             XMT   CMD01,IVR
04666  0 03037             MOV   R3,RB             SET MESSAGE START
04667  6 11377             XMT   -1,R11            *1 - R11<- CHECKSUM SEED
04670  6 17234             XMT   CMD03,IVR       LENGTH BYTE
04671  6 00377             XMT   -1,AUX            *1
04672  1 37002             ADD   RB,R2             R2<- MESSAGE LENGTH (NOT CHECKSUM)
04673  0 02005             MOV   R2,R5             SAVE IT IN R5
04674  6 06232             XMT   CMD01,R6        R6 <- ADDRESS
                           *
04675  0 06017   CMDRSP10  MOV   R6,IVR            LOAD ADDRESS
04676  0 11000             MOV   R11,AUX           AUX <- CHKSUM
04677  1 37011             ADD   RB,R11            R11 <- UPDATED CHKSUM
04700  6 00001             XMT   1,AUX             AUX <- INCREMENT
04701  1 06006             ADD   R6,R6             BUMP POINTER
04702  6 00377             XMT   -1,AUX            AUX <- DECREMENT
04703  1 02002             ADD   R2,R2             DECREMENT COUNTER
04704  5 02275             NZT   R2,CMDRSP10       LOOP UNTIL DONE
                           *
04705  0 06017             MOV   R6,IVR            LOAD ADDRESS
04706  0 11037             MOV   R11,RB            LOAD CHKSUM
                           *
04707  6 00001             XMT   1,AUX             *1 - AUX <- INCREMENT
04710  1 05005             ADD   R5,R5             BUMP COUNT
04711  6 06232             XMT   CMD01,R6          *1 - R6 <- INITIAL ADDRESS
04712  0 06017   CMDRSP20  MOV   R6,IVR            LOAD ADDRESS
04713  6 02104             XMT   XMITBLK,R2        R2 <- BLOCK ADDRESS
04714  0 37001             MOV   RB,R1             R1 <- CHARACTER
04715  6 11116             CALL  BFCH              BUFFER CHARACTER
04716  7 05526
04717  6 00377             XMT   -1,AUX            AUX <- DECREMENT
04720  1 05005             ADD   R5,R5             DECREMENT COUNTER
04721  6 00001             XMT   1,AUX
04722  1 06006             ADD   R6,R6             INC ADDRESS
04723  5 05312             NZT   R5,CMDRSP20       LOOP ON COUNT
                           *
                 CMDRSP40  RSP   SAVSTATE,R1       R1 <- STATE CHANGE (IF ANY)
04724  6 17033   +         XMT   SAVSTATE,IVR           LOAD ADDRESS
04725  6 07021   +         XMT   IVISPD+IVOSPD,IVL *1 - SELECT SPD READ
04726  0 37001   +         MOV   RB,R1              READ DATA
04727  5 01331             NZT   R1,CMDRSP50       BRANCH ON STATE CHANGE
04730  7 04732             JMP   CMDSX             GO TO EXIT
                           *
04731  7 00453   CMDRSP50  JMP   EXEC              CHANGE STATES
                           *
        004732   CMDSX     EQU   *                 EXIT COMMAND MODULE
                           *
                           *     DIAGNOSTICS MODULE
                           *
                           *     PERFORMS CHEXSUM ON LOGIC RAM
                           *
04732  6 11117   DIAGS000  CALL  INTRP             CALL INTERRUPT HANDLER
04733  7 05103
04734  5 01364             NZT   R1,DIAGS070       IF R1 .NE. 0, PROBLEMS
04735  6 17034             XMT   DIAGSHI,IVR     GET STARTING CHEXSUM HI
04736  6 07024             XMT   IVOLRHI+IVISPD,IVL SELECT LOGIC ADDR HI,
04737  0 37001             MOV   RB,R1
04740  6 17035             XMT   DIAGSLO,IVR       GET CHEX ADDR LO
04741  0 01027             MOV   R1,LB             *1 LOAD LOGIC ADDR HI
04742  0 37002             MOV   RB,R2
04743  6 07003             XMT   IVOLRLO,IVL       SELECT LOGIC RAM LO
04744  0 02027             MOV   R2,LB
04745  5 01365             NZT   R1,DIAGS010       *1
04746  5 02365             NZT   R2,DIAGS010       *2IF [R1,R2].NE.0 THEN GOTO DIAGS010
04747  6 07000   DIAGS005  XMT   IVOCTRL,IVL       *3 ELSE, SET LOGIC ADDR TO BEGIN+1
04750  6 27300             XMT   CTRLINCL,CTRLREG  INC LOGIC ADDR
04751  6 03377             XMT   11111111B,R3      R3 <- CHECKSUM SEED
04752  6 27300             XMT   CTRLINCL,CTRLREG  BUMP ADDRESS BEYOND CHECKSUM NODE
04753  6 04002             XMT   2,R4              SKIP LOGIC CHECKSUM BYTE
04754  6 17276             XMT   SPDCONF1,IVR      LOAD SCRATCHPAD ADDRESS
04755  6 07021             XMT   IVISPD+IVOSPD,IVL SELECT SCRATCHPAD READ/WRITE
04756  0 37001             MOV   RB,R1             R1 <- SYSTEM CONFIGURATION
04757  6 00037             XMT   00011111B,AUX     AUX <- MASK
04760  6 17037             XMT   DIAGCTR,IVR       LOAD SCRATCHPAD ADDRESS
04761  2 01301             AND   R1(3),R1          R1 <- NUMBER OF 256-BYTE BLOCKS
04762  0 01037             MOV   R1,RB             LOAD COUNTER
04763  7 04771             JMP   DIAGS020
                           *
04764  7 00453   DIAGS070  JMP   EXEC              EXIT TO EXECUTIVE
                           *
04765  6 17036   DIAGS010  XMT   DIAGCHK,IVR       GET PARTIAL CHEXSUM
04766  6 07020             XMT   IVISPD,IVL        SELECT SCRATCH PAD READ
04767  0 37003             MOV   RB,R3
                           CLR   R4
04770  6 04000   +         XMT   0,R4
                           *
04771  6 17276   DIAGS020  XMT   SPDCONF1,IVR      LOAD SCRATCHPAD ADDRESS
04772  6 07020             XMT   IVISPD,IVL        SELECT PORT
04773  6 05001             XMT   1,R5              R5 <- LOOP COUNTER
```

```
4367  04774  5 34136           NZT    SYS0256B,DIAGS030 256-BYTE MEMORIES => ONE LOOP
4368  04775  6 05002           XMT    2,R5              ALL OTHERS NEED TWO LOOPS
4369                    *
4370  04776  6 07000   DIAGS030 XMT   IVOCTRL+IVILRDAT,IVL  SELECT CONTROL PULSE,LOGIC DAA
4372  04777  0 37000   DIAGS040 MOV   RB,AUX            GET LOGIC RAM DATA
4373  05000  6 27300           XMT    CTRLINCL,CTRLREG   INCR ADDR
4374  05001  1 03003           ADD    R3,R3             *1 ADD TO CHEXSUM
4375  05002  6 00001           XMT    1,AUX             *2
4376  05003  1 04004           ADD    R4,R4             *3 CHECK IF DONE PORTION
4377  05004  5 04377           NZT    R4,DIAGS040       IF .NOT.DONE 256 BYTE PORTION, LOOP
4378  05005  6 00377           XMT    -1,AUX            ELSE, TEST IF MORE TO DO
4379  05006  6 17037           XMT    DIAGCTR,IVR       LOAD SCRATCHPAD ADDRESS
4380  05007  6 07021           XMT    IVISPD+IVOSPD,IVL SELECT SPD READ/WRITE
4381  05010  1 37037           ADD    RB,RB             DECREMENT COUNTER
4382  05011  1 05005           ADD    R5,R5             DECREMENT COUNT
4383  05012  5 05376           NZT    R5,DIAGS030       R5.NE.0 => CONTINUE LOOP
4384  05013  0 37000           MOV    RB,AUX            AUX <- COUNT (SHORT BRANCH PROBLEM)
4385  05014  5 00042           NZT    AUX,DIAGS100      AUX.NE.0 => NOT DONE YET
4386  05015  6 01000           XMT    SYSLRCHH,R1       DIAGSCTR.EQ.0 => DONE, FETCH CHECKSUM
4387  05016  6 07004           XMT    IVOLRHI,IVL       SELECT LOGIC ADDRESS HIGH
4388  05017  0 01027           MOV    R1,LB             LOAD ADDRESS
4389  05020  6 07003           XMT    IVOLRLO,IVL       SELECT LOGIC ADDRESS LOW
4390  05021  6 01000           XMT    SYSLRCHL,R1       R1 <- ADDRESS
4391  05022  0 01027           MOV    R1,LB             LOAD ADDRESS
4392  05023  6 07000           XMT    IVILRDAT,IVL      *1 SELECT LOGIC RAM READ
4393                           CLR    R5                *2 - CLEAR R5 TO RESET ADDRESS
4393  05024  6 05000  +        XMT    0,R5
4394  05025  0 03000           MOV    R3,AUX             *3 - AUX <- COMPUTED CHECKSUM
4395  05026  3 37000           XOR    RB,AUX            COMPARE WITH LATEST CHEXSUM
4396  05027  6 01002           XMT    SYSELCHK,R1
4397  05030  5 00032           NZT    AUX,DIAGS060      IF CHEXSUMS COMPARE
4398                           CLR    R1                THEN R1=0, ELSE R1=STOPMEM
4398  05031  6 01000  +        XMT    0,R1
4399  05032  6 07001  DIAGS060 XMT    IVOSPD,IVL
4400  05033  6 17034           XMT    DIAGSHI,IVR       RESET CHEXSUM ADDR
4401  05034  0 05037           MOV    R5,RB
4402                           NOP                      *1 - WAIT
4402  05035  0 00000  +        MOV    AUX,AUX
4403  05036  6 17035           XMT    DIAGSLO,IVR
4404  05037  0 05037           MOV    R5,RB
4405  05040  5 01364           NZT    R1,DIAGS070       BRANCH ON ERROR
4406  05041  7 05051           JMP    DIAGSX            NO ERROR, CONTINUE
4407                  *
4408                  *
4409  05042  6 17034  DIAGS100 XMT    DIAGSHI,IVR       INCRIMENT CHEXSUM ADDR BY 512
4410  05043  6 00002           XMT    2,AUX             *1
4411  05044  1 37037           ADD    RB,RB
4412                           NOP                      *1
4412  05045  0 00000  +        MOV    AUX,AUX
4413  05046  6 17036  DIAGS110 XMT    DIAGCHK,IVR
4414  05047  0 03037           MOV    R3,RB
4415                           NOP                      *1
4415  05050  0 00000  +        MOV    AUX,AUX
4416                  *
4417           005051 DIAGSX   EQU    *                  EXIT
4419                  *
4420                  ***UPDATE SYSTEM TIMERS
4421                  *
4422                  EXEC040  RSP    MSTRCLK,R1        R1 <- SCAN TIMER
4422  05051  6 17015  +        XMT    MSTRCLK,IVR          LOAD ADDRESS
4422  05052  6 07021  +        XMT    IVISPD+IVOSPD,IVL *1 - SELECT SPD READ
4422  05053  0 37001  +        MOV    RB,R1              READ DATA
4423                           WSP    TIMER001,R1       SET 0.01 TIMER
4423  05054  6 07021  +        XMT    IVISPD+IVOSPD,IVL SELECT SPD READ/WRITE
4423  05055  6 17016  +        XMT    TIMER001,IVR          LOAD ADDRESS
4423  05056  0 01037  +        MOV    R1,RB              WRITE DATA
4424                           NOP                      *1 - WAIT
4424  05057  0 00000  +        MOV    AUX,AUX
4425                           RSP    TTMR010,R2        R2 <- 0.10 TIMER TICK COUNTER
4425  05060  6 17021  +        XMT    TTMR010,IVR          LOAD ADDRESS
4425  05061  6 07021  +        XMT    IVISPD+IVOSPD,IVL *1 - SELECT SPD READ
4425  05062  0 37002  +        MOV    RB,R2              READ DATA
4426  05063  6 04366           XMT    -10,R4            R4 <- -(TIME BASE)
4427  05064  6 05017           XMT    TIMER010,R5       R5 <- DESTINATION ADDRESS
4428  05065  6 11120           CALL   UPTIMER           UPDATE TIMER
      05066  7 05627
4429                           RSP    TTMR100,R2        R2 <- 1.00 TIMER TICK COUNTER
4429  05067  6 17022  +        XMT    TTMR100,IVR          LOAD ADDRESS
4429  05070  6 07021  +        XMT    IVISPD+IVOSPD,IVL *1 - SELECT SPD READ
4429  05071  0 37002  +        MOV    RB,R2              READ DATA
4430  05072  6 04234           XMT    -100,R4           R4 <- -(TIME BASE)
4431  05073  6 05020           XMT    TIMER100,R5       R5 <- DESTINATION ADDRESS
4432  05074  6 11121           CALL   UPTIMER           UPDATE TIMER
      05075  7 05627
4433                           CLR    R1                RESET SCAN TIMER
4433  05076  6 01000  +        XMT    0,R1
4434                           WSP    MSTRCLK,R1        LOAD TO SCRATCHPAD
4434  05077  6 07021  +        XMT    IVISPD+IVOSPD,IVL SELECT SPD READ/WRITE
4434  05100  6 17015  +        XMT    MSTRCLK,IVR          LOAD ADDRESS
4434  05101  0 01037  +        MOV    R1,RB              WRITE DATA
4435  05102  7 00504           JMP    EXEC010
4437  05103                    PROC   INTRP
4438                  *
4439                  ***SUBROUTINE INTRP
4440                  *
4441                  ***THIS SUBROUTINE IS THE INTERRUPT HANDLER
```

```
                       *
                       ***CALLING SEQUENCE:
                       *
                       *         CALL    INTRP
                       *
                       ***REGISTER USAGE:
                       *
                       *         R1  - R1.EQ.0 => NO ERROR
                       *               R1.NE.0 => ERROR STATE
                       *         R2  - SCRATCH
                       *         R3  - SCRATCH
                       *         R4  - SCRATCH
                       *         R5  - SCRATCH
                       *         R6  - SCRATCH
                       *         R11 - SUBROUTINE LINAKGE
                       *         AUX - SCRATCH
                       *
                       *
                       INTRP000 WSP     SAVERET,R11        SAVE RETURN
05103  6 07021         +        XMT     IVISPD+IVOSPD,IVL  SELECT SPD READ/WRITE
05104  6 17032         +        XMT     SAVERET,IVR              LOAD ADDRESS
05105  0 11037         +        MOV     R11,RB                WRITE DATA
                                ORG     10,32
05106  6 07060         INTRP001 XMT     IVIINTRP,IVL       SELECT INTERRUPT SENSE REGISTER
05107  5 27114                  NZT     INTRPWFB,INTRP010  BRANCH ON POWER-FAILURE
05110  5 26115                  NZT     INTRRTCB,INTRP020  BRANCH ON REAL-TIME CLOCK
05111  5 25116                  NZT     INTRRRYB,INTRP030  BRANCH ON RECEIVER READY
05112  5 24117                  NZT     INTRTRYB,INTRP040  BRANCH ON TRANSMITTER READY
05113  7 05120                  JMP     INTRP050           EXIT WHEN NO INTERRUPTS PENDING
                       *
05114  7 05125         INTRP010 JMP     INTRP100           POWER-FAILURE
                       *
05115  7 05127         INTRP020 JMP     INTRP200           REAL-TIME CLOCK
                       *
05116  7 05136         INTRP030 JMP     INTRP300           RECEIVER READY
                       *
05117  7 05332         INTRP040 JMP     INTRP400           TRANSMITTER READY
                       *
                       INTRP050 CLR     R1                 EXIT WITH NO INTERRUPT PENDING
05120  6 01000         +        XMT     0,R1
                       *
                       INTRPX   RSP     SAVERET,R11        RESTORE RETURN
05121  6 17032         +        XMT     SAVERET,IVR              LOAD ADDRESS
05122  6 07021         +        XMT     IVISPD+IVOSPD,IVL  *1 - SELECT SPD READ
05123  0 37011         +        MOV     RB,R11               READ DATA
05124  7 07176                  RTN                        RETURN
                       *
                       ***POWER-FAILURE
                       *
05125  6 01040         INTRP100 XMT     SYSSPDNM,R1        R1 <- POWER-DOWN STATE
05126  7 05121                  JMP     INTRPX             EXIT IMMEDIATELY
                       *
                       ***REAL-TIME CLOCK
                       *
05127  6 07000         INTRP200 XMT     IVOCTRL,IVL        SELECT CONTROL PULSES
05130  6 27306                  XMT     CTRLRTC,CTRLREG    RESET RTC
05131  6 07021                  XMT     IVOSPD+IVISPD,IVL  SELECT SPD READ AND WRITE
05132  6 17015                  XMT     MSTRCLK,IVR        LOAD MSTRCLK ADDRESS
05133  6 00001                  XMT     1,AUX              *1 - AUX <- INCREMENT
05134  1 37037                  ADD     RB,RB              UPDATE MSTRCLK
05135  7 05106                  JMP     INTRP001           RECHECK INTERRUPTS
                       *
                       ***PERIPHERAL PORT RECEIVER
                       *
05136  6 07040         INTRP300 XMT     IVISTAT,IVL        SELECT STATUS REGISTER
05137  7 05140                  ORG     7,32
05140  5 23105                  NZT     STATERRB,INTRP305  BRANCH ON PARITY/FRAMING ERROR
05141  5 22104                  NZT     STATOVRB,INTRP301  BRANCH ON NO OVERRRUN ERROR
05142  6 01001                  XMT     SYSEOVR,R1         R1 <- ERROR STATE ON OVERRUN
05143  7 05146                  JMP     INTRP310           CONTINUE PROCESSING
                       *
05144  7 05165         INTRP301 JMP     INTRP315           TO GET OVER SHORT BRANCH
                       *
                       ***ERROR HANDLING
                       *
                       INTRP305 CLR     R1                 INDICATE NO ERROR
05145  6 01000         +        XMT     0,R1
                       *
                       INTRP310 CLR     R2                 RESET RECEIVER STATUS
05146  6 02000         +        XMT     0,R2
05147  6 17074         INTRP312 XMT     MSGCOUNT,IVR       LOAD ADDRESS
05150  6 07021                  XMT     IVISPD+IVOSPD,IVL  DO SELECTS
05151  0 02037                  MOV     R2,RB              CLEAR MESSAGE COUNT
05152  6 02112                  XMT     RCVRBUFF,R2        R2<- BUFFER ADDRESS
05153  6 17033                  XMT     SAVSTATE,IVR       LOAD ADDRESS
05154  0 01037                  MOV     R1,RB              SAVE RETURN CODE
05155  6 01075                  XMT     RCVRBLK,R1         R1 <- BLOCK ADDRESS
05156  6 03050                  XMT     RCVRBLEN,R3        R3 <- BUFFER LENGTH
05157  6 11122                  CALL    BUFFINIT           INITIALIZE BUFFER
05160  7 05500
                                RSP     SAVSTATE,R1        GET EXIT CODE
05161  6 17033         +        XMT     SAVSTATE,IVR             LOAD ADDRESS
05162  6 07021         +        XMT     IVISPD+IVOSPD,IVL  *1 - SELECT SPD READ
05163  0 37001         +        MOV     RB,R1               READ DATA
05164  7 05325                  JMP     INTRP365           AND EXIT
                       *
                       ***READ CHARACTER
```

```
                          *
05165  6 17102   INTRP315 XMT   RCVRSTAT,IVR        SELECT RECEIVER STATUS BYTE
05166  6 07040            XMT   IVISTAT,IVL         SELECT SPD READ
                          ORG   5,32
05167  5 30132            NZT   RCVREIAB,INTRP320 BRANCH IF PREVIOUS CHAR WAS FROM EIA
05170  5 21133            NZT   STATEIAB,INTRP325 BRANCH FOR STATE CHANGE
                 *
05171  7 05212   INTRP317 JMP   INTRP335            SHORT BRANCH PROBLEM
                 *
05172  5 21131   INTRP320 NZT   STATEIAB,INTRP317 BRANCH IF NO STATE CHANGE
                 *
05173  6 01112   INTRP325 XMT   RCVRBUFF,R1         CHANGE STATES, FLUSH BUFFERS
05174  6 02075            XMT   RCVRBLK,R2          R2 <- RECEIVER BLOCK ADDRESS
05175  6 03050            XMT   RCVRBLEN,R3         R3<- BUFFER LENGTH
05176  6 11123            CALL  BUFFINIT            INITIALIZE BUFFERS
05177  7 05500
05200  6 02200            XMT   RCVREIAM,R2         R2 <- EIA FLAG MASK
05201  6 07041            XMT   IVISTAT+IVOSPD,IVL SELECT PORTS
05202  5 21104            NZT   STATEIAB,INTRP330 BRANCH IF EIA
                          CLR   R2                  CLEAR MASK ON P180
05203  6 02000   +        XMT   0,R2
                 *
05204  6 17102   INTRP330 XMT   RCVRSTAT,IVR        LOAD SPD ADDR
05205  0 02037            MOV   R2,RB               WRITE NEW STATUS
05206  7 05212            JMP   INTRP335            CONTINUE
                 *
05207  7 05266   INTRP331 JMP   INTRP345            SHORT BRANCH PROBLEM
05210  7 05227   INTRP332 JMP   INTRP340            SHORT BRANCH PROBLEM
05211  7 05240   INTRP333 JMP   INTRP341            SHORT BRANCH PROBLEM
                 *
05212  6 07121   INTRP335 XMT   IVIPPDAT+IVOSPD,IVL SELECT RECEIVER PORT
05213  0 27001            MOV   LB,R1               R1 <- CHARACTER
05214  5 31107            NZT   RCVRMSGB,INTRP331 BRANCH IF MESSAGE IN PROGRESS
05215  5 33110            NZT   RCVRFCNB,INTRP332 BRANCH IF WAITING FOR FUNCTION CODE
05216  5 34111            NZT   RCVRLENB,INTRP333 BRANCH IF WAITING FOR LENGTH BYTE
05217  6 00002            XMT   ASCSTX,AUX          AUX <- MASK
05220  3 01000            XOR   R1,AUX              LOOK FOR AN STX CHARACTER
05221  5 00225            NZT   AUX,INTRP337        BRANCH IF NOT AN STX
05222  6 07021            XMT   IVISPD+IVOSPD,IVL SELECT SPD READ/WRITE
05223  6 00020            XMT   RCVRFCNM,AUX        AUX <- MASK
05224  3 37037            XOR   RB,RB               SET FLAG
                 *
                 INTRP337 CLR   R1                  CLEAR EXIT CODE
05225  6 01000   +        XMT   0,R1
05226  7 05325            JMP   INTRP365            GO TO COMMON CODE
                 *
                 *
05227  6 07021   INTRP340 XMT   IVISPD+IVOSPD,IVL SELECT SPD READ/WRITE
05230  6 00030            XMT   RCVRFCNM+RCVRLENM,AUX  AUX<- MASK
05231  3 37037            XOR   RB,RB
                 *
05232  6 00001            XMT   -1+ASCSTX,AUX       AUX <- CHKSUM SEED
05233  1 01000            ADD   R1,AUX              UPDATE CHKSUM
                          WSP   MSGCHECK,AUX        WRITE CHKSUM
05234  6 07021   +        XMT   IVISPD+IVOSPD,IVL SELECT SPD READ/WRITE
05235  6 17073   +        XMT   MSGCHECK,IVR          LOAD ADDRESS
05236  0 00037   +        MOV   AUX,RB               WRITE DATA
05237  7 05321            JMP   INTRP360            GO TO COMMON EXIT
                 *
05240  6 07021   INTRP341 XMT   IVISPD+IVOSPD,IVL DO SELECTS
05241  6 00110            XMT   RCVRLENM+RCVRMSGM,AUX      AUX<- MASK
05242  3 37037            XOR   RB,RB
05243  6 00375            XMT   -3,AUX              MAKE SURE MESSAGE LENGTH
05244  1 01002            ADD   R1,R2               IS > 3 AND < 25
05245  6 00200            XMT   10000000B,AUX       MAKE SURE IT IS > 3
05246  2 02002            AND   R2,R2
05247  5 02255            NZT   R2,INTRP343         IF NOT, ERROR
05250  6 00347            XMT   -25,AUX             CHECK IF < 25
05251  1 01002            ADD   R1,R2
05252  6 00200            XMT   10000000B,AUX
05253  2 02002            AND   R2,R2
05254  5 02261            NZT   R2,INTRP346         IF NOT, ERROR
05255  6 01015   INTRP343 XMT   ERRLEN,R1           SET LENGTH ERROR
05256  6 11124            CALL  ERRMSG
05257  7 05621
05260  7 05147            JMP   INTRP312
05261  6 00375   INTRP346 XMT   -3,AUX              CALCULATE LENGTH LEFT
05262  6 17103            XMT   RCVRLEN,IVR
05263  6 07021            XMT   IVISPD+IVOSPD,IVL
05264  1 01037            ADD   R1,RB
                 *
05265  7 05313   INTRP342 JMP   INTRP355            SHORT BRANCH PROBLEM
                 *
05266  6 17103   INTRP345 XMT   RCVRLEN,IVR         LOAD LENGTH ADDRESS
05267  6 07021            XMT   IVISPD+IVOSPD,IVL SELECT SPD READ AND WRITE
05270  0 37000            MOV   RB,AUX              AUX <- CURRENT DATA BYTE COUNT
05271  5 00265            NZT   AUX,INTRP342        AUX.NE.0 => DATA BYTE
                          RSP   MSGCHECK,AUX        AUX <- MESSAGE CHECKSUM
05272  6 17073   +        XMT   MSGCHECK,IVR             LOAD ADDRESS
05273  6 07021   +        XMT   IVISPD+IVOSPD,IVL *1 - SELECT SPD READ
05274  0 37000   +        MOV   RB,AUX                READ DATA
05275  3 01000            XOR   R1,AUX              AUX.EQ.0 => GOOD CHECKSUM
05276  5 00307            NZT   AUX,INTRP350        AUX.NE.0 => BAD CHECKSUM
05277  6 17074            XMT   MSGCOUNT,IVR        SELECT MESSAGE COUNT BYTE
05300  6 00001            XMT   1,AUX               *1 - AUX <- INCREMENT
05301  1 37037            ADD   RB,RB               INCREMENT MESSAGE COUNT
                          CLR   R1                  CLEAR R1
```

```
05302  6 01000  +          XMT    0,R1
05303  6 17102             XMT    RCVRSTAT,IVR       LOAD ADDRESS
                           NOP                       *1 - WAIT
05304  0 00000  +          MOV    AUX,AUX
05305  0 01737             MOV    R1,7,RB            LEAVE EIA BIT ALONE
05306  7 05325             JMP    INTRP365           GO TO COMMON EXIT
                *
05307  6 01003  INTRP350   XMT    ERRCHK,R1          R1 <- ERROR CODE FOR BAD CHECKSUM
05310  6 11125             CALL   ERRMSG             LOAD ERROR MESSAGE TO BUFFER
05311  7 05621
05312  7 05147             JMP    INTRP312           FLUSH BUFFER
                *
05313  6 00377  INTRP355   XMT    -1,AUX             AUX <- DECREMENT
05314  1 37037             ADD    RB,RB              DECREMENT BYTE COUNT
05315  0 01000             MOV    R1,AUX             *1 - AUX <- CHARACTER
05316  6 17073             XMT    MSGCHECK,IVR       LOAD ADDRESS
                           NOP                       *1 - WAIT
05317  0 00000  +          MOV    AUX,AUX
05320  1 37037             ADD    RB,RB              UPDATE CHECKSUM
                *
05321  6 02075  INTRP360   XMT    RCVRBLK,R2         R2 <- RECEIVER BUFFER BLOCK
05322  6 11126             CALL   BFCH               BUFFER CHARACTER
05323  7 05526
                           CLR    R1                 CLEAR EXIT CODE
05324  6 01000  +          XMT    0,R1
                *
05325  6 07000  INTRP365   XMT    IVOCTRL,IVL        SELECT CONTROL PULSES
05326  6 27304             XMT    CTRLRCLR,CTRLREG   CLEAR RECEIVER
05327  5 01331             NZT    R1,INTRP370        BRANCH ON SYSTEM ERROR
05330  7 05106             JMP    INTRP001           ELSE, CONTINUE
                *
05331  7 05121  INTRP370   JMP    INTRPX             GO TO EXIT
                *
                ***PERIPHERAL PORT TRANSMITTER
                *
                INTRP400   RSP    XMITCNT,R1         R1 <- BUFFER COUNT
05332  6 17110  +          XMT    XMITCNT,IVR            LOAD ADDRESS
05333  6 07021  +          XMT    IVISPD+IVOSPD,IVL  *1 - SELECT SPD READ
05334  0 37001  +          MOV    RB,R1               READ DATA
05335  5 01337             NZT    R1,INTRP410        BRANCH IF BUFFER NOT EMPTY
05336  7 05344             JMP    INTRP420           BRANCH IF BUFFER EMPTY
                *
05337  6 02104  INTRP410   XMT    XMITBLK,R2         R2 <- BUFFER BLOCK ADDRESS
05340  6 11127             CALL   UBFCH              GET NEXT CHAR
05341  7 05565
05342  6 07010             XMT    IVOPPDAT,IVL       SELECT TRANSMITTER PORT
05343  0 01027             MOV    R1,LB              WRITE OUT DATA
                *
05344  6 07060  INTRP420   XMT    IVIINTRP,IVL       SELECT INTERRUPT SENSE
05345  5 27107             NZT    INTRPWFB,INTRP430  BRANCH ON POWER-FAIL
05346  7 05120             JMP    INTRP050           GO TO SUCCESS EXIT
                *
05347  7 05125  INTRP430   JMP    INTRP100           POWER-FAILURE
                *
                *          END    INTRP
                *
                ***SYSTEM SUBROUTINE MODULES
                *
05350                      PROC   CRCHK
                *
                ***SUBROUTINE CRCHK
                *
                ***THIS SUBROUTINE COMPUTES THE CHECKSUM FOR THE COIL RAM
                *
                ***CALLING SEQUENCE:
                *
                *          CALL   CRCHK
                *
                ***PARAMETERS:
                *
                *          [SYSCON2H,SYSCON2L] - COIL RAM CONFIGURATION
                *
                ***REGISTER USAGE:
                *
                *          R1  - COUNTER
                *          R2  - COUNTER
                *          R3  - NOT USED (PRESERVED)
                *          R4  - NOT USED (PRESERVED)
                *          R5  - NOT USED (PRESERVED)
                *          R6  - CHECKSUM
                *          R11 - SUBROUTINE LINKAGE
                *          AUX - SCRATCH
                *
                ***CHECKSUM SEED IS B'11111111'
                *
        000377  CRCKSEED   EQU    11111111B          COIL RAM CHECKSUM SEED
                CRCHK000   WSP    SAVERET,R11        SAVE RETURN ADDRESS
05350  6 07021  +          XMT    IVISPD+IVOSPD,IVL  SELECT SPD READ/WRITE
05351  6 17032  +          XMT    SAVERET,IVR            LOAD ADDRESS
05352  0 11037  +          MOV    R11,RB                WRITE DATA
05353  6 07001             XMT    IVOCRHI,IVL        SELECT COIL ADDRESS HIGH
                           CLR    R2                 FIRST CHECKSUM COIL DATA
05354  6 02000  +          XMT    0,R2
05355  0 02027             MOV    R2,LB              LOAD ADDRESS
05356  6 07000             XMT    IVOCTRL+IVICRDAT,IVL SELECT PORTS
05357  0 02037             MOV    R2,RB              LOAD ADDRESS
05360  6 06377             XMT    CRCKSEED,R6        *1 - R6 <- CHECKSUM SEED
05361  6 11130             CALL   CRCHKSUB           *2,*3 - USE SUBROUTINE
```

```
05362  7 05404
                     *
                     ***DO REGISTER SPACE
                     *
05363  6 04001               XMT    SYSSTATH,R4         R4 <- HIGH-ORDER ADDRESS
                     *
05364  6 02001       CRCHK010 XMT   SYSSTATL,R2         R2 <- START OF REGISTER SPACE
05365  0 02037               MOV    R2,RB               LOAD ADDRESS
05366  6 07001               XMT    IVOCRHI,IVL         SELECT COIL ADDRESS HIGH
05367  0 04027               MOV    R4,LB               LOAD ADDRESS
05370  6 03077               XMT    63,R3               ALTERNATE COUNT FOR FIRST CHIP
05371  6 11131               CALL   CRCHKENT            USE ALTERNATE ENTRY POINT
05372  7 05405
05373  6 00001               XMT    1,AUX               AUX <- INCREMENT
05374  1 04004               ADD    R4,R4               BUMP COUNTER
05375  6 00004               XMT    00000100B,AUX       AUX <- MASK
05376  3 04000               XOR    R4,AUX              AUX.EQ.0 => DONE
05377  5 00364               NZT    AUX,CRCHK010        AUX.NE.0 => CONTINUE
                     *
                             RSP    SAVERET,R11         RESTORE RETURN ADDRESS
05400  6 17032     +         XMT    SAVERET,IVR               LOAD ADDRESS
05401  6 07021     +         XMT    IVISPD+IVOSPD,IVL *1 - SELECT SPD READ
05402  0 37011     +         MOV    RB,R11                READ DATA
05403  7 07176               RTN                        EXIT
                             END    CRCHK
05404                        PROC   CRCHKSUB
                     *
                     ***SUBROUTINE CRCHKSUB
                     *
05404  6 03100       CRCHKS00 XMT   64,R3               R3 <- COUNTER
                     *
        000360       CRCHKMSK EQU   SYSC256M+SYSC192M+SYSC128M+SYSC064M MASK FOR COIL CNGIFURATION
                     *
                             ENTRY  CRCHKENT            ALTERNATE ENTRY POINT
                     *
                             RSP    SPDCONF2,R1         R1 <- COIL RAM CONFIGURATION
05405  6 17277     +         XMT    SPDCONF2,IVR              LOAD ADDRESS
05406  6 07021     +         XMT    IVISPD+IVOSPD,IVL *1 - SELECT SPD READ
05407  0 37001     +         MOV    RB,R1                READ DATA
                     *
05410  0 03002       CRCHKS10 MOV   R3,R2               SET UP COUNTER
05411  6 00360               XMT    CRCHKMSK,AUX        AUX <- MASK
05412  2 01001               AND    R1,R1               R1 <- COUNTER
05413  6 07000               XMT    IVOCTRL+IVICRDAT,IVL SELECT PORTS
                     *
05414  0 27000       CRCHKS20 MOV   LB,AUX              AUX <- COIL DATA
05415  1 06006               ADD    R6,R6               UPDATE CHECKSUM
05416  6 27301               XMT    CTRLINCC,CTRLREG    BUMP ADDR
05417  6 00377               XMT    -1,AUX              *1 - AUX <- DECREMENT
05420  1 02002               ADD    R2,R2               *2 - DECREMENT COUNTER
05421  5 02014               NZT    R2,CRCHKS20         LOOP UNTIL DONE
05422  6 00360               XMT    CRCHKMSK,AUX        AUX <- MASK
05423  2 01101               AND    R1(1),R1            SHIFT COUNTER
05424  5 01010               NZT    R1,CRCHKS10         CONTINUE UNTIL COMPLETED
05425  7 07176               RTN                        EXIT
                             END    CRCHKSUB
05426                        PROC   LRCHK
                     *
                     ***SUBROUTINE LRCHK
                     *
                     ***THIS SUBROUTINE COMPUTES THE LOGIC RAM CHECKSUM
                     *
                     ***CALLING SEQUENCE:
                     *
                     *       CALL   LRCHK
                     *
                     ***REGISTER USAGE:
                     *
                     *       R1  - SCRATCH
                     *       R2  - SCRATCH
                     *       R3  - SCRATCH
                     *       R4  - NOT USED
                     *       R5  - NOT USED
                     *       R6  - CHECKSUM
                     *       R11 - LINKAGE
                     *       AUX - SCRATCH
                     *
                     ***
                     LRCHK000 RSP   SPDCONF1,R1         R1 <- LOGIC RAM CONFIGURATION
05426  6 17276     +         XMT    SPDCONF1,IVR              LOAD ADDRESS
05427  6 07021     +         XMT    IVISPD+IVOSPD,IVL *1 - SELECT SPD READ
05430  0 37001     +         MOV    RB,R1                READ DATA
05431  6 00037               XMT    00011111B,AUX       AUX <- MASK
05432  2 01301               AND    R1(3),R1            R1 <- NUMBER OF PAGES
05433  6 07004               XMT    IVOLRHI,IVL         SELECT LOGIC ADDRHI
05434  6 02000               XMT    SYSUSERH,R2         R2 <- START OF LOGIC ADDRHI
05435  0 02027               MOV    R2,LB               LOAD ADDRESS
05436  6 02002               XMT    SYSUSERL,R2         R2 <- START OF LOGIC ADDRLO
05437  6 07003               XMT    IVOLRLO,IVL         SELECT PORT
05440  0 02027               MOV    R2,LB               LOAD ADDRESS
05441  6 03000               XMT    CTRLINCL,R3         *1 - R3 <- INCREMENT PULSE
05442  6 06377               XMT    11111111B,R6        *2 - R6 <- CHKSUM SEED
05443  6 07000               XMT    IVILRDAT+IVOCTRL,IVL *3 - SELECT PORTS
                     *
05444  0 37000       LRCHK010 MOV   RB,AUX              AUX <- DATA
05445  0 03027               MOV    R3,LB               INCREMENT ADDRESS
05446  1 06006               ADD    R6,R6               *1 - UPDATE CHECKSUM
```

```
05447  6 00001          XMT    1,AUX                *2 - AUX <- INCREMENT
05450  1 02002          ADD    R2,R2                *3 - BUMP POINTER
05451  5 02044          NZT    R2,LRCHK010          R2.NE.0 =. CONTINUE
05452  6 00377          XMT    -1,AUX               AUX <- DECREMENT
05453  1 01001          ADD    R1,R1                DECREMENT FIELD COUNTER
05454  5 01044          NZT    R1,LRCHK010          R1.NE.0 => CONTINUE
05455  7 07176          RTN                         EXIT
                        END    LRCHK
05456                   PROC   WRTUP
                 *
                 ***SUBROUTINE WRTUP
                 *
                 ***THIS SUBROUTINE WRITES ONE BYTE TO THE LOGIC RAM AND UPDATES
                 ***THE LOGIC RAM CHECKSUM.
                 *
                 ***CALLING SEQUENCE:
                 *
                 *      CALL   WRTUP
                 *
                 *      ON ENTRY, THE LRAM ADDRESSES ARE SET
                 ***PARAMETERS:
                 *
                 *      R1  - DATA BYTE (PRESERVED)
                 *      R2  - SCRATCH
                 *      R3 - R6  - NOT USED (PRESERVED)
                 *      R11 - SUBROUTINE LINKAGE
                 *      AUX - SCRATCH
                 *
                 ***
05456  6 02000          XMT    SYSLRCHL,R2          *1 - R2 <- LOGIC CHECKSUM ADDR LOW
05457  6 07011          XMT    IVILRDAT+IVOLRDAT,IVL   *2 - SELECT PORTS
                        NOP                         *3 - WAIT
05460  0 00000        + MOV    AUX,AUX
05461  0 37000          MOV    RB,AUX               AUX <- OLD DATA
05462  0 01027          MOV    R1,LB                WRITE OUT NEW DATA
05463  6 07003          XMT    IVOLRLO,IVL          *1 - SELECT LOGIC ADDR LOW
05464  0 02027          MOV    R2,LB                LOAD ADDRESS
05465  6 07004          XMT    IVOLRHI,IVL          SELECT LOGIC ADDR HIGH
05466  6 02000          XMT    SYSLRCHH,R2          R2 <- LOGIC CHECKSUM ADDR HIGH
05467  0 02027          MOV    R2,LB                LOAD ADDRESS
05470  6 02377          XMT    -1,R2                *1 - R2 <- -1
05471  3 02000          XOR    R2,AUX               *2 - AUX <- ONE'S COMP OF OLD DATA
05472  6 07011          XMT    IVILRDAT+IVOLRDAT,IVL   *3 - SELECT PORTS
05473  1 37000          ADD    RB,AUX               AUX <- CHECKSUM - OLD DATA - 1
05474  1 01000          ADD    R1,AUX               AUX <- UPDATED CHECKSUM
05475  6 02001          XMT    1,R2                 R2 <- INCREMENT
05476  1 02027          ADD    R2,LB                WRITE OUT NEW CHECKSUM
                 *
05477  7 07176          RTN                         EXIT
                        END    WRTUP
05500                   PR C   BUFFINIT
                 *
                 ***SUBROUTI E ;UFFINIT
                 *
                 ***THIS SL  OUTINE IS USED TO INITIALIZE A CIRCULAR BUFFER.
                 *
                 ***CALLINC ;EQUENCE:
                 *
                 *      CALL   BUFFINIT
                 *
                 ***PARAMETERS:
                 *
                 *      R1 - BUFFER BLOCK
                 *      R2 - BUFFER BASE ADDRESS
                 *      R3 - BUFFER LENGTH
                 *
                 ***REGISTER USAGE:
                 *
                 *      R1  - BUFFER BLOCK ADDRESS
                 *      R2  - BUFFER BASE ADDRESS
                 *      R3  - BUFFER LENGTH
                 *      R4  - SCRATCH
                 *      R5  - NOT USED
                 *      R6  - NOT USED
                 *      R11 - LINKAGE
                 *      AUX - SCRATCH
                 *
05500  6 00001   BFINI000 XMT  1,AUX                AUX <- INCREMENT
                        CLR    R4                   R4 <- 0
05501  6 04000        + XMT    0,R4
05502  6 07001          XMT    IVOSPD,IVL           SELECT SCRATCHPAD WRITE
                 *
05503  0 01017          MOV    R1,IVR               LOAD ADDRESS
05504  0 02037          MOV    R2,RB                LOAD BUFFER BASE
05505  1 01001          ADD    R1,R1                *1 - INCREMENT ADDRESS
05506  0 01017          MOV    R1,IVR               LOAD ADDRESS
05507  0 04037          MOV    R4,RB                INITIALIZE IPTR
05510  1 01001          ADD    R1,R1                *1 - INCREMENT ADDRESS
05511  0 01017          MOV    R1,IVR               LOAD ADDRESS
05512  0 04037          MOV    R4,RB                INITIALIZE OPTR
05513  1 01001          ADD    R1,R1                *1 - INCREMENT ADDRESS
05514  0 01017          MOV    R1,IVR               LOAD ADDRESS
05515  0 03037          MOV    R3,RB                LOAD BUFFER LENGTH
05516  1 01001          ADD    R1,R1                *1 - INCREMENT ADDRESS
05517  0 01017          MOV    R1,IVR               LOAD ADDRESS
05520  0 04037          MOV    R4,RB                INITIALIZE USAGE COUNT
```

```
05521  1 01001            ADD    R1,R1              *1 - INCREMENT ADDRESS
05522  0 01017            MOV    R1,IVR             LOAD ADDRESS
                          NOP                       *1 - WAIT (FOR 7 BIT WRITE)
05523  0 00000          + MOV    AUX,AUX
05524  0 04737            MOV    R4,7,RB            INITIALIZE STATUS
05525  7 07176            RTN                       EXIT
                          END    BUFFINIT
05526                     PROC   BFCH
                 *
                 ***SUBROUTINE BFCH - BUFFER CHARACTER
                 *
                 ***THIS SUBROUTINE BUFFERS A CHARACTER TO A CIRCULAR BUFFER
                 *
                 ***CALLING SEQUENCE:
                 *
                 *        CALL   BFCH
                 *
                 ***PARAMETERS:
                 *
                 *        R1 - CHARACTER TO BE BUFFERED
                 *        R2 - BUFFER DATA BLOCK
                 *
                 ***REGISTER USAGE:
                 *
                 *        R1  - CHARACTER (PRESERVED)
                 *        R2  - BUFFER DATA BLOCK ADDRESS (PRESERVED)
                 *        R3  - NOT USED
                 *        R4  - SCRATCH
                 *        R5  - NOT USED
                 *        R6  - NOT USED
                 *        R11 - SUBROUTINE LINKAGE
                 *        AUX - SCRATCH
                 *
                 ***
05526  6 00001   BFCH000  XMT    BFIPTR,AUX         AUX <- OFFSET
05527  1 02017            ADD    R2,IVR             LOAD IPTR ADDRESS
05530  6 07021            XMT    IVISPD+IVOSPD,IVL  *1 - SELECR SPD READ/WRITE
05531  0 37003            MOV    RB,R3              R3<- IPTR
05532  1 37004            ADD    RB,R4              R4 <- NEW IPTR
05533  6 00003            XMT    BFLEN,AUX          AUX <- OFFSET
05534  1 02017            ADD    R2,IVR             LOAD ADDRESS
05535  0 04000            MOV    R4,AUX             *1 - AUX <- NEW IPTR
05536  3 37000            XOR    RB,AUX             AUX.EQ.0 => WRAP-AROUND
05537  5 00141            NZT    AUX,BFCH010        AUX.NE.0 => NO WRAP-AROUND
                          CLR    R4                 RESET IPTR ON WRAP-AROUND
05540  6 04000          + XMT    0,R4
                 *
05541  6 00002   BFCH010  XMT    BFOPTR,AUX         AUX <- OFFSET
05542  1 02017            ADD    R2,IVR             LOAD ADDRESS
05543  0 04000            MOV    R4,AUX             AUX <- NEW IPTR
05544  3 37000            XOR    RB,AUX             AUX.EQ.0 => BUFFER FULL
05545  5 00161            NZT    AUX,BFCH020        AUX.NE.0 => BUFFER NOT FULL
05546  6 00377            XMT    -1,AUX             AUX <- INVERT
05547  3 01001            XOR    R1,R1              COMPLEMENT CHARACTER
05550  7 05564            JMP    BFCHX              AND EXIT
                 *
05551  0 02017   BFCH020  MOV    R2,IVR             LOAD BASE ADDRESS
05552  0 03000            MOV    R3,AUX             *1 - AUX <- IPTR
05553  1 37017            ADD    RB,IVR             LOAD NEW BUFFER ADDRESS
05554  0 01037            MOV    R1,RB              WRITE BYTE TO BUFFER
05555  6 00001            XMT    BFIPTR,AUX         *1 - AUX <- OFFSET
05556  1 02017            ADD    R2,IVR             LOAD IPTR ADDRESS
05557  0 04037            MOV    R4,RB              LOAD NEW IPTR
05560  6 00004            XMT    BFUSE,AUX          *1 - AUX <- OFFSET
05561  1 02017            ADD    R2,IVR             LOAD ADDRESS
05562  6 00001            XMT    1,AUX              *1 - AUX <- INCREMENT
05563  1 37037            ADD    RB,RB              USAGE <- USAGE + 1
                 *
05564  7 07176   BFCHX    RTN                       EXIT
                          END    BFCH
05565                     PROC   UBFCH
                 *
                 ***SUBROUTINE UBFCH
                 *
                 ***THIS SUBROUTINE UNBUFFERS CHARACTERS FROM A CIRCULAR BUFFER.
                 *
                 ***CALLING SEQUENCE:
                 *
                 *        CALL   UBFCH
                 *
                 ***PARAMETERS:
                 *
                 *        R1 - CHARACTER ON RETURN
                 *        R2 - BUFFER BLOCK POINTER
                 *
                 ***REGISTER USAGE:
                 *
                 *        R1  - CHARACTER
                 *        R2  - BUFFER BLOCK ADDRESS (DESTROYED)
                 *        R3  - NOT USED
                 *        R4  - SCRATCH
                 *        R5  - NOT USED
                 *        R6  - NOT USED
                 *        R11 - SUBROUTINE LINKAGE
                 *        AUX - SCRATCH
                 *
                 ***
```

```
05565   6 00004   UBFCH000 XMT   BFUSE,AUX           AUX <- OFFSET
05566   1 02017            ADD   R2,IVR              LOAD ADDRESS
05567   6 07021            XMT   IVISPD+IVOSPD,IVL   *1 - SELECT SPD READ/WRITE
05570   5 37033            NZT   RB,UBFCH010         BRANCH IF BUFFER NOT EMPTY
                           CLR   R1                  R1 <- 0
05571   6 01000   +        XMT   0,R1
05572   7 05620            JMP   UBFCHX              AND EXIT
                  *
05573   6 00377   UBFCH010 XMT   -1,AUX              AUX <- DECREMENT
05574   1 37037            ADD   RB,RB               USAGE <- USAGE - 1
05575   6 00002            XMT   BFOPTR,AUX          *1 - AUX <- OFFSET
05576   1 02017            ADD   R2,IVR              LOAD ADDRESS
                           NOP                       *1 - WAIT
05577   0 00000   +        MOV   AUX,AUX
05600   0 37004            MOV   RB,R4               R4 <- OPTR
05601   0 02017            MOV   R2,IVR              LOAD ADDRESS
05602   0 04000            MOV   R4,AUX              *1 - AUX <- OFFSET
05603   1 37017            ADD   RB,IVR              LOAD BUFFER ADDRESS
05604   6 00003            XMT   BFLEN,AUX           AUX <- OFFSET
05605   0 37001            MOV   RB,R1               R1 <- DATA BYTE
05606   1 02017            ADD   R2,IVR              LOAD LENGTH ADDRESS
05607   6 00001            XMT   1,AUX               *1 - AUX <- INCREMENT
05610   1 04004            ADD   R4,R4               OPTR <- OPTR + 1
05611   0 04000            MOV   R4,AUX              AUX <- NEW IPTR
05612   3 37000            XOR   RB,AUX              AUX.EQ.0 => WRAP-AROUND
05613   5 00215            NZT   AUX,UBFCH020        AUX.NE.0 => NO WARP-AROUND
                           CLR   R4                  RESET OPTR
05614   6 04000   +        XMT   0,R4
                  *
05615   6 00002   UBFCH020 XMT   BFOPTR,AUX          AUX <- OFFSET
05616   1 02017            ADD   R2,IVR              LOAD OPTR ADDRESS
05617   0 04037            MOV   R4,RB               LOAD NEW OPTR
                  *
05620   7 07176   UBFCHX   RTN                       EXIT
                           END   UBFCH
05621                      PROC  ERRMSG
                  *
                  ***SUBROUTINE ERRMSG
                  *
                  ***THIS SUBROUTINE BUFFERS AN ERROR MESSAGE FOR THE TRANSMIT BUFFER.
                  *
                  EMSG000  WSP   CMD04,R1            WRITE OUT ERROR CODE IN MESSAGE
05621   6 07021   +        XMT   IVISPD+IVOSPD,IVL   SELECT SPD READ/WRITE
05622   6 17235   +        XMT   CMD04,IVR              LOAD ADDRESS
05623   0 01037   +        MOV   R1,RB                WRITE DATA
05624   6 01000            XMT   0,R1                CLEAR R1 FOR EXEC
05625   6 02001            XMT   1,R2                R2<- MSGCOUNT
05626   7 07176            RTN                       EXIT
                           END   ERRMSG
05627                      PROC  UPTIMER
                  *
                  ***SUBROUTINE UPTIMER
                  *
                  ***THIS SUBROUTINE IS USED TO UPDATE TIMERS AT END-OF-SWEEP.
                  *
                  ***CALLING SEQUENCE:
                  *
                  *        CALL  UPTIMER
                  *
                  ***PARAMETERS:
                  *
                  *        R1  - MSTRCLK
                  *        R2  - TICK COUNTER
                  *        R4  - TIMER BASE (TWO'S COMPLEMENT)
                  *        R5  - DESTINATION ADDRESS
                  *        IVR - TICK COUNTER ADDRESS
                  *
                  ***REGISTER USAGE:
                  *
                  *        R1  - MSTRCLK (PRESERVED)
                  *        R2  - TICK COUNTER (UPDATED)
                  *        R3  - UPDATED CLOCK
                  *        R4  - TIMER BASE (TWO'S COMPLEMENT)
                  *        R5  - DESTINATION ADDRESS (PRESERVED)
                  *        R6  - NOT USED (PRESERVED)
                  *        R11 - SUBROUTINE LINKAGE
                  *        AUX - SCRATCH
                  *
                  ***
05627   0 01000   UPTIM000 MOV   R1,AUX              AUX <- SWEEP TIMER
                           CLR   R3                  R3 TO HOLD UPDATED TIMER
05630   6 03000   +        XMT   0,R3
05631   1 02002            ADD   R2,R2               UPDATE TICK COUNTER
05632   0 04000            MOV   R4,AUX              AUX <- TIMER BASE
05633   1 02000            ADD   R2,AUX              AUX <- TICK COUNTER - BASE
05634   5 10236            NZT   OVF,UPTIM010        OVF.NE.0 => TICKCOUNTER.GE.BASE
05635   7 05640            JMP   UPTIM020            OVF.EQ.0 => TICKCOUNTER.LT.BASE
                  *
05636   6 03001   UPTIM010 XMT   1,R3                SET TIMER VALUE
05637   0 00002            MOV   AUX,R2              R2 <- NEW TICK COUNTER VALUE
                  *
05640   6 07001   UPTIM020 XMT   IVOSPD,IVL          SELECT SCRATCHPAD WRITE
05641   0 02037            MOV   R2,RB               WRITE OUT NEW TICK COUNTER
                           NOP                       *1 - WAIT
```

```
05642  0 00000   +           MOV    AUX,AUX
05643  0 05017               MOV    R5,IVR              LOAD ADDRESS
05644  0 03037               MOV    R3,RB               WRITE OUT TIMER VALUE
05645  7 07176               RTN                        RETURN
                             END    UPTIMER
05646                        PROC   OUTPUT
                  *
                  ***SUBROUTINE OUTPUT
                  *
                  ***THIS SUBROUTINE BUILDS A NIBBLE OF DATA FROM THE COIL RAM
                  *
                  ***CALLING SEQUENCE:
                  *
                  *          CALL   OUTPUT
                  *
                  ***PARAMETERS:
                  *
                  *          R3   - OUTPUT BYTE
                  *
                  ***REGISTER USAGE:
                  *
                  *          R1   - I/O ADDRESS
                  *          R2   - SCRATCH
                  *          R3   - OUTPUT BYTE
                  *          R4   - INPUT BYTE
                  *          R5   - SCRATCH
                  *          R6   - NOT USED
                  *          R11  - LINKAGE
                  *          AUX  - SCRATCH
                  *
                  ***
05646  6 07000    OUTPUT00 XMT    IVICRDAT+IVOCTRL,IVL SELECT PORTS
05647  6 02004             XMT    4,R2                R2 <- COUNTER
                  *
05650  0 26100    OUTPUT10 MOV    CROUTPUT,AUX        AUX <- COIL STAT
05651  6 27301             XMT    CTRLINCC,CTRLREG    INC ADDR
05652  3 03003             XOR    R3,R3               *1 - LOAD COIL STATE
05653  0 03103             MOV    R3(1),R3            *2 - ROTATE OUTPUT VECTOR
05654  6 00377             XMT    -1,AUX              *3 - AUX <- DECREMENT
05655  1 02002             ADD    R2,R2               DECREMENT COUNTER
05656  5 02250             NZT    R2,OUTPUT10         LOOP UNTIL DONE
                  *
05657  7 07176             RTN                        EXIT
                           END    OUTPUT
05660                      PROC   INPUT
                  *
                  ***SUBROUTINE INPUT
                  *
                  ***THIS SUBROUTINE UNPACKS I/O INPUT DATA
                  *
                  ***CALLING SEQUENCE:
                  *
                  *          CALL   INPUT
                  *
                  ***PARAMETERS:
                  *
                  *          R4   - INPUT BYTE
                  *
                  ***REGISTER USAGE:
                  *
                  *          R1   - I/O ADDRESS
                  *          R2   - SCRATCH
                  *          R3   - OUTPUT BYTE
                  *          R4   - INPUT BYTE
                  *          R5   - NOT USED
                  *          R6   - NOT USED
                  *          R11  - LINKAGE
                  *          AUX  - SCRATCH
                  *
                  ***
05660  6 02004    INPUT000 XMT    4,R2                R2 <- LOOP COUNT R
                  *
05661  6 07002    INPUT010 XMT    IVICRDAT+IVOCRDAT,IVL SELECT COIL READ AND WRITE
05662  0 25100             MOV    CRINPUT,AUX         AUX <- CURRENT INPUT STATE
05663  0 00121             MOV    AUX,CRINHIS         LOAD HISTORY BIT
                           NOP                        *1 - WAIT FOR WRITE
05664  0 00000   +         MOV    AUX,AUX
                           NOP                        *2 - TO OCCUR BEFORE NEXT READ CYCLE
05665  0 00000   +         MOV    AUX,AUX
                           NOP                        *3 - BEFORE TESTING STATUS
05666  0 00000   +         MOV    AUX,AUX
05667  5 24131             NZT    CRINDISB,INPUT020   BRANCH IF DISABLED
05670  0 04125             MOV    R4,CRINPUT          LOAD INPUT STATE
                  *
05671  0 04104    INPUT020 MOV    R4(1),R4            ROTATE INPUT BYTE
05672  6 00377             XMT    -1,AUX              AUX <- DECREMENT
05673  6 07000             XMT    IVOCTRL,IVL         SELECT CONTROL
05674  6 27301             XMT    CTRLINCC,CTRLREG    BUMP ADDR
05675  1 02002             ADD    R2,R2               *1 - DECREMENT COUNTER
05676  5 02261             NZT    R2,INPUT010         *2 - BRANCH UNTIL DONE
                  *
05677  7 07176             RTN                        EXIT
                  *
                           END    INPUT
```

```
05700                         PROC   REGVAL
                       *
                       *   ROUTINE: REGVAL
                       *       ENTER WITH NODE DATA IN [R1,R2]
                       *       COMPUTE REGISTER ADDR, AND DECIDE IF HOLDING
                       *       REGISTER OR INPUT REGISTER
                       *       EXIT WITH REGISTER CONTENTS IN [R1,R2] AND
                       *       WITH REGISTER ADDR IN [R5,R6]
                       *
05700  6 00003         REGVAL00 XMT   3,AUX              CHECK FOR HOLDING REGISTER OR
05701  2 01000                  AND   R1,AUX             INPUT REGISTER
05702  4 00303                  XEC   REGVALTB(AUX),4    VECTOR TO REGISTER TYPE
                       *
05703  7 05707         REGVALTB JMP   REGVAL10           HOLDING REGISTER
05704  7 05746                  JMP   REGVAL50           INPUT REGISTER
05705  7 05761                  JMP   REGVAL60           DUMMY REGISTER
05706  7 05775                  JMP   REGVAL99           INVALID REGISTER TYPE
                       *
                       *
05707  6 07000         REGVAL10 XMT   IVOCTRL,IVL        SELECT COIL RAM ADDR LO
05710  6 00002                  XMT   REGBASEL,AUX       GET BASE ADDR OF REG TABLE
05711  1 02006                  ADD   R2,R6              ADD REFERENCE NUMBER -> R6
05712  0 06037                  MOV   R6,RB              SET COIL ADDR LO
05713  0 10005                  MOV   OVF,R5
05714  6 00001                  XMT   REGBASEH,AUX
05715  1 05005                  ADD   R5,R5              GET HI REG ADDR -> R5
05716  6 07001                  XMT   IVOCRHI+IVICRDAT,IVL  SELECT COIL HI ADDR, COIL READ
05717  0 05027                  MOV   R5,LB              REG ADDR HI -> COIL ADDR HI
                                CLR   R2                 *1
05720  6 02000         +        XMT   0,R2
05721  6 00001                  XMT   1,AUX              *2
05722  1 05000                  ADD   R5,AUX             *3
05723  0 27402                  MOV   REGDATA,R2         GET LOW NIBBLE OF REGISTER DATA
05724  0 00027                  MOV   AUX,LB             ADDRESS MIDDLE NIBBLE
05725  6 00002                  XMT   2,AUX              *1
05726  1 05000                  ADD   R5,AUX             *2
                                CLR   R1                 *3
05727  6 01000         +        XMT   0,R1
05730  0 27401                  MOV   REGDATA,R1         MOVE MIDDLE NIBBLE -> R1 TEMP'ARLY
05731  0 00027                  MOV   AUX,LB             ADDRESS HIGH ORDER NIBBLE
05732  0 02000                  MOV   R2,AUX             *1 COMBINE LOW AND MIDDLE NIBBLE
05733  3 01402                  XOR   R1(4),R2           *2
                                CLR   AUX                *3
05734  6 00000         +        XMT   0,AUX
05735  0 27401                  MOV   REGDATA,R1         GET HIGH NIBBLE
05736  0 00027                  MOV   AUX,LB               ODD->COIL ADDR HI
05737  6 07001                  XMT   IVOSPD,IVL         SELECT SCRATCH PAD WRITE
05740  6 17067                  XMT   CNTRPWR,IVR        PUT COUNTER POWER HISTORY INTO SCRATCH PAD
05741  6 00003                  XMT   00000011B,AUX
05742  0 01201                  MOV   R1(2),R1
05743  2 01037                  AND   R1,RB              WRITE COUNTER POWER
05744  2 01601                  AND   R1(6),R1           MASK COUNTER POWER OUT OF REG DATA
                       *
05745  7 05776                  JMP   REGVALX            TAKE COMMON EXIT
                       *
                       *        INPUT REGISTERS
                       *
05746  6 00300         REGVAL50 XMT   REG3001H,AUX       INPUT REGISTERS, GET BASE ADDR
05747  1 02000                  ADD   R2,AUX
05750  1 02006                  ADD   R2,R6              ADD REFERENCE NUMBER -> R6
05751  6 07021                  XMT   IVOSPD+IVISPD,IVL  SELECT SCRATCHPAD READ WRITE
05752  0 06017                  MOV   R6,IVR
05753  6 00001                  XMT   1,AUX              *
05754  0 37001                  MOV   RB,R1              GET HI ORDER REGISTER DATA -> R1
05755  1 06017                  ADD   R6,IVR             ADDR LOW REG
                                CLR   R5                 *
05756  6 05000         +        XMT   0,R5
05757  0 37002                  MOV   RB,R2              GET LO ORDER REGISTER DATA -> R2
05760  7 05776                  JMP   REGVALX
                       *
                       REGVAL60 RSP   REG4000H,R1        GET DUMMY REGISTER HI
05761  6 17070         +        XMT   REG4000H,IVR             LOAD ADDRESS
05762  6 07021         +        XMT   IVISPD+IVOSPD,IVL  *1 - SELECT SPD READ
05763  0 37001         +        MOV   RB,R1               READ DATA
                                RSP   REG4000L,R2        GET DUMMY REGISTER LO
05764  6 17071         +        XMT   REG4000L,IVR             LOAD ADDRESS
05765  6 07021         +        XMT   IVISPD+IVOSPD,IVL  *1 - SELECT SPD READ
05766  0 37002         +        MOV   RB,R2               READ DATA
                                CLR   AUX
05767  6 00000         +        XMT   0,AUX
                                WSP   CNTRPWR,AUX        CLEAR COUNTER POWER HISTORY
05770  6 07021         +        XMT   IVISPD+IVOSPD,IVL  SELECT SPD READ/WRITE
05771  6 17067         +        XMT   CNTRPWR,IVR              LOAD ADDRESS
05772  0 00037         +        MOV   AUX,RB               WRITE DATA
05773  6 05377                  XMT   -1,R5              SET DUMMY REG FLAG
05774  7 05776                  JMP   REGVALX
                       *
05775  6 01377         REGVAL99 XMT   -1,R1              ERROR RETURN
                       *
05776  7 07176         REGVALX  RTN                      EXIT
                                END   REGVAL
05777                           PROC  STORE
                       *
                       *   ROUTINE: STORE
                       *       ENTER WITH REGISTER (HOLDING) ADDR IN [R5,R6] AND
                       *       DATA IN [R1,R2]
```

```
                                   *
05777  6 00377          STOREC00 XMT    -1,AUX               CHECK FOR DUMMY REGISTER
06000  3 05000                   XOR    R5,AUX
06001  5 00003                   NZT    AUX,STORE010         NOT DUMMY REG, GOTO STOREC10
06002  7 06040                   JMP    STORE020             DUMMY REG, GO TO STORE020
                        STOREC10 RSP    CNTRPWR,AUX          GET COUNTER POWER
06003  6 17067          +        XMT    CNTRPWR,IVR               LOAD ADDRESS
06004  6 07021          +        XMT    IVISPD+IVOSPD,IVL    *1 - SELECT SPD READ
06005  0 37000          +        MOV    RB,AUX                 READ DATA
06006  0 00600                   MOV    AUX(6),AUX           ROTATE INTO PLACE
06007  3 01001                   XOR    R1,R1                COMBINE WITH REGISTER DATA
06010  6 07000                   XMT    IVOCRLO,IVL          SELECT COIL ADDR LO
06011  0 06037                   MOV    R6,RB                LOAD LO ADDR
06012  6 07001                   XMT    IVOCRHI,IVL          SELECT COIL ADDR HI
06013  0 05027                   MOV    R5,LB
06014  6 07002                   XMT    IVOCRDAT,IVL         *1 SELECT COIL WRITE
06015  6 00017                   XMT    00001111B,AUX        GET MASK
06016  2 02027                   AND    R2,LB                WRITE LO ORDER NIBBLE
06017  6 00001                   XMT    1,AUX
06020  1 05000                   ADD    R5,AUX               STEP TO NEXT NIBBLE
06021  6 07001                   XMT    IVOCRHI,IVL          SELECT COIL RAM ADDR HI
06022  0 00027                   MOV    AUX,LB
06023  6 00017                   XMT    00001111B,AUX        *1 GET MASK
06024  2 02400                   AND    R2(4),AUX            PREPARE MIDDLE NIBBLE
06025  6 07002                   XMT    IVOCRDAT,IVL         SELECT COIL RAM WRITE
06026  0 00027                   MOV    AUX,LB               WRITE MIDDLE NIBBLE
06027  6 00002                   XMT    2,AUX
06030  1 05000                   ADD    R5,AUX               STEP TO HI ORDER NIBBLE
06031  6 07001                   XMT    IVOCRHI,IVL          SELECT COIL RAM ADDR HI
06032  0 00027                   MOV    AUX,LB
06033  6 07002                   XMT    IVOCRDAT,IVL         SELECT COIL RAM WRITE
06034  0 01027                   MOV    R1,LB                WRITE HI ORDER NIBBLE
06035  6 07001                   XMT    IVOCRHI,IVL          SELECT COIL ADDR HI
                                 CLR    AUX
06036  6 00000          +        XMT    0,AUX
06037  0 00027                   MOV    AUX,LB               0-> COIL RAM ADDR HI
06040  7 07176          STORE020 RTN                         EXIT
                                 END    STORE
06041                            PROC   ADRVAL
                        *
                        ***SUBROUTINE ADRVAL
                        *
                        ***THIS SUBROUTINE VALIDATES AN ADDRESS FOR A COMMAND FUNCTION
                        *  THE ONLY COMMANDS TO CALL ADRVAL ARE ONES WITH VARIABLE LENGTH
                        *  FIELDS. ADRVAL ENSURES THAT THE ADDRESS+LENGTH-1 IS IN BOUNDS.
                        *
                        ***CALLING SEQUENCE:
                        *
                        *        CALL   ADRVAL
                        *
                        ***RETURNS:
                        *
                        *        TO CALLER IF NO ERROR
                        *        TO CMDS1610 ON ERROR
                        *
                        ***REGISTER USAGE:
                        *
                        *        R1 - ADDRESS FIELD
                        *        R2 - -(DATA LENGTH)
                        *        R3 - SCRATCH
                        *        R4 - SCRATCH
                        *        R5 - ADDRHI
                        *        R6 - ADDRLO
                        *        R11 - LINKAGE
                        *        AUX - SCRATCH
                        *
                        ***
06041  6 17233          ADRVAL00 XMT    CMD02,IVR            LOAD ADDRESS
06042  6 07021                   XMT    IVOSPD+IVISPD,IVL    DO SELECTS
06043  0 37404                   MOV    LENFLD,R4            PICK UP LENGTH FIELD IN COMMAND BYTE
06044  6 00367                   XMT    -9,AUX               LENGTH SHOULD BE < 9
06045  1 04002                   ADD    R4,R2                SEE IF OK
06046  6 00200                   XMT    10000000B,AUX        R2 SHOULD BE -
06047  2 02002                   AND    R2,R2
06050  5 02052                   NZT    R2,ADRVAL05
06051  7 06147                   JMP    ADRVAL55             IF NOT, ERROR
06052  6 17235          ADRVAL05 XMT    CMD04,IVR            LOAD ADDRESS
                                 NOP                         *1 - WAIT
06053  0 00000          +        MOV    AUX,AUX
06054  0 37005                   MOV    RB,R5                R5<- ADDRHI
06055  0 32301                   MOV    ADRFLD,R1            PICK UP FIELD
06056  6 17236                   XMT    CMD05,IVR            LOAD ADDRESS
06057  6 00377                   XMT    -1,AUX               *1
06060  0 37006                   MOV    RB,R6                R6<- ADDRLO
06061  6 17030                   XMT    SAVER6,IVR           SAVE ADDR
06062  0 06037                   MOV    R6,RB
                                 NOP                         *1 - WAIT
06063  0 00000          +        MOV    AUX,AUX
06064  6 17027                   XMT    SAVER5,IVR
06065  0 05037                   MOV    R5,RB
06066  4 01077                   XEC    ADRVALTB(R1),8       AUX<- LENGTH - 1 IN MEMORY
06067  1 06006                   ADD    R6,R6                ADD IN LENGTH
06070  0 10000                   MOV    OVF,AUX
06071  1 05005                   ADD    R5,R5
06072  6 00007                   XMT    7,AUX                MAKE SURE DIDN'T CHANGE FIELDS
06073  2 05500                   AND    R5(5),AUX            AUX<- NEW FIELD
```

```
06074  3 01002            XOR  R1,R2            SHOULD = OLD FIELD
06075  5 02145            NZT  R2,ADRVAL50      IF NOT, ERROR
06076  7 06111            JMP  ADRVAL20
                 *
06077  1 04700   ADRVALTB ADD  R4(7),AUX        LOGIC SPACE
06100  1 04700            ADD  R4(7),AUX        I/O SPACE
06101  1 04000            ADD  R4,AUX           REGISTER SPACE
06102  1 04700            ADD  R4(7),AUX        SCRATCHPAD SPACE
06103  7 06107            JMP  ADRVAL10         ILLEGAL
06104  7 06107            JMP  ADRVAL10         ILLEGAL
06105  7 06107            JMP  ADRVAL10         ILLEGAL
06106  7 06107            JMP  ADRVAL10         ILLEGAL
                 *
06107  6 01005   ADRVAL10 XMT  ERRADI,R1        R1 <- ERROR CODE
06110  7 04646            JMP  CMDERR           GO TO ERROR HANDLER
                 *
06111  6 17276   ADRVAL20 XMT  SPDCONF1,IVR     LOAD ADDRESS
06112  6 00037            XMT  -1-ADRMSK,AUX    AUX <- MASK
06113  0 37003            MOV  RB,R3            R3 <- CONF1
06114  6 17277            XMT  SPDCONF2,IVR     LOAD ADDRESS
06115  2 05005            AND  R5,R5            MASK OUT FIELD DESIGNATOR
06116  0 37004            MOV  RB,R4            R4 <- CONF2
06117  4 01120            -XEC ADRVALT2(R1),4   EXECUTE VIA TABLE OF FIELD TYPES
                 *
06120  7 06124   ADRVALT2 JMP  ADRVAL30         LOGIC SPACE
06121  7 06151            JMP  ADRVAL60         I/O SPACE
06122  7 06151            JMP  ADRVAL60         REGISTER SPACE
06123  7 06154            JMP  ADRVAL80         SCRATCHPAD SPACE
                 *
06124  6 00001   ADRVAL30 XMT  1,AUX            AUX <- MASK
06125  2 06000            AND  R6,AUX           R6 SHOULD BE ODD
06126  5 00130            NZT  AUX,ADRVAL31
06127  7 06107            JMP  ADRVAL10
06130  6 00037   ADRVAL31 XMT  00011111B,AUX    AUX <- MASK
06131  2 03303            AND  R3(3),R3         R3 <- NUMBER OF LOGIC FIELDS
                 *
06132  6 00377   ADRVAL35 XMT  -1,AUX           AUX <- MASK
06133  3 05002            XOR  R5,R2            R2 <- COMPLEMENT OF ADDRHI
06134  6 00001            XMT  1,AUX            AUX <- INCREMENT
06135  1 02000            ADD  R2,AUX           AUX <- -(ADDRHI)
06136  1 03000            ADD  R3,AUX           AUX <- FIELDS - ADDRHI
06137  5 00141            NZT  AUX,ADRVAL40     AUX.NE.0 => CHECK OVF
06140  7 06145            JMP  ADRVAL50         AUX.EQ.0 => ERROR
                 *
06141  6 02200   ADRVAL40 XMT  10000000B,R2     R2 <- MASK
06142  2 02002            AND  R2,R2            R2 <- MSB
06143  5 02145            NZT  R2,ADRVAL50      R2.NE.0 => ERROR
06144  7 06155            JMP  ADRVALX          R2.EQ.0 => SUCCESS
                 *
06145  6 01004   ADRVAL50 XMT  ERRADR,R1        R1 <- ERROR CODE
06146  7 04646            JMP  CMDERR           ERROR EXIT
                 *
06147  6 01015   ADRVAL55 XMT  ERRLEN,R1        R1<- ERROR CODE
06150  7 04646            JMP  CMDERR
                 *
06151  6 00017   ADRVAL60 XMT  00001111B,AUX    AUX <- MASK
06152  2 04403            AND  R4(4),R3         R3 <- COIL RAM CONFIGURATION
06153  7 06132            JMP  ADRVAL35
                 *
06154  5 05145   ADRVAL80 NZT  R5,ADRVAL50      SCRATCHPAD ADDRHI.EQ.0
                 *
06155  6 17233   ADRVALX  XMT  CMD02,IVR        SEND BACK -DATA LENGTH IN R2
06156  6 00377            XMT  -1,AUX           *1
06157  0 37402            MOV  LENFLD,R2
06160  6 17027            XMT  SAVER5,IVR       SEND BACK ADRRESS IN (R5,R6)
06161  0 02702            MOV  R2(7),R2         *1 - HAVE TO SHIFT LENFLD
06162  0 37505            MOV  30H,5,R5         DON'T READ FIELD
06163  6 17030            XMT  SAVER6,IVR
06164  3 02002            XOR  R2,R2            *1 R2<- -LENGTH - 1
06165  0 37006            MOV  RB,R6
06166  6 00001            XMT  1,AUX
06167  1 02002            ADD  R2,R2            R2<- -DATA LENGTH
06170  7 07176            RTN
                          END  ADRVAL
06171                     PROC LENVAL
                 *
                 ***SUBROUTINE LENVAL
                 *
                 ***THIS SUBROUTINE VALIDATES THE LENGTH FIELD AND THE LENGTH BYTE
                 *  IN A COMMAND WITH A VARIABLE LENGTH FIELD.
                 *
                 ***CALLING SEQUENCE:
                 *
                 *        CALL LENVAL
                 *               ON ENTRY, AUX = WHAT TO ADD TO LENGTH BYTE TO GET
                 *               DATA LENGTH
                 *               R2 CONTAINS -DATA LENGTH
                 *               IVL = IVISPD+IVOSPD
                 *
                 ***RETURNS:
                 *
                 *        TO CALLER IF NO ERROR
                 *        TO CMDERR IF ERROR
                 *
                 * IN ADDITION, LENVAL PUTS THE DATA LENGTH INTO INNUM
                 *
```

```
06171  6 17234           *XMT    CMD03,IVR           ADDR OF LENGTH BYTE
06172  1 02000            ADD    R2,AUX
06173  1 37000            ADD    RB,AUX
06174  5 00203            NZT    AUX,LENVAL10        IF AUX .NE. 0, ERROR
06175  6 00377            XMT    -1,AUX              NOW WRITE OUT INNUM
06176  3 02003            XOR    R2,R3               WITHOUT DISTURBING R1,R2,R5 OR R6
06177  6 00001            XMT    1,AUX
06200  6 17265            XMT    INNUM,IVR
06201  1 03037            ADD    R3,RB
06202  7 07176            RTN
06203  6 01015   LENVAL10 XMT    ERRLEN,R1           LENGTH ERROR CODE
06204  7 04646            JMP    CMDERR
                          END    LENVAL
06205                     PROC   LENZERO
                 *
                 ***CHECK THAT THE LENGTH NIBBLE IN THE COMMAND BYTE = 0
                 *
06205  6 17233            XMT    CMD02,IVR           ADDRESS OF COMMAND BYTE
06206  6 07020            XMT    IVISPD,IVL          SELECT SPD READ
06207  0 37401            MOV    30H,4,R1            READ LENGTH
06210  5 01212            NZT    R1,LENZERO1
06211  7 07176            RTN
06212  6 01006   LENZERO1 XMT    ERRCMD,R1
06213  7 04646            JMP    CMDERR
                          END    LENZERO
06214                     PROC   CLRDIAG
                 *
                 * THIS PROC CLEARS THE FLAGS FOR THE CHECKSUM DIAGNOSTIC
                 *
06214  6 17034            XMT    DIAGSHI,IVR         LOAD ADDRESS
06215  6 07021            XMT    IVOSPD+IVISPD,IVL
06216  6 02000            XMT    0,R2
06217  0 02037            MOV    R2,RB
                          NOP                        *1 - WAIT
06220  0 00000   +        MOV    AUX,AUX
06221  6 17035            XMT    DIAGSLO,IVR
06222  0 02037            MOV    R2,RB
06223  7 07176            RTN
                          END    CLRDIAG
06224                     PROC   INSTINIT
                 *
                 * PERFORM INSERT INITIALIZATION. THIS PROC EXISTS ONLY BECAUSE
                 * THERE ARE TWO INSERT COMMANDS
                 * ON EXIT, R1 = NOWPAGE, R2 = INPAGE, AND THE INSTAD IS IN SAVER5 AND SAVER6
                 *
                          WSP    SAVERET,R11         SAVE RETURN ADDR
06224  6 07021   +        XMT    IVISPD+IVOSPD,IVL SELECT SPD READ/WRITE
06225  6 17032   +        XMT    SAVERET,IVR              LOAD ADDRESS
06226  0 11037   +        MOV    R11,RB                 WRITE DATA
06227  6 11132            CALL   ADRVAL             VALIDATE ADDRESS
06230  7 06041
06231  6 00372            XMT    -6,AUX              INSERT LENGTH SHOULD  =
06232  6 11133            CALL   LENVAL              CMDLEN - 6
06233  7 06171
06234  6 11134            CALL   PROTECT             CHECK MEMORY PROTECT
06235  7 06541
06236  4 01240   *        XEC    INSTITAB(R1),4      EXECUTE OFF FIELD TYPE
06237  7 04646            JMP    CMDERR              GO TO ERROR EXIT
                 *
06240  7 06245   INSTITAB JMP    INSTI010            LOGIC SPACE
06241  6 01005            XMT    ERRADI,R1           I/O SPACE         - ILLEGAL
06242  6 01005            XMT    ERRADI,R1           REGISTER SPACE    - ILLEGAL
06243  6 01005   INSTI009 XMT    ERRADI,R1           SCRATCHPAD SPACE - ILLEGAL
06244  7 04646      *     JMP    CMDERR
                 *
06245  5 05250   INSTI010 NZT    R5,INSTI011         IF ADDRESS = (0,0), ERROR
06246  5 06250            NZT    R6,INSTI011
06247  7 06243            JMP    INSTI009
06250  6 17030   INSTI011 XMT    SAVER6,IVR          SAVE ADDRESSES
06251  6 07021            XMT    IVISPD+IVOSPD,IVL
06252  0 06037            MOV    R6,RB
06253  6 03237            XMT    CMD06,R3            *1 - SET COMMAND DATA ADDR
06254  6 17027            XMT    SAVER5,IVR
06255  0 05037            MOV    R5,RB
06256  0 02004            MOV    R2,R4               *1 - R4<- LOOP COUNT FOR VALIDATE
06257  6 17024            XMT    SAVER2,IVR          SAVE LENGTH
06260  0 02037            MOV    R2,RB
06261  6 07020   INSTI015 XMT    IVISPD,IVL          SELECT SPD READ
06262  6 00001            XMT    1,AUX
06263  0 03017            MOV    R3,IVR              LOAD DATA ADDR
06264  1 03003            ADD    R3,R3               *1 - INC ADDR
06265  0 37001            MOV    RB,R1               R1<- DATAHI
06266  0 03017            MOV    R3,IVR              LOAD ADDRESS
06267  1 03003            ADD    R3,R3               *1 - INC DATA ADDR
06270  0 37002            MOV    RB,R2               R2<- DATALO
06271  6 11135            CALL   VALIDATE            SEE IF VALID NODE
06272  7 06702
06273  6 00377            XMT    -1,AUX              IF NOT, R1 = -1
06274  3 01000            XOR    R1,AUX
06275  5 00300            NZT    AUX,INSTI017
06276  6 01012            XMT    ERRNOD,R1
06277  7 04646            JMP    CMDERR
```

```
5536  06300  6 00002   INSTI017 XMT   2,AUX
5537  06301  1 04004            ADD   R4,R4              INC LOOP COUNT
5538  06302  5 04261            NZT   R4,INSTI015        LOOP UNTIL R4 = 0
5539                            RSP   SAVER5,R5          RESTORE ADDRESSES
5539  06303  6 17027   +        XMT   SAVER5,IVR              LOAD ADDRESS
5539  06304  6 07021   +        XMT   IVISPD+IVOSPD,IVL  *1 - SELECT SPD READ
5539  06305  0 37005   +        MOV   RB,R5               READ DATA
5540                            RSP   SAVER6,R6
5540  06306  6 17030   +        XMT   SAVER6,IVR              LOAD ADDRESS
5540  06307  6 07021   +        XMT   IVISPD+IVOSPD,IVL  *1 - SELECT SPD READ
5540  06310  0 37006   +        MOV   RB,R6               READ DATA
5541  06311  6 11136            CALL  EOLCHECK           CHECK THAT INSTAD .LE. EOLAD
      06312  7 06516
5542  06313  6 00001            XMT   00000001B,AUX      CALCULATE INPAGE = ADDR/128
5543  06314  2 06700            AND   R6(7),AUX
5544  06315  1 05702            ADD   R5(7),R2           R2<- INPAGE
5545                            WSP   INPAGE,R2          SAVE
5545  06316  6 07021   +        XMT   IVISPD+IVOSPD,IVL  SELECT SPD READ/WRITE
5545  06317  6 17264   +        XMT   INPAGE,IVR              LOAD ADDRESS
5545  06320  0 02037   +        MOV   R2,RB               WRITE DATA
5546                            NOP                      *1 - WAIT
5546  06321  0 00000   +        MOV   AUX,AUX
5547  06322  6 17065            XMT   EOLHI,IVR          GET EOL ADDR
5548  06323  6 07021            XMT   IVOSPD+IVISPD,IVL  *1 - SELECT SPD READ/WRITE
5549  06324  0 37003            MOV   RB,R3              R3<- EOLLOCHI
5550  06325  6 17066            XMT   EOLLO,IVR
5551  06326  6 00001            XMT   00000001B,AUX      *1 - FOR ANDING LATER
5552  06327  0 37004            MOV   RB,R4              R4<- EOLLOCLO
5553  06330  2 04700            AND   R4(7),AUX          CALCULATE EOLPAGE
5554  06331  1 03701            ADD   R3(7),R1           R1<- EOLPAGE = NOWPAGE
5555  06332  6 00300            XMT   ENT1STM+PASS1STM,AUX  SET 1ST ENTRY AND 1ST PASS
5556  06333  6 17263            XMT   NOWPAGE,IVR        FLAGS
5557  06334  1 01037            ADD   R1,RB              SAVE FLAGS AND NOWPAGE
5558                            NOP                      *1 - WAIT
5558  06335  0 00000   +        MOV   AUX,AUX
5559  06336  6 17265            XMT   INNUM,IVR          GET INNUM (INSERT LENGTH)
5560                            NOP                      *1 - WAIT
5560  06337  0 00000   +        MOV   AUX,AUX
5561  06340  0 37000            MOV   RB,AUX             AUX<- INNUM
5562  06341  1 04004            ADD   R4,R4              EOLAD <- EOLAD + INNUM
5563  06342  0 10000            MOV   OVF,AUX
5564  06343  1 03003            ADD   R3,R3
5565  06344  6 17276            XMT   SPDCONF1,IVR       CHECK CONFIG
5566  06345  6 00037            XMT   00011111B,AUX      *1
5567  06346  2 34506            AND   33H,5,R6           R6<- NUMBER OF LOGIC 256 BYTE PAGES
5568  06347  0 03000            MOV   R3,AUX             CHECK THAT EOLAD < MAX MEM
5569  06350  3 06006            XOR   R6,R6              IF NOT, R3=R6
5570  06351  5 06354            NZT   R6,INITI020
5571  06352  6 01021            XMT   ERRFUL,R1          TAKE ERROR EXIT
5572  06353  7 04646            JMP   CMDERR
5573  06354  6 17066   INITI020 XMT   EOLLO,IVR          UPDATE EOLAD IN SPD
5574  06355  0 04037            MOV   R4,RB
5575                            NOP                      *1 - WAIT
5575  06356  0 00000   +        MOV   AUX,AUX
5576  06357  6 17065            XMT   EOLHI,IVR
5577  06360  0 03037            MOV   R3,RB
5578                            NOP                      *1 - WAIT
5578  06361  0 00000   +        MOV   AUX,AUX
5579                            RSP   SAVERET,R11        GET RETURN ADDR
5579  06362  6 17032   +        XMT   SAVERET,IVR             LOAD ADDRESS
5579  06363  6 07021   +        XMT   IVISPD+IVOSPD,IVL  *1 - SELECT SPD READ
5579  06364  0 37011   +        MOV   RB,R11              READ DATA
5580  06365  7 07176            RTN                      RETURN
5581                            END   INSTINIT
5583  06366                     PROC  DLETINIT
5584                   *
5585                   * INITIALIZE FOR DELETE. THE ONLY REASON THIS PROC EXISTS IS THAT THERE
5586                   * ARE TWO DELETE COMMANDS
5587                   * ON RETURN, R2 = DLNUM, (R3,R4) = DLSTAD
5588                   *
5589                            WSP   SAVERET,R11        SAVE RETURN ADDR
5589  06366  6 07021   +        XMT   IVISPD+IVOSPD,IVL  SELECT SPD READ/WRITE
5589  06367  6 17032   +        XMT   SAVERET,IVR             LOAD ADDRESS
5589  06370  0 11037   +        MOV   R11,RB              WRITE DATA
5590  06371  6 11137            CALL  ADRVAL             VALIDATE ADDRESS
      06372  7 06041
5591  06373  6 11140            CALL  PROTECT            CHECK MEMORY PROTECT
      06374  7 06541
5592  06375  4 01377            XEC   DLETITAB(R1),4     EXECUTE OFF FIELD TYPE
5593  06376  7 04646            JMP   CMDERR             TAKE ERROR EXIT
5594                   *
5595  06377  7 06403   DLETITAB JMP   DLETI010           LOGIC SPACE
5596  06400  6 01005            XMT   ERRADI,R1          I/O SPACE          - ILLEGAL
5597  06401  6 01005            XMT   ERRADI,R1          REGISTER SPACE     - ILLEGAL
5598  06402  6 01005            XMT   ERRADI,R1          SCRATCHPAD SPACE - ILLEGAL
5599                   *
5600  06403  6 07021   DLETI010 XMT   IVISPD+IVOSPD,IVL  SELECT SPD READ/WRITE
5601  06404  6 00377            XMT   -1,AUX             SAVE +DLNUM
5602  06405  6 17265            XMT   DLNUM,IVR          LOAD ADDRESS
5603  06406  3 02002            XOR   R2,R2              R2<- DLNUM -1
5604  06407  6 00001            XMT   1,AUX
5605  06410  1 02002            ADD   R2,R2
5606  06411  0 02037            MOV   R2,RB
5607  06412  0 06004            MOV   R6,R4              (R3,R4)<- DLSTAD
5608  06413  0 05003            MOV   R5,R3
5609  06414  0 02000            MOV   R2,AUX             MAKE SURE DLSTAD + DLNUM .LE. EOLAD
```

```
06415  1 06006              ADD    R6,R6             (R5,R6)= DLSTAD+DLNUM
06416  0 10000              MOV    OVF,AUX
06417  1 05005              ADD    R5,R5
06420  6 11141              CALL   EOLCHECK
06421  7 06516
                            RSP    DLNUM,R2          EOLCHECK DESTROYED R2
06422  6 17265     +        XMT    DLNUM,IVR             LOAD ADDRESS
06423  6 07021     +        XMT    IVISPD+IVOSPD,IVL *1 - SELECT SPD READ
06424  0 37002     +        MOV    RB,R2              READ DATA
                            RSP    SAVERET,R11       GET RETURN ADD
06425  6 17032     +        XMT    SAVERET,IVR               LOAD ADDRESS
06426  6 07021     +        XMT    IVISPD+IVOSPD,IVL *1 - SELECT SPD READ
06427  0 37011     +        MOV    RB,R11                READ DATA
06430  7 07176              RTN
                            END    DLETINIT
06431                       PROC NULLFILL
                   *
                   * THIS PROCEDURE FILLS A REGION OF LOGIC WITH EITHER NULLS OR EOLS
                   * DEPENDING ON WHICH ENTRY POINT IS CALLED
                   * ON ENTRY, (R5,R6) = START ADDR
                   *           R1     = COUNT
                   * R3, R4 ARE DESTROYED
                   *
06431  6 03134     FILLCC   XMT    NODENULL.L.2,R3   R3<- NULLNODE HI
06432  7 06434              JMP    FILL01
                            ENTRY  EOLFILL
06433  6 03004              XMT    NODEEOL.L.2,R3    R3<- EOL HI
06434  6 07003     FILL01   XMT    IVOLRLO,IVL       SELECT LOGIC ADDRLO
06435  0 06027              MOV    R6,LB
06436  6 07004              XMT    IVOLRHI,IVL       SELECT LOGIC ADDRHI
06437  0 05027              MOV    R5,LB
06440  6 00376              XMT    -2,AUX            *1 -, TO DEC COUNT
06441  6 04000     FILL02   XMT    0,R4              *2, LOOP*2, R4<- EOL/NULL LO
06442  6 07011              XMT    IVOLRDAT,IVL      *3
06443  0 03027              MOV    R3,LB             EOL/NULL HI -> LOGIC
06444  6 07000              XMT    IVOCTRL,IVL       *1 - SELECT CTRL
06445  6 27300              XMT    CTRLINCL,CTRLREG
06446  6 07011              XMT    IVOLRDAT,IVL      *1 - SELECT LOGIC WRITE
06447  1 01001              ADD    R1,R1             *2 - DEC COUNT
                            NOP                      *3 - WAIT
06450  0 00000     +        MOV    AUX,AUX
06451  0 04027              MOV    R4,LB             EOL/NULL LO
06452  6 07000              XMT    IVOCTRL,IVL       *1
06453  6 27300              XMT    CTRLINCL,CTRLREG  INC ADDR
06454  5 01041              NZT    R1,FILL02         *1 - LOOP ON COUNT
06455  7 07176              RTN
                            END    NULLFILL
06456                       PROC   INLOOP
                   *
                   * THIS PROCEDURE PERFORMS A MOVE OF DATA FOR THE INSERT COMMAND
                   * ON ENTRY, (R3,R4) = TOADDR
                   *           (R5,R6) = FROMADDR
                   *           R1 = COUNT
                   *
06456  5 01060     INLOOP00 NZT    R1,INLOOP01       IF R1 = 0, DO NOTHING
06457  7 06502              JMP    INLOOP04
06460  6 00377     INLOOP01 XMT    -1,AUX            SET AUX FOR DECREMENTING
06461  6 07004     INLOOP02 XMT    IVOLRHI,IVL       SELECT LOGIC ADDRHI
06462  0 05027              MOV    R5,LB             FROMADDR HI
06463  6 07003              XMT    IVOLRLO,IVL       LOGIC ADDRLO
06464  0 06027              MOV    R6,LB             FROMADDR LO
06465  1 06006              ADD    R6,R6             *1 - DEC ADDRLO (CAN'T UNDERFLOW)
06466  1 01001              ADD    R1,R1             *2 - DEC COUNT
                            NOP                      *3 - WAIT
06467  0 00000     +        MOV    AUX,AUX
06470  0 37002              MOV    RB,R2             READ DATA
06471  0 04027              MOV    R4,LB             TOADDR LO
06472  6 07004              XMT    IVOLRHI,IVL       SELECT LOGIC ADDRHI
06473  0 03027              MOV    R3,LB             SET TOADDR HI
06474  5 04076              NZT    R4,INLOOP03       *1 - CHECK IF R4 WILL UNDERFLOW
06475  1 03003              ADD    R3,R3             IF SO, DEC R3
06476  1 04004     INLOOP03 ADD    R4,R4             *2 - DEC TOADDR
06477  6 07011              XMT    IVOLRDAT,IVL      *3 - SELECT LOGIC WRITE
06500  0 02027              MOV    R2,LB             WRITE DATA
06501  5 01061              NZT    R1,INLOOP02       LOOP ON COUNT
06502  7 07176     INLOOP04 RTN    RETURN
                            END    INLOOP
06503                       PROC   UPDTLCHK
                   *
                   * THIS PROCEDURE UPDATES THE LOGIC CHECKSUM.
                   * ON ENTRY, AUX = VALUE TO ADD TO THE CHECKSUM
                   * R4 IS DESTROYED
                   *
06503  6 04000              XMT    SYSLRCHL,R4       LOGIC CHECKSUM LO
06504  6 07003              XMT    IVOLRLO,IVL       LOGIC ADDRLO
06505  0 04027              MOV    R4,LB
06506  6 04000              XMT    SYSLRCHH,R4       CHECKSUM ADDRHI
06507  6 07004              XMT    IVOLRHI,IVL       LOGIC ADDRHI
06510  0 04027              MOV    R4,LB
06511  6 07011              XMT    IVILRDAT+IVOLRDAT,IVL *1 - SELECT LOGIC READ/WRITE
                            NOP                      *2 - WAIT
06512  0 00000     +        MOV    AUX,AUX
                            NOP                      *3 - WAIT
06513  0 00000     +        MOV    AUX,AUX
06514  1 37027              ADD    RB,LB             DO THE UPDATE
06515  7 07176              RTN
                            END    UPDTLCHK
```

```
06516                         PROC    EOLCHECK
                      *
                      ***THIS SUBROUTINE CHECKS THAT (R5,R6) .LE. EOLADDR
                      *
                      *RETURNS:
                      *       TO CALLER IF NO ERROR
                      *       TO CMDERR IF ERROR
                      *       R2 IS DESTROYED
                      *
06516   6 17065               XMT     EOLHI,IVR          EOL ADDRHI
06517   6 07021               XMT     IVISPD+IVOSPD,IVL  *1 - DO SELECTS
06520   6 00377               XMT     -1,AUX
06521   3 37002               XOR     RB,R2              R2<- -EOLLOCHI-1
06522   6 00001               XMT     1,AUX
06523   1 02000               ADD     R2,AUX             AUX<- -EOLLOCHI
06524   1 05002               ADD     R5,R2
06525   6 00200               XMT     10000000B,AUX      CHECK IF R2 NEGATIVE
06526   2 02000               AND     R2,AUX
06527   5 00136               NZT     AUX,EOLCHK01       IF SO, OK
06530   5 02137               NZT     R2,EOLERR          IF R2 .NE. 0, ERROR
06531   6 17066               XMT     EOLLO,IVR          LOAD ADDRESS
06532   6 00377               XMT     -1,AUX
06533   3 37000               XOR     RB,AUX             AUX<- -EOLLOCLO - 1
06534   1 06002               ADD     R6,R2
06535   5 10137               NZT     OVF,EOLERR         IF OVF SET, ERROR
06536   7 07176       EOLCHK01 RTN                       ELSE, RETURN
06537   6 01005       EOLERR  XMT     ERRADI,R1
06540   7 04646               JMP     CMDERR
                              END     EOLCHECK
06541                         PROC    PROTECT
                      *
                      ****SUBROUTINE PROTECT
                      *
                      ***CHECKS FOR MEMORY PROTECT FAULTS
                      *
                      ***RETURNS:
                      *
                      *       TO CALLER IF MEMORY PROTECT CLEAR
                      *       TO CMDERR IF MEMORY PROTECT SET
                      *
                      ***REGISTER USAGE:
                      *
                      *       R1   - NOT USED
                      *       R2   - NOT USED
                      *       R3   - NOT USED
                      *       R4   - NOT USED
                      *       R5   - NOT USED
                      *       R6   - NOT USED
                      *       R11  - LINKAGE
                      *       AUX  - NOT USED
                      *
                      ***
06541   6 07040       PROTECT0 XMT    IVISTAT,IVL        SELECT PORT
06542   5 25104               NZT     STATMEMB,PROTECT1  BRANCH ON MEMORY PROTECT
06543   7 07176               RTN                        EXIT
                      *
06544   6 01013       PROTECT1 XMT    ERRMEM,R1          R1 <- ERROR FLAG
06545   7 04646               JMP     CMDERR             EXIT ON ERROR
                              END     PROTECT
06546                         PROC    PWROTATE
                      *
                      ***SUBROUTINE PWROTATE
                      *
                      ***ROTATES POWER OUTPUT AND STORE POWER BYTES
                      *
                      ***REGISTER USAGE:
                      *
                      *       R1  - PRESERVED
                      *       R2  - PRESERVED
                      *       R3  - POWER BYTE
                      *       R4  - COUNTER
                      *       R5  - SCRATCH
                      *       R6  - SCRATCH
                      *       R11 - LINKAGE
                      *       AUX - SCRATCH
                      *
                      ***
        006546        PWROT000 EQU    *
06546   4 04153               XEC     PWROTAB1-1(R4),8   SET UP MASK
06547   4 04163               XEC     PWROTAB2-1(R4),8   MASK AND ROTATE POWER
                      *
06550   6 17044               XMT     POWER,IVR          LOAD SPD ADDRESS
06551   6 07021               XMT     IVISPD+IVOSPD,IVL  *1 - SELECT SPD READ/WRITE
06552   5 37034               NZT     RB,PWROT010        BRANCH IF POWER FOR THIS NETWORK
06553   7 06603               JMP     PWROTX             ELSE, EXIT
                      *
                      ***TABLE 1 - SET UP MASK
                      *
06554   6 00377       PWROTAB1 XMT    11111111B,AUX      8 NODES PER COLUMN
06555   6 00376               XMT     11111110B,AUX      7 NODES PER COLUMN
06556   6 00374               XMT     11111100B,AUX      6 NODES PER COLUMN
06557   6 00370               XMT     11111000B,AUX      5 NODES PER COLUMN
06560   6 00360               XMT     11110000B,AUX      4 NODES PER COLUMN
06561   6 00340               XMT     11100000B,AUX      3 NODES PER COLUMN
06562   6 00300               XMT     11000000B,AUX      2 NODES PER COLUMN
06563   6 00200               XMT     10000000B,AUX      1 NODE  PER COLUMN
```

```
                         *
                         ***TABLE 2 - ROTATE AND MASK POWER
                         *
06564  2 03003   PWROTAB2 AND   R3,R3             8 NODES PER COLUMN
06565  2 03703            AND   R3(7),R3          7 NODES PER COLUMN
06566  2 03603            AND   R3(6),R3          6 NODES PER COLUMN
06567  2 03503            AND   R3(5),R3          5 NODES PER COLUMN
06570  2 03403            AND   R3(4),R3          4 NODES PER COLUMN
06571  2 03303            AND   R3(3),R3          3 NODES PER COLUMN
06572  2 03203            AND   R3(2),R3          2 NODES PER COLUMN
06573  2 03103            AND   R3(1),R3          1 NODE  PER COLUMN
                         *
06574  6 17060   PWROT010 XMT   POWERPTR,IVR      LOAD ADDRESS
06575  6 00001            XMT   1,AUX             *1 - AUX <- INCREMENT
06576  0 37005            MOV   RB,R5             R5 <- POINTER
06577  1 37037            ADD   RB,RB             UPDATE POINTER
                          NOP                     *1 - WAIT
06600  0 00000  +         MOV   AUX,AUX
06601  0 05017            MOV   R5,IVR            LOAD ADDRESS
06602  0 03037            MOV   R3,RB             WRITE POWER BYTE TO BUFFER
                         *
06603  6 04010   PWROTX   XMT   8,R4              INITIALIZE ROTATE COUNTER
06604  7 07176            RTN                     EXIT
                          END   PWROTATE
                         *
06605                     PROC    DIVIDE
                          IF ENHANCE
                         *
                         *     DIVIDE SUBROUTINE
                         *
                         *     REGISTER USE:
                         *     R1 - DIVIDEND ON ENTRY, REMAINDER/QUOTIENT ON EXIT
                         *     R2 - DIVIDEND ON ENTRY, QUOTIENT ON EXIT
                         *     R3 - DIVISOR
                         *     R4 - DIVISOR
                         *     R5 - SCRATCH
                         *     R6 - DIVIDEND ON ENTRY, REMAINDER ON EXIT
                         *     AUX - SCRATCH
                         *     R11 - SUBROUTINE LINKAGE
                         *
                         *     SCRATCH PAD USE: CALCNT, SAVER11
                         *
                         *     ON ENTRY:
                         *     DIVIDEND [R6,R1,R2]
                         *     DIVISOR [R3,R4]
                         *
                         *     ON EXIT:
                         *     REMAINDER IN [R6,R1(7-2)]
                         *     QUOTIENT IN [R1(1-0),R2]
                         *
                         *
                 DIVIDE00 WSP   SAVER11,R11       SAVE SUBROUTINE LINK
06605  6 07021  +         XMT   IVISPD+IVOSPD,IVL SELECT SPD READ/WRITE
06606  6 17031  +         XMT   SAVER11,IVR          LOAD ADDRESS
06607  0 11037  +         MOV   R11,RB              WRITE DATA
06610  0 06011            MOV   R6,R11            HI DIVIDEND => R11
06611  6 07021            XMT   IVOSPD+IVISPD,IVL SELECT SCRATCH PAD READ/WRITE
06612  6 00365            XMT   -11,AUX
06613  6 17010            XMT   CALCNT,IVR
06614  0 00037            MOV   AUX,RB            INIT COUNT
                         *
06615  0 03603            MOV   R3(6),R3          NORMALIZE DIVISOR
06616  6 00003            XMT   011B,AUX
06617  2 04600            AND   R4(6),AUX         [R3,R4] <= [R3,R4].ROTATED LEFT.2
06620  3 03003            XOR   R3,R3
06621  6 00374            XMT   11111100B,AUX
06622  2 04604            AND   R4(6),R4
                         *
06623  6 00377   DIVIDE10 XMT   -1,AUX            DIVISOR HOLD <= -DIVISOR
06624  3 04006            XOR   R4,R6
06625  3 03005            XOR   R3,R5
06626  6 00001            XMT   1,AUX
06627  1 06006            ADD   R6,R6
06630  0 10000            MOV   OVF,AUX
06631  1 05005            ADD   R5,R5
                         *
                         *
06632  6 00001   DIVIDE20 XMT   1,AUX             COUNT DOWN ON LOOP
06633  1 37000            ADD   RB,AUX
06634  5 00236            NZT   AUX,DIVIDE30
06635  7 06666            JMP   DIVIDE90          IF FINISHED LOOP, GOTO DIVIDE90
                         *
06636  0 00037   DIVIDE30 MOV   AUX,RB            ELSE, UPDATE COUNT
06637  0 11000            MOV   R11,AUX           MULTIPLY DIVIDEND BY 2
06640  1 11011            ADD   R11,R11
06641  0 01000            MOV   R1,AUX            [R11,R1,R2] <= [R11,R1,R2].ROTATE LEFT
06642  1 01001            ADD   R1,R1
06643  0 10000            MOV   OVF,AUX
06644  1 11011            ADD   R11,R11
06645  0 02000            MOV   R2,AUX
06646  1 02002            ADD   R2,R2
06647  0 10000            MOV   OVF,AUX
06650  1 01000            ADD   R1,AUX
                         *
06651  1 06001            ADD   R6,R1             COMPARE DIVIDEND TO DIVISOR HOLD
06652  0 10000            MOV   OVF,AUX
```

```
06653   1 05000               ADD    R5,AUX             [R11,R1] <= [R11,R1] + [R5,R6]
06654   1 11011               ADD    R11,R11
06655   6 00200               XMT    10000000B,AUX      CHECK SIGN OF RESULT
06656   2 11000               AND    R11,AUX
06657   5 00263               NZT    AUX,DIVIDE40       IF RESULT.LT.0 GOTO DIVIDE40
                    *
06660   6 00001               XMT    1,AUX              ELSE, CONTINUE
06661   1 02002               ADD    R2,R2              SET QUOTIENT BIT TO '1'
06662   7 06623               JMP    DIVIDE10           LOOP, SET DIVR HOLD = -DIVR
                    *
06663   0 03005     DIVIDE40  MOV    R3,R5              SET DIVR HOLD = DIVR
06664   0 04006               MOV    R4,R6              (QUOTIENT BIT = 0)
06665   7 06632               JMP    DIVIDE20           LOOP
                    *
                    *
06666   6 00200     DIVIDE90  XMT    10000000B,AUX      CHECK FOR NEGATIVE REMAINDER
06667   2 11000               AND    R11,AUX
06670   5 00276               NZT    AUX,DIVIDE95
                    *
06671   0 04000               MOV    R4,AUX             FIX REMAINDER
06672   1 01001               ADD    R1,R1              HI DIVIDEND = HI DIVIDEND + DIVISOR
06673   0 10000               MOV    OVF,AUX            [R11,R1] <= [R11,R1] + [R3,R4]
06674   1 03000               ADD    R3,AUX
06675   1 11011               ADD    R11,R11
                    *
06676   6 17031     DIVIDE95  XMT    SAVER11,IVR        GET SUBROUTINE LINK
06677   0 11006               MOV    R11,R6
06700   0 37011               MOV    RB,R11
                              ENDIF
06701   7 07176               RTN
                    *
                              END    DIVIDE
06702                         PROC   VALIDATE
                    *
                    *
                    ***VALIDATE NODE SUBROUTINE
                    *
                    *         REGISTER USE:
                    *         R1 = <ON ENTRY> FIRST BYTE OF NODE.
                    *              <ON EXIT> ENTRY VALUE,IF VALID.  -1 IF INVALID.
                    *         R2 = 2ND BYTE OF NODE
                    *         R3 = UNUSED
                    *         R4 = UNUSED
                    *         R5 = SCRATCH
                    *         R6 = SCRATCH
                    *         R11 = SUBROUTINE LINK
                    *         AUX = SCRATCH
                    *
                    *         SCRATCH PAD USE:  DIVDFLAG,SPDCONF2
                    *
                    *
                    *         NOTE:
                    *         IF NODE IS INVALID (EITHER NODE TYPE OR REFERENCE VALUE)
                    *         R1 IS SET TO '-1' ON EXIT.
                    *         IF NODETYPE '11111B' IS EXECUTED AS A VALID NODE,
                    *         THEN MODIFICATIONS MAY BE NEEDED (BECAUSE THE FIRST BYTE
                    *         OF THE NODE MAY POSSIBLY BE '-1')
                    *
                    *
06702   6 00037     VALID000  XMT    NODETYPM,AUX       VECTOR OFF NODE TYPE
06703   2 01200               AND    R1(2),AUX
06704   4 00305               XEC    VALIDTAB(AUX),32
                    *
                    *
06705   7 06745     VALIDTAB  JMP    VAL00000           START OF NETWORK
06706   7 06745               JMP    VAL01000           END OF LOGIC
06707   7 06754               JMP    VAL02000           END OF COLUMN
06710   7 06764               JMP    VAL03000           NORMALLY-OPEN RELAY
06711   7 06764               JMP    VAL04000           NORMALLY-CLOSED RELAY
06712   7 07006               JMP    VAL05000           POSITIVE-GOING TRANSITIONAL
06713   7 07006               JMP    VAL06000           NEGATIVE-GOING TRANSITIONAL
06714   7 07012               JMP    VAL07000           COIL
06715   7 07012               JMP    VAL08000           LATCHED COIL
06716   7 07012               JMP    VAL09000           DISABLED COIL
06717   7 07012               JMP    VAL10000           DISABLED LATCHED COIL
06720   7 06747               JMP    VAL11000           HORIZONTAL OPEN
06721   7 06747               JMP    VAL12000           HORIZONTAL CLOSED
06722   7 07021               JMP    VAL13000           PRESET/CALCULATE-B-NODE CONSTANT
06723   7 07036               JMP    VAL14000           PRESET/CALCULATE-B-NODE REGISTER
06724   7 07112               JMP    VAL15000           COUNTER
06725   7 07112               JMP    VAL16000           TIMER 1.00
06726   7 07112               JMP    VAL17000           TIMER 0.10
06727   7 07112               JMP    VAL18000           TIMER 0.01
06730   7 07121               JMP    VAL19000           CONVERT NODE
06731   7 07025               JMP    VAL20000           CALCULATE-C-NODE CONSTANT
06732   7 07133               JMP    VAL21000           CALCULATE-C-NODE REGISTER
06733   7 07154               JMP    VAL22000           CALCULATE - D NODE
06734   7 06745               JMP    VAL23000           NULL NODE
06735   7 07174               JMP    VAL24000           UNASSIGNED - ERROR
06736   7 07174               JMP    VAL25000           UNASSIGNED - ERROR
06737   7 07174               JMP    VAL26000           UNASSIGNED - ERROR
06740   7 07174               JMP    VAL27000           UNASSIGNED - ERROR
06741   7 07174               JMP    VAL28000           UNASSIGNED - ERROR
06742   7 07174               JMP    VAL29000           UNASSIGNED - ERROR
06743   7 07174               JMP    VAL30000           UNASSIGNED - ERROR
06744   7 07174               JMP    VAL31000           UNASSIGNED - ERROR
```

```
                 006745    VAL00000 EQU    *                  START OF NETWORK NODE
                 006745    VAL01000 EQU    *                  END OF LOGIC NODE
                 006745    VAL23000 EQU    *                  NULL NODE
                           *
        06745  6 00203              XMT    10000011B,AUX      R1(7,1-0) AND R2 MUST BE .EQ. 0
        06746  7 06750              JMP    VAL11010
                           *
                 006747    VAL11000 EQU    *                  HORIZONTAL OPEN NODE
                 006747    VAL12000 EQU    *                  HORIZONTAL CLOSED NODE
                           *                                  REFERENCE MUST BE '0'
        06747  6 00003              XMT    011B,AUX           CHECK R1 (1-0)
        06750  2 01000     VAL11010 AND    R1,AUX
        06751  5 00363              NZT    AUX,VAL02500       INVALID EXIT
        06752  5 02363              NZT    R2,VAL02500        CHECK R2
        06753  7 07175              JMP    VALIDOK            VALID EXIT
                           *
                           *
        06754  6 00203     VAL02000 XMT    10000011B,AUX      END OF CLOUMD NODE
        06755  2 01000              AND    R1,AUX             R1(7,1-0) AND R2 (0) MUST BE '0'
        06756  5 00363              NZT    AUX,VAL02500
        06757  6 00001              XMT    01B,AUX
        06760  2 02000              AND    R2,AUX
        06761  5 00363              NZT    AUX,VAL02500
        06762  7 07175              JMP    VALIDOK            VALID EXIT
                           *
        06763  7 07174     VAL02500 JMP    VALIDERR
                           *
                           *
                           *
                 006764    VAL03000 EQU    *                  NORMALLY OPEN NODE
                 006764    VAL04000 EQU    *                  NORMALLY CLOSED NODE
        06764  6 00003              XMT    011B,AUX
        06765  2 01005              AND    R1,R5              REFERENCE TYPE => R5
        06766  3 05005              XOR    R5,R5              CHECK FOR SEQUENCER REFERENCE
        06767  5 05371              NZT    R5,VAL03010
        06770  7 07175              JMP    VALIDOK            SEQUENCER REF, ANY R2 VALUE VALID
                           *
        06771  0 02006     VAL03010 MOV    R2,R6              SETUP FOR GENERAL COIL RAM VALIDATE
        06772  6 17277     VAL03020 XMT    SPDCONF2,IVR       GET CONFIGURATION FOR COIL RAM
        06773  6 07021              XMT    IVOSPD+IVISPD,IVL  SELECT SCRATCH PAD READ/WRITE
        06774  0 33305              MOV    34H,3,R5           READ COIL CONFIG
        06775  4 05001              XEC    VAL03TAB(R5),5     GET MAX VALUE
        06776  1 06006              ADD    R6,R6
        06777  5 10174              NZT    OVF,VALIDERR       REFERENCE IS INVALID
        07000  7 07175              JMP    VALIDOK
                           *
        07001  6 00000     VAL03TAB XMT    0,AUX              256 COILS
        07002  6 00300              XMT    -64,AUX            64 COILS
        07003  6 00200              XMT    -128,AUX           128 COILS
        07004  6 00377              XMT    -1,AUX             INVALID
        07005  6 00100              XMT    -192,AUX           192 COILS
                           *
                           *
                           *        TRANSITIONAL NODES, VALIDATE IF ENHANCED SET.
                                    IF     ENHANCE
                 007006    VAL05000 EQU    *                  POSITIVE TRANSITIONAL NODE
                 007006    VAL06000 EQU    *                  NEGATIVE TRANSITIONAL NODE
        07006  2 01005              AND    R1,R5
        07007  3 05005              XOR    R5,R5
        07010  5 05371              NZT    R5,VAL03010        NOT SEQ REF, VALIDATE R2
        07011  7 07174              JMP    VALIDERR           SEQ REF, INVALID
                           *
                                    ENDIF
                           *        END OF TRANSITIONAL NODES VALIDATION
                           *
                           *
                 007012    VAL07000 EQU    *                  COIL
                 007012    VAL08000 EQU    *                  LATCHED COIL
                 007012    VAL09000 EQU    *                  DISABLED COIL
                 007012    VAL10000 EQU    *                  DISAVBLED LATCHED COIL
        07012  6 00003              XMT    011B,AUX
        07013  2 01005              AND    R1,R5              REF TYPE CAN BE ONLY OUTPUT AND
        07014  4 05015              XEC    VAL07TAB(R5),4     INTERNAL COILS
                           *
        07015  7 07174     VAL07TAB JMP    VALIDERR           INPUT REF - INVALID
        07016  7 06771              JMP    VAL03010           OUTPUT COIL - VALIDATE R2
        07017  7 06771              JMP    VAL03010           INTERNAL COIL - VALIDATE R2
        07020  7 07174              JMP    VALIDERR           SEQ REF - INVALID
                           **
                           *
                 007021    VAL13000 EQU    *                  TIMER/COUNTR PRESET CONSTANT NODE
                           *                                  AND CALCULATE-B-NODE IF ENHANCED SET.
                                    IF     ENHANCE
                           *                                  ON ENHANCED SET, SET DIVIDEND 'OK' FLAG
                                    CLR    AUX                TIMER/COUNTR PRESET-CALC B NODE CONSTANT
        07021  6 00000     +        XMT    0,AUX
                                    WSP    DIVDFLAG,AUX       SET DIVIDEND 'OK' FLAG
        07022  6 07021     +        XMT    IVISPD+IVOSPD,IVL  SELECT SPD READ/WRITE
        07023  6 17014     +        XMT    DIVDFLAG,IVR               LOAD ADDRESS
        07024  0 00037     +        MOV    AUX,R8                     WRITE DATA
                 007025    VAL20000 EQU    *                  CALC C NODE CONSTANT NODE
                           *        END OF CONDITIONAL ASSEMBLY AREA
                                    ENDIF
        07025  6 00003              XMT    011B,AUX
        07026  2 01005              AND    R1,R5              CONSTANT MUST BE .LT.1000
        07027  6 00030              XMT    NEG1000L,AUX
```

```
07030   1 02000             ADD    R2,AUX
07031   6 00377             XMT    NEG1000H,AUX
07032   1 10000             ADD    OVF,AUX
07033   1 05000             ADD    R5,AUX
07034   5 10174             NZT    OVF,VALIDERR       CONSTANT.GE.1000, INVALID
07035   7 07175             JMP    VALIDOK            CONSTANT.LT.1000, VALID
                    *
                    *
07036   6 00003   VAL14000 XMT     011B,AUX           VECTOR TO REG TYPE
07037   2 01000             AND    R1,AUX
07040   4 00041             XEC    VAL14TAB(AUX),4
                    *
07041   7 07045   VAL14TAB JMP     VAL14100           HOLDING REGS
07042   7 07070             JMP    VAL14200           INPUT REGS
07043   7 07077             JMP    VAL14300           DUMMY REGS
07044   7 07174             JMP    VALIDERR           INVALID
                    *
                            IF     ENHANCE-1
                            ENDIF
                            IF ENHANCE
                    *                                 ENHANCED SET, VALIDATE HOLDING REG,
                    *                                 THEN SET DIVIDEND 'OK' FLAG.
07045   6 17277   VAL14100 XMT     SPDCONF2,IVR       GET SYSTEM CONFIGURATION
07046   0 02006             MOV    R2,R6
07047   6 07021             XMT    IVOSPD+IVISPD,IVL
07050   0 33305             MOV    34H,3,R5
                    *
07051   4 05063             XEC    VAL141TB(R5),5     GET VALIDATE VALUE
07052   1 06000             ADD    R6,AUX
07053   5 10174             NZT    OVF,VALIDERR       INVALID
                    *
                    *                                 REGISTER IS VALID,
                    *                                 CHECK REF AND SET
                    *                                 DIVIDEND OK FLAG
07054   6 00001             XMT    1,AUX
07055   1 06006             ADD    R6,R6
07056   5 10105             NZT    OVF,VAL14BAD       DIVIDEND BAD
07057   4 05063             XEC    VAL141TB(R5),5
07060   1 06000             ADD    R6,AUX
07061   5 10105             NZT    OVF,VAL14BAD       DIVIDEND BAD
07062   7 07100             JMP    VAL14OK            DIVIDEND GOOD
                    *
07063   6 00002   VAL141TB XMT     2,AUX              256 REGS
07064   6 00302             XMT    -62,AUX            62 REGS
07065   6 00202             XMT    -126,AUX           126 REGS
07066   6 00377             XMT    -1,AUX             INVALID
07067   6 00102             XMT    -190,AUX           190 REGS
                    *
                    *                                 END OF ENHANCED SET HOLDING REG VALIDATION
                            ENDIF
                    *
07070   6 00160   VAL14200 XMT     1110000B,AUX       VALIDATE INPUT REG REF
07071   2 02000             AND    R2,AUX
07072   5 00174             NZT    AUX,VALIDERR       REF > 32, ERROR
                            IF     ENHANCE-1
                            ENDIF
                            IF     ENHANCE
                    *                                 ENHANCED SET B NODE INPUT REG VALIDATION
                    *                                 MUST TEST FOR VALID DIVIDEND
07073   6 00341             XMT    -31,AUX            CHECK DIVIDEND
07074   1 02000             ADD    R2,AUX
07075   5 10105             NZT    OVF,VAL14BAD       DIVIDEND BAD
07076   7 07100             JMP    VAL14OK            DIVIDEND OK
                    *                                 END OF B NODE INPUT REG ENHANCED VALIDATION
                            ENDIF
                    *
                    *
07077   5 02174   VAL14300 NZT     R2,VALIDERR        DUMMY REG, R2 MUST BE 0
                    *
                    *
                            IF     ENHANCE
                    *                                 ENHANCED SET B NODE REGISTER VALIDATION
                    *                                 SET DIVIDEND 'OK' FLAG.
                  VAL14OK  CLR     R5
07100   6 05000   +         XMT    0,R5
                            WSP    DIVDFLAG,R5        SET DIVIDEND 'OK' FLAG
07101   6 07021   +         XMT    IVISPD+IVOSPD,IVL  SELECT SPD READ/WRITE
07102   6 17014   +         XMT    DIVDFLAG,IVR          LOAD ADDRESS
07103   0 05037   +         MOV    R5,RB               WRITE DATA
07104   7 07175             JMP    VALIDOK
                    *
07105   6 05377   VAL14BAD XMT     -1,R5
                            WSP    DIVDFLAG,R5        SPOIL DIVIDEND 'OK' FLAG
07106   6 07021   +         XMT    IVISPD+IVOSPD,IVL  SELECT SPD READ/WRITE
07107   6 17014   +         XMT    DIVDFLAG,IVR          LOAD ADDRESS
07110   0 05037   +         MOV    R5,RB               WRITE DATA
07111   7 07175             JMP    VALIDOK
                    *                                 END OF ENHANCED SET B NODE REG VALIDATION
                            ENDIF
                    *
        007112    VAL15000 EQU     *                  COUNTER
        007112    VAL16000 EQU     *                  TIMER 1.00
        007112    VAL17000 EQU     *                  TIMER 0.10
        007112    VAL18000 EQU     *                  TIMER 0.01
07112   6 00003             XMT    011B,AUX
07113   2 01000             AND    R1,AUX
```

```
07114  4 00115            XEC     VAL15TAB(AUX),4    BRANCH TO REFERENCE VALIDATION
                   *
                          IF      ENHANCE-1
                          ENDIF
                          IF      ENHANCE
                   *                                 ENHANCED SET VECTOR TABLE FOR TIMER/COUNTER
                   *                                 REFERENCE TYPE.
07115  7 07142   VAL15TAB JMP     VAL21100           HOLDING REG
07116  7 07174            JMP     VALIDERR           INPUT REG - INVALID
07117  7 07152            JMP     VAL21300           DUMMY REG
07120  7 07174            JMP     VALIDERR           INVALID
                   *                                 END OF ENHANCED SET VECTOR TABLE FOR TIMER/
                   *                                 COUNTER REFERENCE TYPE
                          ENDIF
                          IF      ENHANCE
                   *                                 ENHANCED SET FUNCTIONS.
                   *                                 CONVERT NODES, CALC NODES.
                   *
                   *
07121  6 00001   VAL19000 XMT     1,AUX              CONVERT NODE
07122  1 02000            ADD     R2,AUX             CHECK FOR DUMMY REG
07123  5 10175            NZT     OVF,VALIDOK        DUMMY REF, VALID
                   *
07124  2 01000            AND     R1,AUX             GET REF TYPE, REGOR DISCRETE
07125  4 00131            XEC     VAL19TAB(AUX),2    GET OFFSET
07126  1 02006            ADD     R2,R6              ADD OFFSET TO REF
07127  5 10174            NZT     OVF,VALIDERR
07130  7 06772            JMP     VAL03020           COMPLETE VALIDATION
                   *
07131  6 00014   VAL19TAB XMT     12,AUX             DISCRETE OFFSET
07132  6 00002            XMT     2,AUX              REGISTER OFFSET
                   *
07133  6 00003   VAL21000 XMT     011B,AUX           C NODE REGISTER
07134  2 01000            AND     R1,AUX
07135  4 00136            XEC     VAL21TAB(AUX),4    VECTOR TO REF VALIDATION
                   *
07136  7 07142   VAL21TAB JMP     VAL21100           HOLDING REG REF
07137  7 07146            JMP     VAL21200           INPUT REG REF
07140  7 07152            JMP     VAL21300           DUMMY REG REF
07141  7 07174            JMP     VALIDERR           INVALID
                   *
07142  6 00002   VAL21100 XMT     2,AUX              ADD OFFSET TO REF
07143  1 02006            ADD     R2,R6
07144  5 10174            NZT     OVF,VALIDERR       REF.GT.254, INVALID
07145  7 06772            JMP     VAL03020
                   *
07146  6 00340   VAL21200 XMT     11100000B,AUX      INPUT REG REF
07147  2 02000            AND     R2,AUX             MUST BE .LT.32
07150  5 00174            NZT     AUX,VALIDERR
07151  7 07175            JMP     VALIDOK
                   *
07152  5 02174   VAL21300 NZT     R2,VALIDERR        DUMMY REF, R2.MUST.BE 0
07153  7 07175            JMP     VALIDOK
                   *
                   *
                   *
07154  6 00003   VAL22000 XMT     011B,AUX           CALCULATE NODES
07155  2 01000            AND     R1,AUX             VECTOR TO HANDLER
07156  4 00157            XEC     VAL22TAB(AUX),5
                   *
07157  7 07142   VAL22TAB JMP     VAL21100           CALC-ADD
07160  7 07142            JMP     VAL21100           CALC-SUB
07161  7 07163            JMP     VAL22100           CALC-MPX
07162  7 07167            JMP     VAL22200           CALC-DIV
                   *
07163  6 00003   VAL22100 XMT     3,AUX              GET OFFSET FOR REF #
07164  1 02006            ADD     R2,R6
07165  5 10174            NZT     OVF,VALIDERR
07166  7 06772            JMP     VAL03020
                   *
                 VAL22200 RSP     DIVDFLAG,AUX       CHECK IF DIVIDEND IS OK
07167  6 17014   +        XMT     DIVDFLAG,IVR          LOAD ADDRESS
07170  6 07021   +        XMT     IVISPD+IVOSPD,IVL  *1 - SELECT SPD READ
07171  0 37000   +        MOV     RB,AUX               READ DATA
07172  5 00174            NZT     AUX,VALIDERR
07173  7 07142            JMP     VAL21100           VALIDATE HOLDNG REG
                   *
                   **                                END OF ENHANCED SET AREA FOR
                   *                                 CONVERT AND CALCULATE NODES.
                          ENDIF
                   *
                          IF      ENHANCE-1
                          FNDIF
                   *
                   *
         007174  VAL24000 EQU     *                  UNASSIGNED NODE TYPES
         007174  VAL25000 EQU     *
         007174  VAL26000 EQU     *
         007174  VAL27000 EQU     *
         007174  VAL28000 EQU     *
         007174  VAL29000 EQU     *
         007174  VAL30000 EQU     *
         007174  VAL31000 EQU     *
                 *
                 *
                 ***INVALID NODE EXIT
                 *
```

```
07174   6 01377     VALIDERR XMT    -1,R1              SET ERROR INDICATOR
                    *
                    *
                    ***COMMON EXIT
07175   7 07176     VALIDOK  RTN
                    *
                             END    VALIDATE
                             END    MAIN


   RETURN TABLE
     07176  4 11177
     07177  7 00122
     07200  7 00127
     07201  7 00133
     07202  7 00150
     07203  7 00153
     07204  7 00255
     07205  7 00432
     07206  7 00506
     07207  7 00610
     07210  7 00617
     07211  7 00626
     07212  7 00644
     07213  7 00663
     07214  7 00775
     07215  7 01044
     07216  7 01150
     07217  7 01204
     07220  7 01251
     07221  7 01375
     07222  7 01414
     07223  7 01474
     07224  7 01505
     07225  7 02047
     07226  7 02057
     07227  7 02101
     07230  7 02203
     07231  7 02213
     07232  7 02375
     07233  7 02430
     07234  7 02440
     07235  7 02575
     07236  7 02612
     07237  7 02654
     07240  7 02662
     07241  7 02673
     07242  7 02730
     07243  7 03070
     07244  7 03072
     07245  7 03075
     07246  7 03167
     07247  7 03236
     07250  7 03247
     07251  7 03333
     07252  7 03364
     07253  7 03521
     07254  7 03564
     07255  7 03627
     07256  7 03704
     07257  7 03770
     07260  7 03772
     07261  7 04032
     07262  7 04042
     07263  7 04062
     07264  7 04101
     07265  7 04111
     07266  7 04123
     07267  7 04246
     07270  7 04262
     07271  7 04303
     07272  7 04333
     07273  7 04364
     07274  7 04374
     07275  7 04376
     07276  7 04405
     07277  7 04407
     07300  7 04421
     07301  7 04424
     07302  7 04427
     07303  7 04432
     07304  7 04441
     07305  7 04444
     07306  7 04446
     07307  7 04521
     07310  7 04552
     07311  7 04576
     07312  7 04603
     07313  7 04632
     07314  7 04641
     07315  7 04717
     07316  7 04734
     07317  7 05067
     07320  7 05076
     07321  7 05161
```

```
07322  7 05200
07323  7 05260
07324  7 05312
07325  7 05324
07326  7 05342
07327  7 05363
07330  7 05373
07331  7 06231
07332  7 06234
07333  7 06236
07334  7 06273
07335  7 06313
07336  7 06373
07337  7 06375
07340  7 06422

TOTAL ASSEMBLY ERRORS =   10
                          JOB     P180 : 001 : MOD 01 : REV AX23

  **********************************************
  NOTE!  EQUATES  FOR  REVISION  LEVEL
  FOR  DEVELOPMENT  AND  RELEASE;  PLEASE

                 / THESE EQUATES DEFINE THE DEVELOPMENT AND RELEASE
                 / DISPLAY OF THE REVISION WHEN THE P180 IS
                 / INITIALIZED.

                 /        'MAJREV' IS THE MAJOR REVISION, A,B,C, ETC
         0041    MAJREV="A

                 /        'DVR1-3' DEFINE THE DEVELOPMENT REVISIONS.
                 /        THESE MUST BE UPDATED
                 /         DURING DEVELOPMENT FOR EACH EDIT!
                 /        THESE MUST BE SET TO "SPACE"
                 /         ON EACH EQUATE WHEN RELEASED!
         0058    DVR1="X
         0032    DVR2="2
         0033    DVR3="3

  **********************************************
                 /
                 /
                 /        COPYRIGHT, (C) 1978, GOULD-MODICON DIV., ALL
                 /        RIGHTS RESERVED.  NO PART OF THIS PROGRAM
                 /        MAY BE REPRODUCED IN ANY FORM WITHOUT THE
                 /        EXPRESS WRITTEN PERMISSION OF GOULD-MODICON DIV.
                 /
                 /
                 /
                          EJECT

                          SUBJOB GLOBAL DEFINITIONS
                 /
                 /***I/O ADDRESSES
                 /
         0020    DMA0AD=:20               / DMA CHN 0 - ADDRESS
                 /DMA0TC=:21              / DMA CHN 0 - TERM COUNT
                 /DMA1AD=:22              / DMA CHN 1 - ADDRESS
                 /DMA1TC=:23              / DMA CHN 1 - TERM COUNT
         0024    DMA2AD=:24               / DMA CHN 2 - ADDRESS
         0025    DMA2TC=:25               / DMA CHN 2 - TERM COUNT
         0026    DMA3AD=:26               / DMA CHN 3 - ADDRESS
         0027    DMA3TC=:27               / DMA CHN 3 - TERM COUNT
                 /DMASTA=:28              / DMA STATUS REGISTER (IN)
         0028    DMAMOD=:28               / DMA MODE REGISTER (OUT)
                 /
         0038    CRTSTA=:38               / CRT STATUS REGISTER (IN)
         0038    CRTCTL=:38               / CRT CONTROL REG (OUT)
         0039    CRTDAT=:39               / CRT DATA REGISTER
         003A    SP1STA=:3A               / PORT #1 - STATUS (IN)
         003A    SP1CTL=:3A               / PORT #1 - CONTROL (OUT)
         003B    SP1IN=:3B                / PORT #1 - DATA IN
         003B    SP1OUT=:3B               / PORT #1 - DATA OUT
         003C    SP2STA=:3C               / PORT #2 - STATUS (IN)
         003C    SP2CTL=:3C               / PORT #2 - CONTROL (OUT
         003D    SP2IN=:3D                / PORT #2 - DATA IN
         003D    SP2OUT=:3D               / PORT #2 - DATA OUT
         003E    PARIN=:3E                / PARALLEL INPUT PORT
         003E    PAROUT=:3E               / PARALLEL OUTPUT PORT
                 /IOTEST=:3F              / SPARE (TEST I/O)
                          EJECT
```

```
                /
                /***PARALLEL PORT DEFINITIONS
                /
                /***PAROUT
                /
0080            POPWR=:80                       / CRT DISPLAY POWER
0040            POBEEP=:40                      / BEEPER
                /PORENB=:20                     / PORT 2 RCVR - INT ENB
                /POTENB=:10                     / PORT 2 XMIT - INT ENB
                /POSEL=:08                      / KEYBOARD/PORT 2
                /POCODE=:07                     / OUTPUT CODE
                /
                /***POCODE VALUES, POSEL = 0 (KEYBOARD)
                /
                /POROW0=:00                     / KEYBOARD ROW 0
                /POROW1=:01                     / KEYBOARD ROW 1
                /POROW2=:02                     / KEYBOARD ROW 2
                /POROW3=:03                     / KEYBOARD ROW 3
                /POROW4=:04                     / KEYBOARD ROW 4
                /POROW5=:05                     / KEYBOARD ROW 5
                /POROW6=:06                     / KEYBOARD ROW 6
                /POROW7=:07                     / KEYBOARD ROW 7
                /
                /***POCODE VALUES, POSEL = 1 (SERIAL PORT #2 CONTROLS)
                /
0000            POPENB=:00                      / PARITY ENABLE
0001            POPEVN=:01                      / EVEN PARITY
0002            PO2STP=:02                      / TWO STOP BITS
                /       :03                     / NOT USED
                /       :04                     / NOT USED
                /       :05                     / NOT USED
                /       :06                     / NOT USED
                /       :07                     / NOT USED
                /
                /***PARIN
                /
                /***POSEL = 1 (SERIAL PORT TWO STATUS)
                /
0080            PISTAT=:80
                        EJECT

                /
                /***KEYBOARD DATA
                /
                /KBDROW=:08                     / NUMBER OF ROWS
                /KBDCNT=:07                     / CHARACTERS PER ROW
                /KBDMSK=:01                     / STARTING MASK
                        EJECT

                /
                /***CRT CONTROLLER DEFINITIONS
                /
                /****COMMANDS
                /
0000            CMDRST=:00                      / RESET AND STOP DISPLAY
0020            CMDST=:20                       / START DISPLAY
                /CMPSTP=:40                     / STOP DISPLAY
                /CMDRLP=:60                     / READ LIGHT PEN POSITIC
0080            CMDCUR=:80                      / LOAD CURSOR POSITION
                /CMDEI=:A0                      / ENABLE INTERRUPT
                /CMDDI=:C0                      / DISABLE INTERRUPT
00E0            CMDPRE=:E0                      / PRESET COUNTERS
                /
                /****SCREEN COMPOSITION BYTES
                /
0043            COMPB1=:43                      / VERTICALLY SPACED ROWS
                                                / 68 CHARS PER ROW
0014            COMPB2=:14                      / CHARACTER ROWS
                                                / ROWS PER SCREEN
007B            COMPB3=:7B                      / UNDERLINE ROW POSITION
                                                / LINES PER ROW
0036            COMPB4=:36                      / CURSOR FORMAT
                                                / 14 CHARS PER HOZ RETRA
                /
                /****CRT STATUS PORT DEFINITIONS
                /
                /       :80                     / NOT USED
```

```
         /CRTSIE=.40                      / INTERRUPT ENABLED
0020     CRTSIR=.20                       / INTERRUPT REQUEST
         /CRTSLP=.10                      / LIGHT PEN ACTIVE
         /CRTSCI=.08                      / COMMAND INCOMPLETE
0004     CRTSVE=.04                       / VIDEO ENABLED
         /CRTSDU=.02                      / DMA UNDERFLOW
         /CRTSSO=.01                      / STACK OVERFLOW
         /
         /****CURSOR DEFINITION - DISABLED
         /
0000     CURVER=.00                       / VERTICAL
007F     CURHOZ=.7F                       / HORIZONTAL
         /
         /****BURST MODE
         /
000B     BURST=.0B                        /
                 EJECT
         /
         /****DMA CONTROLLER DEFINITIONS
         /
         /DMAVER=.00                      / DMA VERIFY
         /DMAWRT=.40                      / DMA WRITE
0080     DMARED=.80                       / DMA READ
         /
0080     DMAMAL=.80                       / ENABLE AUTO-LOAD
         /DMAMTC=.40                      / ENABLE TC STOP
         /DMAMEW=.20                      / ENABLE EXTENDED WRITE
         /DMAMRP=.10                      / ENABLE ROTATING PRIORITY
0008     DMAME3=.08                       / ENABLE DMA CHANNEL 3
0004     DMAME2=.04                       / ENABLE DMA CHANNEL 2
         /DMAME1=.02                      / ENABLE DMA CHANNEL 1
         /DMAME0=.01                      / ENABLE DMA CHANNEL 0
         /
008C     DMACMD= DMAMAL+DMAME3+DMAME2     / DMA COMMAND
                 EJECT
         /
         /****SERIAL PORT DEFINITIONS
         /
         /****STATUS REGISTER
         /
0080     SPSDSR=.80                       / DATA SET READY
0040     SPSSYN=.40                       / SYNC DETECT
0020     SPSFE=.20                        / FRAMING ERROR
0010     SPSOE=.10                        / OVERRUN ERROR
0008     SPSPE=.08                        / PARITY ERROR
0004     SPSTE=.04                        / TRANSMITTER EMPTY
0002     SPSRRY=.02                       / RECEIVER READY
0001     SPSTRY=.01                       / TRANSMITTER READY
         /
         /****COMMAND DEFINITION
         /
0080     SPCEH=.80                        / ENTER HUNT MODE
0040     SPCIR=.40                        / INTERNAL RESET
0020     SPCRTS=.20                       / REQUEST TO SEND
0010     SPCER=.10                        / RESET ERROR FLAGS
0008     SPCBRK=.08                       / SEND BREAK CHARACTER
0004     SPCRE=.04                        / RECEIVER ENABLED
0002     SPCDTR=.02                       / DATA TERMINAL READY
0001     SPCTE=.01                        / TRANSMIT ENABLE
         /
         /****MODE DEFINITION - ASYNCH MODE
         /
00C0     SPMSTP=.C0                       / 2 STOP BITS
0020     SPMEVN=.20                       / EVEN PARITY
0010     SPMPAR=.10                       / PARITY ENABLED
000C     SPMLEN=.0C                       / 8-BIT CHARACTERS
0002     SPMBRF=.02                       / BAUD RATE X 16
         /
         /***COMMAND DEFINITIONS
         /
00FE     PPMODE=SPMSTP+SPMEVN+SPMPAR+SPMLEN+SPMBRF
0079     P2MODE=.79      / 1 STOP BIT, EVEN PARITY, 7 DATA BITS
         /
0025     PPCMD=SPCRTS+SPCRE+SPCTE         / ENABLE RECEIVER, TRANS
```

```
                 /                                 / MITTER, AND RECEIVER
                 /                                 / INTERRUPT
0081             PFNULL=SFCEH+SFCTE                / NULL COMMAND
                         EJECT

                 /
                 /***NODE TYPES
                 /
0000             NOSON=00                          / START OF NETWORK
0001             NOEOL=01                          / END OF LOGIC
0002             NOEOC=02                          / END OF COLUMN
0003             NOOREL=03                         / NORMALLY OPEN RELAY
0004             NOCREL=04                         / NORMALLY CLOSED RELAY
0005             NOPOST=05                         / POSITIVE TRANSITIONAL
0006             NONEGT=06                         / NEGATIVE TRANSITIONAL
0007             NOCOIL=07                         / COIL
0008             NOLATC=10                         / LATCH
0009             NODCOL=11                         / DISABLED COIL
000A             NODLAT=12                         / DISABLED LATCH
000B             NOHOZO=13                         / HORIZONTAL OPEN
000C             NOHOZS=14                         / HORIZONTAL SHORT
000D             NOCPRE=15                         / CONSTANT PRESET/B-NODE
000E             NORPRE=16                         / REGISTER PRESET/B-NODE
000F             NOCTR=17                          / COUNTER
0010             NOT100=20                         / TIMER 1.00 SECS
0011             NOT010=21                         / TIMER 0.10 SECS
0012             NOT001=22                         / TIMER 0.01 SECS
0013             NOCON=23                          / CONVERT
0014             NOCCON=24                         / C-NODE CONSTANT
0015             NOCREG=25                         / C-NODE REGISTER
0016             NOCALC=26                         / CALCULATE
0017             NONULL=27                         / NULL NODE
                 /        30                       / NOT USED
                 /        31                       / NOT USED
                 /        32                       / NOT USED
                 /        33                       / NOT USED
                 /        34                       / NOT USED
                 /        35                       / NOT USED
                 /        36                       / NOT USED
                 /        37                       / NOT USED
                          EJECT

                          SUBJOB  MEMORY SPACE DEFINITION
                 /
                 /***MEMORY SPACE DEFINITION
                 /
0000             ROMLO=:0000                       / START OF ROM
37FF             ROMHI=:37FF                       / END OF ROM
000E             NUM1K=ROMHI+1-ROMLO%@1024         / # OF 1K AREAS
                 /
F800             RAMLO=:F800                       / START OF RAM
FFFF             RAMHI=:FFFF                       / END OF RAM
                 /
3800             ROMSIZ=ROMHI-ROMLO+1              / ROM SIZE
0800             RAMSIZ=RAMHI-RAMLO+1              / RAM SIZE
                          EJECT

                          SUBJOB  DIAGNOSTIC INTERRUPT VECTOR
                 /
                 /***DIAGNOSTIC INTERRUPT VECTOR
                 /
                 /***LOADED DURING POWER-UP WITH A RET
                 / INSTRUCTION ('C9')
                 /
                 /***DIAGNOSTIC WILL LOAD A JUMP TO ITS INTERRUPT
                 /***HANDLER.
                 /
F800             INTVEC=RAMLO                      / INTERRUPT VECTOR, 3 BYTES
                 /
                 /***THE NEXT LOCATION IS RESERVED FOR DIAGNOSTICS ALSO.
                 /
0004             INTVCL=4                          / NUMBER OF RESERVED BYTES
```

```
                / THE INDEPENDENT ON-BOARD DIAGNOSTIC SYSTEM
                / IS JUMPED-TO @ POWER UP TIME IF THE STAR-
                / LINK CASSETTE MACHINE IS CONNECTED. THE
                / JUMP ADDRESS IS.

3300            PDIA=:3300
                        EJECT

                        SUBJOB  REFRESH MEMORY ALLOCATION
                /
                /***CRT REFRESH
                /
                /***FORMAT.
                /
                /       ROW  0 - PAD ROW (50 HZ)
                /       ROW  1 - PAD ROW
                /       ROW  2 - DISPLAY LOGIC ROW
                /       ROW  3 - DISPLAY LOGIC ROW
                /       ROW  4 - DISPLAY LOGIC ROW
                /       ROW  5 - DISPLAY LOGIC ROW
                /       ROW  6 - DISPLAY LOGIC ROW
                /       ROW  7 - DISPLAY LOGIC ROW
                /       ROW  8 - DISPLAY LOGIC ROW
                /       ROW  9 - DISPLAY LOGIC ROW
                /       ROW 10 - DISPLAY LOGIC ROW
                /       ROW 11 - DISPLAY LOGIC ROW
                /       ROW 12 - DISPLAY LOGIC ROW
                /       ROW 13 - DISPLAY LOGIC ROW
                /       ROW 14 - DISPLAY LOGIC ROW
                /       ROW 15 - DISPLAY LOGIC ROW
                /       ROW 16 - DISPLAY LOGIC ROW
                /       ROW 17 - DISPLAY LOGIC ROW
                /       ROW 18 - SEPARATION ROW
                /       ROW 19 - ASSEMBLY/STATUS ROW 1
                /       ROW 20 - ASSEMBLY/STATUS ROW 2
                /       ROW 21 - PAD ROW
                /       ROW 22 - PAD ROW (50 HZ)
                /
                        EJECT

                /
                /***REFRESH MEMORY ALLOCATION
                /
                /***ROW TYPES
                /
0002            ROWA=:02                          / END-OF-ROW + PAD
0050            ROWB=:50                          / LOGIC ROW
0045            ROWC=:45                          / SEPARATION ROW
004D            ROWD=:4D                          / ASM/STATUS - ROW 1
004E            ROWE=:4E                          / ASM/STATUS - ROW 2
                /
F804            CRTRFH=INTVEC+INTVCL              / START OF REFRESH
                /
                                                  / FULL DATA AREA
0544            CRTTMP=16!ROWB+ROWC+ROWD+ROWE+ROWA+ROWA
                /
F804            CRT50S=CRTRFH                     / START OF 50HZ DISPLAY
                /
F806            CRT60S=CRTRFH+ROWA                / START OF 60HZ DISPLAY
                /
FD4E            CRT50E=CRT60S+CRTTMP+ROWA+ROWA    / END OF 50HZ DISPLAY
                /
FD4C            CRT60E=CRT60S+CRTTMP+ROWA         / END OF 60HZ DISPLAY
                /
FD4E            CRTRFX=CRT50E                     / END-OF-REFRESH
                /
                /***SPECIAL DMA CHARACTERS
                /
000E            ROWCNT=:0E                        / 7X2 ROW OF LOGIC
0001            PADCNT=:01                        / 1 PAD AT END (60 HZ)
00F1            DMAEOR=:F1                        / END-OF-ROW, STOP DMA
0020            DMABLK=:20                        / SPACE
0080            DMAFAN=:80                        / FIELD ATTRIBUTE
                        EJECT
```

```
                /
                /***DMA ADDRESS AND TERMINAL COUNTS
                /
      0549      DM50TL=CRT50E-CRTRFH-1          / 50HZ TERMINAL COUNT
      0547      DM60TL=CRT60E-CRTRFH-1          / 60HZ TERMINAL COUNT
                /
      0005      DM50TH=DM50TL%.100              / 50HZ TC - HIGH
      0049      DM50TL=-.100!DM50TH+DM50TC      / 50HZ TC - LOW
                /
      0005      DM60TH=DM60TC%.100              / 60HZ TC - HIGH
      0047      DM60TL=-.100!DM60TH+DM60TC      / 60HZ TC - LOW
                /
      00F8      DM50AH=CRT50S%.100              / 50HZ ADDRESS - HIGH
      0004      DM50AL=-.100!DM50AH+CRT50S      / 50HZ ADDRESS - LOW
                /
      00F8      DM60AH=CRT60S%.100              / 60HZ ADDRESS - HIGH
      0006      DM60AL=-.100!DM60AH+CRT60S      / 60HZ ADDRESS - LOW
                        EJECT

                /
                /***LOGIC SPACE DEFINITIONS
                /
      F808      DSPLOG=CRTRFH+ROWA+ROWA / START OF LOGIC
                /
      0007      DSPNOD=7                        / NODE LENGTH
                /
      0003      DSPPOW=3                        / POWER-RAIL LENGTH
                                                /   (# OF CHARS ON
                                                /     THE HOR FOR
                                                /     EACH SCN LINE)
                /
      000B      ADVFLD=.B                       / LENGTH OF ADVISORY FIELD
                /
      000D      ERRFLD=.D                       / LENGTH OF ERROR FIELD
                /
      FC6C      DSPBSY=16!ROWB+DSPLOG+ROWA+ROWA / BUSY LINE
                /
      0004      REFLEN=.4                       / LENGTH OF REF FIELDS
                /
      0006      ASMCOL=.6                       / FIRST REF COLUMN
                        EJECT

                        SUBJOB  ASSEMBLY/STATUS AREA DEFINITION
                /
                /***DEFINE ASSEMBLY/STATUS AREA
                /
                                                / START OF AREA
      FCB1      DSPASM=2!ROWA+CRTRFH+CRTTMP-ROWD-ROWE
                /
      FCB3      DSPCON=DSPASM+2                 / CONTACT FIELD (ASSEMBLY)
                /
      FCB8      DSPVER=DSPCON+@5                / VERTICAL FIELD (ASSEMBLY)
                /
      FCBB      DSPERR=DSPVER+3                 / ERROR FIELD
                /
      FCDA      DSPREF=DSPERR+@31               / FIRST REFERENCE NUMBER
                /
      FCFE      DSPNUM=DSPASM+ROWD              / NUMERIC FIELD (ASSEMBLY)
                /
      FD08      DSPSHT=DSPNUM+@10               / SHIFT FIELD
                /
      FD0A      DSPADV=DSPSHT+2                 / ADVISORY FIELD
                /
      FD18      DSPSTP=DSPADV+@14               / STEP FIELD
                /
      FD1D      DSPUSE=DSPSTP+.5                / USAGE FIELD
                /
      FD28      DSPVAL=DSPUSE+@11               / FIRST VALUE FIELD
                        EJECT

                /
                /***LOCATION OF EACH NODE IN REFRESH
                /
      F80B      L1C01U=DSPLOG+DSPPOW            / COL 1
      F85B      L1C01L=L1C01U+ROWB
                /L1C02U=L1C01U+DSPNOD           / COL 2
                /L1C02L=L1C02U+ROWB
```

```
        /L1C03U=L1C02U+DSPNOD     / COL 3
        /L1C03L=L1C03U+ROWB
        /L1C04U=L1C03U+DSPNOD     / COL 4
        /L1C04L=L1C04U+ROWB
        /L1C05U=L1C04U+DSPNOD     / COL 5
        /L1C05L=L1C05U+ROWB
        /L1C06U=L1C05U+DSPNOD     / COL 6
        /L1C06L=L1C06U+ROWB
        /L1C07U=L1C06U+DSPNOD     / COL 7
        /L1C07L=L1C07U+ROWB
        /L1C08U=L1C07U+DSPNOD     / COL 8
        /L1C08L=L1C08U+ROWB
        /L1C09U=L1C08U+DSPNOD     / COL 9
        /L1C09L=L1C09U+ROWB
        /L1C10U=L1C09U+DSPNOD     / COL 10
        /L1C10L=L1C10U+ROWB
        /L1C11U=L1C10U+DSPNOD     / COL 11
        /L1C11L=L1C11U+ROWB
                EJECT

        /
        /***LINE 2
        /
F8AB    L2C01U=L1C01L+ROWB        / COL 1
F8FB    L2C01L=L2C01U+ROWB
        /L2C02U=L2C01U+DSPNOD     / COL 2
        /L2C02L=L2C02U+ROWB
        /L2C03U=L2C02U+DSPNOD     / COL 3
        /L2C03L=L2C03U+ROWB
        /L2C04U=L2C03U+DSPNOD     / COL 4
        /L2C04L=L2C04U+ROWB
        /L2C05U=L2C04U+DSPNOD     / COL 5
        /L2C05L=L2C05U+ROWB
        /L2C06U=L2C05U+DSPNOD     / COL 6
        /L2C06L=L2C06U+ROWB
        /L2C07U=L2C06U+DSPNOD     / COL 7
        /L2C07L=L2C07U+ROWB
        /L2C08U=L2C07U+DSPNOD     / COL 8
        /L2C08L=L2C08U+ROWB
        /L2C09U=L2C08U+DSPNOD     / COL 9
        /L2C09L=L2C09U+ROWB
        /L2C10U=L2C09U+DSPNOD     / COL 10
        /L2C10L=L2C10U+ROWB
        /L2C11U=L2C10U+DSPNOD     / COL 11
        /L2C11L=L2C11U+ROWB
                EJECT

        /
        /***LINE 3
        /
        /L3C01U=L2C01L+ROWB       / COL 1
        /L3C01L=L3C01U+ROWB
        /L3C02U=L3C01U+DSPNOD     / COL 2
        /L3C02L=L3C02U+ROWB
        /L3C03U=L3C02U+DSPNOD     / COL 3
        /L3C03L=L3C03U+ROWB
        /L3C04U=L3C03U+DSPNOD     / COL 4
        /L3C04L=L3C04U+ROWB
        /L3C05U=L3C04U+DSPNOD     / COL 5
        /L3C05L=L3C05U+ROWB
        /L3C06U=L3C05U+DSPNOD     / COL 6
        /L3C06L=L3C06U+ROWB
        /L3C07U=L3C06U+DSPNOD     / COL 7
        /L3C07L=L3C07U+ROWB
        /L3C08U=L3C07U+DSPNOD     / COL 8
        /L3C08L=L3C08U+ROWB
        /L3C09U=L3C08U+DSPNOD     / COL 9
        /L3C09L=L3C09U+ROWB
        /L3C10U=L3C09U+DSPNOD     / COL 10
        /L3C10L=L3C10U+ROWB
        /L3C11U=L3C10U+DSPNOD     / COL 11
        /L3C11L=L3C11U+ROWB
                EJECT
```

```
/
/***LINE 4
/
/L4C01U=L3C01L+ROWB            / COL 1
/L4C01L=L4C01U+ROWB
/L4C02U=L4C01U+DSPNOD          / COL 2
/L4C02L=L4C02U+ROWB
/L4C03U=L4C02U+DSPNOD          / COL 3
/L4C03L=L4C03U+ROWB
/L4C04U=L4C03U+DSPNOD          / COL 4
/L4C04L=L4C04U+ROWB
/L4C05U=L4C04U+DSPNOD          / COL 5
/L4C05L=L4C05U+ROWB
/L4C06U=L4C05U+DSPNOD          / COL 6
/L4C06L=L4C06U+ROWB
/L4C07U=L4C06U+DSPNOD          / COL 7
/L4C07L=L4C07U+ROWB
/L4C08U=L4C07U+DSPNOD          / COL 8
/L4C08L=L4C08U+ROWB
/L4C09U=L4C08U+DSPNOD          / COL 9
/L4C09L=L4C09U+ROWB
/L4C10U=L4C09U+DSPNOD          / COL 10
/L4C10L=L4C10U+ROWB
/L4C11U=L4C10U+DSPNOD          / COL 11
/L4C11L=L4C11U+ROWB
        EJECT
/
/***LINE 5
/
/L5C01U=L4C01L+ROWB            / COL 1
/L5C01L=L5C01U+ROWB
/L5C02U=L5C01U+DSPNOD          / COL 2
/L5C02L=L5C02U+ROWB
/L5C03U=L5C02U+DSPNOD          / COL 3
/L5C03L=L5C03U+ROWB
/L5C04U=L5C03U+DSPNOD          / COL 4
/L5C04L=L5C04U+ROWB
/L5C05U=L5C04U+DSPNOD          / COL 5
/L5C05L=L5C05U+ROWB
/L5C06U=L5C05U+DSPNOD          / COL 6
/L5C06L=L5C06U+ROWB
/L5C07U=L5C06U+DSPNOD          / COL 7
/L5C07L=L5C07U+ROWB
/L5C08U=L5C07U+DSPNOD          / COL 8
/L5C08L=L5C08U+ROWB
/L5C09U=L5C08U+DSPNOD          / COL 9
/L5C09L=L5C09U+ROWB
/L5C10U=L5C09U+DSPNOD          / COL 10
/L5C10L=L5C10U+ROWB
/L5C11U=L5C10U+DSPNOD          / COL 11
/L5C11L=L5C11U+ROWB
        EJECT
/
/***LINE 6
/
/L6C01U=L5C01L+ROWB            / COL 1
/L6C01L=L6C01U+ROWB            /
/L6C02U=L6C01U+DSPNOD          / COL 2
/L6C02L=L6C02U+ROWB            /
/L6C03U=L6C02U+DSPNOD          / COL 3
/L6C03L=L6C03U+ROWB            /
/L6C04U=L6C03U+DSPNOD          / COL 4
/L6C04L=L6C04U+ROWB            /
/L6C05U=L6C04U+DSPNOD          / COL 5
/L6C05L=L6C05U+ROWB            /
/L6C06U=L6C05U+DSPNOD          / COL 6
/L6C06L=L6C06U+ROWB            /
/L6C07U=L6C06U+DSPNOD          / COL 7
/L6C07L=L6C07U+ROWB            /
/L6C08U=L6C07U+DSPNOD          / COL 8
/L6C08L=L6C08U+ROWB            /
/L6C09U=L6C08U+DSPNOD          / COL 9
/L6C09L=L6C09U+ROWB            /
/L6C10U=L6C09U+DSPNOD          / COL 10
/L6C10L=L6C10U+ROWB            /
/L6C11U=L6C10U+DSPNOD          / COL 11
/L6C11L=L6C11U+ROWB            /
        EJECT
```

```
                /
                /***LINE 7
                /
                /L7C01U=L6C01L+ROWB             / COL 1
                /L7C01L=L7C01U+ROWB             /
                /L7C02U=L7C01U+DSPNOD           / COL 2
                /L7C02L=L7C02U+ROWB             /
                /L7C03U=L7C02U+DSPNOD           / COL 3
                /L7C03L=L7C03U+ROWB             /
                /L7C04U=L7C03U+DSPNOD           / COL 4
                /L7C04L=L7C04U+ROWB             /
                /L7C05U=L7C04U+DSPNOD           / COL 5
                /L7C05L=L7C05U+ROWB             /
                /L7C06U=L7C05U+DSPNOD           / COL 6
                /L7C06L=L7C06U+ROWB             /
                /L7C07U=L7C06U+DSPNOD           / COL 7
                /L7C07L=L7C07U+ROWB             /
                /L7C08U=L7C07U+DSPNOD           / COL 8
                /L7C08L=L7C08U+ROWB             /
                /L7C09U=L7C08U+DSPNOD           / COL 9
                /L7C09L=L7C09U+ROWB             /
                /L7C10U=L7C09U+DSPNOD           / COL 10
                /L7C10L=L7C10U+ROWB             /
                /L7C11U=L7C10U+DSPNOD           / COL 11
                /L7C11L=L7C11U+ROWB             /
                        EJECT
                        SUBJOB  STACK ALLOCATION
                /
                /***STACK ALLOCATION
                /
        0040    STACKL=100                      / 64 BYTE STACK
                /
        FD8F    STACK=CRTRFX+STACKL+1           / STACK BASE
                        EJECT
                SUBJOB SYSTEM TIMERS
                /
                /***SYSTEM TIMERS ALLOCATION
                /
        FD8F    TMRTAB=STACK            / START OF TABLE
        FD8F    TMRBEP=TMRTAB           / BEEP TIMER
        FD90    TMRACK=TMRBEP+1         / ACK TIMER
        FD91    TMRLED=TMRACK+1         / LED TIMER
        FD92    TMRPWR=TMRLED+1         / POWER TIMER
        FD93    TMRERR=TMRPWR+1         / ERROR BLINK TIMER
        FD94    TMRDIS=TMRERR+1         / DISCRETE UPDATE TIMER
                                        /   BOTTOM OF SCREEN
                /
        FD95    TMRTBX=TMRDIS+1         / END OF TABLE
                /
        0006    TMRCNT=TMRDIS-TMRTAB+1  / NUMBER OF TIMERS
                /
                /***NOTE:
                /
                /       THE TIMER MUST BE IN THE SAME SEQUENCE AS THE
                /       DISPATCH TABLE TMRDSP IN CLKINT..
                /
                /***TIMER VALUES
                /
        001E    ERRTMR=@30                      / ERROR FLASH RATE (2HZ)
                /
        001E    LEDTMR=@30                      / LED REQUEST RATE (2HZ)
                /
        0002    PWRTMR=@2                       / POWER REQUEST RATE (30HZ)
                /
        003C    ACKTMR=@60                      / ACK TIMER (1 SEC)
                /
        0001    DISTMR=@1                       / DISCRETE UPDATE (60HZ)
                        EJECT
                SUBJOB BUFFER BLOCKS

                /
                /****CIRCULAR BUFFER BLOCK DEFINITION,
                /
                /****EACH BUFFER IS DEFINED BY A DATA BLOCK
                /
```

```
0000    BFBASE=0                    / ADDRESS OF BUFFER BASE
0002    BFIPTR=BFBASE+2             / INPUT POINTER
0003    BFOPTR=BFIPTR+1             / OUTPUT POINTER
0004            BFLEN=BFOPTR+1      / BUFFER LENGTH
0005    BFUSE=BFLEN+1               / USAGE COUNT
0006    BFBLKL=BFUSE+1              / BLOCK LENGTH
        /
        /***BUFFER BLOCKS:
        /
FD96    SPLBLK=TMRTBX+1             / SPOOLER BLOCK
        /
FD9C    PPIBLK=SPLBLK+BFBLKL        / PERIPHERAL RECEIVER BLOCK
        /
FDA2    PPOBLK=PPIBLK+BFBLKL        / PERIPHERAL TRANSMIT BL^CK
        /
FDA8    KBDBLK=PPOBLK+BFBLKL        / KEYBOARD BLOCK
        /
        /***BUFFER LENGTHS (MAX IS 255 BYTES)
        /
0040    SPLBFL=100                  / SPOOLER LENGTH
0020    PPIBFL=  40                 / RECEIVER BUFFER LENGTH
0020    PPOBFL=  40                 / TRANSMIT BUFFER LENGTH
0010    KBDBFL=  20                 / KBD BUFFER LENGTH
        /
        /*** ACTUAL BUFFER LOCATIONS - TOP OF RAM SPACE
        /
FFC0    SPLBUF= RAMHI-SPLBFL+1      / SPOOLER
FFA0    PPIBUF= SPLBUF-PPIBFL       / RECEIVER
FF80    PPOBUF= PPIBUF-PPOBFL       / TRANSMITTER
FF70    KBDBUF= PPOBUF-KBDBFL       / KEYBOARD
        /
FF70    BUFFER= KBDBUF              / START OF BUFFERS
                EJECT

        SUBJOB PERIPHERAL PORT SCRATCHPAD ALLOCATIONS
        /
FDAE    PPISTA= KBDBLK+BFBLKL       / RECEIVER STATUS
FDAF    PPOSTA= PPISTA+1            / TRANSMIT STATUS
FDB0    MSGLEN= PPOSTA+1            / INPUT MESSAGE LENGTH CTR
FDB1    PPICHK=MSGLEN+1             / INPUT MESSAGE CHECKSUM
FDB2    RCOUNT=PPICHK+1             / RETRY COUNT
FDB3    PPOCHK=RCOUNT+1             / OUTPUT MESSAGE CHECKSUM
        /
FDB4    POSAVE= PPOCHK+1            / PARALLEL PORT IMAGE
        /
0004    MAXTRY=:4                   / 4 RETRIES ALLOWED
        /
        /***PERIPHERAL PORT RECEIVER STATUS
        /   SOFTWARE BITS; SET AND RESET IN "PPISTA"
        /
0080    PPIMSG=:80                  / MESSAGE IN PROCESS
0040    PPIFCN=:40                  / NEXT CHAR IS FUNCTION
0020    PPIDON=:20                  / MESSAGE COMPLETED
0010    PPIPAR=:10                  / PARITY/FRAMING ERROR
0008    PPIOVR=:08                  / OVERRUN ERROR
0004    PPIRET=:04                  / RETRANSMIT
0002    PPICER=:02                  / CHECKSUM ERROR
0001    PPICNT=:01                  / NEXT CHAR IS COUNT
                EJECT

                SUBJOB  LOGIC DATA TABLE

        / NOTE: THIS TABLE IS MAINTAINED TO DESCRIBE
        /       THE LAYOUT OF A NETWORK ON A ROW-BY-ROW BASIS.  IT
        /       IS DESIGNED TO KEEP TRACK OF MORE THAN 1 NETWORK
        /       PER SCREEN, WHICH IS NOT IMPLEMENTED AT THIS TIM

        /***BLOCK DEFINITION
        /
0000    ROWFLG=0            / FLAG CELL
0001    ROWFMA=ROWFLG+1     / FIRST MEMORY ADDRESS
0003    ROWLMA=ROWFMA+2     / LAST  MEMORY ADDRESS
0005    ROWCUR=ROWLMA+2     / CURSOR POSITION
0006    ROWSEQ=ROWCUR+1     / SEQUENCE NUMBER
0008    ROWBKL=ROWSEQ+2     / LENGTH OF BLOCK
        /
        /***FLAG DEFINITION
```

```
                 /
      0080       ROWFSN=:80                       / START OF NETWORK
      0040       ROWFEN=:40                       / END OF NETWORK
      0020       ROWFMN=:20                       / MIDDLE OF NETWORK
      0010       ROWFBK=:10                       / BLANK ROW
                 /        :08                     / NOT USED
                 /        :04                     / NOT USED
                 /        :02                     / NOT USED
                 /        :01                     / NOT USED
                 /
                 /***STORAGE ALLOCATION
                 /
      FDB5       ROWTAB=PUSAVE+1
                 /
      FDB5       ROWTB1=ROWTAB                    / LINE 1
      FDBD       ROWTB2=ROWTB1+ROWBKL             / LINE 2
      FDC5       ROWTB3=ROWTB2+ROWBKL             / LINE 3
      FDCD       ROWTB4=ROWTB3+ROWBKL             / LINE 4
      FDD5       ROWTB5=ROWTB4+ROWBKL             / LINE 5
      FDDD       ROWTB6=ROWTB5+ROWBKL             / LINE 6
      FDE5       ROWTB7=ROWTB6+ROWBKL             / LINE 7
      FDED       ROWTBX=ROWTB7+ROWBKL             / END OF TABLE
                 /
      0038       ROWTBL=ROWTB7+ROWBKL-ROWTAB      / LENGTH OF BLOCK
                         EJECT

                 SUBJOB COLUMN DATA TABLE


                 /       THIS TABLE MAINTAINS, FOR EACH COLUMN, THE LOWEST
                 /       AND HIGHEST CONTROLLER ADDRESSES FOR THE NODES
                 /       IN THIS COLUMN.  IT ALSO MAINTAINS THE ACTUAL
                 /       "END-OF-COLUMN" NODE, IF THERE IS ONE.

                 /
                 /***BLOCK DEFINITION
                 /
      0000       COLSHI=0                         / START OF COLUMN - ADDR I
      0001       COLSLO=COLSHI+1                  / START OF COLUMN - ADDRLO
      0002       COLEHI=COLSLO+1                  / END OF COLUMN - ADDRHI
      0003       COLELO=COLEHI+1                  / END OF COLUMN - ADDRLO
      0004       EOCHI=COLELO+1                   / END-OF-COL - BYTE 0
      0005       EOCLO=EOCHI+1                    / END-OF-COL - BYTE 1
                 /
      0006       COLBKL=EOCLO+1                   / BLOCK LENGTH
                 /
      FDED       COLTAB=ROWTBX                    / START OF TABLE
                 /
      FDED       COLTB1=COLTAB                    / COLUMN 1
      FDF3       COLTB2=COLTB1+COLBKL             / COLUMN 2
      FDF9       COLTB3=COLTB2+COLBKL             / COLUMN 3
      FDFF       COLTB4=COLTB3+COLBKL             / COLUMN 4
      FE05       COLTB5=COLTB4+COLBKL             / COLUMN 5
      FE0B       COLTB6=COLTB5+COLBKL             / COLUMN 6
      FE11       COLTB7=COLTB6+COLBKL             / COLUMN 7
      FE17       COLTB8=COLTB7+COLBKL             / COLUMN 8
      FE1D       COLTB9=COLTB8+COLBKL             / COLUMN 9
      FE23       COLTBA=COLTB9+COLBKL             / COLUMN A
      FE29       COLTBB=COLTBA+COLBKL             / COLUMN B
                 /
      FE2F       COLTBX=COLTBB+COLBKL             / END OF TABLE
                 /
      0042       COLTBL=COLTBX-COLTAB             / TABLE SIZE
                         EJECT

                 /
                 /***NODE TYPE MATRIX
                 /
                 /***7 X 11 MATRIX WITH NODE TYPE FOR EACH POSITION
                 /
      FE2F       MATROW=COLTBX                    / START OF TABLE
                 /
      FE2F       MATRW1=MATROW                    / ROW 1
      FE3A       MATRW2=MATRW1+@11                / ROW 2
      FE45       MATRW3=MATRW2+@11                / ROW 3
      FE50       MATRW4=MATRW3+@11                / ROW 4
```

```
FE5B    MATRW5=MATRW4+@11        / ROW 5
FE66    MATRW6=MATRW5+@11        / ROW 6
FE71    MATRW7=MATRW6+@11        / ROW 7
        /
FE7C    MATROX=MATRW7+@11        / END OF TABLE
        /
004D    MATROL=MATROX-MATROW     / TABLE SIZE
                EJECT

        /
        /***KEYBOARD STATE VECTOR
        /
FE7C    KSTATE=MATROX            / STORAGE ALLOCATION
        /
        /***BIT DEFINITION
        /
0080    KSHIFT=:80               / SHIFT FLAG
0040    KERROR=:40               / I/O ERROR STATE
0020    KRESET=:20               / RESET REQUIRED
0010    KCLEAR=:10               / CLEAR NUMERIC FIELD
0008    KNET=:08                 / NETWORK IN PROGRESS
0004    KCLADV=:04               / CLEAR ADVISORY FIELD
0002    KSUPER=:02               / SUPERVISORY STATE
        /        :01             / NOT USED
        /
FE7D    CURDSP=KSTATE+1          / DISPLAY CURSOR
        /
FE7E    CURACT=CURDSP+1          / ACTUAL CURSOR
        /
000B    MAXCOL=@11               / NUMBER OF LOGIC COLUMNS
        /
0007    MAXROW=@7                / NUMBER OF LOGIC ROWS
        /
0080    ASMROW=:80               / ASSEMBLY ROW
        /
000F    COLMSK=:0F               / COLUMN MASK
        /
00F0    ROWMSK=:F0               / ROW MASK
        /
0006    ASMNUM=:6                / NUMBER OF REF FIELDS
        /
FE7F    ASMCON=CURACT+1          / CONTACT TYPE - ASSEMBLY
        /
FE80    CURCON=ASMCON+1          / CONTACT TYPE - CURSOR
        /
FE81    DISPTR=CURCON+1          / PTR FOR DISCRETE DISPLAY
        /
FE82    NEWKEY=DISPTR+1          / LATEST KEYSTROKE
        /
FE83    LASTKY=NEWKEY+1          / LAST KEYSTROKE
                EJECT

        SUBJOB MAINFRAME DATA BASE
        /
FE84    SCONF1=LASTKY+1          / CONFIGURATION - BYTE 1
FE85    SCONF2=SCONF1+1          / CONFIGURATION - BYTE 2
        /
FE86    MEMSIZ=SCONF2+1          / MEMORY SIZE (2 BYTES)
FE88    MEMUSE=MEMSIZ+2          / MEMORY USAGE (2 BYTES)
        /
FE8A    STPNUM=MEMUSE+2          / STEP NUMBER (2 BYTES)
        /
FE8C    ADRSON=STPNUM+2          / ADDRESS - START-OF-NET
        /
FE8E    ADREON=ADRSON+2          / ADDRESS - END-OF-NET
        /
        /***MAINFRAME DATA BASE DDRESSES
        /
00C0    INPBAS=300               / BASE OF INPUT REG SPACE
        /
60BD    ADRSYS=:6000+@189        / SYSTEM STATE BYTE
        /
60BE    ADRCON=:6000+@190        / CONFIGURATION ADDRESS
        /
```

```
0002    ADRUSE=.0002              / START OF USER LOGIC
        /
        /***ADDRESS FIELDS
        /
0000    LOGFLD=.00                / LOGIC FIELD
0020    IOFLD=.20                 / I/O FIELD
0040    REGFLD=.40                / REGISTER FIELD
0060    SPDFLD=.60                / SCRATCHPAD FIELD
        /
        /***NODE INFORMATION
        /
0080    EOCFLG=:80                / END-OF-COLUMN FLAG
0001    OUTFLG=:01                / OUTPUT COIL
0002    INTFLG=:02                / INTERNAL COIL
0003    SEQFLG=:03                / SEQUENCER
        /
007C    NODMSK=.7C                / NODE TYPE MASK
        /
0000    HLDFLG=:00                / HOLDING REGISTER
0001    INPFLG=:01                / INPUT REGISTER
0002    DUMFLG=:02                / DUMMY REGISTER
        /
0000    ADDFLG=.00                / CALCULATE - ADD
0001    SUBFLG=:01                / CALCULATE - SUBTRACT
0002    MPXFLG=:02                / CALCULATE - MULTIPLY
0003    DIVFLG=:03                / CALCULATE - DIVIDE
                EJECT
        /
0001    INTSTA=:01                / STATE - INTERNAL COIL
0002    OUTSTA=:02                / STATE - OUTPUT COIL
0004    INPSTA=:04                / STATE - INPUT
0008    INPDIS=:08                / STATE - INPUT DISABLE
        /
        /INTHIS=.10               / HISTORY - INTERNAL COI
0020    OUTHIS=:20                / HISTORY - OUTPUT COIL
        /INPHIS=:40               / HISTORY - INPUT
        /       :80               / NOT USED
        /
F7FF    DISMSK=-INPDIS!:100-1     / MASK INPUT DISABLE
        /
        /CTRFLG=:00               / COUNTER FLAG
        /T10FLG=:01               / TIMER 1.00 FLAG
        /T01FLG=:02               / TIMER 0.10 FLAG
        /T00FLG=:03               / TIMER 0.01 FLAG
        /
0000    SINFLG=:00                / DISCRETE SOURCE FLAG
0001    SRGFLG=:01                / REGISTER SOURCE FLAG
0002    DINFLG=:02                / DISCRETE DESTINATION FLAG
0003    DRGFLG=:03                / REGISTER DESTINATION FLAG
        /
                EJECT

        SUBJOB SYSTEM CONFIGURATION BYTE DEFINITION
        /
        /***SYSCONF1
        /
0080    SY4096=:80                / 4096 BYTE LOGIC RAM
0040    SY2048=:40                / 2048 BYTE LOGIC RAM
0020    SY1024=:20                / 1024 BYTE LOGIC RAM
0010    SY0512=:10                /  512 BYTE LOGIC RAM
0008    SY0256=:08                /  256 BYTE LOGIC RAM
        /       :04               / NOT USED
        /       :02               / NOT USED
        /       :01               / NOT USED
        /
        /***SYSCONF2
        /
0080    SYS256=:80                / 256 I/O POINTS
0040    SYS192=:40                / 192 I/O POINTS
0020    SYS128=:20                / 128 I/O POINTS
0010    SYS064=:10                /  64 I/O POINTS
        /       :08               / NOT USED
        /SYSTRN= :04              / TRANSITIONAL OPTION
0002    SYSENH=:02                / ENHANCED EXEC
        /       :01               / NOT USED
        /
```

```
                /***SYSTEM STATE BYTE
                / .
      0080      SYSRUN=:80                      / RUN STATE
                /SYSPUP=:40                     / POWER-UP STATE
                /SYSPDN=:20                     / POWER-DOWN STATE
      0010      SYSSTP=:10                      / STOP STATE
                /SYSERR=:0F                     / ERROR CODES
                /
                /***ERROR CODE/S
                /
                /SYSOVR=:01                     / COMMUNICATIONS OVERRRUN
                /SYSLCK=:02                     / LOGIC RAM CHECKSUM ERR R
                /SYSNOD=:03                     / INVALID NODE TYPE
                /SYSIO=:04                      / I/O PORT ERROR
                /SYSSPD=:05                     / SCRATCHPAD DIAGS FAILE
                /SYSCCK=:06                     / COIL RAM CHECKSUM ERROR
                /SYSDIA=:07                     / CPU DIAGNOSTIC FAILED
                /SYSMEM=:08                     / ILLEGAL MEM CONFIGURAT ON
                /SYSRTC=:09                     / REAL-TIME CLOCK ERROR
                /SYSWDT=:0A                     / WATCH-DOG TIMER EXPIRED
                /SYSCOL=:0B                     / ILLEGAL COLUMN
      000C      SYSEOL=:0C                      / NO END-OF-LOGIC NODE
                /
                /***SEQUENCER DATA
                /
      0033      SEQBAS=@51                      / BASE SEQUENCER REG - 4051
      00E0      REGMSK=:E0                      / REGISTER MASK
      001F      STPMSK=:1F                      / STEP MASK
                        EJECT
                        SUBJOB  COMMUNICATIONS SCRATCHPAD ALLOCATIONS
                /
                /***COMMAND BUFFER
                /
      FE90      CMDBUF=ADREON+2                 / START OF COMMAND BUFFER
                /
      0018      CMDBFL=@24                      / BUFFER LENGTH (19 BYTES)
                /
      FEA8      RSPBUF=CMDBUF+CMDBFL            / RESPONSE BUFFER
                /
      0018      RSPBFL=@24                      / BUFFER LENGTH (19 BYTES)
                        EJECT
                SUBJOB \        RAM STORAGE FOR LOAD, DUMP, VER

      FEC0              *RSPBUF+RSPBFL

                /       "EOUSEG" IS A 2 BYTE WORD USED TO STORE
                /       THE HIGHEST VALID 484 ADDR IN
                /       A SEGMENT AS 'HI-LO'.  I.E. LOGIC RAM, COIL
                /       RAM, OR REG RAM.

FEC0            EOUSEG, DS      2


                /       "TEMP" IS A 2 BYTE TEMPORARY LOC USED BY L-D-V

FEC2            TEMP,   DS      2


                /       "CASBUF" IS USED BY L-D-V TO TRANSFER
                /       DATA IN/OUT OF PORT 2; IT MUST CONTAIN 1
                /       COMPLETE RECORD.

FEC4            CASBUF, DS      @47


                /       "VERBUF" IS USED BY THE "VERIFY" FUNCTION
                /       OF L-D-V TO COMPARE A TAPE BUFFER TO A
                /       BUFFER READ FROM THE 484.

FEF3            VERBUF, DS      @24


                        EJECT
```

```
                SUBJOB \         SEARCH RAM LOCATIONS

                         SRCHST  IS A 2 BYTE HOLDING CELL FOR
                        # OF START-OF-NETWORK NODES ENCOUNTERED
                        DURING SEARCH

FF0B            SRCHST  DS        2

                        END

                        SUBJOB  ASCII CHARACTER SET
                /
                /***ASCII CHARACTER
                /
                /ASC1D=.00                    / 1.
                /ASCD1=.01                    / .1
       0002     ASCTL=.02                     / TOP LEFT BOARDER
       0003     ASCUB=.03                     / UPPER BOARDER
       0004     ASCTR=.04                     / TOP RIGHT BOARDER
       0005     ASCLB=.05                     / LEFT BOARDER
                /ASCCTR=.06                   / COUNTER LEFT
       0007     ASCTMR=.07                    / TIMER BOARDER T
                /ASCTMD=.08                   / TIMER BOARDER T.
       0009     ASCRB=.09                     / RIGHT BOARDER
       000A     ASCDIV=.0A                    / DIVIDE
       000B     ASCMPX=.0B                    / MULTIPLY
                /ASCOPN=.0C                   / OPEN INDICATOR
                /ASCNON=.0D                   / NON-ASCII BLANK
                /        .0E                  / NOT USED
                /        .0F                  / NOT USED
       0010     ASC0UN=.10                    / 0 UNDERLINED
                /ASC1UN=.11                   / 1 UNDERLINED
                /ASC2UN=.12                   / 2 UNDERLINED
       0013     ASC3UN=.13                    / 3 UNDERLINED
       0014     ASC4UN=.14                    / 4 UNDERLINED
                /ASC5UN=.15                   / 5 UNDERLINED
                /ASC6UN=.16                   / 6 UNDERLINED
                /ASC7UN=.17                   / 7 UNDERLINED
                /ASC8UN=.18                   / 8 UNDERLINED
                /ASC9UN=.19                   / 9 UNDERLINED
                /ASCAUP=.1A                   / UP ARROW
       001B     ASCADN=.1B                    / DOWN ARROW
                /ASCBSL=.1C                   / BACK SLASH
       001D     ASCNBK=.1D                    / NUMERIC FIELD BLANK
       001E     ASCVBK=.1E                    / VERTICAL FIELD BLANK
       001F     ASCCBK=.1F                    / CONTACT FIELD BLANK
       0020     ASCBLK=.20                    / SPACE
                /ASCEXP=.21                   / !
                /ASCQUO=.22                   / "
                /ASCNUM=.23                   / #
                /ASCDOL=.24                   / $
                /ASCPER=.25                   / %
                /ASCAMP=.26                   / &
                /ASCAPO=.27                   / '
                /ASCLPR=.28                   / (
                /ASCRPR=.29                   / )
       002A     ASCAST=.2A                    / *
       002B     ASCPLS=.2B                    / +
                /ASCCMA=.2C                   / ,
       002D     ASCMIN=.2D                    / -
       002E     ASCDOT=.2E                    / .
       002F     ASCSLH=.2F                    / /
       0030     ASC0=.30                      / 0
       0031     ASC1=.31                      / 1
       0032     ASC2=.32                      / 2
       0033     ASC3=.33                      / 3
       0034     ASC4=.34                      / 4
       0035     ASC5=.35                      / 5
       0036     ASC6=.36                      / 6
       0037     ASC7=.37                      / 7
       0038     ASC8=.38                      / 8
       0039     ASC9=.39                      / 9
       003A     ASCCOL=.3A                    / :
                /ASCSMI=.3B                   / ;
                /ASCLES=.3C                   / <
                /ASCEQ=.3D                    / =
                /ASCGTR=.3E                   / >
```

```
            /ASCQMK=:3F          / ?
            /ASCAT=:40           / @
            /ASCA=:41            / A
            /ASCB=:42            / B
0043        ASCC=:43             / C
0044        ASCD=:44             / D
            /ASCE=:45            / E
            /ASCF=:46            / F
            /ASCG=:47            / G
            /ASCH=:48            / H
            /ASCI=:49            / I
            /ASCJ=:4A            / J
            /ASCK=:4B            / K
            /ASCL=:4C            / L
            /ASCM=:4D            / M
004E        ASCN=:4E             / N
004F        ASCO=:4F             / O
            /ASCP=:50            / P
            /ASCQ=:51            / Q
0052        ASCR=:52             / R
0053        ASCS=:53             / S
0054        ASCT=:54             / T
            /ASCU=:55            / U
            /ASCV=:56            / V
            /ASCW=:57            / W
            /ASCX=:58            / X
            /ASCY=:59            / Y
            /ASCZ=:5A            / Z
            /ASCLBK=:5B          / [
            /ASCLSL=:5C          / \
            /ASCRBK=:5D          / ]
            /ASCUP=:5E           / UP ARROW
            /ASCLF=:5F           / <-
0060        ASCLRE=:60           / -]
            /          :61       / -] HIGH LIGHT
            /ASCRRE=:62          / [-
            /          :63       / [- HIGHLIGHT
            /ASCCOL=:64          / -+
            /          :65       / -+ HIGHLIGHT
0066        ASCDIS=:66           / DISABLE
            /          :67       / DISABLE HIGH LIGHT
            /ASCCL=:68           / -(
            /          :69       / -( HIGHLIGHT
            /ASCCR=:6A           / )-
            /          :6B       / )- HIGHLIGHT
            /ASCCM=:6C           / ::
            /          :6D       / :: HIGHLIGHT
            /ASCLM=:6E           / :L:
            /          :6F       / :L: HIGHLIGHT
            /ASCOR=:70           / +-
            /          :71       / +- HIGHLIGHT
0072        ASCDSH=:72           / -
            /          :73       / - HIGHLIGHT
0074        ASCBAR=:74           / --
            /          :75       / -- HIGHLIGHT
            /ASCNSP=:76          / SPACE
            /          :77       / SPACE - HILITE
            /ASCNUP=:78          / UP ARROW
            /          :79       / UP ARROW - HIGHLIGHT
            /ASCNDN=:7A          / DOWN ARROW
            /          :7B       / DOWN ARROW - HIGHLIGHT
            /ASCNBS=:7C          / BACK SLASH
            /          :7D       / BACK SLASH - HIGHLIGHT
            /          :7E       / SPARE
            /          :7F       / SPARE
            /
            /***FIELD ATTRIBUTES

0000        [illegible]          / NORMAL
0000        [illegible]          / REVERSE VIDEO
            [illegible]          / UNDERLINE
            [illegible]          / REVERSE + UNDERLINE
            [illegible]
            /
            /***CHARACTER ATTRIBUTES
            /    THESE CHARS DRAW HOR AND VERT LINES
            /
```

```
        0OD0    CA0101=.C0                  / L=0, R=1, U=0, D=1
                /CA1001=.C4                 / L=1, R=0, U=0, D=1
                /CA0110=.C8                 / L=0, R=1, U=1, D=0
        00CC    CA1010=.CC                  / L=1, R=0, U=1, D=0
        00D0    CA1101=.D0                  / L=1, R=1, U=0, D=1
                /CA1011=.D4                 / L=1, R=0, U=1, D=1
        00D8    CA0111=.D8                  / L=0, R=1, U=1, D=1
        00DC    CA1110=.DC                  / L=1, R=1, U=1, D=0
        00E0    CA1100=.E0                  / L=1, R=1, U=0, D=0
        00E4    CA0011=.E4                  / L=0, R=0, U=1, D=1
        00E8    CA1111=.E8                  / L=1, R=1, U=1, D=1
                /         .EC               / NOT USED
                /CADMA=.F0                  / DMA CONTROL
                /         .F4               / NOT USED
                /         .F8               / NOT USED
                /         .FC               / NOT USED
                /
                /***OFFSETS
                /
                /CATNOR=.0                  / NORMAL
        0001    CATHI=.1                    / HIGHLIGHT
                /CATBLK=.2                  / BLINK
                /CATHBL=.3                  / HIGHLIGHT + BLINK
                /
        0002    ASCSTX=.02                  / ASCII START-OF-TEXT
        00D0    ASCNAK=.D0                  / ASCII NOT ACKNOWLEDGE
                        EJECT

                        SUBJOB  MAINFRAME COMMUNICATIONS DEFINITIONS
                /
                /***COMMANDS
                /
        0010    CMDRED=.10                  / READ
        0020    CMDWRT=.20                  / WRITE
        0030    CMDSCH=.30                  / SEARCH
        0040    CMDPWR=.40                  / POWER
        0050    CMDINS=.50                  / INSERT
        0060    CMDDEL=.60                  / DELETE
        0070    CMDLED=.70                  / LED
        0080    CMDSTP=.80                  / STOP
        0090    CMDGO=.90                   / GO
        00A0    CMDINI=.A0                  / INITIALIZE
        00B0    CMDINC=.B0                  / INSERT @EOC
        00C0    CMDDEC=.C0                  / DELETE @EOC
        00D0    CMDNAK=.D0                  / NAK
                /         .E0               / NOT USED
                /         .F0               / NOT USED
                /
                /***VARIABLE LENGTH CODES
                /
        0001    CMD02=.01                   / 2 BYTES
                /CMD04=.02                  / 4 BYTES
                /CMD06=.03                  / 6 BYTES
                /CMD08=.04                  / 8 BYTES
                /CMD10=.05                  / 10 BYTES
                /CMD12=.06                  / 12 BYTES
                /CMD14=.07                  / 14 BYTES
                /CMD16=.08                  / 16 BYTES
                /
                /***COMMAND LENGTHS
                /
        0006    LENRED=.06                  / READ
        000A    LENWRT=.0A                  / WRITE
        000A    LENSCH=.0A                  / SEARCH
        0006    LENPWR=.06                  / POWER
        0008    LENINS=.08                  / INSERT
        0006    LENDEL=.06                  / DELETE
        0005    LENLED=.05                  / LED
        0004    LENSTP=.04                  / STOP
        0004    LENGO=.04                   / GO
        0004    LENINI=.04                  / INITIALIZE
        0008    LENINC=.08                  / INSERT @EOC
        0006    LENDEC=.06                  / DELETE @EOC
        0005    LENNAK=.05                  / NAK
                /
                /***MASKS
```

```
                /
                /CMDMSK=.F0                   / FUNCTION CODE
                /CNTMSK=.0F                   / COUNT CODE
                /
                /***ERROR CODES
                /
      0001      ERRPAR=.01                    / PARITY/FRAMING ERROR
      0002      ERROVR=.02                    / OVERRUN ERROR
      0003      ERRCHK=.03                    / BAD CHECKSUM
      0004      ERRADR=.04                    / ADDRESS OUT-OF-RANGE
      0005      ERRADI=.05                    / ILLEGAL ADDRESS
      0006      ERRCMD=.06                    / ILLEGAL COMMAND
      0007      ERRTIM=.07                    / TIME OUT
      0008      ERRMSK=.08                    / INVALID MASK
      0009      ERRSEQ=.09                    / INVALID SEQUENCE NUMBE
      000A      ERRNOD=.0A                    / INVALID NODE
      000B      ERRMEM=.0B                    / MEMORY PROTECT FAULT
      000C      ERRSTP=.0C                    / SYSTEM NOT IN STOP STA E
      000D      ERRLEN=.0D                    / BAD LENGTH
      000E      ERRCON=.0E                    / NODE NOT A CONTACT
      000F      ERRNPD=.0F                    / NODE NOT IN POWER DISP AY
      0010      ERRSUP=.10                    / NODE NOT SUPPORTED
      0011      ERRFUL=.11                    / MEMORY FULL
                        EJECT

      0000              *.0000
                /
                /***LOCATION : X'0000' : POWER-UP RESTART
                /
 0000 F3                DI                    / DISABLE INTERRUPTS
 0001 C33F00            JMP     PWRUP         / VECTOR TO THE POWER-UP
 0004 76                HLT                   / SHOULD NEVER REACH HERE
 0005 76                HLT                   / SHOULD NEVER REACH HERE
 0006 76                HLT                   / SHOULD NEVER REACH HER
 0007 76                HLT                   / SHOULD NEVER REACH HERE
                        EJECT

      0008              *.0008
                /
                /***LOCATION : X'0008' : RESTART 1
                /
                / RST 1 IS DEFINED AS A "NIBBLE SWAP" ROUTINE.
                /       IT PUTS THE LEAST SIGNIFICANT 4 BITS TO
                /       MOST SIGNIFICANT 4 BITS AND VISA VERSA.
                /       EXAMPLE.
                /               A-REG ON CALL = AAAABBBB
                /
                /               NSWP
                /
                /               A-REG ON EXIT = BBBBAAAA

                        SUBJOB  LOW ROM ALLOCATION
                /
                /***LOW ROM ALLOCATION
                /
                /***THIS MODULE DEFINES THE ALLOCATION OF THE
                /***FIRST 64 BYTES OF ROM.  THESE ADDRESSES ARE
                /***USED FOR THE RESTART INSTRUCTIONS
                /
                /
                        EJECT

                        SUBJOB  LOWROM ALLOCATION
                /
                /***LOW ROM IS ALLOCATED FOR THE RESTART INSTRUCTIONS.
                /
                /       RST 0 - POWER-UP
                /       RST 1 - NSWP (SWAP 4 BITS HI-LO IN A-REG)
                /       RST 2 - MEM[H,L] <- [B,C]
                /       RST 3 - PC <- MEM[H,L]
                /       RST 4 - [H,L] <- MEM[H,L]
                /       RST 5 - MEM[H,L] <- [D,E]
                /       RST 6 - DBL PREC. COMPARE D/E & H/L
                /       RST 7 - INTERRUPT HANDLER
                /
                        EJECT
```

```
               /
      000F     NSWP=:0F
               /
0008 0F                  RRC                 / ROTATE 4 TIMES
0009 0F                  RRC                 / X
000A 0F                  RRC                 / X
000B 0F                  RRC                 / X
000C C9                  RET                 / DONE

000D 76                  HLT                 / NEVER REACH HERE!
000E 76                  HLT                 / X
000F 76                  HLT                 / X
                         EJECT

      0010               *:0010
               /
               /***LOCATION : X'0010' . RESTART 2
               /
               /***STORE [B,C] INTO MEMORY([H,L])
               /
               /***[B,C] PRESERVED
               /***[H,L] <- [H,L] + 2
               /
      00D7     MOVBC=:D7                          / OPCODE FOR RST 2
               /
0010 70                  MOV      M,B             / STORE HI-ORDER VALUE
0011 23                  INX      H               / BUMP ADDRESS
0012 71                  MOV      M,C             / STORE LOW-ORDER VALUE
0013 23                  INX      H               / BUMP ADDRESS
0014 C9                  RET                      / EXIT
0015 76                  HLT                      / SHOULD NEVER REACH HERE
0016 76                  HLT                      / SHOULD NEVER REACH HER
0017 76                  HLT                      / SHOULD NEVER REACH HERE
                         EJECT

      0018               *:0018
               /
               /***LOCATION : X'001A' : RESTART 3
               /
               /***DISPATCH OFF A TABLE
               /
               /***PC <- MEM([H,L])
               /
               /***A DESTROYED
               /***[H,L] DESTROYED
               /
      00DF     DSPTAB=:DF                         / OPCODE FOR RST 3
               /
0018 F1                  POP      PSW             / POP RETURN FROM STACK
0019 7E                  MOV      A,M             / A <- LOW-ORDER ADDRESS
001A 23                  INX      H               / BUMP ADDRESS
001B 66                  MOV      H,M             / L <- HIGH-ORDER ADDRESS
001C 6F                  MOV      L,A             / H <- LOW-ORDER ADDRESS
001D E9                  PCHL                     / DISPATCH
001E 76                  HLT                      / SHOULD NEVER REACH HERE
001F 76                  HLT                      / SHOULD NEVER REACH HER
                         EJECT

      0020               *:0020
               /
               /***LOCATION . X'0020' : RESTART 4
               /
               /***[H,L] <- MEM([H,L])
               /
               /***A DESTROYED
               /
      00E7     GETHL=:E7                          / OPCODE FOR RST 4
               /
0020 7E                  MOV      A,M             / A <- HIGH-ORDER BYTE
0021 23                  INX      H               / BUMP ADDRESS
0022 6E                  MOV      L,M             / L <- LOW-ORDER ADDRESS
0023 67                  MOV      H,A             / H <- HIGH-ORDER ADDRESS
0024 C9                  RET                      / EXIT
0025 76                  HLT                      / SHOULD NEVER REACH HERE
0026 76                  HLT                      / SHOULD NEVER REACH HERE
0027 76                  HLT                      / SHOULD NEVER REACH HER
                         EJECT
```

```
         0028              *.0028
                           /
                           /***LOCATION . X'0028' . RESTART 5
                           /
                           /***MEM[H,L] <- [D,E]
                           /***[H,L] <- [H,L] + 2
                           /
         00EF              MOVDE=.EF                                    / OPCODE FOR RST 5
                           /
    0028 72                        MOV     M,D                          / STORE D
    0029 23                        INX     H                            / BUMP ADDRESS
    002A 73                        MOV     M,E                          / STORE E
    002B 23                        INX     H                            / BUMP ADDRESS
    002C C9                        RET                                  / EXIT
    002D 76                        HLT                                  / SHOULD NEVER REACH HER
    002E 76                        HLT                                  / SHOULD NEVER REACH HERE
    002F 76                        HLT                                  / SHOULD NEVER REACH HERE
                                   EJECT
```

```
         0030              *.0030
                           /
                           /***LOCATION . X'0030' . RESTART 6
                           /
                           / RST 6 IS DEFINED AS A ROUTINE TO DO A
                           /       "DOUBLE PRECISION COMPARE" OF THE
                           /       CONTENTS OF D/E TO THE CONTENTS OF H/L
                           /
                           /       CALLED BY.
                           /
                           /       DCMP              / COMPARE ETC.
                           /
\ NOTE:   THE A-REG IS DESTROYED!!!
                           /
                           / EXIT:
                           /       FLAGS ARE SET AS FOLLOWS:
                           /
                           /       CARRY SET IF D/E < H/L
                           /       CARRY RESET IF D/E >= H/L
                           /       ZERO SET IF D/E = H/L, RESET IF NOT

         00F7              DCMP=.F7          / "RST 6"

    0030 7A                        MOV     A,D      / GET MS BYTE OF D/E
    0031 BC                        CMP     H        / COMPARE AND SET FLAGS
    0032 C0                        RNZ              / NOT EQUAL, ALL DONE
    0033 7B                        MOV     A,E      / GET LS BYTE OF D/E
    0034 BD                        CMP     L        / COMPARE AND SET FLAGS
    0035 C9                        RET              / DONE

    0036 76                        HLT                          / SHOULD NEVER REACH HERE
    0037 76                        HLT                          / SHOULD NEVER REACH HERE
                                   EJECT
```

```
         0038              *.0038
                           /
                           /***LOCATION . X'0038' . RESTART 7
                           /
                           /***INTERRUPT HANDLER
                           /
    0038 CD00F8                    CALL    INTVEC   / CHECK FOR DIAGNOSTIC LOAD
    003B C34502                    JMP     INTRP    / BRANCH TO HANDLER
    003E 76                        HLT              / SHOULD NEVER REACH HERE
                                   EJECT
```

```
                                   SUBJOB  POWER-UP ROUTINE
                           /
                           /***POWER-UP ROUTINE
                           /
    003F 318FFD            PWRUP,  LXI     SP,STACK          / SET STACK POINTER
                           /
                           /***INITIALIZE PARALLEL PORT AND STOP CRT
                           /
    0042 3E80                      MVI     A,POPWR           / A <- VIDEO POWER MASK
    0044 D33E                      OUT     PAROUT            / STOP BEEPER, CRT POWER ON
    0046 AF                        CLA                       / A <- 0
```

```
     0047 D338                      OUT      CRTCTL          / STOP CRT CONTROLLER
                          /
                          /***WAIT FOR ANY HARDWARE RESETS TO SETTLE
                          /
     0049 010002                    LXI      B,1000          / [B,C] <- 1000
     004C 0B              PWR010,   DCX      B               / WAIT LOOP FOR HARDWARE
     004D 78                        MOV      A,B             / [B,C].EQ.[0,0]?
     004E B1                        ORA      C               / X
     004F C24C00                    JNZ      PWR010          / BRANCH IF [B,C].NE.[0, ]
                                    EJECT

                          /
                          /***ROM CHECKSUM
                          /

\      PATCH 3 NOP'S (00,00,00)' TO
\      SKIP THE ROM CHECKSUM!

     0052 CDBE00                    CALL     ROMCHK          / VALIDATE CHECKSUM
                                                             / RETURN ONLY IF GOOD!
                                    EJECT

                          /
                          /***RAM DIAGNOSTIC
                          /
     0055 2100F8          PWR020,   LXI      H,RAMLO         / [H,L] <- START OF RAM
     0058 010008                    LXI      B,RAMSIZ        / [B,C] <- RAM SIZE
     005B 1601                      MVI      D,:01           / D <- PATTERN
     005D AF                        CLA                      / CLEAR A FOR TESTING
                          /
     005E 72              PWR030,   MOV      M,D             / STORE PATTERN
     005F 23                        INX      H               / INCREMENT POINTER
     0060 0B                        DCX      B               / DECREMENT COUNTER
     0061 B8                        CMP      B               / TEST B.EQ.0
     0062 C25E00                    JNZ      PWR030          / CONTINUE LOOP
     0065 B9                        CMP      C               / C.EQ.0?
     0066 C25E00                    JNZ      PWR030          / NO, CONTINUE
     0069 1E08                      MVI      E,:08           / E <- COUNTER
                          /
     006B 2100F8          PWR040,   LXI      H,RAMLO         / [H,L] <- START OF RAM
     006E 010008                    LXI      B,RAMSIZ        / [B,C] <- RAM SIZE
     0071 7E              PWR050,   MOV      A,M             / A <- CURRENT CONTENTS
     0072 BA                        CMP      D               / PATTERNS MATCH?
     0073 C2AF00                    JNZ      PWRE20          / Z.EQ.0 => ERROR
     0076 87                        ADD      A               / SHIFT LEFT
     0077 77                        MOV      M,A             / STORE INTO RAM
     0078 23                        INX      H               / INCREMENT POINTER
     0079 0B                        DCX      B               / DECREMENT COUNTER
     007A AF                        CLA                      / CLEAR A
     007B B8                        CMP      B               / B.EQ.0?
     007C C27100                    JNZ      PWR050          / NO, CONTINUE
     007F B9                        CMP      C               / C.EQ.0?
     0080 C27100                    JNZ      PWR050          / BRANCH IF NOT ZERO
     0083 7A                        MOV      A,D             / A <- PATTERN
     0084 87                        ADD      A               / SHIFT LEFT
     0085 57                        MOV      D,A             / D <- NEW PATTERN
     0086 1D                        DCR      E               / DECREMENT LOOP COUNTER
     0087 C26B00                    JNZ      PWR040          / E.NE.0 => COUNTINUE
                                    EJECT

                          SUBJOB DECIDE IF DIAGNOSTIC OR P180

                          /         THIS AREA WILL DETERMINE IF A DIAGNOSTIC
                          /         IS TO BE RUN.  IF, ON POWER UP, A DEVICE IS
                          /         CONNECTED TO THE PERIPHERAL PORT 2, AND
                          /         THAT DEVICE SETS 'DATA SET READY', WE WILL
                          /         UNCONDITIONALLY JUMP TO THE DIAGNOSTIC
                          /         LOADER SYSTEM, AND NOT START THE P180.
                          /         IF 'DATA SET READY' IS NOT
                          /         PRESENT, WE CONTINUE ON WITH NORMAL P180.

     008A DB3C                      IN       SP2CTL  / LOOK FOR 'DSR' ON PORT 2
     008C E680                      ANI      SPSDSR  / IS IT SET?
     008E C20033                    JNZ      PDIA    /   YES! GO TO DIAG LOADER SYSTEM

                          /         NOT THERE, DO P180 COLD START
                                    EJECT
```

```
                        SUBJOB INITIALIZE THE P180
                        /
                        /  I/O DEVICE INITIALIZATION
                        /
0091 CD0002                     CALL    SPLINI          / INITIALIZE SPOOLER
0094 CD9E03                     CALL    CLKINI          / INITIALIZE CLOCKS
0097 CD6B02                     CALL    CRTINI          / INITIALIZE CRT CONTROLLER
009A CD2004                     CALL    PPINIT          / INITIALIZE MAINFRAME PORT
                        /
                        /  ENABLE INTERRUPTS
                        /
009D 3EC9                       MVI     A,:C9           / A <- RET INSTRUCTION
009F 3200F8                     STA     INIVEC          / STORE INTO VECTOR
00A2 FB                         EI                      / ENABLE INTERRUPTS
                        /
00A3 CD9F05                     CALL    KBDINI          / INITIALIZE KEYBOARD
                        /
                        /  EXIT TO EXEC
                        /
00A6 C3EF00                     JMP     EXEC
                                EJECT
```

```
                        SUBJOB ERRORS IN POWER-UP
                        /
                        /  ERROR HANDLERS
                        /
00A9 CD0F01             PWRE10, CALL    BEEP            / ROM CHECKSUM FAILED
00AC C3A900                     JMP     PWRE10          / STAY HERE
                        /
00AF CD0F01             PWRE20, CALL    BEEP            / TURN ON BEEPER
00B2 010004                     LXI     B,2000          / [B,C] <- COUNTER
                        PWRE21,
00B5 0B                         DCX     B               / COUNT DOWN
00B6 78                         MOV     A,B             / SEE IF ZERO
00B7 B1                         ORA     C               / X
00B8 C2B500                     JNZ     PWRE21          / BRANCH UNTIL ZERO
00BB C3AF00                     JMP     PWRE20          / TURN ON BEEP AGAIN
                                EJECT
```

```
                                SUBJOB  ROM CHECKSUM DIAGNOSTIC
                        /
                        /***ROM CHECKSUM
                        /
                        /  EACH 1K ROM HAS A CHECKSUM WHICH IS STORED IN THE
                        /  TOP OF THE LAST 1K ROM.   THIS ROUTINE VALIDATES
                        /  THE CHECKSUM.
                        /
                        /***CALLING SEQUENCE
                        /
                        /       CALL    ROMCHK
                        /
                        /***PARAMETERS :
                        /
                        /       CHECKSUMS STORED AT TOP OF MEMORY
                        /
                        /***REGISTER USAGE:
                        /
                        /       [B,C] : SCRATCH
                        /       [D,E] : SCRATCH
                        /       [H,L] . SCRATCH
                        /
                        /***RETURN
                        /
                        /       RETURN ONLY IF OKAY; ELSE
                        /       UNCONDITIONAL JUMP TO ERROR BEEPER
                        /
                                EJECT
```

```
                        / INITIALIZE POINTER, BYTE COUNT TO COMPUTE CHECKSUM.
                        / A CHECKSUM IS COMPUTED ON ALL 1024 BYTES FOR EACH 1K
                        / AREA OF PROM EXCPT THE LAST.   THESE CHECKSUMS ARE
                        / STORED IN CONSECUTIVE LOCATIONS AT THE TOP OF THE
                        / LAST PROM.   FOR THE LAST PROM,
                        / THE CHECKSUM IS COMPUTED
                        / FOR THE FIRST 1023 BYTES (WHICH INCLUDES THE LOWER-
                        / PROM CHECKSUMS) AND COMPARED WITH
```

```
                    / A CHECKSUM STORED IN THE
                    / LAST BYTE OF LAST PROM.

                    ROMCHK,
00BE 21F237                  LXI     H,ROMHI-NUM1K+1 / ADDRESS OF CHECKSUMS
00C1 E5                      PUSH    H               / SAVE ON STACK

00C2 210000                  LXI     H,ROMLO / START OF PROGRAM PROMS
00C5 0E0E                    MVI     C,NUM1K / SET # OF PROMS TO PASS OVER

                    /        HERE TO TEST A 1K AREA OF PROM

                    ROMTES,
00C7 AF                      CLA                  / SET CARRY AND A TO 0
00C8 F5                      PUSH    PSW          / SET STACK
00C9 11FF03                  LXI     D,:400-1/ # OF BYTES TO DO (-1)

                    /        COMPUTE THE CHECKSUM

                    ROMTS1,
00CC F1                      POP     PSW          / GET CURRENT SUM
00CD 8E                      ADC     M            / ADD IN NEXT BYTE
00CE CE00                    ACI     0            / ADD IN CARRY
00D0 F5                      PUSH    PSW          / SAVE CURRENT SUM

00D1 23                      INX     H            / INDEX THE BYTE POINTER
00D2 1B                      DCX     D            / DECR COUNT
00D3 7B                      MOV     A,E          / TEST D/E FOR 0
00D4 B2                      ORA     D            / X
00D5 C2CC00                  JNZ     ROMTS1       / NOT DONE, LOOP

                    /        ARE WE IN THE LAST 1K?

00D8 F1                      POP     PSW          / GET SUM
00D9 0D                      DCR     C            / IN LAST 1K?
00DA CAE100                  JZ      ROMTS2       /   YES, MAKE FINAL CHECK

                    /        HERE WHEN NOT IN LAST PROM, ADD LAST BYTE OF THIS

00DD 8E                      ADC     M            / ADD LAST BYTE
00DE CE00                    ACI     0            / ADD LAST CARRY
00E0 23                      INX     H            / TO NEXT PROM

                    /        HERE TO TEST CHECKSUM

                    ROMTS2,
00E1 E3                      XTHL                 / GET PTR TO SUM
00E2 96                      SUB     M            / SUM-STORED = 0?
00E3 C2A900                  JNZ     PWRE10       /   NO! ERROR

                    /        CHECKSUM OK!

00E6 23                      INX     H            / STEP TO NEXT SUM IN MEMORY
00E7 E3                      XTHL                 / SAVE SUM PTR, GET PROM PTR

00E8 79                      MOV     A,C          / GET COUNT OF AREAS TO DO
00E9 B7                      TST                  / ANY MORE?
00EA C2C700                  JNZ     ROMTES       /   YES, LOOP

                    /        DONE!

00ED E1                      POP     H            / CLEAN STACK
00EE C9                      RET
                             EJECT

                             SUBJOB  SYSTEM EXECUTIVE
                    /
                    /***SYSTEM EXEC
                    /
00EF 318FFD         EXEC,    LXI     SP,STACK          / INITIALIZE STACK
                    /
00F2 3A9BFD         EXEC10,  LDA     SPLBLK+BFUSE      / A <- SPOOLER USAGE COUNT
00F5 B7                      TST                       / A. EQ. 0 => SPOOLER EMPTY
00F6 C42F02                  CNZ     SPOOLR            / CALL SPOOLER
00F9 3AADFD                  LDA     KBDBLK+BFUSE      / A <- KEYBOARD USAGE COUNT
00FC B7                      TST                       / A . EQ. 0 => NO KEYSTROKES
00FD C4CD06                  CNZ     KBDCMD            / CALL KEYBOARD HANDLER
0100 C3F200                  JMP     EXEC10            / CONTINUE ON
                             EJECT
```

```
                        SUBJOB  MOVE STRING UTILITY
                  /
                  /***SUBROUTINE MOVSTR
                  /
                  /***CALLING SEQUENCE:
                  /
                  /        CALL     MOVSTR  - STANDARD STRING FORMAT
                  /        CALL     MOVS10  - B LOADED WITH COUNT
                  /
                  /***PARAMETERS:
                  /
                  /        [D,E] : ADDRESS OF STRING TO BE MOVED
                  /        [H,L] : ADDRESS OF DESTINATION
                  /
                  /***REGISTER USAGE
                  /
                  /        A     : SCRATCH
                  /        [B,C] : SCRATCH
                  /        [D,E] : SOURCE ADDRESS (DESTROYED)
                  /        [H,L] : DESTINATION ADDRESS (DESTROYED)
                  /
                  /***STRING FORMAT:
                  /
                  /        BYTE 0 : LENGTH OF STRING
                  /        BYTE 1 : DATA
                  /        BYTE 2 : DATA
                  /          ETC      ETC
                  /
                  /
0103 1A           MOVSTR, LDAX     D               / A <- BYTE COUNT
0104 47                   MOV      B,A             / B <- BYTE COUNT
0105 13                   INX      D               / BUMP POINTER
                  /
0106 1A           MOVS10, LDAX     D               / A <- DATA BYTE
0107 77                   MOV      M,A             / STORE IT
0108 13                   INX      D               / BUMP SOURCE POINTER
0109 23                   INX      H               / BUMP DESTINATION POINTER
010A 05                   DCR      B               / DECREMENT COUNT
010B C20601               JNZ      MOVS10          / COUNT.NE.0 => COUNTINU
010E C9                   RET                      / EXIT
                          EJECT
```

```
                        SUBJOB  BEEPER SUBROUTINE
                  /
                  /***SUBROUTINE BEEP
                  /
                  /***TURN ON BEEPER
                  /
                  /***CALLING SEQUENCE:
                  /
                  /        CALL     BEEP    - ONE SECOND BEEP
                  /        CALL     BEEP10 - ONE TENTH SECOND BEEP
                  /
                  /***PARAMETERS:
                  /
                  /        NONE
                  /
                  /***REGISTER USAGE:
                  /
                  /        A     : SCRATCH
                  /        [B,C] : NOT USED
                  /        [D,E] : NOT USED
                  /        [H,L] : NOT USED
                  /
                  /
010F 3E3C         BEEP,   MVI      A,@60           / A <- 60HZ COUNT
0111 C31601               JMP      BEEP20          / GO TO COMMON CODE
                  /
0114 3E06         BEEP10, MVI      A,6             / A <- 0.1 SEC BEEP
                  /
0116 328FFD       BEEP20, STA      TMRBEEP         / LOAD TIMER
0119 3AB4FD               LDA      POSAVE          / GET STATUS OF PAROUT
011C F640                 ORI      POBEEP          / SET BEEPER FLAG
011E D33E                 OUT      PAROUT          / TURN ON BEEPER
0120 32B4FD               STA      POSAVE          / SAVE PORT STATUS
0123 C9                   RET                      / EXIT
                          EJECT
```

```
                  SUBJOB  BUFFER HANDLERS
          /
          /***CIRCULAR BUFFER HANDLERS
          /
          /***ROUTINES:
          /
          /       BFINIT : INITIALIZE BUFFER
          /       BFCH   : BUFFER A CHARACTER (BYTE)
          /       UBFCH  : UNBUFFER A CHARACTER (BYTE)
          /
                  EJECT
```

```
          /
          /***SUBROUTINE BFINIT
          /
          /***INITIALIZE CIRCULAR BUFFER
          /
          /***CALLING SEQUENCE:
          /
          /       CALL    BFINIT
          /
          /***PARAMETERS:
          /
          /       [B,C] : BASE ADDRESS OF BUFFER
          /       [D,E] : BUFFER LENGTH
          /       [H,L] : BUFFER BLOCK ADDRESS
          /
          /***REGISTER USAGE:
          /
          /       A     : SCRATCH
          /       [B,C] : BASE ADDRESS OF BUFFER (PRESERVED)
          /       [D,E] : BUFFER LENGTH (PRESERVED)
          /       [H,L] : BUFFER BLOCK ADDRESS (DESTROYED)
          /
          /***NOTE:
          /
          /  BUFFER BLOCKS MAY BE A
          /  MAXIMUM OF 255 BYTES IN LENGTH
          /
                  EJECT
```

```
0124 D7   BFINIT, MOVBC                   / STORE BASE ADDRESS
0125 AF           CLA                     / CLEAR A
0126 77           MOV     M,A             / CLEAR IPTR
0127 23           INX     H               / BUMP ADDRESS
0128 77           MOV     M,A             / CLEAR OPTR
0129 23           INX     H               / BUMP ADDRESS
012A 73           MOV     M,E             / SET LENGTH
012B 23           INX     H               / BUMP ADDRESS
012C 77           MOV     M,A             / CLEAR USAGE COUNT
012D C9           RET                     / EXIT
                  EJECT
```

```
          /
          /***SUBROUTINE BFCH
          /
          /***BUFFER A CHARACTER (BYTE) (PUT INTO BUFFER)
          /
          /***CALLING SEQUENCE:
          /
          /       CALL    BFCH
          /
          /***PARAMETERS:
          /
          /       A     : CHARACTER
          /       [B,C] : BUFFER BLOCK ADDRESS
          /
          /***REGISTER USAGE:
          /
          /       A     : CHARACTER (PRESERVED)
          /       [B,C] : BUFFER BLOCK ADDRESS (PRESERVED)
          /       [D,E] : PRESERVED
          /       [H,L] : SCRATCH
          /
          /***EXIT.
          /
```

```
                   /      Z-BIT.EQ.0 => CHARACTER NOT BUFFERED, BUFFER FUL
                   /      Z-BIT.EQ.1 => CHARACTER BUFFERED
                   /
                          EJECT

012E F5            BFCH,  PUSH    PSW          / SAVE CHAR
012F 210400               LXI     H,BFLEN      / [H,L] <- OFFSET
0132 09                   DAD     B            / [H,L] <- BFLEN ADDRESS
0133 7E                   MOV     A,M          / A <- LENGTH
0134 23                   INX     H            / [H,L] <- USAGE ADDRESS
0135 BE                   CMP     M            / CHECK FOR BUFFER FULL
0136 C24001               JNZ     BFCH10       / BRANCH IF SPACE AVAILABLE
0139 F1                   POP     PSW          / RESTORE CHAR
013A 67                   MOV     H,A          / H <- CHAR
013B 24                   INR     H            / SET UP TEST
013C BC                   CMP     H            / TO CLEAR Z-BIT
013D C35501               JMP     BFCHX        / RIGHT HERE
                   /
0140 C5            BFCH10, PUSH   B            / SAVE [B,C]
0141 34                   INR     M            / INCREMENT USAGE COUNT
0142 2B                   DCX     H            / [H,L] <- BFLEN ADDRESS
0143 7E                   MOV     A,M          / A <- LENGTH
0144 2B                   DCX     H            / [H,L] <- OPTR
0145 2B                   DCX     H            / [H,L] <- IPTR ADDRESS
0146 4E                   MOV     C,M          / GET CURRENT INPUT POINTER
0147 34                   INR     M            / IPTR <- IPTR + 1
0148 3D                   DCR     A            / A <- MASK
0149 A6                   ANA     M            / KEEP IPTR MODULO BASE
014A 77                   MOV     M,A          / UPDATE POINTER
014B 2B                   DCX     H            / [H,L] <- BFBASE LOW
014C 2B                   DCX     H            / [H,L] <- BFBASE HIGH
014D 0600                 MVI     B,0          / B <- 0
014F E7                   GETHL                / [H,L] <- BUFFER BASE
0150 09                   DAD     B            / [H,L] <- BUFFER ADDRESS
0151 C1                   POP     B            / RESTORE [B,C]
0152 F1                   POP     PSW          / GET CHARACTER
0153 77                   MOV     M,A          / STORE INTO BUFFER
0154 BF                   CMP     A            / SET Z-BIT
                   /
0155 C9            BFCHX, RET                  / EXIT
                          EJECT

                   /
                   /***SUBROUTINE UBFCH
                   /
                   /***UNBUFFER A CHARACTER (BYTE) ((GET A BYTE))
                   /
                   /***CALLING SEQUENCE:
                   /
                   /      CALL    UBFCH
                   /
                   /***PARAMETERS:
                   /
                   /      A     : CHARACTER ON EXIT
                   /      [B,C] : BUFFER BLOCK ADDRESS
                   /
                   /***REGISTER USAGE:
                   /
                   /      A     : CHARACTER
                   /      [B,C] : BUFFER BLOCK ADDRESS (PRESERVED)
                   /      [D,E] : PRESERVED
                   /      [H,L] : SCRATCH
                   /
                   /***EXIT:
                   /
                   /      Z-BIT.EQ.0 => BUFFER EMPTY
                   /      Z-BIT.EQ.1 => A HAS CHARACTER
                   /
                          EJECT

0156 C5            UBFCH, PUSH    B            / SAVE [B,C]
0157 210500               LXI     H,BFUSE      / [H,L] <- OFFSET
015A 09                   DAD     B            / [H,L] <- USAGE COUNT
015B AF                   CLA                  / A <- 0
015C BE                   CMP     M            / BFUSE.EQ.0 => BUFF EMPTY
015D C26601               JNZ     UBFCH1       / BRANCH IF NOT EMPTY
0160 C1                   POP     B            / POP STACK
```

```
0161 FEFF            CPI     -1              / CLEAR Z-BIT
0163 C38001          JMP     UBFCHX          / GO TO EXIT
                  /
0166 35     UBFCH1,  DCR     M               / USAGE <- USAGE - 1
0167 2B              DCX     H               / [H,L] <- BFLEN
0168 2B              DCX     H               / [H,L] <- OPTR
0169 4E              MOV     C,M             / C <- OFFSET TO BUFFER
016A 0600            MVI     B,0             / B <- 0
016C 2B              DCX     H               / [H,L] <- IPTR
016D 2B              DCX     H               / [H,L] <- BFBASE ADDR LOW
016E 2B              DCX     H               / [H,L] <- BFBASE ADDR H 3H
016F E7              GETHL                   / [H,L] <- BUFFER BASE
0170 09              DAD     B               / [H,L] <- CHARACTER ADDR
0171 7E              MOV     A,M             / A <- CHARACTER
0172 C1              POP     B               / RESTORE [B,C]
0173 F5              PUSH    PSW             / SAVE CHARACTER
0174 210400          LXI     H,BFLEN         / [H,L] <- OFFSET
0177 09              DAD     B               / [H,L] <- LENGTH ADDRESS
0178 7E              MOV     A,M             / A <- BUFFER LENGTH
0179 3D              DCR     A               / CREATE MASK
017A 2B              DCX     H               / [H,L] <- OPTR ADDRESS
017B 34              INR     M               / OPTR <- OPTR + 1
017C A6              ANA     M               / MASK OUT OVERFLOW
017D 77              MOV     M,A             / SET UP POINTER
017E F1              POP     PSW             / A <- CHARACTER
017F BF              CMP     A               / SET Z-BIT
                  /
0180 C9     UBFCHX,  RET                     / EXIT
                     EJECT

                     SUBJOB  BCD-TO-BINARY CONVERSION
                  /
                  /***BCD-TO-BINARY CONVERSION
                  /
                  /***ENTRY POINTS:
                  /
                  /          BCDBN4 : 4-DIGIT BCD
                  /          BCDBN3 : 3-DIGIT BCD
                  /          BCDBN2 : 2-DIGIT BCD
                  /          BCDBN1 : 1-DIGIT BCD
                  /
                  /***REGISTER USAGE:
                  /
                  /          A     - SCRATCH
                  /          [B,C] - SCRATCH
                  /          [D,E] - POINTER TO BCD NUMBER (DESTROYED)
                  /          [H,L] - BINARY VALUE ON EXIT
                  /
                  /***ILLEGAL BCD NUMBER YIELDS RESULT OF ZERO
                  /
                  /***EXITS:
                  /
                  /          Z-BIT.EQ.0 => ILLEGAL BCD NUMBER
                  /          Z-BIT.EQ.1 => VALID RESULT
                  /
0181 210000 BCDBN4,  LXI     H,0             / INITIALIZE RESULT
0184 01E803          LXI     B,@1000         / [B,C] <- 1000
0187 CDA901          CALL    BCDSUB          / GET AND VALIDATE DIGIT
018A C2A801          JNZ     BCDX            / BRANCH ON ERROR
018D 13              INX     D               / MOVE PTR TO NEXT DIGIT
                  /
018E 016400 BCDBN3,  LXI     B,@100          / [B,C] <- 100
0191 CDA901          CALL    BCDSUB          / GET AND VALIDATE DIGIT
0194 C2A801          JNZ     BCDX            / BRANCH ON ERROR
0197 13              INX     D               / MOVE PTR TO NEXT DIGIT
                  /
0198 010A00 BCDBN2,  LXI     B,@10           / [B,C] <- 10
019B CDA901          CALL    BCDSUB          / GET AND VALIDATE DIGIT
019E C2A801          JNZ     BCDX            / BRANCH ON ERROR
01A1 13              INX     D               / MOVE PTR TO UNIT'S DIGIT
                  /
01A2 010100 BCDBN1,  LXI     B,1             / [B,C] <- 1
01A5 CDA901          CALL    BCDSUB          / GET AND VALIDATE DIGIT
                  /
01A8 C9     BCDX,    RET                     / EXIT
                     EJECT
```

```
01A9 1A        BCDSUB, LDAX    D            / A <- BCD DIGIT
01AA D630              SUI     ASCO         / MAKE IT BINARY
01AC FABD01            JM      BCDS20       / BRANCH ON ERROR
01AF FE0A              CPI     :A           / CHECK FOR VALID BCD DIGIT
01B1 F2BD01            JP      BCDS20       / BRANCH ON ERROR
01B4 B7                TST                  / CHECK FOR ZERO
               /
01B5 CAC101    BCDS10, JZ      BCDSX        / GO TO EXIT
01B8 09                DAD     B            / ADD TO BINARY VALUE
01B9 3D                DCR     A            / DECREMENT POINTER
01BA C3B501            JMP     BCDS10       / AND CONTINUE
               /
01BD 210000    BCDS20, LXI     H,0          / CLEAR RESULT ON ERROR
01C0 BC                CMP     H            / CLEAR Z-BIT
               /
01C1 C9        BCDSX,  RET                  / EXIT
                       EJECT

                       SUBJOB  BINARY-TO-BCD CONVERSION
               /
               /***BINARY-TO-BCD CONVERSION
               /
               /***ENTRY POINTS.
               /
               /       BNBCD4 : 4-DIGIT RESULT
               /       BNBCD3 : 3-DIGIT RESULT
               /       BNBCD2 : 2-DIGIT RESULT
               /       BNBCD1 : 1-DIGIT RESULT

               /***REGISTER USAGE.
               /
               /       A     - SCRATCH
               /       [B,C] - SCRATCH
               /       [D,E] - POINTER TO BCD DESTINATION (DESTROYED)
               /       [H,L] - BINARY VALUE (DESTROYED)
               /
01C2 3E30      BNBCD4, MVI     A,ASCO       / SET A
01C4 0118FC            LXI     B,-@1000     / [B,C] <- DECREMENT
               /
01C7 09        BN010,  DAD     B            / COMPUTE THOUSAND'S DIGIT
01C8 D2CF01            JNC     BN020        / BRANCH ON BORROW
01CB 3C                INR     A            / BUMP DIGIT
01CC C3C701            JMP     BN010        / CONTINUE
               /
01CF 12        BN020,  STAX    D            / STORE DIGIT
01D0 13                INX     D            / BUMP POINTER
01D1 01E803            LXI     B,@1000      / [B,C] <- 1000
01D4 09                DAD     B            / RESET BINARY VALUE
               /
01D5 3E30      BNBCD3, MVI     A,ASCO       / RESET A
01D7 019CFF            LXI     B,-@100      / [B,C] <- DECREMENT
               /
01DA 09        BN030,  DAD     B            / COMPUTE'S HUNDRED'S DIGIT
01DB D2E201            JNC     BN040        / BRANCH ON BORROW
01DE 3C                INR     A            / BUMP DIGIT
01DF C3DA01            JMP     BN030        / AND CONTINUE
               /
01E2 12        BN040,  STAX    D            / STORE DIGIT
01E3 13                INX     D            / BUMP POINTER
01E4 016400            LXI     B,@100       / RESET BINARY VALUE
01E7 09                DAD     B            / FOR TEN'S
               /
01E8 3E30      BNBCD2, MVI     A,ASCO       / SET A
01EA 01F6FF            LXI     B,-@10       / [B,C] <- DECREMENT
               /
01ED 09        BN050,  DAD     B            / COMPUTE TEN'S DIGIT
01EE D2F501            JNC     BN060        / BRANCH ON BORROW
01F1 3C                INR     A            / INCREMENT RESULT
01F2 C3ED01            JMP     BN050        / AND CONTINUE
               /
01F5 12        BN060,  STAX    D            / STORE DIGIT
01F6 13                INX     D            / BUMP POINTER
01F7 010A00            LXI     B,@10        / RESET BINARY VALUE
01FA 09                DAD     B            / FOR UNIT'S DIGIT
               /
01FB 3E30      BNBCD1, MVI     A,ASCO       / SET A
01FD 85                ADD     L            / COMPUTE UNIT'S DIGIT
```

```
01FE 12                  STAX    D                / STORE IT
01FF C9                  RET                      / EXIT
                         EJECT

                         SUBJOB  SPOOLER HANDLERS
               /
               / SPOOLER FUNCTIONS
               /
               / SPLINI - INITIALIZE SPOOLER QUEUE
               /
0200 01C0FF    SPLINI,   LXI     B,SPLBUF         / [B,C] <- START OF QUEUE
0203 114000              LXI     D,SPLBFL         / [D,E] <- LENGTH OF QUEUE
0206 2196FD              LXI     H,SPLBLK         / [H,L] <- SPOOLER BLOCK
0209 CD2401              CALL    BFINIT           / INITIALIZE SPOOLER
020C C9                  RET                      / RETURN
                         EJECT

               /
               / SPOOLI - BUFFER A SPOOLER COMMAND
               /
               / COMMAND FORMAT.
               /
               /         BYTES      USE
               /         -----      ---
               /           0      NUMBER OF BYTES IN SPOOLER COMMAND
               /          1-2     ADDRESS OF START OF COMMAND
               /                  DATA AS REQUIRED
               /
               /***CALLING SEQUENCE:
               /
               /         CALL     SPOOLI
               /
               /***PARAMETERS.
               /
               /         [B,C] -> COMMAND PACKET
               /
               /***REGISTER USAGE:
               /
               /         A     : SCRATCH
               /         [B,C] . COMMAND PACKET ADDRESS (DESTROYED)
               /         [D,E] : PRESERVED
               /         [H,L] . SCRATCH
               /
               /***EXIT:
               /
               /         Z.EQ.0 => COMMAND NOT QUEUED, SPACE NOT AVAILABLE
               /         Z.EQ.1 => COMMAND QUEUED
               /
                         EJECT

020D 0A        SPOOLI,   LDAX    B                / A <- BYTE COUNT
020E 2F                  CMA                      / MAKE IT NEGATIVE
020F 3C                  INR     A                / TWO'S COMP
0210 219BFD              LXI     H,SPLBLK+BFUSE   / [H,L] -> WORDS IN USE
0213 96                  SUB     M                / A <- SPACE LEFT
0214 C640                ADI     SPLBFL           / A.LT.0 => NOT ENOUGH ROOM
0216 F21D02              JP      SPLI10           / A.GE.0 => SPACE AVAILABLE
0219 B7                  TST                      / CLEAR Z-BIT
021A C32E02              JMP     SPLIX            / GO TO EXIT
               /
021D 0A        SPLI10,   LDAX    B                / A <- BYTE COUNT
               /
021E F5        SPLI15,   PUSH    PSW              / SAVE COUNT
021F 03                  INX     B                / BUMP POINTER
0220 0A                  LDAX    B                / A <- COMMAND BYTE
0221 C5                  PUSH    B                / SAVE POINTER
0222 0196FD              LXI     B,SPLBLK         / [B,C] <- SPOOLER BLOCK
0225 CD2E01              CALL    BFCH             / BUFFER BYTE
0228 C1                  POP     B                / RESTORE COMMAND POINTER
0229 F1                  POP     PSW              / RESTORE COUNT
022A 3D                  DCR     A                / COUNT.EQ.0 => QUIT
022B C21E02              JNZ     SPLI15           / COUNT.NE.0 => CONTINUE
               /
022E C9        SPLIX,    RET                      / EXIT
                         EJECT
```

```
                  /
                  /***SUBROUTINE SPOOLR
                  /
                  /***EXECUTE A SPOOLER COMMAND
                  /
                  /***CALLING SEQUENCE:
                  /
                  /        CALL     SPOOLR
                  /
                  /***PARAMETERS:
                  /
                  /        NONE
                  /
                  /***REGISTER USAGE:
                  /
                  /        A      - SCRATCH
                  /        [B,C] - SCRATCH
                  /        [D,E] - SCRATCH
                  /        [H,L] - SCRATCH
                  /
                           EJECT

022F 0196FD       SPOOLR, LXI     B,SPLBLK         / [B,C] <- SPOOLER BLOCK
0232 CD5601               CALL    UBFCH            / GET LOW-ORDER COMMAND
0235 C24402               JNZ     SPLRX            / BRANCH ON ERROR
0238 F5                   PUSH    PSW              / SAVE BYTE
0239 CD5601               CALL    UBFCH            / GET HIGH-ORDER ADDRESS
023C C24302               JNZ     SPLR10           / BRANCH ON ERROR
023F 67                   MOV     H,A              / H <- HIGH-ORDER
0240 F1                   POP     PSW              / POP STACK
0241 6F                   MOV     L,A              / L <- LOW-ORDER
0242 E9                   PCHL                     / EXECUTE
                  /
0243 F1           SPLR10, POP     PSW              / CLEAN STACK
                  /
0244 C9           SPLRX,  RET                      / RETURN
                          EJECT

                          SUBJOB  INTERRUPT HANDLER
                  /
                  /***ROUTINE INTRP
                  /
                  /***SYSTEM INTERRUP HANDLER
                  /
                  /***CALLING SEQUENCE:
                  /
                  /       AN RST 7 INSTRUCTION IS GENERATED WHEN:
                  /               INTERRUPT ENABLE IS TRUE AND
                  /               A DEVICE ISSUES AN INTERRUPT REQUEST
                  /
                  /
                  /***PARAMETERS .
                  /
                  /       NONE
                  /
                  /***REGISTER USAGE:
                  /
                  /       SAVES ALL REGISTERS AND RESTORES THEM
                  /
                          EJECT

0245 F5           INTRP,  PUSH    PSW              / SAVE A
0246 C5                   PUSH    B                / SAVE [B,C]
0247 D5                   PUSH    D                / SAVE [D,E]
0248 E5                   PUSH    H                / SAVE [H,L]

                  /       CHECK FOR PERIPHERAL PORT: IF ACTIVE,
                  /       ONLY DO IT!

0249 DB3A                 IN      SPISTA  / READ STATUS OF PORT
024B 47                   MOV     B,A     / SAVE IN B FOR CALL

024C E603                 ANI     SPSRRY+SPSTRY    / CHECK RECVR + XMIT
024E CA5702               JZ      INTR10           /   NO ACTION, CHECK OTHERS
```

```
0251 CD5304          CALL    PRINT   / ACTIVE! GO PROCESS

0254 C36502          JMP     INTREX  / EXIT TO REGULAR

                /       HERE WHEN PERIPHERAL PORT NOT ACTIVE,
                /       SEE IF CRT INTERRUPT IS UP

                INTR10,
0257 DB38            IN      CRTSTA  / GET STATUS
0259 E620            ANI     CRTSIR  / CHECK FOR INTERRUPT
025B CA6502          JZ      INTREX  /   NONE, EXIT

                /       HERE WHEN CRT INTERRUPTED. IT IS USED AS A
                /       "CLOCK" FOR TIMERS AND KEYBOARD POLLING

025E CD6406          CALL    KBDINT  / POLL KEYBOARD
0261 FB              EI              / ALLOW RE-ENTRANCY ON TIMERS
0262 CDAB03          CALL    CLKINT  / HANDLE TIMERS

                /       EXIT

                INTREX,
0265 E1              POP     H       / RESTORE AND EXIT
0266 D1              POP     D       / X
0267 C1              POP     B       / X
0268 F1              POP     PSW     / X
0269 FB              EI              / ALLOW ALL
026A C9              RET

                     EJECT

                     SUBJOB  CRT CONTROLLER FUNCTIONS
                /
                /***CRT CONTROLLERS FUNCTIONS
                /
                /***ROUTINES.
                /
                /       CRTINI - INITIALIZE CRT CONROLLER
                /
                     EJECT

                /
                /***SUBROUTINE CRTINI
                /
                /***CALLING SEQUENCE:
                /
                /       CALL    CRTINI
                /
                /***PARAMETERS:
                /
                /       NONE
                /
                /***REGISTER USAGE.
                /
                /       A     : SCRATCH
                /       [B,C] . SCRATCH
                /       [D,E] . SCRATCH
                /       [H,L] . SCRATCH
                /
                /***SUBROUTINES USED
                /
                /       DMAINT . DMA INITIALIZATION
                /
                     EJECT

026B 3E00       CRTINI, MVI  A,CMDRST       / A <- RESET AND STOP CMD
026D D338            OUT     CRTCTL         / WRITE TO CONTROLLER
                /
026F 3E43            MVI     A,COMPB1       / A <- COMPOSITION BYTE 1
0271 D339            OUT     CRTDAT         / LOAD IT
0273 3E14            MVI     A,COMPB2       / A <- COMPOSITION BYTE
0275 D339            OUT     CRTDAT         / LOAD IT
0277 3E7B            MVI     A,COMPB3       / A <- COMPOSITION BYTE 3
0279 D339            OUT     CRTDAT         / LOAD IT
027B 3E36            MVI     A,COMPB4       / A <- COMPOSITION BYTE 4
027D D339            OUT     CRTDAT         / LOAD IT
                /
```

```
027F 3E80             MVI    A,CMDCUR        / A <- CURSOR COMMAND
0281 D338             OUT    CRTCTL          / ISSUE COMMAND
0283 3E7F             MVI    A,CURHOZ        / GET CURSOR COLUMN
0285 D339             OUT    CRTDAT          / LOAD IT
0287 3E00             MVI    A,CURVER        / GET CURSOR ROW
0289 D339             OUT    CRTDAT          / LOAD IT
            /
028B CDB002           CALL   DMAINI          / INITIALIZE DMA + FORMAT
                                             /   REFRESH AREA

            /
028E 3EE0             MVI    A,CMDPRE        / A <- PRESET COMMAND
0290 D338             OUT    CRTCTL          / PRESET COUNTERS
            /
0292 3E2B             MVI    A,CMDST+BURST   / A <- START PARAMETERS
0294 D338             OUT    CRTCTL          / START DISPLAY
            /
            /***SYNC LOOP TO START DMA ON VERTICAL RETRACE
            /
0296 DB38   CRT010,   IN     CRTSTA          / READ STATUS
0298 E620             ANI    CRTSIR          / CHECK FOR VERTICAL RET 9C
029A C29602           JNZ    CRT010          / BRANCH IF ACTIVE.
            /
029D DB38   CRT020,   IN     CRTSTA          / READ STATUS
029F E620             ANI    CRTSIR          / CHECK VERTICAL RETRACE
02A1 CA9D02           JZ     CRT020          / BRANCH IF NOT ACTIVE
            /
02A4 3E8C             MVI    A,DMACMD        / START DMA ON LEADING EDGE
02A6 D328             OUT    DMAMOD          / OF VERTICAL RETRACE
02A8 3E80             MVI    A,POPWR         / A <- CRT POWER ENABLE
02AA D33E             OUT    PAROUT          / TURN ON TUBE
02AC 32B4FD           STA    POSAVE          / SAVE STATE
02AF C9               RET                    / EXIT
                      EJECT

            /
            /***SUBROUTINE DMAINI
            /
            /***DMA INITIALIZATION FOR CRT
            /
            /***CALLING SEQUENCE.
            /
            /         CALL   DMAINI
            /
            /***PARAMETERS:
            /
            /         NONE
            /
            /***REGISTER USAGE.
            /
            /         A      . SCRATCH
            /         [B,C]  . SCRATCH
            /         [D,E]  . SCRATCH
            /         [H,L]  . SCRATCH
            /
                      EJECT

02B0 AF     DMAINI,   CLA                    / A <- 0
02B1 D328             OUT    DMAMOD          / RESET DMA MODE REGISTER
02B3 3E06             MVI    A,DM60AL        / A <- REFRESH ADDRESS L W
02B5 D324             OUT    DMA2AD          / LOAD DATA
02B7 3EF8             MVI    A,DM60AH        / A <- REFRESH ADDRESS HIGH
02B9 D324             OUT    DMA2AD          / LOAD DATA
02BB 3E47             MVI    A,DM60TL        / A <- TERMINAL COUNT LOW
02BD D325             OUT    DMA2TC          / LOAD DATA
02BF 3E85             MVI    A,DM60TH+DMARED / A <- TERMINAL COUNT HI
02C1 D325             OUT    DMA2TC          / LOAD DATA
            /
02C3 3E06             MVI    A,DM60AL        / A <- REFRESH ADDRESS L W
02C5 D326             OUT    DMA3AD          / LOAD DATA
02C7 3EF8             MVI    A,DM60AH        / A <- REFRESH ADDRESS HIGH
02C9 D326             OUT    DMA3AD          / LOAD DATA
02CB 3E47             MVI    A,DM60TL        / A <- TERMINAL COUNT LOW
02CD D327             OUT    DMA3TC          / LOAD DATA
02CF 3E85             MVI    A,DM60TH+DMARED / A <- TERMINAL COUNT HI H
02D1 D327             OUT    DMA3TC          / LOAD DATA
                      EJECT
```

```
                   /
                   /***INITIALIZE REFRESH MEMORY
                   /
02D3 2104F8                  LXI     H,CRTRFH        / [H,L] <- START OF REFRESH
02D6 CDFE02                  CALL    ROWPAD          / DO FIRST ROW
02D9 CDFE02                  CALL    ROWPAD          / DO SECOND ROW
02DC 060E                    MVI     B,ROWCNT        / B <- COUNTER
                   /
02DE CD0503        DMA010,   CALL    ROWLOG          / DO A LOGIC ROW
02E1 05                      DCR     B               / DONE?
02E2 C2DE02                  JNZ     DMA010          / NO, CONTINUE
                   /
02E5 CDFE02                  CALL    ROWPAD          / DO A PAD ROW
02E8 CDFE02                  CALL    ROWPAD          / DO A PAD ROW
02EB CD2403                  CALL    ROWBLK          / DO BLANK ROW
02EE CD2903                  CALL    ROWST1          / DO FIRST STATUS ROW
02F1 CD4003                  CALL    ROWST2          / DO SECOND STATUS ROW
                   /
02F4 0601                    MVI     B,PADCNT        / B <- COUNT
02F6 CDFE02        DMA020,   CALL    ROWPAD          / DO A PAD ROW
02F9 05                      DCR     B               / DONE?
02FA C2F602                  JNZ     DMA020          / NO, CONTINUE

02FD C9                      RET                     / EXIT
                             EJECT
```

```
                   /
                   /***SUBROUTINES TO BUILD REFRESH MEMORY
                   /
02FE 36F1          ROWPAD,   MVI     M,DMAEOR        / STORE END-OF-ROW
0300 23                      INX     H               / BUMP POINTER
0301 3620                    MVI     M,DMABLK        / STORE A PAD CHARACTER
0303 23                      INX     H               / BUMP POINTER
0304 C9                      RET                     / EXIT
                   /
                   /***DO A LOGIC ROW
                   /
0305 0E0B          ROWLOG,   MVI     C,MAXCOL        / 11 NODES PER ROW
0307 CD1203                  CALL    ROWBEG          / START ROW
                   /
030A CD1703        ROWL10,   CALL    ROWNOD          / DO A NODE
030D 0D                      DCR     C               / DONE?
030E C20A03                  JNZ     ROWL10          / NO, LOOP AGAIN
0311 C9                      RET                     / EXIT
                   /
0312 1602          ROWBEG,   MVI     D,2             / START ROW WITH A FIELD
0314 C31903                  JMP     ROWN10          / ATTRIBUTE AND 2 BLANKS
                   /
0317 1606          ROWNOD,   MVI     D,DSPNOD-1      / CHARACTERS PER NODE
                   /
0319 3680          ROWN10,   MVI     M,DMAFAN        / STORE A FIELD ATTRIBUTE
                   /
031B 23            ROWN20,   INX     H               / BUMP POINTER
031C 3620                    MVI     M,DMABLK        / STORE A BLANK
031E 15                      DCR     D               / DONE?
031F C21B03                  JNZ     ROWN20          / NO, LOOP
0322 23                      INX     H               / BUMP POINTER
0323 C9                      RET                     / EXIT
                             EJECT
```

```
                   /
                   /***DO A BLANK ROW
                   /
0324 1644          ROWBLK,   MVI     D,ROWC-1        / 64 BLANKS
0326 C31903                  JMP     ROWN10          / PUT IN DISPLAY
                   /
                   /***DO ASSEMBLY/STATUS ROW 1
                   /
0329 118803        ROWST1,   LXI     D,DMAST3        / [D,E] <- STRING ADDRES
032C CD0301                  CALL    MOVSTR          / FORMAT CONTACT AREA
032F 160C                    MVI     D,ERRFLD-1      / D <- COUNTER
0331 CD1903                  CALL    ROWN10          / FORMAT ERROR MESSAGE AREA
0334 3680                    MVI     M,DMAFAN        / STORE AN ATTRIBUTE
0336 23                      INX     H               / BUMP POINTER
0337 116E03                  LXI     D,DMAST1        / D <- STRING ADDRESS
033A CD0301                  CALL    MOVSTR          / LOAD TEXT
033D C35B03                  JMP     ROWST3          / FORMAT REF SECTION
```

```
                        /
                        /***DO ASSEMBLY/STATUS ROW2
                        /
0340 119303     ROWST2, LXI     D,DMAST4        / [D,E] <- STRING ADDRES
0343 CD0301             CALL    MOVSTR          / FORMAT NUMERIC FIELD
0346 1601               MVI     D,1             / D <- COUNT
0348 CD1903             CALL    ROWN10          / FORMAT SHIFT FIELD
034B 160B               MVI     D,ADVFLD        / D <- COUNTER
034D CD1903             CALL    ROWN10          / FORMAT ADVISORY AREA
0350 160A               MVI     D,@10           / D <- COUNTER
0352 CD1903             CALL    ROWN10          / FORMAT STEP + USED VALUES
0355 118003             LXI     D,DMAST2        / D <- STRING ADDRESS
0358 CD0301             CALL    MOVSTR          / LOAD TEXT
                        /
035B 0E06       ROWST3, MVI     C,6             / C <- COUNTER
                        /
035D 1605       ROWST4, MVI     D,5             / D <- COUNTER
035F 3690               MVI     M,DMAFAN        / STORE FIELD ATTRIBUTE
0361 23                 INX     H               / BUMP POINTER
                        /
0362 3620       ROWST5, MVI     M,DMABLK        / STORE A BLANK
0364 23                 INX     H               / BUMP POINTER
0365 15                 DCR     D               / DECREMENT COUNTER
0366 C26203             JNZ     ROWST5          / LOOP UNTIL DONE
0369 0D                 DCR     C               / DECREMENT COUNTER
036A C25D03             JNZ     ROWST4          / LOOP UNTIL DONE
036D C9                 RET                     / EXIT
                        EJECT

                        /
                        /***DATA STRINGS
                        /
036E 11         DMAST1, DB      DMAS1X
036F 20535445           DA      ' STEP# USED REF> '
0373 50232055
0377 53454420
037B 5245463E
037F 20
     0011       DMAS1X=.-DMAST1-1               / LENGTH OF STRING
                /
0380 07         DMAST2, DB      DMAS2X
0381 20205641           DA      '  VAL> '
0385 4C3E20
     0007       DMAS2X=.-DMAST2-1               / LENGTH OF STRING
                /
0388 0A         DMAST3, DB      DMAS3X
0389 80201F             DB      DMAFAN,ASCBLK,ASCCBK
038C 1F1F1F1F           DB      ASCCBK,ASCCBK,ASCCBK,ASCCBK,ASCVBK
0390 1E
0391 2020               DB      ASCBLK,ASCBLK
     000A       DMAS3X=.-DMAST3-1               / LENGTH OF FIELD
                /
0393 0A         DMAST4, DB      DMAS4X
0394 80201D             DB      DMAFAN,DMABLK,ASCNBK
0397 1D1D1D1D           DB      ASCNBK,ASCNBK,ASCNBK,ASCNBK,ASCVBK
039B 1E
039C 2020               DB      ASCBLK,ASCBLK
     000A       DMAS4X=.-DMAST4-1
                        EJECT

                        SUBJOB  CLOCK FUNCTIONS
                /
                /***CLOCK FUNCTIONS
                /
                /***ROUTINES.
                /
                /       CLKINI : CLOCK INITIALIZER
                /       CLKINT : CLOCK INTERRUPT HANDLER
                /
                        EJECT

                /
                /***SUBROUTINE CLKINI
                /
                /***THIS SUBROUTINE INITIALIZES ALL TIMER VALUES
                /
                /***CALLING SEQUENCE:
                /
```

```
                 /        CALL     CLKINI
                 /
                 /***PARAMETERS:
                 /
                 /        NONE
                 /
                 /***REGISTER USAGE.
                 /
                 /        A      : SCRATCH
                 /        B      : COUNTER
                 /        C      : NOT USED
                 /        [D,E]  : NOT USED
                 /        [H,L]  : SCRATCH
                 /
                          EJECT

039E AF          CLKINI,  CLA                   / CLEAR A
039F 0606                 MVI      B,TMRCNT     / B <- CLOCK TABLE LENGTH
03A1 218FFD               LXI      H,TMSTAB     / [H,L] <- CLOCK TABLE
                 /
03A4 77          CLKI10,  MOV      M,A          / RESET TIMER
03A5 23                   INX      H            / BUMP ADDRESS
03A6 05                   DCR      B            / DECREMENT COUNT
03A7 C2A403               JNZ      CLKI10       / BRANCH IF COUNT NOT ZERO
03AA C9                   RET                   / EXIT
                          EJECT

                 /
                 /***SUBROUTINE CLKINT
                 /
                 /***CLOCK INTERRUPT ROUTINE
                 /
                 /***CALLING SEQUENCE.
                 /
                 /        CALL     CLKINT
                 /
                 /***PARAMETERS:
                 /
                 /        NONE
                 /
                 /***REGISTER USAGE.
                 /
                 /        A      : SCRATCH
                 /        [B,C]  : SCRATCH
                 /        [C,D]  : SCRATCH
                 /        [H,L]  : SCRATCH
                 /
                          EJECT

03AB 218FFD      CLKINT,  LXI      H,TMRTAB     / [H,L] <- TIMERS ADDRESS
03AE AF                   CLA                   / CLEAR A
                 /
03AF F5          CLK010,  PUSH     PSW          / SAVE COUNTER
03B0 F3                   DI                    / PREVENT DURING TMR UPDATE
03B1 7E                   MOV      A,M          / A <- TIMER
03B2 B7                   TST                   / TIMER.NE.0 => RUNNING
03B3 CAC803               JZ       CLK030       / TIMER.EQ.0 => NOT RUNNING
03B6 35                   DCR      M            / DECREMENT TIMER
03B7 C2C803               JNZ      CLK030       / BRANCH IF NOT EXPIRED
03BA FB                   EI                    / NOW ALLOW HIGHER INTS.
03BB F1                   POP      PSW          / GET COUNTER
03BC F5                   PUSH     PSW          / SAVE IT AGAIN
03BD E5                   PUSH     H            / SAVE POINTER
03BE 87                   ADD      A            / COUNTER <- COUNTER*2
03BF 21D203               LXI      H,TMRDSP     / [H,L] <- DISPATCH TABLE
03C2 5F                   MOV      E,A          / E <- OFFSET
03C3 1600                 MVI      D,0          / D <- 0
03C5 19                   DAD      D            / [H,L] <- ROUTINE ADDRESS
03C6 DF                   DSPTAB                / EXECUTE ROUTINE
                 /
03C7 E1          CLK020,  POP      H            / RESTORE [H,L]
                 /
                 CLK030,
03C8 FB                   EI                    / ALLOW HIGHER RUPTS
03C9 23                   INX      H            / BUMP ADDRESS
03CA F1                   POP      PSW          / GET COUNTER
```

```
03CB 3C            INR     A                / BUMP COUNTER
03CC FE06          CPI     TMRCNT           / A. EQ. TMRCNT => DONE
03CE C2AF03        JNZ     CLK010           / A. NE. TMRCNT => CONTINU
03D1 C9            RET                      / EXIT
                   EJECT

           /
           /***TIMER DISPATCH TABLE
           /
           / NOTE:  IF TIMERS ARE ADDED/SUBTRACTED FROM SYSTEM,
           /        THIS TABLE MUST BE IN SAME ORDER AND SIZE
           /        AS THE TIMERS ARE.   SEE:
           /                "SYSTEM TIMERS ALLOCATION"
           /
03D2 DE03  TMRDSP, DW      CLK100           / BEEP TIMER
03D4 EB03          DW      CLK200           / ACK TIMER
03D6 EE03          DW      CLK300           / LED TIMER
03D8 F403          DW      CLK400           / POWER TIMER
03DA FD03          DW      CLK500           / ERROR TIMER
03DC 1104          DW      CLK600           / DISCRETE REFRESH
                   EJECT

           /
           /***BEEP TIMER
           /
03DE 3AB4FD CLK100, LDA    POSAVE           / GET CURRENT STATE OF PORT
03E1 E6BF           ANI    -1-POBEEP        / MASK OUT BEEPER
03E3 D33E           OUT    PAROUT           / OUTPUT DATA
03E5 32B4FD         STA    POSAVE           / STORE NEW STATE OF PORT
03E8 C3C703         JMP    CLK020           / GO BACK TO LOOP
           /
           /***ACK TIMER
           /
03EB C3C703 CLK200, JMP    CLK020           / NO ACTION HERE
           /
           /***LED TIMER
           /
03EE 011704 CLK300, LXI    B,SPLLED         / [B,C] <- COMMAND BLOCK
03F1 C3F703         JMP    CLK410           / GO TO COMMON CODE
           /
           /***POWER TIMER
           /
03F4 011A04 CLK400, LXI    B,SPLPWR         / [B,C] <- COMMAND BLOCK
           /
03F7 CD0D02 CLK410, CALL   SPOOLI           / SPOOL COMMAND
03FA C3C703         JMP    CLK020           / GO BACK TO LOOP
           /
           /***ERROR TIMER
           /
03FD 21BBFC CLK500, LXI    H,DSPERR         / [H,L] <- FIELD ATTRIBUTE
0400 3E80           MVI    A,FACNOR         / A <- NORMAL ATTRIBUTE
0402 BE             CMP    M                / CHECK FIELD ATTRIBUTE
0403 C20804         JNZ    CLK510           / BRANCH ON REVERSE VIDEO
0406 3E90           MVI    A,FACREV         / SET REVERSE VIDEO
           /
0408 77     CLK510, MOV    M,A              / SET NORMAL VIDEO
           /
0409 3E1E   CLK520, MVI    A,ERRTMR         / A <- TIMER VALUE
040B 3293FD         STA    TMRERR           / STORE IT
040E C3C703         JMP    CLK020           / CONTINUE
           /
           /***DISCRETE REFRESH TIMER
           /
0411 011D04 CLK600, LXI    B,SPLDIS         / [B,C] <- COMMAND BLOCK
0414 C3F703         JMP    CLK410           / SPOOL COMMAND
                    EJECT

           /
           /***LED COMMAND SPOOL BLOCK
           /
0417 02     SPLLED, DB     SPLLEX           / NUMBER OF BYTES
0418 E11E           DW     KE21             / COMMAND ADDRESS
     0002   SPLLEX= .-SPLLED-1              / COMMAND LENGTH
           /
           /***POWER COMMAND SPOOL BLOCK
           /
```

```
0041A 02           SPLPWR, DB      SPLPWX         / NUMBER OF BYTES
0041B FA1D                 DW      KF20           / COMMAND ADDRESS
      0002         SPLPWX=.-SPLPWR-1              / COMMAND LENGTH
                   /
                   /***DISCRETE REFRESH SPOOL BLOCK
                   /
0041D 02           SPLDIS, DB      SPLDIX         / NUMBER OF BYTES
0041E B41B                 DW      KF18           / COMMAND ADDRESS
      0002         SPLDIX=.-SPLDIS-1              / COMMAND LENGTH
                           EJECT

                           SUBJOB  PERIPHERAL PORT HANDLERS
                   /
                   /***PERIPHERAL PORT ROUTINES
                   /
                   /***ROUTINES:
                   /
                   /       PPINIT - INITIALIZATION
                   /       PPINT  - INTERRUPT HANDLER
                   /
                           EJECT

                   /
                   /***SUBROUTINE PPINIT
                   /
                   /***INITIALIZE PERIPHERAL PORT
                   /
                   /***CALLING SEQUENCE:
                   /
                   /       CALL    PPINIT
                   /
                   /***PARAMETERS:
                   /
                   /       NONE
                   /
                   /***REGISTER USAGE:
                   /
                   /       A     - SCRATCH
                   /       [B,C] - SCRATCH
                   /       [D,E] - SCRATCH
                   /       [H,L] - SCRATCH
                   /
                           EJECT

0420 01A0FF        PPINIT, LXI     B;PPIBUF       / [B,C] <- RECEIVER BUFB S
0423 112000                LXI     D;PPIBFL       / [D,E] <- RECEIVER BFLEN
0426 219CFD                LXI     H;PPIBLK       / [H,L] <- RECEIVER BUFBLK
0429 CD2401                CALL    BFINIT         / INITIALIZE RCVR BUFFER
                   /
042C 0180FF                LXI     B;PPOBUF       / [B,C] <- TRANSMIT BUFBAS
042F 112000                LXI     D;PPOBFL       / [D,E] <- TRANSMIT BFLE
0432 21A2FD                LXI     H;PPOBLK       / [H,L] <- TRANSMIT BUFBLK
0435 CD2401                CALL    BFINIT         / INITIALIZE XMIT BUFFER
                   /
0438 AF                    CLA                    / A <- 0
0439 32AEFD                STA     PPISTA         / CLEAR RECEIVER FLAGS
043C 32AFFD                STA     PPOSTA         / CLEAR TRANSMIT FLAGS
                   /
043F 3E81                  MVI     A;PPNULL       / A <- NULL CHARACTER
0441 D33A                  OUT     SP1CTL         / LOAD NULL INSTRUCTION
0443 00                    NOP                    / PRECAUTIONARY WAIT
0444 D33A                  OUT     SP1CTL         / LOAD SECOND NULL
                   /
0446 3E40                  MVI     A;SPCIR        / A <- RESET COMMAND
0448 D33A                  OUT     SP1CTL         / RESET INTERFACE
044A 3EFE                  MVI     A;PPMODE       / A <- INTERFACE MODE
044C D33A                  OUT     SP1CTL         / SET INTERFACE MODE
044E 3E25                  MVI     A;PPCMD        / A <- INTERFACE STATE
0450 D33A                  OUT     SP1CTL         / LOAD STATE
                   /
0452 C9                    RET                    / EXIT
                           EJECT

                   /
                   /***SUBROUTINE PPINT
                   /
                   /***PERIPHERAL PORT INTERRRUPT HANDLER
```

```
                /
                /***CALLING SEQUENCE:
                /
                /         CALL     PPINT
                /
                /***PARAMETERS:
                /
                /         NONE
                /
                /***REGISTER USAGE:
                /
                /         A       . SCRATCH
                /         B = STATUS OF PORT
                /         C = SCRATCH
                /         [D,E] : SCRATCH
                /         [H,L] : SCRATCH
                /
                          EJECT

                PPINT,
0453 78                   MOV    A,B            / GET PORT STATUS
0454 F5                   PUSH   PSW            / SAVE IT
0455 E602                 ANI    SPSRRY         / CHECK FOR RECEIVER READY
0457 CA0E05               JZ     PPI100         / BRANCH IF NOT READY
                /
                /***RECEIVER INTERRUPT
                /
045A 78                   MOV    A,B            / A <- STATUS
045B E628                 ANI    SPSFE+SPSPE    / PARITY/FRAMING ERROR
                                                / CHECK
045D CA6504               JZ     PPI010         / BRANCH IF NO ERROR
                /
                /***PARITY/FRAMING ERROR
                /
0460 3E10                 MVI    A,PPIPAR       / A <- STATUS
0462 C3FB04               JMP    PPI090         / GO TO ERROR HANDLER
                /
0465 78         PPI010,   MOV    A,B            / A <- STATUS
0466 E610                 ANI    SPSOE          / CHECK FOR OVERRUN
0468 CA7004               JZ     PPI030         / BRANCH IF NO ERROR
                /
                /***OVERRRUN ERROR
                /
046B 3E08                 MVI    A,PPIOVR       / A <- STATUS
046D C3FB04               JMP    PPI090         / GO TO ERROR HANDLER
                          EJECT

0470 DB3B       PPI030,   IN     SP1IN          / READ DATA
0472 47                   MOV    B,A            / SAVE CHARACTER
0473 3AAEFD               LDA    PPISTA         / A <- RECEIVER STATUS
0476 4F                   MOV    C,A            / SAVE STATUS
0477 E680                 ANI    PPIMSG         / CHECK FOR MSG IN PROGESS
0479 C2D004               JNZ    PPI050         / BRANCH IF SET
047C 79                   MOV    A,C            / GET STATUS AGAIN
047D E640                 ANI    PPIFCN         / CHECK FOR FUNCTION FLAG
047F C29604               JNZ    PPI040         / BRANCH IF SET
0482 79                   MOV    A,C            / A <- STATUS
0483 E601                 ANI    PPICNT         / CHECK FOR COUNT FLAG
0485 C2C204               JNZ    PPI045         / BRANCH ON COUNT FLAG
0488 3E02                 MVI    A,ASCSTX       / A <- STX
048A B8                   CMP    B              / CHARACTER AN STX?
048B C20E05               JNZ    PPI100         / NO, IGNORE IT
048E 3E40                 MVI    A,PPIFCN       / A <- NEW RECEIVER STATUS
0490 32AEFD               STA    PPISTA         / LOAD IT
0493 C30E05               JMP    PPI100         / CONTINUE
                          EJECT
                /
                /***FUNCTION CHARACTER
                /
0496 3E01       PPI040,   MVI    A,.FF+ASCSTX   / CREATE MESSAGE CHKSUM
0498 32B1FD               STA    PPICHK         / INITIALIZE CHECKSUM
049B 3E01                 MVI    A,PPICNT       / A <- NEW RECEIVER STAT S
049D 32AEFD               STA    PPISTA         / LOAD IT
04A0 78                   MOV    A,B            / GET CHAR
04A1 FED0                 CPI    ASCNAK         / WAS IT NAK?
04A3 C2DB04               JNZ    PPI060         /   NO, GO ON...
```

```
                      /       RECEIVED A "NAK"; SHUT DOWN TRANSMIT
04A6 F1                       POP     PSW            / CLEAR XMIT STATUS
04A7 AF                       CLA                    / X
04A8 F5                       PUSH    PSW            / X
04A9 C5                       PUSH    B              / SAVE CHAR
04AA 0180FF                   LXI     B;PPOBUF       / GET XMIT BUFBAS
04AD 112000                   LXI     D;PPOBFL       / GET XMIT BUFLEN
04B0 21A2FD                   LXI     H;PPOBLK       / GET XMIT BUFBLK
04B3 CD2401                   CALL    BFINIT         / RESET BUFFER
04B6 AF                       CLA                    / 0 XMIT FLAG
04B7 32AFFD                   STA     PPOSTA         / X
04BA 3E25                     MVI     A;PPCMD        / GET COMMAND BYTE
04BC D33A                     OUT     SP1CTL         / DISABLE XMIT INTERRUPT
04BE C1                       POP     B              / RESTORE CHAR
04BF C3DB04                   JMP     PPI060         /   AND CONTINUE
                              EJECT
                      /
                      /***COUNT CHARACTER
                      /
04C2 78               PPI045, MOV     A;B            / A <- CHARACTER
04C3 D604                     SUI     :04            / ALLOW FOR STX AND FCN
04C5 32B0FD                   STA     MSGLEN         / LOAD COUNTER
04C8 3E80                     MVI     A;PPIMSG       / A <- NEW STATUS
04CA 32AEFD                   STA     PPISTA         / LOAD STATUS
04CD C3DB04                   JMP     PPI060         / AND CONTINUE
                      /
                      /***DATA CHARACTER
                      /
04D0 3AB0FD           PPI050, LDA     MSGLEN         / MSGLEN.EQ.0 =>
04D3 B7                       TST                    / THIS CHAR IS CHECKSUM
04D4 CAEA04                   JZ      PPI070         / BRACH FOR CHECKSUM
04D7 3D                       DCR     A              / DECREMENT CHARACTER COUNT
04D8 32B0FD                   STA     MSGLEN         / STORE IT
                      /
                      /***BUFFER DATA CHARACTER
                      /
04DB 78               PPI060, MOV     A;B            / A <- DATA CHARACTER
04DC 019CFD                   LXI     B;PPIBLK       / [B,C] <- BUFFER BLOCK
04DF CD2E01                   CALL    BFCH           / BUFFER CHARACTER
04E2 21B1FD                   LXI     H;PPICHK       / [H,L] <- CHECKSUM ADDR SS
04E5 86                       ADD     M              / A <- NEW RUNNING CHECKSUM
04E6 77                       MOV     M;A            / STORE IT
04E7 C30E05                   JMP     PPI100         / CONTINUE
                      /
                      /***CHECKSUM CHARACTER
                      /
04EA 3AB1FD           PPI070, LDA     PPICHK         / A <- COMPUTED CHECKSUM
04ED B8                       CMP     B              / A.EQ.B => CHECKSUM OKAY
04EE C2F904                   JNZ     PPI080         / A.NE.B => CHECKSUM BAD
04F1 3E20                     MVI     A;PPIDON       / INDICATE MESSAGE DONE
04F3 32AEFD                   STA     PPISTA         / SET RECEIVER STATUS
04F6 C30E05                   JMP     PPI100         / CONTINUE
                              EJECT
                      /
                      /***CHECKSUM ERROR
                      /
04F9 3E02             PPI080, MVI     A;PPICER       / A <- STATUS
                      /
                      /***COMMON ERROR CODE
                      /
04FB F604             PPI090, ORI     PPIRET         / SET RETRAN FLAG
04FD 32AEFD                   STA     PPISTA         / SET NEW STATUS
0500 DB3B                     IN      SP1IN          / CLEAR RECEIVER
0502 01A0FF                   LXI     B;PPIBUF       / GET PARAMETERS
0505 112000                   LXI     D;PPIBFL       / TO INITIALIZE
0508 219CFD                   LXI     H;PPIBLK       / RECEIVER BUFFER
050B CD2401                   CALL    BFINIT         / INITIALIZE BUFFER
                                                     / CONTINUE PROCESSING
                              EJECT
```

```
                    /
                    /***CHECK FOR TRANSMITTER INTERRUPT
                    /
050E F1             PPI100, POP     PSW             / A <- INTERFACE STATUS
050F E601                   ANI     SPSTRY          / CHECK FOR TRANSMIT READY
0511 CA2A05                 JZ      PPIX            / BRANCH IF NOT READY
0514 3AA7FD                 LDA     PPOBLK+BFUSE    / A <- BUFFER COUNT
0517 B7                     TST                     / CHECK FOR BUFFER EMPTY
0518 CA2605                 JZ      PPI110          / BRANCH IF BUFFER EMPTY
051B 01A2FD                 LXI     B,PPOBLK        / [B,C] <- BUFBLK ADDRES
051E CD5601                 CALL    UBFCH           / GET CHARACTER FROM BUFFER
0521 D33B                   OUT     SP1OUT          / WRITE OUT CHARACTER
0523 C32A05                 JMP     PPIX            / GO TO EXIT
                    /
0526 3E25           PPI110, MVI     A,PPCMD         / A <- COMMAND BYTE
0528 D33A                   OUT     SP1CTL          / DISABLE INTERRUPT
                    /
052A C9             PPIX,   RET                     / EXIT
                            EJECT
```

```
                            SUBJOB  CURSOR ILLUMINATION
                    /
                    /***SUBROUTINE CURSOR
                    /
                    /***MOVE CURSOR FROM OLD LOCATION TO NEW LOCATION
                    /
                    /***CALLING SEQUENCE:
                    /
                    /       CALL    CURSOR
                    /
                    /***PARAMETERS:
                    /
                    /       B : XXXXYYYY
                    /       C : WWWWZZZZ
                    /
                    /       WHERE : XXXX = OLD CURSOR LINE
                    /               YYYY = OLD CURSOR COLUMN
                    /               WWWW = NEW CURSOR LINE
                    /               ZZZZ = NEW CURSOR COLUMN
                    /
                    /***REGISTER USAGE:
                    /
                    /       A     : SCRATCH
                    /       [B,C] : PARAMETERS (PRESERVED)
                    /       [D,E] : SCRATCH
                    /       [H,L] : SCRATCH
                    /
052B AF             CURSOR, CLA                     / A <- 0
052C B8                     CMP     B               / B.EQ.0 => SET CURSOR
052D CA3805                 JZ      CUR010          / BRANCH TO SET CURSOR
                    /
0530 CD4705                 CALL    CUR100          / GET LOCATION
0533 3680                   MVI     M,DMAFAN        / CLEAR REVERSE VIDEO
0535 19                     DAD     D               / GET SECOND LINE
0536 3680                   MVI     M,DMAFAN        / CLEAR REVERSE VIDEO
                    /
0538 78             CUR010, MOV     A,B             / SWAP
0539 41                     MOV     B,C             / B AND C
053A 4F                     MOV     C,A             / C FOR NEW LOCATION
053B CD4705                 CALL    CUR100          / GET LOCATION
053E 3690                   MVI     M,FACREV        / TURN ON REVERSE VIDEO
0540 19                     DAD     D               / GET SECOND LINE
0541 3690                   MVI     M,FACREV        / TURN ON REVERSE VIDEO
0543 78                     MOV     A,B             / PUT B
0544 41                     MOV     B,C             / AND C
0545 4F                     MOV     C,A             / BACK
0546 C9                     RET                     / EXIT
                            EJECT
```

```
                    /
                    /***COMPUTE START OF NODE ADDRESS
                    /
0547 78             CUR100, MOV     A,B             / A <- [LINE,COL]
0548 E6F0                   ANI     ROWMSK          / ISOLATE LINE NUMBER
054A FE80                   CPI     ASMROW          / CHECK FOR STATUS LINE
```

```
054C CA6805              JZ       CUR120          / BRANCH TO HANDLER
054F 210BF8              LXI      H,DSPLOG+DSPPOW / [H,L] <- START OF LOGIC
0552 11A000              LXI      D,ROWB+ROWB     / [H,L] <- LOGIC ROW LEN TH
0555 CF                  NSWP                     / SHIFT
                                                  / A TO FORM
                                                  / COUNTER
                                                  / FOR LOOP
0556 CD7805              CALL     CUR200          / GET LINE ADDRESS
0559 115000              LXI      D,ROWB          / [D,E] <- ROW LENGTH
055C D5                  PUSH     D               / SAVE ROW LENGTH
055D 110700              LXI      D,DSPNUD        / [D,E] <- NODE LENGTH
0560 78                  MOV      A,B             / A <- CURSOR LOCATION
                /
0561 E60F       CUR110,  ANI      COLMSK          / ISOLATE COLUMN
0563 CD7805              CALL     CUR200          / GET NODE ADDRESS
0566 D1                  POP      D               / RESTORE ROW LENGTH
0567 C9                  RET                      / EXIT
                /
0568 21DAFC     CUR120,  LXI      H,DSPREF        / [H,L] <- REF AREA
056B 114E00              LXI      D,ROWD+1        / [D,E] <- ROW LENGTH
056E D5                  PUSH     D               / SAVE ROW LENGTH
056F 110600              LXI      D,DSPNOD-1      / SHORTER NODE SIZE
0572 78                  MOV      A,B             / A<- CURSOR POSITION
0573 D605                SUI      5               / OFFSET IT
0575 C36105              JMP      CUR110          / DO AN EXIT
                /
0578 3D         CUR200,  DCR      A               / LOOP TO BUMP ADDRESS
0579 C8                  RZ                       / EXIT WHEN COUNT ZERO
057A 19                  DAD      D               / BUMP ADDRESS
057B C37805              JMP      CUR200          / CONTINUE
                         EJECT

                         SUBJOB   ERROR HANDLER
                /
                /***ERROR HANDLER
                /
                /***PARAMETERS:
                /
                /        [D,E] - MESSAGE ADDRESS
                /
                /***REGISTER USAGE:
                /
                /        A     - SCRATCH
                /        [B,C] - SCRATCH
                /        [D,E] - MESSAGE ADDRESS (DESTROYED)
                /        [H,L] - SCRATCH
                /
057E D5         ERROR,   PUSH     D               / SAVE ADDRESS
057F 21BBFC              LXI      H,DSPERR        / [H,L] <- DESTINATION
0582 160C                MVI      D,ERRFLD-1      / D <- FIELD LENGTH
0584 CD1903              CALL     ROWN10          / CLEAR ERROR FIELD
0587 D1                  POP      D               / RESTORE ADDRESS
0588 21BCFC              LXI      H,DSPERR+1      / [H,L] <- FIELD ADDRESS
058B CD0301              CALL     MOVSTR          / LOAD MESSAGE TO FIELD
058E 3E1E                MVI      A,ERRTMR        / A <- ERROR TIMER PRESET
0590 3293FD              STA      TMRERR          / ENABLE ERROR TIMER
0593 3A7CFE              LDA      KSTATE          / A <- STATE VECTOR
0596 F620                ORI      KRESET          / SET RESET FLAG
0598 327CFE              STA      KSTATE          / LOAD STATE VECTOR
059B CD531F              CALL     KU03            / CLEAR SHIFT FIELD
059E C9                  RET                      / EXIT
                         EJECT

                         SUBJOB   SOURCE FILE DEMARKATION
                /
                /***P180XX.P1 : END-OF-FILE
                /
                /***THIS MARKS THE END OF SOURCE FILE P180XX.P1.
                /
                         EJECT

\***********************************
```

```
\**** P18023.P2 : START-OF-FILE
\*****************************************
                    EJECT

                    SUBJOB  KEYBOARD FUNCTIONS
               /
               /***KEYBOARD HANDLER
               /
               /***ROUTINES:
               /
               /       KBDINI - INITIALIZE OPERATOR INTERFACE
               /       KBDINT - INTERRUPT HANDLER
               /       KBDFCN - FUNCTION HANDLER
               /       KF01   - DISABLE
               /       KF02   - CURSOR CONTROL
               /       KF03   - CONTACTS
               /       KF04   - VERTICALS
               /       KF05   - NUMERICS
               /       KF06   - SHIFT
               /       KF07   - FORCE
               /       KF08   - GET
               /       KF09   - GET NETWORK
               /       KF10   - SEARCH
               /       KF11   - CLEAR
               /       KF12   - DELETE
               /       KF13   - START NEXT
               /       KF14   - ENTER
               /       KF15   - SPARE
               /       KF16   - UNDEFINED
               /       KF17   - CLEAR RESET
               /       KF18   - DISCRETE UPDATE
               /       KF19   - SUPERVISORY
               /       KF20   - POWER DISPLAY
               /       KF21   - LED DISPLAY
               /
                       EJECT

               /
               /***SUBROUTINE KBDINI
               /
               /***INITIALIZE OPERATOR INTERFACE
               /
               /***CALLING SEQUENCE:
               /
               /       CALL    KBDINI
               /
               /***PARAMETERS.
               /
               /       NONE
               /
               /***REGISTER USAGE:
               /
               /       A     : SCRATCH
               /       [B,C] : SCRATCH
               /       [D,E] . SCRATCH
               /       [H,L] : SCRATCH
               /
                       EJECT

05A2 111000           LXI   D,KBDBFL     / [D,E] <- KEYBOARD BFLEN
059F 0170FF  KBDINI,  LXI   B,KBDBUF     / [B,C] <- KEYBOARD BFBASE
05A5 21A8FD           LXI   H,KBDBLK     / [H,L] <- KEYBOARD BFBL
05A8 CD2401           CALL  BFINIT       / INITIALIZE BUFFER
05AB 3EFF             MVI   A,:FF        / SET INITIAL KEYSTROKE
05AD 3283FE           STA   LASTKY       / FOR ROLLOVER
05B0 3282FE           STA   NEWKEY       / FOR DEBOUNCING
               /
05B3 CD8A1F           CALL  KU06         / RESET LOGIC
               /
```

```
05B6 111427             LXI   D,MSGHI          / [D,E] <- MESSAGE ADDRESS
05B9 CD681F             CALL  KU04             / TO ADVISORY FIELD
                /
05BC 3E14               MVI   A,KCLEAR+KCLADV  / SET FLAGS FOR
05BE 327CFE             STA   KSTATE           / INITIAL STATE
                /
05C1 3E30               MVI   A,ASCO           / A <- ASCII 0
05C3 0604               MVI   B,4              / B <- COUNTER
05C5 2118FD             LXI   H,DSPSTP         / [H,L] <- STEP DATA ADDR
                /
05C8 77         KBDI10, MOV   M,A              / MOVE IN A ZERO
05C9 23                 INX   H                / BUMP ADDRESS
05CA 05                 DCR   B                / DECREMENT
05CB C2C805             JNZ   KBDI10           / BRANCH IF NOT DONE
                        EJECT

                /
                /***COMPUTE MEMORY SIZE-AND USAGE
                /
05CE 2193FE     KBDI15, LXI   H,CMDBUF+3       / [H,L] <- COMMAND BUFFER
05D1 11BE60             LXI   D,ADRCON         / [D,E] <- ADDRESS
05D4 EF                 MOVDE                  / STORE DATA
                /
05D5 110611             LXI   D,CMDRED+CMD02!:100+LENRED      / SET PARMS
05D8 CD8125             CALL  PIO              / READ CONTROLLER DATA
05DB C2CE05             JNZ   KBDI15           / BRANCH ON ERROR
05DE CD9F1B             CALL  CLRERR           / CLEAR ANY ERROR MESSAGES
05E1 01ABFE             LXI   B,RSPBUF+3       / [B,C] <- SOURCE ADDRES
05E4 2184FE             LXI   H,SCONF1         / [H,L] <- DESTINATION ADDR
05E7 0A                 LDAX  B                / A <- CONFIGURATION BYTE 1
05E8 77                 MOV   M,A              / STORE IT
05E9 57                 MOV   D,A              / D <- DATA
05EA 03                 INX   B                / BUMP ADDRESS
05EB 23                 INX   H                / BUMP ADDRESS
05EC 0A                 LDAX  B                / A <- CONFIGURATION BYTE 2
05ED 77                 MOV   M,A              / STORE IT
05EE 010001             LXI   B,:0100          / [B,C] <- 256 FOR COUNT NG
05F1 210000             LXI   H,0              / CLEAR [H,L]
05F4 7A                 MOV   A,D              / A  <- LOGIC RAM CONFIG
05F5 0F                 RRC                    / SHIFT A
05F6 0F                 RRC                    / TO FORM
05F7 0F                 RRC                    / COUNTER
05F8 E61F               ANI   :1F              / FOR MEMORY SIZE
                /
05FA 09         KBDI20, DAD   B                / COUNT 256 BYTES
05FB 3D                 DCR   A                / DONE?
05FC C2FA05             JNZ   KBDI20           / BRANCH IF NOT DONE
05FF EB                 XCHG                   / SWAP REGISTERS
0600 2186FE             LXI   H,MEMSIZ         / [H,L] <- POINTER
0603 EF                 MOVDE                  / STORE DATA
                /
0604 2193FE             LXI   H,CMDBUF+3       / [H,L] <- COMMAND BUFFE
0607 110200             LXI   D,ADRUSE         / [D,E] <- START-OF-USER LO
IC
060A EF                 MOVDE                  / STORE DATA IN BUFFER
060B 110004             LXI   D,NOEOL!:400     / [D,E] <- DATA
060E EF                 MOVDE                  / STORE DATA IN BUFFER
060F 110000             LXI   D,0              / [D,E] <- MASK
0612 EF                 MOVDE                  / STORE INTO BUFFER
                /
0613 110A30     KBDI25, LXI   D,CMDSCH!:100+LENSCH    / SET PARAMETERS
0616 CD8125             CALL  PIO              / DO SEARCH
0619 C21306             JNZ   KBDI25           / HARD FAILURE
                        EJECT
                /       SEE IF WE GOT A GOOD ANSWER; SET UP
                /       USEAGE IF SO

061C 21A9FE             LXI   H,RSPBUF+1       / [H,L] <- POINTER
061F E7                 GETHL                  / GET ADDR OF SEARCH RETURN
D
0620 11FFFF             LXI   D,-1             / SET FOR FAILURE TEST
0623 F7                 DCMP                   / ADDR = FAILURE?
0624 CA5406             JZ    KBDI50           /   YES, FAILED TO FIND OL


                /       OKAY, TAKE ADDR AS SIZE

```

```
059 0627 EB                 XCHG                     / SWAP
060 0628 13                 INX      D               / ADD 2 FOR EOL NODE
061 0629 13                 INX      D               /   ITSELF!
062 062A 218BFE             LXI      H,MEMUSE        / [H,L] <- DESTINATION
063 062D EF                 MOVDE                    / STORE USAGE COUNT
064 062E EB                 XCHG                     / SWAP
065 062F 111DFD             LXI      D,DSPUSE        / [D,E] <- BCD DESTINATION
066 0632 CDC201             CALL     BNBCD4          / CONVERT TO BCD
067                         EJECT

001                 /
002                 /***INITIALIZE LOGIC DATA
003                 /
004 0635 010000             LXI      B,0             / [B,C] <- 0
005 0638 218AFE             LXI      H,STPNUM        / [H,L] <- DESTINATION
006 063B D7                 MOVBC                    / CLEAR STEP NUMBER
007 063C 218CFE             LXI      H,ADRSON        / [H,L] <- DESTINATION
008 063F D7                 MOVBC                    / CLEAR STARTING ADDR
009 0640 218EFE             LXI      H,ADREON        / [H,L] <- DESTINATION
010 0643 D7                 MOVBC                    / CLEAR ENDING ADDR
011                 /
012 0644 3E01               MVI      A,DISTMR        / A <- DISCRETE TIMER
013 0646 3294FD             STA      TMRDIS          / SET TIMER
014 0649 3E06               MVI      A,ASMCOL        / A <- STARTING COLUMN
015 064B 3281FE             STA      DISPTR          / INITIALIZE POINTER
016                 /
017 064E CD4524             CALL     KU21            / START LED + PWR TIMERS
018 0651 C35A06             JMP      KBDIX           / YES, GO TO EXIT
019                 /
020 0654 115B06     KBDI50, LXI      D,KBDIMS        / [D,E] <- MESSAGE ADDR
021 0657 CD7E05             CALL     ERROR           / DISPLAY MESSAGE
022                 /
023 065A C9         KBDIX,  RET                      / EXIT
024                 /
025                 /***MESSAGE
026                 /
027 065B 08         KBDIMS, DB       KBDIMX
028 065C 494E4954           DA       'INIT MEM'
    0660 204D454D
029      0008       KBDIMX= .-KBDIMS-1               / MESSAGE LENGTH
030                         EJECT

001                 /
002                 /***SUBROUTINE KBDINT
003                 /
004                 /***KEYBOARD INTERRUPT (POLLING) ROUTINE
005                 /
006                 /***CALLING SEQUENCE:
007                 /
008                 /       CALL     KBDINT
009                 /
010                 /***PARAMETERS:
011                 /
012                 /       NONE
013                 /
014                 /***REGISTER USAGE:
015                 /
016                 /       A     - SCRATCH
017                 /       [B,C] - SCRATCH
018                 /       [D,E] - SCRATCH
019                 /       [H,L] - SCRATCH
020                 /
021                         EJECT

001 0664 3AB4FD     KBDINT, LDA      FOSAVE          / A <- CURRENT OUTPUT STATE
002 0667 E6C0               ANI      POPWR+POBEEP    / SAVE LED AND BEEP STATE
003 0669 1608               MVI      D,:8            / D <- COUNTER
004 066B 5F                 MOV      E,A             / E <- OUTPUTS
005 066C 210000             LXI      H,0             / [H,L] <- OFFSET
006                 /
007 066F 7B         KBD010, MOV      A,E             / A <- PORT CONTROL
008 0670 D33E               OUT      PAROUT          / SELECT ROW
009 0672 DB3E               IN       PARIN           / READ DATA
010 0674 B7                 TST                      / A.EQ.0 => NO KEYS
011 0675 CABE06             JZ       KBD040          / A.NE.0 => KEY(S)
```

```
0678 0607              MVI     B;7          / B <- COUNTER
067A 0E01              MVI     C;01         / C <- MASK
                  /
067C F5       KBD020,  PUSH    PSW          / SAVE DATA
067D A9                XRA     C            / LOOK FOR MATCH
067E C2B206            JNZ     KBD030       / WANT ONE KEY ONLY
0681 3A82FE            LDA     NEWKEY       / A <- LAST KEYSTROKE
0684 BD                CMP     L            / MATCH?
0685 CA8F06            JZ      KBD021       / YES, MUST BE OKAY
                  /
0688 7D                MOV     A;L          / NO, A <- NEW KEYSTROKE
0689 3282FE            STA     NEWKEY       / INDICATE NEW KEYSTROKE
068C C3AE06            JMP     KBD025       / AND CONTINUE
                  /
068F 3A83FE   KBD021,  LDA     LASTKY       / A <- LAST VALID KEY
0692 BD                CMP     L            / MATCH?
0693 CAAE06            JZ      KBD025       / YES, ALREADY BUFFERED
                  /
0696 7D                MOV     A;L          / A <- NEW KEYSTROKE
0697 3282FE            STA     NEWKEY       / INDICATE LATEST KEY
069A 3283FE            STA     LASTKY       / AND LAST VALID KEY
069D 01A8FD            LXI     B;KBDBLK     / [B,C] <- BLOCK ADDRESS
06A0 CD2E01            CALL    BFCH         / BUFFER KEYSTROKE
06A3 3A7CFE            LDA     KSTATE       / A <- STATE VECTOR
06A6 E620              ANI     KRESET       / CHECK FOR ERROR
06A8 C2AE06            JNZ     KBD025       / NO BEEP ON ERROR STATE
06AB CD1401            CALL    BEEP10       / TURN ON BEEP
                  /
06AE F1       KBD025,  POP     PSW          / CLEAR STACK
06AF C3CC06            JMP     KBDX         / EXIT
                  /
06B2 23       KBD030,  INX     H            / BUMP INDEX
06B3 79                MOV     A;C          / SHIFT C
06B4 81                ADD     C            / LEFT ONE PLACE
06B5 4F                MOV     C;A          / BY AN ADD
06B6 F1                POP     PSW          / RESTORE ROW DATA
06B7 05                DCR     B            / DECREMENT COUNTER
06B8 C27C06            JNZ     KBD020       / CONTINUE LOOP
06BB C3CC06            JMP     KBDX         / IGNORE MULTIPLES
                  /
06BE 1C       KBD040,  INR     E
06BF 010700            LXI     B;7
06C2 09                DAD     B
06C3 15                DCR     D
06C4 C26F06            JNZ     KBD010
06C7 3EFF              MVI     A;:FF        / INDICATE NO KEYS
06C9 3283FE            STA     LASTKY       / STORE FLAG
                  /
06CC C9       KBDX,    RET
                       EJECT

                       SUBJOB  KEYBOARD FUNCTION DISPATCHER
                  /
                  /***SUBROUTINE KBDCMD
                  /
                  /***KEYBOARD FUNCTION HANDLER
                  /
                  /***CALLING SEQUENCE:
                  /
                  /      CALL     KBDCMD
                  /
                  /***PARAMETERS:
                  /
                  /      NONLE
                  /
                  /***REGISTER USAGE:
                  /
                  /      A     :  SCRATCH
                  /      [B,C] :  SCRATCH
                  /      [D,E] :  SCRATCH
                  /      [H,L] :  SCRATCH
                  /
                       EJECT

06CD 01A8FD   KBDCMD,  LXI     B;KBDBLK     / [B,C] <- KBD BUFFER BLOCK
06D0 CD5601            CALL    UBFCH        / GET KEYSTROKE
06D3 C2E506            JNZ     KBDCMX       / EXIT IF BUFFER EMPTY
```

```
06D6 21F206              LXI    H,KBDTAB      / [H,L] <- DISPATCH TABLE
06D9 F5                  PUSH   PSW           / SAVE CHARACTER
06DA 0600                MVI    B,0           / B<- 0
06DC 87                  ADD    A             / WORD-ORIENTATED TABLE
06DD 4F                  MOV    C,A           / [B,C] <- OFFSET
06DE 09                  DAD    B             / [H,L] <- ADDRESS OF FC
06DF 7E                  MOV    A,M           / A <- ADDRLO
06E0 23                  INX    H             / BUMP ADDR
06E1 66                  MOV    H,M           / H <- ADDRHI
06E2 6F                  MOV    L,A           / L <- ADDRLO
06E3 F1                  POP    PSW           / RESTORE CHARACTER
06E4 E9                  PCHL                 / DISPATCH
                /
06E5 0170FF     KBDCMX,  LXI    B,KBDBUF      / REINITIALIZE
06E8 111000              LXI    D,KBDBFL      / KEYBOARD BUFFER
06EB 21A8FD              LXI    H,KBDBLK      / AFTER NO DATA
06EE CD2401              CALL   BFINIT        / EXIT
06F1 C9                  RET
                         EJECT

                /
                /***KEYBOARD TABLE
                /
06F2 2E15       KBDTAB,  DW     KF14          / ENTER
06F4 5908                DW     KF02          / CURSOR UP
06F6 971B                DW     KF17          / ERROR RESET
06F8 9709                DW     KF03          / LATCH
06FA 9709                DW     KF03          / COIL
06FC B30A                DW     KF04          / VERTICAL SHORT
06FE B30A                DW     KF04          / VERTICAL OPEN
0700 5908                DW     KF02          / CURSOR RIGHT
0702 5908                DW     KF02          / CURSOR DOWN
0704 5908                DW     KF02          / CURSOR LEFT
0706 350B                DW     KF06          / SHIFT
0708 D60A                DW     KF05          / 1 / TIMER 0.01
070A D60A                DW     KF05          / 7 / ADD
070C D60A                DW     KF05          / 4 / SUBTRACT
070E 0110                DW     KF10          / SEARCH
0710 731B                DW     KF15          / SPARE 7
0712 731B                DW     KF15          / SPARE 6
0714 D60A                DW     KF05          / 0 / COUNTER
0716 D60A                DW     KF05          / 2 / TIMER T.01
0718 D60A                DW     KF05          / 8 / CONVERT
071A D60A                DW     KF05          / 5
071C 720C                DW     KF09          / GET PREVIOUS
071E 720C                DW     KF09          / GET NEXT
0720 1B0C                DW     KF08          / GET
0722 7111                DW     KF11          / CLEAR
0724 D60A                DW     KF05          / 3 - TIMER 1.0
0726 D60A                DW     KF05          / 9 - MULTIPLY
0728 D60A                DW     KF05          / 6 - DIVIDE
072A 841B                DW     KF16          / NOT USED
072C 841B                DW     KF16          / NOT USED
072E 841B                DW     KF16          / NOT USED
0730 731B                DW     KF15          / SPARE 5
0732 731B                DW     KF15          / SPARE 4
0734 9709                DW     KF03          / HORIZONTAL SHORT
0736 9709                DW     KF03          / HORIZONTAL OPEN
0738 841B                DW     KF16          / NOT USED
073A 841B                DW     KF16          / NOT USED
073C 841B                DW     KF16          / NOT USED
073E 9709                DW     KF03          / NEG TRANSITIONAL
0740 9709                DW     KF03          / POS TRANSITIONAL
0742 9709                DW     KF03          / NORMALLY OPEN RELAY
0744 9709                DW     KF03          / NORMALLY CLOSED RELAY
0746 841B                DW     KF16          / NOT USED
0748 841B                DW     KF16          / NOT USED
074A 841B                DW     KF16          / NOT USED
074C 560B                DW     KF07          / FORCE
074E 731B                DW     KF15          / SPARE 3
0750 861C                DW     KF19          / SUPERVISORY
0752 9D11                DW     KF12          / DELETE
0754 841B                DW     KF16          / NOT USED
0756 841B                DW     KF16          / NOT USED
0758 841B                DW     KF16          / NOT USED
075A 6207                DW     KF01          / DISABLE
075C 731B                DW     KF15          / SPARE 2
```

```
     075E D314          DW      KF13               / START NEXT
     0760 731B          DW      KF15               / SPARE 1
                        EJECT

                        SUBJOB  KEY DEFINITION

          0000   KEYENT= :00                       / ENTER
          0001   KEYUP=  :01                       / CURSOR UP
          0002   KEYERR= :02                       / ERROR RESET
          0003   KEYLAT= :03                       / LATCH
          0004   KEYCOL= :04                       / COIL
          0005   KEYVSH= :05                       / VERTICAL SHORT
          0006   KEYVOP= :06                       / VERTICAL OPEN
          0007   KEYRGT= :07                       / CURSOR RIGHT
          0008   KEYDWN= :08                       / CURSOR DOWN
          0009   KEYLFT= :09                       / CURSOR LEFT
          000A   KEYHT=  :0A                       / SHIFT
          000B   KEY1=   :0B                       / 1 / TIMER 0.01
          000C   KEY7=   :0C                       / 7 / ADD
          000D   KEY4=   :0D                       / 4 / SUBTRACT
          000E   KEYSCH= :0E                       / SEARCH
          000F   KEYSP7= :0F                       / SPARE 7
          0010   KEYSP6= :10                       / SPARE 6
          0011   KEY0=   :11                       / 0 / COUNTER
          0012   KEY2=   :12                       / 2 / TIMER T.01
          0013   KEY8=   :13                       / 8 / CONVERT
          0014   KEY5=   :14                       / 5
          0015   KEYPRE= :15                       / GET PREVIOUS
          0016   KEYNXT= :16                       / GET NEXT
          0017   KEYGET= :17                       / GET
          0018   KEYCLR= :18                       / CLEAR
          0019   KEY3=   :19                       / 3 - TIMER 1.0
          001A   KEY9=   :1A                       / 9 - MULTIPLY
          001B   KEY6=   :1B                       / 6 - DIVIDE
          001C   KEYNU1= :1C                       / NOT USED
          001D   KEYNU2= :1D                       / NOT USED
          001E   KEYNU3= :1E                       / NOT USED
          001F   KEYSP5= :1F                       / SPARE 5
          0020   KEYSP4= :20                       / SPARE 4
          0021   KEYHZS= :21                       / HORIZONTAL SHORT
          0022   KEYHZO= :22                       / HORIZONTAL OPEN
          0023   KEYNU4= :23                       / NOT USED
          0024   KEYNU5= :24                       / NOT USED
          0025   KEYNU6= :25                       / NOT USED
          0026   KEYNEG= :26                       / NEG TRANSITIONAL
          0027   KEYPOS= :27                       / POS TRANSITIONAL
          0028   KEYNOR= :28                       / NORMALLY OPEN RELAY
          0029   KEYNCR= :29                       / NORMALLY CLOSED RELAY
          002A   KEYNU7= :2A                       / NOT USED
          002B   KEYNU8= :2B                       / NOT USED
          002C   KEYNU9= :2C                       / NOT USED
          002D   KEYFOR= :2D                       / FORCE
          002E   KEYSP3= :2E                       / SPARE 3
          002F   KEYSUP= :2F                       / SUPERVISORY
          0020   KEYDEL= :20                       / DELETE
          0021   KEYNUA= :21                       / NOT USED
          0022   KEYNUB= :22                       / NOT USED
          0023   KEYNUC= :23                       / NOT USED
          0024   KEYDIS= :24                       / DISABLE
          0025   KEYSP2= :25                       / SPARE 2
          0026   KEYSTR= :26                       / START NEXT
          0027   KEYSP1= :27                       / SPARE 1
                        EJECT

                        SUBJOB  KEY FUNCTION : KF01 : DISABLE
                 /
                 /***KEY FUNCTION : KF01 : DISABLE
                 /
                 /***DISABLE COMPLEMENTS THE DISABLE STATE.
                 /
                 /***COILS ARE DISABLED ONLY IN NETWORKS.
                 /***INPUTS ARE DISABLED ONLY IN REFERENCE AREA
                 /
     0762 CD281F KF01,  CALL    KU01               / CHECK FOR RESET
     0765 CD491F        CALL    KU02               / CHECK FOR SHIFT
     0768 CA7107        JZ      KF0110             / BRANCH ON NO SHIFT
```

```
0768 CD791F          CALL    KU05                / DISPLAY ERROR
076E C34808          JMP     KF01X               / EXIT
               /
0771 CD0B23  KF0110, CALL    KU12                / GET CURSOR POINTERS
0774 78              MOV     A, B                / A <- CURSOR
0775 E6F0            ANI     ROWMSK              / ISOLATE ROW
0777 FE80            CPI     ASMROW              / CHECK FOR LOGIC AREA
0779 C2DA07          JNZ     KF0150              / BRANCH ON LOGIC AREA

               /     PROCESS DISABLES FOR INPUTS (1XXX)

077C E5              PUSH    H                   / SAVE POINTER
077D 23              INX     H                   / BUMP TO REFERENCE TYPE
077E 7E              MOV     A, M                / A <- REFERENCE TYPE
077F FE31            CPI     ASC1                / MUST BE '1XXX'
0781 CA8807          JZ      KF0120              / BRANCH IF OKAY
0784 E1              POP     H                   / CLEAN STACK
0785 C3D107          JMP     KF01ER              / GO TO ERROR
               /
0788 D1      KF0120, POP     D                   / [D, E] <- POINTER TO FIELD
0789 D5              PUSH    D                   / STACK IT AGAIN
078A 13              INX     D                   / BUMP TO REFERENCE TYPE
078B 13              INX     D                   / BUMP TO FIRST DIGIT
078C 210000          LXI     H, 0                / INITIALIZE BINARY RESU T
078F CD8E01          CALL    BCDBN3              / CONVERT REF TO BINARY
0792 2B              DCX     H                   / MAKE RELATIVE BASE 0
0793 5D              MOV     E, L                / E <- BINARY
0794 1620            MVI     D, IOFLD            / D <- FIELD TYPE
0796 2193FE          LXI     H, CMDBUF+3         / [H, L] <- CMD BUFFER
0799 EF              MOVDE                       / STORE ADDRESS

079A E1              POP     H                   / [H, L] <- FIELD ADDR
079B E5              PUSH    H                   / STACK IT AGAIN
079C 114F00          LXI     D, ROWD+2           / [D, E] <- OFFSET
079F 19              DAD     D                   / [H, L] <- CURRENT STATE
07A0 110008          LXI     D, INPDIS!.100      / [D, E] <- DISABLE
07A3 7E              MOV     A, M                / A <- STATE
07A4 FE44            CPI     ASCD                / CHECK FOR DISABLED
07A6 C2AC07          JNZ     KF0130              / BRANCH IF NOT
07A9 110000          LXI     D, 0                / [D, E] <- NO FLAG
               /
07AC 2195FE  KF0130, LXI     H, CMDBUF+5         / [H, L] <- DESTINATION
07AF EF              MOVDE                       / STORE DATA
               /
07B0 11FFF7          LXI     D, DISMSK           / [D, E] <- MASK
07B3 EF              MOVDE                       / STORE MASK
               /
07B4 110A21          LXI     D, CMDWRT+CMDO2!.100+LENWRT      / SET PA  MS
07B7 CD8125          CALL    PIO                 / DO WRITE
07BA E1              POP     H                   / GET POINTER OFF STACK
07BB C24808          JNZ     KF01X               / EXIT ON ERROR
               /
07BE 114F00          LXI     D, ROWD+2           / [D, E] <- OFFSET
07C1 19              DAD     D                   / [H, L] <- ADDR OF D FLA
07C2 3E44            MVI     A, ASCD             / A <- 'D'
07C4 BE              CMP     M                   / CHECK IF WAS DISABLED
07C5 C2CD07          JNZ     KF0140              / BRANCH IF ENABLED
               /
07C8 3620            MVI     M, ASCBLK           / CLEAR DISABLE
07CA C34808          JMP     KF01X               / EXIT
               /
07CD 77      KF0140, MOV     M, A                / SET DISABLE
07CE C34808          JMP     KF01X               / EXIT
               /
07D1 1112[illegible] KF01ER, LXI D, KF07N1       / [D, E] <- MESSAGE ADDR
07D4 CD7E[illegible] CALL    ERROR               / SET ERROR STATE
07D7 C34808          JMP     KF01X               / AND EXIT
                     EJECT

               /
               /***LOGIC AREA (I.E. COILS; OXXX)
               /
07DA CDA[illegible] KF0150, CALL KU17            / [H, L] <- PTR TO NODE TYPE
07DD 7E              MOV     A, M                / A <- NODE TYPE
07DE 01[illegible]07 LXI     B, NOCOIL!.100+NODCOL / [B, C] <- PATTERN
07E1 B8              CMP     B                   / CHECK FOR MATCH
07E2 CA[illegible]   JZ      KF0175              / BRANCH ON IT
```

```
07E5 010A08          LXI    B,NOLATC!.100+NODLAT / [B,C] <- PATTERN
07E8 B8              CMP    B               / CHECK FOR MATCH
07E9 CAFA07          JZ     KF0175          / BRANCH ON IT
07EC 010709          LXI    B,NODCOL!.100+NOCOIL / [B,C] <- PATTERN
07EF B8              CMP    B               / CHECK FOR MATCH
07F0 CAFA07          JZ     KF0175          / BRANCH ON IT
07F3 01080A          LXI    B,NODLAT!.100+NOLATC / [B,C] <- PATTERN
07F6 B8              CMP    B               / CHECK FOR MATCH
07F7 C24908          JNZ    KF01RR          / BRANCH ON ERROR
                /
07FA E5         KF0175, PUSH H              / SAVE PATTERN
07FB C5              PUSH   B               / SAVE POINTER
                /
07FC CD5124          CALL   KU22            / [H,L] <- COLTAB POINTER
07FF E7              GETHL                  / [H,L] <- STARTING ADDR
0800 CD0423          CALL   KU11            / A <- ROW
                /
0803 3D         KF0185, DCR A               / DECREMENT COUNT
0804 CA0C08          JZ     KF0190          / BRANCH ON DONE
0807 23              INX    H               / BUMP POINTER
0808 23              INX    H               / TWICE FOR NODE
0809 C30308          JMP    KF0185          / CONTINUE
                /
080C EB         KF0190, XCHG                / SWAP
080D 2193FE          LXI    H,CMDBUF+3      / [H,L] <- POINTER
0810 EF              MOVDE                  / STORE ADDRESS
0811 C1              POP    B               / GET NODE TYPES
0812 79              MOV    A,C             / A <- NEW TYPE
0813 07              RLC                    / SHIFT TO
0814 07              RLC                    / FOR NODE
0815 57              MOV    D,A             / D <- BYTE 0
0816 1E00            MVI    E,0             / E <- BYTE 1
0818 EF              MOVDE                  / STORE INTO BUFFER
                /
0819 C5              PUSH   B               / SAVE NODE TYPES
081A 11FF83          LXI    D,-NODMSK!.100-1 / [D,E] <- MASK
081D EF              MOVDE                  / STORE INTO BUFFER
                /
081E 110A21          LXI    D,CMDWRT+CMD02!.100+LENWRT      / SET PARMS
0821 CD8125          CALL   PIO             / DO WRITE
0824 C1              POP    B               / CLEAN
0825 E1              POP    H               / STACK
0826 C24808          JNZ    KF01X           / EXIT,ON ERROR
                /
0829 71              MOV    M,C             / SET NODE TYPE IN MATRIX
082A 79              MOV    A,C             / A <- NEW NODE TYPE
082B 21FD09          LXI    H,NODTAB+NODCON / [H,L] <- TABLE ADDR
082E 110900          LXI    D,NODRCL        / [D,E] <- OFFSET
                /
0831 BE         KF0195, CMP M               / CHECK FOR MATCH
0832 CA3908          JZ     KF01A0          / BRANCH ON MATCH
0835 19              DAD    D               / BUMP POINTER
0836 C33108          JMP    KF0195          / CONTINUE
                /
0839 11FAFF     KF01A0, LXI D,NODDIS-NODCON / [D,E] <- OFFSET
083C 19              DAD    D               / [H,L] <- DISPLAY
083D E5              PUSH   H               / SAVE POINTER
083E CD0B23          CALL   KU12            / GET CURSOR POINTERS
0841 D1              POP    D               / [D,E] <- SOURCE
0842 23              INX    H               / BUMP TO DISPLAY
0843 0605            MVI    B,DSPNOD-2      / B <- COUNT
0845 CD0601          CALL   MOVSIO          / MOVE STRING
                /
0848 C9         KF01X,  RET                 / EXIT

                /       ERROR, "NOT COIL"

                KF01RR,
0849 115008          LXI    D,KF01NC/ PTR TO MSG
084C CD7E05          CALL   ERROR   / DISPLAY IT
084F C9              RET            / DONE

0850 08         KF01NC, DB  KF01NX
0851 4E4F5420        DA     'NOT COIL'
0855 434F494C
     0008       KF01NX=.-KF01NC-1
                     EJECT
```

```
                            SUBJOB  KEY FUNCTION : KF02: CURSOR CONTROL
                    /
                    /****KEY FUNCTION : KF02 : CURSOR CONTROL
                    /
                    /
0859 CD281F         KF02,   CALL    KU01            / CHECK FOR RESET
                    /
085C F5                     PUSH    PSW             / SAVE KEYSTROKE
085D FE01                   CPI     KEYUP           / LOOK FOR CURSOR UP
085F CA9108                 JZ      KF0220          / BRANCH ON UP
0862 FE08                   CPI     KEYDWN          / LOOK FOR CURSOR DOWN
0864 CA9F08                 JZ      KF0230          / BRANCH ON DOWN
0867 FE09                   CPI     KEYLFT          / LOOK FOR CURSOR LEFT
0869 CAC408                 JZ      KF0250          / BRANCH ON LEFT
                    /
                    /***CURSOR RIGHT
                    /
086C CD8509                 CALL    KO2SUB          / GET DATA

                    /       IF ACTUAL CURSOR NOT = DISPLAY CURSOR,
                            FORCE NEW CURSOR TO 1,1

086F B8                     CMP     B               / SAME?
0870 CA7508                 JZ      KF0205          /   YES, DO REGULAR

                    /       NO, FORCE TO THIS ROW, COL 1

0873 E6F0                   ANI     ROWMSK          / ISOLATE THIS ROW

                            HERE FOR REGULAR PROCESS

                    KF0205,
0875 C601                   ADI     .01             / MOVE IT RIGHT
0877 4F                     MOV     C,A             / C <- NEW CURSOR
0878 E60F                   ANI     COLMSK          / CHECK FOR WRAP-AROUND
087A FE0C                   CPI     MAXCOL+1        / WILL GO TO LEFT POSITI N
087C FAE708                 JM      KF0260          / OF SAME ROW, BRANCH OKAY
087F 79                     MOV     A,C             / A <- NEW CURSOR
0880 E6F0                   ANI     ROWMSK          / MASK OUT COLUMN
0882 FE80                   CPI     ASMROW          / CHECK FOR ASM/REF ROW
0884 CA8C08                 JZ      KF0210          / BRANCH IF THERE
0887 F601                   ORI     .01             / LOGIC ROW - COL 1
0889 C3E608                 JMP     KF0270          / GO TO COMMON CODE
                    /
088C F606           KF0210, ORI     .06             / ASM/REF - COL 6
088E C3E608                 JMP     KF0270          / GO TO COMMON CODE
                            EJECT
                    /
                    /***CURSOR UP
                    /
0891 CD8509         KF0220, CALL    KO2SUB          / GET DATA
0894 D610                   SUI     .10             / SHIFT UP
0896 4F                     MOV     C,A             / C <- NEW CURSOR
0897 E6F0                   ANI     ROWMSK          / CHECK FOR TOP OF SCREEN
0899 C2E708                 JNZ     KF0260          / NO, SET CURSOR
089C C38009                 JMP     KF02X           / YES, NO MOVEMENT
                    /
                    /***CURSOR DOWN
                    /
089F CD8509         KF0230, CALL    KO2SUB          / GET DATA
08A2 C610                   ADI     .10             / SHIFT DOWN
08A4 4F                     MOV     C,A             / C <- NEW CURSOR
08A5 E6F0                   ANI     ROWMSK          / ISOLATE ROW
08A7 FE80                   CPI     ASMROW          / CHECK FOR ASM/REF ROW
08A9 C2BC08                 JNZ     KF0240          / BRANCH IF NOT
08AC 79                     MOV     A,C             / A <- NEW CURSOR
08AD E60F                   ANI     COLMSK          / ISOLATE COLUMN
08AF FE06                   CPI     .06             / CHECK VALID MOVE
08B1 F2E708                 JP      KF0280          /   OKAY, PROCEED...

                    /       NOT ABOVE AREA, FORCE TO LEFT SIDE OF AREA

08B4 79                     MOV     A,C             / GET NEW CURSOR
08B5 E6F0                   ANI     ROWMSK          / ISOLATE ROW
08B7 F606                   ORI     .06             / FORCE TO LEFT SIDE
08B9 C3E608                 JMP     KF0270          /   OF ASSMBLY AND GO
```

```
                          /
08BC FE90    KF0240,  CPI    ASMROW+.10    / CHECK FOR OVERFLOW
08BE CA8009           JZ     KF02X         / BRANCH FOR NO MOVEMENT
08C1 C3E708           JMP    KF0280        / EXECUTE
                      EJECT
             /
             /***CURSOR LEFT
             /
08C4 CD8509  KF0250,  CALL   KO2SUB        / GET DATA
08C7 D601             SUI    .01           / MOVE IT LEFT
08C9 4F               MOV    C,A           / C <- NEW CURSOR
08CA E60F             ANI    COLMSK        / ISOLATE COLUMN
08CC C2D708           JNZ    KF0260        / BRANCH IF NOT WRAP-AROUND
08CF 79               MOV    A,C           / A <- CURSOR
08D0 E6F0             ANI    ROWMSK        / SAVE ROW
08D2 F60B             ORI    .0B           / MOVE TO RIGHT BOUNDARY
08D4 C3E608           JMP    KF0270        / GO TO COMMON CODE
             /
08D7 FE05    KF0260,  CPI    .05           / CHECK FOR ILLEGAL MOVE
08D9 C2E708           JNZ    KF0280        / BRANCH IF OKAY
08DC 79               MOV    A,C           / A <- CURSOR
08DD E6F0             ANI    ROWMSK        / CHECK ROW
08DF FE80             CPI    ASMROW        / LOOK FOR ASM/REF
08E1 C2E708           JNZ    KF0280        / BRANCH IF NOT
08E4 F60B             ORI    .0B           / GO TO RIGHT MARGIN IF SO
             /
08E6 4F      KF0270,  MOV    C,A           / C <- NEW CURSOR
             /
08E7 CD2B05  KF0280,  CALL   CURSOR        / MOVE CURSOR
08EA 79               MOV    A,C           / A <- NEW CURSOR
08EB 327EFE           STA    CURACT        / STORE NEW ACTUAL POS
08EE 327DFE           STA    CURDSP        / STORE NEW DISPLAY POS
             /
08F1 E6F0             ANI    ROWMSK        / ISOLATE ROW
08F3 FE80             CPI    ASMROW        / CHECK FOR ASSEMBLY ROW
08F5 C2FF08           JNZ    KF0285        / BRANCH IF NOT
             /
08F8 AF               CLA                  / A <- 0
08F9 3280FE           STA    CURCON        / SET NODE TYPE

08FC C38009           JMP    KF02X         / EXIT
                      EJECT
```

\ CHECK FOR MOVING ALONG COIL EXTENSIO

```
             /
             KF0285,

             /        CHECK TO SEE IF WE HAVE MOVED TO THE
             /        COIL COLUMN

08FF 3A7EFE           LDA    CURACT  / GET THE CURRENT POS
0902 E60F             ANI    COLMSK  / ISOLATE THE COL
0904 FE0B             CPI    MAXCOL  / ARE WE IN COIL COL?
0906 CA4E09           JZ     KF02CL  /   YES, GO TO SPECIAL PROC

             /        NOT IN COIL COL; SEE IF ON A DASHED
             /        COIL EXTENSION

0909 3A7EFE           LDA    CURACT  / GET POSITION
090C 47               MOV    B,A     / SET B FOR CALL
090D CD8D09           CALL   CKDASH  / ARE WE ON A DASHED LINE?
0910 C27909           JNZ    KF0296  /   NO, ALL SET TO EXIT

             /        ON A DASH!  SPIN UNTIL NOT

             KF02LP,
             /
0913 F1               POP    PSW             / GET KEYSTROKE AGAIN
0914 F5               PUSH   PSW             / X

             /        IS IT RIGHT OR LEFT?

0915 FE09             CPI    KEYLFT          / WHICH?
0917 C22809           JNZ    KF0290          /   IT IS RIGHT!

             /        HERE FOR LEFT - DECR AND CHECK FOR LEFT RAIL
```

```
0918 0D                     DCR     C               / -1 TO COL
091B 79                     MOV     A,C             / GET NEW COL
091C E60F                   ANI     COLMSK          / ISOLATE IT; AT LEFT RAIL?
091E C23609                 JNZ     KF0292          /   NO, GO MOVE IT
                            EJECT
                    /       FORCE TO RIGHT RAIL, WE HAVE WRAPAROUND!

0921 79                     MOV     A,C             / GET CURSOR POS
0922 C60B                   ADI     MAXCOL          / WRAP TO RIGHT COL
0924 4F                     MOV     C,A             / RESET C TO NEW CURSOR
0925 C33609                 JMP     KF0292          / MOVE AND LOOP

                    /       HERE FOR RIGHT-HAND MOVE...

                    KF0290,
0928 0C                     INR     C               / STEP RIGHT ONE COL
0929 79                     MOV     A,C             / GET IT
092A E60F                   ANI     COLMSK          / ISOLATE COLUMN
092C FE0C                   CPI     MAXCOL+1        / IS IT AT RIGHT RAIL?
092E DA3609                 JC      KF0292          /   NO, OKAY TO MOVE

                    /       FORCE TO LEFT RAIL, WE HAVE WRAP-AROUND!

0931 79                     MOV     A,C             / GET CURSOR POS
0932 E6F0                   ANI     ROWMSK          / SAVE CURRENT ROW
0934 3C                     INR     A               / SET TO COL 1
0935 4F                     MOV     C,A             / RESET C TO NEW POS
                                                    / FALL TO COMMON CODE

                    /       HERE TO MOVE CURSOR AND LOOP

                    KF0292,
0936 3A7DFE                 LDA     CURDSP  / GET PRESENT CURSOR POS
0939 47                     MOV     B,A     /   TO B FOR MOVE
093A CD2B05                 CALL    CURSOR  / MOVE IT FROM PRES TO NEW
093D 79                     MOV     A,C     / GET NEW
093E 327DFE                 STA     CURDSP  / SET DISPLAY
0941 327EFE                 STA     CURACT  / SET ACTUAL (MATRIX)

                    /       SEE IF STILL ON A DASH

0944 47                     MOV     B,A     / SET FOR CALL
0945 CD8D09                 CALL    CKDASH  / STILL DASH?
0948 C2FF08                 JNZ     KF0285  /   NO, NOW GO CHECK COL.
094B C31309                 JMP     KF02LP  /   YES, LOOP AND MOVE
                            EJECT
    HERE WHEN CURSOR IS ON COIL COLUMN

                    KF02CL,
094E CDAA23                 CALL    KU17    / GET PTR TO "MATROW"
0951 7E                     MOV     A,M     / GET NODE TYPE
0952 3280FE                 STA     CURCON  / SET CURSOR NODE TYPE

                    /       SEE IF IT IS A REAL TYPE OR NOT

0955 B7                     TST             / 0? OR REAL?
0956 C29009                 JNZ     KF02X   /   REAL, SO ALL SET

                    /       IT IS 0, SO DO WE HAVE A BLANK NODE
                    /       ON SCREEN OR AN EXTENDED COIL?

0959 3A7EFE                 LDA     CURACT  / GET CURSOR LOC
095C 47                     MOV     B,A     /   TO B FOR CALL
095D CD4705                 CALL    CUR100  / GET PTR TO DISPLAY AREA
0960 23                     INX     H       / STEP PAST ATTRIBUTE
0961 7E                     MOV     A,M     / GET CHAR
0962 FE20                   CPI     ASCBLK  / IS IT A SPACE? (BLANK NODE?)
0964 CA8009                 JZ      KF02X   /   YES, ALL SET TO EXIT

                            WE HAVE JUST MOVED TO A DASHED COIL;
                    /       BACK "CURACT" UP TO THE VALID ENTRY
                    /       IN MATROW WHERE THE TYPE IS

                    KF02[illegible],
0967 3A7EFE                 LDA     CURACT  / STEP BACKWARDS UNTIL
                                            /   NODE TYPE FOUND
096A 3D                     DCR     A       / COL-1
```

```
     096B 327EFE            STA      CURACT  / X
     096E CDAA23            CALL     KU17    / GET PRT TO TYPE
                                             /   @ CURACT
     0971 7E                MOV      A,M     / GET TYPE
     0972 B7                TST              / 0 OR REAL?
     0973 CA6709            JZ       KF0295  /   0, KEEP STEPPING BACK
     0976 C37C09            JMP      KF0297  /  REAL, GO STORE AND XIT
                            EJECT
\    HERE WHEN FINAL CURSOR POS IS KNOWN,
\    SET UP CONTACT TYPE @ CURSOR

                   KF0296,
     0979 CDAA23            CALL     KU17             / GET MATRIX POINTER
                   KF0297,
     097C 7E                MOV      A,M              / A <- CONTACT TYPE
     097D 3280FE            STA      CURCON           / STORE NODE TYPE
                   /
     0980 F1       KF02X,   POP      PSW              / CLEAN STACK
     0981 CD531F            CALL     KU03             / CLEAR SHIFT
     0984 C9                RET                       / EXIT
                            EJECT
                   /
                   /***SUBROUTINE TO SET POINTERS
                   /
     0985 3A7DFE   K023UB,  LDA      CURDSP           / A <- DISPLAY CURSOR
     0988 47                MOV      B,A              /    AND SET FOR MOVE
     0989 3A7EFE            LDA      CURACT           / GET CURSOR LOC REAL
     098C C9                RET                       / EXIT
                   /
                   /*** SUBR TO CHECK DISPLAY FOR A DASH
                   /
                   /        B = CURRENT CURSOR POSITION
                   /        H/L MUST BE FREE!
                   /
                   CKDASH,
     098D CD4705            CALL     CUR100  / GET SCREEN PTR @ CURSOR
     0990 23                INX      H       / STEP PAST ATTRIBUTE
     0991 7E                MOV      A,M     / GET CHAR AT NODE
     0992 E6FE              ANI      -1-CATHI/ KILL L.S. BIT
     0994 FE72              CPI      ASCDSH  / IS IT A DASH?
                                             /   Z SET IF DASH
                                             /   Z RESET IF NOT
     0996 C9                RET              / DONE
                            EJECT

                            SUBJOB  KEY FUNCTION : KF03 : CONTACTS
                   /
                   /***KEY FUNCTION : KF03 : CONTACTS
                   /
     0997 CD281F   KF03,    CALL     KU01             / CHECK FOR RESET
     099A CD491F            CALL     KU02             / CHECK FOR SHIFT
     099D CAA609            JZ       KF0310           / BRANCH ON NO SHIFT
     09A0 CD791F            CALL     KU05             / DISPLAY MESSAGE
     09A3 C3E609            JMP      KF03X            / GO TO EXIT
                   /
                   /***ENTRY POINT FOR NON-RELAY NODES FROM KF05
                   /
     09A6 21F609   KF0310,  LXI      H,NODTAB         / [H,L] <- START OF TABLE
     09A9 110900            LXI      D,NODRCL         / [D,E] <- TABLE ENTRY LEN
     09AC 0615              MVI      B,NODTBL         / B <- NUMBER OF ENTRIES
                   /
     09AE BE       KF0320,  CMP      M                / CHECK FOR KEY MATCH
     09AF CAC009            JZ       KF0330           / BRANCH WHEN FOUND
     09B2 19                DAD      D                / BUMP POINTER
     09B3 05                DCR      B                / DECREMENT COUNTER
     09B4 C2AE09            JNZ      KF0320           / CONTINUE LOOP
                   /
     09B7 11EA09            LXI      D,KF03M1         / [D,E] <- ERROR MESSAGE
     09BA CD7E05            CALL     ERROR            / DISPLAY MESSAGE
     09BD C3E609            JMP      KF03X            / GO TO COMMON EXIT
                   /
     09C0 23       KF0330,  INX      H                / BUMP ADDRESS
     09C1 EB                XCHG                      / SWAP [H,L] AND [D,E]
     09C2 FE22              CPI      KEYHZO           / CHECK FOR HORIZONTAL OPEN
     09C4 CACC09            JZ       KF0340           / BRANCH ON IT
     09C7 FE21              CPI      KEYHZS           / CHECK FOR SHORT
     09C9 C2D909            JNZ      KF0360           / BRANCH IF NOT
```

```
                  /
     09CC 3E20    KF0340, MVI     A,ASCBLK        / A <- BLANK
     09CE 2100FD          LXI     H,DSPNUM+2      / [H,L] <- START OF FIELD
     09D1 0605            MVI     B,5             / B <- FIELD LENGTH
                  /
     09D3 77      KF0350, MOV     M,A             / STORE BLANK
     09D4 23              INX     H               / BUMP POINTER
     09D5 05              DCR     B               / DECREMENT COUNTER
     09D6 C2D309          JNZ     KF0350          / CONTINUE LOOP
                  /
     09D9 21B3FC  KF0360, LXI     H,DSPCON        / [H,L] <- DESTINATION
     09DC 0605            MVI     B,DSPNOD-2      / B <- COUNTER
     09DE CD0601          CALL    MOVS10          / MOVE TO CONTACT FIELD
     09E1 13              INX     D               / BUMP TO NODE TYPE
     09E2 1A              LDAX    D               / A <- CONTACT TYPE
     09E3 327FFE          STA     ASMCON          / SAVE IT
                  /
     09E6 CD531F  KF03X,  CALL    KU03            / TURN OFF SHIFT
     09E9 C9              RET                     / EXIT
                  /
                  /***MESSAGES
                  /
     09EA 0B      KF03M1, DB      KF03MX
     09EB 554E4B20        DA      'UNK CONTACT'
     09EF 434F4E54
     09F3 414354
          000B    KF03MX= .-KF03M1-1
                          EJECT
```

```
                  /
                  /***TABLE FOR CONTACT TYPES
                  /
          0000    NODKEY= 0                       / KEYSTROKE
          0001    NODDIS= NODKEY+1                / DISPLAY STRING (5 CHR)
          0006    NODTYP= NODDIS+5                / NODE TYPE; 1,2 OR 3 NODES
          0007    NODCON= NODTYP+1                / CONTACT TYPE
          0008    NODVAL= NODCON+1                / VALID REFERENCE TYPES
                  /
          0009    NODRCL= NODVAL+1                / RECORD LENGTH
                  /
                  /***VALID REFERENCE TYPE FLAGS
                  /
          0001    NODOUT= :01                     / 0XXX - COILS
          0002    NODINP= :02                     / 1XXX - INPUTS
          0004    NODSEQ= :04                     / 2YXX - SEQUENCERS
          0008    NODIRG= :08                     / 3XXX - INPUT REGISTERS
          0010    NODHRG= :10                     / 4XXX - HOLDING REGISTERS
          0020    NODCST= :20                     / 0YYY - CONSTANT
          0040    NODBLK= :40                     / BBBB - BLANKS
                  /       :80                     / NOT USED
                  /
     09F6 28      NODTAB, DB      KEYNOR          / NORMALLY OPEN RELAY
     09F7 74746076        DB      :74,:74,:60,:76,:62
     09FB 62
     09FC 01              DB      1               / SINGLE-NODE CONTACT
     09FD 03              DB      NOOREL
     09FE 07              DB      NODOUT+NODINP+NODSEQ
                  /
     09FF 29              DB      KEYNCR          / NORMALLY CLOSED RELAY
     0A00 7474607C        DB      :74,:74,:60,:7C,:62
     0A04 62
     0A05 01              DB      1               / SINGLE-NODE CONTACT
     0A06 04              DB      NOCREL
     0A07 07              DB      NODOUT+NODINP+NODSEQ
                  /
     0A08 27              DB      KEYPOS          / POSITIVE TRANSITIONAL
     0A09 74746078        DB      :74,:74,:60,:78,:62
     0A0D 62
     0A0E 01              DB      1               / SINGLE-NODE CONTACT
     0A0F 05              DB      NOPOST
     0A10 07              DB      NODOUT+NODINP+NODSEQ
                  /
     0A11 26              DB      KEYNEG          / NEGATIVE TRANSITIONAL
     0A12 7474607A        DB      :74,:74,:60,:7A,:62
     0A16 62
     0A17 01              DB      1               / SINGLE-NODE CONTACT
     0A18 06              DB      NONEGT
```

```
0A19 07                 DB      NODOUT+NODINP+NODSEQ
                        /
0A1A 04                 DB      KEYCOL-             / COIL
0A1B 7474686C           DB      :74;:74;:68;:6C;:6A
0A1F 6A
0A20 01                 DB      1                   / SINGLE-NODE CONTACT
0A21 07                 DB      NOCOIL
0A22 01                 DB      NODOUT
                        /
0A23 03                 DB      KEYLAT              / LATCH
0A24 7474686E           DB      :74;:74;:68;:6E;:6A
0A28 6A
0A29 01                 DB      1                   / SINGLE-NODE CONTACT
0A2A 08                 DB      NOLATC
0A2B 01                 DB      NODOUT
                        /
0A2C 22                 DB      KEYHZO              / HORIZONTAL OPEN
0A2D 0D0D0D0C           DB      :0D;:0D;:0D;:0C;:0D
0A31 0D
0A32 01                 DB      1                   / SINGLE-NODE CONTACT
0A33 0B                 DB      NOHOZO
0A34 40                 DB      NODBLK
                        /
0A35 21                 DB      KEYHZS              / HORIZONTAL SHORT
0A36 74747474           DB      :74;:74;:74;:74;:74
0A3A 74
0A3B 01                 DB      1                   / SINGLE-NODE CONTACT
0A3C 0C                 DB      NOHOZS
0A3D 40                 DB      NODBLK
                        /
0A3E FF                 DB      :FF                 / DISABLED COIL
0A3F 7466686C           DB      :74;:66;:68;:6C;:6A
0A43 6A
0A44 01                 DB      1                   / SINGLE-NODE CONTACT
0A45 09                 DB      NODCOL
0A46 01                 DB      NODOUT
                        /
0A47 FF                 DB      :FF                 / DISABLED LATCH
0A48 7466686E           DB      :74;:66;:68;:6E;:6A
0A4C 6A
0A4D 01                 DB      1                   / SINGLE-NODE CONTACT
0A4E 0A                 DB      NODLAT
0A4F 01                 DB      NODOUT
                        /
0A50 11                 DB      KEY0                / COUNTER
0A51 20435452           DA      ' CTR '
0A55 20
0A56 02                 DB      2
0A57 0F                 DB      NOCTR
0A58 10                 DB      NODHRG
                        /
0A59 19                 DB      KEY3                / TIMER 1.0 SECS
0A5A 2054312E           DA      ' T1.0'
0A5E 30
0A5F 02                 DB      2
0A60 10                 DB      NOT100
0A61 10                 DB      NODHRG
                        /
0A62 12                 DB      KEY2                / TIMER 0.1 SECS
0A63 2054302E           DA      ' T0.1'
0A67 31
0A68 02                 DB      2
0A69 11                 DB      NOT010
0A6A 10                 DB      NODHRG

                        /
0A6B 0B                 DB      KEY1                / TIMER .01 SECS
0A6C 20542E30           DA      ' T.01'
0A70 31
0A71 02                 DB      2
0A72 12                 DB      NOT001
0A73 10                 DB      NODHRG

                        /
0A74 0C                 DB      KEY7                / ADD
0A75 20414444           DA      ' ADD '
0A79 20
```

```
0A7A 03                   DB      3
0A7B 16                   DB      NOCALC
0A7C 10                   DB      NODHRG

          /
0A7D 0D                   DB      KEY4              / SUBTRACT
0A7E 20535542             DA      ' SUB
0A82 20
0A83 03                   DB      3
0A84 16                   DB      NOCALC
0A85 10                   DB      NODHRG

          /
0A86 1A                   DB      KEY9              / MULTIPLY
0A87 204D554C             DA      ' MUL '
0A8B 20
0A8C 03                   DB      3
0A8D 16                   DB      NOCALC
0A8E 10                   DB      NODHRG

          /
0A8F 1B                   DB      KEY6              / DIVIDE
0A90 20444956             DA      ' DIV '
0A94 20
0A95 03                   DB      3
0A96 16                   DB      NOCALC
0A97 10                   DB      NODHRG
          /
0A98 13                   DB      KEY8              / CONVERT
0A99 20434F4E             DA      ' CON '
0A9D 20
0A9E 02                   DB      2
0A9F 13                   DB      NOCON
0AA0 13                   DB      NODINP+NODOUT+NODHRG
          /
0AA1 00000000             DB      0,0,0,0,0,0       / PRESET CONSTANT
0AA5 0000
0AA7 FF                   DB      :FF
0AA8 0D                   DB      NOCFRE
0AA9 20                   DB      NODCST
          /
0AAA 00000000             DB      0,0,0,0,0,0       / PRESET REGISTER
0AAE 0000
0AB0 FF                   DB      :FF
0AB1 0E                   DB      NORFRE
0AB2 18                   DB      NODIRG+NODHRG

          /
     0015       NODTBL=   .-NODTAB/NODRCL           / NUMBER OF ENTRIES
                          EJECT

                          SUBJOB  KEY FUNCTION : KF04 : VERTICALS
          /
          /***KEY FUNCTION : KF04 : VERTICALS
          /
0AB3 CD281F     KF04,     CALL    KU01              / CHECK FOR RESET
0AB6 CD491F               CALL    KU02              / CHECK FOR SHIFT
0AB9 C2D20A               JNZ     KF0420            / BRANCH ON ERROR
0ABC 01E4D0               LXI     B,CA1101!:100+CA0011   / ASSUME SHORT
0ABF FE06                 CPI     KEYVOP            / CHECK FOR OPEN
0AC1 C2C70A               JNZ     KF0410            / BRANCH ON SHORT
0AC4 0120E0               LXI     B,CA1100!:100+ASCBLK / LOAD FOR OPEN
          /
0AC7 78         KF0410,   MOV     A,B               / A <- UPPER CHARACTER
0AC8 32B8FC               STA     DSPVER            / STORE IT
0ACB 79                   MOV     A,C               / A <- LOWER CHARACTER
0ACC 3205FD               STA     DSPVER+ROWD       / STORE IT
0ACF C3D50A               JMP     KF04X             / GO TO EXIT
          /
0AD2 CD791F     KF0420,   CALL    KU05              / DISPLAY ERROR MESSAGE
          /
0AD5 C9         KF04X,    RET                       / EXIT
                          EJECT
```

```
                          SUBJOB  KEY FUNCTION : KF05 : NUMERICS
                   /
                   /***KEY FUNCTION : KF05
                   /
                   /***NUMERIC KEYS
                   /
                   /***PARAMETERS:
                   /
                   /         A      - KEYSTROKE
                   /
0AD6 CD281F        KF05,     CALL   KU01               / TEST FOR RESET
0AD9 CD491F                  CALL   KU02               / TEST FOR SHIFT
0ADC C2A609                  JNZ    KF0310             / SHIFT SET => CONTACT
0ADF 47                      MOV    B, A               / SAVE KEYSTROKE
0AE0 3A7CFE                  LDA    KSTATE             / GET KEYBOARD STATE
0AE3 E610                    ANI    KCLEAR             / CHECK FOR CLEAR FLAG
0AE5 CA000B                  JZ     KF0520             / YES, DON'T CLEAR
0AE8 2100FD                  LXI    H, DSPNUM+2        / POINT TO MS POS
0AEB 3620                    MVI    M, ASCBLK          / BLANK IT
0AED 23                      INX    H                  / STEP TO NEXT CHAR
0AEE 3E30                    MVI    A, ASCO            / SET UP TO ZERO ASSEMBL
0AF0 1604                    MVI    D, 4               / SET UP TO LOOP 4 O IN
                   /
0AF2 77            KF0510,   MOV    M, A               / LOOP TO CLEAR FIELD
0AF3 23                      INX    H                  / BUMP POINTER
0AF4 15                      DCR    D                  / DECREMENT COUNT
0AF5 C2F20A                  JNZ    KF0510             / LOOP UNTIL DONE
0AF8 3A7CFE                  LDA    KSTATE             / GET STATE VECTOR
0AFB E6EF                    ANI    -1-KCLEAR          / CLEAR FLAG
0AFD 327CFE                  STA    KSTATE             / SET NEW STATE
                   /
0B00 0E03          KF0520,   MVI    C, 3               / LOOP TO SHIFT FIELD LEFT
0B02 2104FD                  LXI    H, DSPNUM+6        / [H,L] <- RIGHT-MOST DI IT
0B05 56                      MOV    D, M               / GET DIGIT
                   /
0B06 2B            KF0530,   DCX    H                  / MOVE POINTER
0B07 5E                      MOV    E, M               / E <- CURRENT CHAR
0B08 72                      MOV    M, D               / STORE DIGIT FROM RIGHT
0B09 53                      MOV    D, E               / D <- OLD DIGIT
0B0A 0D                      DCR    C                  / DECREMENT POINTER
0B0B C2060B                  JNZ    KF0530             / LOOP UNTIL DONE
                   /
                   /***BUILD TABLE ENTRY
                   /
0B0E 78                      MOV    A, B               / A <- KEYSTROKE
0B0F 21210B                  LXI    H, KF05TB          / [H,L] <- TABLE ADDRESS
                   /
0B12 BE            KF0540,   CMP    M                  / CHECK FOR MATCH
0B13 CA1B0B                  JZ     KF0550             / BRANCH WHEN FOUND
0B16 23                      INX    H                  / BUMP POINTER
0B17 23                      INX    H                  / TO NEXT ENTRY
0B18 C3120B                  JMP    KF0540             / CONTINUE
                   /
0B1B 23            KF0550,   INX    H                  / BUMP TO DISPLAY CHARAC ER
0B1C 7E                      MOV    A, M               / A <- CHARACTER
0B1D 3204FD                  STA    DSPNUM+6           / STORE INTO DISPLAY
                   /
0B20 C9                      RET                       / EXIT
                             EJECT
```

```
                   /
                   /***NUMERIC KEYSTROKE TABLE
                   /
0B21 1130          KF05TB,   DB     KEY0, ASC0
0B23 0B31                    DB     KEY1, ASC1
0B25 1232                    DB     KEY2, ASC2
0B27 1933                    DB     KEY3, ASC3
0B29 0D34                    DB     KEY4, ASC4
0B2B 1435                    DB     KEY5, ASC5
0B2D 1B36                    DB     KEY6, ASC6
0B2F 0C37                    DB     KEY7, ASC7
0B31 1338                    DB     KEY8, ASC8
0B33 1A39                    DB     KEY9, ASC9
                             EJECT
```

```
                                SUBJOB  KEY FUNCTION : KF06 : SHIFT KEY
                        /
                        /***KEY FUNCTION : KF06 . SHIFT KEY
                        /
                        /
0B35 CD281F     KF06,   CALL    KU01                / CHECK FOR RESET
0B38 217CFE             LXI     H,KSTATE            / [H,L] <- ADDRESS
0B3B 7E                 MOV     A,M                 / A <- STATE VECTOR
0B3C E680               ANI     KSHIFT              / ISOLATE SHIFT FLAG
0B3E C24A0B             JNZ     KF0610              / BRANCH IF SET
0B41 7E                 MOV     A,M                 / A <- STATE VECTOR
0B42 F680               ORI     KSHIFT              / SET SHIFT FLAG
0B44 115390             LXI     D,FACREV!:100+ASCS   / [D,E] <- FIELD VALUE
0B47 C3500B             JMP     KF06X               / GO TO COMMON EXIT
                        /
0B4A 7E         KF0610, MOV     A,M                 / A <- STATE VECTOR
0B4B E67F               ANI     -1-KSHIFT           / CLEAR SHIFT FLAG
0B4D 112080             LXI     D,FACNOR!:100+ASCBLK  / [D,E] <- FIELD V LU

                        /
0B50 77         KF06X,  MOV     M,A                 / STORE STATE VECTOR
0B51 2108FD             LXI     H,DSPSHT            / [H,L] <- FIELD ADDRESS
0B54 EF                 MOVDE                       / STORE FIELD
0B55 C9                 RET                         / EXIT
                        EJECT

                                SUBJOB  KEY FUNCTION : KF07 : FORCE
                        /
                        /***KEY FUNCTION : KF07 : FORCE
                        /
                        /***FORCE COMPLEMENTS THE STATE OF A DISABLED CONTACT.
                        /
                        / RULES.
                        /       1-YOU CAN ONLY FORCE WHEN A CONTACT
                        /         IS DISABLED
                        /       2-YOU CAN ONLY FORCE 1XXX IN THE DISCRETE AREA;
                        /         NOT NETWORK!
                        /       3-YOU CAN ONLY FORCE 0XXX IN THE NETWORK;
                        /         NOT DISCRETE AREA!
                        /
                        /
0B56 CD281F     KF07,   CALL    KU01                / CHECK FOR RESET
0B59 CD491F             CALL    KU02                / CHECK FOR SHIFT
0B5C CA650B             JZ      KF0705              / BRANCH ON NO SHIFT
0B5F CD791F             CALL    KU05                / SET ERROR STATE
0B62 C3040C             JMP     KF07X               / EXIT
                        /
0B65 CD0B23     KF0705, CALL    KU12                / GET CURSOR POINTERS
                        /
0B68 78                 MOV     A,B                 / A <- CURSOR
0B69 E6F0               ANI     ROWMSK              / ISOLATE ROW
0B6B FE80               CPI     ASMROW              / LOOK FOR ASSEMBLY AREA
0B6D C2B20B             JNZ     KF0725              / BRANCH IF NOT

            PROCESS  1XXX

0B70 23                 INX     H                   / STEP TO MS DIGIT
0B71 7E                 MOV     A,M                 / GET IT
0B72 FE31               CPI     ASC1                / IS IT A 1?
0B74 CA7D0B             JZ      KF0707              /   YES, GO ON
0B77 11120C             LXI     D,KF07N1            /   NO, ERROR:
0B7A C3010C             JMP     KF07RR              /   "NOT 1XXX"

                KF0707,
0B7D EB                 XCHG                        / SWAP
0B7E 19                 DAD     D                   / [H,L] <- VALUE FIELD
0B7F 7E                 MOV     A,M                 / A <- DISABLE FLAG
0B80 FE44               CPI     ASCD                / MUST BE 'D'
0B82 C2FE0B             JNZ     KF07ER              / BRANCH IF NOT
                        /
0B85 23                 INX     H                   / BUMP TO CONTACT STATE
0B86 7E                 MOV     A,M                 / A <- FIRST CHARACTER
0B87 FE20               CPI     ASCBLK              / CHECK FOR BLANK
0B89 010004             LXI     B,INPSTA!:100       / [B,C]<- 'ON'
0B8C C2920B             JNZ     KF0710              / BRANCH IF 'OFF'
0B8F 010000             LXI     B,0                 /  B,C <- 'OFF'
```

```
                       /
0B92 2195FE            KF0710, LXI    H,CMDBUF+5          / [H,L] <- CMDBUF ADDR
0B95 D7                        MOVBC                      / LOAD WRITE DATA
                       /
0B96 01FFFB                    LXI    B,-INPSTA!:100-1/ [B,C]<- MASK
0B99 D7                        MOVBC                      / LOAD MASK
                       /
0B9A 13                        INX    D                   / BUMP TO
0B9B 13                        INX    D                   / REFERENCE FIELD
0B9C 210000                    LXI    H,0                 / [H,L]<- 0
0B9F CD8E01                    CALL   BCDBN3              / CONVERT TO BINARY
0BA2 2B                        DCX    H                   / MAKE RELATIVE BASE 0
0BA3 65                        MOV    H,L                 / H <- DATALO
0BA4 2E20                      MVI    L,IOFLD             / L <- DATAHI
0BA6 2293FE                    SHLD   CMDBUF+3            / STORE ADDR
                       /
0BA9 110A21                    LXI    D,CMDWRT+CMD02!:100+LENWRT        / PARMS
0BAC CD8125                    CALL   PIO                 / DO WRITE
0BAF C3040C                    JMP    KF07X               / AND EXIT
                               EJECT

\ LOGIC AREA (I. E. OXXX)
                       /
0BB2 23                KF0725, INX    H                   / BUMP POINTER
0BB3 23                        INX    H                   / TO DISABLE FIELD
0BB4 7E                        MOV    A,M                 / A <- DISABLE FIELD
0BB5 E6FE                      ANI    -1-CATHI            / MASK OUT LSB
0BB7 FE66                      CPI    ASCDIS              / DISABLE CHARACTER?
0BB9 C2FE0B                    JNZ    KF07ER              / ERROR IF NOT
                       /
0BBC 19                        DAD    D                   / [H,L] <- REFERENCE
0BBD EB                        XCHG                       / SWAP
0BBE 13                        INX    D                   / BUMP POINTER
0BBF 210000                    LXI    H,0                 / INITIALIZE BINARY
0BC2 CD8E01                    CALL   BCDBN3              / CONVERT
0BC5 2B                        DCX    H                   / MAKE RELATIVE BASE 0
0BC6 E5                        PUSH   H                   / SAVE REFERENCE
0BC7 65                        MOV    H,L                 / SWAP H,L
0BC8 2E20                      MVI    L,IOFLD             / SET FIELD FLAG
0BCA 2293FE                    SHLD   CMDBUF+3            / STORE INTO BUFFER
                       /
0BCD 110611                    LXI    D,CMDRED+CMD02!:100+LENRED        / PARMS
0BD0 CD8125                    CALL   PIO                 / DO READ
0BD3 E1                        POP    H                   / CLEAN STACK
0BD4 C2040C                    JNZ    KF07X               / EXIT ON ERROR
                       /
0BD7 AF                        CLA                        / A <- 0
0BD8 BC                        CMP    H                   / CHECK COIL TYPE
0BD9 C2E40B                    JNZ    KF0730              / BRANCH ON INTERNAL
                       /
0BDC 0602                      MVI    B,OUTSTA            / B <- FLAG
0BDE 11FFFD                    LXI    D,-OUTSTA!:100-1/ [D,E] <- MASK
0BE1 C3E90B                    JMP    KF0735              / GO TO COMMON CODE
                       /
0BE4 0601              KF0730, MVI    B,INTSTA            / B <- FLAG
0BE6 11FFFE                    LXI    D,-INTSTA!:100-1/ [D,E]<- MASK
                       /
0BE9 3AABFE            KF0735, LDA    RSPBUF+3            / A <- COIL STATE
0BEC A8                        XRA    B                   / COMPLEMENT STATE
0BED 0E00                      MVI    C,0                 / C <- 0
0BEF 47                        MOV    B,A                 / B <- WRITE DATA
0BF0 2195FE                    LXI    H,CMDBUF+5          / [H,L] <- POINTER
0BF3 D7                        MOVBC                      / STORE DATA
0BF4 EF                        MOVDE                      / STORE MASK
                       /
0BF5 110A21                    LXI    D,CMDWRT+CMD02!:100+LENWRT        / PARMS
0BF8 CD8125                    CALL   PIO                 / DO WRITE
0BFB C3040C                    JMP    KF07X               / GO TO EXIT
                               EJECT

                       /***ERROR HANDLER
                       /
0BFE 11050C            KF07ER, LXI    D,KF07MS            / [D,E] <- MESSAGE ADDR
                       KF07RR,
```

```
0C01 CD7E05          CALL    ERROR                / SET ERROR
                /
0C04 C9         KF07X,  RET                       / EXIT
                /
                /***MESSAGES
                /
0C05 0C         KF07MS, DB      KF07MX
0C06 4E4F5420           DA      "NOT DISABLED"
0C0A 44495341
0C0E 42404544
     000C       KF07MX=  -KF07MS-1

0C12 08         KF07N1, DB      KF07NX
0C13 4E4F5420           DA      "NOT 1XXX
0C17 31585858
     0008       KF07NX=, -KF07N1-1
                        EJECT

                        SUBJOB  KEY FUNCTION : KF08 : GET
                /
                /***KEY FUNCTION : KF08 : GET
                /
                /***THIS FUNCTION FETCHES DISCRETE VALUES FOR
                /***DISPLAY IN THE REFERENCE AREA
                /
                /***ALLOWABLE DISCRETES:
                /
                /       0XXX - COILS
                /       1XXX - INPUTS
                /       3XXX - INPUT REGISTERS
                /       4XXX - HOLDING REGISTERS
                /
                /***CURSOR MUST BE IN ASSEMBLY AREA
                /
0C1B CD281F     KF08,   CALL    KU01                / CHECK FOR RESET
0C1E CD491F             CALL    KU02                / CHECK FOR SHIFT
0C21 CA2A0C             JZ      KF0805              / BRANCH ON NOSHIFT
0C24 CD791F             CALL    KU05                / DISPLAY ERROR
0C27 C3650C             JMP     KF08X               / EXIT
                /
0C2A 3A7EFE     KF0805, LDA     CURACT              / A <- CURSOR
0C2D E6F0               ANI     ROWMSK              / ISOLATE ROW
0C2F FE80               CPI     ASMROW              / CHECK FOR ASSEMBLY
0C31 CA3D0C             JZ      KF0810              / BRANCH IF OKAY
                /
0C34 11660C             LXI     D,KF08M1            / [D,E] <- MESSAGE ADDR
                /
0C37 CD7E05     KF08ER, CALL    ERROR               / SET ERROR STATE
0C3A C3650C             JMP     KF08X               / EXIT
                /
0C3D 3A01FD     KF0810, LDA     DSPNUM+3            / A <- REFERENCE TYPE
0C40 11411B             LXI     D,KF14M1            / [D,E] <- MESSAGE ADDR
0C43 FE32               CPI     ASC2                / CHECK FOR SEQUENCER
0C45 CA370C             JZ      KF08ER              / ERROR ON SEQUENCER
                /
0C48 3E1B               MVI     A,NODINP+NODOUT+NODIRG+NODHRG   / A <- MASK
0C4A CDC71F             CALL    KU07                / VALIDATE REFERENCE
0C4D C2650C             JNZ     KF08X               / BRANCH IF NOT VALID
                /
0C50 CD0B23             CALL    KU12                / GET CURSOR POINTERS
0C53 23                 INX     H                   / BUMP BEYOND FIELD ATTRIB
0C54 0604               MVI     B,REFLEN            / B <- STRING LENGTH
0C56 1101FD             LXI     D,DSPNUM+3          / D <- SOURCE
0C59 CD0601             CALL    MOVS10              / MOVE IN DATA
                /
0C5C 114900             LXI     D,ROWD-REFLEN       / [D,E] <- OFFSET
0C5F 19                 DAD     D                   / MOVE TO VAL FIELD
0C60 1604               MVI     D,REFLEN            / D <- FIELD LENGTH
0C62 CD1B03             CALL    ROWN20              / CLEAR VALUE FIELD
                /
0C65 C9         KF08X,  RET                         / EXIT
                /
                /***MESSAGE
                /
0C66 0B         KF08M1, DB      KF08MX
```

```
0C67 4E4F5420          DA       'NOT ALLOWED'
0C6B 414C4C4F
0C6F 574544
     000B     KF08MX=  .-KF08M1-1
                       EJECT

                       SUBJOB  KEY FUNCTION : KF09 : GET NETWORK
              /
              /***KEY FUNCTION : KF09 : GET NETWORK
              /
0C72 CD281F   KF09,    CALL     KU01              / CHECK FOR RESET
0C75 CD491F            CALL     KU02              / CHECK FOR SHIFT
0C78 CA7F0C            JZ       KF0905            / BRANCH ON NO SHIFT
0C7B CD791F            CALL     KU05              / SET ERROR STATE
0C7E C9                RET                        / EXIT
              /
0C7F FE15     KF0905,  CPI      KEYPRE            / IS THIS GET PREVIUS?
0C81 C28D0C            JNZ      KF0915            / NO, GET NEXT
              /
              /***FETCH PREVIOUS - FIND PRECEEDING START NODE
              /
0C84 01FFFF            LXI      B,-1              / [B,C] <- DECREMENT
0C87 218CFE            LXI      H,ADRSON          / [H,L] <- STARTING ADDR
0C8A C3930C            JMP      KF0920            / CONTINUE
              /
0C8D 010100   KF0915,  LXI      B,1               / [B,C] <- INCREMENT
0C90 218EFE            LXI      H,ADREON          / [H,L] <- STARTING ADDR
              /
              /***LOOK FOR PREV/NEXT START NODE
              /
0C93 E7       KF0920,  GETHL                      / [H,L] <- ADDRESS

              /        GET THE NETWORK!

0C94 CD980C            CALL     GETNET   / DONE
0C97 C9                RET               / RETURN
                       EJECT

\            THIS POINT IS AN
\            ENTRY TO GET A NETWORK ONTO
\            THE SCREEN.

              /        B/C=STEP VALUE FOR CTRLR ADDR (+/-/0)
              /        H/L=AN ADDRESS TO START SEARCH
              /            FOR THE START NODE
              /
              GETNET,

              /        IF H/L = 0 AND B/C IS NEG; WE ARE AT START
              /        OF LOGIC. DISPLAY ERROR AND QUIT

0C98 7C                MOV      A,H      / GET MS BYTE
0C99 B5                ORA      L        / GET AND TEST BOTH
0C9A C2A80C            JNZ      KF0927   /   NOT ZERO, GO ON

0C9D 78                MOV      A,B      / GET STEPPER SIGN
0C9E B7                TST               / + OR -?
0C9F F2A80C            JP       KF0927   /   POS, GO ON

              /        AT START OF LOGIC; GIVE ERROR

0CA2 11CB27            LXI      D,MSGSOL/ GET PTR
0CA5 C3CA0C            JMP      KF09ER  / DISPLAY AND EXIT

              /        HERE TO STEP AND SEARCH NEXT NODE

              KF0927,
0CA8 09                DAD      B                 / [H,L] <- NEXT
0CA9 09                DAD      B                 / ADDRESS FOR READ
0CAA EB                XCHG                       / SWAP
0CAB C5                PUSH     B                 / STACK INC/DEC
0CAC D5                PUSH     D                 / STACK ADDRESS
0CAD 2193FE            LXI      H,CMDBUF+3        / [H,L] <- DESTINATION
0CB0 EF                MOVDE                      / STORE DATA
              /
0CB1 110611            LXI      D,CMDRED+CMD02!:100+LENRED      / SET PARMS
```

```
    0CB4 CD8125               CALL   PIO                 / DO READ
    0CB7 E1                   POP    H                   / GET ADDRESS
    0CB8 C1                   POP    B                   / GET INC/DEC
    0CB9 C0                   RNZ                        / EXIT ON ERROR
                     /
    0CBA 3AABFE               LDA    RSPBUF+3            / A <- NODE - BYTE 0
    0CBD FE00                 CPI    NOSON!.04           / CHECK FOR START NODE
    0CBF CACE0C               JZ     KF0930              / BRANCH ON IT


    0CC2 FE04                 CPI    NOEOL!.04           / CHECK FOR END-OF-LOGIC
    0CC4 C2980C               JNZ    GETNET              / BRANCH IF NOT
                     /
    0CC7 11D727               LXI    D,MSGEOL            / [D,E] <- MESSAGE ADDR
                     /
    0CCA CD7E05      KF09ER,  CALL   ERROR               / SET ERROR
    0CCD C9                   RET                        / EXIT
                              EJECT

                     /
                     /**BUILD NETWORK
                     /
    0CCE EB          KF0930,  XCHG                       / SWAP
    0CCF 3A7CFE               LDA    KSTATE              / A <- STATE VECTOR
    0CD2 F608                 ORI    KNET                / INDICATE NETWORK ACTIV
    0CD4 327CFE               STA    KSTATE              / SET STATE
    0CD7 218CFE               LXI    H,ADRSON            / [H,L] <- DESTINATION
    0CDA EF                   MOVDE                      / STORE DATA
    0CDB 218EFE               LXI    H,ADREON            / [H,L] <- DESTINATION
    0CDE EF                   MOVDE                      / STORE DATA
    0CDF D5                   PUSH   D                   / SAVE ADDRESS
    0CE0 CD2121               CALL   KU08                / INC/DEC STEP NUMBER
                     /
    0CE3 CD8A1F               CALL   KU06                / CLEAR LOGIC DATA
                     /
    0CE6 CD8C23               CALL   KU16                / DISPLAY POWER RAIL
                     /
    0CE9 D1          KF0935,  POP    D                   / POP ADDRESS
    0CEA 13                   INX    D                   / BUMP
    0CEB 13                   INX    D                   / ADDRESS
    0CEC 2193FE               LXI    H,CMDBUF+3          / [H,L] <- DESTINATION
    0CEF EF                   MOVDE                      / STORE DATA
    0CF0 D5                   PUSH   D                   / SAVE ADDRESS
                     /
    0CF1 110A11               LXI    D,CMDRED+CMD02!.100+LENRED     / SET PARMS
    0CF4 CD8125               CALL   PIO                 / DO READ
    0CF7 C25D0F               JNZ    KF0999              / EXIT ON ERROR
                     /
    0CFA 3AABFE               LDA    RSPBUF+3            / A <- BYTE 0 OF NODE
    0CFD E67C                 ANI    NODMSK              / ISOLATE NODE TYPE
    0CFF 0F                   RRC                        / NORMALIZE
    0D00 0F                   RRC                        / FOR OFFSET
    0D01 87                   ADD    A                   / DOUBLE IT
    0D02 0600                 MVI    B,0                 / B <- 0
    0D04 4F                   MOV    C,A                 / C <- OFFSET
    0D05 210A0D               LXI    H,KF09TB            / [H,L] <- TABLE BASE
    0D08 09                   DAD    B                   / [H,L] <- ADDR OF BRANCH
    0D09 DF                   DSPTAB                     / EXECUTE ROUTINE
                              EJECT

                     /
                     /***DISPATCH TABLE FOR NODE TYPES
                     /
    0D0A 5D0F        KF09TB,  DW     KF0999              / START-OF-NETWORK
    0D0C 5D0F                 DW     KF0999              / END-OF-LOGIC
    0D0E 480D                 DW     K09100              / END-OF-COLUMN
    0D10 AA0D                 DW     K09200              / NORMALLY OPEN RELAY
    0D12 AA0D                 DW     K09200              / NORMALLY CLOSED RELAY
    0D14 AA0D                 DW     K09200              / POSITIVE TRANSITIONAL
    0D16 AA0D                 DW     K09200              / NEGATIVE TRANSITIONAL
    0D18 AA0D                 DW     K09200              / COIL
    0D1A AA0D                 DW     K09200              / LATCH
    0D1C AA0D                 DW     K09200              / DISABLED COIL
    0D1E AA0D                 DW     K09200              / DISABLED LATCH
    0D20 0F0E                 DW     K09300              / HORIZONTAL OPEN
    0D22 0F0E                 DW     K09300              / HORIZONTAL SHORT
    0D24 1C0E                 DW     K09400              / PRESET CONSTANT
```

```
0D26 2E0E         DW      K09500          / PRESET REGISTER
0D28 590E         DW      K09600          / COUNTER
0D2A 590E         DW      K09600          / TIMER - 1.00 SECS.
0D2C 590E         DW      K09600          / TIMER - 0.10 SECS.
0D2E 590E         DW      K09600          / TIMER - 0.01 SECS.
0D30 D00E         DW      K09700          / CALC : C-NODE : CONSTANT
0D32 D00E         DW      K09700          / CALC : C-NODE : REGIST R
0D34 F30E         DW      K09800          / CALCULATE
0D36 230F         DW      K09900          / CONVERT
0D38 4D0F         DW      K09A00          / NULL
0D3A 4D0F         DW      K09A00          / NOT USED
0D3C 4D0F         DW      K09A00          / NOT USED
0D3E 4D0F         DW      K09A00          / NOT USED
0D40 4D0F         DW      K09A00          / NOT USED
0D42 4D0F         DW      K09A00          / NOT USED
0D44 4D0F         DW      K09A00          / NOT USED
0D46 4D0F         DW      K09A00          / NOT USED
                  EJECT

           /
           /***END OF COLUMN NODE
           /
0D48 CD5124 K09100, CALL  K022            / [H,L] <- COLTAB POINTER
0D4B 010400       LXI     B,EOCHI         / [B,C] <- OFFSET
0D4E 09           DAD     B               / [H,L] <- EOC NODE
0D4F 3608         MVI     M,NOEOC!.04     / STORE BYTE 0
0D51 23           INX     H               / BUMP POINTER
0D52 3AACFE       LDA     RSFBUF+4        / A <- BYTE 1
0D55 77           MOV     M,A             / STORE CONNECTIVITY
0D56 3A7EFE       LDA     CURACT          / A <- CURSOR
0D59 E60F         ANI     COLMSK          / ISOLATE COLUMN
0D5B F610         ORI     .10             / FAKE TO ROW 1
0D5D 47           MOV     B,A             / B <- FAKED CURSOR
0D5E CD4705       CALL    CUR100          / [H,L] <- FIRST NODE AD R
0D61 110600       LXI     D,DSPNOD-1      / [D,E] <- OFFSET
0D64 19           DAD     D               / [H,L] <- VERTICAL COLUMN
0D65 115000       LXI     D,ROWB          / [D,E] <- OFFSET
           /
0D68 3AACFE       LDA     RSFBUF+4        / A <- CONNECTIVITY
0D6B 0607         MVI     B,MAXROW        / B <- COUNTER
           /
0D6D 4F    K09120, MOV    C,A             / C <- CONNECTIVITY
0D6E E680         ANI     .80             / CHECK FOR POWER FROM U
0D70 C2820D       JNZ     K09140          / BRANCH ON IT
0D73 79           MOV     A,C             / A <- CONNECTIVITY
0D74 E640         ANI     .40             / CHECK FOR POWER DOWN
0D76 C27D0D       JNZ     K09130          / BRANCH ON IT
0D79 19           DAD     D               / NO CHANGE
0D7A C39B0D       JMP     K09170          / CONTINUE
           /
0D7D 36D0  K09130, MVI    M,CA1101        / DOWN VERTICAL - DISPLAY
0D7F C39B0D       JMP     K09160          / CONTINUE
                  EJECT
0D82 79    K09140, MOV    A,C             / A <- CONNECTIVITY
0D83 E640         ANI     .40             / CHECK FOR DOWN VERTICAL
0D85 C2960D       JNZ     K09150          / BRANCH ON IT

           /      IF WE HAVE A DASH HERE, DO NOT CONNECT
           /      THE VERTICAL DOWN.  DASH MEANS NO
           /      CONNECTION

0D88 7E           MOV     A,M     / GET CHAR THERE NOW
0D89 E6FE         ANI     -1-CATHI/ KILL THE HILITE BIT
0D8B FE72         CPI     ASCDSH  / IS IT A DASH?
0D8D CA920D       JZ      K09145  /  YES, SKIP OVER CHAR
0D90 36DC         MVI     M.CA1110/  NO, LOAD DISPLAY
           K09145,
0D92 19           DAD     D               / BUMP POINTER
0D93 C39B0D       JMP     K09170          / CONTINUE
           /
0D96 36E8  K09150, MVI    M,CA1111        / LOAD DISPLAY
           /
0D98 19    K09160, DAD    D               / BUMP ADDRESS
0D99 36E4         MVI     M,CA0011        / LOAD DISPLAY
           /
0D9B 19    K09170, DAD    D               / BUMP ADDRESS
```

```
0D9C 79                MOV   A,C          / A <- CONNECTIVITY
0D9D 07                RLC                / ROTATE IT
0D9E 05                DCR   B            / DECREMENT COUNTER
0D9F C2[illegible]0D   JNZ   F09120       / CONTINUE UNTIL DONE
                /
0DA2 D1                POP   D            / [D,E] <- ADDR
0DA3 D5                PUSH  D            / STACK IT AGAIN
0DA4 CD[illegible]0F   CALL  [illegible]  / DO UPDATES
0DA7 C3E90C            JMP   [illegible]  / CONTINUE
                       EJECT
\ SINGLE-NODE [illegible]
                /
0DAA 3AABFE    F09200  LDA   RSFBUF+3     / A <- BYTE 0
0DAD E670              ANI   [illegible]  / ISOLATE NODE TYPE
0DAF 0F                RRC                / RIGHT-JUSTIFY
0DB0 0F                RRC                / NODE TYPE
0DB1 CD[illegible]     CALL  K01[illegible] / DISPLAY CONTACT
                /
0DB4 CD0B[illegible]   CALL  K012         / SET POINTERS
0DB7 11[illegible]00   LXI   D,ROWB+2     / [D,E] <- OFFSET
0DBA 19                DAD   D            / [H,L] <- REF AREA
0DBB EB                XCHG               / SWAP
                
0DBC 3AABFE            LDA   RSFBUF+3     / A <- NODE TYPE
0DBF 47                MOV   B,A          / B <- NODE TYPE
0DC0 E603              ANI   SEQFLG       / ISOLATE REFERENCE TYPE
0DC2 0E30              MVI   C,ASC0       / C <- 0
0DC4 FE01              CPI   OUTFLG       / CHECK FOR OUTPUT COIL
0DC6 CAD50D            JZ    F09210       / BRANCH ON IT
0DC9 FE02              CPI   INTFLG       / CHECK FOR INTERNAL COIL
0DCB CAD50D            JZ    F09210       / BRANCH ON IT
0DCE FE03              CPI   SEQFLG       / CHECK FOR SEQUENCER
0DD0 CAEE0D            JZ    F09230       / BRANCH TO SEQ
0DD3 0E31              MVI   C,ASC1       / INPUT REFERENCE
                /
0DD5 79        F09210  MOV   A,C          / A <- REFERENCE TYPE
0DD6 12                STAX  D            / STORE IT
0DD7 13                INX   D            / BUMP POINTER
                /
0DD8 3AACFE            LDA   RSFBUF+4     / A <- REFERENCE NUMBER
0DDB 6F                MOV   L,A          / L <- REFERENCE NUMBER
0DDC 2600              MVI   H,0          / H <- 0
0DDE 23                INX   H            / MAKE RELATIVE BASE 1
0DDF 78                MOV   A,B          / A <- NODE TYPE
0DE0 E603              ANI   SEQFLG       / ISOLATE REFERENCE TYPE
0DE2 FE02              CPI   INTFLG       / INTERNAL COIL?
0DE4 C2E80D            JNZ   F09220       / NO, CONTINUE
0DE7 24                INR   H            / BUMP HI-ORDER VALUE
                /
0DE8 CDD501    F09220  CALL  [illegible]  / CONVERT + DISPLAY
0DEB C3090F            JMP   F09240       / CONTINUE
                /
0DEE 3E32      F09230  MVI   A,ASC2       / SEQUENCE REFERENCE
0DF0 12                STAX  D            / DISPLAY '2'
0DF1 13                INX   D            / BUMP POINTER
0DF2 3AACFE            LDA   RSFBUF+4     / A <- SEQ DATA
0DF5 47                MOV   B,A          / B <- BACKUP
0DF6 E6E0              ANI   [illegible]  / ISOLATE REGISTER REF
0DF8 07                RLC                / ROTATE
0DF9 07                RLC                / TO FORM
0DFA 07                RLC                / CONSTANT
0DFB C631              ADI   ASC1         / A <- REG REFERENCE
0DFD 12                STAX  D            / STORE IT
0DFE 13                INX   D            / BUMP POINTER
                /
0DFF 78                MOV   A,B          / A <- REGISTER REF
0E00 E61F              ANI   [illegible]  / ISOLATE STEP NUMBER
0E02 3C                INR   A            / BUMP IT
0E03 6F                MOV   L,A          / L <- STEP NUMBER
0E04 2600              MVI   H,0          / H <- 0
0E06 CDE801            CALL  [illegible]  / CONVERT AND DISPLAY
                /
0E09 CD[illegible]0F F09240 CALL [illegible] / DO COMMON CODE
0E0C C3E90C            JMP   [illegible]  / CONTINUE
                       EJECT
```

```
                         /
                         /***HORIZONTAL OPEN/SHORT
                         /
0E0F 3AABFE              K09300, LDA     RSPBUF+3         / A <- BYTE 0
0E12 E67C                        ANI     NODMSK           / ISOLATE NODE TYPE
0E14 0F                          RRC                      / SHIFT
0E15 0F                          RRC                      / RIGHT
0E16 CD1323                      CALL    KU13
0E19 C3090E                      JMP     K09240
                                 EJECT
                         /
                         /***PRESET CONSTANT/B-NODE CONSTANT
                         /
0E1C CD6423              K09400, CALL    KU14             / DISPLAY TOP LINE
                         /
0E1F EB                  K09405, XCHG                     / SWAP
0E20 21ABFF                      LXI     H,RSPBUF+3       / [H,L] <- POINTER
0E23 E7                          GETHL                    / [H,L] <- NODE
0E24 7C                          MOV     A,H              / A <- BYTE 0
0E25 E603                        ANI     -1-NODMSK-EOCFLG/ ISOLATE HI-ORDER DATA
0E27 67                          MOV     H,A              / H <- HI-ORDER DATA
0E28 CDC201                      CALL    BNBCD4           / DISPLAY
0E2B C3090E                      JMP     K09240           / COMMON CODE
                                 EJECT
                         /
                         /***PRESET REGISTER / B-NODE REGISTER
                         /
0E2E CD6423              K09500, CALL    KU14             / DISPLAY TOP LINE
                         /
0E31 EB                  K09505, XCHG                     / SWAP
0E32 21ABFE                      LXI     H,RSPBUF+3       / [H,L] <- POINTER
0E35 E7                          GETHL                    / [H,L] <- NODE
0E36 7C                          MOV     A,H              / A <- BYTE 0
0E37 2600                        MVI     H,0              / H <- 0
0E39 23                          INX     H                / BUMP TO MAKE BASE 1
0E3A EB                          XCHG                     / SWAP
0E3B E603                        ANI     3EOFLG           / ISOLATE REGISTER TYPE
0E3D 3634                        MVI     M,ASC4           / ASSUME HOLDING REGISTER
0E3F FE00                        CPI     HLDFLG           / CHECK FOR IT
0E41 CA510E                      JZ      K09515           / BRANCH OKAY
0E44 FE02                        CPI     DUMFLG           / CHECK FOR DUMMY REG
0E46 C24F0E                      JNZ     K09510           / BRANCH IF NOT
0E49 110000                      LXI     D,0              / CLEAR [D,E]
0E4C C3510E                      JMP     K09515           / CONTINUE
                         /
0E4F 3633                K09510, MVI     M,ASC3           / INPUT REGISTER
                         /
0E51 EB                  K09515, XCHG                     / SWAP
0E52 13                          INX     D                / BUMP POINTER
0E53 CDD501                      CALL    BNBCD5           / CONVERT AND DISPLAY
0E56 C3090E                      JMP     K09240           / CONTINUE
                                 EJECT

                         /
                         /***COUNTER/TIMERS
                         /
0E59 3AABFE              K09600, LDA     RSPBUF+3         / A <- BYTE 0
0E5C E67C                        ANI     NODMSK           / ISOLATE NODE TYPE
0E5E 0F                          RRC                      / SHIFT
0E5F 0F                          RRC                      / RIGHT
0E60 21131B                      LXI     H,MULTAB+1       / [H,L] <- TABLE ADDRESS
0E63 110700                      LXI     D,MULRCL         / [D,E] <- RECORD LENGTH
                         /
0E66 BE                  K09610, CMP     M                / CHECK FOR MATCH
0E67 CA6E0E                      JZ      K09620           / BRANCH ON MATCH
0E6A 19                          DAD     D                / BUMP TO NEXT RECORD
0E6B C3660E                      JMP     K09610           / CONTINUE
                         /
0E6E E5                  K09620, PUSH    H                / SAVE POINTER
0E6F CD0B23                      CALL    KU12             / B <- CURSOR
0E72 23                          INX     H                / BUMP BEYOND ATTRIBUTE
0E73 D1                          POP     D                / [D,E] <- SOURCE
0E74 13                          INX     D                / BUMP POINTER
0E75 0605                        MVI     B,DSPNOD-2       / B <- LENGTH
0E77 CD0601                      CALL    MOVS10           / DISPLAY DATA
0E7A 36E0                        MVI     M,CA1100         / DO VERTICAL STUB
                         /
```

```
0E7C 114B00   K09620, LXI   D,ROWB-2        / [D,E] <- OFFSET
0E7F 19               DAD   D               / [H,L] <- NEXT LINE
0E80 3605             MVI   M,ASCLB         / DISPLAY BOARDER
0E82 23               INX   H               / BUMP POINTER
0E83 EB               XCHG                  / SWAP
                      /
0E84 21ABFE           LXI   H,RSPBUF+3      / [H,L] <- POINTER
0E87 E7               GETHL                 / [H,L] <- NODE
0E88 7C               MOV   A,H             / A <- BYTE 0
0E89 2600             MVI   H,0             / H <- 0
0E8B 23               INX   H               / BUMP REFERENCE
0E8C EB               XCHG                  / SWAP
0E8D 47               MOV   B,A             / SAVE BYTE 0
0E8E E67C             ANI   NODMSK          / ISOLATE NODE TYPE
0E90 FE40             CPI   NOCON!.04       / CHECK FOR CONVERT
0E92 CAC10E           JZ    K09660          / BRANCH ON CONVERT
                      /
0E95 78               MOV   A,B             / REFETCH NODE TYPE
0E96 E603             ANI   SEQFLG          / ISOLATE REFERENCE TYPE
0E98 3614             MVI   M,ASC4UN        / ASSUME HOLDING
0E9A FE00             CPI   HLDFLG          / CHECK FOR HOLDING
0E9C CAAC0E           JZ    K09640          / BRANCH ON IT
0E9F FE0?             CPI   DUMFLG          / CHECK FOR DUMMY
0EA1 C2AA0E           JNZ   K09630          / BRANCH ON INPUT REGIST R
0EA4 110000           LXI   D,0             / [D,E] <- 0
0EA7 C3AC0E           JMP   K09640          / CONTINUE
                      /
0EAA 3613     K09630, MVI   M,ASC3UN        / INPUT REGISTER
                      /
0EAC EB       K09640, XCHG                  / SWAP
0EAD 13               INX   D               / BUMP POINTER
0EAE D5               PUSH  D               / SAVE POINTER
0EAF CD0501           CALL  BNBCD3          / DISPLAY REFERENCE
                      /
0EB2 E1               POP   H               / GET POINTER
0EB3 0603             MVI   B,3             / B <- COUNTER
                      /
0EB5 7E       K09650, MOV   A,M             / A <- REFERENCE DIGIT
0EB6 D620             SUI   ASC0-ASC0UN     / UNDER LINE DIGIT
0EB8 77               MOV   M,A             / STORE IN DISPLAY
0EB9 23               INX   H               / INCREMENT POINTER
0EBA 05               DCR   B               / DECREMENT COUNTER
0EBB C2B50E           JNZ   K09650          / LOOP
0EBE C3090E           JMP   K09240          / COMMON CODE
                      /
0EC1 3610     K09660, MVI   M,ASC0UN        / ASSSUME COIL OUTPUT
0EC3 78               MOV   A,B             / A <- BYTE 0
0EC4 E603             ANI   DRGFLG          / ISOLATE DESTINATION
0EC6 FE02             CPI   DINFLG          / CHECK FOR COIL OUTPUT
0EC8 CAAC0E           JZ    K09640          / BRANCH ON IT
                      /
0ECB 3614             MVI   M,ASC4UN        / REGISTER OUTPUT
0ECD C3AC0E           JMP   K09640          / AND CONTINUE
                      EJECT

                      /
                      /***C-NODE CONSTANT / REGISTER
                      /
0ED0 CD0B23   K09700, CALL  K012            / B <- CURSOR
0ED3 23               INX   H               / BUMP
0ED4 3605             MVI   M,ASCLB         / DISPLAY LEFT BOARDER
0ED6 110400           LXI   D,4             / [D,E] <- OFFSET
0ED9 19               DAD   D               / [H,L] <- RIGHT BOARDER
0EDA 3609             MVI   M,ASCRB         / DISPLAY RIGHT BOARDER
0EDC 23               INX   H               / BUMP
0EDD 36E0             MVI   M,CA1100        / DISPLAY CONNECTOR
0EDF 114B00           LXI   D,ROWB-DSPNOD+2 / [D,E] <- OFFSET
0EE2 19               DAD   D               / [H,L] <- NEXT ROW
0EE3 3605             MVI   M,ASCLB         / DISPLAY LEFT BOARDER
0EE5 23               INX   H               / BUMP
                      /
0EE6 3AABFE           LDA   RSPBUF+3              / A <- BYTE 0
0EE9 E67C             ANI   NODMSK          / ISOLATE NODE TYPE
0EEB FE50             CPI   NOCCON!.04      / CHECK FOR CONSTANT
0EED CA1F0E           JZ    K09405          / BRANCH ON IT
```

```
0EF0 C3310E            JMP     K09505          / BRANCH FOR REGISTER
                /
                /***CALCULATE NODES
                /
0EF3 CD0B23    K09800, CALL    KU12            / B <- CURSOR
0EF6 1163FF            LXI     D,-ROWB-ROWB+3  / [D,E] <- OFFSET
0EF9 19                DAD     D               / [H,L] <- ADDR FOR SYMB
0EFA 3AABFE            LDA     RSPBUF+3        / A <- NODE
0EFD E603              ANI     DIVFLG          / ISOLATE TYPE
0EFF 362B              MVI     M,ASCPLS        / ASSUME ADD
0F01 FE00              CPI     ADDFLG          / CHECK
0F03 CA160F            JZ      K09810          / BRANCH OKAY
0F06 362D              MVI     M,ASCMIN        / ASSUME SUB
0F08 FE01              CPI     SUBFLG          / CHECK
0F0A CA160F            JZ      K09810          / BRANCH OKAY
0F0D 362A              MVI     M,ASCAST        / ASSUME MULTIPLY
0F0F FE02              CPI     MPXFLG          / CHECK
0F11 CA160F            JZ      K09810          / BRANCH OKAY
0F14 362F              MVI     M,ASCSLH        / MUST BE DIVIDE
                /
0F16 119E00    K09810, LXI     D,ROWB+ROWB-2   / [D,E] <- OFFSET
0F19 19                DAD     D               / [H,L] <- DISPLAY
0F1A 11560F            LXI     D,KF09MS        / DO FIRST LINE
0F1D CD0301            CALL    MOVSTR          / VIA MOVSTR
0F20 C37C0E            JMP     K09625          / CONTINUE
                       EJECT

                /
                /***CONVERT NODES
                /
0F23 3AABFE    K09900, LDA     RSPBUF+3        / A <- NODE TYPE
0F26 E603              ANI     DRGFLG          / ISOLATE TYPE DATA
0F28 FE02              CPI     DINFLG          / CHECK FOR DESTINATION
0F2A F2590E            JP      K09600          / BRANCH ON DESTINATION
                /
0F2D CD6423            CALL    KU14            / DISPLAY TOP LINE
0F30 EB                XCHG                    / SWAP
0F31 21ABFE            LXI     H,RSPBUF+3      / SET POINTER
0F34 E7                GETHL                   / [H,L] <- NODE DATA
0F35 7C                MOV     A,H             / A <- BYTE 0
0F36 2600              MVI     H,0             / CLEAR HI-ORDER BYTE
0F38 23                INX     H               / BUMP FROM ZERO BASE
0F39 EB                XCHG                    / SWAP
                /
0F3A 3631              MVI     M,ASC1          / ASSUME INPUT SOURCE
0F3C E603              ANI     DRGFLG          / ISOLATE SOURCE TYPE
0F3E FE00              CPI     SINFLG          / WAS IT FROM INPUT?
0F40 CA450F            JZ      K09905          / BRANCH ON INPUT
0F43 3634              MVI     M,ASC4          / SOURCE IS REGISTER
                /
0F45 23        K09905, INX     H               / BUMP POINTER
0F46 EB                XCHG                    / SWAP
0F47 CDD501            CALL    BNBCD3          / DISPLAY REFERENCE
0F4A C3090E            JMP     K09240          / AND CONTINUE
                       EJECT

                /
                /***USED OR NORMALLY INVALID NODE TYPES
                /
0F4D 11EA09    K09A00, LXI     D,KF03M1        / [D,E] <- MESSAGE ADDR
0F50 CD7E05            CALL    ERROR           / SET ERROR STATE
0F53 C35D0F            JMP     KF0999          / AND EXIT
                       EJECT

                /
                /***MESSAGE
                /
0F56 06        KF09MS, DB      KF09MX
0F57 05201B20          DB      ASCLB,ASCBLK,ASCADN,ASCBLK,ASCRB,CA1100
0F5B 09E0
     0006      KF09MX= .-KF09MS-1
                       EJECT
```

```
\   HERE  WHEN  DONE  WITH  NETWORK  DISPLAY

                   KF099:
                   /        NOW, PUT CURSOR AT HOME (1,1) UNLESS
                   /        WE HAVE A COIL AT 1,1.  IN THAT CASE,
                   /        PUT IT AT 1, MAX COL

0F5D 3A7DFE                 LDA     CURDSP  / GET PRESENT LOC
0F60 47                     MOV     B,A     /   TO B FOR OLD

0F61 3E11                   MVI     A,.11   / GET "HOME
0F63 327EFE                 STA     CURACT  / SET REAL
0F66 327DFE                 STA     CURDSP  / SET DISPLAY-TO-BE

0F69 CDAA23                 CALL    K017    / GET PTR TO "MATROW"
                                            /   FOR NODE TYPE
0F6C 7E                     MOV     A,M     / GET TYPE
0F6D 3280FE                 STA     CURCON  / SET IT UP

0F70 CD7023                 CALL    ISCOIL  / IS IT A COIL TYPE?
0F73 DA7B0F                 JC      KF099A  /   NO, ALL SET

                   /        HERE WHEN NODE @ 1,1 IS A COIL TYPE

0F76 3E1B                   MVI     A,.10+MAXCOL     / SET ROW 1,COIL COL
0F78 327DFE                 STA     CURDSP           / DISPLAY HERE, INSTEAD

                   /        HERE TO PUT CURSOR CORRECTLY

                   KF099A,
0F7B 3A7DFE                 LDA     CURDSP  / GET NEW DISPLAY POS
0F7E 4F                     MOV     C,A     / SET FOR CALL
0F7F CD2B05                 CALL    CURSOR

0F82 CD4524                 CALL    K021             / START TIMERS
0F85 D1                     POP     D                / CLEAN STACK
                   /
0F86 C9                     RET                      / EXIT
                            EJECT
\****  SUBROUTINE  K09Z
\****  SUBROUTINE  K09ZZ
                   /
                   /***THIS SUBROUTINE PERFORMS COMMON CODE DURING
                   /***THE PROCESSING OF A NODE.
                   /
                   /***PARAMETERS:
                   /
                   /        CURACT . ACTUAL CURSOR LOCATION
                   /        CURDSP . DISPLAY CURSOR LOCATION
                   /
                   /***ACTIVITIES:
                   /
                   /        1.  LOAD NODE TYPE INTO MATROW (K09Z ONLY)
                   /        2.  UPDATES ADRCON
                   /        3.  UPDATES COLTAB
                   /        4.  MOVES CURSOR TO NEXT DISPLAY POSITION
                   /
                   K09Z,

                   /        THIS ENTRANCE BEGINS BY UPDATTING "MATROW"
                   /        WITH THE CURRENT NODE TYPE

0F87 CDAA23                 CALL    K017             / [H,L] <= MATRIX POINTE
0F8A 3A0BFE                 LDA     RSPBUF+3         / A <- BYTE 0
0F8D E67C                   ANI     NODMSK           / ISOLATE NODE TYPE
0F8F 0F                     RRC                      / SHIFT
0F90 0F                     RRC                      / RIGHT
0F91 77                     MOV     M,A              / STORE IN MATRIX
                   /
                   /        THIS IS THE ALTERNATE ENTRY WHICH DOES NOT
                   /        UPDATE MATROW BY DOES EVERTHING ELSE.
                   /
                   K09ZZ,

                   /        NOW UPDATE THE 'CURRENT' (-2) CONTROLLER
```

```
                          /        END OF NETWORK ADDRESS.  (IT WILL BE
                          /        THE END OF THIS NETWORK WHEN THE
                          /        WHOLE NETWORK IS DISPLAYED.)

0F92 218EFE                        LXI     H,ADREON           / [H,L] <- SOURCE
0F95 E7                            GETHL                      / [H,L] <- LAST ADDRESS
0F96 23                            INX     H                  / BUMP
0F97 23                            INX     H                  / ADDRESS
0F98 EB                            XCHG                       / SWAP
0F99 218EFE                        LXI     H,ADREON           / [H,L] <- DESTINATION
0F9C EF                            MOVDE                      / STORE DATA

                          /        NOW, KEEP TRACK OF THE LOWEST AND HIGHEST
                          /        CONTROLLER ADDR FOR THIS COLUMN.

0F9D 3A7EFE                        LDA     CURACT             / A <- CURSOR
0FA0 E60F                          ANI     COLMSK             / ISOLATE COLUMN
0FA2 010600                        LXI     B,COLBKL           / [B,C] <- OFFSET
0FA5 21E7FD                        LXI     H,COLTAB-COLBKL    / [H,L] <- ADDRESS
                          /
0FA8 09                   K09Z10,  DAD     B                  / BUMP ADDRESS
0FA9 3D                            DCR     A                  / DECREMENT COUNTER
0FAA C2A80F                        JNZ     K09Z10             / LOOP UNTIL DONE
                          /
0FAD BE                            CMP     M                  / TEST FOR START OF COLUMN
0FAE C2BB0F                        JNZ     K09Z20             / BRANCH IF NOT
0FB1 23                            INX     H                  / BUMP POINTER
0FB2 BE                            CMP     M                  / TEST AGAIN
0FB3 2B                            DCX     H                  / DECREMENT POINTER
0FB4 C2BB0F                        JNZ     K09Z20             / BRANCH IF NOT ZERO
0FB7 EF                            MOVDE                      / STORE ADDR START
0FB8 C3BD0F                        JMP     K09Z25             / CONTINUE
                          /
0FBB 23                   K09Z20,  INX     H                  / BUMP TO
0FBC 23                            INX     H                  / ADDR END
                          /
0FBD EF                   K09Z25,  MOVDE                      / STORE LAST ADDR
                          /
0FBE 3AABFE                        LDA     RSPBUF+3           / A <- BYTE 0 OF NODE
0FC1 E680                          ANI     EOCFLG             / CHECK FOR EOC FLAG
0FC3 CAE50F                        JZ      K09Z40             / BRANCH IF NOT
                          /
0FC6 3A7EFE               K09Z30,  LDA     CURACT             / A <- CURSOR
0FC9 47                            MOV     B,A                / B <- CURSOR
0FCA E60F                          ANI     COLMSK             / ISOLATE COLUMN
0FCC FE0B                          CPI     MAXCOL             / CHECK FOR LAST COLUMN
0FCE CA0010                        JZ      K09ZX              / EXIT IF DONE
0FD1 C611                          ADI     :11                / GO TO START NEXT COLUMN
                          /
0FD3 4F                   K09Z35,  MOV     C,A                / C <- NEW CURSOR
0FD4 327EFE                        STA     CURACT             / STORE NEW REAL CURSOR
0FD7 3A7DFE                        LDA     CURDSP             / GET "OLD" CURSOR POS
0FDA 47                            MOV     B,A                / SET UP FOR MOVE
0FDB CD2B05                        CALL    CURSOR             / DISPLAY NEW CURSOR
0FDE 79                            MOV     A,C                / A <- NEW DISPLAY CURSOR
0FDF 327DFE                        STA     CURDSP             / STORE IT
0FE2 C30010                        JMP     K09ZX              / EXIT
                          /
0FE5 3AABFE               K09Z40,  LDA     RSPBUF+3           / A <- NODE TYPE
0FE8 E67C                          ANI     NODMSK             / ISOLATE IT
0FEA FE08                          CPI     NOEOC!:04          / CHECK FOR EOC NODE
0FEC CAC60F                        JZ      K09Z30             / BRANCH ON IT
                          /
0FEF 3A7EFE                        LDA     CURACT             / A <- CURSOR
0FF2 47                            MOV     B,A                / B <- CURSOR
0FF3 E6F0                          ANI     ROWMSK             / ISOLATE ROW
0FF5 FE70                          CPI     MAXROW!:10         / CHECK FOR MAX
0FF7 CA0010                        JZ      K09ZX              / EXIT IF IT IS
0FFA 78                            MOV     A,B                / A <- OLD CURSOR
0FFB C610                          ADI     :10                / DROP TO NEXT ROW
0FFD C3D30F                        JMP     K09Z35             / CONTINUE
                          /
1000 C9                   K09ZX,   RET                        / EXIT
                                   EJECT
```

```
                    SUBJOB  KEY FUNCTION : KF10 : SEARCH
           /
           /***KEY FUNCTION : KF10 : SEARCH
           /
1001 CD281F  KF10,  CALL    KU01            / CHECK FOR RESET
1004 CD491F         CALL    KU02            / CHECK FOR SHIFT
1007 C21010         JNZ     KF1005          / BRANCH ON SHIFT
           /
100A 110200         LXI     D,ADRUSE        / SEARCH FROM START
100D C31710         JMP     KF1010          / OF LOGIC
           /
1010 218EFE  KF1005, LXI    H,ADREON        / SEARCH FROM CURRENT
1013 E7             GETHL                   /    NETWORK
1014 23             INX     H               / BUMP TO
1015 23             INX     H               / NEXT NETWORK
1016 EB             XCHG                    / SWAP
           /
1017 2193FE  KF1010, LXI    H,CMDBUF+3      / SET POINTER
101A EF             MOVDE                   / LOAD ADDRESS
           /
101B 110000         LXI     D,0             / [D,E] <- INITIAL DATA
101E EF             MOVDE                   / LOAD IN BUFFER
           /
101F 11FFFF         LXI     D,.FFFF         / [D,E] <- INITIAL MASK
1022 EF             MOVDE                   / LOAD IN BUFFER

           /        INITIALIZE RUNNING STEP COUNT

1023 210000         LXI     H,0     / SET TO ZERO
1026 220BFF         SHLD    SRCHST  / X
                    EJECT
\    HERE TO CHECK CONTACT FIELD
\    FOR SEARCH TYPE

1029 3AB3FC         LDA     DSPCON          / A <- CONTACT FIELD
102C FE1F           CPI     ASCCBK          / CHECK FOR UNDEFINED
102E CA4110         JZ      KF1015          / BRANCH ON UNDEFINED
           /
1031 3A97FE         LDA     CMDBUF+7        / A <- MASKHI
1034 E683           ANI     -1-NODMSK       / CLEAR NODE TYPE FIELD
1036 3297FE         STA     CMDBUF+7        / SET NEW MASKHI
           /
1039 3A7FFE         LDA     ASMCON          / A <- CONTACT TYPE
103C 07             RLC                     / SHIFT
103D 07             RLC                     / LEFT
103E 3295FE         STA     CMDBUF+5        / STORE NEW DATAHI
                    EJECT
\    HERE TO CHECK NUMERIC FIELD
\    FOR SEARCH TYPE

1041 3A01FD  KF1015, LDA    DSPNUM+3        / A <- NUMERIC FIELD
1044 FE1D           CPI     ASCNBK          / CHECK FOR UNDEFINED
1046 CA6710         JZ      KF1020          / BRANCH ON UNDEFINED
           /
1049 3EFF           MVI     A,.FF           / ALLOW ALL TYPES
104B CDC71F         CALL    KU07            / VERIFY REFERENCE
104E C25711         JNZ     KF10X           / BRANCH ON ERROR
           /
1051 EB             XCHG
1052 2195FE         LXI     H,CMDBUF+5      / SET POINTER
1055 7E             MOV     A,M             / A <- DATAHI
1056 B2             ORA     D               / SET REFERENCE HIGH BIT
1057 77             MOV     M,A             / STORE DATAHI
           /
1058 23             INX     H               / BUMP POINTER
1059 73             MOV     M,E             / STORE DATALO
           /
105A 23             INX     H               / BUMP POINTER (=CMDBUF+7)
105B 7E             MOV     A,M             / A <- MASKHI
105C FEFF           CPI     .FF             / ARE WE LOOKING FOR
                                            /   A CONTACT?
105E CA6410         JZ      KF1017          /   YES, IGNORE REF
                                            /   HIGH BITS FOR NOW
                                            / NO.....
```

```
1061 E6FC              ANI    -1-SEQFLG        / CLEAR REFERENCE HIGH BITS
1063 77                MOV    M,A              / STORE MASKHI
              KF1017,
1064 23                INX    H                / BUMP POINTER
1065 3600              MVI    M,0              / CLEAR MASKLO
                       EJECT
\    HERE TO ACTUALLY
\    DO THE SEARCH!

1067 110A30   KF1020,  LXI    D,CMDSCH!:100+LENSCH    / SET PARMS
106A CD8125            CALL   P10              / DO SEARCH
106D C25711            JNZ    KF10X            / BRANCH ON ERROR

              /        KEEP A RUNNING COUNT OF THE # OF S. O. N.
              /        NODES PASSED DURING SEARCH

1070 21ADFE            LXI    H,RSPBUF+5 / PTR TO RETURNED COUNT
1073 E7                GETHL            / # TO...
1074 EB                XCHG             /    D/E

1075 210BFF            LXI    H,SRCHST/ PTR TO RUNNING COUNT CELLS
1078 E7                GETHL          / GET CURRENT #
1079 19                DAD    D       / ADD NEW VALUE
107A EB                XCHG           / TO D/E FOR STORE
107B 210BFF            LXI    H,SRCHST/ PTR AGAIN
107E EF                MOVDE          / SAVE RUNNING TOTAL

              /        DID WE FIND ANYTHING? OR NO MATCH

107F 21A9FE            LXI    H,RSPBUF+1 / GET THE ADDR RETURNED
1082 E7                GETHL            /    INTO H/L

1083 11FFFF            LXI    D,-1    / SEE IF VALID OR NOT
1086 F7                DCMP           / MATCH OR NO MATCH?
1087 CA5B11            JZ     KF12NM  /    NO MATCH, TAKE ERROR EXIT

              /        DID WE GET THE FAMOUS "END-OF-LOGIC"
              /        NODE RETURNED.  IF SO, "NO MATCH"

108A 3AABFE            LDA    RSPBUF+3/ GET NODE TYPE
108D E67C              ANI    NODMSK  / ISOLATE IT
108F FE04              CPI    NOEOL!4 / IS IT END OF LOGIC?
1091 CA5B11            JZ     KF12NM  /    YES, TAKE NO MATCH EXIT

              /        OKAY, WE FOUND A MATCH TO THE REQUEST.
              /        NOW, SEE IF WE WERE LOOKING FOR A # ONLY.  IF SO,
              /        THIS IS A SPECIAL PROBLEM

1094 3AB3FC            LDA    DSPCON  / GET CONTACT TYPE
1097 FE1F              CPI    ASCCBK  / BLANK?
1099 C21911            JNZ    KF1080  /    NO, SKIP SPECIAL CHECK

              /        CONTACT IS BLANK; SEE IF NUMBER IS NOT
              /        BLANK

109C 3A01FD            LDA    DSPNUM+3/ GET MS DIGIT OF #
109F FE1D              CPI    ASCNBK  / IS THERE A #?
10A1 CA1911            JZ     KF1080  /    NO, NOT SPECIAL
                       EJECT
\          HERE WHEN ONLY # SEARCH!

              /        THIS IS A SPECIAL CASE.  WE HAVE A MATCH ON
              /        THE L.S. BYTE OF REFERENCE ONLY.  NOW WE
              /        MUST SEE IF THE NODE TYPE WITH MATCHING
              /        # IS TRULY A MATCH.

              /        THERE ARE BASICALLY 2 PERTINENT SERIES OF #S:
              /        1-IF USER PUT IN 0XXX TO 2XXX, MATCH ON
              /          TYPE MUST BE IN RANGE OF OPEN RELAY TO
              /          DIS LATCH COIL.  ALSO, SPECIAL
              /          TEST ON CONVERT NODE FOR 0XXX,1XXXX
              /        2-IF USER PUT IN 3XXX TO 4XXX, MATCH
              /          TYPE MUST BE ON RANGE FROM PRESET REG/B TO C-NODE
              /          REG, EXCEPT C-NODE CONSTANT.  ALSO, CALC NODE
```

```
                    ;        IS A SPECIAL CASE, MUST BE 4XXX ONLY.
                    ;       DECIDE WHICH SERIES: 0-2XXX OR 3-4XXX
10A4 FE33                   CPI     ASC3    ; < OR >=?
10A6 D2E310                 JNC     KF10RG  ; >=  WE HAVE A REGISTER
                                            ; <   FALL TO 0-2XXX
                            EJECT
\    HERE WHEN USER WANTS
\    0XXX-2XXX
                    ;       GET NODE TYPE AND SEE IF VALID
10A9 3AABFE                 LDA     RSPBUF+3; GET NODE TYPE BYTE
10AC E670                   ANI     NODMSK  ; ISOLATE TYPE
10AE 0F                     RRC             ; TO LOW END
10AF 0F                     RRC             ; X
                    ;       IF CONVERT, SPECIAL
10B0 FE13                   CPI     NOCON   ; CONVERT?
10B2 CAC810                 JZ      KF1025  ;   YES, GO SPECIAL
                    ;       SEE IF IN REGULAR RANGE
10B5 FE03                   CPI     NODREL  ; LOWER THAN LOW?
10B7 DA0F11                 JC      KF1070  ;   YES, MATCH FAIL
10BA FE0B                   CPI     NODLAT+1; HIGHER THAN HIGH?
10BC D20F11                 JNC     KF1070  ;   YES, FAIL
                    ;       PASSES RANGE TEST, SEE IF REF # HIGH BITS
                    ;       MATCH UP.
10BF CD6411                 CALL    COMPHI  ; SEE IF MATCH...
10C2 C20F11                 JNZ     KF1070  ;   NO, FAIL. LOOK AGAIN
10C5 C31911                 JMP     KF1080  ;   SUCCESS! TAKE IT.
                            EJECT
\    HERE FOR CONVERT NODE.   SEE IF USER #
\    1XXX OR 1-256
                    KF1025,
10C8 CD6411                 CALL    COMPHI  ; IF THEY MATCH AND ARE 00,
                                            ;   OKAY. HAVE 1XXX MATCH
10CB C2D510                 JNZ     KF1030  ;   NO MATCH, CHECK FOR 1-256
10CE B7                     TST             ;   MATCH! ARE THEY 00?
10CF CA1911                 JZ      KF1080  ;      YES, TAKE IT
10D2 C30F11                 JMP     KF1070  ;      NO, FAILURE
                    ;       NOT 1XXX.  SEE IF USER ASKED FOR
                    ;       1-256 (A=01) AND GOT 1-256 (B=11)
                    KF1030,
10D5 FE01                   CPI     01      ; DID USER ASK FOR 1-256?
10D7 C20F11                 JNZ     KF1070  ;   NO, FAILURE
                                            ;   YES, CHECK RESULT
10DA 78                     MOV     A,B     ; GET IT
10DB FE03                   CPI     3       ; IS IT 1-256 IN NODE?
10DD C20F11                 JNZ     KF1070  ;   NO, FAILURE
10E0 C31911                 JMP     KF1080  ;   YES, TAKE IT
                            EJECT
\    HERE WHEN USER WANTS
\    3XXX-4XXX
                    KF10RG,
                    ;       IF NODE TYPE IS C-NODE CONSTANT; FAILURE.
                    ;       IF NODE TYPE IS CALC, SPECIAL CHECK
                    ;       ELSE CHECK RANGE FROM B-NODE REG TO C-NODE REG
10E3 3AABFE                 LDA     RSPBUF+3; GET NODE TYPE
10E6 E670                   ANI     NODMSK  ; ISOLATE IT
10E8 0F                     RRC             ; TO LOW END
10E9 0F                     RRC             ; X
```

```
                        /       CALC?
     10EA FE16                  CPI     NOCALC  / IS IT?
     10EC CA0711                JZ      KF1040  /   YES, GO SPECIAL
                        /       C-NODE CONSTANT?
     10EF FE14                  CPI     NOCCON  / IS IT?
     10F1 CA0F11                JZ      KF1070  /   YES, FAIL
                        /       CHECK THE RANGE
     10F4 FE0E                  CPI     NORPRE  / IS IT LOWER THAN LOW?
     10F6 DA0F11                JC      KF1070  /   YES, FAIL
     10F9 FE16                  CPI     NOCREG+1/ HIGHER THAN HIGH?
     10FB D20F11                JNC     KF1070  /   YES, FAIL
                        /       IN RANGE!  MATCH ON REF # HI-BITS
     10FE CD6411                CALL    COMPHI  / MATCH?
     1101 C20F11                JNZ     KF1070  /   NO, FAIL
     1104 C31911                JMP     KF1080  /   YES, TAKE IT
                                EJECT
\   HERE FOR CALC NODE.
\   MUST BE 4XXX REQUEST.
                        KF1040,
     1107 3A01FD                LDA     DSPNUM+3/ GET MS DIGIT OF #
     110A FE34                  CPI     ASC4    / IS IT 4?
     110C CA1911                JZ      KF1080  /   YES, TAKE IT
                                                /   NO, FALL TO FAILURE COMMON
                                EJECT
\    HERE WHEN WE DECIDE THIS SEARCH
\    IS A FAILURE
                        KF1070,
                        /       STEP TO NEXT CONTROLLER ADDR
                        /       AND LOOP BACK TO SEARCH I/O
                        / STAT:
                        /       H/L = CURRENT CTRLR ADDR
     110F EB                    XCHG                    / TO D/E
     1110 13                    INX     D               / STEP TO NEXT
     1111 13                    INX     D               /   CONTROLLER ADDR
     1112 2193FE                LXI     H,CMDBUF+3 / POINT TO ADDR AREA
     1115 EF                    MOVDE                   / LOAD ADDR FOR I/O
     1116 C36710                JMP     KF1020  /   GO SEARCH AGAIN
                                EJECT
\   HERE WHEN WE DECIDE THIS MATCH
\   IS GOOD!
                        KF1080,
                        / STAT.
                        /       H/L = CONTROLLER ADDR W/GOOD MATCH
     1119 EB                    XCHG                    / TO D/E FOR NOW
                        /       GET AND SAVE OLD STEP # TIL LATER
     111A 218AFE                LXI     H,STPNUM                / [H,L] <- PTR TO SEQ NUMBE

     111D E7                    GETHL                           / [H,L] <- OLD SEQUENCE 'JM
ER
     111E E5                    PUSH    H                       / STACK IT!
     111F EB                    XCHG                            / SWAP ADDR TO H/L
                        /       NOW FIGURE OUT THE STEP PARAMETER.  IF NO
                        /       CONDITION ON SEARCH, STEP = 0.
                        /       IF ANY CONDITION, STEP = -1.
```

```
1120 01FFFF            LXI     B,-1      / ASSUME CONDITIONS
1123 3AB3FC            LDA     DSPCON    / CHECK CONTACT FIELD
1126 FE1F              CPI     ASCLBK    / UNDEFINED?
1128 C23411            JNZ     KF1090    /   NO, GO

112B 3A01FD            LDA     DSPNUM+3/ CHECK NUMERIC FIELD
112E FE1D              CPI     ASCNBK    /   UNDEFINED?
1130 C23411            JNZ     KF1090    /   NO, GO

1133 03                INX     B         / BOTH UNDEFINED, SET 0000
                       EJECT
              /        GET THE NETWORK ONTO THE SCREEN!!!!!

              KF1090,
1134 CD980C            CALL    GETNET              / FETCH THIS NETWORK
              /
1137 D1                POP     D                   / GET OLD SEQ #
1138 210BFF            LXI     H,SRCHST            / POINT TO # OF SONS
113B E7                GETHL                       / GET THEM!
113C 3A7CFE            LDA     KSTATE              / A <- STATE VECTOR
113F E620              ANI     KRESET              / CHECK FOR ERRORS
1141 C25711            JNZ     KF10X               / EXIT ON ERROR
              /
1144 CD491F            CALL    KU02                / CHECK FOR SHIFT
1147 CA4B11            JZ      KF1095              / BRANCH ON NO SHIFT
              /
114A 19                DAD     D                   / [H,L] <- NEW STEP NUMB R
              /
114B EB       KF1095,  XCHG                        / SWAP
114C 218AFE            LXI     H,STPNUM            / SET DESTINATION
114F EF                MOVDE                       / LOAD NEW SEQUENCE NUMBER
              /
1150 EB                XCHG                        / SWAP
1151 1118FD            LXI     D,DSPSTP            / [D,E] <- DESTINATION
1154 CDC201            CALL    BNBCD4              / DISPLAY BCD
              /
1157 CD531F   KF10X,   CALL    KU03                / CLEAR SHIFT
115A C9                RET                         / EXIT
                       EJECT
              /        HERE WHEN SEARCH COMMAND ANSWER
              /        SAYS "NO MATCH"

              KF12NM,
115B 11EF27            LXI     D,MSGSCH/ GET PTR TO MSG
115E CD7E05            CALL    ERROR     / DISPLAY IT
1161 C35711            JMP     KF10X     / EXIT

              / COMPHI IS A SUBR TO GET AND COMPARE
              /         THE REF # HIGH BITS
              /
              / A & B MUST BE FREE
              /
              / EXIT:
              /        A = HIGH BITS FROM "CMDBUF+5"
              /        B = HIGH BITS FROM "RSPBUF+3"
              /        Z BIT SET IF =, RESET IF NOT
              /
              COMPHI,
1164 3AABFE            LDA     RSPBUF+3/ GET ANSER HIGH BITS
1167 E603              ANI     3         / ISOLATE THEM
1169 47                MOV     B,A       / SAVE IN B FOR EXIT
116A 3A95FE            LDA     CMDBUF+5/ GET HIGH BITS FROM REQUEST
116D E603              ANI     3         / ISOLATE THEM
116F B8                CMP     B         / SET,RESET Z-BIT
1170 C9                RET
                       EJECT
                       SUBJOB  KEY FUNCTION : KF11 : CLEAR
              /
              /***KEY FUNCTION : KF11 : CLEAR
              /
1171 CD281F   KF11,    CALL    KU01                / CHECK FOR RESET
1174 CD491F            CALL    KU02                / CHECK FOR SHIFT
1177 CA7B11            JZ      KF1110              / BRANCH ON NO SHIFT

              /        SHIFT/CLEAR MAKES THE P180 RESET!

```

```
117A C7                    RST     0               / DO IT!
                   /       REGULAR CLEAR; JUST THE ASSEMBLY AREA
117B 21B1FC        KF1110, LXI     H,DSPASM        / [H,L] <- CONTACT FIELD
117E 118803                LXI     D,DMAST3        / [D,E] <- SOURCE DATA
1181 CD0301                CALL    MOVSTR          / LOAD DATA
1184 21FEFC                LXI     H,DSPNUM        / [H,L] <- NUMERIC FIELD
1187 119303                LXI     D,DMAST4        / [D,E] <- SOURCE DATA
118A 3A7CFE                LDA     KSTATE          / A <- STATE VECTOR
118D F610                  ORI     KCLEAR          / SET CLEAR NUMERIC FLAG
118F 327CFE                STA     KSTATE          / STORE VECTOR
1192 CD0301                CALL    MOVSTR          / LOAD DATA
1195 CD531F                CALL    KU03            / CLEAR SHIFT
1198 AF                    CLA                     / A <- 0
1199 327FFE                STA     ASMCON          / CLEAR CONTACT TYPE
119C C9                    RET                     / EXIT
                           EJECT

                           SUBJOB  KEY FUNCTION : KF12 : DELETE
                   /
                   /***KEY FUNCTION : KF12 : DELETE
                   /
                   /***PARAMETERS:
                   /
                   /       SHIFT.EQ.0 => DELETE NODE
                   /       SHIFT.EQ.1 => DELETE NETWORK
                   /
119D CD281F        KF12,   CALL    KU01            / CHECK FOR RESET
11A0 CD491F                CALL    KU02            / CHECK FOR SHIFT
11A3 C21013                JNZ     KF1265          / BRANCH TO DELETE NETWO K
                   /
                   /***DELETE  NODE
                   /
11A6 3A7EFE                LDA     CURACT          / A <- CURSOR
11A9 47                    MOV     B,A             / B <- CURSOR
11AA E6F0                  ANI     ROWMSK          / ISOLATE ROW
11AC FE80                  CPI     ASMROW          / CHECK FOR ASSEMBLY
11AE C2C811                JNZ     KF1210          / BRANCH IF NOT
                   /
                   /***CLEAR REFERENCE SLOT
                   /
11B1 CD4705                CALL    CUR100          / [H,L] <- CURSOR LOCATI N
11B4 23                    INX     H               / STEP BEYOND FIELD ATTRIB
11B5 3E04                  MVI     A,REFLEN        / A <- COUNT
11B7 0620                  MVI     B,ASCBLK        / B <- BLANK
                   /
11B9 70            KF1205, MOV     M,B             / CLEAR BYTE
11BA 114E00                LXI     D,ROWD+1        / [D,E] <- OFFSET
11BD 19                    DAD     D               / BUMP TO NEXT LINE
11BE 70                    MOV     M,B             / CLEAR BYTE
11BF 11B3FF                LXI     D,-ROWD         / [D,E] <- OFFSET
11C2 19                    DAD     D               / BACK TO PREVIOUS LINE
11C3 3D                    DCR     A               / DECREMENT COUNTER
11C4 C2B911                JNZ     KF1205          / LOOP UNTIL DONE
11C7 C9                    RET                     / GO TO EXIT
                           EJECT

\### DELETE NETWORK NODE(S)
                   /
11C8 3A7CFE        KF1210, LDA     KSTATE          / A <- STATE VECTOR
11CB E608                  ANI     KNET            / NETWORK ACTIVE?
11CD 11E427                LXI     D,MSGNET        / [D,E] <- MESSAGE ADDR
11D0 CADA13                JZ      KF12ER          / BRANCH ON ERROR

                   /       VERIFY THAT THE CURSOR IS ON A NODE
                   /       THAT WE CAN DELETE.  THESE ARE:
                   /       NON-BLANK; TOP OF NODE MULTI-NODE ITEMS

11D3 3A80FE                LDA     CURCON  / GET CURSOR NODE TYPE
11D6 B7                    TST             / BLANK?
11D7 CAE911                JZ      KF12NV  /   YES, "INVALID" ERROR EXIT

                   /       ON A REAL NODE; NOW IS IT THE TOP
                   /       NODE IF M-NODE ITEM?
```

```
11DA FE0D          CPI     NOCPRE  / IS IT A SINGLE NODE ITEM?
11DC FAF011        JM      KF1212  /    YES, ALL SET
11DF FE0F          CPI     NOCTR   / IS IT A PRESET/B-NODE?
11E1 FAF511        JM      KF1214  /    YES, POSSIBLY GOOD
11E4 FE13          CPI     NOCON   / IS IT A CONVERT NODE?(SPECIAL)
11E6 CA1712        JZ      KF1216  /    YES, SPECIAL PROCESS
          /        CURSOR IS NOT ON A VALID NODE!
          KF12NV,
11E9 11411B        LXI     D,KF14M1/ PTR TO "INVALID"
11EC CD7E05        CALL    ERROR   / DISPLAY IT
11EF C9            RET             / DONE
          /        HERE FOR SINGLE NODE ITEMS,
          /        SET COUNT=1 AND GO
          KF1212,
11F0 0E01          MVI     C,1     / SET NODE COUNT
11F2 C32F12        JMP     KF1220  / GO VERIFY POSITION
                   EJECT
          /        HERE WHEN PRESET/B-NODE TYPE.
          /        MAKE SURE WE ARE @ TOP OF CTR, TMR, CALC
          KF1214,
11F5 0E02          MVI     C,2     / SET COUNT AT LEAST TO 2
          /        NOW LOOK AT THE NODE BELOW CURRENT; MAKE
          /        SURE IT IS EITHER PRESET/C (I.E. 2ND NODE OF
          /        CALC) OR CTR/TMR
11F7 3A7EFE        LDA     CURACT  / GET CURRENT POSITION
11FA C610          ADI     :10     / STEP TO NEXT ROW
11FC CD4614        CALL    GETYPE  / GET THE TYPE THERE
          /        CTR/TMR?
11FF FE0F          CPI     NOCTR   / TEST LOW END OF RANGE
1201 FAE911        JM      KF12NV  /    LOWER, ERROR (NEVER HAPPEN)
1204 FE13          CPI     NOCON   / TEST HIGH END
1206 FA2F12        JM      KF1220  /    IN RANGE, GOV VERIFY POS
          /        NOT CTR/TMR, IT BETTER BE THE C-NODE/PRESET
1209 0C            INR     C       / SET COUNT = 3
120A FE14          CPI     NOCCON  / TEST LOW END
120C FAE911        JM      KF12NV  /    ERROR
120F FE16          CPI     NOCALC  / TEST HIGH END
1211 FA2F12        JM      KF1220  /    OK; GO VER POS
1214 C3E911        JMP     KF12NV  /    INVALID!
                   EJECT
          /        HERE FOR SPECIAL CONVERT NODE TEST.
          /        THE NODE BELOW MUST BE CONVERT, TOO!
          KF1216,
1217 0E02          MVI     C,2     / SET COUNT = 2
          /        NOW LOOK AT NODE BELOW. IT MUST BE CONVERT
1219 3A7EFE        LDA     CURACT  / GET CURRENT POS
121C C610          ADI     :10     / STEP TO NEXT ROW
121E 47            MOV     B,A     / SAVE IT
121F E6F0          ANI     ROWMSK  / ISOLATE ROW
1221 FE80          CPI     MAXROW+1!@16     / DID WE GO > MAX?
1223 D2E911        JNC     KF12NV           /    YES, ERROR
1226 78            MOV     A,B     / NOT OFF BOTTOM; GET TYPE
1227 CD4614        CALL    GETYPE  / NOW THE TYPE BELOW IS IN A
122A FE13          CPI     NOCON   / IS IT ALSO CONVERT?
122C C2E911        JNZ     KF12NV  /    NO, ERROR
                                   /    YES, FALL TO COMMON CODE
                   EJECT
```

HERE WHEN THE CURRENT NODE IS ABLE TO BE DELETED!

```
                        /       NOW, THE ITEM MUST BE THE LAST IN ITS
                        /       COLUMN.  IF IT IS AND IT IS IN THE TOP ROW,
                        /       IT MUST BE THE LAST IN ITS ROW!

                        KF1220,
                        / STAT:
                        /       C = ROW

    122F CD0423                 CALL    KU11     / GET CURRENT ROW IN L. S NIBBLE
    1232 81                     ADD     C        / CALCULATE ROW+1 OF DELETABLE
    1233 FE08                   CPI     MAXROW+1/ ARE WE DEALING WITH LAST ROW?
    1235 D25712                 JNC     KF1225   /   YES, THIS MUST BE THE LAST
                                                 /   ITEM IN COLUMN

                        /       NOT AT BOTTOM OF NETWORK,
                        /       SEE WHAT'S BELOW

    1238 CF                     NSWP             / GET ROW BEYOND TO
                                                 /   MOST SIG NIBBLE
    1239 47                     MOV     B,A      / SAVE IT
    123A 3A7EFE                 LDA     CURACT   / GET PRESENT POSITION
    123D E60F                   ANI     COLMSK   / SAVE COLUMN
    123F B0                     ORA     B        / CONCAT W/ TEST ROW
    1240 CD4614                 CALL    GETYPE   / GET THE NODE TYPE BELOW
    1243 B7                     TST              / IS IT BLANK?
    1244 CA5712                 JZ      KF1225   /   YES, GO CHECK TOP ROW

                        /       HERE FOR ERROR WHEN SOMETHING IS EITHER
                        /       BELOW OR TO THE RIGHT IN TOP ROW.
                        /       ERROR EXIT WITH "NOT LAST"

                        KF12NL,
    1247 114E12                 LXI     D,KM12NL/ PTR TO MSG
    124A CD7E05                 CALL    ERROR    / DISPLAY AND GO
    124D C9                     RET              / X

    124E 08             KM12NL, DB      KM12X1
    124F 4E4F5420               DA      'NOT LAST'
    1253 4C415354
         0008           KM12X1=, -KM12NL-1
                                EJECT

                        /       WE HAVE THE LAST ITEM IN THE COL.
                        /       IS IT THE TOP ROW?

                        KF1225,
    1257 CD0423                 CALL    KU11     / GET ROW IN LS NIBBLE
    125A FE01                   CPI     1        / AT TOP ROW?
    125C C27312                 JNZ     KF1230   /   NO, OK TO DELETE

                        /       IN TOP ROW, ARE WE IN LAST COL?

    125F 3A7EFE                 LDA     CURACT   / GET POSITION
    1262 47                     MOV     B,A      / SAVE IT, TOO
    1263 E60F                   ANI     COLMSK   / ISOLATE COL
    1265 FE0B                   CPI     MAXCOL   / AT RIGHT RAIL?
    1267 CA7312                 JZ      KF1230   /   YES, OK TO DELETE

                        /       NOT LAST COL, MAKE SURE IT IS LAST
                        /       NODE IN ROW

    126A 78                     MOV     A,B      / REFETCH CURRENT CURSOR
    126B 3C                     INR     A        / STEP ONE COL
    126C CD4614                 CALL    GETYPE   / GET THE NODE TYPE THERE
    126F B7                     TST              / IS IT BLANK?
    1270 C24712                 JNZ     KF12NL   /   NO, ERROR "NOT LAST"
                                                 /   YES, FALL TO DELETE
                                EJECT
```

HERE TO ACTUALLY DO DELETE!

```
                        /       FIRST, CALC CONTROLLER ADDR OF NODE(S)
                        /       TO DELETE, AND SET UP I/O BUFFER
```

```
                    KF1230,
1273 CD5124                    CALL    KU22     / GET PTR TO COLTAB
1276 E5                        PUSH    H        / SAVE IT

1277 E7                        GETHL            / GET THE START ADDR OF THIS COL

1278 CD0423                    CALL    KU11     / GET THE CURRENT ROW
127B 3D                        DCR     A        / MAKE IT 0 REL
127C 87                        ADD     A        /   AND DOUBLE IT
127D 5F                        MOV     E,A      / SET IT AS LS BYTE
127E 1600                      MVI     D,0      / CLR MS BYTE

1280 19                        DAD     D        / NOW H/L = ADDR OF NODE TO DELE Ξ
1281 EB                        XCHG

1282 2193FE                    LXI     H,CMDBUF+3 / GET PTR TO STORE ADDR
1285 EF                        MOVDE              / STORE CNTRLR ADDR IN I/O BUFF

                    /          NOW SEE IF THERE ARE ANY VERTICALS HERE AT ALL

1286 E1                        POP     H        / GET COLTAB PTR BACK
1287 110400                    LXI     D,EOCHI  / GET OFFSET TO E-O-C NODE
128A 19                        DAD     D        / CALC PTR TO EOC
128B AF                        CLA              / FOR TEST
128C BE                        CMP     M        / ANY VERTICALS?
128D C29612                    JNZ     KF1240   /   YES, GO HANDLE BELOW

                    /          YAY!, NO VERTICALS.  JUST DELETE

1290 3EC0                      MVI     A,CMDDEC/ GET DEL @ EOC FUNCTION
1292 CD4F14                    CALL    DELTIO   / DO DELETE AND UPDATE
1295 C9                        RET              / DONE
                               EJECT
```

```
\          HERE WHEN THERE ARE VERTICALS
\          IN THE COLUMN

                    /          NEED TO TEST AND HANDLE 3 CONDITIONS:

                    /          1-THERE ARE VERTICALS, BUT THIS DELETE
                    /            DOES NOT TOUCH THEM
                    /          2-THERE ARE VERTICALS, AND THIS DELETE
                    /            REMOVES ALL OF THEM
                    /          2-THERE ARE VERTICALS, AND THIS DELETE
                    /            REMOVES SOME OF THEM

                    KF1240,

                    /          CREATE A MASK BASED UPON COUNT
                    /          AND CURRENT ROW WHICH WILL AND OUT
                    /          THE VERTICALS BEING DELETED

1296 CD0423                    CALL    KU11     / GET ROW #
1299 57                        MOV     D,A      /   TO D FOR COUNT

129A 3E80                      MVI     A,:80    / GET BIT FOR 1ST ROW W/DELETE

                    KF1242,
129C 0F                        RRC              / SHIFT 1ST ROW BIT LEFT
129D 15                        DCR     D        / COUNT DOWN # OF ROWS
129E C29C12                    JNZ     KF1242   /   LOOP UNTIL 1ST ROW BIT
                                                /   IS IN POSITION

                    /          NOW A-REG = POSITION FOR 1ST ROW TO BE DELETED.
                    /          NEXT, PUT IN MORE BITS FOR > 1 NODE

12A1 5F                        MOV     E,A      / SAVE RESULT
12A2 57                        MOV     D,A      / SET UP A TRAVELER BIT
12A3 C5                        PUSH    B        / SAVE COUNT
                    KF1244,
12A4 0D                        DCR     C        / COUNT DOWN # OF NODES
12A5 CAB012                    JZ      KF1245   /   DONE!, E HAS MASK

                    /          > 1 NODE, SO CREATE ANOTHER BIT IN MASK
```

```
12A8 7A                 MOV    A,D      / GET TRAVELING BIT
12A9 0F                 RRC             / SHIFT TO NEXT LOWER ROW POS
12AA 57                 MOV    D,A      / SAVE TRAVELER

12AB B3                 ORA    E        / CONCATENATE WITH MASK RESULT
12AC 5F                 MOV    E,A      / SAVE RESULT
12AD C3A412             JMP    KF1244   / LOOP TIL MASK MADE
                        EJECT


              /         HERE WHEN MASK IS BUILT. ONE'S COMPLEMENT
              /         IT TO CREATE THE "AND" MASK

              KF1245,
12B0 C1                 POP    B        / GET COUNT BACK
12B1 7B                 MOV    A,E      / GET MASK
12B2 2F                 CMA             / NOW A = FINAL MASK
12B3 47                 MOV    B,A      / SAVE IT IN B

              /         NOW LOOK AT END-OF-COLUMN NODE STORED
              /         LOCALLY AND SEE WHAT, IF ANY, VERTICAL
              /         BITS ARE CHANGING.

12B4 CD5124             CALL   KU22     / GET PTR TO COLTAB

12B7 110500             LXI    D,EOCLO  / OFFSET TO EOC VERT BITS
12BA 19                 DAD    D        / SET H/L AS PTR TO THEM
12BB 7E                 MOV    A,M      / GET THEM
12BC A0                 ANA    B        / MASK OUT THE DELETED ONES

        NOW, THE BIG DECISION!

12BD CACA12             JZ     KF1250   / GO IF WE HAVE DELETED ALL!

        DID WE DELETE ANY?

12C0 BE                 CMP    M        / SAME AS BEFORE?
12C1 C2D612             JNZ    KF1260   /   NO, GOT RID OF SOME!

        HERE WHEN NO CHG TO VERTICALS!

12C4 3E60               MVI    A,CMDDEL/ DELETE NOT AT E-O-C

12C6 CD4F14             CALL   DELTIO   / DO DELETE AND UPDATE
12C9 C9                 RET             / DONE
                        EJECT

        HERE WHEN THIS DELETE
        ALSO REMOVES ALL VERTICALS

              KF1250,
12CA 0C                 INR    C        / ADD 1 TO COUNT TO
                                        /   REMOVE EOC NODE
12CB 2B                 DCX    H        / STEP COLTAB PTR BACK TO
                                        /   MS BYTE OF EOC NODE
12CC 110000             LXI    D,0      / CLEAR EOC NODE IN COLTAB
12CF EF                 MOVDE           / X

12D0 3EC0               MVI    A,CMDDEC/ GET FUNCTION TO DELETE @ EOC
12D2 CD4F14             CALL   DELTIO   / DO IT
12D5 C9                 RET             / DONE
                        EJECT

        HERE WHEN DELETING SOME VERTICALS
        BUT NOT ALL

              KF1260,

              /         THIS CASE IS THE TRICKIEST.  WE NEED TO
              /         WRITE THE END OF COL NODE W/MASK
              /         TO REMOVE SOME VERTICAL BITS, THEN DELETE
              /         NODE(S).
              / STAT.
              /         H/L = PTR TO EOC BITS IN COLTAB (EOCLO)
              /         A = THOSE BITS 'ANDED' BY MASK (BITS LEFT OVER)
              /         B = FINAL MASK
              /         C = COUNT
```

```
                /       WE MUST DO A LOT OF FANCY FOOTWORK TO SAVE
                /       VALUES AND WRITE VERTICALS.  WATCH CLOSELY!

12D6 EB                 XCHG                / SAVE EOC PTR IN D/E
12D7 2A93FE             LHLD    CMDBUF+3/ GET THE ADDR OF NODE(S)
                                            /   TO DELETE AND
12DA E5                 PUSH    H           /   SAVE ON STACK FOR LATER

12DB EB                 XCHG                / RESTORE EOC PTR
12DC E5                 PUSH    H           / SVE EOC PTR
12DD C5                 PUSH    B           / SAVE MASK, COUNT
12DE F5                 PUSH    PSW         / SAVE FINAL BITS

                /       BUILD I/O COMMAND FOR RE-WRITING EOC NODE

12DF 11FDFF             LXI     D,COLEHI-EOCLO  / GET PTR BACK TO
                                                /   END OF COL ADDR
12E2 19                 DAD     D               /   X

12E3 E7                 GETHL               / GET ADDR FOR WRITE
12E4 EB                 XCHG                /   INTO D/E

12E5 2193FE             LXI     H,CMDBUF+3 / POINT TO I/O BUFFER

12E8 EF                 MOVDE               / STORE ADDR FOR WRITE
                        EJECT
                /       BUILD DATA & MASK FOR WRITE

12E9 F1                 POP     PSW         / GET FINAL BITS
12EA F5                 PUSH    PSW         / X
12EB 5F                 MOV     E,A         / SET AS "DATALO"
12EC 1600               MVI     D,0         / CLEAR "DATAHI"
12EE EF                 MOVDE               / STORE DATA TO WRITE

12EF 1100FF             LXI     D,:FF00 / GET MASK FOR WRITE
12F2 EF                 MOVDE               / STORE IN CMDBUF
                        EJECT
                /       DO THE I/O!

12F3 110A21             LXI     D,CMDWRT+CMD02!:100+LENWRT / PARAMS
12F6 CD8125             CALL    PIO     / DO WRITE!

12F9 C20B13             JNZ     KF1264  / EXIT IF ERROR, NO UPDATE

                /       I/O OKAY, NOW.....
                /       RELOAD ALL VALUES AND PTRS

12FC F1                 POP     PSW         / GET FINAL BITS
12FD C1                 POP     B           / GET MASK, COUNT
12FE D1                 POP     D           / GET EOC PTR TO D/E
12FF E1                 POP     H           / RELOAD DELETE ADDR

                /       HERE TO DELETE AND UPDATE

1300 2293FE             SHLD    CMDBUF+3/ RESTORE DELETE ADDR TO
                                            /   I/O BUFFER

                /       UPDATE BITS IN COLTAB

1303 EB                 XCHG                / SET H/L = PTR TO EOC BITS
1304 77                 MOV     M,A         / SET BITS!

                /       DO DELETE AND UPDATE THE WORLD!

1305 3E60               MVI     A,CMDDEL/ GET FUNCTION
1307 CD4F14             CALL    DELTIO  / DO IT
130A C9                 RET                 / DONE


                /       HERE WHEN ERROR, CLEAR STACK AND EXIT

                KF1264,
130B E1                 POP     H           / DISCARD 4 ITEMS
130C E1                 POP     H           / X
```

```
130D E1                  POP      H           / X
130E E1                  POP      H           / X
130F C9                  RET                  / EXIT
                         EJECT
\**** DELETE NETWORK
                 /
1310 11E427     KF1265,  LXI      D,MSGNET          / [D,E] <- MESSAGE ADDR
1313 3A7CFE              LDA      KSTATE            / A <- STATE VECTOR
1316 E608                ANI      KNET              / NETWORK ACTIVE?
1318 CADA13              JZ       KF12ER            / NO, ERROR

                 /       DELETE NETWORK A COLUMN AT A TIME,
                 /       BEGINNING WITH RIGHT AND WORKING LEFT

131B 3E1B                MVI      A,:10+MAXCOL      / SET ACTUAL CURSOR
131D 327EFE              STA      CURACT            /   TO RIGHT SIDE

                 /       BEGIN LOOP AND DELETE BY COLUMN

                KF1270,

                 /       GET PTR TO COLUMN BEING DELETED

1320 CD5124              CALL     KU22        / NOW H/L HAS PTR
1323 44                  MOV      B,H         / SAVE IN B/C
1324 4D                  MOV      C,L         /   FOR LATER

1325 E7                  GETHL                / GET START ADDR
1326 EB                  XCHG                 /   TO D/E
1327 7A                  MOV      A,D         / IS IT 0? IF SO, DO
1328 B3                  ORA      E           /   NOTHING ON THIS COL.
1329 CA5A13              JZ       KF1275      /   GO DO NEXT COLUMN!

                 /       SET UP ADDR FOR DELETE

132C 2193FE              LXI      H,CMDBUF+3 / PTR TO I/O BUFF
132F EF                  MOVDE                 / SET IT UP

                 /       FIGURE OUT HOW MANY NODES TO DELETE (1-8)
                 /       CALC: (END-START)/2+1

1330 7A                  MOV      A,D         / TWO'S COMPLEMENT START
1331 2F                  CMA                  /   AND PUT IT IN D/E
1332 57                  MOV      D,A         /   X
1333 7B                  MOV      A,E         /   X
1334 2F                  CMA                  /   X
1335 5F                  MOV      E,A         /   X
1336 13                  INX      D           / DONE
                         EJECT
                 /       GET END ADDR AND SUBTRACT IT

1337 210200              LXI      H,COLEHI/ GET OFFSET TO END ADR
133A 09                  DAD      B           / NOW H/L=PTR TO END
133B E7                  GETHL                / GET END
133C 19                  DAD      D           / END-START

                 /       NOW DIVIDE RESULTS BY 2 AND ADD 1
                 /       FOR FINAL NODE COUNT

133D 7D                  MOV      A,L.        / GET L.S. RESULT
                                              / (MS CAN BE IGNORED)
133E 0F                  RRC                  / DIVIDE BY 2
133F E60F                ANI      :F          / PURIFY IT
1341 3C                  INR      A           / NOW A-REG = NODE COUNT!

                 /       SET UP B/C FOR USEAGE DECR IF GOOD I/O.
                 /       B/C MUST = -(BYTE COUNT)

1342 F5                  PUSH     PSW         / SAVE COUNT

1343 07                  RLC                  / *2 FOR BYTE COUNT
1344 2F                  CMA                  / TWO'S COMP IT
1345 3C                  INR      A           / X
1346 4F                  MOV      C,A         / SET L.S. BYTE
1347 06FF                MVI      B,:FF       / SET M.S. BYTE
```

```
1349 F1                    POP     PSW       / RESTORE NODE COUNT
134A C5                    PUSH    B         / SAVE -BYTE COUNT

                   /       NOW BUILD I/O COMMAND

134B F660                  ORI     CMDDEL    / CREATE FUNCTION
134D 57                    MOV     D,A       /    TO D
134E 1E06                  MVI     E,LENDEL/ SET LENGTH FOR CALL
1350 CD8125                CALL    FIO       / DO DELETE!
1353 C1                    POP     B         / REFETCH -BYTE COUNT

1354 C27813                JNZ     KF1295    / ERROR ON DELETE, HANDLE BELOW

                   /       UPDATE USEAGE COUNT

1357 CDCB23                CALL    KU18      / DONE
                           EJECT

                   /       OKAY, COLUMN IS GONE. STEP TO NEXT
                   /       AND CHECK IF DONE

                   KF1275,
135A 3A7EFE                LDA     CURACT    / GET CURRENT COLUMN
135D 3D                    DCR     A         / -1 FROM COL
135E FE10                  CPI     :10       / ARE WE DONE?
1360 CA6913                JZ      KF1280    /    YES, GET RID OF S. O. N.

                   /       NOT DONE, SET UP AND LOOP

1363 327EFE                STA     CURACT    / SET TO NEXT COL AT LEFT
1366 C32013                JMP     KF1270    /    LOOP TIL DONE

                   /       HERE WHEN ALL BUT S. O. N. NODE DELETED

                   KF1280,
1369 218CFE                LXI     H,ADRSON/ POINT TO S. O. N
136C E7                    GETHL             / GET IT
136D EB                    XCHG              / TO D/E
136E 2193FE                LXI     H,CMDBUF+3 / PTR TO BUFF
1371 EF                    MOVDE             / SET IT UP

                   /       DELETE THE SON

1372 110661                LXI     D,CMDDEL+CMD02!:100+LENDEL   / PARAMS
1375 CD8125                CALL    FIO       / DO IT
                           EJECT

                   /       ALL DONE, NOW GET NEXT NETWORK ON SCREEN

                   /       ALSO HERE FOR ERROR.
                   /       WE GET THE SAME NETWORK AGAIN AND REDISPLAY
                   /       IT TO SHOW USER WHAT WAS NOT DELETED

                   KF1295,
1378 CD8A1F                CALL    KU06      / CLEAR SCREEN
137B CD531F                CALL    KU03      / CLEAR SHIFT

                   /       SEE WHAT WE HAVE AT THE OLD "START-OF-NET" ADDR:
                   /       -IF WE HAVE AN 'END-OF-LOGIC' NODE, WE DELETED
                   /        LAST NETWORK IN DATABASE, SO WE WILL GET
                   /        THE PREVIOUS NETWORK.
                   /       -IF NOT, WE WILL GET THE NEXT NETWORK.
                   /       -IF WE DELETED THE LAST AND ONLY NETWORK,
                   /        "GET PREV" WILL GIVE 'START OF LOGIC' MSG.

137E 218CFE                LXI     H,ADRSON/ POINT TO OUR OLD START
1381 E7                    GETHL             / GET ADDR
1382 E5                    PUSH    H         / SAVE IT
1383 EB                    XCHG              / TO D/E
1384 2193FE                LXI     H,CMDBUF+3 / POINT TO I/O
1387 EF                    MOVDE             / SET UP ADDR TO READ
1388 110A11                LXI     D,CMDRED+CMD02!:100+LENRED
138B CD8125                CALL    FIO       / READ NODE!

138E E1                    POP     H         / IN CASE OF ERROR
138F C0                    RNZ               / ERROR, QUIT NOW
```

```
1390 E5                     PUSH    H        / GOOD, RESAVE ADRSON

                    /       SEE WHAT NODE IS AT S.O.N. ADDR

1391 3A0BFE                 LDA     RSPBUF+3/ GET NODE TYPE
1394 FE04                   CPI     NDEOL!4 / IS IT END-OF-LOGIC?
1396 C2BF13                 JNZ     KF1297/ /   NO, GO LOOK FOR NEXT

                    /       WE DELETED THE NETWORK AT END OF DATA.
                    /       SET UP TO LOOK FOR PREVIOUS.
                    /       NOTE: IF WE DELETED THE LAST AND ONLY,
                    /             CLEAR NETWORK ACTIVE AND STEP #

1399 E1                     POP     H        / GET SON
139A 01FFFF                 LXI     B,-1     / GET STEP FOR GETNET

139D 110200                 LXI     D,ADRUSE/ SEE IF WE ARE AT BEGINNING
13A0 E7                     DCMP             /   OF USER LOGIC.
13A1 C2CB13                 JNZ     KF1298  /       NO, GO GET PREV

                    /       YES, CLEAR NET ACTIVE AND STEP #

13A4 C5                     PUSH    B        / SAVE REGS
13A5 E5                     PUSH    H        / X

                    /       CLEAR STEP # AND DISPLAY

13A6 1118FD                 LXI     D,DSPSTP/ PTR TO DISPLAY AREA
13A9 210000                 LXI     H,0      / CLEAR VALUE
13AC 228AFE                 SHLD    STPNUM   / CLEAR COUNTER
13AF CDC201                 CALL    BNBCD4   / CLEAR DISPLAY

13B2 3A7CFE                 LDA     KSTATE   / CLEAR "NETWORK ACTIVE"
13B5 E6F7                   ANI     -KNET-1 / X
13B7 327CFE                 STA     KSTATE   / X

13BA E1                     POP     H        / RESTORE SON
13BB C1                     POP     B        / RESTORE STEP
13BC C3CB13                 JMP     KF1298   / GO GET PREV, IT WILL
                                             /   "START OF LOGIC" ON DISPLAY
                            EJECT
                    /       HERE TO GET NEXT NETWORK
                    /       (NOT LAST DELETED)

                    KF1297,
13BF 01FFFF                 LXI     B,-1     / DECR STEP # CAUSE 'GETNET'
13C2 CD2121                 CALL    KU08     /   INCRS IT!

13C5 E1                     POP     H        / GET SON ADDR BACK
13C6 2B                     DCX     H        / STEP BACK 2 BECAUSE 'GETNET'
13C7 2B                     DCX     H        /   STEPS FWD 2
13C8 010100                 LXI     B,1      / STEPPER

                    /       NOW CLEAR OLD START/END ADDR

                    KF1298,
13CB E5                     PUSH    H        / SAVE ADDR FOR 'GETNET'

13CC 210000                 LXI     H,0      / SET CLEAR
13CF 228CFE                 SHLD    ADRSON   / CLEAR START
13D2 228EFE                 SHLD    ADREON   / CLEAR END

13D5 E1                     POP     H        / RESTORE ADDR

                    /       GO GET NETWORK FROM 484! (FINALLY!)

13D6 CD980C                 CALL    GETNET   / DONE
13D9 C9                     RET              / EXIT
                            EJECT
\            HERE FOR BAD DELETE;
\            TAKE ERROR EXIT

                    KF12ER,
13DA CD7E05                 CALL    ERROR    / DISPLAY MSG
13DD C9                     RET
                            EJECT
```

```
                          /***SUBROUTINE TO CLEAR NODES AND UPDATE COLUMN TABLE
                          /
     13DE C5              K12SUB, PUSH    B               / SAVE COUNT
     13DF 79                      MOV     A,C             / A <- COUNT
     13E0 81                      ADD     C               / DOUBLE IT FOR
                                                          /   SCREEN ROW CNT
     13E1 4F                      MOV     C,A             / AND STORE IT BACK
     13E2 3A7EFE                  LDA     CURACT          / CURRENT CURSOR POS
     13E5 47                      MOV     B,A             / SET B FOR CALL
     13E6 CD4705                  CALL    CUR100          / GET DISPLAY POINTERS

                          /       FIRST, DELETE ALL BUT 1 CHAR OF
                          /       THE 1ST ROW AND SEE IF THERE IS
                          /       A VERTICAL UP CHAR AS LAST.  IF SO,
                          /       SET IT TO BE UP ONLY.

     13E9 1605                    MVI     D,DSPNOD-2 / CLEAR ALL BUT LAST
     13EB CD1B03                  CALL    ROWN20      / DONE

                          /       NOW H/L IS POINTING TO LAST CHAR IN ROW

     13EE 7E                      MOV     A,M      / GET CHAR THERE
     13EF FEE8                    CPI     CA1111   / VERT UP/DN?
     13F1 CAFE13                  JZ      K12S02   /   YES, GO FIX FOR VERT UP
     13F4 FEDC                    CPI     CA1110   / VERT UP?
     13F6 CAFE13                  JZ      K12S02   /   YES, GO FIX VERT UP

                          /       NO VERT UP, SO BLANK IT

     13F9 3620                    MVI     M,ASCBLK/ DONE
     13FB C30014                  JMP     K12S04   / GO JOIN REG

                          /       HERE TO SET UP VERT ONLY

                          K12S02,
     13FE 36DC                    MVI     M,CA1110/ SET

                          /       DONE WITH ROW, STEP H/L ONCE TO
                          /       KEEP IN SYNC WITH "ROWN20"

                          K12S04,
     1400 23                      INX     H          / SET
     1401 0D                      DCR     C          / ACCOUNT FOR 1ST ROW DONE

     1402 114900                  LXI     D,ROWB-DSPNOD   / STEP TO NEXT ROW
     1405 19                      DAD     D               / DONE
                                  EJECT
                          /
                          /       NOW LOOP AND BLANK REST OF NODES
                          /
     1406 1606            K12S10, MVI     D,DSPNOD-1       / D <- COUNT

                          /       IF DASHED LINE, SKIP IT AND QUIT

     1408 23                      INX     H         / TO 1ST CHAR
     1409 7E                      MOV     A,M       / GET CHAR
     140A E6FE                    ANI     -CATHI-1/ REMOVE HILITE BIT
     140C FE73                    CPI     ASCDSH   / DASH?
     140E CA2B14                  JZ      K12S15   /   YES, ALL DONE
     1411 2B                      DCX     H        /   NO, RESET FOR CLEAR

     1412 CD1B03                  CALL    ROWN20          / CLEAR NODE
     1415 114900                  LXI     D,ROWB-DSPNOD   / [D,E] <- OFFSET
     1418 19                      DAD     D               / BUMP TO NEXT ROW
     1419 0D                      DCR     C               / DECREMENT COUNTER
     141A C20614                  JNZ     K12S10          / LOOP UNTIL DONE

                          /       NOW FIX LAST VERT!

     141D 110600                  LXI     D,DSPNOD-1 / GET STEP TO LAST VERT
     1420 19                      DAD     D          / NOW H/L POINTS TO LAST

                          /       IF DASH, DON T CLEAR

     1421 7E                      MOV     A,M       / GET CHAR
     1422 E6FE                    ANI     -CATHI-1/ REMOVE HILITE
```

```
1424 FE72            CPI     ASCDSH  / DASH?
1426 CA2B14          JZ      K12S15  /    YES, DONE
1429 3620            MVI     M,ASCBLK/    NO, CLEAR IT
                     EJECT
               K12S15,
142B C1              POP     B               / GET COUNT
142C C5              PUSH    B               / STACK IT AGAIN

142D 3A7EFE          LDA     CURACT          / GET CURRENT POS AGAIN
1430 47              MOV     B,A             / SET B FOR LOOP

               /     LOOP CLEAR "MATROW" NODE TYPES

               K12S20,
1431 CDB123          CALL    KU17A           / GET PTR TO MATROW
1434 3600            MVI     M,0             / CLEAR TYPE BYTE

1436 78              MOV     A,B             / GET POSITION
1437 C610            ADI     :10             / STEP TO NEXT ROW
1439 47              MOV     B,A             / SAVE IT
143A 0D              DCR     C               / COUNT DOWN # OF NODES
143B C23114          JNZ     K12S20          /   AND LOOP TIL CLEAREI
               /
               /     NOW UPDATE "COLTAB"
               /
143E CD5124          CALL    KU22            / GET COLTAB PTR
1441 C1              POP     B               / GET COUNTER
1442 CD0025          CALL    COLDEC          / FIX IT
1445 C9              RET
                     EJECT

               SUBJOB  GETYPE = GET NODE TYPE FROM 'MATROW'

               / GETYPE IS A SUBR TO GET THE NODE TYPE BASED ON A
               /        ROW, COL INDEX
               /
               / *ENTRY
               /       A = ROW,COL
               /
               /       CALL    GETYPE
               /
               / *EXIT
               /       A = NODE TYPE
               /
               GETYPE,
1446 D5              PUSH    D       / SAVE
1447 E5              PUSH    H       / X

1448 CDB123          CALL    KU17A   / GET PTR TO MATROW

144B 7E              MOV     A,M     / GET NODE TYPE @ PTR

144C E1              POP     H       / RESTORE AND EXIT
144D D1              POP     D       / X
144E C9              RET             / X
                     EJECT

               SUBJOB  DELTIO = DELETE I/O AND UPDATE SUBR

               / DELTIO IS A SUBR TO DO THE I/O WHICH DELETES
               /       NODES.  THEN, IF NO ERROR, IT DOES THE UPDATE ON:
               /       SCREEN
               /       'MATROW' (NODE MATRIX TABLE)
               /       'COLTAB' (COLUMN ADDR TABLE)
               /
               / *ENTRY
               /       "CMDBUF+3" ALREADY HAS THE ADDRESS
               /       C = NODE COUNT (1,2,3)
               /       A = BASIC COMMAND, OR END-OF-COL COMMAND
               /           (60 OR C0)
               /
               /       CALL    DELTIO
               /
               / *EXIT
               /       A = ?
               /       C = NODE COUNT
               /
```

```
                 /        EXIT IS SAME WHETHER I/O IS GOOD OR BAD.
                 /        UPDATES ARE SKIPPED IF I/O BAD.
                 /
                 DELTIO,
1 44F E5                  PUSH    H        / SAVE ALL
1450 D5                   PUSH    D        / X
1451 C5                   PUSH    B        / X

                 /        CREATE I/O COMMAND

1452 B1                   ORA     C        / A NOW HAS FINAL FUNCTION
1453 57                   MOV     D,A      / SET D= DELETE FUNCTION

                 /        SPECIAL TEST, IF CURSOR IS ON TOP ROW,
                 /        THEN THIS IS THE LAST NODE(S) IN COLUMN.
                 /        SET THE I/O FUNCTION TO REGULAR DELETE
                 /        (NOT DELETE AT E-O-C) SO WE DON'T SET
                 /        EOC BIT ON PREVIOUS COLUMN OR
                 /        S.O.N. NODE

1454 CD0423               CALL    KU11     / GET CURRENT ROW
1457 FE01                 CPI     :01      / TOP ROW?
1459 C26014               JNZ     DELT10   /   NO, OK

145C 3E60                 MVI     A,CMDDEL/ REGULAR DELETE
145E B1                   ORA     C        / SET FINAL FUNCTION
145F 57                   MOV     D,A      /   TO D

                 /        HERE FOR I/O

                 DELT10,
1460 1E06                 MVI     E,LENDEC/ SET E= LENGTH OF COMMAND
1462 CD8125               CALL    PIO      / DO IT

                 /        IF I/O ERROR, SKIP UPDATE

1465 C27414               JNZ     DELTEX   / BAD I/O, SKIP

                 /        UPDATE SCREEN, MATROW, COLTAB, USEAGE

1468 C1                   POP     B        / RELOAD COUNT
1469 C5                   PUSH    B        / X

146A CDDE13               CALL    K12SUB   / UPDATES DONE

146D AF                   CLA              / CLEAR CURRENT CURSOR NODE
146E 3280FE               STA     CURCON   /   TYPE

                 /        ERASE DASHES IF THE DELETE WAS OF A COIL

1471 CD7814               CALL    DELDSH   / DO IT

                 /        EXIT

                 DELTEX,
1474 C1                   POP     B        / RESTORE ALL
1475 D1                   POP     D        / X
1476 E1                   POP     H        / X
1477 C9                   RET
                          EJECT

                 SUBJOB   DELDSH = DELETE DASHES IF COIL EXTENSION

                 / DELDSH IS A SUBR WHICH DECIDES IF WE ARE REMOVING
                 /        A COIL EXTENSION.  IF SO, IT BLANKS THE DASHES ON
                 /        THE SCREEN AND BACKS THE CURSOR UP TO THE TRUE
                 /         CURACT' LOCATION.
                 /
                 / *ENTRY
                 /         CURACT  AND  CURDSP  ARE USED
                 /
                 /        CALL    DELDSH
                 /
                 / *EXIT
                 /        IF CURACT=CURDSP, NO ACTION
                 /        IF NOT, DASHES DELETED AND CURSOR AND CURDSP
```

```
                        /       ARE SET TO CURACT
                        /
                        DELDSH,
1478 C5                         PUSH    B          / SAVE ALL
1479 D5                         PUSH    D          / X
147A E5                         PUSH    H          / X
147B F5                         PUSH    PSW        / X
                        /       SEE IF WE HAVE ANY WORK TO DO; DOES 'CURACT' =
                        /       'CURDSP'?
147C 3A7DFE                     LDA     CURDSP   / GET DISPLAY POSITION
147F 47                         MOV     B,A      / . TO B FOR COMPARE AND POSSIBLE M
VE
1480 3A7EFE                     LDA     CURACT   / GET TRUE POSITION
1483 B8                         CMP     B        / SAME?
1484 CACE14                     JZ      DELDEX   /   YES, EXIT
                        /       WE HAVE DASHES! BACK UP CURSOR AND GET
                        /       RID OF THEM!
1487 4F                         MOV     C,A      / SET FOR CURSOR MOVE
1488 327DFE                     STA     CURDSP   / ALSO UPDATE NEW DISPLAY POS
148B CD2B05                     CALL    CURSOR   / MOVE IT
                        /       NOW LOOP ACROSS THE ROW AND DELETE DASHES
                        /       AND COIL
                        DELD10
148E 41                         MOV     B,C      / GET CURRENT LOCATION
148F CD4705                     CALL    CUR100   / GET PTR TO SCREEN @ TRUE NODE
1492 23                         INX     H        / STEP PAST ATTRIBUTE
1493 1606                       MVI     D,DSPNOD-1 / SET COUNTER
1495 1E20                       MVI     E,ASCBLK   / SET CLEAR CHAR
                        /       LOOP AND CLEAR THE NODE OF DASHES
                        DELD20,
1497 7E                         MOV     A,M      / GET CHAR THERE NOW
1498 E6FE                       ANI     -1-CATHI/ ISOLATE CHAR W/O HIGHLITE
149A FE72                       CPI     ASCDSH   / IS IT A DASH?
149C C2A014                     JNZ     DELD25   /   NO, LEAVE WHAT'S THERE, THERE
149F 73                         MOV     M,E      /   YES, BLANK IT
                        DELD25,
                        /       NOW, IF CHAR ABOVE IS A VERT SHORT,
                        /       REPLACE BLANK WITH "HOR AND VERT UP"
                        /       CHAR TO MAKE VERTICAL COMPLETE
14A0 D5                         PUSH    D        / SAVE
14A1 E5                         PUSH    H        / SAVE PRESENT LOC
14A2 11B0FF                     LXI     D,-ROWB / STEP TO PREV ROW
14A5 19                         DAD     D        / NOW H/L POINTS THERE
14A6 7E                         MOV     A,M      / GET CHAR
14A7 E6FE                       ANI     -1-CATHI/ GET RID OF HILITE BIT
14A9 FEE4                       CPI     CA0011   / IS THERE A VERT SHORT?
14AB E1                         POP     H        / (RESTORE IN EITHER CASE)
14AC D1                         POP     D        / (DITTO)
14AD C2B214                     JNZ     DELD30   /   NO, GO ON
14B0 36DC                       MVI     M,CA1110/   YES, SET HOR AND VERT UP
                        DELD30,
14B2 23                         INX     H        / STEP TO NEXT CHAR
14B3 15                         DCR     D        / COUNT DOWN
14B4 C29714                     JNZ     DELD20   /   NOT DONE WITH NODE, LOOP
                        /       DONE WITH NODE, STEP AND CHECK FOR DONE
14B7 0C                         INR     C        / STEP TO NEXT COL. POS
14B8 79                         MOV     A,C      / GET ROW,COL
14B9 E60F                       ANI     COLMSK   / ISOLATE COL
14BB FE0B                       CPI     MAXCOL   / AT RIGHT?
14BD C28E14                     JNZ     DELD10   /   NO, LOOP TIL DONE
                                EJECT
```

```
                      /         NOW GET RID OF COIL ITSELF

     14C0 1606                  MVI     D,DSPNOD-1         / COUNT TO CLEAR
     14C2 CD1B03                CALL    ROWN20             / CLEAR 1ST ROW
     14C5 114900                LXI     D,ROWB-DSPNOD      / OFFSET TO NEXT
     14C8 19                    DAD     D                  / SET H/L TO NEXT ROW
     14C9 1606                  MVI     D,DSPNOD-1         / SET COUNT AGAIN
     14CB CD1B03                CALL    ROWN20             / CLEAR 2ND ROW

                      /         EXIT

                      DELDEX,
     14CE F1                    POP     PSW      / RESTORE ALL
     14CF E1                    POP     H        / X
     14D0 D1                    POP     D        / X
     14D1 C1                    POP     B        / X
     14D2 C9                    RET              / DONE
                                EJECT

                                SUBJOB  KEY FUNCTION : KF13 : START NEXT
                      /
                      /***KEY FUNCTION : KF13 : START NEXT
                      /
     14D3 CD281F      KF13,     CALL    KU01               / CHECK FOR RESET
     14D6 CD491F                CALL    KU02               / CHECK FOR SHIFT
     14D9 CAE214                JZ      KF1305             / BRANCH ON NO SHIFT
     14DC CD791F                CALL    KU05               / DISPLAY ERROR
     14DF C32715                JMP     KF13X              / GO TO EXIT
                      /
     14E2 218EFE      KF1305,   LXI     H,ADREON           / [H,L] <- ADDR
     14E5 46                    MOV     B,M                / B<- ADDRHI
     14E6 23                    INX     H                  / BUMP POINTER
     14E7 4E                    MOV     C,M                / C <- ADDRLO
     14E8 03                    INX     B                  / BUMP ADDRESS
     14E9 03                    INX     B                  / TO NEXT NODE
     14EA 2193FE                LXI     H,CMDBUF+3         / [H,L] <- POINTER
     14ED D7                    MOVBC                      / STORE ADDRESS
     14EE 010000                LXI     B,NOSON!:400       / [B,C] <- START NODE
     14F1 D7                    MOVBC                      / STORE NODE
                      /
     14F2 110851                LXI     D,CMDINS+CMD02!:100+LENINS      / SET PARMS
     14F5 CD8125                CALL    PIO                / DO INSERT
                      /
     14F8 C22715                JNZ     KF13X              / BRANCH ON ERROR
     14FB CD8A1F                CALL    KU06               / INITIALIZE LOGIC DATA
                      /
     14FE 010100                LXI     B,1                / [B,C] <- INCREMENT
     1501 CD2121                CALL    KU08               / INCREMENT STEP NUMBER
                      /
     1504 112815                LXI     D,KF13MS           / [D,E] <- MESSAGE ADDR
     1507 CD681F                CALL    KU04               / DISPLAY MESSAGE
                      /
     150A CD8C23                CALL    KU16               / DISPLAY POWER RAIL
                                EJECT
     150D 3E18                  MVI     A,KCLEAR+KNET      / A <- NEW STATE VECTOR
     150F 327CFE                STA     KSTATE             / LOAD NEW STATE VECTOR
     1512 218EFE                LXI     H,ADREON           / SET UP POINTER
     1515 E7                    GETHL                      / [H,L] <- END OF LAST NET
     1516 23                    INX     H                  / BUMP POINTER
     1517 23                    INX     H                  / TO NEXT NODE ADDR
     1518 EB                    XCHG                       / SWAP
     1519 218CFE                LXI     H,ADRSON           / [H,L] <- POINTER
     151C EF                    MOVDE                      / STORE NEW START ADDR
     151D 218EFE                LXI     H,ADREON           / [H,L] <- POINTER
     1520 EF                    MOVDE                      / STORE NEW END ADDR
     1521 010200                LXI     B,2                / INCREMENT
     1524 CDCB23                CALL    KU18               / MEMORY USAGE
                      /
     1527 C9          KF13X,    RET                        / EXIT
                      /
                      /***MESSAGE
                      /
     1528 05          KF13MS,   DB      KF13MX
     1529 53544152              DB      'START'
     152D 54
          0005        KF13MX= .-KF13MS-1                   / MESSAGE LENGTH
                                EJECT
```

```
                                SUBJOB  KEY FUNCTION : KF14 : ENTER
                        /
                        /***KEY FUNCTION : KF14: ENTER
                        /
152E CD281F     KF14,   CALL    KU01            / CHECK FOR RESET
1531 CD491F             CALL    KU02            / CHECK FOR SHIFT
1534 CA3D15             JZ      K14005          / BRANCH ON NO SHIFT
1537 CD791F             CALL    KU05            / DISPLAY ERROR
153A C3011B             JMP     KF14X           / GO TO EXIT
                        /
153D 3A7CFE     K14005, LDA     KSTATE          / A <- STATE VECTOR
1540 E608               ANI     KNET            / CHECK FOR NETWORK FLAG
1542 C24B15             JNZ     K14010          / BRANCH ON IT
1545 11E427             LXI     D,MSGNET        / [D,E] <- MESSAGE ADDR
1548 C3FE1A             JMP     KF14ER          / GO TO ERROR CODE
                        /
154B 3A7EFE     K14010, LDA     CURACT          / A <- CURSOR
154E 47                 MOV     B,A             / B <- CURSOR
154F E6F0               ANI     ROWMSK          / ISOLATE ROW
1551 FE80               CPI     ASMROW          / CHECK FOR ASSEMBLY AREA
1553 CABA1A             JZ      K14900          / BRANCH IF ASSEMBLY ARE
                        EJECT
                        /       IF THE USER WANTS A COIL,
                        /       1-MUST NOT HAVE A VERTICAL SHORT
                        /       2-IF NEW, MUST NOT HAVE ANYTHING
                        /         TO RIGHT THRU COIL COLUMN

1556 3A7FFE             LDA     ASMCON  / GET NEW TYPE
1559 CD7A25             CALL    ISCOIL  / IS IT A COIL?
155C DA8D15             JC      K14014  /   NO, GO DO OTHER VALID

                        /       YES, USER WANTS A COIL. CHECK VERT SHORT

155F 3A05FD             LDA     DSPVER+ROWD     / GET ASSEMBLY VERT
1562 FEE4               CPI     CA0011          / SHORT?
1564 CAA815             JZ      KF14NV          /   YES, ERROR

                        /       NO SHORT, SO SEE IF NEW OR REPLACE.
                        /       IF REPLACE, GO. IT DOES ITS OWN VALIDATION
                        /       IF NEW, MAKE SURE BLANKS TO RIGHT

1567 3A7EFE             LDA     CURACT  / GET TRUE POS
156A CD021B             CALL    KF14Z   / BLANK HERE?
156D C2AD17             JNZ     K14135  /   NO, GO TO REPLACE

                        /       NEW, MAKE SURE ALL OPEN TO RIGHT
                        /       IN THIS ROW.

1570 3A7EFE             LDA     CURACT  / START HERE
1573 47                 MOV     B,A     / SET B AS HOLDER

                        /       LOOP DOWN THE ROW AND MAKE SURE
                        /       IT IS BLANK

                K14012,
1574 78                 MOV     A,B     / GET CURRENT LOC
1575 CD021B             CALL    KF14Z   / BLANK HERE?
1578 C28715             JNZ     KF14NR  /   NO, ERROR
                        EJECT
                        /       HAVE WE SEARCHED THE ROW?

157B 78                 MOV     A,B     / GET POSITION
157C E60F               ANI     COLMSK  / ISOLATE COLUMN
157E FE0B               CPI     MAXCOL  / AT RIGHT-SIDE?
1580 CAAE15             JZ      K14015  /   YES, ALL DONE AND GOOD
1583 04                 INR     B       /   NO, GO BACK AND CHECK
1584 C37415             JMP     K14012  /   NEXT COLUMN IN ROW

                        /       HERE FOR ERROR WHEN THERE IS SOMETHING
                        /       TO THE RIGHT!

                KF14NR,
1587 11671B             LXI     D,KF14M5/ GET PTR TO ERROR
158A C3FE1A             JMP     KF14ER  / DISPLAY AND EXIT
                        EJECT
                        /       IF IN BOTTOM ROW OR RIGHT-HAND COLUMN,
```

```
                        /       NO VERTICAL SHORT ALLOWED

                        K14014,
158D 3A7DFE                     LDA     CURDSP  / GET CURRENT CURSOR LOC
1590 47                         MOV     B,A     / SAVE IT, TOO
1591 E6F0                       ANI     ROWMSK  / ISOLATE ROW
1593 FE70                       CPI     MAXROW!@16 / ARE WE IN BOTTOM ROW?
1595 CAA015                     JZ      KF14VT     /   YES, GO CHECK VERTS

                        /       NOT IN BOTTOM ROW, SEE IF RIGHT-HAND COL

1598 78                         MOV     A,B     / GET CURENT LOC AGAIN
1599 E60F                       ANI     COLMSK  / ISOLATE COLUMN
159B FE0B                       CPI     MAXCOL  / ARE WE IN RIGHT COL?
159D C2AE15                     JNZ     K14015  /   NO, GO AHEAD

                        /       HERE TO MAKE SURE NO VERTICAL SHORT

                        KF14VT,
15A0 3A05FD                     LDA     DSPVER+ROWD / GET ASSEMBLY VERT
15A3 FEE4                       CPI     CA0011      / IS IT SHORT?
15A5 C2AE15                     JNZ     K14015      /    NO, GO AHEAD

                        /       ERROR! 'NO VERT'

                        KF14NV,
15A8 115F1B                     LXI     D,KF14M4/ GET PTR
15AB C3FE1A                     JMP     KF14ER  / GO ERROR EXIT
                                EJECT

\  HERE TO ENTER INTO A NETWORK!

15AE 3A7EFE             K14015, LDA     CURACT          / A <- CURSOR
15B1 CD021B                     CALL    KF14Z           / CHECK FOR BLANK
15B4 C2AD17                     JNZ     K14135          / BRANCH FOR REPLACEMENT

\        HERE TO ENTER NEW NODE!

15B7 11491B                     LXI     D,KF14M2        / [D,E] <- ERROR MESSAGE
15BA 3A01FD                     LDA     DSPNUM+3        / CHECK FOR ALL FIELDS
15BD FE1D                       CPI     ASCNBK          / DEFINED
15BF CAFE1A                     JZ      KF14ER          / BRANCH ON NUMERIC ERRO
15C2 3AB3FC                     LDA     DSPCON          / A <- CONTACT
15C5 FE1F                       CPI     ASCCBK          / CHECK FOR BLANK
15C7 CAFE1A                     JZ      KF14ER          / BRANCH ON IT
15CA 3AB8FC                     LDA     DSPVER          / A <- VERTICAL
15CD FE1E                       CPI     ASCVBK          / CHECK FOR BLANK
15CF CAFE1A                     JZ      KF14ER          / BRANCH ON IT
                        /
15D2 3A7EFE                     LDA     CURACT          / A <- CURSOR
15D5 FE11                       CPI     :11             / CHECK FOR HOME POSITIO
15D7 CAF215                     JZ      K14025          / BRANCH AT HOME
15DA 47                         MOV     B,A             / BACK UP CURSOR
15DB E6F0                       ANI     ROWMSK          / ISOLATE ROW
15DD FE10                       CPI     :10             / CHECK FOR TOP ROW
15DF 78                         MOV     A,B             / RESTORE CURSOR
15E0 C2E715                     JNZ     K14016          / BRANCH IF NOT TOP
15E3 3D                         DCR     A               / CHECK TO LEFT ON TOP ROW
15E4 C3E915                     JMP     K14020          / CONTINUE
                        /
15E7 D610               K14016, SUI     :10             / CHECK ABOVE NODE
                        /
15E9 CD021B             K14020, CALL    KF14Z           / CHECK FOR BLANK
15EC 11411B                     LXI     D,KF14M1        / [D,E] <- MESSAGE ADDR
15EF CAFE1A                     JZ      KF14ER          / BRANCH ON BLANK NODE
                        /
15F2 21FD09             K14025, LXI     H,NODTAB+NODCON / [H,L] <- TABLE ADDR
15F5 110900                     LXI     D,NODRCL        / [D,E] <- ENTRY LENGTH
15F8 3A7FFE                     LDA     ASMCON          / A <- CONTACT TYPE
                        /
15FB BE                 K14030, CMP     M               / CHECK FOR MATCH
15FC CA0316                     JZ      K14035          / BRANCH ON MATCH
15FF 19                         DAD     D               / BUMP POINTER
1600 C3FB15                     JMP     K14030          / LOOP UNTIL FIND
                                EJECT
```

```
1603 2B        K14035, DCX    H              / MOVE TO NODE SIZE
1604 3E01              MVI    A,1            / A <- 1
1606 BE                CMP    M              / CHECK FOR MULTI-NODE
1607 C29416            JNZ    K14075         / BRANCH MULTI-NODE CONTACT
\          ENTER A 1 NODE ITEM
160A 23                INX    H              / STEP TO REFERENCE NODE
160B 23                INX    H              / BUMP POINTER
160C 7E                MOV    A,M            / A <- REFERENCE FIELD MASK
                /
160D CDC71F    K14065, CALL   KU07           / VERIFY REFERENCE NUMBE
1610 C2011B            JNZ    KF14X          / BRANCH ON ERROR
                /      IF NOT ENHANCED, DONT TAKE
                /      TRANSITIONAL CONTACTS
1613 3A85FE            LDA    SCONF2  / GET CONFIG BYTE
1616 E602              ANI    SYSENH  / ISOLATE ENHANCED BIT
1618 C22816            JNZ    K14070  /   GO IF ENHANCED
                /      NOT ENHANCED, CHECK TRANSITIONALS
161B 3A7FFE            LDA    ASMCON  / GET ASSEMBLY CONTACT
161E FE05              CPI    NOPOST  / POSI. TRANS?
1620 CAFB1A            JZ     KF14IV  /   YES, INVALID
1623 FE06              CPI    NONEGT  / NEG. TRANS?
1625 CAFB1A            JZ     KF14IV  /   YES, INVALID
                /      HERE TO PUT CONTACT IN
               K14070,
1628 3A7FFE            LDA.   ASMCON         / A <- CONTACT
162B 07                RLC                   / ROTATE TO
162C 07                RLC                   / FORM NODE
162D B4                ORA    H              / A <- BYTE 0
162E 65                MOV    H,L            / SWAP H AND L
162F 6F                MOV    L,A            / FOR SHLD
1630 2295FE            SHLD   CMDBUF+5       / STORE INTO BUFFER
1633 0E01              MVI    C,1            / SINGLE NODE INSERT
1635 CD3321            CALL   KU09           / DO INSERT
1638 C2011B            JNZ    KF14X          / BRANCH ON ERROR
                /
163B 3A7FFE            LDA    ASMCON         / A <- CONTACT TYPE
163E CD7A25            CALL   ISCOIL         / IS IT COIL TYPE?
1641 DA6C16            JC     K14040         /   GO IF NOT
                /
1644 3A7EFE            LDA    CURACT         / EXTEND ROW FOR COILS
1647 47                MOV    B,A            / B <- CURSOR
1648 4F                MOV    C,A            / C <- CURSOR
                /
1649 79        K14037, MOV    A,C            / A <- CURSOR
164A E60F              ANI    COLMSK         / ISOLATE COLUMN
164C FE0C              CPI    MAXCOL+1       / AT RIGHT RAIL?
164E CA6716            JZ     K14039         / YES, DONE
1651 CD2B05            CALL   CURSOR         / MOVE CURSOR
1654 CD4705            CALL   CUR100         / GET POINTERS
1657 23                INX    H              / SKIP FIELD ATTRIBUTE
1658 1606              MVI    D,DSPNOD-1     / D <- COUNTER
165A 1E72              MVI    E,ASCDSH       / E <- DASH
                /
               K14038,
165C 73                MOV    M,E            / STORE DASH
165D 23                INX    H              / BUMP POINTER
165E 15                DCR    D              / DECREMENT COUNTER
165F C25C16            JNZ    K14038         / LOOP UNTIL DONE
                /
1662 41                MOV    B,C            / B <- NEW CURSOR
1663 0C                INR    C              / C <- NEXT CURSOR
1664 C34916            JMP    K14037         / CONTINUE
                /
1667 79        K14039, MOV    A,C            / A <- CURSOR
1668 3D                DCR    A              / ADJUST CURSOR
1669 327DFE            STA    CURDSP         / LOAD DATA
                /
166C CD0B23    K14040, CALL   KU12           / SET CURSOR POINTERS
```

```
166F 23          INX   H                  / BUMP ADDRESS
1670 11B3FD      LXI   D,DSPCON           / [D,E] <- SOURCE
1673 0606        MVI   B,DSPNOD-1         / B <- LENGTH
1675 CD0601      CALL  MOVS10             / MOVE DATA
1678 114A00      LXI   D,ROWB-DSPNOD+1    / [D,E] <- BUMP TO NEXT
167B 19          DAD   D                  / ROW FOR DISPLAY
167C 1100FD      LXI   D,DSPNUM+2         / [D,E] <- SOURCE
167F 0606        MVI   B,DSPNOD-1         / B <- LENGTH
1681 CD0601      CALL  MOVS10             / MOVE DATA
1684 114F00      LXI   D,ROWB-1           / STEP TO NEXT ROW
1687 19          DAD   D                  /   BELOW VERT
1688 CD6224      CALL  FIXVER             / GO FIX LAST VERT CHAR
168B CDE323      CALL  KU19               / EXTEND POWER FROM RAIL
168E CD0A24      CALL  KU20               / CONNECT VERTICALS
1691 C3011B      JMP   KF14X              / GO TO EXIT
                 EJECT

\          ENTER A 2 OR 3 NODE ITEM

1694 CD0423 K14075, CALL KU11             / A <- ROW
1697 86          ADD   M                  / CHECK FOR OVERFLOW
1698 FE09        CPI   MAXROW+2           / BEYOND ROW 7
169A 11521B      LXI   D,KF14M3           / [D,E] <- MESSAGE ADDR
169D F2FE1A      JP    KF14ER             / BRANCH ON ERROR
            /
16A0 3E02        MVI   A,2                / CHECK FOR CALCULATE-TY E
16A2 BE          CMP   M                  / NODES (3 NODES)
16A3 C2E119      JNZ   K14200             / BRANCH ON A TRIPLE

\          HERE TO ENTER A 2 NODE ITEM

16A6 3A7FFE      LDA   ASMCON             / A <- CONTACT TYPE
16A9 FE13        CPI   NOCON              / CHECK FOR CONVERT NODE
16AB 'CAD916     JZ    K14085             / HANDLE CONVERT SEPARATELY

\          2 NODE: CTR, TMRS

16AE 3E38        MVI   A,NODCST+NODIRG+NODHRG  / A <- MASK
16B0 CDC71F      CALL  KU07               / VALIDATE REFERENCE
16B3 C2011B      JNZ   KF14X              / EXIT ON ERROR
            /
16B6 3A01FD      LDA   DSPNUM+3           / A <- REFERENCE TYPE
16B9 FE30        CPI   ASCO               / CHECK FOR CONSTANT
16BB 3E34        MVI   A,NOCPRE!.04       / ASSUME CONSTANT
16BD CAC216      JZ    K14080             / BRANCH ON CONSTANT
16C0 3E38        MVI   A,NORPRE!.04       / REGISTER PRESET
            /
16C2 B4     K14080, ORA  H                / A <- DATA HI
16C3 65          MOV   H,L                / H <- DATA LO
16C4 6F          MOV   L,A                / L <- DATA HI
16C5 2295FE      SHLD  CMDBUF+5           / LOAD BUFFER
            /
16C8 3A7FFE      LDA   ASMCON             / A <- CONTACT TYPE
16CB 07          RLC                      / ROTATE
16CC 07          RLC                      / LEFT
16CD F602        ORI   DUMFLG             / SET DUMMY REG FLAG
16CF 3297FE      STA   CMDBUF+7           / LOAD NODE2 DATA HI
16D2 AF          CLA                      / A <- 0
16D3 3298FE      STA   CMDBUF+10          / LOAD NODE2 DATA LO
16D6 C33817      JMP   K14110             / CONTINUE
                 EJECT

\          2 NODE: CONVERT NODE

            /    MAKE SURE IT IS ENHANCED SET TO
            /    ACCEPT "CONVERT"

            K14085,
16D9 3A85FE      LDA   SCONF2    / GET CONFIG BYTE
16DC E602        ANI   SYSENH    / ISOLATE ENHANCED?
16DE CAFB1A      JZ    KF14IV    /   NO, ERROR
                                 /   OK, GO AHEAD

16E1 3A01FD      LDA   DSPNUM+3           / GET REFERENCE TYPE
16E4 FE31        CPI   ASC1               / CHECK FOR INPUT SOURCE
```

```
16E6 C22317          JNZ    K14100          / BRANCH ON IT
                /
16E9 1102FD          LXI    D,DSPNUM+4      / [D,E] <- BCD SOURCE
16EC 210000          LXI    H,0             / INITIALIZE BINARY
16EF CD8E01          CALL   BCDBN3          / CONVERT TO BINARY
16F2 2B              DCX    H               / MAKE ZERO RELATIVE
16F3 E5              PUSH   H               / STACK IT
                /
16F4 3A85FE          LDA    SCONF2          / A <- COIL RAM CONFIG
16F7 E6F0            ANI    SYS256+SYS192+SYS128+SYS064 / ISOLATE
16F9 CF              NSWP                   / COIL CONFIGURATION
                                            / AND ROTATE TO SET
                                            / UP TEST FOR ALLOWABLE
                                            / RANGE FOR I/O
16FA 21CBFF          LXI    H,-@53          / [H,L] <- INTIAL MAX
16FD 11C0FF          LXI    D,-@64          / [D,E] <- OFFSET
                /
1700 0F         K14090, RRC                 / ROTATE MASK
1701 DA0817          JC     K14095          / BRANCH WHEN DONE
1704 19              DAD    D               / ELSE, UP MAX
1705 C30017          JMP    K14090          / AND CONTINUE
                /
1708 EB         K14095, XCHG                / SWAP
1709 E1              POP    H               / GET BINARY
170A E5              PUSH   H               / RESTACK IT
170B 19              DAD    D               / CHECK FOR OVERFLOW
170C E1              POP    H               / GET BINARY
170D 11411B          LXI    D,KF14M1        / SET ERROR ADDRESS
1710 DAFE1A          JC     KF14ER          / BRANCH ON OVERFLOW
                /
1713 65              MOV    H,L             / H <- NODE1 DATA LO
1714 2E4C            MVI    L,NOCON!:04+SINFLG / L <- NODE1 DATA HI
1716 2295FE          SHLD   CMDBUF+5        / LOAD BUFFER
1719 26FF            MVI    H,:FF           / H <- NODE1 DATA LO
171B 2E4F            MVI    L,NOCON!:04+DRGFLG / L <- NODE2 DATAHI
171D 2297FE          SHLD   CMDBUF+7        / LOAD BUFFER
1720 C33817          JMP    K14110          / AND CONTINUE
                /
1723 3E10       K14100, MVI    A,NODHRG     / CONVERT REGISTER SOURCE
1725 CDC71F          CALL   KU07            / VALIDATE REFERENCE
1728 C2011B          JNZ    KF14X           / EXIT ON ERROR
                /
172B 65              MOV    H,L             / H <- NODE 1 DATA LO
172C 2E4D            MVI    L,NOCON!:04+SRGFLG / L <- NODE 1 DATA HI
172E 2295FE          SHLD   CMDBUF+5        / LOAD BUFFER
1731 26FF            MVI    H,:FF           / H <- NODE 2 DATA LO
1733 2E4E            MVI    L,NOCON!:04+DINFLG / L <- NODE 2 DATA HI
1735 2297FE          SHLD   CMDBUF+7        / LOAD BUFFER
                     EJECT

\            COMMON  CODE  FOR  2  NODE  ITEMS. . .

1738 0E02       K14110, MVI    C,2          / C <- NODE COUNT
173A CD3321          CALL   KU09            / INSERT DOUBLE-NODE
173D C2011B          JNZ    KF14X           / EXIT ON ERROR
                /
1740 CD0B23          CALL   KU12            / SET CURSOR POINTERS
1743 23              INX    H               / STEP OVER ATTRIBUTE
1744 11081B          LXI    D,MULLN1        / [D,E] <- SOURCE
1747 0605            MVI    B,DSPNOD-2      / B <- LENGTH
1749 CD0601          CALL   MOVS10          / MOVE DATA
174C 3AB8FC          LDA    DSPVER          / A <- VERTICAL
174F 77              MOV    M,A             / STORE IT
1750 114B00          LXI    D,ROWB-DSPNOD+2 / MOVE POINTER
1753 19              DAD    D               / TO NEXT LINE
1754 3605            MVI    M,ASCLB         / SET LEFT BOARDER
1756 23              INX    H               / BUMP TO NEXT POSITION
1757 1101FD          LXI    D,DSPNUM+3      / [D,E] <- SOURCE
175A 0604            MVI    B,4             / B <- LENGTH
175C CD0601          CALL   MOVS10          / MOVE DATA
175F 3A05FD          LDA    DSPVER+ROWD     / A <- VERTICAL
1762 77              MOV    M,A             / STORE IT
1763 CDE323          CALL   KU19            / POWER FROM RAIL
1766 CD0A24          CALL   KU20            / CONNECT VERTICALS
                /
```

```
1769 3A7FFE              LDA     ASMCON           / A <- CONTACT TYPE
176C 110700              LXI     D,MULRCL         / [D,E] <- RECORD LENGTH
176F 21131B              LXI     H,MULTAB+1       / [H,L] <- TABLE ADDR
                /
1772 BE         K14115,  CMP     M                / CHECK KEY MATCH
1773 CA7A17              JZ      K14120           / BRANCH ON IT
1776 19                  DAD     D                / BUMP POINTER
1777 C37217              JMP     K14115           / CONTINUE
                /
177A E5         K14120,  PUSH    H                / SAVE ADDRESS
177B 3A7DFE              LDA     CURDSP           / A <- CURSOR
177E C610                ADI     :10              / FAKE IT TO NEXT
1780 327DFE              STA     CURDSP           / COLUMN FOR INSERT
1783 CD0B23              CALL    KU12             / SET UP CURSOR POINTERS
1786 23                  INX     H                / STEP OVER ATTRIBUTE
1787 D1                  POP     D                / [D,E] <- DISPLAY SOURCE
1788 13                  INX     D                / FOR DISPLAY
1789 0605                MVI     B,DSPNOD-2       / B <- LENGTH
178B CD0601              CALL    MOVS10           / MOVE DATA
178E 36E0                MVI     M,CA1100         / DO VERTICAL
1790 114B00              LXI     D,ROWB-DSPNOD+2  / [D,E] <- OFFSET
1793 19                  DAD     D                / MOVE POINTER TO NEXT ROW
1794 110D1B              LXI     D,MULLN2         / [D,E] <- SOURCE
1797 0605                MVI     B,DSPNOD-2       / B <- LENGTH
1799 CD0601              CALL    MOVS10           / MOVE DATA
179C CDE323              CALL    KU19             / EXTEND POWER
179F CD0A24              CALL    KU20             / CONNECT VERTICALS
                /
17A2 3A7DFE              LDA     CURDSP           / A <- CURSOR
17A5 D610                SUI     :10              / MOVE IT BACK
17A7 327DFE              STA     CURDSP           / STORE IT
17AA C3011B              JMP     KF14X            / AND EXIT
                         EJECT

\### NODE REPLACEMENT
                /
                K14135,
17AD 3A7FFE              LDA     ASMCON           / GET REQUESTED TYPE
17B0 CD8023              CALL    KU15A            / SEE IF M-NODE TYPE
17B3 C2FB1A              JNZ     KF14IV           /   YES, "INVALID"
                                                  /   NO, OKAY TO GO ON
17B6 CD5124              CALL    KU22             / GET PTR TO "COLTAB"
17B9 E7                  GETHL                    / [H,L] <- LAST ADDRESS
17BA CD0423              CALL    KU11             / A <- ROW
17BD 3D                  DCR     A                / MAKE RELATIVE TO ZERO
17BE 87                  ADD     A                / TWO BYTES PER NODE
17BF 1600                MVI     D,0              / D <- 0
17C1 5F                  MOV     E,A              / E <- OFFSET
17C2 19                  DAD     D                / [H,L] <- ADDRESS OF MO
17C3 EB                  XCHG                     / SWAP
17C4 2193FE              LXI     H,CMDBUF+3       / [H,L] <- DESTINATION
17C7 EF                  MOVDE                    / STORE ADDRESS
                /
17C8 110000              LXI     D,0              / [D,E] <- NULL DATA
17CB EF                  MOVDE                    / STORE DATA
                /
17CC 11FFFF              LXI     D,:FFFF          / [D,E] <- MASK
17CF EF                  MOVDE                    / STORE MASK
                /
                /        IF THE CONTACT IS "NULL",
                /        SKIP CHECK FOR MULTI-NODE

17D0 3AB7FC              LDA     DSPCON+4         / GET LAST CHAR OF HOR CONT
CT
17D3 FE1F                CPI     ASCCBK           / IS IT "NULL" (CLEARED)?
17D5 CA0A18              JZ      K14150           /   YES, GO PROCESS #
                         EJECT

\          HERE TO PROCESS NEW CONTACT TYPE

                /        TEST FOR M-NODE REPLACE; IF TRUE, ERROR!

17D8 CD7D23              CALL    KU15             / MULTI-NODE REPLACE?
17DB C2FB1A              JNZ     KF14IV           / YES, NOT ALLOWED
                /
```

```
                     K14145,
                     /        IF AT RIGHT RAIL, REPLACEMENT MUST
                     /                BE COIL TYPE
                     /        IF NOT AT RIGHT RAIL, REPLACEMENT
                     /                TYPE MUST NOT BE COIL
17DE 3A7DFE                   LDA     CURDSP  / GET CURRENT DISPLAY LOC
17E1 E60F                     ANI     COLMSK  / ISOLATE COLUMN
17E3 FE0B                     CPI     MAXCOL  / AT RIGHT RAIL?
17E5 CAF417                   JZ      K14146  /   YES, MAKE SURE ITS A COIL
                     /        NOT AT RIGHT RAIL, MUST NOT BE A COIL
17E8 3A7FFE                   LDA     ASMCON  / GET NEW TYPE
17EB CD7A25                   CALL    ISCOIL  / IS IT A COIL?
17EE DAFD17                   JC      K14147  /   NO, OKAY
17F1 C3FB1A                   JMP     KF14IV  /   YES, INVALID
                     /        AT RIGHT RAIL, MUST HAVE A COIL!
                     K14146,
17F4 3A7FFE                   LDA     ASMCON  / GET NEW TYPE
17F7 CD7A25                   CALL    ISCOIL  / IS IT A COIL?
17FA DAFB1A                   JC      KF14IV  /   NO, INVALID
                     /        OKAY TO USE CONTACT
                     K14147,
17FD 3A7FFE                   LDA     ASMCON          / GET CONTACT TYPE
1800 07                       RLC                     / SHIFT LEFT
1801 07                       RLC                     / FOR NODE FORMAT
1802 3295FE                   STA     CMDBUF+5        / STORE IN BUFFER
                     /
1805 3E83                     MVI     A,-1-NODMSK     / A <- NEW MASK
1807 3297FE                   STA     CMDBUF+7        / STORE IN BUFFER
                              EJECT
\#### NUMERIC REPLACEMENT
                     /
180A 3A01FD          K14150,  LDA     DSPNUM+3        / A <- NUMERIC FIELD
180D FE1D                     CPI     ASCNBK          / UNDEFINED?
180F CA8718                   JZ      K14158          / YES, SKIP
                     /        USE THE #, SO SET THE "TO BE CLEARED" FLAG
1812 3A7CFE                   LDA     KSTATE          / GET FLAGS
1815 F610                     ORI     KCLEAR          / SET "TO BE CLEARED"
1817 327CFE                   STA     KSTATE          / X
                     /        BRANCH ON CONTACT TYPE
181A 3A80FE                   LDA     CURCON          / A <- CURRENT CONTACT
181D FE0D                     CPI     NOCPRE          / CHECK FOR CONSTANT PRESET
181F CA3E18                   JZ      K14152          / BRANCH ON CONSTANT PRESET
1822 FE14                     CPI     NOCCON          / CHECK FOR C-NODE CONST NT
1824 CA3E18                   JZ      K14152          / BRANCH ON IT
1827 FE0E                     CPI     NORPRE          / CHECK FOR REGISTER PRESET
1829 CA3118                   JZ      K14151          / BRANCH ON IT
182C FE15                     CPI     NOCREG          / CHECK FOR C-NODE REG
182E C25618                   JNZ     K14154          / BRANCH IF NOT
                     /
1831 47              K14151,  MOV     B,A             / B <- NODE TYPE
1832 3A01FD                   LDA     DSPNUM+3        / A <- REFERENCE TYPE
1835 FE30                     CPI     ASC0            / CHECK FOR CONSTANT
1837 C25618                   JNZ     K14154          / BRANCH IF NO CHANGE
183A 05                       DCR     B               / CHANGE NODE TYPE
183B C34818                   JMP     K14153          / AND CONTINUE
                     /
183E 47              K14152,  MOV     B,A             / B <- NODE TYPE
183F 3A01FD                   LDA     DSPNUM+3        / A <- REFERENCE TYPE
1842 FE30                     CPI     ASC0            / CHECK FOR CONSTANT
1844 CA5618                   JZ      K14154          / BRANCH ON CONSTANT
1847 04                       INR     B               / CHANGE NODE TYPE
                     /
1848 78              K14153,  MOV     A,B             / A <- NEW NODE TYPE
```

```
1849 3280FE             STA     CURCON           / UPDATE CURSOR NODE TYF
184C 07                 RLC                      / ROTATE TO
184D 07                 RLC                      / FORM NODE
184E 3295FE             STA     CMDBUF+5         / STORE IN BUFFER
1851 3E80               MVI     A,EQCFLG         / A <- MASKHI
1853 3297FE             STA     CMDBUF+7         / LOAD MASKHI
                        EJECT

               /        VERIFY REFERENCE # TO CONTACT TYPE +
               /        SET UP I/O COMMAND.

1856 3A7FFE    K14154,  LDA     ASMCON           / A <- ASSEMBLY NODE TYF
1859 B7                 TST                      / CHECK IF DEFINED
185A C26018             JNZ     K14155           / BRANCH IF DEFINED
               /
185D 3A80FE             LDA     CURCON           / A <- CURSOR NODE TYPE
               /
1860 21FD09    K14155,  LXI     H,NODTAB+NODCON  / [H,L] <- POINTER
1863 110900             LXI     D,NODRCL         / [D,E] <- OFFSET
               /
1866 BE        K14156,  CMP     M                / LOOK FOR MATCH
1867 CA6E18             JZ      K14157           / BRANCH ON MATCH
186A 19                 DAD     D                / MOVE TO NEXT ENTRY
186B C36618             JMP     K14156           / CONTINUE
               /
186E 23        K14157,  INX     H                / BUMP TO REFERENCE MASK
186F 7E                 MOV     A,M              / A <- REFERENCE MASK
1870 CDC71F             CALL    KU07             / VERIFY REFERENCE
1873 C2011B             JNZ     KF14X            / EXIT ON ERROR
               /
1876 EB                 XCHG                     / SWAP
1877 2195FE             LXI     H,CMDBUF+5       / SET POINTER
187A 7A                 MOV     A,D              / A <- HI-ORDER REF
187B B6                 ORA     M                / SET CORRECT BITS
187C 77                 MOV     M,A              / SET FINAL BYTE 0
               /
187D 23                 INX     H                / BUMP POINTER
187E 73                 MOV     M,E              / SET BYTE 1
187F 23                 INX     H                / BUMP TO MASKHI
1880 7E                 MOV     A,M              / A <- MASKHI
1881 E6FC               ANI     -1-SEQFLG        / CLEAR HI-ORDER REF FIELD
1883 77                 MOV     M,A              / STORE IN BUFFER
1884 AF                 CLA                      / A <- 0
1885 23                 INX     H                / BUMP TO MASKLO
1886 77                 MOV     M,A              / STORE MASKLO
                        EJECT
1887 110A21    K14158,  LXI     D,CMDWRT+CMD02!:100+LENWRT      / SET PARMS
188A CD8125             CALL    PIO              / DO WRITE
188D C2011B             JNZ     KF14X            / EXIT ON ERROR

               /        UPDATE 'MATROW' WITH NEW NODE TYPE.
               /        IF 'ASMCON' BLANK, USE CURSOR NODE TYPE

1890 3A7FFE             LDA     ASMCON   / GET ASSEMBLY NODE TYFE
1893 B7                 TST              / BLANK?
1894 C29A18             JNZ     K14159   /   NO, USE IT
1897 3A80FE             LDA     CURCON   /   YES, USE CURRENT NODE
               K14159,
189A F5                 PUSH    PSW      / SAVE TYPE
189B CDAA23             CALL    KU17     / GET PTR TO MATROW
189E F1                 POP     PSW      / GET NODE TYPE
189F 77                 MOV     M,A      / UPDATE MATROW

               /        UPDATE DISPLAY WITH NEW CONTACT, IF THERE IS ONE

18A0 3AB3FC             LDA     DSPCON           / A <- CONTACT FIELD
18A3 FE1F               CPI     ASCCBK           / CHECK FOR BLANK
18A5 CABD18             JZ      K14160           / DO CHANGE NEEDED
               /
18A8 CD7D23             CALL    KU13             / CHECK FOR MULTI-NODE
18AB C2BD18             JNZ     K14160           / DON'T CHANGE
               /
18AE CD0B23             CALL    KU12             / B <- CURSOR
18B1 23                 INX     H                / BUMP OVER ATTRIBUTE
18B2 11B3FC             LXI     D,DSPCON         / SET SOURCE
```

```
18B5 0605                MVI    B,DSPNOD-2        / B <- COUNT
18B7 CD0601              CALL   MOVS10            / PAINT NEW DISPLAY
18BA CDE923              CALL   KU19              / EXTEND POWER
                         EJECT
\   SEE IF # TO BE DISPLAYED

18BD 3A01FD     K14160,  LDA    DSPNUM+3          / A <- NUMERIC FIELD
18C0 FE1D                CPI    ASCNBK            / UNDEFINED?
18C2 CAF118              JZ     K14170            / YES, SKIP

\   MOVE # FROM ASSEMBLY TO NETWORK

18C5 CD0B23              CALL   KU12              / B <- CURSOR
18C8 19                  DAD    D                 / BUMP TO REF FIELD
18C9 23                  INX    H                 / SKIP ATTRIBUTE
18CA 23                  INX    H                 / TO MS DIGIT IN NETWORK
18CB 0604                MVI    B,4               / SET LENGTH

                /        NOW SEE IF THE ASSEMBLY AREA IS SPACES OR #

18CD 1101FD              LXI    D,DSPNUM+3        / SET SRC PTR
18D0 1A                  LDAX   D                 / GET MS DIGIT
18D1 FE20                CPI    ASCBLK            / IS IT BLANK NOW?
18D3 CAE118              JZ     K14164            /   YES, JUST MOVE #

                /        HAVE #, SO SEE IF UNDERLINE OR NOT

18D6 7E                  MOV    A,M               / GET # IN SCREEN NET
18D7 FE20                CPI    ASCBLK            / IS IT BLANK NOW?
18D9 CAE118              JZ     K14164            /   YES, JUST MOVE #

                /        # IS ON SCREEN; SEE IF IT IS ALREADY
                /        UNDERLINED

18DC FE30                CPI    ASC0              / CHECK FOR UNDERLINE
18DE DAE718              JC     K14165            / BRANCH TO UNDERLINE
                K14164,
18E1 CD0601              CALL   MOVS10            / DISPLAY REFERENCE
18E4 C3F118              JMP    K14170            / CONTINUE
                /
18E7 1A         K14165,  LDAX   D                 / A <- NUMBER
18E8 D620                SUI    ASC0-ASC0UN       / UNDERLINE IT
18EA 77                  MOV    M,A               / DISPLAY IT
18EB 13                  INX    D                 / BUMP
18EC 23                  INX    H                 / POINTERS
18ED 05                  DCR    B                 / DONE?
18EE C2E718              JNZ    K14165            / NO, CONTINUE LOOP
                         EJECT
\### VERTICAL REPLACEMENTS
                /
18F1 3AB8FC     K14170,  LDA    DSPVER            / A <- VERTICAL FIELD
18F4 FE1E                CPI    ASCVBK            / UNDEFINED?
18F6 CA011B              JZ     KF14X             / YES, EXIT
                /
18F9 CD0423              CALL   KU11              / A <- ROW
18FC 47                  MOV    B,A               / B <- COUNTER
18FD 3E80                MVI    A,:80             / A <- INITIAL MASK
                /
18FF 0F         K14172,  RRC                      / ROTATE MASK
1900 05                  DCR    B                 / DECREMENT COUNTER
1901 C2FF18              JNZ    K14172            / LOOP UNTIL DONE
1904 4F                  MOV    C,A               / SAVE MASK FOR A SEC

                /        NOW GET PTR TO COLTAB FOR CURRENT POS

1905 CD5124              CALL   KU22              / NOW H/L = PTR
1908 E5                  PUSH   H                 / SAVE POINTER
1909 110400              LXI    D,EOCHI           / [D,E] <- OFFSET
190C 19                  DAD    D                 / [H,L] <- EOC NODE
190D 59                  MOV    E,C               / E <- MASK
190E AF                  CLA                      / A <- 0
190F BE                  CMP    M                 / ANY VERTICALS THIS ROW
1910 C24C19              JNZ    K14175            / YES, CONTINUE
                /
1913 3A05FD              LDA    DSPVER+ROWD       / A <- VERTICAL TYPE
```

```
1916 FE20                 CPI    ASCBLK              / IS IT BLANK?
1918 C21F19               JNZ    K14174              / NO, MUST DO AN INSERT
191B E1                   POP    H                   / YES, CLEAN STACK
191C C3011B               JMP    KF14X               / AND EXIT WITH NO ACTION
                /
191F 1608       K14174,   MVI    D,NDEOC!.04         / D <- NODE TYPE
1921 2B                   DCX    H                   / MOVE POINTER BACK TO
1922 2B                   DCX    H                   / LAST ADDRESS IN COLUMN
1923 E7                   GETHL                      / [H,L] <- LAST ADDRESS
1924 23                   INX    H                   / BUMP TO MOVE OVER
1925 23                   INX    H                   / LAST NODE IN COL
1926 44                   MOV    B,H                 / B <- ADDRHI
1927 4D                   MOV    C,L                 / C <- ADDRLO
1928 2193FE               LXI    H,CMDBUF+3          / [H,L] <- DESTINATION
192B D7                   MOVBC                      / LOAD ADDRESS
192C EF                   MOVDE                      / LOAD DATA
192D D5                   PUSH   D                   / SAVE DATA
                /
192E 1108B1               LXI    D,CMDINC+CMD02!.100+LENINC / SET PARMS
1931 CD8125               CALL   PIO                 / INSERT NEW EOC NODE
1934 D1                   POP    D                   / GET EOC NODE
1935 E1                   POP    H                   / GET COLUMN POINTER
1936 C2011B               JNZ    KF14X               / EXIT ON ERROR
                /
1939 E5                   PUSH   H                   / STACK POINTER
193A 010400               LXI    B,EOCHI             / [B,C] <- OFFSET
193D 09                   DAD    B                   / [H,L] <- EOC DATA
193E EF                   MOVDE                      / LOAD NEW EOC DATA
193F E1                   POP    H                   / RESTORE POINTER
1940 010100               LXI    B,CMD02             / [B,C] <- NODE COUNT
1943 CDB824               CALL   COLINC              / UPDATE COLUMN TABLE
1946 CDCF22               CALL   KU09UF              / UPDATE MATROW AND USEAGE
1949 C3C419               JMP    K14190              / AND DISPLAY VERTICAL
                          EJECT
\### UPDATE EXISTING VERTICAL
                /
                K14175,
194C 23                   INX    H                   / POINT AT VERTICALS
194D 7B                   MOV    A,E                 / A <- MASK
194E 4B                   MOV    C,E                 / C <- MASK
194F 5E                   MOV    E,M                 / E <- VERTICALS
1950 1600                 MVI    D,0                 / D <- 0
1952 B3                   ORA    E                   / SET FLAG
1953 5F                   MOV    E,A                 / STORE IT
1954 3A05FD               LDA    DSPVER+ROWD         / A <- VERTICAL FIELD
1957 FE20                 CPI    ASCBLK              / ANY VERTICAL?
1959 C29E19               JNZ    K14180              / YES
                /
195C 79                   MOV    A,C                 / A <- MASK
195D AB                   XRA    E                   / CLEAR FLAG
195E 5F                   MOV    E,A                 / SET VERTICAL FLAGS
195F C29E19               JNZ    K14180              / BRANCH IF STILL VERTIC`LS
                /
1962 01FDFF               LXI    B,-EOCLO+COLEHI     / [B,C] <- OFFSET
1965 09                   DAD    B                   / [H,L] <- ADDRESS
1966 E7                   GETHL                      / [H,L] <- ADDRESS OF EOC N
DE
1967 EB                   XCHG                       / SWAP
1968 2193FE               LXI    H,CMDBUF+3          / [H,L] <- DESTINATION
196B EF                   MOVDE                      / LOAD ADDRESS
                /
196C 1106C1               LXI    D,CMDDEL+CMD02!.100+LENDEC / SET PARMS
196F CD8125               CALL   PIO                 / DELETE EOC NODE
1972 E1                   POP    H                   / GET POINTER
1973 C2011B               JNZ    KF14X               / EXIT ON ERROR
                /
1976 E5                   PUSH   H                   / SAVE PTR TO COL
1977 010400               LXI    B,EOCHI             / GET OFFSET TO EOC DATA
197A 09                   DAD    B                   / COMPUTE ADDR OF EOC
197B 010000               LXI    B,0                 / CLEAR THE EOC NODE
197E D7                   MOVBC                      / DONE
197F E1                   POP    H                   / RESTORE PTR TO COL
1980 010100               LXI    B,CMD02             / [B,C] <- NODE COUNT
1983 CD0025               CALL   COLDEC              / UPDATE COLUMN TABLE
1986 CD0B23               CALL   KU12                / GET DISPLAY POINTERS
```

```
     1989 110600          LXI     D,DSPNOD-1        / [D,E] <- OFFSET
     198C 19              DAD     D                 / BUMP TO VERTICAL SPOT
     198D 36E0            MVI     M,CA1100          / CLEAR VERTICAL
     198F 115000          LXI     D,ROWB            / [D,E] <- OFFSET
     1992 19              DAD     D                 / BUMP TO NEXT LINE
     1993 3620            MVI     M,ASCBLK          / BLANK ENTRY
     1995 19              DAD     D                 / BUMP TO NEXT ROW
     1996 3E20            MVI     A,ASCBLK          / GET A SPACE
     1998 CD6224          CALL    FIXVER            / FIX LAST VERT CHAR
     199B C3011B          JMP     KF14X             / AND EXIT
                          EJECT

\          HERE TO PUT A NEW VERT IN
\          ON A COLUMN WITH OTHER VERTS

                  /
     199E 2195FE  K14180, LXI     H,CMDBUF+5        / SET DESTINATION
     19A1 EF              MOVDE                     / STORE DATA
                  /
     19A2 1100FF          LXI     D,:FF00           / SET MASK
     19A5 EF              MOVDE                     / LOAD MASK
                  /
     19A6 E1              POP     H                 / GET POINTER
     19A7 E5              PUSH    H                 / SAVE IT
     19A8 110200          LXI     D,COLEHI          / [D,E] <- OFFSET
     19AB 19              DAD     D                 / [H,L] <- LAST ADDR
     19AC E7              GETHL                     / [H,L] <- LAST ADDR OF  AT

     19AD EB              XCHG                      / SWAP
     19AE 2193FE          LXI     H,CMDBUF+3        / [H,L] <- DESTINATION
     19B1 EF              MOVDE                     / LOAD ADDRESS
                  /
     19B2 110A21          LXI     D,CMDWRT+CMD02!:100+LENWRT     / SET PA MS
     19B5 CD8125          CALL    FIO               / DO WRITE
     19B8 E1              POP     H                 / CLEAN STACK
     19B9 C2011B          JNZ     KF14X             / EXIT ON ERROR
                  /
     19BC 110500          LXI     D,EOCLO           / [D,E] <- OFFSET
     19BF 19              DAD     D                 / [H,L] <- CONNECTIVITY  YT

     19C0 3A96FE          LDA     CMDBUF+6          / A <- NEW CONNECTIVITY BYT

     19C3 77              MOV     M,A               / LOAD NEW CONNECTIVITY BYT

                  /
                  K14190,
     19C4 CD0B23          CALL    KU12              / B <- CURSOR
     19C7 110600          LXI     D,DSPNOD-1        / GET OFFSET
     19CA 19              DAD     D                 / [H,L] <- VERTICAL SLOT
     19CB 3AB8FC          LDA     DSPVER            / A <- VERTICAL
     19CE 77              MOV     M,A               / DISPLAY IT
     19CF 115000          LXI     D,ROWB            / [D,E] <- OFFSET
     19D2 19              DAD     D                 / MOVE POINTER
     19D3 3A05FD          LDA     DSPVER+ROWB       / A <- VERTICAL
     19D6 77              MOV     M,A               / DISPLAY IT
     19D7 19              DAD     D                 / STEP TO ROW BELOW VERT
     19D8 CD6224          CALL    FIXVER            / GO FIX LAST VERT CHR
     19DB CD0A24          CALL    KU20              / CONNECT VERTICALS
     19DE C3011B          JMP     KF14X             / AND EXIT
                          EJECT

\### CALCULATE NODES (3 NODES)


                  /       MAKE SURE ENHANCED SET TO ACCEPT CALC

                  K14200,
     19E1 3A85FE          LDA     SCONF2  / GET CONFIG BYTE
     19E4 E602            ANI     SYSENH  / IS IT ENHANCED?
     19E6 CAFB1A          JZ      KF14IV  /   NO, ERROR
                                          /   OK, GO AHEAD

     19E9 3E38            MVI     A,NODCST+NODIRG+NODHRG   / A <- MASK
     19EB CDC71F          CALL    KU07              / VALIDATE REFERENCE
     19EE C2011B          JNZ     KF14X             / EXIT ON ERROR
                  /
```

```
19F1 3A01FD            LDA     DSPNUM+3           / A <- REFERENCE TYPE
19F4 FE30              CPI     ASC0               / CHECK FOR CONSTANT
19F6 3E34              MVI     A,NOCPRE!:04       / ASSUME CONSTANT
19F8 CAFD19            JZ      K14201             / BRANCH ON CONSTANT
19FB 3E38              MVI     A,NORPRE!:04       / REGISTER PRESET
                  /
19FD B4       K14201,  ORA     H                  / CREATE DATAHI
19FE 65                MOV     H,L                / H <- DATALO
19FF 6F                MOV     L,A                / L <- DATAHI
1A00 2295FE            SHLD    CMDBUF+5           / STORE INTO BUFFER
                  /
1A03 2600              MVI     H,0                / H <- DATALO
1A05 2E56              MVI     L,NOCREG!:04+DUMFLG     / L <- DATAHI
1A07 2297FE            SHLD    CMDBUF+7           / LOAD BUFFER
                  /
1A0A 21351B            LXI     H,K14TAB           / [H,L] <- START OF TABL
1A0D 110300            LXI     D,3                / D <- TABLE LENGTH
1A10 3AB4FC            LDA     DSPCON+1           / A <- FIRST CHARACTER
                  /
1A13 BE       K14205,  CMP     M                  / LOOK FOR MATCH
1A14 CA1B1A            JZ      K14210             / BRANCH ON MATCH
1A17 19                DAD     D                  / BUMP TO NEXT ENTRY
1A18 C3131A            JMP     K14205             / AND CONTINUE
                  /
1A1B 23       K14210,  INX     H                  / BUMP TO DISPLAY CHAR
1A1C E5                PUSH    H                  / STACK POINTER
1A1D 23                INX     H                  / BUMP TO SUB-FIELD TYPE
1A1E 7E                MOV     A,M                / A <- SUB-FIELD
1A1F F658              ORI     NOCALL!:04         / SET NODE TYPE
1A21 6F                MOV     L,A                / SET DATA HI
1A22 26FF              MVI     H,:FF              / SET DATA LO
1A24 2299FE            SHLD    CMDBUF+11          / LOAD BUFFER
                  /
1A27 0E03              MVI     C,3                / C <- NODE COUNT
1A29 CD3321            CALL    KU09               / INSERT NODE
1A2C E1                POP     H                  / CLEAN STACK
1A2D C2011B            JNZ     KF14X              / EXIT ON ERROR
                  /
1A30 E5                PUSH    H                  / RESTACK POINTER
1A31 CD0B23            CALL    KU12               / SET CURSOR POINTERS
1A34 23                INX     H                  / SET OVER ATTRIBUTE
1A35 11081B            LXI     D,MULLN1           / [D,E] <- SOURCE
1A38 0605              MVI     B,DSPNOD-2         / B <- LENGTH
1A3A CD0601            CALL    MOVS10             / DISPLAY TOP ROW
                  /
1A3D 3AD8FC            LDA     DSPVER             / A <- VERTICAL
1A40 77                MOV     M,A                / DISPLAY VERTICAL
1A41 114C00            LXI     D,ROWL-DSPNOD+3    / [D,E] <- OFFSET
1A44 19                DAD     D                  / BUMP TO NEXT ROW
1A45 3605              MVI     M,ASCLB            / SET LEFT BOARDER
1A47 23                INX     H                  / INCREMENT POINTER
1A48 1101FD            LXI     D,DSPNUM+3         / [D,E] <- SOURCE
1A4B 0605              MVI     B,5                / B <- COUNTER
1A4D CD0601            CALL    MOVS10             / DISPLAY REFERENCE
                  /
1A50 CDE323            CALL    KU19               / EXTEND POWER
1A53 CD0A24            CALL    KU20               / CONNECT VERTICALS
                  /
1A56 3A7DFE            LDA     CURDSP             / A <- CURSOR
1A59 C610              ADI     :10                / FAKE IT TO NEXT ROW
1A5B 327DFE            STA     CURDSP             / AND STORE IT
                       EJECT

1A5E CD0B23            CALL    KU12               / A <- CURSOR
1A61 23                INX     H                  / STEP OVER ATTRIBUTE
1A62 3605              MVI     M,ASCLB            / DISPLAY LEFT BOARDER
1A64 23                INX     H                  / STEP
1A65 23                INX     H                  / TO ACTIVITY POSITION
1A66 D1                POP     D                  / GET POINTER TO CHAR
1A67 1A                LDAX    D                  / A <- CHARACTER
1A68 77                MOV     M,A                / DISPLAY IT
1A69 23                INX     H                  / BUMP
1A6A 23                INX     H                  / POINTER
1A6B 3609              MVI     M,ASCRB            / DISPLAY BOARDER
1A6D 23                INX     H                  / NOW DO VERTICAL
1A6F 36E0              MVI     M,CA1100           / DISPLAY VERTICAL
                  /
```

```
1A70 114B00            LXI   D,ROWB-DSPNOD+2 / [D,E] <- OFFSET
1A73 19                DAD   D               / BUMP TO NEXT ROW
1A74 3605              MVI   M,ASCLB         / DISPLAY BOARDER
1A76 23                INX   H               / BUMP POINTER
1A77 EB                XCHG                  / SWAP
1A78 21A00F            LXI   H,@4000         / [H,L] <- DUMMY REGISTER
1A7B CDC201            CALL  BNBCD4          / DISPLAY IT
1A7E CDE323            CALL  KU19            / EXTEND POWER
1A81 CD0A24            CALL  KU20            / CONNECT VERTICALS
                /
1A84 3A7DFE            LDA   CURDSP          / A <- CURSOR
1A87 C610              ADI   :10             / FAKE IT TO NEXT ROW
1A89 327DFE            STA   CURDSP          / FOR ENTRY
                /
1A8C CD0B23            CALL  KU12            / SET POINTERS
1A8F 23                INX   H               / SKIP ATTRIBUTE
1A90 3605              MVI   M,ASCLB         / DISPLAY BOARDER
1A92 23                INX   H               / MOVE
1A93 23                INX   H               / POINTER
1A94 361B              MVI   M,ASCADN        / INSERT DOWN ARROW
1A96 23                INX   H               / MOVE
1A97 23                INX   H               / POINTER
1A98 3609              MVI   M,ASCRB         / DISPLAY RIGHT BOARDER
1A9A 23                INX   H               / BUMP POINTER
1A9B 36E0              MVI   M,CAI100        / DISPLAY VERTICAL
1A9D 114B00            LXI   D,ROWB-DSPNOD+2 / [D,E] <- OFFSET
1AA0 19                DAD   D               / MOVE POINTER
1AA1 110D1B            LXI   D,MULLN2        / [D,E] <- SOURCE
1AA4 0605              MVI   B,5             / B <- LENGTH
1AA6 CD0601            CALL  MOVS10          / DISPLAY DATA
1AA9 CDE323            CALL  KU19            / EXTEND POWER
1AAC CD0A24            CALL  KU20            / CONNECT VERTICALS
                /
1AAF 3A7DFE     K142.., LDA   CURDSP          / A <- CURSOR
1AB2 D620              SUI   :20             / UNFAKE IT
1AB4 327DFE            STA   CURDSP          / TO REAL PLACE
1AB7 C3011B            JMP   KF14X           / AND EXIT
                       EJECT

                /
                /***HOLDING REGISTER UPDATE
                /
1ABA CD4705     K14900, CALL  CUR100          / SET CURSOR POINTERS
1ABD 23                INX   H               / SKIP ATTRIBUTE
1ABE 7E                MOV   A,M             / A <- REFERENCE TYPE
1ABF FE34              CPI   ASC4            / MUST BE 4XXX
1AC1 C2FB1A            JNZ   KF14IV          / BRANCH ON ERROR
                /
1AC4 23                INX   H               / STEP OVER REFERENCE TYPE
1AC5 EB                XCHG                  / SWAP
1AC6 210000            LXI   H,0'            / INITIALIZE BINARY RESU T
1AC9 CD8E01            CALL  BCDBN3          / CONVERT TO BINARY
1ACC EB                XCHG                  / SWAP
1ACD 1640              MVI   D,REGFLD        / SET ADDRHI
1ACF 1C                INR   E               / SET ADDRLO
1AD0 2193FE            LXI   H,CMDBUF+3      / [H,L] <- DESTINATION
1AD3 EF                MOVDE                 / STORE ADDR
                /
1AD4 1101FD            LXI   D,DSPNUM+3      / [D,E] <- NUMERIC FIELD
1AD7 1A                LDAX  D               / A <- HIGH-ORDER DIGIT
1AD8 FE30              CPI   ASC0            / MUST BE ZERO
1ADA CAE31A            JZ    K14905          / BRANCH ON NO ERROR
                /
1ADD 11491B            LXI   D,KF14M2        / [D,E] <- MESSAGE ADDR
1AE0 C3FE1A            JMP   KF14ER          / COMMON CODE
                /
1AE3 210000     K14905, LXI   H,0             / INITIALIZE BINARY
1AE6 CD8101            CALL  BCDBN4          / CONVERT TO BINARY
                /
1AE9 EB                XCHG                  / SWAP
1AEA 2195FE            LXI   H,CMDBUF+5      / SET DESTINATION
1AED EF                MOVDE                 / STORE NEW DATA
                /
1AEE 110000            LXI   D,0             / [D,E] <- MASK
1AF1 EF                MOVDE                 / SET MASK
                /
```

```
1AF2 110A21              LXI     D,CMDWRT+CMD02!:100+LENWRT / SET PARMS
1AF5 CD8125              CALL    F10                / DO WRITE
1AF8 C3011B              JMP     KF14X              / AND EXIT
                         EJECT

                KF14IV,
1AFB 11411B              LXI     D,KF14M1           / GET PTR TO 'INVALID'
1AFE CD7E05     KF14ER,  CALL    ERROR              / SET ERROR STATE
                /
1B01 C9         KF14X,   RET                        / RET
                         EJECT

                SUBJOB   KF14Z = CHECK FOR A BLANK NODE
                /
                /
                /        A - CURRENT CURSOR (ROW,COL)
                /
                /***CHECK FOR BLANK NODE
                /
                /***Z-BIT.EQ.0 -> NON-BLANK
                /***Z-BIT.EQ.1 -> BLANK
                /
                KF14Z,
1B02 CDB123              CALL    KU17A     / GET "MATROW" PTR
1B05 AF                  CLA               / TEST FOR BLANK NODE TO 0
1B06 BE                  CMP     M         / TEST DONE; FLAGS SET
1B07 C9                  RET               / WITH Z:BIT SET/RESET
                         EJECT

                         SUBJOB  KEY FUNCTION : KF14 : ENTER - DATA TABLES
                /
                /***TOP ROW - MULTINODE CONTACTS
                /
1B08 02030303   MULLN1,  DB      ASCTL;ASCUB;ASCUB;ASCUB;ASCTR
1B0C 04
                /
                /***BOTTOM ROW - MULTINODE CONTACTS
                /
1B0D 05141010   MULLN2,  DB      ASCLB;ASC4UN;ASCOUN;ASCOUN;ASCOUN
1B11 10
                /
                /***DISPLAY TABLE
                /
     0000       MULKEY= 0                           / KEY
     0001       MULNOD= MULKEY+1                    / NODE TYPE
     0002       MULDIS= MULNOD+1                    / DISPLAY
                /
     0007       MULRCL= MULDIS+5                              / RECORD LENGTH
                /
1B12 110F       MULTAB,  DB      KEY0;NOCTR        / COUNTER
1B14 05435452            DB      ASCLB;ASCC;ASCT;ASCR;ASCRB
1B18 09
                /
1B19 1910                DB      KEY3;NOT100       / TIMER 1.0
1B1B 07312E30            DB      ASCTMR;ASC1;ASCDOT;ASC0;ASCRB
1B1F 09
                /
1B20 1211                DB      KEY2;NOT010       / TIMER 0.1
1B22 07302E31            DB      ASCTMR;ASC0;ASCDOT;ASC1;ASCRB
1B26 09
                /
1B27 0B12                DB      KEY1;NOT001       / TIMER 0.01
1B29 072E3031            DB      ASCTMR;ASCDOT;ASC0;ASC1;ASCRB
1B2D 09
                /
1B2E 1313                DB      KEY8;NOCON        / CONVERT
1B30 05434F4E            DB      ASCLB;ASCC,ASCO;ASCN;ASCRB
1B34 09
                         EJECT
1B35 41         K14TAB,  DA      'A'               / ADD
1B36 2B00                DB      ASCPLS;ADDFLG
                /
1B38 53                  DA      'S'               / SUBTRACT
1B39 2D01                DB      ASCMIN,SUBFLG
                /
```

```
1B3B 4D                  DA      'M'                 / MULTIPLY
1B3C 0B02                DB      ASCMPX;MPXFLG
                         /
1B3E 44                  DA      'D'                 / DIVIDE
1B3F 0A03                DB      ASCDIV;DIVFLG
                         EJECT

                         /
                         /***MESSAGES
                         /
1B41 07          KF14M1, DB      K14M1X
1B42 494E5641            DA      'INVALID'
1B46 4C4944
     0007        K14M1X= .-KF14M1-1
                         /
1B49 08          KF14M2, DB      K14M2X
1B4A 42414420            DA      'BAD NODE'
1B4E 4E4F4445
     0008        K14M2X= .-KF14M2-1
                         /
1B52 0C          KF14M3, DB      K14M3X
1B53 434F4C20            DA      'COL TOO LONG'
1B57 544F4F20
1B5B 4C4F4E47
     000C        K14M3X= .-KF14M3-1
                         /
1B5F 07          KF14M4, DB      K14M4X
1B60 4E4F2056            DA      'NO VERT'
1B64 455254
     0007        K14M4X=.-KF14M4-1

1B67 0B          KF14M5, DB      K14M5X
1B68 4E4F4445            DA      'NODE IN WAY'
1B6C 20494E20
1B70 574159
     000B        K14M5X=.-KF14M5-1
                         EJECT

                         SUBJOB  KEY FUNCTION : KF15 : SPARE KEY
                 /
                 /***KEY FUNCTION : KF15 : SPARE KEYS
                 /
                 /***PRELIMINARY VERSION
                 /
1B73 117A1B      KF15,   LXI     D;KF15MS            / [D,E] <- MESSAGE ADDR
1B76 CD7E05              CALL    ERROR               / SET ERROR STATE
1B79 C9                  RET                         / EXIT
                 /
                 /***MESSAGE
                 /
1B7A 09          KF15MS, DB      KF15MX
1B7B 53504152            DA      'SPARE KEY'
1B7F 45204B45
1B83 59
     0009        KF15MX= .-KF15MS-1                  / MESSAGE LENGTH
                         EJECT

                         SUBJOB  KEY FUNCTION : KF16 : ILLEGAL KEYS
                 /
                 /***KEY FUNCTION : KF16 : ILLEGAL KEYS
                 /
1B84 118B1B      KF16,   LXI     D;KF16MS            / [D,E] <- MESSAGE ADDR
1B87 CD7E05              CALL    ERROR               / SET ERROR STATE
1B8A C9                  RET                         / EXIT
                 /
                 /***MESSAGE
                 /
1B8B 0B          KF16MS, DB      KF16MX
1B8C 494C4C45            DA      'ILLEGAL KEY'
1B90 4741 4C20
1B94 4B4559
     000B        KF16MX= .-KF16MS-1                  / MESSAGE LENGTH
                         EJECT
```

```
                             SUBJOB  KEY FUNCTION : KF17 : ERROR RESET
                   /
                   /***KEY FUNCTION : KF17 : ERROR RESET
                   /
                   KF17,
    1B97 CD9F1B              CALL    CLRERR          / CLEAR ERROR LINE AND S AT

                   /         NOW, IF ERROR CAME FROM HARD P180 I/O, RESET WOR D!

    1B9A 78                  MOV     A,B             / GET OLD STATE BYTE
    1B9B E640                ANI     KERROR          / HARD I/O ERROR?
    1B9D C8                  RZ                      /   NO, GO BACK TO REGULAR
    1B9E C7                  RST     0               /   YES!, RESET P180


\   SUBROUTINE "CLRERR"

                   / THIS ROUTINE CLEARS THE ERROR LINE AND THE
                   / RESET AND SHIFT BITS IN THE STATE BYTE

                   CLRERR,
    1B9F 217CFE              LXI     H,KSTATE        / [H,L] <- STATE VECTOR
    1BA2 7E                  MOV     A,M             / LOAD STATE VECTOR
    1BA3 47                  MOV     B,A             / SAVE IT, TOO
    1BA4 E65F                ANI     -1-KRESET-KSHIFT/ CLEAR RESET FLAG
    1BA6 77                  MOV     M,A             / STORE STATE VECTOR
    1BA7 AF                  CLA                     / CLEAR A
    1BA8 3293FD              STA     TMRERR          / RESET ERROR TIMER
    1BAB 21BBFC              LXI     H,DSPERR        / [H,L] <- ERROR FIELD A DR
    1BAE 160C                MVI     D,ERRFLD-1      / D <- FIELD LENGTH
    1BB0 CD1903              CALL    ROWN10          / CLEAR ERROR FIELD
                   /
    1BB3 C9                  RET                     / EXIT
                             EJECT

                             SUBJOB  KEY FUNCTION : KF18 : DISCRETE UPDATE
                   /
                   /***KEY FUNCTION : KF18 : DISCRETE UPDATE
                   /
                   /***FUNCTION ACTIVATED BY CLKINT VIA SPOOLER
                   /
    1BB4 3E06      KF18,     MVI     A,ASMNUM        / A <- COUNTER
                   /
    1BB6 F5        KF1805,   PUSH    PSW             / STACK COUNTER
    1BB7 3A81FE              LDA     DISPTR          / A <- POINTER
    1BBA F680                ORI     ASMROW          / SET MASK
    1BBC 47                  MOV     B,A             / B <- DISPLAY COORDINATES
    1BBD CD4705              CALL    CUR100          / COMPUTE POINTERS
    1BC0 23                  INX     H               / BUMP TO REFERENCE TYPE
    1BC1 7E                  MOV     A,M             / A <- REFERENCE TYPE
    1BC2 FE20                CPI     ASCBLK          / CHECK FOR BLANK
    1BC4 C2DD1B              JNZ     KF1815          / BRANCH IF NOT
                   /
    1BC7 3A81FE              LDA     DISPTR          / A <- POINTER
    1BCA 3C                  INR     A               / BUMP IT
    1BCB FE0C                CPI     MAXCOL+1        / CHECK FOR WRAP-AROUND
    1BCD C2D21B              JNZ     KF1810          / BRANCH IF NOT
    1BD0 3E06                MVI     A,ASMCOL        / RESET POINTER
                   /
    1BD2 3281FE    KF1810,   STA     DISPTR          / STORE POINTER
    1BD5 F1                  POP     PSW             / GET COUNTER
    1BD6 3D                  DCR     A               / DECREMENT COUNTER
    1BD7 C2B61B              JNZ     KF1805          / LOOP IF NOT DONE
    1BDA C3781C              JMP     KF18X           / EXIT
                   /
    1BDD F1        KF1815,   POP     PSW             / CLEAN STACK
    1BDE E5                  PUSH    H               / SAVE POINTER
    1BDF 23                  INX     H               / BUMP TO ADDRESS
    1BE0 EB                  XCHG                    / SWAP
    1BE1 210000              LXI     H,0             / INITIALIZE BINARY RESULT
    1BE4 CD8E01              CALL    BCDBN3          / CONVERT

    1BE7 2B                  DCX     H               / MAKE RELATIVE BASE 0
    1BE8 EB                  XCHG                    / SWAP
```

```
1BE9 E1                   POP     H                   / GET POINTER
1BEA E5                   PUSH    H                   / STACK IT AGAIN
1BEB 7E                   MOV     A,M                 / A <- REFERENCE TYPE
1BEC FE34                 CPI     ASC4                / CHECK FOR HOLDING REG
1BEE CA431C               JZ      KF1830              / BRANCH ON IT
1BF1 FE33                 CPI     ASC3                / CHECK FOR INPUT REG
1BF3 CA4A1C               JZ      KF1835              / BRANCH ON IT
                /
1BF6 D5                   PUSH    D                   / SAVE TYPE
1BF7 1620                 MVI     D,IOFLD             / SET I/O FIELD FLAG
1BF9 2193FE               LXI     H,CMDBUF+3          / [H,L] <- POINTER
1BFC EF                   MOVDE                       / STORE ADDRESS
                          EJECT

1BFD 110611               LXI     D,CMDRED+CMD02!:100+LENRED / SET PARMS
1C00 CD8125               CALL    PIO                 / DO READ
1C03 D1                   POP     D                   / CLEAN (REFERENCE TYPE)
1C04 E1                   POP     H                   / STACK (POINTER)
1C05 C2781C               JNZ     KF18X               / EXIT ON ERROR
                /
1C08 0601                 MVI     B,INTSTA            / B <- MASK
1C0A AF                   CLA                         / A <- 0
1C0B BA                   CMP     D                   / CHECK FOR INTERNAL COIL
1C0C C22C1C               JNZ     KF1820              / BRANCH ON IT
1C0F 0602                 MVI     B,OUTSTA            / B <- MASK
1C11 7E                   MOV     A,M                 / A <- REFERENCE TYPE
1C12 FE30                 CPI     ASC0                / CHECK FOR COIL
1C14 CA2C1C               JZ      KF1820              / BRANCH ON IT
1C17 0604                 MVI     B,INPSTA            / B <- MASK
1C19 E5                   PUSH    H                   / SAVE POINTER
1C1A 114E00               LXI     D,ROWD+1            / [D,E] <- OFFSET
1C1D 19                   DAD     D                   / BUMP TO DISABLE AREA
1C1E 3AABFE               LDA     RSPBUF+3            / A <- STATE
1C21 E608                 ANI     INPDIS              / ISOLATE DISABLE FLAG
1C23 D1                   POP     D                   / [D,E] <- POINTER
1C24 3620                 MVI     M,ASCBLK            / ASSUME ENABLED
1C26 CA2B1C               JZ      KF1816              / BRANCH IF ENABLED
1C29 3644                 MVI     M,ASCD              / ELSE, INDICATE DISABLED
                /
1C2B EB         KF1816,   XCHG                        / SWAP POINTERS BACK
                /
1C2C 3AABFE     KF1820,   LDA     RSPBUF+3            / A <- STATE BYTE
1C2F A0                   ANA     B                   / ISOLATE DISCRETE STATE
1C30 114F00               LXI     D,ROWD+2            / D <- OFFSET
1C33 19                   DAD     D                   / MOVE POINTER
1C34 117E1C               LXI     D,KF18M1            / [D,E] <- 'OFF' MESSAGE
1C37 C23D1C               JNZ     KF1825              / BRANCH ON OFF
1C3A 11821C               LXI     D,KF18M2            / [D,E] <- 'ON' MESSAGE
                /
1C3D CD0301     KF1825,   CALL    MOVSTR              / DISPLAY STATE
1C40 C36C1C               JMP     KF1899              / GO TO COMMON EXIT
                          EJECT

                /
                /***REGISTER REFERENCES
                /
1C43 1C         KF1830,   INR     E                   / HOLDING REGISTER
1C44 1C                   INR     E                   / STEP TO BASE ADDRESS
1C45 1640                 MVI     D,REGFLD            / SET TO FIELD TYPE
1C47 C3511C               JMP     KF1840              / GO TO COMMON CODE
                /
1C4A 7D         KF1835,   MOV     A,L                 / A <- INPUT REG - 1
1C4B 85                   ADD     L                   / DOUBLE IT
1C4C C6C0                 ADI     INPBAS              / ADD IN BASE ADDR
1C4E 6F                   MOV     L,A                 / L <- SPD ADDRESS
1C4F 2660                 MVI     H,SPDFLD            / SET FIELD TYPE
                /
1C51 2193FE     KF1840,   LXI     H,CMDBUF+3          / [H,L] <- POINTER
1C54 EF                   MOVDE                       / LOAD ADDRESS
                /
1C55 110611               LXI     D,CMDRED+CMD02!:100+LENRED / SET PARMS
1C58 CD8125               CALL    PIO                 / DO READ
1C5B E1                   POP     H                   / CLEAN STACK
1C5C C2781C               JNZ     KF18X               / EXIT ON ERROR
                /
```

```
1C5F 114D00          LXI    D,ROWD        / [D,E] <- OFFSET
1C62 19              DAD    D             / [H,L] <- DESTINATION
1C63 EB              XCHG                 / SWAP
1C64 13              INX    D             / INCREMENT BINARY VALUE
1C65 21ABFE          LXI    H,RSPBUF+3    / SET POINTER TO VALUE
1C68 E7              GETHL                / [H,L] <- BINARY REGISTER
ALUE
1C69 CDC201          CALL   BNBCD4        / CONVERT AND DISPLAY
                     /
1C6C 2181FE  KF1899, LXI    H,DISPTR      / [H,L] <- POINTER
1C6F 34              INR    M             / BUMP POINTER
1C70 7E              MOV    A,M           / A <- POINTER
1C71 FE0C            CPI    MAXCOL+1      / CHECK FOR WRAP-AROUND
1C73 C2781C          JNZ    KF18X         / BRANCH IF NOT
                     /
1C76 3606            MVI    M,ASMCOL      / RESET POINTER
                     /
1C78 3E01    KF18X,  MVI    A,DISTMR      / A <- TIMER RESET
1C7A 3294FD          STA    TMRDIS        / REINIT TIMER
1C7D C9              RET                  / EXIT
                     EJECT
                     /
                     /***MESSAGES
                     /
1C7E 03      KF18M1, DB     K18M1X
1C7F 204F4E          DA     ' ON'
     0003    K18M1X= .-KF18M1-1
                     /
1C82 03      KF18M2, DB     K18M2X
1C83 4F4646          DA     'OFF'
     0003    K18M2X= .-KF18M2-1
                     EJECT

                     SUBJOB  KEY FUNCTION : KF19 : SUPERVISORY STATE
                     /
                     /***KEY FUNCTION : KF19 : SUPERVISORY STATE
                     /
                     /***ENTRY POINTS:
                     /
                     /      KF19   - SET SUPERVISORY STATE
                     /      KF1920 - EXECUTE SUPERVISORY COMMAND
                     /
                     /***NOTE:
                     /
                     /      SUPERVISORY STATE CREATES ITS OWN DISPLAY.
                     /      WHEN IN SUPERVISORY STATE (KSUPER.EQ.1)
                     /      ALL KEYS, EXCEPT RESET ARE PROCESSED HERE.
                     /
1C86 CD281F  KF19,   CALL   KU01          / CHECK FOR RESET
1C89 CD491F          CALL   KU02          / CHECK FOR SHIFT
1C8C CA951C          JZ     KF1905        / BRANCH ON NO SHIFT
1C8F CD791F          CALL   KU05          / SET ERROR STATE
1C92 C3131D          JMP    KF19X         / EXIT
                     /
1C95 CD0002  KF1905, CALL   SPLINI        / CLEAR SPOOLER
1C98 AF              CLA                  / A <- 0
1C99 3294FD          STA    TMRDIS        / STOP DISCRETE UPDATES
1C9C 3292FD          STA    TMRPWR        / STOP POWER DISPLAY
1C9F 3291FD          STA    TMRLED        / STOP LED DISPLAY
                     /
1CA2 CD8A1F          CALL   KU06          / CLEAR SCREEN
1CA5 3E2F            MVI    A,KEYSUP      / A <- SUPERVISORY KEY
1CA7 3283FE          STA    LASTKY        / INDICATE LAST KEYSTOKE
1CAA 3282FE          STA    NEWKEY        / AND CURRENT KEYSTROKE
                     /
1CAD 3E02            MVI    A,KSUPER      / A <- SUPERVISORY STATE
1CAF 327CFE          STA    KSTATE        / SET STATE
                     /
1CB2 CD0B23          CALL   KU12          / B <- CURSOR
1CB5 3680            MVI    M,DMAFAN      / CLEAR DISPLAY CURSOR TOP
1CB7 19              DAD    D             / BUMP TO NEXT ROW
1CB8 3680            MVI    M,DMAFAN      / CLEAR DISPLAY CURSOR B T
                     /
1CBA 21B1FC          LXI    H,DSPASM      / [H,L] <- POINTER
```

```
1CBD CD2903            CALL    ROWST1          / INIT ASM/REF ROW 1
1CC0 CD4003            CALL    ROWST2          / INIT ASM/REF ROW 2
                /
1CC3 117127            LXI     D,MSGSUP        / [D,E] <- MSG ADDR
1CC6 CD681F            CALL    KU04            / DIPLAY ADVISORY
                /
1CC9 21ABF8            LXI     H,L2C01U        / [H,L] <- POINTER
1CCC 117F1D            LXI     D,DSPSUP        / [D,E] <- POINTER
1CCF 3E07              MVI     A,SUPOPT        / A <- COUNT
                /
1CD1 F5         KF1910, PUSH   PSW             / STACK COUNT
1CD2 E5                PUSH    H               / STACK POINTER
1CD3 CD0301            CALL    MOVSTR          / DISPLAY LINE
1CD6 E1                POP     H               / POP POINTER
1CD7 F1                POP     PSW             / POP COUNT
1CD8 015000            LXI     B,ROWB          / [B,C] <- OFFSET
1CDB 09                DAD     B.              / BUMP TO NEXT LINE
1CDC 3D                DCR     A               / DECREMENT COUNTER
1CDD C2D11C            JNZ     KF1910          / LOOP UNTIL DONE
                /
1CE0 C3131D            JMP     KF19X           / GO TO EXIT
                       EJECT

                /
                /***SUPERVISORY KEY HANDLER
                /
1CE3 21FE1C     KF1920, LXI    H,KF19TB        / [H,L] <- POINTER
1CE6 0607              MVI     B,SUPOPT        / B <- COUNTER
                /
1CE8 BE         KF1925, CMP    M               / CHECK FOR MATCH
1CE9 CAFC1C            JZ      KF1930          / BRANCH ON MATCH
1CEC 23                INX     H               / STEP OVER KEY
1CED 23                INX     H               / STEP OVER ADDRLO
1CEE 23                INX     H               / STEP OVER ADDRHI
1CEF 05                DCR     B               / DECREMENT COUNT
1CF0 C2E81C            JNZ     KF1925          / LOOP UNTIL DONE
                /
1CF3 11411B            LXI     D,KF14M1        / [D,E] <- MESSAGE ADDR
1CF6 CD7E05            CALL    ERROR           / SET ERROR STATE
1CF9 C3131D            JMP     KF19X           / EXIT
                /
1CFC 23         KF1930, INX    H               / BUMP TO ADDRLO
1CFD DF                DSPTAB                  / DISPATCH
                       EJECT

                /
                /***KEY TABLE
                /
1CFE 11         KF19TB, DB     KEY0            / EXIT
1CFF 141D              DW      K19000
1D01 0B                DB      KEY1            / STOP
1D02 151D              DW      K19100
1D04 12                DB      KEY2            / START
1D05 311D              DW      K19200
1D07 19                DB      KEY3            / INITIALIZE
1D08 4D1D              DW      K19300
1D0A 0D                DB      KEY4            / LOAD
1D0B C929              DW      LOAD
1D0D 14                DB      KEY5            / DUMP
1D0E 1028              DW      DUMP
1D10 1B                DB      KEY6            / VERIFY
1D11 542A              DW      VERIFY
                /
                /***COMMON EXIT
                /
1D13 C9         KF19X, RET                     / EXIT
                       EJECT

\ HERE TO PROCESS THE SUPERVISORY KEYS
                /
1D14 C7         K19000, RST    0               / RESTART SYSTEM
                /
                /***STOP
                /
```

```
1D15 110480    K19100, LXI     D,CMDSTP!:100+LENSTP     / SET PARMS
1D18 CD8125            CALL    PIO                  / STOP CONTROLLER
1D1B C0                RNZ                          / ERROR, EXIT NOW
               /       NOW READ SYSTEM STATE TO BE SURE!
1D1C CD5B2C            CALL    DELHLF  / WAIT .5 SEC
1D1F CD641D            CALL    RDSYS   / GET IT
1D22 C0                RNZ             /   I/O EROR, QUIT
1D23 E610              ANI     SYSSTP  / ARE WE STOPPED?
1D25 CA5D1D            JZ      K19NG   /   NO! FAILURE
               /       DISPLAY MSG "STOP OK" ON ADVISORY
1D28 11D61D            LXI     D,K191MS             / GET PTR
1D2B CD681F            CALL    KU04                 / DO IT
1D2E C3131D            JMP     KF19X                / EXIT
               /
               /***START
               /
1D31 110490    K19200, LXI     D,CMDGO!:100+LENGO       / SET PARMS
1D34 CD8125            CALL    PIO                  / GO COMMAND
1D37 C0                RNZ                          / ERROR, EXIT NOW
               /       NOW READ SYSTEM STATE TO BE SURE!
1D38 CD5B2C            CALL    DELHLF  / WAIT .5 SEC
1D3B CD641D            CALL    RDSYS   / GET IT!
1D3E C0                RNZ             /   I/O ERROR, QUIT
1D3F E680              ANI     SYSRUN  / ARE WE RUNNING?
                                       / (GO OUT AND CATCH IT!)
1D41 CA5D1D            JZ      K19NG   /   NO, FAILURE
               /       DISPLAY "START OK"
1D44 11DE1D            LXI     D,K192MS             / GET PTR TO MSG
1D47 CD681F            CALL    KU04                 / DISPLAY IT
1D4A C3131D            JMP     KF19X                / EXIT
                       EJECT
               /
               /***INITIALIZE
               /
1D4D 1104A0    K19300, LXI     D,CMDINI!:100+LENINI     / SET PARMS
1D50 CD8125            CALL    PIO                  / INITIALIZE
1D53 C0                RNZ                          / ERROR, EXIT NOW
               /       DISPLAY MSG "INIT OK"
1D54 11E71D            LXI     D,K193MS             / PTR TO MSG
1D57 CD681F            CALL    KU04                 / DISPLAY IT
1D5A C3131D            JMP     KF19X                / EXIT
               /       HERE WHEN START OR STOP FAILED!
               K19NG,
1D5D 11EF1D            LXI     D,K194MS/ GET PTR
1D60 CD7E05            CALL    ERROR   / DISPLAY IT
1D63 C9                RET             / EXIT
                       EJECT

               SUBJOB RDSYS = READ SYSTEM STATE BYTE
               / RDSYS IS A SUBR TO READ THE SYS STATE BYTE
               /
               / *ENTRY
               /       A MUST BE FREE
               /
               /       CALL    RDSYS
               /
               / *EXIT
               /       A = BYTE IF GOOD READ,
```

```
                      /        Z-BIT RESET IF BAD I/O; SET IF OK
                      /
                      RDSYS,
1D64 C5                        PUSH    B         / SAVE MAJOR
1D65 D5                        PUSH    D         / X
1D66 E5                        PUSH    H         / X

1D67 2193FE                    LXI     H;CMDBUF+3 / PTR TO I/O BUFF
1D6A 11BD60                    LXI     D;ADRSYS   / CONTROLER ADDR OF SYS STATE
1D6D EF                        MOVDE              / STORE IN BUFF

1D6E 110611                    LXI     D;CMDRED+CMD02!.100+LENRED
1D71 CD8125                    CALL    PIO      / READ IT!
1D74 C27B1D                    JNZ     RDSYSX   /   BAD, EXIT

1D77 AF                        CLA               /   GOOD! SET Z-BIT
1D78 3AABFE                    LDA     RSPBUF+3/ GET SYS STATE BYTE

                      RDSYSX,
1D7B E1                        POP     H         / RESTORE AND EXIT
1D7C D1                        POP     D         / X
1D7D C1                        POP     B         / X
1D7E C9                        RET               / X
                               EJECT

     1D7F             DSPSUP= .
1D7F 0A80             DSPST0,  DB      DSPS0X;DMAFAN
1D81 30202D20                  DA      '0 - EX'
1D85 4558
1D87 80                        DB      DMAFAN
1D88 4954                      DA      'IT'
     000A             DSPS0X= .-DSPST0-1
                      /
1D8A 0A80             DSPST1,  DB      DSPS1X;DMAFAN
1D8C 31202D20                  DA      '1 - ST'
1D90 5354
1D92 80                        DB      DMAFAN
1D93 4F50                      DA      'OP'
     000A             DSPS1X= .-DSPST1-1
                      /
1D95 0B80             DSPST2,  DB      DSPS2X;DMAFAN
1D97 32202D20                  DA      '2 - ST'
1D9B 5354
1D9D 80                        DB      DMAFAN
1D9E 415254                    DA      'ART'
     000B             DSPS2X= .-DSPST2-1
                      /
1DA1 1180             DSPST3,  DB      DSPS3X;DMAFAN
1DA3 33202D20                  DA      '3 - IN'
1DA7 494E
1DA9 80                        DB      DMAFAN
1DAA 49544941                  DA      'ITIALI'
1DAE 4C49
1DB0 80                        DB      DMAFAN
1DB1 5A45                      DA      'ZE'
     0011             DSPS3X= .-DSPST3-1
                      /
1DB3 0A80             DSPST4,  DB      DSPS4X;DMAFAN
1DB5 34202D20                  DA      '4 - LO'
1DB9 4C4F
1DBB 80                        DB      DMAFAN
1DBC 4144                      DA      'AD'
     000A             DSPS4X= .-DSPST4-1
                      /
1DBE 0A80             DSPST5,  DB      DSPS5X;DMAFAN
1DC0 35202D20                  DA      '5 - DU'
1DC4 4455
1DC6 80                        DB      DMAFAN
1DC7 4D50                      DA      'MP'
     000A             DSPS5X= .-DSPST5-1
                      /
1DC9 0C80             DSPST6,  DB      DSPS6X;DMAFAN
1DCB 36202D20                  DA      '6 - VE'
1DCF 5645
```

```
1DD1 80               DB      DMAFAN
1DD2 52494659         DA      'RIFY'.
     000C     DSPS6X= .-DSPST6-1
              /
     0007     SUPOPT= 7                          / NUMBER OF COMMANDS


              /       SUPERVISORY MSGS

              K191MS,
1DD6 07               DB      K191ME  / LENGTH
1DD7 53544F50         DA      'STOP OK'
1DDB 204F4B
     0007     K191ME=.-K191MS-1

              K192MS,
1DDE 08               DB      K192ME
1DDF 53544152         DA      'START OK'
1DE3 54204F4B
     0008     K192ME=.-K192MS-1

              K193MS,
1DE7 07               DB      K193ME
1DE8 494E4954         DA      'INIT OK'
1DEC 204F4B
     0007     K193ME=.-K193MS-1

              K194MS,
1DEF 0A               DB      K194ME
1DF0 46434E20         DA      'FCN FAILED'
1DF4 4641494C
1DF8 4544
     000A     K194ME=.-K194MS-1
                      EJECT
                      SUBJOB  KEY FUNCTION : KF20 : POWER DISPLAY
              /
              /       THIS ROUTINE IS ACTIVATED BY THE
              /       SPOOLER FROM THE CLOCK INTERRUPT ROUTINE
              /
              /***KEY FUNCTION : KF20 : POWER DISPLAY
              /
1DFA 3A7CFE   KF20,   LDA     KSTATE           / A <- STATE VECTOR
1DFD E608             ANI     KNET             / NETWORK ACTIVE?
1DFF CA9A1E           JZ      KF20X            / NO, EXIT
              /
1E02 218AFE           LXI     H,STPNUM         / [H,L] <- SOURCE
1E05 E7               GETHL                    / [H,L] <- SEQUENCE NUMB R
1E06 EB               XCHG                     / SWAP
1E07 2193FE           LXI     H,CMDBUF+3       / [H,L] <- DESTINATION
1E0A EF               MOVDE                    / LOAD BUFFER
              /
1E0B 110640           LXI     D,CMDPWR!:100+LENPWR    / SET PARMS
1E0E CD8125           CALL    PIO              / GET POWER DATA
1E11 C29A1E           JNZ     KF20X            / EXIT ON ERROR
              /
1E14 210FF8           LXI     H,L1C01U+4       / [H,L] <- DISPLAY POINT R
1E17 11ABFE           LXI     D,RSPBUF+3       / [D,E] <- POWER DATA POINT
R
1E1A 3E01             MVI     A,1              /   A   <- COLUMN INDICA OR
              /
1E1C E5       KF2005, PUSH    H                / STACK DISPLAY POINTER
1E1D D5               PUSH    D                / STACK POWER POINTER
1E1E F5               PUSH    PSW              / STACK COLUMN COUNTER
              /
1E1F 1A               LDAX    D                / A <- POWER BYTE FOR CO
1E20 57               MOV     D,A              / D <- POWER BYTE
1E21 0602             MVI     B,2              / B <- COUNTER
1E23 CDA01E           CALL    K20SUB           / HIGHLIGHT BEFORE VERTS
              /
1E26 F1               POP     PSW              / GET COLUMN COUNT
1E27 F5               PUSH    PSW              / RESTACK IT
1E28 FE0B             CPI     MAXCOL           / CHECK IF DONE
1E2A CA8C1E           JZ      KF2040           / BRANCH WHEN DONE
1E2D 21E7FD           LXI     H,COLTAB-COLBKL / [H,L] <- TABLE POINTER
```

```
1E30 110600          LXI    D;COLBKL       / [D,E] <- ENTRY LENGTH
                 /
1E33 19     KF2010,  DAD    D              / BUMP POINTER
1E34 3D              DCR    A              / DECREMENT COUNT
1E35 C2331E          JNZ    KF2010         / LOOP UNTIL DONE
                 /
1E38 110500          LXI    D;EOCLO        / [D,E] <- OFFSET
1E3B 19              DAD    D              / SET POINTER TO EOC
1E3C AF              CLA                   / A <- 0
1E3D BE              CMP    M              / ANY VERTICALS?
1E3E CA7D1E          JZ     KF2035         / NO, CONTINUE
                     EJECT

                 /
                 /***SOLVE VERTICAL CONNECTIVITY
                 /
1E41 4E              MOV    C;M            / C <- CONNECTIVITY BYTE.
1E42 210200          LXI    H;2            / [H,L] <- OFFSET
1E45 39              DAD    SP             / [H,L] <- ADDR OF POINTER
1E46 7E              MOV    A;M            / A <- DATALO
1E47 23              INX    H              / BUMP POINTER
1E48 66              MOV    H;M            / H <- DATAHI
1E49 6F              MOV    L;A            / L <- DATALO
1E4A 56              MOV    D;M            / D <- POWER BYTE
1E4B AF              CLA                   / A <- 0
1E4C BA              CMP    D              / CHECK FOR ANY POWER
1E4D CA7D1E          JZ     KF2035         / NO POWER => NO WORK
1E50 0601            MVI    B;:01          / B <- MASK BIT
                 /
1E52 79     KF2020,  MOV    A;C            / A <- CONNECTIVITY DATA
1E53 A0              ANA    B              / LOOK FOR VERTICAL
1E54 CA6C1E          JZ     KF2030         / BRANCH IF NO VERT
1E57 1E00            MVI    E;0            / CLEAR NEW MASK
                 /
1E59 B3     KF2025,  ORA    E              / SET BITS
1E5A 5F              MOV    E;A            / SAVE MASK
1E5B 78              MOV    A;B            / A <- ROTATING MASK
1E5C 07              RLC                   / SHIFT IT LEFT
1E5D 47              MOV    B;A            / AND SAVE IT
1E5E A1              ANA    C              / LOOK FOR CONTINUED VER
1E5F C2591E          JNZ    KF2025         / LOOP UNTIL END
                 /
1E62 78              MOV    A;B            / A <- ROTATING MASK
1E63 B3              ORA    E              / A <- POWER MASK
1E64 5F              MOV    E;A            / SAVE IT
1E65 A2              ANA    D              / LOOK FOR ANY POWER
1E66 CA6C1E          JZ     KF2030         / NO POWER, CONTINUE
                 /
1E69 7A              MOV    A;D            / A <- POWER BYTE
1E6A B3              ORA    E              / PASS POWER ON VERTS
1E6B 57              MOV    D;A            / UPDATE POWER BYTE
                 /
1E6C 78     KF2030,  MOV    A;B            / A <- ROTATING MASK
1E6D FE80            CPI    :80            / DONE?
1E6F 07              RLC                   / ROTATE MASK
1E70 47              MOV    B;A            / UPDATE IT
1E71 C2521E          JNZ    KF2020         / LOOP UNTIL DONE
                 /
1E74 210200          LXI    H;2            / [H,L] <- OFFSET
1E77 39              DAD    SP             / [H,L] <- ADDR OF PTR
1E78 7E              MOV    A;M            / A <- DATALO
1E79 23              INX    H              / BUMP POINTER
1E7A 66              MOV    H;M            / H <- DATAHI
1E7B 6F              MOV    L;A            / L <- DATALO
1E7C 72              MOV    M;D            / LOAD IN BUFFER
                 /
                     EJECT

                 /
                 /***DISPLAY POWER AFTER VERTICALS
                 /
1E7D F1     KF2035,  POP    PSW            / GET DATA FROM STACK
1E7E D1              POP    D              / POWER POINTER
1E7F E1              POP    H              / DISPLAY POINTER
1E80 E5              PUSH   H              / RESTACK DATA
```

```
1E81 D5                PUSH    D                    / TO SAVE
1E82 F5                PUSH    PSW                  / FOR FUTURE USE
                /
1E83 1A                LDAX    D                    / A <- POWER BYTE
1E84 57                MOV     D,A                  / D <- POWER BYTE
1E85 23                INX     H                    / MOVE POINTER
1E86 23                INX     H                    / TO VERTICAL AREA
1E87 0605              MVI     B,DSPNOD-2           / B <- COUNTER
1E89 CDA01E            CALL    K20SUB               / DO POWER
                /
1E8C F1         KF2040, POP    PSW                  / GET COLUMN COUNTER
1E8D D1                POP     D                    / GET POWER POINTER
1E8E E1                POP     H                    / GET DISPLAY POINTER
                /
1E8F 13                INX     D                    / BUMP TO NEXT POWER BYTE
1E90 3C                INR     A                    / BUMP TO NEXT COLUMN
1E91 010700            LXI     B,DSPNOD             / [B,C] <- OFFSET
1E94 09                DAD     B                    / BUMP TO NEXT COLUMN
1E95 FE0C              CPI     MAXCOL+1             / CHECK IF DONE
1E97 FA1C1E            JM      KF2005               / LOOP UNTIL DONE
                /
1E9A 3E02       KF20X, MVI     A,PWRTMR             / A <- TIMER VALUE
1E9C 3292FD            STA     TMRPWR               / LOAD TIMER
1E9F C9                RET                          / EXIT
                       EJECT

                /
                /***SUBROUTINE TO HIGHLIGHT POWER
                /
1EA0 0E0E       K20SUB, MVI    C,MAXROW+MAXROW      / C <- COUNTER
                /
1EA2 7A         K20S05, MOV    A,D                  / A <- POWER BYTE
1EA3 07                RLC                          / SHIFT LEFT TO LSB
1EA4 57                MOV     D,A                  / AND SAVE IT
                /
1EA5 C5         K20S10, PUSH   B                    / SAVE POINTERS
                /
1EA6 CDC71E     K20S15, CALL   K20SSR               / DO NEXT CHARACTER
1EA9 23                INX     H                    / BUMP POINTER
1EAA 05                DCR     B                    / DECREMENT COUNTER
1EAB C2A61E            JNZ     K20S15               / LOOP UNTIL DONE
                /
1EAE 015000            LXI     B,ROWB               / [B,C] <- OFFSET
1EB1 09                DAD     B                    / BUMP TO NEXT LINE
1EB2 C1                POP     B                    / GET COUNTERS
1EB3 58                MOV     E,B                  / E <- FIELD LENGTH
                /
1EB4 2B         K20S20, DCX    H                    / MOVE POINTER
1EB5 1D                DCR     E                    / DECREMENT COUNT
1EB6 C2B41E            JNZ     K20S20               / LOOP UNTIL DONE
                /
1EB9 0D                DCR     C                    / DECREMENT COUNTER
1EBA CAC61E            JZ      K20SX                / EXIT ON ERROR
1EBD 79                MOV     A,C                  / A <- COUNT REMAINING
1EBE E601              ANI     :01                  / ISOLATE LSB
1EC0 C2A51E            JNZ     K20S10               / BRANCH IF ODD
1EC3 C3A21E            JMP     K20S05               / ELSE, ROTATE POWER
                /
1EC6 C9         K20SX, RET                          / EXIT
                       EJECT

                /
                /***HIGHLIGHT CHARACTER ROUTINE
                /
1EC7 7E         K20SSR, MOV    A,M                  / A <- CHARACTER
1EC8 FE60              CPI     ASCLRE               / DO RANGE CHECK
1ECA DAE01E            JC      K20SSX               / BRANCH OUT-OF-RANGE
1ECD FE7F              CPI     FACNOR-1             / DO RANGE CHECK
1ECF DAD71E            JC      K20SS1               / BRANCH IN RANGE
1ED2 FEC0              CPI     CA0101               / DO RANGE CHECK
1ED4 DAE01E            JC      K20SSX               / BRANCH OUT-OF-RANGE
                /
1ED7 7A         K20SS1, MOV    A,D                  / A <- POWER BYTE
1ED8 E601              ANI     CATHI                / ISOLATE LSB
1EDA 5F                MOV     E,A                  / E <- POWER STATE
```

```
1EDB 7E                MOV     A,M.                 / A <- CHARACTER
1EDC E6FE              ANI     -1-CATHI             / TURN OFF HIGHLIGHT
1EDE B3                ORA     E                    / TURN OFF/ON HIGHLIGHT
1EDF 77                MOV     M,A                  / LOAD IN DISPLAY
                /
1EE0 C9         K20SSX, RET                         / EXIT
                       EJECT

                       SUBJOB  KEY FUNCTION : KF21 : LED DISPLAY
                /
                /***KEY FUNCTION : KF21 : LED DISPLAY
                /
1EE1 CD0423     KF21,  CALL    KU11                 / A <- ROW
1EE4 FE08              CPI     ASMROW%:10           / ASSEMBLY AREA?
1EE6 CA221F            JZ      KF21X                / YES, EXIT
                /
1EE9 47                MOV,    B,A                  / B <- COUNTER
1EEA 110800            LXI     D,ROWBKL             / [D,E] <- OFFSET
1EED 21ADFD            LXI     H,ROWTAB-ROWBKL / [H,L] <- START OF TABLE
                /
1EF0 19         KF2120, DAD    D                    / BUMP POINTER
1EF1 3D                DCR     A                    / DECREMENT COUNTER
1EF2 C2F01E            JNZ     KF2120               / LOOP UNTIL DONE
                /
1EF5 11F8FF     KF2130, LXI    D,-ROWBKL            / [D,E] <- -OFFSET
1EF8 0E00              MVI     C,0                  / C<- 0
                /
1EFA 7E         KF2140, MOV    A,M                  / A <- ROW FLAG
1EFB E680              ANI     ROWFSN               / CHECK FOR START FLAG
1EFD C20B1F            JNZ     KF2150               / BRANCH ON IT
1F00 19                DAD     D                    / MOVE POINTER
1F01 0D                DCR     C                    / DECREMENT COUNT
1F02 05                DCR     B                    / DECREMENT COUNT
1F03 C2FA1E            JNZ     KF2140               / LOOP IF NOT DONE
1F06 AF                XRA     A                    / Z-BIT <- 1
1F07 3C                INR     A                    / Z-BIT <- 0
1F08 C3221F            JMP     KF21X                / GO TO EXIT
                       EJECT
                /
1F0B 3E07       KF2150, MVI    A,MAXROW             / A <- MAXROW
1F0D 81                ADD     C                    / A <- TRUE ROW IN NETWO K
1F0E 87                SAL                          / ROTATE A
1F0F 87                SAL                          / TO FORM
1F10 87                SAL                          / FIRST BYTE
1F11 87                SAL                          / OF ARGUMENT
1F12 4F                MOV     C,A                  / C <- ROW
1F13 3A7EFE            LDA     CURACT               / A <- CURSOR
1F16 E60F              ANI     COLMSK               / ISOLATE COLUMN
1F18 81                ADD     C                    / A <- ROW/COL
1F19 3293FE            STA     CMDBUF+3             / STORE IT
                /
1F1C 110570            LXI     D,CMDLED!:100+LENLED    / SET PARMS
1F1F CD8125            CALL    PIO                  / ISSUE COMMAND
                /
1F22 3E1E       KF21X, MVI     A,LEDTMR             / A<- LED TIMER PRESET
1F24 3291FD            STA     TMRLED               / STORE TI
                /
1F27 C9                RET                          / EXIT
                       EJECT

                       SUBJOB  KEY UTILITIES
                /
                /***KEY UTILITIES:
                /
                /      KU01 - RESET/SUPERVISORY STATE TEST
                /      KU02 - SHIFT TEST
                /      KU03 - CLEAR SHIFT
                /      KU04 - ADVISORY MESSAGE
                /      KU05 - ILLEGAL SHIFT
                /      KU06 - RESET DISPLAY AND LOGIC DATA
                /      KU07 - VALIDATE REFERENCE NUMBER
                /      KU08 - INCREMENT/DECREMENT SEQUENCE NUMBER
                /      KU09 - INSERT NODE IN NETWORK
                /      KU10 -
                /      KU11 - A <- ROW
```

```
                    /         KU12 - COMPUTE CURSOR POINTERS
                    /         KU13 - DISPLAY NODE TYPE
                    /         KU14 - DISPLAY TOP LINE - MULTINODE CONTACT
                    /         KU15 - CHECK FOR MULTI-NODE CONTACT
                    /         KU16 - DISPLAY POWER RAIL
                    /         KU17 - COMPUTE MATRIX ADDRESS
                    /         KU18 - INCREMENT/DECREMENT MEMORY USAGE
                    /         KU19 - EXTEND POWER FROM RAIL
                    /         KU20 - CONNECT VERTICALS
                    /         KU21 - LOAD TIMERS
                    /         KU22 - COMPUTE COLTAB POINTER
                    /         FIXVER - FIX LAST VERTICAL CHAR
                    /
                              EJECT

                              SUBJOB  KEY UTILITY : KU01 : RESET/SUPER TEST
                    /
                    /***KEY UTILITY . KU01 : RESET/SUPERVISORY TEST
                    /
                    /***EXITS:
                    /
                    /         TO CALLER IF NO RESET AND NO SUPERVISORY
                    /         TO EXEC IF RESET
                    /         TO SUPERVISORY IF NO RESET AND SUPER
                    /
1F28 F5             KU01,     PUSH    PSW              / STACK CHARACTER
1F29 3A7CFE                   LDA     KSTATE           / A <- STATE VECTOR
1F2C E602                     ANI     KSUPER           / TEST FOR SUPERVISORY
1F2E CA3E1F                   JZ      KU0105           / BRANCH IF NOT SUPERVISORY
                    /
1F31 3A7CFE                   LDA     KSTATE           / TEST FOR RESET
1F34 E620                     ANI     KRESET           / ISOLATE FLAG
1F36 C2461F                   JNZ     KU0110           / BRANCH ON RESET
1F39 F1                       POP     PSW              / RESTORE CHARACTER
1F3A C1                       POP     B                / CLEAR EXIT
1F3B C3E31C                   JMP     KF1920           / GO TO SUPERVIOSRY STAT
                    /
1F3E 3A7CFE         KU0105,   LDA     KSTATE           / A <- STATE VECTOR
1F41 E620                     ANI     KRESET           / ISOLATE RESET FLAG
1F43 CA471F                   JZ      KU0115           / BRANCH IF NOT
                    /
1F46 F1             KU0110,   POP     PSW              / CLEAR CHARACTER
                    /
1F47 F1             KU0115,   POP     PSW              / CLEAR STACK
1F48 C9                       RET                      / EXIT
                              EJECT

                              SUBJOB  KEY UTILITY : KU02 : TEST FOR SHIFT
                    /
                    /***KEY UTILITY : KU02 : TEST FOR SHIFT
                    /
                    /***ON EXIT:
                    /
                    /         Z-BIT.EQ.1 => CLEAR
                    /         Z-BIT.EQ.0 => SET
                    /
1F49 C5             KU02,     PUSH    B                / SAVE [B,C]
1F4A 47                       MOV     B,A.             / SAVE A
1F4B 3A7CFE                   LDA     KSTATE           / A <- STATE VECTOR
1F4E E680                     ANI     KSHIFT           / TEST FOR SHIFT FLAG
1F50 78                       MOV     A,B              / RESTORE A
1F51 C1                       POP     B                / RESTORE [B,C]
1F52 C9                       RET                      / EXIT
                              EJECT

                              SUBJOB  KEY UTILITY : KU03 : CLEAR SHIFT
                    /
                    /***KEY UTILITY : KU03 : CLEAR SHIFT
                    /
                    /***PRESERVES ALL REGISTERS
                    /
1F53 F5             KU03,     PUSH    PSW              / SAVE A
1F54 3A7CFE                   LDA     KSTATE           / A <- STATE VECTOR
1F57 E67F                     ANI     -1-KSHIFT        / CLEAR SHIFT FLAG
1F59 327CFE                   STA     KSTATE           / STORE NEW STATE VECTOR
                    /
```

```
1F5C 3E20               MVI    A,ASCBLK         / A <- BLANK
1F5E 3209FD             STA    DSPSHT+1         / CLEAR SHIFT FIELD
                 /
1F61 3E80               MVI    A,FACNOR         / A <- NORMAL FIELD ATTR B
1F63 3208FD             STA    DSPSHT           / CLEAR FIELD
                 /
1F66 F1                 POP    PSW              / RESTORE A
1F67 C9                 RET                     / EXIT
                        EJECT

                        SUBJOB  KEY UTILITY : KU04 : ADVISORY MESSAGE
                 /
                 /***KEY UTILITY : KU04 : ADVISORY MESSAGE
                 /
                 /***REGISTER USAGE:
                 /
                 /      A     - SCRATCH
                 /      [B,C] - SCRATCH
                 /      [D,E] - MESSAGE ADDRESS (DESTROYED)
                 /      [H,L] - SCRATCH
                 /
1F68 D5          KU04,  PUSH   D                / SAVE MESSAGE ADDRESS
1F69 210AFD             LXI    H,DSPADV         / [H,L] <- START OF FIELD
1F6C 160A               MVI    D,ADVFLD-1       / D <- FIELD LENGTH
1F6E CD1903             CALL   ROWN10           / CLEAR FIELD
1F71 D1                 POP    D                / RESTORE MESSAGE ADDRESS
1F72 210BFD             LXI    H,DSPADV+1       / [H,L] <- DESTINATION
1F75 CD0301             CALL   MOVSTR           / LOAD FIELD
1F78 C9                 RET                     / EXIT
                        EJECT

                        SUBJOB  KEY UTILITY : KU05 : ILLEGAL SHIFT
                 /
                 /***KEY UTILITY : KU05 : ILLEGAL SHIFT
                 /
1F79 11801F      KU05,  LXI    D,KU05MS         / [D,E] <- MESSAGE ADDR
1F7C CD7E05             CALL   ERROR            / SET ERROR STATE
1F7F C9                 RET                     / EXIT
                 /
                 /***MESSAGE
                 /
1F80 09          KU05MS, DB    KU05MX
1F81 42414420           DA     'BAD SHIFT'
1F85 53484946
1F89 54
     0009        KU05MX= .-KU05MS-1             / MESSAGE LENGTH
                        EJECT

                        SUBJOB  KEY UTILITY : KU06 : RESET DISPLAY/LOGIC
                 /
                 /***KEY UTILITY : KU06 : RESET DISPLAY AND LOGIC
                 /
                 /***USES ALL REGISTERS
                 /
1F8A 21B5FD      KU06,  LXI    H,ROWTAB         / [H,L] <- TABLE ADDRESS
1F8D 0638               MVI    B,ROWTBL         / B <- TABLE LENGTH
1F8F AF                 CLA                     / A <- 0
                 /
1F90 77          KU0610, MOV   M,A              / CLEAR ENTRY
1F91 23                 INX    H                / BUMP POINTER
1F92 05                 DCR    B                / DECREMENT COUNTER
1F93 C2901F             JNZ    KU0610           / LOOP UNTIL DONE
                 /
1F96 21EDFD             LXI    H,COLTAB         / [H,L] <- TABLE ADDRESS
1F99 0642               MVI    B,COLTBL         / B <- TABLE LENGTH
                 /
1F9B 77          KU0620, MOV   M,A              / CLEAR ENTRY
1F9C 23                 INX    H                / BUMP POINTER
1F9D 05                 DCR    B                / DECREMENT COUNTER
1F9E C29B1F             JNZ    KU0620           / LOOP UNTIL DONE
                 /
1FA1 212FFE             LXI    H,MATROW         / [H,L] <- TABLE ADDRESS
1FA4 064D               MVI    B,MATROL         / B <- TABLE LENGTH
                 /
1FA6 77          KU0630, MOV   M,A              / CLEAR ENTRY
```

```
1FA7 23                 INX     H               / BUMP POINTER
1FA8 05                 DCR     B               / DECREMENT COUNTER
1FA9 C2A61F             JNZ     KU0630          / LOOP UNTIL DONE
               /
1FAC 2108F8             LXI     H,DSPLOG        / [H,L] <- START OF LOGIC
1FAF 060E               MVI     B,ROWCNT        / B <- NUMBER OF ROWS *
               /
1FB1 CD0503    KU0640,  CALL    ROWLOG          / CLEAR ROW
1FB4 05                 DCR     B               / DECREMENT COUNTER
1FB5 C2B11F             JNZ     KU0640          / LOOP UNTIL DONE
               /
1FB8 217DFE             LXI     H,CURDSP        / [H,L] <- CURSOR ADDR
1FBB 46                 MOV     B,M             / B <- CURRENT CURSOR
1FBC 0E11               MVI     C,:11           / C <- HOME CURSOR
1FBE 71                 MOV     M,C             / STORE NEW CURSOR
1FBF 217EFE             LXI     H,CURACT        / SET DESTINATION
1FC2 71                 MOV     M,C             / LOAD CURSOR
1FC3 CD2B05             CALL    CURSOR          / MOVE CURSOR HOME
               /
1FC6 C9                 RET                     / EXIT
                        EJECT
```

```
                        SUBJOB  KEY UTILITY :  KU07 . VALIDATE REFERENCE
               /
               /***KEY UTILITY . KU07 . VALIDATE REFERENCE
               /
               /***PARAMETERS.
               /
               /        Z-BIT.EQ.0 => REFERENCE NOT VALID
               /        Z-BIT.EQ.1 => REFERENCE VALID
               /
               /***REGISTER USAGE.
               /
               /        A     - ALLOWABLE TYPES MASK
               /        [B,C] - SCRATCH
               /        [D,E] - MESSAGE ADDRESS ON ERROR
               /        [H,L] - REFERENCE TYPE
               /
                        EJECT
```

```
1FC7 47        KU07,    MOV     B,A             / A <- REFERENCE TYPES

               /        SET THE "TO BE CLEARED" FLAG FOR NUMERIC
               /        AREA OF ASSEMBLY AREA

1FC8 3A7CFE             LDA     KSTATE          / GET FLAGS BYTE
1FCB F610               ORI     KCLEAR          / SET "TO BE CLRED"
1FCD 327CFE             STA     KSTATE          / X

               /        NOW DECIDE WHAT TYPE OF # WE HAVE

1FD0 3A01FD             LDA     DSPNUM+3        / A <- FIRST REFERENCE D'GI

1FD3 FE30               CPI     ASC0            / CHECK FOR OUTPUT/CONSTANT
1FD5 CAFC1F             JZ      KU0700          / BRANCH ON OUTPUT/CONST NT
1FD8 FE31               CPI     ASC1            / CHECK FOR INPUT
1FDA CA0B20             JZ      KU0701          / BRANCH ON INPUT
1FDD FE32               CPI     ASC2            / CHECK FOR SEQUENCER
1FDF CA1420             JZ      KU0702          / BRANCH ON SEQUENCER
1FE2 FE33               CPI     ASC3            / CHECK FOR INPUT REGISTER
1FE4 CA1D20             JZ      KU0703          / BRANCH ON INPUT REGIST R
1FE7 FE34               CPI     ASC4            / CHECK FOR HOLDING REG
1FE9 CA2620             JZ      KU0704          / BRANCH ON HOLDING REG
1FEC FE20               CPI     ASCBLK          / CHECK FOR BLANK
1FEE CA2F20             JZ      KU0705          / BRANCH ON BLANK
               /
1FF1 11411B    KU07ER,  LXI     D,KF14M1        / [D,E] <- MESSAGE ADDR
1FF4 CD7E05             CALL    ERROR           / SET ERROR STATE
1FF7 AF                 CLA                     / A <- 0
1FF8 3C                 INR     A               / Z <- 0
1FF9 C32021             JMP     KU07X           / EXIT
                        EJECT
```

```
                        /
                        /***OUTPUT/CONSTANT CHECK
                        /
1FFC 78         KU0700, MOV     A,B             / A <- MASK
1FFD E601               ANI     NODOUT          / OUTPUTS ALLOWED?
1FFF C23820             JNZ     KU0710          / YES, CONTINUE
2002 78                 MOV     A,B             / A <- MASK
2003 E620               ANI     NODCST          / CONSTANTS ALLOWED?
2005 C20021             JNZ     KU0770          / YES, CONTINUE
2008 C3F11F             JMP     KU07ER          / ERROR
                        /
                        /***INPUT CHECK
                        /
200B 78         KU0701, MOV     A,B             / A <- MASK
200C E602               ANI     NODINP          / INPUTS ALLOWED?
200E C23820             JNZ     KU0710          / YES, CONTINUE
2011 C3F11F             JMP     KU07ER          / NO, ERROR
                        /
                        /***SEQUENCER CHECK
                        /
2014 78         KU0702, MOV     A,B             / A <- MASK
2015 E604               ANI     NODSEQ          / SEQUENCER ALLOWED?
2017 C27C20             JNZ     KU0730          / YES, CONTINUE
201A C3F11F             JMP     KU07ER          / NO, ERROR
                        /
                        /***INPUT REGISTER CHECK
                        /
201D 78         KU0703, MOV     A,B             / A <- MASK
201E E608               ANI     NODIRG          / INPUT REGISTER ALLOWED?
2020 C2B220             JNZ     KU0740          / YES, CONTINUE
2023 C3F11F             JMP     KU07ER          / NO, ERROR
                        /
                        /***HOLDING REGISTER CHECK
                        /
2026 78         KU0704, MOV     A,B             / A <- MASK
2027 E610               ANI     NODHRG          / HOLDING REGISTER ALLOW D?
2029 C2D420             JNZ     KU0745          / YES, CONTINUE
202C C3F11F             JMP     KU07ER          / NO, ERROR
                        /
                        /***BLANK FIELD CHECK
                        /
202F 78         KU0705, MOV     A,B             / A <- MASK
2030 E640               ANI     NODBLK          / BLANKS ALLOWED?
2032 C20C21             JNZ     KU0780          / YES, CONTINUE
2035 C3F11F             JMP     KU07ER          / NO, ERROR
                        EJECT

\### COILS AND INPUTS (OXXX/1XXX)
                        /
                        /       VALIDATE THE 3 L.S. DIGITS
                        /
2038 210000     KU0710, LXI     H,0             / [H,L] <- 0
203B 1102FD             LXI     D,DSPNUM+4      / [D,E] <- ADDRESS OF RE
203E CD8E01             CALL    BCDBN3          / CONVERT TO BINARY
2041 2B                 DCX     H               / MAKE RELATIVE TO BASE 0
2042 7C                 MOV     A,H             / GET MS BYTE OF REF:
                                                /   IF 0, OKAY FOR BOTH
                                                /   IF 1, MUST BE OUTPUT
                                                /   IF > 1, ERROR!
2043 B7                 TST                     / SEE IF ZERO:
2044 CA5320             JZ      KU0713          /    YES, OKAY 0,1XXX
2047 3D                 DCR     A               /    NOT 0, SEE IF 1 OR
2048 C2F11F             JNZ     KU07ER          /       >1, ERROR!

                /       # IS >256, SO MUST BE OUTPUT COIL OR ELSE ERROR

204B 3A01FD             LDA     DSPNUM+3        / GET MS DIGIT
204E FE30               CPI     ASCO            / IS IT 0 (FOR OUTPUT)
2050 C2F11F             JNZ     KU07ER          /    NO, ERROR

                KU0713,
2053 E5                 PUSH    H               / SAVE BINARY VALUE (ORIG)

                /       REF IS 512/256 OR LESS, SO SEE IF IT IS VALID
```

```
                    /        BY THE CURRENT 484 CONFIG OF I/O

2054 3A85FE                  LDA      SCONF2          / GET I/O CONFIG BITS
2057 210001                  LXI      H,@256          / MAX I/O
205A 11C0FF                  LXI      D,-@64          / SET NEG STEP SIZE
                    KU0715,
205D 17                      RAL                      / GET THE CONFIG BIT
205E DA6520                  JC       KU0717          /    OK! FOUND SIZE
2061 19                      DAD      D               /    NOT FOUND, REDUCE M X
2062 C35D20                  JMP      KU0715          /    AND LOOP TIL FOUND

                    /        NOW REGISTER L = MAX # OF I/O POINTS:
                    /        (00=256,  C0=192,  80=128,  40=64)

                    KU0717,
2065 7D                      MOV      A,L             / GET MAX #
2066 E1                      POP      H               / GET ORIG BIN REF #
2067 B7                      TST                      / IF MAX=0, ALL OK
2068 CA7020                  JZ       KU0719          /    OK, HAVE MAX
                             EJECT
                    /        NOT MAX, SO CHECK REF TO SYS LIMIT

206B 3D                      DCR      A               / (MAKE CARRY CHECK WORK
206C BD                      CMP      L               / MATCH TO LS BYTE ONLY
                                                      /    (MS IS IRRELEVANT)
206D DAF11F                  JC       KU07ER          / BAD #!, ERROR

                    /        SUCCESS!!! REF # OK (LEAST SIG 3 DIGITS)

                    KU0719,
2070 3A01FD                  LDA      DSPNUM+3        / A <- TYPE
2073 FE30                    CPI      ASCO            / CHECK FOR COILS
2075 C21F21                  JNZ      KU0799          / BRANCH IF NOT
2078 24                      INR      H               / SET FLAG FOR OUTPUT/INT
2079 C31F21                  JMP      KU0799          / GO TO SUCCESS EXIT
                             EJECT

                    /
                    /***SEQUENCER REFERENCE (2YXX)
                    /
207C 3A85FE         KU0730,  LDA      SCONF2          / A <- CONFIG BYTE
207F E602                    ANI      SYSENH          / ENHANCED SET?
2081 CAF11F                  JZ       KU07ER          / NO, ERROR
2084 3A02FD                  LDA      DSPNUM+4        / A <- REGISTER TYPE
2087 D630                    SUI      ASCO            / CONVERT TO BINARY
2089 FAF11F                  JM       KU07ER          / BRANCH ON ERROR
208C FE09                    CPI      :09             / CHECK HIGH RANGE
208E F2F11F                  JP       KU07ER          / BRANCH ON ERROR
2091 3D                      DCR      A               / CREATE BASE 0 REF
2092 0F                      RRC                      / ROTATE TO FORM
2093 0F                      RRC                      / MASK FOR FINAL
2094 0F                      RRC                      / RESULT
2095 F5                      PUSH     PSW             / STACK IT
                    /
2096 210000                  LXI      H,0             / [H,L] <- 0
2099 1103FD                  LXI      D,DSPNUM+5      / [D,E] <- BCD FIELD ADDR
209C CD9801                  CALL     BCDBN2          / CONVERT TO BINARY
                    /
209F 2B                      DCX      H               / DECREMENT RESULT
20A0 3EE0                    MVI      A,REGMSK        / A <- MASK
20A2 A5                      ANA      L               / CHECK RESULT
20A3 CAAA20                  JZ       KU0735          / BRANCH OKAY
20A6 F1                      POP      PSW             / REFERENCE TOO LARGE
20A7 C3F11F                  JMP      KU07ER          / GO TO ERROR
                    /
20AA F1             KU0735,  POP      PSW             / A <- REGISTER VALUE
20AB B5                      ORA      L               / SET BITS
20AC 6F                      MOV      L,A             / L <- BYTE 1
20AD 2603                    MVI      H,SEQFLG        / H <- BYTE 0
20AF C31F21                  JMP      KU0799          / GO TO EXIT
                             EJECT

\*** INPUT REGISTER REFERENCE (3OXX); X)
                    /
20B2 3A85FE         KU0740,  LDA      SCONF2          / A <- CONFIGURATION
20B5 E602                    ANI      SYSENH          / CHECK FOR ENHANCED EXEC
```

```
20B7 CAF11F          JZ      KU07ER          / BRANCH IF NOT
                 /
20BA 210000          LXI     H,0             / [H,L] <- 0
20BD 1102FD          LXI     D,DSPNUM+4      / [D,E] <- START OF FIELD
20C0 CD8E01          CALL    BCDBN3          / CONVERT REF TO BINARY
                 /
20C3 2B              DCX     H               / MAKE RELATIVE BASE 0
20C4 AF              CLA                     / A <- 0
20C5 BC              CMP     H               / H MUST BE ZERO
20C6 C2F11F          JNZ     KU07ER          / BRANCH IF NOT
20C9 7D              MOV     A,L             / A <- LOW-ORDER BYTE
20CA D620            SUI     @32             / MUST BE < 31
20CC F2F11F          JP      KU07ER          / BRANCH IF NOT
20CF 2601            MVI     H,INPFLG        / SET INPUT REGISTER FLA
20D1 C31F21          JMP     KU0799          / GO TO EXIT
                     EJECT

\**** HOLDING REGISTER REFERENCE (4XXX)
                 /
20D4 210000  KU0745, LXI     H,0             / [H,L] <- 0
20D7 1102FD          LXI     D,DSPNUM+4      / [D,E] <- BCD FIELD
20DA CD8E01          CALL    BCDBN3          / CONVERT TO BINARY
                 /
20DD 2B              DCX     H               / MAKE RELATIVE BASE 0
20DE 7C              MOV     A,H             / GET MS BYTE. IT
                                             /   MUST BE 0, OR ELSE
                                             /   ERROR.
20DF B7              TST                     / ZERO? (IE 256 OR LESS?)
20E0 C2F11F          JNZ     KU07ER          /   NO, ERROR
20E3 E5              PUSH    H               /   YES, SAVE ORIG #

                 /       OKAY, LEAST SIG 3 DIGITS ARE 1-256;
                 /       NOW CHECK TO CONFIG SIZE

20E4 3A85FE          LDA     SCONF2          / GET I/O CONFIG BITS
20E7 210001          LXI     H,@256          / MAX POSS I/O
20EA 11C0FF          LXI     D,-@64          / NEG STEP SIZE
             KU0750,
20ED 17              RAL                     / GET NEXT CONFIG BIT
20EE DAF520          JC      KU0753          / OK! FOUND SIZE
20F1 19              DAD     D               / NOT FOUND, REDUCE MAX
20F2 C3ED20          JMP     KU0750          /    AND LOOP TIL FOUND

                 /       NOW L= MAX # OF I/O POINTS
                 /       (00=256,  C0=192,  80=128, 40=64)
                 /       NOW SUBTRACT 2 BECAUSE THE "LAST 2"
                 /       HOLDING REGS ARE NOT AVAILABLE TO USER.

             KU0753,
20F5 3EFD            MVI     A,-3            / -2 FOR THE SYSTEM
                                             / (-1 FOR CARRY TEST)
20F7 85              ADD     L               / NOW A=MAX 4XXX FOR THIS
                                             /   CONTROLLER
20F8 E1              POP     H               / GET ORIG #
20F9 BD              CMP     L               / MATCH ON LS BYTE
20FA DAF11F          JC      KU07ER          /   BAD #, ERROR
20FD C31F21          JMP     KU0799          /   GOOD, EXIT OK
                     EJECT

             /
             /***CONSTANT FIELD
             /
2100 1101FD  KU0770, LXI     D,DSPNUM+3      / [D,E] <- BCD POINTER
2103 210000          LXI     H,0             / INITIALIZE RESULT
2106 CD8101          CALL    BCDBN4          / CONVERT TO BINARY
2109 C31F21          JMP     KU0799          / AND EXIT
             /
             /***BLANK FIELD
             /
210C 2101FD  KU0780, LXI     H,DSPNUM+3      / [H,L] <- SOURCE ADDR
210F 3E20            MVI     A,ASCBLK        / A <- ASCII BLANK
2111 0604            MVI     B,REFLEN        / B <- FIELD LENGTH
             /
2113 BE      KU0785, CMP     M               / CHECK CHARACTER
2114 C2F11F          JNZ     KU07ER          / BRANCH ON ERROR
2117 23              INX     H               / BUMP POINTER
```

```
2118 05                 DCR     B               / DECREMENT COUNT
2119 C21321             JNZ     KU0765          / LOOP UNTIL DONE
                /
211C 210000             LXI     H,0             / [H,L] <- 0
                /
211F AF         KU0799, CLA                     / A <- 0; Z-BIT <- 1
                /
2120 C9         KU07X,  RET                     / EXIT
                        EJECT

                        SUBJOB  KEY UTILITY : KU08 : INC/DCR STEP NUMBER
                /
                /***KEY UTILITY : KU08 : INC/DCR STEP NUMBER
                /
                /***PARAMETERS:
                /
                /       [B,C].EQ.+1     => INCREMENT
                /       [B,C].EQ.-1     => DECREMENT
                /
                /***REGISTER USAGE:
                /
                /       A     - SCRATCH
                /       [B,C] - INCREMENT/DECREMENT
                /       [D,E] - SCRATCH
                /       [H,L] - SCRATCH
                /
2121 218AFE     KU08,   LXI     H;STPNUM        / [H,L] <- ADDRESS
2124 E7                 GETHL                   / [H,L] <- STEP NUMBER
2125 09                 DAD     B               / MODIFY STEP NUMBER
2126 EB                 XCHG                    / [D,E] <-> [H,L]
2127 218AFE             LXI     H;STPNUM        / [H,L] <- ADDRESS
212A EF                 MOVDE                   / UPDATE STEP NUMBER
212B EB                 XCHG                    / [D,E] <-> [H,L]
212C 118FD              LXI     D,DSPSTP        / [D,E] <- DESTINATION
212F CDC201             CALL    BNBCD4          / CONVERT TO BCD AND DISPLA

2132 C9                 RET                     / EXIT
                        EJECT

                        SUBJOB  KEY UTILITY : KU09 : INSERT NODE
                /
                /***KEY UTILITY : KU09 : INSERT NODE
                /
                /***PARAMETERS:
                /
                /       Z-BIT.EQ.0 => ERROR
                /       Z-BIT.EQ.1 => INSERT COMPLETED
                /
                /       NODE IN COMMAND BUFFER
                /       INSERT AT CURSOR (CURACT)
                /
                /***REGISTER USAGE:
                /
                /       A     - SCRATCH
                /       B     - SCRATCH
                /       C     - NODE COUNT
                /       [D,E] - SCRATCH
                /       [H,L] - SCRATCH
                /
                        EJECT

2133 C5         KU09,   PUSH    B               / SAVE COUNTER
2134 CD5124             CALL    KU22            / [H,L] <- COLTAB POINTER
2137 E5                 PUSH    H               / STACK POINTER
2138 3A7EFE             LDA     CURACT          / A <- CURSOR
213B E6F0               ANI     ROWMSK          / ISOLATE ROW
213D FE10               CPI     :10             / CHECK FOR FIRST ROW
213F C2AF21             JNZ     KU0930          / BRANCH IF NOT
                /
2142 3A05FD             LDA     DSPVER+ROWD     / A <- VERTICAL
2145 FE20               CPI     ASCBLK          / CHECK FOR BLANK
2147 C27921             JNZ     KU0915          / BRANCH ON VERTICAL
                /
214A 218EFE             LXI     H;ADREUN        / [H,L] <- SOURCE
214D E7                 GETHL                   / [H,L] <- LAST ADDRESS
214E EB                 XCHG                    / SWAP
```

```
2214F 13                 INX     D              / BUMP ADDRESS
2150 13                  INX     D              / FOR NEW NODE
2151 2193FE              LXI     H;CMDBUF+3     / [H,L] <- COMMAND BUF P R
2154 EF                  MOVDE                  / STORE ADDRESS
                /
2155 41                  MOV     B;C            / B <- COUNT
2156 2193FE              LXI     H;CMDBUF+3     / [H,L] <- POINTER
2159 110200              LXI     D;2            / [D,E] <- OFFSET
                /
215C 19         KU0910,  DAD     D              / BUMP POINTER
215D 05                  DCR     B              / DECREMENT COUNTER
215E C25C21              JNZ     KU0910         / LOOP UNTIL DONE
                /
2161 7E                  MOV     A;M            / A <- DATAHI
2162 F680                ORI     EOCFLG         / SET END-OF-COL FLAG
2164 77                  MOV     M;A            / STORE BACK INTO BUFFER
                /
2165 3E50                MVI     A;CMDINS       / A <- COMMAND CODE
2167 CDF822              CALL    KU9SUB         / DO FUNCTION
216A E1                  POP     H              / POP POINTER
216B C1                  POP     B              / POP COUNTER
216C C27621              JNZ     KU09ER         / BRANCH ON FAILURE
216F CDB824              CALL    COLINC         / UPDATE COLTAB
2172 CDCF22              CALL    KU09UP         / UPDATE MATROW AND USEA E
2175 C9                  RET                    / DONE
                /
2176 AF         KU09ER,  CLA                    / A <- 0
2177 3C                  INR     A              / A <- 1; Z-BIT <- 0
2178 C9                  RET                    / GO TO EXIT
                         EJECT

                /
                /***INSERT NEW COLUMN WITH VERTICALS
                /
2179 218EFE     KU0915,  LXI     H;ADREON       / [H,L] <- SOURCE
217C E7                  GETHL                  / [H,L] <- LAST ADDR
217D EB                  XCHG                   / SWAP
217E 13                  INX     D              / BUMP ADDRESS
217F 13                  INX     D              / FOR NEW NODE
2180 2193FE              LXI     H;CMDBUF+3     / [H,L] <- DESTINATION
2183 EF                  MOVDE                  / STORE ADDR IN BUFFER
                /
2184 41                  MOV     B;C.           / B <- COUNT
                /
2185 23         KU0920,  INX     H              / BUMP POINTER
2186 23                  INX     H              / TO FIND EOC SPOT
2187 05                  DCR     B              / DECREMENT COUNTER
2188 C28521              JNZ     KU0920         / LOOP UNTIL DONE
                /
218B 114008              LXI     D;NOEOC!:400+:40 / [D,E] <- EOC NODE
218E EF                  MOVDE                  / LOAD BUFFER
                /
218F E1                  POP     H              / GET POINTER
2190 C1                  POP     B              / GET COUNTER
2191 0C                  INR     C              / INCREMENT COUNT FOR EOC
2192 C5                  PUSH    B              / STACK COUNTER
2193 E5                  PUSH    H              / STACK POINTER
2194 3E50                MVI     A;CMDINS       / A <- COMMAND CODE
2196 CDF822              CALL    KU9SUB         / DO INSERT
2199 E1                  POP     H              / GET POINTER
219A C1                  POP     B              / GET COUNTER
219B C27621              JNZ     KU09ER         / BRANCH ON ERROR
                /
219E E5                  PUSH    H              / SAVE POINTER
219F 110400              LXI     D;EOCHI        / [D,E] <- OFFSET
21A2 19                  DAD     D              / [H,L] <- EOC ADDR
21A3 114008              LXI     D;NOEOC!:400+:40 / [D,E] <- EOC NODE
21A6 EF                  MOVDE                  / LOAD TABLE
21A7 E1                  POP     H              / GET POINTER
21A8 CDB824              CALL    COLINC         / UPDATE COLTAB
21AB CDCF22              CALL    KU09UP         / UPDATE MATROW AND USEA E
21AE C9                  RET
                         EJECT
```

```
                 /
                 /***INSERT IN EXISTING COLUMN
                 /
21AF 110400      KU0930, LXI    D;EOCHI          / [B,C] <- OFFSET
21B2 19                  DAD    D                / POINT TO EOC NODE
21B3 AF                  CLA                     / A <- 0
21B4 BE                  CMP    M                / CHECK IF ANY VERTICALS
21B5 C23322              JNZ    KU0940           / BRANCH ON VERTICALS
                 /
21B8 3A05FD              LDA    DSPVER+ROWD      / A <- VERTICAL FOR NODE
21BB FE20                CPI    ASCBLK           / ANY VERTICAL?
21BD C2ED21              JNZ    KU0935           / YES, PROCESS
                 /
21C0 E1                  POP    H                / [H,L] <- POINTER
21C1 E5                  PUSH   H                / SAVE IT
21C2 110200              LXI    D;COLEHI         / [B,C] <- OFFSET
21C5 19                  DAD    D                / BUMP TO LAST ADDRESS
21C6 E7                  GETHL                   / [H,L] <- LAST ADDRESS
21C7 23                  INX    H                / INSERT AFTER
21C8 23                  INX    H                / THIS ADDRESS
21C9 EB                  XCHG                    / SWAP
21CA 2193FE              LXI    H;CMDBUF+3       / POINTER TO CMDBUF
21CD EF                  MOVDE                   / STORE ADDRESS IN CMDBUF
                 /
21CE 41                  MOV    B;C              / B <- COUNT
                 /
21CF 05          KU0931, DCR    B                / DECREMENT COUNTER
21D0 CAD821              JZ     KU0932           / EXIT WHEN DONE
21D3 23                  INX    H                / BUMP
21D4 23                  INX    H                / POINTER
21D5 C3CF21              JMP    KU0931           / AND LOOP
                 /
21D8 7E          KU0932, MOV    A,M              / A <- DATA HI
21D9 F680                ORI    EOCFLG           / SET EOC FLAG
21DB 77                  MOV    M;A              / AND RELOAD BUFFER
                 /
21DC 3EB0                MVI    A;CMDINC         / A <- COMMAND CODE
21DE CDF822              CALL   KU9SUB           / INSERT NODE(S)
21E1 E1                  POP    H                / GET POINTER
21E2 C1                  POP    B                / GET COUNTER
21E3 C27621              JNZ    KU09ER           / BRANCH ON ERROR
21E6 CDB824              CALL   COLINC           / UPDATE COLTAB
21E9 CDCF22              CALL   KU09UP           / UPDATE MATROW AND USEAGE
21EC C9                  RET                     / DONE
                         EJECT

                 /
                 /***INSERT IN COLUMN - NEW VERTICAL
                 /
21ED 2B          KU0935, DCX    H                / DECREMENT
21EE 2B                  DCX    H                / POINTER
21EF E7                  GETHL                   / [H,L] <- ADDRESS
21F0 23                  INX    H                / INSERT AFTER
21F1 23                  INX    H                / THIS ADDRESS
21F2 EB                  XCHG                    / SWAP
21F3 2193FE              LXI    H;CMDBUF+3       / POINTER TO CMDBUF
21F6 EF                  MOVDE                   / STORE ADDRESS IN CMDBUF
21F7 CD0423              CALL   KU11             / A <- ROW
21FA 47                  MOV    B;A              / B <- COUNTER
21FB 3E80                MVI    A;:80            / A <- MASK
                 /
21FD 0F          KU0936, RRC                     / SHIFT MASK
21FE 05                  DCR    B                / DECREMENT COUNT
21FF C2FD21              JNZ    KU0936           / LOOP UNTIL DONE
                 /
2202 1608                MVI    D;NOEOC!:04      / D <- EOC NODE
2204 5F                  MOV    E;A              / E <- MASK
                 /
2205 41                  MOV    B;C              / B <- COUNT
2206 2195FE              LXI    H;CMDBUF+5       / [H,L] <- POINTER
                 /
2209 23          KU0937, INX    H                / BUMP
220A 23                  INX    H                / POINTER
220B 05                  DCR    B                / DECREMENT COUNT
220C C20922              JNZ    KU0937           / LOOP UNTIL DONE
220F EF                  MOVDE                   / LOAD EOC NODE IN BUFFER
                 /
```

```
2210 E1                   POP     H                  / GET POINTER
2211 C1                   POP     B                  / GET COUNT
2212 0C                   INR     C                  / ACCOUNT FOR EOC NODE
2213 43                   MOV     B,E                / BACK UP MASK
2214 C5                   PUSH    B                  / STACK COUNTER
2215 E5                   PUSH    H                  / STACK POINTER
               /
2216 3EB0                 MVI     A,CMDINC           / A <- COMMAND CODE
2218 CDF822               CALL    KU9SUB             / DO INSERT
221B E1                   POP     H                  / GET POINTER
221C C1                   POP     B                  / GET COUNT
221D C27621               JNZ     KU09ER             / BRANCH ON ERROR
               /
2220 E5                   PUSH    H                  / SAVE POINTER
2221 110400               LXI     D,EOCHI            / [D,E] <- OFFSET
2224 19                   DAD     D                  / [H,L] <- EOC DATA
2225 3608                 MVI     M,NOEOC!:04        / LOAD EOC NODE DATA HI
2227 23                   INX     H                  / BUMP POINTER
2228 70                   MOV     M,B                / LOAD CONNECTIVITY
2229 0600                 MVI     B,0                / ZERO COUNT
222B E1                   POP     H                  / GET POINTER
222C CDB824               CALL    COLINC             / UPDATE COLTAB
222F CDCF22               CALL    KU09UP             / UPADATE MATROW AND USE SE
2232 C9                   RET                        / DONE
                          EJECT

               /
               /***INSERT IN COLUMN - EXISTING VERTICAL
               /
2233 2B        KU0940,    DCX     H                  / DECREMENT POINTER
2234 2B                   DCX     H                  / TO EOC ADDRESS
2235 E7                   GETHL                      / [H,L] <- EOC ADDRESS
2236 3A05FD               LDA     DSPVER+ROWD        / A <- VERTICAL
2239 FE20                 CPI     ASCBLK             / CHECK FOR NEW VERTICAL
223B C25422               JNZ     KU0950             / BRANCH ON NEW VERTICAL
               /
223E EB                   XCHG                       / SWAP
223F 2193FE               LXI     H,CMDBUF+3         / [H,L] <- POINTER
2242 EF                   MOVDE                      / STORE ADDRESS
               /
2243 3E50                 MVI     A,CMDINS           / A <- COMMAND TYPE
2245 CDF822               CALL    KU9SUB             / DO INSERT
2248 E1                   POP     H                  / GET POINTER
2249 C1                   POP     B                  / GET COUNT
224A C27621               JNZ     KU09ER             / BRANCH ON ERROR
224D CDB824               CALL    COLINC             / UPDATE COLTAB
2250 CDCF22               CALL    KU09UP             / UPDATE MATROW AND USEA E
2253 C9                   RET                        / DONE
                          EJECT

               /
               /***INSERT IN COLUMN - ADD NEW VERTICAL
               /
2254 EB        KU0950,    XCHG                       / SWAP
2255 2193FE               LXI     H,CMDBUF+3         / [H,L] <- POINTER
2258 EF                   MOVDE                      / STORE ADDRESS
               /
2259 E1                   POP     H                  / GET POINTER
225A E5                   PUSH    H                  / SAVE IT AGAIN
225B 110500               LXI     D,EOCLO            / [D,E] <- OFFSET
225E 19                   DAD     D                  / [H,L] <- CONNECTIVITY BYT

               /
225F CD0423               CALL    KU11               / A <- ROW
2262 47                   MOV     B,A                / B <- ROW
2263 3E80                 MVI     A,:80              / B <- MASK
               /
2265 0F        KU0955,    RRC                        / ROTATE MASK
2266 05                   DCR     B                  / DECREMENT COUNT
2267 C26522               JNZ     KU0955             / LOOP UNTIL DONE
               /
226A 5F                   MOV     E,A                / E <- DATALO
226B 1600                 MVI     D,0                / D <- DATAHI
226D D5                   PUSH    D                  / SAVE CONNECTIVITY DATA
               /
226E 3E50                 MVI     A,CMDINS           / A <- COMMAND CODE
```

```
2270 CDF822    CALL   KU9SUB            / DO INSERT
2273 D1        POP    D                 / POP CONNECTIVITY DATA
2274 E1        POP    H                 / POP POINTER
2275 C1        POP    B                 / POP COUNTER
2276 C0        RNZ                      / EXIT ON ERROR
          /
2277 CDB824    CALL   COLINC            / UPDATE COLTAB
227A C5        PUSH   B                 / STACK COUNTER
227B E5        PUSH   H                 / STACK POINTER
227C D5        PUSH   D                 / STACK CONNECTIVITY BYT
          /
227D CDCF22    CALL   KU09UP            / UPDATE "MATROW"
2280 D1        POP    D                 / RELOAD CONNECT
2281 E1        POP    H                 / RELOAD PTR
2282 E5        PUSH   H                 / X
2283 D5        PUSH   D                 / SAVE CONNECTIV.
          /
2284 010200    LXI    B,COLEHI          / [B,C] <- OFFSET
2287 09        DAD    B                 / [H,L] <- ADDR OF EOC
2288 E7        GETHL                    / [H,L] <- EOC ADDR
2289 42        MOV    B,D               / B <- DATAHI
228A 4B        MOV    C,E               / C <- DATALO
228B EB        XCHG                     / SWAP
228C 2193FE    LXI    H,CMDBUF+3        / SET DESTINATION
228F EF        MOVDE                    / LOAD ADDRESS
2290 D7        MOVBC                    / LOAD DATA
2291 06FF      MVI    B,:FF             / B <- MASKHI
2293 79        MOV    A,C               / A <- DATALO
2294 2F        CMA                      / COMPLEMENT
2295 4F        MOV    C,A               / C <- MASKLO
2296 D7        MOVBC                    / LOAD MASK
          /
2297 110A21    LXI    D,CMDWRT+CMD02!:100+LENWRT / SET PARMS
229A CD8125    CALL   PIO               / UPDATE EOC NODE
229D D1        POP    D                 / GET CONNECTIVITY BYTE
229E E1        POP    H                 / GET POINTER
229F C1        POP    B                 / GET COUNTER
22A0 C2AC22    JNZ    KU0960            / BRANCH ON ERROR
          /
22A3 010500    LXI    B,EOCLO           / [B,C] <- OFFSET
22A6 09        DAD    B                 / [H,L] <- CONNECTIVITY  YT

22A7 7E        MOV    A,M               / A <- OLD CONNECTIVITY BYT

22A8 B3        ORA    E                 / SET NEW BIT
22A9 77        MOV    M,A               / LOAD NEW CONNECTIVITY BYT

22AA AF        CLA                      / A <- 0
22AB C9        RET                      / AND EXIT
               EJECT

          /
          /***CANCEL PREVIOUS INSERT
          /
          KU0960,
22AC C5        PUSH   B                 / SAVE COUNT
22AD E5        PUSH   H                 / SAVE COLTAB PTR
22AE 110200    LXI    D,COLEHI          / [D,E] <- OFFSET
22B1 19        DAD    D                 / [H,L] <- ADDRESS OF DATA
22B2 E7        GETHL                    / [H,L] <- EOC ADDRESS
22B3 2B        DCX    H                 / DECREMENT
22B4 2B        DCX    H                 / ADDRESS
22B5 EB        XCHG                     / SWAP
22B6 2193FE    LXI    H,CMDBUF+3        / SET DESTINATION
22B9 EF        MOVDE                    / LOAD BUFFER
          /
22BA 3E60      MVI    A,CMDDEL          / A <- FUNCTION CODE
22BC 81        ADD    C                 / A <- COMMAND CODE
22BD 57        MOV    D,A               / D <- COMMAND CODE
22BE 79        MOV    A,C               / A <- NODE COUNT
22BF 3D        DCR    A                 / MAKE ZERO RELATIVE
22C0 87        ADD    A                 / DOUBLE IT
```

```
22C1 C606          ADI     LENDEL          / A <- COMMAND LENGTH
22C3 5F            MOV     E;A             / E <- COMMAND LENGTH
22C4 CD8125        CALL    PIO             / DELETE NODE(S)

22C7 E1            POP     H               / GET COLTAB PTR
22C8 C1            POP     B               / GET COUNTER
22C9 CD0025        CALL    COLDEC          / REPAIR COLTAB
22CC AF            CLA                     / A <- 0
22CD 3C            INR     A               / Z-BIT <- 0
22CE C9            RET                     / AND EXIT
                   EJECT

         SUBJOB    KU09UP = UPDATE "MATROW" AND USEAGE COUNT

         /
         /         C = # OF NODES ADDED
         /
         KU09UP,
22CF 3A95FE        LDA     CMDBUF+5        / A <- DATAHI
22D2 E67C          ANI     NODMSK          / ISOLATE NODE TYPE
22D4 0F            RRC                     / ROTATE
22D5 0F            RRC                     / RIGHT
22D6 3280FE        STA     CURCON          / AND SET TYPE
         /
22D9 CDAA23        CALL    KU17            / GET MATRIX POINTERS
22DC 1195FE        LXI     D;CMDBUF+5      / [D,E] <- POINTER
         /
22DF 1A  KU099A,   LDAX    D               / A <- BYTE 0
22E0 E67C          ANI     NODMSK          / ISOLATE NODE TYPE
22E2 0F            RRC                     / ROTATE
22E3 0F            RRC                     / NODE TYPE
22E4 FE02          CPI     NOEOC           / CHECK FOR AN EOC
22E6 CAEA22        JZ      KU099B          / BRANCH ON EOC
22E9 77            MOV     M;A             / LOAD IN MATRIX
         /
22EA 13  KU099B,   INX     D               / BUMP
22EB 13            INX     D               / POINTER
22EC C5            PUSH    B               / SAVE COUNTER
22ED 010B00        LXI     B;MAXCOL        / [B,C] <- OFFSET
22F0 09            DAD     B               / BUMP TO NEXT COLUMN
22F1 C1            POP     B               / GET COUNTER
22F2 0D            DCR     C               / DECREMENT COUNTER
22F3 C2DF22        JNZ     KU099A          / LOOP UNTIL DONE
         /
22F6 AF            CLA                     / Z-BIT <- 1
         /
22F7 C9            RET                     / EXIT
                   EJECT

         SUBJOB    KU9SUB = SEND I/O COMMAND
         /
         /***SUBROUTINE TO SEND COMMAND
         /
         /***REGISTER USAGE:
         /
         /         A      - COMMAND CODE
         /         B      - SCRATCH
         /         C      - NODE COUNT
         /         [D,E]  - SCRATCH
         /         [H,L]  - SCRATCH
         /
22F8 81  KU9SUB,   ADD     C               / CREATE FUNCTION CODE
22F9 57            MOV     D;A             / D <- FUNCTION CODE
22FA 79            MOV     A;C             / A <- BYTE COUNT
22FB 3D            DCR     A               / ACCOUNT FOR BASE VALUE
22FC 87            ADD     A               / COMPUTE EXTRA LENGTH
22FD C608          ADI     LENINS          / COMPUTE TOTAL LENGTH
22FF 5F            MOV     E;A             / E <- COMMAND LENGTH
2300 CD8125        CALL    PIO             / ISSUE COMMAND
2303 C9            RET                     / EXIT
                   EJECT

                   SUBJOB  KEY UTILITY : KU11 : A <- CURSOR ROW
         /
         /***KEY UTILITY : KU11 : A <- CURSOR ROW
         /
```

```
2304 3A7EFE   KU11,    LDA     CURACT             / A <- CURSOR
2307 E6F0              ANI     ROWMSK             / ISOLATE ROW
2309 CF                NSWP                       / SHIFT
                                                  / TO
                                                  / NORMALIZE
                                                  / RESULT
230A C9                RET                        / EXIT
                       EJECT
                       SUBJOB  KEY UTILITY : KU12 : B <- CURSOR
              /
              /***KEY UTILITY : KU12 : B <- CURSOR
              /
              / H/L=HAS SCREEN ADDR AT CURSOR
              / D/E=STEP VALUE TO NEXT ROW (FROM CUR100)
              /
230B 3A7DFE   KU12,    LDA     CURDSP             / A <- CURSOR
230E 47                MOV     B,A                / B <- CURSOR
230F CD4705            CALL    CUR100             / SET POINTERS
2312 C9                RET                        / EXIT
                       EJECT
                       SUBJOB  KEY UTILITY : KU13 : SEARCH + DISPLAY
              /
              /***KEY UTILITY : KU13 : SEARCH + DISPLAY
              /
              /***PARAMETERS:
              /
              /        A     - NODE TYPE
              /        [H,L] - LAST DISPLAY ADDRESS FOR NODE
              /
2313 21FD09   KU13,    LXI     H,NODTAB+NODCON / [H,L] <- STARTING ADDR
2316 110900            LXI     D,NODRCL           / [D,E] <- OFFSET
              /
2319 BE       KU1305,  CMP     M                  / CHECK FOR MATCH
231A CA2123            JZ      KU1310             / BRANCH ON MATCH
231D 19                DAD     D                  / GO TO NEXT ENTRY
231E C31923            JMP     KU1305             / CONTINUE
              /
2321 11FAFF   KU1310,  LXI     D,NODDIS-NODCON / [D,E] <- OFFSET
2324 19                DAD     D                  / [H,L] <- START OF DATA
2325 E5                PUSH    H                  / SAVE POINTER
              /
2326 CD7A25            CALL    ISCOIL             / COIL TYPE?
2329 DA5423            JC      KU1340             /   NO, GO
              /
232C 3A7EFE            LDA     CURACT             / A <- CURSOR
232F 47                MOV     B,A                / B <- CURSOR
2330 4F                MOV     C,A                / C <- CURSOR
              /
2331 79       KU1320,  MOV     A,C                / A <- NEXT POSITION
2332 E60F              ANI     COLMSK             / ISOLATE COLUMN
2334 FE0C              CPI     MAXCOL+1           / AT RIGHT RAIL?
2336 CA5023            JZ      KU1335             / YES, BRANCH
2339 CD2B05            CALL    CURSOR             / MOVE CURSOR
233C 41                MOV     B,C                / B <- NEW CURSOR
233D CD4705            CALL    CUR100             / GET POINTERS
2340 23                INX     H                  / SKIP FIELD ATTRIBUTE
2341 1606              MVI     D,DSPNOD-1         / D <- COUNT
2343 3E72              MVI     A,ASCDSH           / A <- DASH EXTENSION
              /
2345 77       KU1325,  MOV     M,A                / DISPLAY DASH
2346 23                INX     H                  / BUMP POINTER
2347 15                DCR     D                  / DECREMENT COUNTER
2348 C24523            JNZ     KU1325             / LOOP UNTIL DONE
              /
234B 41       KU1330,  MOV     B,C                / B <- NEW CURSOR
234C 0C                INR     C                  / C <- NEXT CURSOR
234D C33123            JMP     KU1320             / CONTINUE
              /
2350 78       KU1335,  MOV     A,B                / A <- CURSOR
2351 327DFE            STA     CURDSP             / INDICATE DISPLAY CURSOR
              /
2354 CD0B23   KU1340,  CALL    KU12               / B <- CURSOR
2357 23                INX     H                  / BUMP OVER ATTRIBUTE
2358 D1                POP     D                  / [D,E] <- SOURCE
```

```
2359 0605                  MVI     B;DSPNOD-2         / B <- COUNTER
235B CD0601                CALL    MOVS10             / DISPLAY NODE
                  /
235E 36E0                  MVI     M;CA1100           / SET CONNECTOR
2360 CDE323                CALL    KU19               / EXTEND POWER FROM RAIL
                  /
2363 C9                    RET                        / EXIT
                           EJECT

                           SUBJOB  KEY UTILITY : KU14 : M-NODE TOP LINE
                  /
                  /***KEY UTILITY : KU14 : MULTI-NODE TOP LINE
                  /
2364 CD0B23       KU14,    CALL    KU12               / B <- CURSOR
2367 CD4705                CALL    CUR100             / [H,L] <- REFRESH POSITION
236A 23                    INX     H                  / BUMP OVER ATTRIBUTE
236B 11081B                LXI     D;MULLN1           / [D,E] <- SOURCE
236E 0605                  MVI     B;DSPNOD-2         / B <- COUNTER
2370 CD0601                CALL    MOVS10             / DISPLAY TOP LINE
                  /
2373 36E0                  MVI     M;CA1100           / INSERT CONNECTOR
                  /
2375 114B00                LXI     D;ROWB-DSPNOD+2 / [D,E] <- OFFSET
2378 19                    DAD     D                  / MOVE TO NEXT LINE
2379 3605                  MVI     M;ASCLB            / CREATE BOARDER
237B 23                    INX     H                  / BUMP POINTER
                  /
237C C9                    RET                        / EXIT
                           EJECT

                           SUBJOB  KEY UTILITY : KU15 : CHECK FOR MULTI-NODE
                  /
                  /KEY UTILITY : KU15 : CHECK FOR MULTI-NODE CONTACT
                  /              KU15A :  DITTO FOR CONTACT IN A-REG.
                  /
237D 3A80FE       KU15,    LDA     CURCON             / A <- CURSOR CONTACT
                  KU15A,
2380 FE0D                  CPI     NOCPRE             / CHECK RANGE
2382 FA8A23                JM      KU1505             / BRANCH ON SINGLE-NODE
2385 AF                    CLA                        / A <- 0
2386 3C                    INR     A                  / Z-BIT <- 0
2387 C38B23                JMP     KU15X              / AND EXIT
                  /
238A AF           KU1505,  CLA                        / Z-BIT <- 1
                  /
238B C9           KU15X,   RET                        / EXIT
                           EJECT

                           SUBJOB  KEY UTILITY : KU16 : DISPLAY POWER RAIL
                  /
                  /***KEY UTILITY : KU16 : DISPLAY POWER RAIL
                  /
                  /***USES ALL REGISTERS
                  /
238C 2109F8       KU16,    LXI     H;DSPLOG+1         / [H,L] <- START OF POWER
238F 3675                  MVI     M;ASCBAR+CATHI     / RAIL; CREATE POWER RAIL
2391 23                    INX     H                  / USING HIGHLIGHTED CHAR
2392 36D1                  MVI     M;CA1101+CATHI     / ACTER ATTRIBUTES
2394 015000                LXI     B;ROWB             / [B,C] <- OFFSET
2397 09                    DAD     B                  / BUMP TO NEXT ROW
2398 36E5                  MVI     M;CA0011+CATHI     / DO POWER RAIL
239A 1605                  MVI     D;MAXROW-2         / D <- COUNT
                  /
239C 09           KU1610,  DAD     B                  / BUMP TO NEXT ROW
239D 36D9                  MVI     M;CA0111+CATHI     / DO POWER STUB
239F 09                    DAD     B                  / BUMP TO NEXT ROW
23A0 36E5                  MVI     M;CA0011+CATHI     / DO POWER RAIL
23A2 15                    DCR     D                  / DECREMENT COUNT
23A3 C29C23                JNZ     KU1610             / LOOP UNTIL DONE
                  /
23A6 09                    DAD     B                  / JUMP TO LAST ROW
23A7 36DD                  MVI     M;CA1110+CATHI     / CREATE LAST STUB
                  /
23A9 C9                    RET                        / EXIT
                           EJECT
```

```
                     SUBJOB  KEY UTILITY : KU17 : SET MATRIX POINTERS
               /
               /***KEY UTILITY : KU17 : SET MATRIX POINTERS
               /***KEY UTILITY : KU17A : SET MATRIX POINTERS A-REG
               /
               /***REGISTER USAGE:
               /
               /        A     - SCRATCH <OR> ROW,COL
               /        [D,E] - SCRATCH
               /        [H,L] - ENTRY IN MATROW TABLE FOR NODE
               /
               KU17,
23AA C5                PUSH    B                 / SVE
23AB 3A7EFE            LDA     CURACT            / GET CURRENT CURSOR
23AE C3B223            JMP     KU1705            / GO JOIN COMMON

               /       ALTERNATE ENTRY WITH ROW,COL IN A-REG

               KU17A,
23B1 C5                PUSH    B                 / SVE

               /       COMMON CODE

               KU1705,
23B2 47                MOV     B,A               / SAVE ROW,COL FOR BELOW

23B3 E6F0              ANI     ROWMSK            / ISOLATE ROW
23B5 CF                NSWP                      / ROTATE
                                                 / RIGHT TO
                                                 / FORM
                                                 / COUNTER
23B6 2124FE            LXI     H,MATROW-MAXCOL   / [H,L] <- TABLE BASE
23B9 110B00            LXI     D,MAXCOL          / [D,E] <- OFFSET
               /
23BC 19        KU1710, DAD     D                 / BUMP TO NEXT COLUMN
23BD 3D                DCR     A                 / DECREMENT COUNTER
23BE C2BC23            JNZ     KU1710            / LOOP UNTIL DONE
               /
23C1 78                MOV     A,B               / A <- CURSOR
23C2 E60F              ANI     COLMSK            / ISOLATE COLUMN
23C4 3D                DCR     A                 / MAKE RELATIVE BASE 0
23C5 1600              MVI     D,0               / D <- 0
23C7 5F                MOV     E,A               / E <- ROW - 1
23C8 19                DAD     D                 / [H,L] <- MATRIX ENTRY
               /
23C9 C1                POP     B                 / RESTORE
23CA C9                RET                       / EXIT
                       EJECT
                       SUBJOB  KEY UTILITY : KU18 : INC/DEC MEM USAGE
               /
               /***KEY UTILITY : KU18 : INC/DEC MEMORY USAGE
               /
               /***REGISTER USAGE:
               /
               /        A     - SCRATCH
               /        [B,C] - INC/DEC (BYTE COUNT)
               /
               KU18,
23CB C5                PUSH    B                 / SAVE
23CC D5                PUSH    D
23CD E5                PUSH    H                 / X

23CE 2188FE            LXI     H,MEMUSE          / [H,L] <- POINTER
23D1 E7                GETHL                     / [H,L] <- MEMORY USAGE
23D2 09                DAD     B                 / INCREMENT/DECREMENT
23D3 EB                XCHG                      / SWAP
23D4 2188FE            LXI     H,MEMUSE          / [H,L] <- DESTINATION
23D7 EF                MOVDE                     / STORE DATA
23D8 EB                XCHG                      / SWAP
23D9 111DFD            LXI     D,DSPUSE          / [D,E] <- DESTINATION
23DC CDC201            CALL    BNBCD4            / DISPLAY MEMORY USAGE

23DF E1                POP     H                 / RESTORE ALL
23E0 D1                POP     D
23E1 C1                POP     B                 / X
23E2 C9                RET                       / EXIT
                       EJECT
```

```
                       SUBJOB  KEY UTILITY : KU19 : POWER TO COLUMN 1
                  /
                  /***KEY UTILITY : KU19 :POWER TO COLUMN 1
                  /
                  /***REGISTER USAGE:
                  /
                  /       A     - SCRATCH
                  /       [B,C] - SCRATCH
                  /       [D,E] - SCRATCH
                  /       [H,L] - SCRATCH
                  /
23E3 3A7DFE       KU19,   LDA     CURDSP          / A <- CURSOR
23E6 E60F                 ANI     COLMSK          / ISOLATE COLUMN
23E8 FE01                 CPI     :01             / CHECK FOR FIRST COL
23EA C20924               JNZ     KU19X           / EXIT IF NOT
23ED CD0B23               CALL    KU12            / SET DISPLAY POINTERS
23F0 23                   INX     H               / SKIP FIELD ATTRIBUTE
23F1 1603                 MVI     D,3             / D <- COUNTER
                  /
23F3 7E           KU1905, MOV     A,M             / A <- CHARACTER
23F4 FE60                 CPI     ASCLRE          / DO RANGE CHECK
23F6 DA0924               JC      KU19X           / (EXIT IF NOT)
23F9 FE7F                 CPI     FACNOR-1        / FOR HIGH-LIGHTABLE CHARS
23FB DA0324               JC      KU1910          / (BRANCH IF IN RANGE)
23FE FEC0                 CPI     CA0101          / CHECK CHARACTER ATTRIBUTE

2400 DA0924               JC      KU19X           / EXIT IF NOT
                  /
2403 34           KU1910, INR     M               / HIGH-LIGHT POWER FLOW
2404 23                   INX     H               / BUMP POINTER
2405 15                   DCR     D               / DECREMENT COUNTER
2406 C2F323               JNZ     KU1905          / LOOP UNTIL DONE
                  /
2409 C9           KU19X,  RET                     / EXIT
                          EJECT
                       SUBJOB  KEY UTILITY : KU20 : CONNECT VERTICALS
                  /
                  /***KEY UTILITY : KU20 : CONNECT VERTICALS
                  /
                  /***REGISTER USAGE:
                  /
                  /       A     - SCRATCH
                  /       [B,C] - PRESERVED
                  /       [D,E] - SCRATCH
                  /       [H,L] - PRESERVED
                  /
240A C5           KU20,   PUSH    B               / SAVE [B,C]
240B E5                   PUSH    H               / SAVE [H,L]
240C CD0423               CALL    KU11            / A <- ROW
240F FE01                 CPI     :01             / CHECK FOR TOP ROW
2411 CA4224               JZ      KU20X           / NO WORK FOR TOP ROW
                  /
2414 CD0B23               CALL    KU12            / SET DISPLAY POINTERS
2417 11B6FF               LXI     D,DSPNOD-1-ROWB / [D,E] <- OFFSET
241A 19                   DAD     D               / [H,L] <- VERTICAL ABOVE
241B 7E                   MOV     A,M             / A <- VERTICAL
241C FEE4                 CPI     CA0011          / MUST BE VERTICAL
241E CA2624               JZ      KU2005          / BRANCH OKAY
2421 FEE5                 CPI     CA0011+CATHI    / CHECK HIGHLIGHTED VERT
2423 C24224               JNZ     KU20X           / EXIT ON NO VERT
                  /
2426 115000       KU2005, LXI     D,ROWB          / [D,E] <- OFFSET
2429 19                   DAD     D               / [H,L] <- VERTICAL FOR NOD

242A 7E                   MOV     A,M             / A <- VERTICAL CHARACTE
242B FEE0                 CPI     CA1100          / CHECK FOR DOWN VERTICAL
242D CA3524               JZ      KU2010          / BRANCH ON IT
2430 FEE1                 CPI     CA1100+CATHI    / ALSO CHECK HIGHLIGHT
2432 C23D24               JNZ     KU2015          / MUST HAVE DOWN VERT
                  /
2435 E601         KU2010, ANI     CATHI           / SAVE HIGHLIGHT BIT
2437 F6DC                 ORI     CA1110          / CONNECT UPWARD
2439 77                   MOV     M,A             / AND DISPLAY
243A C34224               JMP     KU20X           / EXIT
                  /
```

```
243D E601     KU2015, ANI     CATHI           / SAVE HIGHLIGHT BIT
243F F6E8             ORI     CA1111          / CONNECT UP AND DOWN
2441 77               MOV     M,A             / DISPLAY CONNECTION
                      /
2442 E1       KU20X,  POP     H               / RESTORE [H,L]
2443 C1               POP     B               / RESTORE [B,C]
2444 C9               RET                     / EXIT
                      EJECT

                      SUBJOB  KEY UTILITY : KU21 : SET DISPLAY TIMERS
                      /
                      /***KEY UTILITY : KU21 : SET DISPLAY TIMERS
                      /
                      /***REGISTER USAGE:
                      /
                      /       A     - SCRATCH
                      /       [B,C] - PRESERVED
                      /       [D,E] - PRESERVED
                      /       [H,L] - PRESERVED
                      /
              KU21,
\####: TEMP UNTIL PWR AND LED TEST!!!!!
2445 C9               RET
\####: END TEMP
2446 3E02             MVI     A,PWRTMR        / A <- TIMER VALUE
2448 3292FD           STA     TMRPWR          / INITIALIZE POWER TIMER
244B 3E1E             MVI     A,LEDTMR        / A <- TIMER VALUE
244D 3291FD           STA     TMRLED          / INITIALIZE TIMER
2450 C9               RET                     / EXIT
                      EJECT

                      SUBJOB  KEY UTILITY : KU22 : COMPUTE COLTAB POINTER
                      /
                      /***KEY UTILITY : KU22 : COMPUTE COLTAB POINTER
                      /
                      /***REGISTER USAGE:
                      /
                      /       A     - SCRATCH
                      /       [B,C] - NOT USED
                      /       [D,E] - SCRATCH
                      /       [H,L] - COLTAB POINTER
                      /
2451 3A7EFE   KU22,   LDA     CURACT          / A <- CURSOR
2454 E60F             ANI     COLMSK          / ISOLATE COLUMN
2456 21E7FD           LXI     H,COLTAB-COLBKL / [H,L] <- STARTING ADDR
2459 110600           LXI     D,COLBKL        / [D,E] <- BLOCK LENGTH
                      /
245C 19       KU2210, DAD     D               / BUMP POINTER
245D 3D               DCR     A               / DECREMENT COUNT
245E C25C24           JNZ     KU2210          / LOOP UNTIL DONE
                      /
2461 C9               RET                     / EXIT
                      EJECT
              SUBJOB  FIXVER = FIX LAST VERTICAL CHAR
              /       FIXVER  IS A SUBR WHICH FIGURES OUT HOW TO
              /               CONNECT (OR DISCONNECT) A VERTICAL
              /               COMING DOWN ONTO THE ROW BELOW.
              /               IT EXAMINES THE CHAR ON THE ROW BELOW
              /               TO SEE WHAT IT CURRENTLY
              /               CONNECTS SO THAT THE NEW VERTICAL
              /               WILL NOT CHANGE OTHER CONNECTIONS.
              /
              /       ** ENTRY
              /               A = NEW VERT CHAR (THIS
              /                   DESCRIBES WHETHER WE ARE SHORTING
              /                   OR OPENING A VERTICAL
              /                   (20= SPACE;  E4= SHORT)
              /               H/L = PTR TO LAST VERTICAL CHAR
              /
              /               CALL    FIXVER
              /
              /       ** EXIT
              /               REGS SAME
              /
              /
              FIXVER,
```

```
2462 C5                PUSH    B          / SAVE
2463 47                MOV     B,A        / SAVE UPPER (NEW) VERT

                /      IF LAST VER CHAR-SPACE, NO PROBLEM
                /      BECAUSE THERE ARE NO OTHER CONNECTIONS

2464 7E                MOV     A,M        / GET PRESENT LAST VERT

                /      IF CHAR THERE IS A DASH, DON'T
                /      CONNECT AT ALL.

2465 E6FF              ANI     -CATHI-1/ STRIP OFF HILITE BIT
2467 FE72              CPI     ASCDSH     / DASH?
2469 C26E24            JNZ     FIXV05     /   NO, GO ON
246C C1                POP     B          /   YES, EXIT NOW
246D C9                RET                / X

                FIXV05,
246E FE20              CPI     ASCBLK     / IS IT SPACE?
2470 C27E24            JNZ     FIXV20     /   NO, GO LOOK AT HOR.

                /      HAVE SPACE NOW, WHAT SHOULD IT BE?

                FIXV10,
2473 B8                CMP     B          / DO WE WANT A SPACE?
2474 C1                POP     B          / (RESTORE ORIG)
2475 CA7B24            JZ      FIXV15     /   YES, GO STORE SPACE

2478 36DC              MVI     M,CA1110/    NO, SET VERT
247A C9                RET                / DONE

                /      HERE TO PUT A SPACE @ LAST VERT

                FIXV15,
247B 3620              MVI     M,ASCBLK/ SET
247D C9                RET                / DONE
                       EJECT
                /      THE CURRENT LAST VERT IS NOT SPACE. LOOK
                /      AT THE CHAR TO THE LEFT, WHICH TELLS US
                /      IF THERE IS A HORIZONTAL ENTITY PRESENT.

                FIXV20,
247E 2B                DCX     H          / STEP TO CHAR @ LEFT
247F 7E                MOV     A,M        / GET IT
2480 23                INX     H          / RESET TO PRESENT VERT
2481 FE20              CPI     ASCBLK     / IS IT SPACE?
2483 CA7324            JZ      FIXV10     /   YES, GO BACK AND DECIDE
                                          /    WHAT IT SHOULD BECOME

\          THE PRESENT CONTACTS ARE NOT
\          NULL.  WE NEED TO ANALYSE WHAT
\          CHANGE IS NESESSARY

                /      THERE ARE 4 TYPES OF CONNECTIONS:
                /      1-HOR ONLY
                /      2-HOR AND VERT ABOVE AND VERT BELOW
                /      3-HOR AND VERT ABOVE ONLY
                /      4-HOR AND VERT BELOW ONLY

                /      WE NEED TO LEAVE THE CONNECTIVITY THAT IS
                /      NOT RELATED TO THE NEW VERTICAL
                /      CONDITION AND ADD IN THE NEW VERT.

                /      BRANCH ON THE 4 TYPES...

2486 7E                MOV     A,M        / GET CURRENT VERT ON SCREEN
2487 E6FE              ANI     -CATHI-1/ STRIP OFF HILITE BIT
2489 FEE0              CPI     CA1100     / IS IT HOR ONLY?
248B CAA024            JZ      FIXV30     /   YES, GO FIX

248E FEE8              CPI     CA1111     / IS IT HOR AND VERT UP/DN?
2490 CAA824            JZ      FIXV40     /   YES, GO FIX

2493 FEDC              CPI     CA1110     / IS IT HOR AND VERT UP ONLY?
2495 CAB024            JZ      FIXV50     /   YES, FO GIX
```

```
                    /       ASSUME. HOR AND VERT DOWN ONLY.
                    /       HERE TO FIX IT. IF NEW VERT = SPACE,
                    /       DO NOTHING.  IF NOT, PUT HOR AND VERT UP/DN

2498 78                     MOV     A,B       / GET NEW VERT
2499 C1                     POP     B         / RESTORE ORIG
249A FE20                   CPI     ASCBLK    / SPACE?
249C C8                     RZ                /   YES, DONE
249D 36E8                   MVI     M,CA1111/    NO, SET HOR AND VERT UP/DN
249F C9                     RET               / DONE
                            EJECT
                    /       HERE TO FIX HOR ONLY. IF SPACE, N/C.
                    /       IF NOT, SET HOR AND VERT UP

                    FIXV30,
24A0 78                     MOV     A,B       / GET NEW VERT
24A1 C1                     POP     B         / RESTORE ORIG
24A2 FE20                   CPI     ASCBLK    / SPACE?
24A4 C8                     RZ                /   YES, DONE
24A5 36DC                   MVI     M,CA1110/    NO, SET HOR AND VERT UP
24A7 C9                     RET               / DONE

                    /       HERE TO FIX HOR AND VERT UP/DOWN
                    /       IF NEW IS SPACE, SET HOR AND VERT DN
                    /       IF NOT, NO CHG

                    FIXV40,
24A8 78                     MOV     A,B       / GET NEW
24A9 C1                     POP     B         / RESTORE
24AA FE20                   CPI     ASCBLK    / SPACE?
24AC C0                     RNZ               /    NO, NO CHG
24AD 36D0                   MVI     M,CA1101/    YES, CHG TO HOR AND VERT DN
24AF C9                     RET

                    /       HERE TO FIX HOR AND VERT UP ONLY.
                    /       IF NEW IS SPACE, CHANGE TO HOR ONLY.
                    /       IF NOT, NO CHG

                    FIXV50,
24B0 78                     MOV     A,B       / GET NEW
24B1 C1                     POP     B         / RESTORE
24B2 FE20                   CPI     ASCBLK    / SPACE?
24B4 C0                     RNZ               /   NO, NO CHG
24B5 36E0                   MVI     M,CA1100/    YES, SET HOR ONLY
24B7 C9                     RET
                            EJECT
                    SUBJOB  COLINC = INCREMENT "COLTAB" ADDRESSES
                    / COLINC IS A SUBR TO INCREMENT ALL
                    /       THE ADDRESSES IN COLTAB BASED UPON A #
                    /       OF NODES INSERTTED.  IT ALSO FIXES 'ADREON'
                    /
                    / *ENTRY:
                    /       C = # OF NODES ADDED
                    /       H/L = PTR TO COLUMN WITH INSERT
                    /
                    /       CALL    COLINC
                    /
                    / *EXIT:
                    /       REGS SAME
                    /
                    COLINC,
24B8 D5                     PUSH    D         /SAVE
24B9 C5                     PUSH    B
24BA E5                     PUSH    H

                    /       SET B/C FOR INCREMENT VALUE

24BB 0600                   MVI     B,0       / CLEAR MS
24BD 60                     MOV     H,B       / SET H/L FOR DOUBLING
24BE 69                     MOV     L,C       / X
24BF 09                     DAD     B         / NOW H/L=2*B/C
24C0 44                     MOV     B,H       / RESET B/C WITH STEP VALUE
24C1 4D                     MOV     C,L       / X

                    /       SEE IF THE CURRENT COLUMN IS EMPTY,
```

```
                         /       IF SO, THIS IS THE 1ST INSET IN COL.

    24C2 E1                      POP      H         / RELOAD PTR
    24C3 E5                      PUSH     H         / X
    24C4 110000                  LXI      D,0       / TO CHECK
    24C7 E7                      GETHL              / GET START ADDR
    24C8 F7                      DCMP               / EMPTY?
    24C9 CAE624                  JZ       COLI20    /    YES, GO FIX THIS COL ONLY
                                 EJECT
                         /       NOT EMPTY, SO FIX LAST ADDRESS AND RIPPLE
                         /       DOWN THE COLUMMS, FIXING EACH

                         /       FETCH THE "LAST ADDR" FROM THIS COL AND STEP IT

    24CC E1                      POP      H         / RELOAD COL PTR
    24CD E5                      PUSH     H         / X
    24CE 110200                  LXI      D,COLEHI/ OFFSET TO LAST ADDR
    24D1 19                      DAD      D         / NOW H/L POINTS TO LAST
    24D2 E5                      PUSH     H         / SAVE IT
    24D3 E7                      GETHL              / GET LAST ADDR
    24D4 09                      DAD      B         / STEP IT
    24D5 EB                      XCHG               / TO D/E FOR STORE
    24D6 E1                      POP      H         / GET PTR TO LAST ADDR
    24D7 EF                      MOVDE              / STORE NEW LAST ADDR

    24D8 E1                      POP      H         / RELOAD PTR
    24D9 E5                      PUSH     H         / X

                         /       NOW STEP TO NEXT COLUMN AND SEE IF DONE

                         COLI10,
    24DA CD4225                  CALL     STEPCL    / STEP TO NEXT COL AND
                                                    /   SEE IF PAST COLTAB OR NEXT I
    24DD DAF624                  JC       COLI99    /   DONE, FIX ADREON AND GO

                         /       NOT DONE, FIX NEXT COLUMN

    24E0 CD5A25                  CALL     FIXCOL    / GO FIX IT
    24E3 C3DA24                  JMP      COLI10    / LOOP TIL DONE
                                 EJECT
                         /       HERE TO FIX ONLY THIS COL WHEN IT IS EMPTY

                         COLI20,

                         /       THE START ADDR = '[ADREON]'+2
                         /       THE END ADDR = START + STEP VALUE -2

    24E6 218EFE                  LXI      H,ADREON/ GET PTR TO END OF NET ADDR
    24E9 E7                      GETHL              / GET IT
    24EA EB                      XCHG               / TO D/E FOR STORE
    24EB 13                      INX      D         / STEP IT TWICE
    24EC 13                      INX      D         / X
    24ED E1                      POP      H         / GET PTR TO COL
    24EE E5                      PUSH     H         / X
    24EF EF                      MOVDE              / STORE START
    24F0 EB                      XCHG               / SET D/E=PTR TO END,
                                                    / SET H/L=START ADDR
    24F1 09                      DAD      B         / CALC END ADDR
    24F2 2B                      DCX      H         / ACCOUNT FOR START NODE
    24F3 2B                      DCX      H         / X
    24F4 EB                      XCHG               / NOW D/E=END, H/L=PTR
    24F5 EF                      MOVDE              / STORE IT

                         /       FIX THE "END OF NET" ADDR, AND USEAGE

                         COLI99,
    24F6 CD6B25                  CALL     FIXEON    / DONE

    24F9 CDCB23                  CALL     KU18      / FIX USEAGE

    24FC E1                      POP      H         / RESTORE
    24FD C1                      POP      B
    24FE D1                      POP      D
    24FF C9                      RET
                                 EJECT
```

```
                 SUBJOB  COLDEC = DECREMENT "COLTAB" ADDRESSES
                 / COLDEC IS A SUBR TO DECREMENT ALL
                 /       THE ADDRESSES IN COLTAB BASED UPON A #
                 /       OF NODES DELETED.  IT ALSO FIXES 'ADREON'
                 /
                 / *ENTRY:
                 /       C = # OF NODES DELETED
                 /       H/L = PTR TO COLUMN WITH DELETE
                 /
                 /       CALL    COLDEC
                 /
                 / *EXIT:
                 /       REGS SAME
                 /
                 COLDEC,
2500 D5                  PUSH    D       /SAVE
2501 C5                  PUSH    B
2502 E5                  PUSH    H

                 /       SET B/C FOR DECREMENT VALUE

2503 0600                MVI     B;0     / CLEAR MS
2505 60                  MOV     H;B     / SET H/L FOR DOUBLING
2506 69                  MOV     L;C     / X
2507 09                  DAD     B       / NOW H/L=2*B/C

                 /       NOW TWO'S COMP IT

2508 7D                  MOV     A;L     / GET LS BYTE
2509 2F                  CMA             / ONE'S COMP
250A 4F                  MOV     C;A     / SET LS BYTE
250B 7C                  MOV     A;H     / GET MS BYTE
250C 2F                  CMA             / X
250D 47                  MOV     B;A     / SET MS BYTE
250E 03                  INX     B       / NOW B/C = NEG STEP

                 /       GET THE LAST ADDR IN THIS COL AND DECR
                 /       IT.  IF IT IS < START ADDR, THE LAST ITEM IN
                 /       THIS COL IS BEING DELETED.

250F E1                  POP     H       / RELOAD PTR
2510 E5                  PUSH    H       / X

2511 110200              LXI     D;COLEHI/ OFFSET TO LAST
2514 19                  DAD     D       / NOW H/L=PTR TO LAST
2515 E5                  PUSH    H       / SAVE FOR LATER
2516 E7                  GETHL           / GET LAST ADDR
2517 09                  DAD     B       / DECR IT
2518 EB                  XCHG            / NOW D/E = NEW LAST ADDR
2519 E1                  POP     H       / GET PTR TO LAST ADR
251A EF                  MOVDE           / STORE IT

                 /       NOW SEE IF COL IS EMPTY

251B E1                  POP     H       / RELOAD PTR
251C E5                  PUSH    H       / X
251D E7                  GETHL           / GET START
251E F7                  DCMP            / COMPARE END:START
251F DA3025              JC      COLD20  /   END IS LESS!
                                         /   GO CLEAR COLUMN

                 /       NOT LAST NODE DELETE, SO RIPPLE THRU COLTAB

2522 E1                  POP     H       / RELOAD PTR
2523 E5                  PUSH    H       / X
                 COLD10,
2524 CD4225              CALL    STEPCL  / STEP AND SEE IF DONE
2527 DA3825              JC      COLD99  /   DONE, FIX ADREON
252A CD5A25              CALL    FIXCOL  / NOT DONE, FIX THIS COL
252D C32425              JMP     COLD10  /   AND LOOP TIL DONE

                 /       LAST NODE IN COL IS DELETED, CLEAR COLUMN IN
                 /       COLTAB

                 COLD20,
```

```
2530 E1              POP     H          / GET PTR
2531 E5              PUSH    H          / X
2532 110000          LXI     D,0        / CLEAR VALUE
2535 EF              MOVDE              / CLEAR START ADDR
2536 EF              MOVDE              / CLEAR END ADDR
2537 EF              MOVDE              / CLEAR EOC NODE

            /        FIX THE "END OF NET" ADDR

            COLD99,
2538 CD6B25          CALL    FIXEON  / DONE

253B CDCB23          CALL    KU18    / FIX USEAGE

253E E1              POP     H       / RESTORE
253F C1              POP     B
2540 D1              POP     D
2541 C9              RET
                     EJECT

            SUBJOB  STEPCL = STEP A PTR TO COLTAB AND CHECK DONE
            / STEPCL IS A SUBR TO STEP TO THE NEXT COLUMN IN COLTAB
            /        AND CHECK TO SEE IF DONE.  IT IS DONE IF
            /        THE POINTER GOES PAST THE END OF TABLE OR IF THE
            /        ADDRESS IN THE NEXT COLUMN IS ZERO.
            /
            / *ENTRY
            /        H/L=CURRENT PTR
            /
            /        CALL    STEPCL
            /
            / *EXIT
            /        H/L=NEXT COLUMN
            /        C SET IF DONE OR NEXT COL IS EMPTY
            /        C RESET IF NEITHER
            /
            STEPCL,
2542 D5              PUSH    D          / SAVE

2543 110600          LXI     D,COLBKL/ SIZE (COL STEP VALUE)
2546 19              DAD     D          / NOW H/L POINTS TO NEW
2547 112EFE          LXI     D,COLTBX-1/ GET END OF TABLE
254A F7              DCMP               / END<START?
254B D1              POP     D          / (IN CASE WE EXIT)
254C D8              RC                 /    YES!, EXIT NOW
                                        /    C IS SET

            /        NOT AT END, SO SEE IF NEXT IS 0

254D D5              PUSH    D          / SAVE AGAIN
254E 110000          LXI     D,0        / FOR TEST
2551 E5              PUSH    H          / SAVE PTR
2552 E7              GETHL              / GET START IN NEXT COL
2553 F7              DCMP               / IS IT ZERO? (EMPTY)
2554 E1              POP     H          / (RESTORE FOR EXIT)
2555 D1              POP     D          / (DITTO)
2556 37              STC                / SET CARRY IN CASE OF ZERO
2557 C8              RZ                 / RETURN DONE!

2558 3F              CMC                / RESET FOR NOT DONE
2559 C9              RET                / X
                     EJECT

            SUBJOB  FIXCOL = FIX ONE COLUMN IN "COLTAB"
            / FIXCOL IS A SUBR TO FIX THE START AND END ADDRESSES
            /        IN ONE COLUMN OF COLTAB, USING A STEP VALUE (+/-
            /
            / *ENTRY
            /        H/L=PTR TO A COLUMN
            /        B/C=STEP VALUE (+/-)
            /
            /        CALL    FIXCOL
            /
            / *EXIT
            /        H/L, B/C SAME
            /
            FIXCOL,
```

```
2555A D5                PUSH    D          / SAVE
2555B E5                PUSH    H

2555C E7                GETHL              / GET START ADDRESS
2555D 09                DAD     B          / STEP IT
2555E EB                XCHG               / SET TO D/E FOR STORE
2555F E1                POP     H          / RELOAD PTR TO START
2560 E5                 PUSH    H          / X
2561 EF                 MOVDE              / STORE NEW START ADDR

2562 E5                 PUSH    H          / SAVE STEPPED PTR (END)
2563 E7                 GETHL              / GET OLD END ADDR
2564 09                 DAD     B          / STEP IT
2565 EB                 XCHG               / TO D/E FOR STORE
2566 E1                 POP     H          / GET PTR TO END ADDR
2567 EF                 MOVDE              / STORE IT

2568 E1                 POP     H          / RESTORE AND EXIT
2569 D1                 POP     D          / X
256A C9                 RET
                        EJECT

               SUBJOB  FIXEON = FIX THE END OF NETWORK ADR
               / FIXEON IS A SUBR TO ADJUST THE END OF NETWORK
               /        ADDR BY A STEP VALUE (+/-)
               /
               / *ENTRY
               /        B/C = STEP VALUE
               /
               /        CALL    FIXEON
               /
               / *EXIT
               /        B/C SSAME
               /
               FIXEON,
256B D5                 PUSH    D          /SAVE
256C E5                 PUSH    H

256D 218EFE             LXI     H,ADREON/ GET PTR TO END ADDR
2570 E7                 GETHL              / GET IT
2571 09                 DAD     B          / FIX IT!!!!!!
2572 EB                 XCHG               / TO D/E FOR STORE
2573 218EFE             LXI     H,ADREON/ GET PTR TO END AGAIN
2576 EF                 MOVDE              / STORE NEW ADDR

2577 E1                 POP     H          / RESTORE AND EXIT
2578 D1                 POP     D
2579 C9                 RET
                        EJECT

               SUBJOB  ISCOIL = SEE IF CONTACT IS A COIL TYPE

               / ISCOIL IS A SUBR TO SEE IF THE CONTACT TYPE
               /        IN A = COIL TYPE
               /
               / *ENTRY
               /        A = CONTACT TYPE
               /
               /        CALL    ISCOIL
               /
               / *EXIT
               /        A = SAME
               /        CARRY SET IF NOT COIL TYPE
               /        CARRY RESET IF COIL TYPE
               /
               ISCOIL,
257A FE07               CPI     NOCOIL  / IS IT < COIL TYPE?
257C D8                 RC              /   YES, RETURN 'NOT COIL'

257D FE0B               CPI     NODLAT+1/ IS IT > COIL TYPE?
257F 3F                 CMC                / SET CARRY PROPERLY FOR EXIT
2580 C9                 RET                / EXIT
                        EJECT
```

```
                    SUBJOB  PERIPHERAL I/O HANDLER
            /
            /***PERIPHERAL I/O HANDLER
            /
            /***INPUTS:
            /
            /       D      - FUNCTION CODE
            /       E      - MESSAGE LENGTH
            /       CMDBUF - FORMATTED DATA
            /
            /***OUTPUTS:
            /
            /       Z-BIT. EQ. 1 => OKAY; RESPONSE IN BUFFER
            /       Z-BIT. EQ. 0 => UNABLE TO COMPLETE TRANSACTION
            /
            /***BUILDS MESSAGE PACKET
            /
            /       TRANSMIT DATA
            /       CHECKS RESPONSE FOR NON-MESSAGE REALTED ERRORS
            /       RETURNS
            /
            /***REGISTER USAGE:
            /
            /       A     - SCRATCH
            /       [B,C] - SCRATCH
            /       [D,E] - FUNCTION/LENGTH
            /       [H,L] - SCRATCH
            /
                    EJECT

2581 AF     PIO,    CLA                     / INITIALIZE
2582 32B2FD         STA     RCOUNT          / RETRY COUNT
            /
2585 2190FE         LXI     H,CMDBUF        / [H,L] <- COMMAND BUFFER
2588 3602           MVI     M,ASCSTX        / LOAD AN STX
258A 23             INX     H               / BUMP POINTER
258B EF             MOVDE                   / STORE COMMAND DATA
258C 2190FE         LXI     H,CMDBUF        / [H,L] <- POINTER
258F 3EFF           MVI     A,:FF           / A <- START OF CHECKSUM
2591 D5             PUSH    D               / SAVE PARAMETERS
2592 1D             DCR     E               / ACCOUNT FOR STX
            /
2593 86     PIO010, ADD     M               / UPDATE CHKSUM
2594 23             INX     H               / BUMP POINTER
2595 1D             DCR     E               / DECREMENT COUNTER
2596 C29325         JNZ     PIO010          / LOOP UNTIL DONE
2599 77             MOV     M,A             / STORE CHECKSUM
            /
259A 2190FE PIO020, LXI     H,CMDBUF        / [H,L] <- START OF BUFFER
259D 01A2FD         LXI     B,PPOBLK        / [B,C] <- BUFFER BLKADDR
25A0 D1             POP     D               / GET COUNTER
25A1 D5             PUSH    D               / STACK IT AGAIN
            /
25A2 7E     PIO030, MOV     A,M             / A <- NEXT BYTE
25A3 D5             PUSH    D               / SAVE COUNTER
25A4 E5             PUSH    H               / SAVE POINTER
25A5 CD2E01         CALL    BFCH            / BUFFER BYTE
25A8 E1             POP     H               / GET POINTER
25A9 D1             POP     D               / GET COUNT
25AA 23             INX     H               / INCREMENT POINTER
25AB 1D             DCR     E               / DECREMENT COUNT
25AC C2A225         JNZ     PIO030          / LOOP UNTIL DONE
            /
25AF CDE126         CALL    PU02            / CHECK BUSY STATUS
25B2 CAD425         JZ      PIO060          / BRANCH NOT BUSY
            /
25B5 118827 PIO040, LXI     D,MSGBSY        / [D,E] <- SOURCE ADDR
25B8 216CFC         LXI     H,DSPBSY        / [H,L] <- DESTINATION ADDR
25BB CD0301         CALL    MOVSTR          / DISPLAY MESSAGE
25BE CD2004         CALL    PPINIT          / INITIALIZE PORT
            /
25C1 CDE126 PIO050, CALL    PU02            / CHECK FOR PORT BUSY
25C4 C2C125         JNZ     PIO050          / WAIT UNTIL AVAILABLE
25C7 3A8827         LDA     MSGBSY          / A <- BYTE COUNT
25CA 216CFC         LXI     H,DSPBSY        / [H,L] <- ADDR
```

```
2SCD 57                  MOV    D,A              / D <- BYTE COUNT
25CE CD1903              CALL   ROWN10           / CLEAR FIELD
25D1 C39A25              JMP    PI0020           / START MESSAGE AGAIN
                         EJECT

25D4 3E3C       PI0060,  MVI    A,ACKTMR         / A <- ACKNOWLEDGE TIMER
25D6 3290FD              STA    TMRACK           / LOAD TIMER
25D9 3E27                MVI    A,PPCMD+SPCDTR   / A <- COMMAND CODE
25DB D33A                OUT    SPICTL           / ENABLE INTERRUPT
                /
25DD CDE124     PI0070,  CALL   PU02             / CHECK PORT AVAILABILIT
25E0 C2B525              JNZ    PI0040           / BRANCH IF NOT
25E3 3A90FD              LDA    TMRACK           / A <- ACK TIMER
25E6 B7                  TST                     / CHECK
25E7 CAF925              JZ     PI0085           / BRANCH IF TIME-OUT
                /
25EA 21AEFD     PI0080,  LXI    H,PPISTA         / [H,L] <- STATUS ADDR
25ED 7E                  MOV    A,M              / A <- STATUS
25EE E620                ANI    PPIDUN           / CHECK FOR DONE
25F0 C24126              JNZ    PI0100           / BRANCH ON DONE
25F3 7E                  MOV    A,M              / A <- STATUS
25F4 E604                ANI    PPIRET           / CHECK FOR RETRAN
25F6 CADD25              JZ     PI0070           / LOOP IF NOT
                /
25F9 21B2FD     PI0085,  LXI    H,RCOUNT         / ERROR, CHECK RETRIES
25FC 34                  INR    M                / BUMP COUNT
25FD 3E05                MVI    A,MAXTRY+1       / COMPARE AGAINST MAX
25FF BE                  CMP    M                / RETRY COUNT
2600 CA0E26              JZ     PI0090           / BRANCH ON HARD ERROR
                PI0087,
2603 3AAEFD              LDA    PPISTA           / A <- STATUS
2606 E6E1                ANI    -1-PPIOVR-PPIRET-PPIPAR-PPICER
2608 32AEFD              STA    PPISTA           / CLEAR FLAGS
260B C39A25              JMP    PI0020           / TRY AGAIN
                         EJECT
\         HERE FOR ALL I/O ERRORS
                /
260E 21AEFD     PI0090,  LXI    H,PPISTA         / [H,L] <- STATUS ADDR
2611 11FB26              LXI    D,MSGOVR         / [D,E] <- MESSAGE ADDR
2614 7E                  MOV    A,M              / A <- STATUS
2615 E608                ANI    PPIOVR           / CHECK FOR OVERRUN
2617 C22F26              JNZ    PIOERR           / BRANCH ON OVERRUN
261A 11EE26              LXI    D,MSGPAR         / [D,E] <- MESSAGE ADDR
261D 7E                  MOV    A,M              / A <- STATUS
261E E610                ANI    PPIPAR           / CHECK FOR PARITY/FRAMING
2620 C22F26              JNZ    PIOERR           / BRANCH ON PARITY/FRAMING
2623 110727              LXI    D,MSGCHK         / [D,E] <- MESSAGE ADDR
2626 7E                  MOV    A,M              / A <- STATUS BYTE
2627 E602                ANI    PPICER           / CHECK FOR CHKSUM ERROR
2629 C22F26              JNZ    PIOERR           / BRANCH ON IT
262C 11A927              LXI    D,MSGRSP         / MUST BE TIME-OUT
                /
262F CD7E05     PIOERR,  CALL   ERROR            / DISPLAY MESSAGE
2632 3A7CFE              LDA    KSTATE           / SET P180 I/O ERROR BIT
2635 F640                ORI    KERROR           / X
2637 327CFE              STA    KSTATE           / (FORCES RST 0 BY USER)
263A D1                  POP    D                / CLEAR COMMAND CODE
263B CD2004              CALL   PPINIT           / INIT THE PORT
263E C39026              JMP    PI0130           / GO TO EXIT
                         EJECT

                /
2641 AF         PI0100,  CLA                     / RESPONSE RECEIVED
2642 3290FD              STA    TMRACK           / CLEAR TIMER
2645 3AAEFD              LDA    PPISTA           / A <- STATUS
2648 E6DF                ANI    -1-PPIDUN        / CLEAR DONE FLAG
264A 32AEFD              STA    PPISTA           / STORE FLAG
264D 019CFD              LXI    B,PPIBLK         / [B,C] <- BUFFER BLK ADDR
2650 CD5601              CALL   UBFCH            / GET COMMAND
2653 21A8FE              LXI    H,RSPBUF         / [H,L] <- RESPONSE BLK
2656 77                  MOV    M,A              / A <- RESPONSE
2657 E5                  PUSH   H                / STACK IT
2658 CD5601              CALL   UBFCH            / GET COUNT
265B E1                  POP    H                / RESTORE POINTER
265C D603                SUI    03               / ADJUST COUNTER
265E 57                  MOV    D,A              / D <- REMAINING COUNT
```

```
                   /
265F E5            PIO110, PUSH   H            / SAVE POINTER
2660 CD5601                CALL   UBFCH        / GET NEXT BYTE
2663 E1                    POP    H            / RESTORE POINTER
2664 23                    INX    H            / BUMP POINTER
2665 77                    MOV    M,A          / STORE INTO BUFFER
2666 15                    DCR    D            / DECREMENT COUNT
2667 C25F26                JNZ    PIO110       / LOOP UNTIL DONE
                   /
266A D1                    POP    D            / GET PARAMETERS
266B 21A8FE                LXI    H,RSPBUF     / [H,L] <- RESPONSE BUFFER
266E 7E                    MOV    A,M          / A <- FUNCTION CODE
266F FED0                  CPI    ASCNAK       / CHECK FOR NAK
2671 CA8826                JZ     PIO120       / BRANCH ON NAK
2674 BA                    CMP    D            / DO FUNCTION CHECK
2675 CA9226                JZ     PIOX         / MATCH! I/O OKAY
                                               /   SO EXIT
                           EJECT
                   /       HERE WHEN RESPONSE WAS NOT WHAT WE
                   /       ASKED FOR, NOR WAS IT "NAK".  ASSUME
                   /       GARBAGE AND RETRY.

2678 21B2FD                LXI    H,RCOUNT     / POINT TO RETRY COUNT
267B 34                    INR    M            / STEP IT
267C 3E05                  MVI    A,MAXTRY+1   / CHECK TO MAX
267E BE                    CMP    M            / TRIED ALL?
267F C20326                JNZ    PIO087       /   NO, GO REPEAT
2682 11F827                LXI    D,MSGRES     /   YES, GET ERROR MGS
2685 C32F26                JMP    PIOERR       /   AND GO DISPLAY IT
                   /
2688 23            PIO120, INX    H            / BUMP POINTER TO
2689 7E                    MOV    A,M          / GET NAK CODE
268A 219326                LXI    H,PIOTAB     / [H,L] <- TABLE ADDR
268D CDC726                CALL   PU01         / DO TABLE CHECK
                   /
2690 AF            PIO130, CLA                 / A <- 0
2691 3C                    INR    A            / Z-BIT <- 0
                   /
2692 C9            PIOX,   RET                 / EXIT
                           EJECT

                   /
                   /***TABLE
                   /
2693 11            PIOTAB, DB     PIOTBL
2694 01                    DB     ERRPAR       / PARITY/FRAMING
2695 EE26                  DW     MSGPAR
2697 02                    DB     ERROVR       / OVERRUN
2698 FB26                  DW     MSGOVR
269A 03                    DB     ERRCHK       / CHECKSUM
269B 0727                  DW     MSGCHK
269D 07                    DB     ERRTIM       / TIME OUT
269E 3527                  DW     MSGTIM
26A0 04                    DB     ERRADR       / ADDRESS ERROR
26A1 3D27                  DW     MSGADR
26A3 05                    DB     ERRADI       / INVALID ADDRESS
26A4 4A27                  DW     MSGADI
26A6 06                    DB     ERRCMD       / INVALID COMMAND CODE
26A7 B327                  DW     MSGCMD
26A9 08                    DB     ERRMSK
26AA 5727                  DW     MSGMSK
26AC 09                    DB     ERRSEQ       / BAD STEP NUMBER
26AD 9227                  DW     MSGSEQ
26AF 0A                    DB     ERRNOD       / INVALID NODE
26B0 6427                  DW     MSGNOD
26B2 0B                    DB     ERRMEM       / MEMORY PROTECT FAULT
26B3 1027                  DW     MSGMEM
26B5 0C                    DB     ERRSTP       / NOT STOP STATE
26B6 2927                  DW     MSGSTP
26B8 0D                    DB     ERRLEN       / BAD LENGTH
26B9 0528                  DW     MSGBDL
26BB 0E                    DB     ERRCON       / BAD CONTACT
26BC BF27                  DW     MSGCON
26BE 0F                    DB     ERRNPD       / NOT IN POWER DISPLAY
26BF 9D27                  DW     MSGNPD
26C1 10                    DB     ERRSUP       / NODE NOT SUPPORTED
```

```
2602 7127           DW      MSGSUP
2604 11             DB      ERRFUL               / MEMORY FULL
2605 7027           DW      MSGFUL
                 /
          0011   PIOTBL- .-PIOTAB-1%3
                    EJECT

                    SUBJOB PERIPHERAL UTILITY : PU01 : NAK CODE SEAR H
                 /
                 /***PERIPHERAL UTILITY : PU01 : NAK SEARCH
                 /
                 /***PARAMETERS.
                 /
                 /          Z-BIT.EQ.0 => NO MATCH
                 /          Z-BIT.EQ.1 => MATCH FOUND
                 /
                 /***TABLE FORMAT:
                 /
                 /          BYTE     CONTENTS
                 /            0      NUMBER OF ENTRIES
                 /            1      ENTRY 1 - NAK CODE
                 /            2      ENTRY 1 - MESSAGE ADDRLO
                 /            3      ENTRY 1 - MESSAGE ADDRHI
                 /            4      ENTRY 2 - NAK CODE
                 /            5      ENTRY 2 - MESSAGE ADDRLO
                 /            6      ENTRY 2 - MESSAGE ADDRHI
                 /          ETC
                 /
                 /***REGISTER USAGE.
                 /
                 /          A      - NAK CODE
                 /          [B,C]  - COUNT
                 /          [D,E]  - MESSAGE ADDR
                 /          [H,L]  - TABLE ADDRESS
                 /
                    EJECT .

26C7 46          PU01,      MOV     B,M                  / B <- ENTRY COUNT
26C8 23                     INX     H                    / BUMP POINTER
                 /
26C9 BE          PU0110,    CMP     M                    / CHECK FOR NAK CODE MATCH
26CA CAD826                 JZ      PU0120               / BRANCH ON MATCH
26CD 23                     INX     H                    / BUMP POINTER
26CE 23                     INX     H                    / TO NEXT
26CF 23                     INX     H                    / TABLE ENTRY
26D0 05                     DCR     B                    / DECREMENT ENTRY COUNT
26D1 C2C926                 JNZ     PU0110               / LOOP IF NOT DONE
26D4 04                     INR     B                    / Z <- 0
26D5 C3E026                 JMP     PU01X                / GO TO EXIT
                 /
26D8 23          PU0120,    INX     H                    / BUMP POINTER
26D9 5E                     MOV     E,M                  / E <- MESSAGE ADDRLO
26DA 23                     INX     H                    / BUMP POINTER
26DB 56                     MOV     D,M                  / D <- MESSAGE ADDRHI
26DC CD7E05                 CALL    ERROR                / SET ERROR STATE
26DF AF                     CLA                          / SET Z-BIT
                 /
26E0 C9          PU01X,     RET                          / EXIT
                            EJECT

                    SUBJOB PERIPHERAL UTILITY : PU02 : PORT STATUS
                 /
                 /***PERIPHERAL UTILITY : PU02 : PORT STATUS
                 /
                 /***PARAMETERS.
                 /
                 /          Z-BIT.EQ.0 => PORT NOT AVAILABLE
                 /          Z-BIT.EQ.1 => PORT AVAILABLE

                 /***REGISTER USAGE.
                 /
                 /          A      - SCRATCH
                 /          [B,C]  - NOT USED
                 /          [D,E]  - NOT USED
```

```
                        /         [H,L] - NOT USED
                        /
     26E1 DB3A          PU02,     IN       SP1STA             / REAT STATUS
     26E3 E680                    ANI      SPSDSR             / CHECK DSR (-EIA)
     26E5 C2EC26                  JNZ      PU0210             / BRANCH IF AVAILABLE
     26E8 3C                      INR      A                  / Z-BIT <- 0
     26E9 C3ED26                  JMP      PU02X              / GO TO EXIT
                        /
     26EC AF            PU0210,   CLA                         / Z-BIT <- 1
                        /
     26ED C9            PU02X,    RET                         / EXIT
                                  EJECT

                                  SUBJOB  MESSAGE AREA
                        /
                        /***THIS SECTION CONTAINS ALL THE SYSTEM MSSAGES
                        /
                        /***MESSAGE FORMAT:
                        /
                        /         MSG,     DB MSGEND
                        /                  DA '...TEXT...'
                        /         MSGEND=.-MSG-1
                        /
     26EE 0C            MSGPAR,   DB       MSGPAX
     26EF 50415249                DA       'PARITY ERROR'
     26F3 54592045
     26F7 52524F52
          000C          MSGPAX= .-MSGPAR-1
                        /
     26FB 0B            MSGOVR,   DB       MSGOVX
     26FC 4F564552                DA       'OVERRUN ERR'
     2700 52554E20
     2704 455252
          000B          MSGOVX= .-MSGOVR-1
                        /
     2707 0C            MSGCHK,   DB       MSGCHX
     2708 43484B53                DA       'CHKSUM ERROR'
     270C 554D2045
     2710 52524F52
          000C          MSGCHX= .-MSGCHK-1
                        /
     2714 08            MSGHI,    DB       MSGHIX
     2715 52455620                DA       'REV '
     2719 41                      DB       MAJREV             / MASTER REV LEVEL
     271A 583233                  DB       DVR1,DVR2,DVR3     / DEVELOPMENT LEVEL
          0008          MSGHIX= .-MSGHI-1
                        /
     271D 0B            MSGMEM,   DB       MSGMEX
     271E 4D454D20                DA       'MEM PROTECT'
     2722 50524F54
     2726 454354
          000B          MSGMEX= .-MSGMEM-1                    / MESSAGE LENGTH
                        /
     2729 0B            MSGSTP,   DB       MSGSTX
     272A 34383420                DA       '484 RUNNING'
     272E 52554E4E
     2732 494E47
          000B          MSGSTX= .-MSGSTP-1                    / MESSAGE LENGTH
                        /
     2735 07            MSGTIM,   DB       MSGTIX
     2736 54494D45                DA       'TIMEOUT'
     273A 4F5554
          0007          MSGTIX= .-MSGTIM-1
                        /
     273D 0C            MSGADR,   DB       MSGADX
     273E 42414420                DA       'BAD ADR RNGE'
     2742 41445220
     2746 524E4745
          000C          MSGADX= .-MSGADR-1
                        /
     274A 0C            MSGADI,   DB       MSGADY
     274B 494C4C45                DA       'ILLEGAL ADDR'
     274F 47414C20
     2753 41444452
          000C          MSGADY= .-MSGADI-1
```

```
                        /
     2757 0C            MSGMSK, DB      MSGMSX
     2758 494C4C45              DA      'ILLEGAL MASK'
     275C 47414C20
     2760 4D41534B
          000C          MSGMSX= .-MSGMSK-1
                        /
     2764 0C            MSGNOD, DB      MSGNOX
     2765 494C4C45              DA      'ILLEGAL NODE'
     2769 47414C20
     276D 4E4F4445
          000C          MSGNOX= .-MSGNOD-1
                        /
     2771 0A            MSGSUP, DB      MSGSUX
     2772 53555045              DA      'SUPERVISOR'
     2776 52564953
     277A 4F52
          000A          MSGSUX= .-MSGSUP-1
                        /
     277C 0B            MSGFUL, DB      MSGFUX
     277D 4D454D4F              DA      'MEMORY FULL'
     2781 52592046
     2785 554C4C
          000B          MSGFUX= .-MSGFUL-1
                        /
     2788 09            MSGBSY, DB      MSGBSX
     2789 434F4D4D              DA      'COMM BUSY'
     278D 20425553
     2791 59
          0009          MSGBSX= .-MSGBSY-1
                        /
     2792 0A            MSGSEQ, DB      MSGSEX
     2793 42414420              DA      'BAD STEP #'
     2797 53544550
     279B 2023
          000A          MSGSEX= .-MSGSEQ-1
                        /
     279D 0B            MSGNPD, DB      MSGNPX
     279E 42414420              DA      'BAD LED REQ'
     27A2 4C454420
     27A6 524551
          000B          MSGNPX= .-MSGNPD-1
                        /
     27A9 09            MSGRSP, DB      MSGRSX
     27AA 4E4F2041              DA      'NO ANSWER'
     27AE 4E535745
     27B2 52
          0009          MSGRSX= .-MSGRSP-1
                        /
     27B3 0B            MSGCMD, DB      MSGCMX
     27B4 42414420              DA      'BAD COMMAND'
     27B8 434F4D4D
     27BC 414E44
          000B          MSGCMX= .-MSGCMD-1
                        /
     27BF 0B            MSGCON, DB      MSGCOX
     27C0 42414420              DA      'BAD CONTACT'
     27C4 434F4E54
     27C8 414354
          000B          MSGCOX= .-MSGCON-1
                        /
     27CB 0B            MSGSOL, DB      MSGSOX
     27CC 53544152              DA      'START LOGIC'
     27D0 54204C4F
     27D4 474943
          000B          MSGSOX= .-MSGSOL-1
                        /
     27D7 0C            MSGEOL, DB      MSGEOX
     27D8 454E4420              DA      'END OF LOGIC'
     27DC 4F46204C
     27E0 4F474943
          000C          MSGEOX= .-MSGEOL-1
                        /
     27E4 0A            MSGNET, DB      MSGNEX
     27E5 4E4F204E              DA      'NO NETWORK'
     27E9 4554574F
     27ED 524B
```

```
          000A      MSGNEX= .-MSGNET-1
                    /
     27EF 08        MSGSCH, DB      MSGSCX
     27F0 4E4F204D          DA      'NO MATCH'
     27F4 41544348
          0008      MSGSCX= .-MSGSCH-1
                    /
     27F8 0C        MSGRES, DB      MSGREX
     27F9 42414420          DA      'BAD RESPONSE'
     27FD 52455350
     2801 4F4E5345
          000C      MSGREX=.-MSGRES-1

     2805 0A        MSGBDL, DB      MSGBDX
     2806 42414420          DA      'BAD LENGTH'
     280A 4C454E47
     280E 5448
          000A      MSGBDX=.-MSGBDL-1
                            EJECT

                    JOB \LDV 180 MOD 01 REV AX21


                    /       COPYRIGHT, (C) 1978, GOULD INC., MODICON DIV.,
                    /       ALL RIGHTS RESERVED. NO PART OF THIS PROGRAM
                    /       MAY BE REPRODUCED IN ANY FORM WITHOUT THE
                    /       EXPRESS WRITTEN PERMISSION OF GOULD INC.


                    /       WRITTEN BY: R. SOLOMON

                            EJECT

                    SUBJOB \        REVISION HISTORY OF THIS FILE

                    /       THIS SECTION CONTAINS INFORMATION PERTAINING
                    /       TO ALL REVISIONS. THIS INFROMATION MUST
                    /       CONSIST OF AT LEAST:
                    /               1- NEW REVISION LETTER
                    /               2- WHAT OTHER FILES WERE AFFECTED
                    /               3- WHY REVISION WAS DONE.
                    /               4- ALL "ECO" #'S FOR THE REVISION.

                              REVISION A

                    /               REVISION A IS THE ORIGINAL PROGRAM RELEASE
                    /               ECO # = XXXX

                            EJECT

                    SUBJOB \        FILE DESCRIPTION OF LDV 180

                    /       THIS FILE CONTAINS SOURCE FOR THE
                    /       LOAD-DUMP-VERIFY FUNCTIONS OF
                    /       THE P180 PROGRAMMING PANEL FOR
                    /       THE 484 CONTROLLER.

                            EJECT
                    SUBJOB \  DATA FOR DUMP-LOAD-VER

          0010      MAXBUF= @16             / MAX BUFFER THAT CAN BE
                                            / SENT TO 484
                                            / ALSO SIZE OF TAPE RECORD

          3030      ASCZZ= :3030            / ASCII 00 FOR CREATION OF
                                            / INTEL RECORDS

          3031      ASC01= :3031            / '01' RECORD FOR 484 TAPES

          4646      ENDCHK= :4646           / 'FF' CHECKSUM OF END OF TAPE
                                            / RECORD FOR 484 DUMP

          002F      LENCAS= @47             / LENGTH OF MAXIMUM CASSETTE RECORD

          0D0A      CRLF= :0D0A             / ASCII CRLF

          0003      TYPE1= 3        / USER LOGIC RAM FLAG
```

```
        0002        TYPE2= 2          / COIL RAM FLAG
        0001        TYPE3= 1                    / REGISTER RAM FLAG
        0001        TYPEO1= 1                   / RECORD TYPE FOR CASS.
        0000        FIELD1= 0         / HI-ORDER NIBBLE - LOGIC RAM
        0020        FIELD2= :20       / HI-ORDER NIBBLE - COIL RAM
                              EJECT

                    SUBJOB \          DUMP - DUMP 484 TO PORT 2
                    /         THIS ROUTINE WILL DUMP AN ENTIRE 484
                    /         CONTROLLER TO THE PRIPHERAL PORT # 2
                    /         IN INTEL FORMAT FOR A CASSETTE.
                    /         ENTRY IS FROM 'SUPERVISORY' STATE BY SELECTING
                    /         THE PROPER KEY.
                    /
                    /         EXIT IS TO 'EXEC'
                              EJECT

                    DUMP,
                    /         DISPLAY ADVISORY MESSAGE
2810 115C2D                   LXI     D;MSGDPG/ "DUMPING"
2813 CD681F                   CALL    KU04    / DISPLAY
                    /         INITIALIZE PORT  2
                    /         MUST ADVANCE PAST LEADER
                    /         APPROX  8  SEC.  DELAY
2816 CDCC2A                   CALL    P2INIT  / INIT PERIPHERAL PORT 2
2819 0614                     MVI     B;@20   / CTR FOR 10 SEC DELAY
281B 3E35                     MVI     A;SPCRTS+SPCER+SPCRE+SPCTE  / TURN ON XMIT
281D D33C                     OUT     SP2CTL  /DONE
                    DUMP2,
281F CD5B2C                   CALL    DELHLF  / .5 SEC DELAY
2822 05                       DCR     B       / DONE YET?
2823 C21F28                   JNZ     DUMP2   / 0 --> DONE
2826 3E15                     MVI     A;:15   / STOP TAPE
2828 D33C                     OUT     SP2CTL  / DONE
282A 3E03                     MVI     A;TYPE1 / FIND 1ST,LAST ADDR OF USER LOGIC
282C F5                       PUSH    PSW     / SAVE RAM TYPE
                    DUMP10,
282D CD1529                   CALL    CON484  / GET HI ADDRESS INTO EOUSEG
                                              / 2 BYTES (HI,LO), LOEST->H/L
                    DUMP15,
2830 F1                       POP     PSW     / GET RAM TYPE
2831 F5                       PUSH    PSW     / SAVE RAM TYPE
2832 CD5B28                   CALL    DUMP20  / GET SIZE OF READ
2835 DA4928                   JC      DUMP30  / CY=1 --> END OF SEGMENT
2838 CD6228                   CALL    DUMP25  / DO THE READ

\            WE SUCCESSFULLY READ THE DATA
\            PREPARE TO SEND IT TO PORT # 2
283B CDC928                   CALL    CSFRMT  / FORMAT RECORD FOR CASSETTE
283E CDFF2B                   CALL    P2TIO   / OUTPUT THE RECORD
                    /         SEE IF THERE IS MORE DATA LEFT
2841 F1                       POP     PSW     / GET FIELD BIT
2842 F5                       PUSH    PSW     / SAVE IT AGAIN
2843 CD7928                   CALL    NXTADR  / GET START ADDR OF NEXT READ
2846 C33028                   JMP     DUMP15  / & GET NEXT RECORD
                    /         COME HERE WHEN RAM SEGMENT IS COMPLETE
```

```
                   DUMP30,

                   /       SET LIMITS FOR NEXT RAM FIELD

    2849 F1                POP     PSW     / GET # OF SEGS
    284A 3D                DCR     A       / DECR & SEE IF DONE
    284B F5                PUSH    PSW     / SAVE AGAIN
    284C C22D28            JNZ     DUMP10  / GO PROCESS NEXT SEGMENT

\          ALL DONE WITH DUMP - SEND EOF

    284F CDBB2C            CALL    EOF     / WRITE END RECORD TO PORT 2

                   /       DISPLAY  ADVISORY MESSAGE: "DUMP O. K. "

    2852 11642D            LXI     D,MSGDOK/ DUMP OK
    2855 CD681F            CALL    KU04    / DSPLY

    2858 C3EF00            JMP     EXEC    / GO TO EXEC

                           EJECT

                   SUBJOB \        DUMP20 - CALC SIZE OF READ

                   /       THIS RTN WILL HAVE THE SIZE OF THE NEXT READ BUF ER

                   /       CALCULATED.

                   /       ** ENTRY
                   /               A=RAM TYPE
                   /                       3=LOGIC RAM
                   /                       2=COIL RAM
                   /                       1=REGISTER RAM
                   /               H/L = ADDR OF 1ST BYTE TO DUMP

                   /       CALL DUMP20

                   /       ** EXIT
                   /               IF CY=1 --> END OF SEGMENT
                   /               IF CY=0 -->
                   /                       B/C = # OF BYTES TO BE READ

                   DUMP20,
    285B 011000            LXI     B,MAXBUF/ GET SIZE OF BUFFER FOR READ
    285E CD8828            CALL    GETSIZ  / IN B/C ON RET
    2861 C9                RET             / IF CY=1 --> END OF RAM SEGMENT

                           EJECT

                   SUBJOB \        DUMP25 - READ DATA FROM 484

                   /       THIS RTN WILL FORMULATE A READ COMMAND TO
                   /       READ A SPECIFIED # OF BYTES FROM A
                   /       484 AND HAVE "PIO" DO THE READ.

                   /       ** ENTRY
                   /               B/C = # OF BYTES TO READ
                   /               H/L = ADDRESS OF 1ST BYTE
                   /               D/E AVAILABLE

                   /       CALL DUMP25

                   /       ** EXIT
                   /               ERROR --> UNCOND CALL TO ERROR (NO RET)
                   /               ELSE --> DATA IS STORED IN "RSPBUF"
                   /                          "CMDBUF" IS LEFT SET UP BY "PIO"
                   /                       D/E = READ COMMAND FOR "PIO"


                   DUMP25,
    2862 C5                PUSH    B       / SAVE REGS
    2863 E5                PUSH    H

    2864 79                MOV     A,C     / GET # OF BYTES TO READ
```

```
2865 0F            RRC              / DIVIDE # OF BYTES BY 2
2866 110610        LXI    D;CMDRED!:100+LENRED    / READ COMMAND
2869 82            ADD    D         / INDEX INTO COMMAND
286A 57            MOV    D;A       / ALL SET UP

            /      NOW STORE THE 484 ADDRESS IN CMDBUF AND LET
            /      PIQ TAKE IT FROM THERE

286B E5            PUSH   H         / MOVE ADDR TO B/C
286C C1            POP    B         /  DONE
286D 2193FE        LXI    H;CMDBUF+3 / BUFFER FOR PIO COMMAND
2870 D7            MOVBC
2871 D5            PUSH'  D         / SAVE READ COMMAND
2872 CD052D        CALL   TOPIO     / DO THE READ

2875 D1            POP    D         / RESTORE READ COMMAND
2876 E1            POP    H         / RESTORE REGS
2877 C1            POP    B
2878 C9            RET

                   EJECT
```

```
            SUBJOB \       NXTADR - NEXT BUFFER ADDR


            /      THIS RTN WILL COMPUTE THE START ADDR OF
            /      THE NEXT BUFFER TO BE READ FROM THE 484.

            /      ** ENTRY

            /             A=RAM SEG #
            /                    3=LOGIC
            /                    2=COILS
            /                    1=REGISTERS
            /             B/C=SIZE OF LAST READ(BYTES)
            /             H/L=LAST START ADDR FOR READ

            /      CALL NXTADR

            /      ** EXIT

            /             H/L=START ADDR OF READ
            /             A=?

            NXTADR,
2879 C5            PUSH   B         / SAVE REG

287A FE01          CPI    TYPE3     / IS IT REG RAM?
287C CA8228        JZ     NXTREG    / 0--> REG RAM

            /      LOGIC OR COIL RAM
            /      INC BY PREVIOUS COUNT

287F 09            DAD    B         / INC BY LAST COUNT
2880 C1            POP    B         / RESTORE
2881 C9            RET              / ALL DONE

            /      REGISTER RAM - INC BY 1/2 LAST COUNT

            NXTREG,
2882 79            MOV    A;C       / DIVIDE COUNT BY 2
2883 0F            RRC              /DONE
2884 4F            MOV    C;A       / PUT BACK
2885 09            DAD    B         / GET NEXT ADDR
2886 C1            POP    B         / RESTORE
2887 C9            RET              / ALL DONE

                   EJECT
```

```
            SUBJOB \       GETSIZ - FIND MAX SIZE OF READ

            /      THIS SUBROUTINE WILL RETURN THE MAXIMUM
            /      # OF BYTES. THAT CAN BE READ FROM A 484
            /      SIZE IS LIMITED BY THE SIZE OF THE BUFFER
            /      AND THE HIGHEST RAM LOCATION (ALWAYS EVEN LOC)
```

```
                /       ** ENTRY

                /               A = RAM TYPE
                /                       3 = LOGIC
                /                       2 = COIL
                /                       1 = REGISTER
                /               B/C = MAX SIZE REQUESTED
                /               H/L = ADDR TO BEGIN AT
                /               EOUSEG= HIGHEST ADDRESS IN RAM
                /               SEGMENT - (2 BYTES.. HI,LO)
                /               I.E  LOGIC RAM, COIL RAM, REG RAM.

                /       CALL GETSIZ

                /       ** EXIT

                /               B/C= # OF BYTES TO BE READ
                /               IF CY=0 --> OK TO READ
                /               IF CY=1 --> END OF RAM SEGMENT

                        EJECT

                GETSIZ,
2888 D5                 PUSH    D       / SAVE REG
2889 E5                 PUSH    H       / SAVE ADDR
288A F5                 PUSH    PSW     / SAVE RAM TYPE
288B 2B                 DCX     H       / MAKE 0 REL

                /       IF REGISTER RAM- DIVIDE BYTE COUNT BY 2

289C FE01               CPI     TYPE3   / IS IT REG RAM?
288E C29428             JNZ     GETSZ2  / 0--> REG RAM
2891 79                 MOV     A;C     / GET COUNT
2892 0F                 RRC             / DIVIDE BY 2
2893 4F                 MOV     C;A     / PUT BACK IN A

                GETSZ2,

2894 C5                 PUSH    B       / MOVE SIZE TO D/E
2895 D1                 POP     D       / DONE
2896 19                 DAD     D       / SEE IF WITHIN RANGE
2897 2B                 DCX     H       / MAKE 0 REL

2898 EB                 XCHG            / SAVE TEST ADDR IN D/E
2899 21C0FE             LXI     H;EOUSEG/ GET LAST VALID ADDR
289C E7                 GETHL           / DONE
289D EB                 XCHG            / TEST ADDR BACK TO H/L

                GETSZ5,
289E 78                 MOV     A;B     / IF 0 --> END OF SEGMENT
289F B1                 ORA     C       / TEST B/C FOR 0
28A0 CAB528             JZ      GETEND  / SET END OF SEG FLAG
28A3 F7                 DCMP            / ARE WE LEGAL?
28A4 D2BA28             JNC     GETSXT  / CY=0 --> LEGAL

                /       DECREMENT SIZE & TRY AGAIN

                /       IF REGISTER RAM --> DECR BY 1
                /       ELSE DECR BY 2

28A7 F1                 POP     PSW     / GET RAM TYPE
28A8 E1                 POP     H       / GET START ADDR
28A9 E5                 PUSH    H       / SAVE START ADDR
28AA F5                 PUSH    PSW     / SAVE RAM TYPE AGAIN
28AB FE01               CPI     TYPE3   / IS IT REGISTER?
28AD CAB128             JZ      REGRAM  / 0--> REGISTER

                        EJECT
                /       NOT REGISTER RAM
                /       DECR BY 2

28B0 0B                 DCX     B       / DECR SIZE BY 1

                REGRAM,
28B1 0B                 DCX     B       / DECR SIZE
```

```
28B2 C39428          JMP     GETSZ2   / TRY AGAIN

                /    AT END OF RAM SEGMENT
                /    SET CY = 1   &  RETURN

                GETEND,
28B5 F1              POP     PSW      / REST STACK
28B6 E1              POP     H        / RESTORE STACK
28B7 D1              POP     D
28B8 37              STC              / CY=1 (END OF SEG)
28B9 C9              RET

                /    ALL DONE - HAVE VALID SIZE IN B/C

                GETSXT,
28BA F1              POP     PSW      / REST STACK

                /    IF TYPE 3 - MULT COUNT BY 2

28BB FE01            CPI     TYPE3    / IS IT REG RAM?
28BD C2C528          JNZ     GETSX2   / 0--> REGISTER RAM
28C0 C5              PUSH    B        / MOVE COUNT TO H/L
28C1 E1              POP     H        / DONE
28C2 29              DAD     H        / DOUBLE COUNT
28C3 E5              PUSH    H        / MOVE BACK TO B/C
28C4 C1              POP     B        / DONE

                GETSX2,
28C5 E1              POP     H        / RESTORE ADDR
28C6 D1              POP     D        / RESTORE D/E
28C7 A7              CLC              / CLEAR CARRY
28C8 C9              RET              / RETURN

                     EJECT
                SUBJOB \        CSFRMT -- FORMAT RECORD TO INTEL

                /    THIS SUBR WILL TAKE RSPBUF AND SET UP A BUFFER
                /    IN INTEL FORMAT TO BE SENT OUT OF PORT #2
                /    IT MUST CONVERT FROM BINARY TO ASCII HEX

                /    ** ENTRY

                /            E = READ CMND GIVEN TO "PIO"
                /            RSPBUF SET UP AFTER CALL TO PIO (READ)

                /    CALL CSFRMT

                /    ** EXIT

                /            CASBUF FORMATTED TO BE OUTPUT TO PORT 2

                     EJECT

                CSFRMT,
28C9 C5              PUSH    B        / SAVE REGS
28CA E5              PUSH    H
28CB D5              PUSH    D

28CC 210A0D          LXI     H,CRLF   / GET CRLF
28CF EB              XCHG             / TO D/E
28D0 21C4FE          LXI     H,CASBUF/ PTR TO OUTPUT BUFFER
28D3 EF              MOVDE            / STORE CRLF

28D4 3E3A            MVI     A,ASCCOL/ COLON = 'START OF REC'
28D6 77              MOV     M,A      / STORE IT
28D7 23              INX     H        / BUMP PTR (DEST)

                /    COMPUTE SIZE OF RESPONSE
                /    E = READ CMND GIVEN TO PIO
                /     SUBTRACT "CMDRED" & MULT BY 2 FOR # OF BYTES READ

28D8 C1              POP     B        / GET READ CMND SIZE TO A
28D9 C5              PUSH    B        / DOING
28DA 78              MOV     A,B      / DONE
28DB D610            SUI     CMDRED   / SUB BASIC CMND
28DD 07              RLC              / MULT BY 2
```

```
28DE 11A9FE          LXI     D,RSPBUF+1      / PTR TO HI ADDR RESP BUF
28E1 F5              PUSH    PSW     / SAVE BINARY SIZE OF DATA
28E2 F5              PUSH    PSW
28E3 CD692C          CALL    BN2HX   / CONVERT TO ASCII HEX
28E6 D7              MOVBC           / STORE IN OUTPUT RECORD

28E7 1A              LDAX    D       / GET HI ADDR
28E8 CD692C          CALL    BN2HX   / CONVERT TO ASCII
28EB D7              MOVBC           / STORE
28EC 13              INX     D       / LO ADDR
28ED 1A              LDAX    D       / GET IT
28EE CD692C          CALL    BN2HX   / CONVERT
28F1 D7              MOVBC           / AND STORE
28F2 13              INX     D       / BUMP PTR TO DATA
28F3 D5              PUSH    D       / SAVE SOURCE PTR
28F4 EB              XCHG            / SAVE DEST. PTR IN D/E
28F5 213130          LXI     H,ASC01 / GET RECORD TYPE '01'
28F8 EB              XCHG            / SWITCH
28F9 EF              MOVDE           / STORE '01'
28FA D1              POP     D       / GET BACK SOURCE PTR

                     EJECT
             /       NOW GET DATA BYTES, CONVERT TO ASC HEX
             /       & STORE IN OUTPUT RECORD BUFFER

             CSFMT2,
28FB 1A              LDAX    D       / GET A DATA BYTE
28FC CD692C          CALL    BN2HX   / CONVERT TO ASCII HEX
28FF D7              MOVBC           / STORE IN RECORD
2900 13              INX     D       / BUMP TO NEXT BYTE
2901 F1              POP     PSW     / GET COUNT
2902 3D              DCR     A       / DONE YET?
2903 F5              PUSH    PSW     / SAVE AGAIN
2904 C2FB28          JNZ     CSFMT2  / NOW 0--> GET NEXT BYTE

             /       ALL DATA IS IN RECORD - NOW ADD CHKSUM

2907 F1              POP     PSW     / GET COUNT
2908 F1              POP     PSW     / DONE
2909 C604            ADI     4       / ADD OVERHEAD
290B 21C7FE          LXI     H,CASBUF+3/ PTR TO 1ST CHAR IN RECORD
             /                          TO BE CHECKSUMMED

290E CDE02C          CALL    CHEX80

             /       CLEAR STACK & RETURN

2911 D1              POP     D       / REST REGS
2912 E1              POP     H       / RESTORE REGS
2913 C1              POP     B
2914 C9              RET

                     EJECT


             SUBJOB \        CON484 - FIND HIGHEST LOC IN SEG

             /       THIS SUBR WILL STORE THE HIGHEST LOC IN
             /       A MEMORY SEGMENT (USER LOGIC, COIL RAM,
             /       OR REGS) IN 'EOUSEG'


             /       ** ENTRY

             /               A=  3 --> USER LOGIC
             /                   2 --> COIL RAM
             /                   1 --> REGISTERS
             /               SCONF1 & SCONF2 SET UP WITH
             /               484 CONFIG AS PER SPEC SP-4810-002

             /       CALL CON484

             /       ** EXIT

             /               H/L = LOWEST ADDR OF SEGMENT
             /               EOUSEG= HIGHEST VALID ADDRESS
             /               IN RAM SEGMENT
```

```
                   CON484,
2915 C5                   PUSH    B       /SAVE REGS
2916 D5                   PUSH    D       / SAVE REGS

2917 010200               LXI     B,ADRUSE        / SET UP FOR USER LOGIC RAM

291A FE03                 CPI     TYPE1   /IS IN USER LOGIC?
291C CA3329               JZ      CONUSE  /0 --> USER LOGIC
291F FE02                 CPI     TYPE2   / DISCREET , COIL RAM?
2921 CA5A29               JZ      CONCOL  / 0--> COIL RAM

        REGISTER RAM SEGMENT

2924 010240               LXI     B,:4002 / LOWEST REG RAM ADDR
2927 21C0FE               LXI     H,EOUSEG        / SAME AS COIL RAM ADDR
292A E7                   GETHL           / GET ADDR FOR PREV SEG
292B 7C                   MOV     A,H     / SET FIELD BITS
292C C620                 ADI     :20     / SET THAT BIT
292E 67                   MOV     H,A     / PUT BACK IN H
292F 23                   INX     H       / PREPARE TO BE OFFSET!
2930 C38E29               JMP     CON4A   / FINISHED

                          EJECT
        USER LOGIC RAM SEGMENT

                   CONUSE,
2933 1184FE               LXI     D,SCONF1/ GET USER LOGIC CONFIG
2936 210001               LXI     H,@256  / ASSUME .25K

2939 1A                   LDAX    D       / USER LOGIC CONFIG BYTE
293A FE08                 CPI     SY0256  / IS IT .25K?
293C CA8E29               JZ      CON4A   / 0--> .25K
293F 29                   DAD     H       / TRY FOR .50K
2940 FE10                 CPI     SY0512  / IS IT .50K?
2942 CA8E29               JZ      CON4A   / 0--> .50K
2945 29                   DAD     H       / TRY 1K
2946 FE20                 CPI     SY1024  / IS IT 1K?
2948 CA8E29               JZ      CON4A   / 0--> 1K
294B 29                   DAD     H       / TRY FOR 2K
294C FE40                 CPI     SY2048  / IS IT 2K?
294E CA8E29               JZ      CON4A   / 0 --> 2K
2951 29                   DAD     H       / SHOULD BE 4K
2952 FE80                 CPI     SY4096  / IS IT 4K?
2954 CA8E29               JZ      CON4A   / 0--> 4K

                   /      ERROR --> DON'T KNOW WHAT CONFIG IS

2957 C37E29               JMP     CON4ER  /GO DO ERROR CALL

                          EJECT
        MEMORY TYPE = COIL RAM

                   CONCOL,
295A 014000               LXI     B,@64   / USE AS INCREMENTER
295D 1185FE               LXI     D,SCONF2/ GET COIL RAM CONFIG
2960 1A                   LDAX    D       / --> AREG
2961 214000               LXI     H,@64   / ASSUME 1/16 K
2964 E610                 ANI     SYS064  / IS IT  1/16 TH K?
2966 C28729               JNZ     CON4A0  / 0 --> 1/16 K
2969 09                   DAD     B       / TRY 1/8 K
296A 1A                   LDAX    D       / GET BACK MASK
296B E620                 ANI     SYS128  / IS IT 1/8 K?
296D C28729               JNZ     CON4A0  / 0 --> 1/8 K
2970 09                   DAD     B       / TRY .25K?
2971 1A                   LDAX    D       / GET BACK MASK
2972 E640                 ANI     SYS192  / IS IT .25K?
2974 C28729               JNZ     CON4A0  / 0--> .25K
2977 09                   DAD     B       / SHOULD BE .50K
2978 1A                   LDAX    D       / GET BACK MASK
2979 E680                 ANI     SYS256  / IS IT .50K?
297B C28729               JNZ     CON4A0  / 0 --> .50K

                   CON4ER,
```

```
2997E 11272D          LXI     D;MSGBDC/ ERROR --> CAN'T DETRMN CONFIG
2981 CD7E05           CALL    ERROR
2984 C3EF00           JMP     EXEC

               /      SET UP FOR COIL RAM FIELD

               CON4A0,
2987 7C               MOV     A;H      /SET FIELD BIT
2988 F620             ORI     :20      / DONE
298A 67               MOV     H;A      / MOVE BACK TO H/L
298B 010020           LXI     B;:2000 / LOWEST VALID COIL ADDR

                      EJECT
               /      HIGHEST VALID ADDRESS IS IN H/L
               /      LOWEST VALID ADDRESS IS IN B/C

               CON4A,
298E 2B               DCX     H        / OFFSET
298F EB               XCHG             / STORE HI-LO
2990 21C0FE           LXI     H;EOUSEG/ TRICKY MNVR
2993 EF               MOVDE            / DONE
2994 60               MOV     H;B      / NOW PUT LOW ADDR IN H/L
2995 69               MOV     L;C      / DONE

2996 D1               POP     D
2997 C1               POP     B
2998 C9               RET

                      EJECT
               SUBJOB \       VALOAD - VALID LOAD?


               /      THIS RTN WILL DETERMINE IF AN ADDRRESS
               /      IS VALID TO LOAD INTO A 484.
               /      THIS IS USED IF THE NEXT ADDRESS TO BE
               /      LOADED IS NOT THE NEXT CONTIGUOUS LOCATION.
               /      IT IS VALID TO LOAD A SMALLER 484 INTO A LARGER
               /      ONE.  TO BE VALID --> THE ADDRESS MUST BE THE 1ST
               /      LOC OF THE NEXT RAM SEGMENT.

               /      ** ENTRY
               /              A=RAM TYPE (SEE BELOW)
               /              H/L=ADDR OF TAPE BLOCK

               /      CALL VALOAD

               /      ** EXIT
               /              REG RET --> O,K.  TO CONTINUE
               /              "EOUSEG" IS UPDATED (SEE "CON484")
               /              A=NEW RAM TYPE (SEE BELOW)
               /              ERROR --> UNCOND. ERROR CALL (NO RET)

               /              RAM TYPES:
               /                      3=LOGIC RAM
               /                      2=COIL RAM
               /                      1=REGISTER RAM


               VALOAD,
2999 C5               PUSH    B        /SAVE
299A D5               PUSH    D

299B 47               MOV     B;A      / SAVE RAM TYPE
299C FE03             CPI     TYPE1    / IS IT PRESENTLY LOGIC RAM?
299E CAA929           JZ      LOGRAM   / 0-->LOGIC RAM
29A1 FE02             CPI     TYPE2    / IS IT COIL RAM?
29A3 CAAF29           JZ      COIRAM   / 0--> COIL RAM

               /      THERE ARE NO OTHER VALID RAM TYPES --> ERROR!

29A6 C3C029           JMP     VALERR   / DO AN ERROR CALL

                      EJECT
         ** COME HERE FOR LOGIC RAM

```

```
                       LOGRAM,
29A9 110020                    LXI     D,:2000 / 1ST VALID COIL RAM LOC
29AC C3B229                    JMP     VALOD5  / GO VALIDATE

          **  COME HERE FOR COIL RAM

                       COIRAM,
29AF 110240                    LXI     D,:4002 / 1ST VALID REGISTER ADDRESS
                       VALOD5,
29B2 F7                        DCMP            / SAME AS OUR ADDRESS?
29B3 C2C029                    JNZ     VALERR  / .NE. 0--> ERROR

                       /       WE HAVE A VALID ADDRESS, UPDATE "EOUSEG"

29B6 78                        MOV     A,B     / GET BACK RAM TYPE
29B7 3D                        DCR     A       / UPDATE TO NEW TYPE
29B8 F5                        PUSH    PSW     / SAVE RAM TYPE
29B9 CD1529                    CALL    CON484  / UPDATE "EOUSEG"

29BC F1                        POP     PSW     / RESTORE RAM TYPE TO A
29BD D1                        POP     D       / RESTORE
29BE C1                        POP     B
29BF C9                        RET

          **  COME HERE FOR ERROR

                       VALERR,
29C0 114A27                    LXI     D,MSGADI        / INVALID ADDRESS
29C3 CD7E05                    CALL    ERROR   / DO AN ERROR CALL
29C6 C3EF00                    JMP     EXEC    / GO TO EXEC

                               EJECT

                       SUBJOB \        LOAD - LOAD 484 FROM PORT 2

                       /       THIS ROUTINE WILL LOAD A 484 CONTROLLER
                       /       FROM AN INTEL FORMAT TAPE THROUGH PORT 2
                       /       IT WILL FIRST TRAP THE 484 THEN INIT
                       /       THE MEMORY.
                       /       ALL RECORDS MUST BE TYPE '01' AND
                       /       ADDRESSES MUST BE CONTIGUOUS
                       /       A TAPE OF A LARGER CONTROLLER MAY NOT BE
                       /       LOADED INTO A SMALLER 484 BUT THE
                       /       OPPOSITE IS QUITE LEGAL

                       /       ENTRY FROM SUPERVISORY MODE VIA
                       /       SELECTION OF 'LOAD' KEY

                       /       EXIT TO EXEC

                       /       IN CASE OF ERROR --> UNCOND ERROR CALL
                       /               BAD ADDRESS
                       /               MEMORY OVERFLOW
                       /               CHECKSUM ERROR
                       /               HARDWARE ERROR
                       /                       LOADING WILL CEASE
                       /                       BACK TO SUPER MODE

                               EJECT

                       LOAD,
                       /       DISPLAY  MESSAGE: "LOADING"

29C9 114A2D                    LXI     D,MSGLDG  / MSSG ADDR
29CC CD681F                    CALL    KU04      / DISPLAY ADVISORY


                       /       TRAP THE 484 & INIT MEMORY

29CF 110480                    LXI     D,CMDSTP!:100+LENSTP/ STOP 484 COMMAND
                                                   / LENGTH TO E
29D2 CD8125                    CALL    PIO     / ISSUE COMMAND
29D5 C2EF00                    JNZ     EXEC    / .NE. 0 --> ERROR, SO QUIT!

29D8 1104A0                    LXI     D,CMDINI!:100+LENINI/ INIT 484 CMND
                                                   / LENGTH TO E
```

```
29DB CD8125            CALL    PIO       / ISSUE COMMAND
29DE C2EF00            JNZ     EXEC      / .NE. 0 --> ERROR, SO QUIT!

                /      484 IS TRAPPED AND INIT'D
                /      INIT PORT # 2

29E1 CDCC2A            CALL    P2INIT    / INIT PORT #2

29E4 3E03              MVI     A;TYPE1   / GET HIGHEST ADDR IN SEG
                LOAD05,
29E6 F5                PUSH    PSW       / SAVE MEM TYPE
29E7 CD1529            CALL    CON484    / HIGHEST ADDR IN 'EOUSEG'
                                         / ON RET, LOWEST IN H/L


                LOAD10,

          INPUT A RECORD FROM PORT 2

29EA CD292B            CALL    P2RIO     / READ A RECORD
29ED DA422A            JC      LOAD30    / CY=1 --> END OF TAPE
29F0 0192FE            LXI     B;CMDBUF+2        / DEST PTR
29F3 CDA62B            CALL    UNFORM    / PLACE INTO CMDBUF
                                         / TO SHIP TO 484
29F6 EB                XCHG              / MOVE ADDR TO D/E
29F7 2193FE            LXI     H;CMDBUF+3/ PICK UP ADDRESS & SEE IF VALID
29FA E7                GETHL             / DONE
29FB E5                PUSH    H         / SAVE ADDR (484)
                LOAD20,
29FC F7                DCMP              / ADDRESS SHOULD BE SAME
29FD CA072A            JZ      LOAD25    / 0--> CONTIG. ADDR, OK

                /      IF ADDRESS IS NOT THE NEXT CONTIGUOUS
                /      LOC, ALL IS NOT LOST ... YET.
                /      A SMALLER 484 MAY LOAD INTO A LARGER ONE.
                /      SEE IF ADDR IS THE 1ST VALID ADDR OF THE NEXT
                /      SEGMENT OF RAM.

2A00 E1                POP     H         / GOT TO GET TO RAM TYPE
2A01 F1                POP     PSW       / GOT RAM TYPE
2A02 CD9929            CALL    VALOAD    / VALIDATE THIS ADDRESS TO SEE
                                         / IF IT IS IN NEXT SEGMENT

                /      RETURNED FROM "VALOAD" O.K. TO CONTINUE

2A05 F5                PUSH    PSW       / SAVE RAM TYPE
2A06 E5                PUSH    H         / SAVE ADDR (484)

                LOAD25,

2A07 3A92FE            LDA     CMDBUF+2/ LENGTH OF CMND
2A0A F5                PUSH    PSW       / SAVE COUNT
2A0B F5                PUSH    PSW       / AGAIN
2A0C 110820            LXI     D;CMDWRT!:100+LENWRT-2/WRITE COMMAND / LENG
H
2A0F 82                ADD     D         / INDEX PROPER COMMAND
2A10 57                MOV     D;A       / INIT D-REG
2A11 F1                POP     PSW       / CALC CORRECT LENGTH
2A12 07                RLC               / MULT BY 2 FOR BYTE COUNT
2A13 83                ADD     E         / ACCOUNT FOR DATA
2A14 5F                MOV     E;A       / BACK TO E
2A15 CD052D            CALL    TOPIO     / LOAD CONTROLLER W/BUFFER

                /      THE DATA WAS JUST SENT TO THE 484
                /      UPDATE THE ADDRESS FOR VERIFICATION

2A18 C1                POP     B         / GET COUNT BACK (LSB)
2A19 E1                POP     H         / GET ADDR BACK
2A1A 78                MOV     A,B       / MOVE COUNT TO
2A1B 07                RLC               / MULT BY 2 FOR
                                         /   BYTE COUNT
2A1C 4F                MOV     C;A       / MOVE TO C
2A1D 0600              MVI     B;0       / MSB OF COUNT
2A1F F1                POP     PSW       / GET RAM TYPE
2A20 F5                PUSH    PSW       / SAVE RAM TYPE
2A21 CD7928            CALL    NXTADR    / GET NEXT VALID ADDR
```

```
                  /         SEE IF NEXT SEGMENT

2A24 EB                     XCHG                / TAPE ADDR TO D/E
2A25 21C0FE                 LXI     H,EOUSEG/ HIGHEST 484 ADDR
2A28 E7                     GETHL               / HI-LO TO H/L
2A29 EB                     XCHG                / SWITCH
2A2A F7                     DCMP                / COMPARE
2A2B DA312A                 JC      NXTSEG  / CY=1 --> NEXT SEGMENT
2A2E C3EA29                 JMP     LOAD10  / CONTINUE

                  /         GET HIGHEST ADDR OF NEXT SEG

                  NXTSEG,
2A31 F1                     POP     PSW     / GET MEM TYPE
2A32 3D                     DCR     A       / NXT SEG #
2A33 C2E629                 JNZ     LOAD05  /0--> END OR 484 RANGE

\         MUST GET END RECORD NEXT!
\         ANY OTHER RECORD --> FATAL ERR.

2A36 CD292B                 CALL    P2RIO   / READ A RECORD FROM PORT 2
2A39 DA422A                 JC      LOAD30  / CY=1 -->OK

                  /         NO END RECORD --  BAD TAPE ERROR

2A3C 113F2D                 LXI     D,MSGBDR/ BAD RECORD
2A3F C34E2A                 JMP     LOADR2  / DO AN ERROR CALL


                  LOAD30,

                  /         JUST GOT AN 'END OF FILE' RECORD
                  /         THE 484 IS LOADED, NOTIFY USER

2A42 11522D                 LXI     D,MSGLDD/ "LOAD O.K."
2A45 CD681F                 CALL    KD04    / DSPLY

2A48 C3EF00                 JMP     EXEC    / EXIT

                  /         ERROR IN ADDRESS VALIDATION

                  LOADER,
2A4B 114A27                 LXI     D,MSGADI/ BAD ADDRESS
                  LOADR2,
2A4E CD7E05                 CALL    ERROR   / DO ERROR CALL
2A51 C3EF00                 JMP     EXEC    / EXIT

                            EJECT

                  SUBJOB \          VERIFY = VERIFY TAPE AGAINST 484

                  /         THIS ROUTINE WILL READ AN INTEL FORMAT
                  /         TAPE FROM PORT 2 AND VERIFY IT AGAINST
                  /         THE 484 CONTROLLER
                  /         ANY DATA MISMATCH WILL CAUSE A
                  /         MESSAGE TO BE DISPLAYED & THE VERITY
                  /         WILL STOP AND EXIT TO 'EXEC'

\         NOTE. TAPE MUST HAVE BEEN MADE
\         BY P180 OR EQUIV.
\         (16 BYTE RECORDS THRU N-1)


                  /         ALL RECORDS IN A RAM SEGMENT MUST BE 16 BYTES
                  /         THE LAST RECORD MUST CONTAIN THE REMAINING BYTES.

                  /         ENTER FROM SUPER MODE VIA SELECTIONS
                  /         OF     VERIFY  KEY

                  /         JMP VERIFY

                  /         EXIT TO  EXEC

                            EJECT
```

```
          VERIFY,

          /        DISPLAY ADVISORY:  "VERIFYING"

2A54 116E2D        LXI     D,MSGVFG/ "VERIFYING"
2A57 CD681F        CALL    KU04    / DISPLAY

2A5A CDCC2A        CALL    P2INIT  / INIT PORT 2


2A5D 3E03          MVI     A,TYPE1 / LOGIC RAM 1ST
2A5F F5            PUSH    PSW     / SAVE ON STACK

          VER03,
2A60 CD1529        CALL    CON484  / GET HI,LO ADDRESSES OF SEG

          VER05,
2A63 F1            POP     PSW     / GET RAM TYPE
2A64 F5            PUSH    PSW     / SAVE RAM TYPE AGAIN
2A65 CD5B28        CALL    DUMP20  / GET SIZE OF READ
2A68 DA9B2A        JC      VER30   / CY=1 --> END OF SEGMENT
2A6B C5            PUSH    B       / SAVE SIZE OF READ
2A6C CD6228        CALL    DUMP25  / DO THE READ

\         DATA IS IN "RSPBUF"

          /        GET A TAPE RECORD

2A6F CD292B        CALL    P2R10   / GOT THE RECORD
2A72 DAB02A        JC      VERCHK  / PREMATURE END OF TAPE (CY=1)
2A75 01F3FE        LXI     B,VERBUF/ STORE 484 FORMAT DATA
2A78 CDA62B        CALL    UNFORM  / AT B/C

          /        NOW COMPARE "RSPBUF" TO "VERBUF"

2A7B E5            PUSH    H            / SAVE 484 ADDR
2A7C 21A8FE        LXI     H,RSPBUF          / PTR TO READ COMMAND
2A7F 7E            MOV     A,M     / SET UP COUNTER
2A80 D60F          SUI     CMDRED-1          / SUBTRACT OVERHEAD BUT
                                   / ACCOUNT FOR ADDRESS HI/LO
2A82 07            RLC             / X2 FOR BYTE COUNT
2A83 5F            MOV     E,A     / COUNTER IN E
2A84 23            INX     H       / BUMP TO ADDR HI BYTE
2A85 03            INX     B       / BUMP TAPE BUFFER PTR

                   EJECT
          VER10,
2A86 0A            LDAX    B       / GET A TAPE BYTE
2A87 BE            CMP     M       / COMPARE TO 484 BYTE
2A88 C2B02A        JNZ     VERCHK  / PROCESS MIS-MATCH (.NE. 0)
2A8B 23            INX     H       / BUMP BUFFER PTRS
2A8C 03            INX     B       / DONE
2A8D 1D            DCR     E       / DECR COUNTER
2A8E C2862A        JNZ     VER10   / 0--> DONE WITH BUFFER

2A91 E1            POP     H       / GET 484 ADDRESS
2A92 C1            POP     B       / GET SIZE OF LAST READ
2A93 F1            POP     PSW     / GET RAM TYPE
2A94 F5            PUSH    PSW     / SAVE RAM TYPE AGAIN
2A95 CD7928        CALL    NXTADR  / GET NEXT START ADDRESS
2A98 C3632A        JMP     VER05   / LOOP

          /        END OF RAM SEGMENT

          VER30,
2A9B F1            POP     PSW     / GET RAM TYPE
2A9C 3D            DCR     A       / NEXT SEGMENT
2A9D F5            PUSH    PSW     / SAVE ON STACK
2A9E C2602A        JNZ     VER03   / 0 --> DONE WITH ALL RAM

\ NOTE: AN END OF TAPE MUST FOLLOW
\ FOR VALID DATA-MATCH

2AA1 CD292B        CALL    P2R10   / READ THE NEXT RECORD
2AA4 D2C32A        JNC     VERCHS  / CY=0 --> NOT END OF TAPE
                                   / REGISTER RAM ERROR (HAS TO BE)
```

```
\             *** GOOD DATA-MATCH

                 VEROK,
2AA7 119F2D               LXI     D,MSGVOK/ DATA MATCH GOOD
2AAA CD681F               CALL    KU04    / DISPLAY ADVISORY
2AAD C3EF00               JMP     EXEC

                          EJECT

                 SUBJOB \         VERCHK - MIS-MATCH HNDLR

                 /        THIS RTN WILL DETERMINE WHICH RAM SEGMENT
                 /        A DATA MIS-MATCH OCCURED IN AND DISPLAY AN
                 /         APPROPRIATE MESSAGE.

\            NOTE:      NOTE:      NOTE:      NOTE:

                 /        IF CONTROLLER IS RUNNING,
                 /        IT IS EMINENT THAT A MIS-MATCH WILL
                 /        OCCUR SINCE THE COIL RAM AND THE
                 /        REGISTER RAM IS CONSTANTLY
                 /        CHANGING.

                 /        ** ENTRY
                 /                H/L = 484 ADDRESS (NORMAL ENTRY)
                 /                @ VERCK5 DON'T NEED H/L SET!


                 /        JMP     VERCHK (NORMAL ENTRY)
                 /        JMP VERCK5 (KNOWN REGISTER MIS-MATCH)

                 /        ** EXIT
                 /                DISPLAY APPROPRIATE MESSAGE IN
                 /                ADVISORY AREA AND JMP TO EXEC.

                 VERCHK,
2AB0 7C                   MOV     A,H     / GET FIELD BITS
2AB1 E6F0                 ANI     :OF0    / MASK
2AB3 11852D               LXI     D,MSGLNM        / LOGIC NO MATCH
2AB6 FE00                 CPI     FIELD1  / IS IT LOGIC RAM?
2AB8 CAC62A               JZ      VERCXT  / 0--> LOGIC RAM MIS-MATCH
2ABB 11922D               LXI     D,MSGCNM        / COIL NO MATCH
2ABE FE20                 CPI     FIELD2  / IS IT COIL RAM?
2AC0 CAC62A               JZ      VERCXT  / COIL RAM MIS-MATCH

\            ENTRY POINT FOR KNOW REGISTER MIS

                 VERCK5,
2AC3 11782D               LXI     D,MSGRNM        / REGISTER RAM MIS-MATCH

                 VERCXT,
2AC6 CD7E05               CALL    ERROR   / DO AN ERROR CALL
2AC9 C3EF00               JMP     EXEC

                          EJECT

                 SUBJOB \         P2INIT - INIT PORT 2

                 /        THIS ROUTINE WILL INITIALIZE PRIRPHERAL
                 /        PORT 2 IN THE P180
                 /

                 /        ** ENTRY

                 /                NO ENTRY REQUIREMENTS

                 /        CALL P2INIT

                 /        ** EXIT

                 /                PORT 2 INITIALIZED


                 P2INIT,

2ACC 3E81                 MVI     A,PPNULL
```

```
2ACE D33C          OUT     SP2CTL  / LOAD NULL INSTRUCTION
2AD0 00            NOP             / PRECAUTIONARY WAIT
2AD1 D33C          OUT     SP2CTL  / LOAD SECOND NULL

2AD3 3E50          MVI     A,SPCIR+SPCER   / RESET COMMAND
2AD5 D33C          OUT     SP2CTL  / RESET INTERFACE
2AD7 3E79          MVI     A,P2MODE / INTERFACE MODE
2AD9 D33C          OUT     SP2CTL  / SET INTERFACE MODE
2ADB 3E10          MVI     A,SPCER/ INTERFACE STATE
2ADD D33C          OUT     SP2CTL  / LOAD STATE

\        IF NO DEVICE IS ATTACHED TO PORT
\        ALLOW NO MORE FORWARD PROGRESS

2ADF DB3C          IN      SP2CTL  / CHECK CONTROL PORT
2AE1 E680          ANI     SPSDSR  / IS THERE A "DSR"?
2AE3 C0            RNZ             / OK IF .NE. 0

              /    PORT 2 IS NOT ATTACHED - ERROR

2AE4 11322D        LXI     D,MSGN02        / PORT 2 EMPTY
2AE7 CD7E05        CALL    ERROR
2AEA C3EF00        JMP     EXEC    / QUIT RIGHT NOW!
                   EJECT

              SUBJOB \     P2RDCH - READ CHAR FROM PORT 2

              /    THIS SUBR WILL INPUT ONE CHAR FROM
              /    PORT 2 IN CASE OF ANY HADWARE OR
              /    CHECKSUM ERRORS - AN ERROR MESSAGE
              /    WILL BE DISPLAYED AND CY SET = 1.


              /    * *ENTRY

              /            NO ENTRY REQUIREMENTS

              /    CALL P2RDCH

              /    * *EXIT

              /            CHAR IN A REG
              /            IF ERROR --> UNCOND ERROR CALL
              /            DISPLAY ERROR MESSAGE, GO TO EXEC

                   EJECT


              P2RDCH,
2AED C5            PUSH    B       / SAVE REGS
2AEE D5            PUSH    D
2AEF E5            PUSH    H

2AF0 11322D        LXI     D,MSGN02/ NOT CONNECTED TO PORT
              P2RD05,
2AF3 DB3C          IN      SP2STA  / GET PORT STATUS IN AREG
2AF5 47            MOV     B,A     / AND B
2AF6 E680          ANI     SPSDSR  / CHECK IF DATA SET RDY
2AF8 CA1F2B        JZ      P2RD0E  / 0 --> ERROR
2AFB 78            MOV     A,B     / GET BACK STATUS
2AFC E602          ANI     SPSRRY  / CHECK FOR RCVR RDY
2AFE CAF32A        JZ      P2RD05  / 0 --> NOT READY

\        READY TO RECEIVE A CHAR

2B01 78            MOV     A,B     / GET STATUS
2B02 E628          ANI     SPSFE+SPSPE/ CHECK PARITY/FRAMING ERROR
2B04 CA0D2B        JZ      P2RD02  / 0 --> NO ERROR

              /    ***  PARITY/ FRAMING ERROR

2B07 110C00        LXI     D,MSGPAX/ ERROR MESSAGE
2B0A C31F2B        JMP     P2RD0E  / GO DISPLAY

              P2RD02,
2B0D 78            MOV     A,B     / GET STATUS BACK
```

```
2B0E E610                 ANI     SPSOE    / CHECK FOR OVERRUN
2B10 CA192B               JZ      P2RD03   / 0 --> NO ERROR

                   /      ***  OVERRUN ERROR

2B13 110B00               LXI     D,MSGOVX/ DISPLAY MESSG
2B16 C31F2B               JMP     P2RDOE   / GO DO IT

                   P2RD03,
2B19 DB3D                 IN      SP2IN    / GET CHARACTER
2B1B E1                   POP     H        / RESTORE REGS
2B1C D1                   POP     D
2B1D C1                   POP     B
2B1E C9                   RET              / CHAR IN A-REG

                   /      COME HERE IN CASE OF ERROR
                   /      ADDR OF ERROR MSSG IN D/E

                   P2RDOE,
2B1F CD7E05               CALL    ERROR    / DISPLAY ERROR & SET STATE
2B22 3E10                 MVI     A,SPCER / TURN OFF TAPE
2B24 D33C                 OUT     SP2CTL   / DONE
2B26 C3EF00               JMP     EXEC     / GO TO EXEC

                          EJECT

                   SUBJOB \       P2RIO - READ RECORD PORT 2

                   /      THIS RTN WILL INPUT AN INTEL FORMAT
                   /      RECORD FROM PORT 2 OF THE P180 AND
                   /      VALIDATE THE CHECKSUM.


                   /      ** ENTRY

                   /              NO ENTRY REQUIREMENTS

                   /      CALL P2RIO

                   /      ** EXIT

                   /              RECORD INPUT TO 'CASBUF'
                   /              ERROR --> MSSG DISPLAYED
                   /                      UNCOND ERROR CALL
                   /                      IF END RECORD --> CY=1
                   /                      ELSE CY=0

                   P2RIO,
2B29 C5                   PUSH    B        / SAVE REGS
2B2A D5                   PUSH    D
2B2B E5                   PUSH    H

2B2C 01C4FE               LXI     B,CASBUF/ PTR TO STORAGE BUFFER

                   /      TURN ON RECEIVER

2B2F 3E16                 MVI     A,SPCDTR+SPCER+SPCRE/ RECEIVER ON
2B31 D33C                 OUT     SP2CTL   / O.K.

                   P2RIO2,
2B33 CDED2A               CALL    P2RDCH   / GET A CHAR
2B36 FE3A                 CPI     ASCCOL   / IS IT A COLON?
2B38 C2332B               JNZ     P2RIO2   / NOT 0--> TRY AGAIN

                   /      ** GOT A ':'    BEGINNING OF INTEL RECORD
                   /      GET THE 2 SIZE OF RECORD CHARS

2B3B 02                   STAX    B        / STORE CHAR
2B3C 03                   INX     B        / BUMP PTR
2B3D CDED2A               CALL    P2RDCH   / 1ST CHAR
2B40 02                   STAX    B        / STORE CHAR
2B41 03                   INX     B        / BUMP PTR
2B42 CDED2A               CALL    P2RDCH   / 2ND
2B45 02                   STAX    B        / STORE CHAR
```

```
2B46 03                 INX     B         / BUMP PTR
                 /      CONVERT LENGTH TO BINARY FOR COUNTER
2B47 11C5FE             LXI     D;CASBUF+1/ PTR TO BCD LENGTH
2B4A CD982C             CALL    H2BN2     / CONVERT TO BINARY (H/L)
            SEE IF END RECORD
2B4D 7D                 MOV     A,L       / TEST FOR END RECORD
2B4E B7                 TST               / DONE
2B4F CA572B             JZ      P2RIAA    / 0 --> END RECORD
2B52 A7                 CLC               / NOT END RECORD
2B53 F5                 PUSH    PSW       / SAVE CY
2B54 C3592B             JMP     P2RI0A    / NOT END RECORD
                 /      IT IS THE END RECORD
                 P2RIAA,
2B57 37                 STC               / SIGNAL END RECORD
2B58 F5                 PUSH    PSW       / SAVE CY
                 /      CONTINUE TO PROCESS RECORD
                 P2RI0A,
2B59 7D                 MOV     A,L       / ADD OVERHEAD BYTES TO LENGTH
2B5A 65                 MOV     H,L       / SAVE IN H
2B5B 07                 RLC               / DOUBLE FOR ASCII COUNT
2B5C C604               ADI     4         / DON'T INCLUDE CHECKSUM
2B5E 6F                 MOV     L,A       / BACK TO L
                 P2RI03,
2B5F CDED2A             CALL    P2RDCH    / GET A CHAR
2B62 02                 STAX    B         / STORE IT
2B63 03                 INX     B         / BUMP POINTER
2B64 2D                 DCR     L         / DONE YET?
2B65 C25F2B             JNZ     P2RI03    / NOT 0--> GET ANOTHER
                 /      **  RECORD HAS BEEN INPUT EXCEPT FOR CHKSUM
2B68 CDED2A             CALL    P2RDCH    / GET HI CHKSUM
2B6B 02                 STAX    B         / STORE
2B6C 03                 INX     B         / BUMP PTR
2B6D CDED2A             CALL    P2RDCH    / LO CHKSUM  .
2B70 02                 STAX    B
            ** GET CHECKSUM FROM TAPE
2B71 CDED2A             CALL    P2RDCH    / HI ORDER
2B74 57                 MOV     D,A       / TO D
2B75 CDED2A             CALL    P2RDCH    / LO ORDER
2B78 5F                 MOV     E,A       / TO E
                 /      ** TURN OFF RECEIVER
2B79 3E10               MVI     A;SPCER / OFF RCVR
2B7B D33C               OUT     SP2CTL  / DONE
            ** NOW VERIFY CHECKSUM
2B7D 7C                 MOV     A,H       / CTR TO A
2B7E 07                 RLC               / MULT BY 2 FOR ASCII HEX
2B7F C608               ADI     @8        / ADD OVERHEAD
2B81 01C5FE             LXI     B;CASBUF+1        / 1ST CHAR TO CHKSUM
2B84 210000             LXI     H;0       / ADDR OF CHKSUM TO B/C
2B87 6F                 MOV     L,A       / COUNT
2B88 09                 DAD     B         / COMPUTE ADDR OF CHKSUM
2B89 C5                 PUSH    B         / SWITCH B/C H/L
2B8A E5                 PUSH    H
2B8B C1                 POP     B
2B8C E1                 POP     H         / DONE
2B8D 0F                 RRC               / DIVIDE BY 2 FOR BINARY COUNT
2B8E CDE02C             CALL    CHEX80    / COMPUTE CHECKSUM
                 /      NOW VERIFY 2 CHKSUMS TO BE SAME
                 /      TAPE CHKSUM IN D/E
                 /      COMPUTED CHECKSUM (B/C --> ADDR)
```

```
2B91 C5            PUSH    B          / GET ADDR TO H/L
2B92 E1            POP     H          / DONE
2B93 E7            GETHL              / GET CHKSUM TO H/L
2B94 F7            DCMP               / COMPARE
2B95 C29D2B        JNZ     P2CKER     / .NE. 0--> CHKSUM ERROR


                /  DONE-CLEAN STACK & RET

2B98 F1            POP     PSW        / RESTURE CY FLAG
2B99 E1            POP     H
2B9A D1            POP     D
2B9B C1            POP     B
2B9C C9            RET

\   ** COME HERE IF CHKSUM ERROR

                P2CKER,
2B9D 110727        LXI     D,MSGCHK           / CHECKSUM ERROR
2BA0 CD7E05        CALL    ERROR
2BA3 C3EF00        JMP     EXEC

                   EJECT

                SUBJOB \        UNFORM - SET UP 484 CMD

                /  THIS RTN WILL TAKE A RECORD IN 'CASBUF'
                /  CASLII? & CONVERT IT TO A 484 MESSAGE
                /  COMMAND (BINARY) ( FOR A WRITE COMMAND)


                /  ** ENTRY

                /          B/C --> PLACE IN BUFFER FOR 1ST
                /          CHAR TO BE STORED
                /          SHOULD POINT TO LENGTH BYTE

                /  CALL UNFORM

                /  ** EXIT

                /          SET UP IN 484 CMD FORMAT
                /          --> XXCAADDDDD...MM
                /          WHERE C = BINARY BYTE COUNT, A= ADDRESS
                /          HI,LO, D= DATA HI,LO, M= MASK HI,LO.
                /          IF RECORD TYPE .NE. 01 --> ERROR
                /          UNCOND CALL TO ERROR (NO RET)


\         NOTE:       NOTE:       NOTE:       NOTE:

                /  THE LENGTH STORED IN DEST WILL
                /  = THE BINARY # OF DATA BYTES IN
                /  CASBUF DIVIDED BY 2
                /  I.E. IF 16 BYTES WERE READ,
                /  8 WILL BE STORED!!


                UNFORM,
2BA6 D5            PUSH    D
2BA7 E5            PUSH    H
2BA8 C5            PUSH    B
2BA9 C5            PUSH    B          / ONE MORE TIME

2BAA 11C5FE        LXI     D,CASBUF+1/ CONVERT LENGTH TO BINARY
2BAD CD982C        CALL    H2BN2
2BB0 7D            MOV     A,L        / DIVIDE BY 2 FOR BINARY COUNT
2BB1 0F            RRC                / DONE
2BB2 6F            MOV     L,A        / PUT BACK IN L
2BB3 65            MOV     H,L        / SAVE IN H TOO
2BB4 EB            XCHG               / COUNT TO D/E
2BB5 E1            POP     H          / GET DEST ADDR
2BB6 73            MOV     M,E        / STORE COUNT
2BB7 23            INX     H          / BUMP DEST PTR
2BB8 D5            PUSH    D          / SAVE COUNT
2BB9 E5            PUSH    H          / DEST PTR-SAVE
```

```
                /        **  PROCESS ADDRESS
2BBA 11C7FE              LXI      D,CASBUF+3/ PTR TO BCD ADDR
2BBD CD842C              CALL     H2BN4   / CONVERT TO BINARY
2BC0 D1                  POP      D       / GET DEST ADDR
2BC1 C1                  POP      B       / GET COUNT OFF STACK
2BC2 EB                  XCHG             / BINARY TO D/E
2BC3 EF                  MOVDE            / STORE
2BC4 C5                  PUSH     B       / STORE COUNT AGAIN
2BC5 E5                  PUSH     H       / SAVE DEST (NEW)
                /        ***  NOW VERIFY RECORD TYPE
2BC6 11CBFE              LXI      D,CASBUF+7/ PTR TO RECORD TYPE
2BC9 CD982C              CALL     H2BN2   / SEE IF TYPE '01'
2BCC 7D                  MOV      A,L     / TYPE TO A
2BCD FE01                CPI      TYPE01  / IS IT VALID?
2BCF C2F62B              JNZ      BADREC  / NOT 0--> INVALID REC
                         EJECT
                /        *** NOW PROCESS DATA
2BD2 11CDFE              LXI      D,CASBUF+@9/ PTR TO 1ST DATA BYTE
2BD5 D5                  PUSH     D         / SAVE PTR (SOUCE)
                UNFRM2,
2BD6 CD842C              CALL     H2BN4   / CONVERT 21 BYTES (HI,LO)
2BD9 C1                  POP      B       / SOURCE ADDR TO B/C
2BDA D1                  POP      D       / DEST ADDR TO D/E
2BDB EB                  XCHG             / SWITCH
2BDC EF                  MOVDE            / PLACE BYTES AT DEST
2BDD D1                  POP      D       / GET BACK COUNT
2BDE 15                  DCR      D       / DCR & SEE IF DONE
2BDF CAEE2B              JZ       UNFRM5  / 0 --> DONE WITH DATA
                /        ***  SET UP FOR 2 MORE DATA BYTES
2BE2 D5                  PUSH     D       / SAVE COUNT
2BE3 E5                  PUSH     H       / SAVE DEST
2BE4 03                  INX      B       / GET TO NEXT WORD
2BE5 03                  INX      B       / SKIP OVER NEXT
2BE6 03                  INX      B       / 3 CHARS
2BE7 03                  INX      B
2BE8 C5                  PUSH     B       / SAVE SOURCE ADDR
2BE9 D1                  POP      D       / MOVE SRC ADDR TO D/E
2BEA D5                  PUSH     D       / & REST. STACK
2BEB C3D62B              JMP      UNFRM2  / PROCESS NEXT WORD
                UNFRM5,
                /        *** ALL DONE WITH DATA
                /        STORE MASK IN NEXT 2 BYTES FOR WRITE
2BEE 010000              LXI      B,0     / MASK = 0
2BF1 D7                  MOVBC            / STORE
2BF2 C1                  POP      B       / REST REGS
2BF3 E1                  POP      H
2BF4 D1                  POP      D
2BF5 C9                  RET
                BADREC,
2BF6 113F2D              LXI      D,MSGBDR/ MSSG FOR RECORD TYPE ERROR
2BF9 CD7E05              CALL     ERROR
2BFC C3EF00              JMP      EXEC    / FATAL ERROR - GO TO EXEC
                         EJECT
                SUBJOB \          P2TIO - TRANSMIT REC TO PORT 2
                /        THIS RTN WILL OUTPUT AN INTEL FORMAT
                /        RECORD STORED IN 'CASBUF' OVER PORT 2
                /        THE FORMAT MUST BE AS FOLLOWS:
                /                 CRLF:NNADDR01DDDDDDCK
```

```
                /       WHERE NN= THE # OF DATA BYTES IN THE REC
                /               ADDR = THE ADDRESS (484 - HI/LO)
                /               DD IS THE DATA
                /               CK IS THE CHECKSUM OF ALL BYTES AFTER THE
                /               : -->8 BIT ADDITIVE W/O END AROUND CARRY

                /       ** ENTRY

                /               CASBUF SET UP AS DESCRIBED

                /       CALL P2TIO

                /       ** EXIT

                /               BUFFER WILL HAVE BEEN SENT OUT PORT 2
                /               IN CASE OF ERROR --> DISPLY MSSG &
                /                       EXIT TO EXEC

                        EJECT

                P2TIO,
2BFF C5                 PUSH    B        / SAVE REGS
2C00 D5                 PUSH    D
2C01 E5                 PUSH    H

2C02 11C7FE             LXI     D,CASBUF+3      / PTR TO LENGTH
2C05 CD982C             CALL    H2BN2    / CONVERT TO BINARY
2C08 7D                 MOV     A,L      / ADD IN OVERHEAD BYTES
2C09 07                 RLC              / DOUBLE FOR BCD COUNT
2C0A C60D               ADI     @13      / OVERHEAD
2C0C 5F                 MOV     E,A      / SAVE IN E

2C0D 21C4FE             LXI     H,CASBUF/ SOURCE PTR


                /       TURN ON PORT 2 XMIT

2C10 3E35               MVI     A,SPCRTS+SPCER+SPCRE+SPCTE/ SENT RTS TO  OR
 2
2C12 D33C               OUT     SP2CTL   / DONE

                /       MUST DELAY APPROX .5 SEC
                /       TO ALLOW TAPE TO GET UP TO SPEED

2C14 CD5B2C             CALL    DELHLF/ DELAY  .5 SEC
                /       SEND 4 NULLS TO PORT 2 TO AVOID
                /       LOST CHARACTERS

2C17 0604               MVI     B,4      / COUNTER
                P2TI07,
2C19 AF                 CLA              / NULL CHAR
2C1A CD352C             CALL    P2TCH    / XMIT
2C1D 05                 DCR     B        / DONE YET?
2C1E C2192C             JNZ     P2TI07   / 0--> DONE


                /       OUTPUT A CHAR

                P2TI05,
2C21 7E                 MOV     A,M      / GET CHAR
2C22 CD352C             CALL    P2TCH    / TRANSMIT
2C25 23                 INX     H        / BUMP PTR
2C26 1D                 DCR     E        / DONE?
2C27 C2212C             JNZ     P2TI05   / NEG--> DONE

                        EJECT
                /       RECORD HAS BEEN TRANSMITTED

                /       DELAY BEFORE SHUTTING TAPE OFF TO ALLOW
                /       DATA TO BE WRITTEN

2C2A CD5B2C             CALL    DELHLF   / DONE

                /       TURN OFF PORT 2 XMIT

```

```
    2C2D 3E10              MVI      A,SPCER / HALT XMIT
    2C2F D33C              OUT      SP2CTL  / DONE


    2C31 E1                POP      H
    2C32 D1                POP      D
    2C33 C1                POP      B
    2C34 C9                RET

                           EJECT
                 SUBJOB \           P2TCH - TRANSMIT CHAR PORT 2

                 /         THIS RTN WILL TRANSMIT A CHAR OVER PORT 2
                 /         IN CASE OF ERROR --> DISPL MSSG & GO TO EXEC

                 /         ** ENTRY

                 /                  A= CHAR

                 /         CALL P2TCH

                 /         ** EXIT

                 /                  CHAR TRANSMITTED
                 /                  IF ERROR --> DISPL MSSG & GO TO EXEC

                 P2TCH,
    2C35 C5                PUSH     B         / SAVE REGS
    2C36 D5                PUSH     D
    2C37 E5                PUSH     H

    2C38 F5                PUSH     PSW       / SAVE CHAR

                 P2TCH2,
    2C39 11322D            LXI      D,MSGN02        / MSG IF NOT CONNECTED
    2C3C DB3C              IN       SP2STA  / GET STATUS OF PORT 2
    2C3E 47                MOV      B,A     / SAVE IN B
    2C3F E680              ANI      SPSDSR  / SEE IF CONNECTED
    2C41 CA512C            JZ       P2TER   / 0 --> NOTHING CONNECTED TO PORT

    2C44 78                MOV      A,B     / GET STATUS BACK
    2C45 E601              ANI      SPSTRY  / SEE IF XMTR READY
    2C47 CA392C            JZ       P2TCH2  / 0 --> NOT READY

                 /         SEND THE CHARACTER

    2C4A F1                POP      PSW     / GET CHAR BACK
    2C4B D33D              OUT      SP2OUT  / XMIT IT

    2C4D E1                POP      H
    2C4E D1                POP      D
    2C4F C1                POP      B
    2C50 C9                RET

                           EJECT
\           ERROR IN PORT 2

                 P2TER,
    2C51 CD7E05            CALL     ERROR
    2C54 3E10              MVI      A,SPCER / TURN OFF TAPE
    2C56 D33C              OUT      SP2CTL  / DONE
    2C58 C3EF00            JMP      EXEC    / EXIT

                           EJECT
                 SUBJOB \           DELHLF- .5 SEC DELAY


                 /         THIS RTN WILL CAUSE A DELAY
                 /         FOR APPROX .5 SEC. AND RETURN


                 /         ** ENTRY
                 /                  NO ENTRY REQUIREMENTS

                 /         CALL DELHLF
```

```
                     /        ** EXIT
                     /                APPROX .5 SEC DELAY


                     DELHLF,
2C5B C5                       PUSH    B          / SAVE
2C5C 01AA2A                   LXI     B, 2AAA    / SET UP .5 SEC CTR

                     DELHF2,
2C5F E3                       XTHL               / WASTE SOME TIME
2C60 E3                       XTHL               / LEAVE AS FOUND
2C61 0B                       DCX     B          / SEE IF DONE
2C62 79                       MOV     A,C        / DONE YET?
2C63 B0                       ORA     B          / TEST B/C FOR 0
2C64 C25F2C                   JNZ     DELHF2     / 0--> DONE

2C67 C1                       POP     B          / ALL DONE
2C68 C9                       RET

                              EJECT

                     SUBJOB \         BN2HX - BIN TO ASCII HEX


                     /        THIS SUBR WILL CONVERT A BINARY BYTE INTO
                     /        2 ASCII HEX BYTES

                     /        ** ENTRY

                     /                A=BINARY BYTE TO BE CONVERTED

                     /        CALL BN2HX

                     /        ** EXIT

                     /                A = ?
                     /                B/C = 2 ASCII HEX  BYTES

                     BN2HX,
2C69 F5                       PUSH    PSW        / SAVE DIGIT
2C6A E6F0                     ANI     :OFO       / MASK FOR M-S-NIBBLE
2C6C CF                       NSWP               / GET M-S-NIBBLE
2C6D CD792C                   CALL    CONVRT     / CONVERT TO ASCII
2C70 47                       MOV     B,A        / STORE IN B

2C71 F1                       POP     PSW        / GET L-S-NIBBLE
2C72 E60F                     ANI     :OF        / MASK
2C74 CD792C                   CALL    CONVRT     / CONVERT TO ASCII
2C77 4F                       MOV     C,A        / STORE IN C
2C78 C9                       RET

                              EJECT
                     SUBJOB \         CONVRT - BINARY TO ASCII HEX


                     /        THIS RTN WILL CONVERT A VALUE FROM
                     /        BINARY TO HEX ASCII

                     /        ** ENTRY

                     /                A = VALUE (BINARY)
                     /                1 NIBBLE RIGHT JUSTIFIED

                     /        CALL CONVRT

                     /        ** EXIT

                     /                A = HEX ASCII DIGIT



                     CONVRT,
2C79 FE0A                     CPI     .0A        / >9 ?
2C7B D2812C                   JNC     CNVHEX     / CY = 0 --> HEX DIGIT
```

```

                     /         CONVERT NUMBER TO HEX ASCII

2C7E C630                      ADI      :30      / DONE
2C80 C9                        RET

                     /         CONVERT LETTER TO HEX ASCII

                     CNVHEX,
2C81 C637                      ADI      :37      / DONE
2C83 C9                        RET

                               EJECT
                     SUBJOB \           H2BN4, H2BN2

                     /         H2BN4 AND H2BN2 ARE SUBROUTINES TO CONVERT
                     /         FOUR (TWO) HEX DIGITS TO ONE 16 BIT BINARY
                     /         VALUE.
                     /         THE RTN GETS A POINTER TO A 4 (2) BYTE
                     /         STRING AND CONVERTS.
                     /         1ST CHAR TO MOST SIG 4 BITS OF RESULT
                     /         2ND CHAR TO NEXT 4 BITS OF RESULT
                     /         3RD CHAR TO NEXT 4 BITS OF RESULT
                     /         4TH CHAR TO LEAST SIG 4 BITS OF RESULT

                     /          THERE IS NO CHECKING FOR BAD CHARS, EXCEPT
                     /         SPACES ARE CONVERTED TO ZEROES.

                     /         ** ENTRY
                     /         D/E = ADDR OF STRING, 1ST CHAR

                     /         CALL H2BN4 (H2BN2)

                     /         ** EXIT
                     /                  H/L = 16 BIT VALUE

                     H2BN4,
2C84 C5                        PUSH     B        / SAVE REG
2C85 D5                        PUSH     D        / MOVE D/E TO B/C
2C86 C1                        POP      B        / DONE

                     /         1ST CHAR

2C87 0A                        LDAX     B        / GET IT
2C88 CDAA2C                    CALL     CHOPIT   / GET THE 4-BIT VERSION
2C8B CF                        NSWP              / SHIFT IT TO HIGH 4 POS.
2C8C 67                        MOV      H, A     / SET H=11110000
2C8D 03                        INX      B        / TO 2CND

                     /         2ND CHAR

2C8E 0A                        LDAX     B        / GET IT
2C8F CDAA2C                    CALL     CHOPIT   / GET THE 4 -BIT VERSION
2C92 B4                        ORA      H        / CONCAT WITH A
2C93 67                        MOV      H, A     / SET H=11112222 (H DONE)
2C94 03                        INX      B        / TO 3RD
2C95 C39B2C                    JMP      H2BNZ    / JMP AROUND 2ND ENTRY

                     /         3RD CHAR

                               EJECT
\            ENTER HERE FOR "H2BNZ"

                     H2BN2,
2C98 C5                        PUSH     B        / SAVE REGS
2C99 D5                        PUSH     D        / MOVE TO B/C
2C9A C1                        POP      B        / DONE

                     H2BNZ,
2C9B 0A                        LDAX     B        / GET IT
2C9C CDAA2C                    CALL     CHOPIT   / GET 4 BITS
2C9F CF                        NSWP              / SHIFT TO HIGH 4 BIT POS
2CA0 6F                        MOV      L, A     / SAVE IN LOW REG, L=33330000
2CA1 03                        INX      B        / TO 4TH

                     /         4TH CHAR

```

```
2CA2 0A                     LDAX    B          / GET IT
2CA3 CDAA2C                 CALL    CHOPIT     / GET THE 4 BIT VERSION
2CA6 B5                     ORA     L          / CONCAT WITH A
2CA7 6F                     MOV     L,A        / L=33334444 (DONE

2CA8 C1                     POP     B          / REST REG
2CA9 C9                     RET



                  /         CHOPIT IS A QUICKIE SUBR FOR
                  /         H2BN4 (H2BN2) TO GET AN ASCII HEX
                  /         CHAR TO 4 BIT HEX VALUE.

                  CHOPIT,
2CAA FE20                   CPI     .20        / IF SPACE, SUBS 0
2CAC C2B12C                 JNZ     CHOPGO     / NO , NOT 0
2CAF 3E30                   MVI     A,.30      / YES, FORCE 0
                  CHOPGO,
2CB1 D630                   SUI     .30        / MAKE CHAR 0-REL
2CB3 FE0A                   CPI     @10        / IS THIS AN A-F CHAR?
2CB5 D8                     RC                 /NO, 0-9 ALL SET
2CB6 D607                   SUI     @7         / YES, SUB HOLE IN ASCII SET
2CB8 E60F                   ANI     .0F        / CLEAR TOP 4 BITS
2CBA C9                     RET

                            EJECT

                  SUBJOB \          EOF - SEND EOF TO TAPE

                  /         THIS RTN WILL SEND AN END OF TAPE
                  /         OVER PORT 2 TO COMPLETE 'DUMP'
                  /         FUNCTION - ':00000001FF'


                  /         ** ENTRY

                  /                 NO ENTRY REQUIREMENTS

                  /         CALL    EOF

                  /         ** EXIT

                  /                 END RECORD WRITTEN TO TAPE
                  /                 UNCOND ERROR CALL IF ERROR


                  EOF,

2CBB C5                     PUSH    B          / SAVE REGS
2CBC D5                     PUSH    D
2CBD E5                     PUSH    H

2CBE 21C4FE                 LXI     H,CASBUF/ PTR TO CASSETTE BUFF
2CC1 110A0D                 LXI     D,CRLF     / GET 'CRLF'
2CC4 EF                     MOVDE              / STORE CRLF
2CC5 3E3A                   MVI     A,ASCCOL/ START OF REC
2CC7 77                     MOV     M,A        / STORE IT
2CC8 23                     INX     H          / BUMP PTR

                  /         NOW PLACE LENGTH & ADDR

2CC9 EB                     XCHG               / SAVE ADDR IN D/E
2CCA 213030                 LXI     H,ASC22 / PTR TO '00'
2CCD EB                     XCHG               / SWITHC
2CCE EF                     MOVDE              / LENGTH
2CCF EF                     MOVDE              / ADDR HI
2CD0 EF                     MOVDE              / ADDR LO

                  /         NOW PLACE RECORD TYPE

2CD1 113130                 LXI     D,ASC01 / '01'
2CD4 EF                     MOVDE              / STORE

                            EJECT
```

```
                   / `    FINALLY STORE THE END RECORD CHKSM

2CD5 114646               LXI     D,ENDCHK/ ADDR OF CHECKSUM
2CD8 EF                   MOVDE            / STORE

2CD9 CDFF2B               CALL    P2TIU    / TRANSMIT THE RECORD

2CDC E1                   POP     H        / RESTORE REGS
2CDD D1                   POP     D
2CDE C1                   POP     B
2CDF C9                   RET

                          EJECT

                   SUBJOB \        CHEX80 - COMPUT INTEL CHKSM

                   /      THIS RTN WILL COMPUTE & STORE A
                   /      CHECKSUM FOR AN INTEL RECORD.

                   /      ** ENTRY

                   /               H/L --> 1ST BYTE TO CHECKSUM
                   /               A = # OF BYTES

                   /      CALL CHEX80

                   /      **-EXIT

                   /               CHECKSUM STORED AFTER LAST BYTE
                   /               OF RECORD
                   /                A = ?

                   CHEX80,
2CE0 C5                   PUSH    B        / SAVE REGS
2CE1 D5                   PUSH    D
2CE2 E5                   PUSH    H

2CE3 47                   MOV     B,A      / COUNTER IN B
2CE4 AF                   CLA              / INIT CHKSUM
2CE5 F5                   PUSH    PSW      / SAVE CHKSUM
2CE6 C5                   PUSH    B        / SAVE COUNTS
2CE7 EB                   XCHG .          ./ ADDRESS TO D/E
                   CHEX8A,
2CE8 D5                   PUSH    D        / SAVE ADDR
2CE9 CD992C               CALL    H2BN2    / CONVERT TO BIN
2CEC D1                   POP     D        / GET BACK ADDR
2CED 13                   INX     D        / BUMP TO NEXT CHAR
2CEE 13                   INX     D        / DONE
2CEF C1                   POP     B        / GET COUNTER
2CF0 F1                   POP     PSW      / GET CHKSUM
2CF1 85                   ADD     L        / UPDATE CHKSUM
2CF2 F5                   PUSH    PSW      / SAVE CHKSUM AGAIN
2CF3 05                   DCR     B        / SEE IF DONE
2CF4 C5                   PUSH    B        / SAVE
2CF5 C2E82C               JNZ     CHEX8A   / NOT 0--> NOT DONE


                          EJECT
                   /      **      CHECKSUM IS IN A REG
                   /              STORE IN RECORD AFTER 2'S CMP

2CF8 2F                   CMA              / 1'S COMPL
2CF9 3C                   INR     A        / 2'S COMPL
2CFA CD692C               CALL    BN2HX    / CONVERT TO HEX ASCII
2CFD EB                   XCHG             / ADDR TO H/L
2CFE D7                   MOVBC            / STORE CHKSUM

2CFF C1                   POP     B        / CLEAN STACK
2D00 F1                   POP     PSW
2D01 E1                   POP     H
2D02 D1                   POP     D
2D03 C1                   POP     B
2D04 C9                   RET

                          EJECT
```

```
                        SUBJOB \        TOPIO - INDIRECT CALL

                        /       THIS SUBR WILL HOPEFULLY SOLVE THE
                        /       COMMUNICATIONS PROBLEMS BETWEEN PORT 1 OF THE
                        /       P180 AND THE 484.  IT APPEARS THAT THE P180
                        /       AND THE 484 CAN GET OUT OF SYNC.  THE 484
                        /       DETECTS AN ERROR AND INTERPRETS THE NEXT '02' AS
                        /       A 'STX' WHICH CAN LEAD TO ALL SORTS OF PROBLEMS.
                        /       THIS RTN WILL HOPEFULLY GIVE THE UNITS ENOUGH TI'E
                        /       TO GET BACK INTO SYNC AND RETRY THE COMM.  A
                        /       FEW TIMES BEFORE CALLING IT A HARD ERROR.


                        /       ** ENTRY
                        /               D/E SET UP FOR CALL TO "PIO"
                        /               "CMDFUF" SET UP FOR CALL TO "PIO"

                        /       CALL  TOPIO

                        /       ** EXIT
                        /               HARD ERROR --> ERROR CALL
                        /                               GO TO "EXEC"
                        /               SUCCESS --> NORMAL RET


                        TOPIO,
 2D05 E5                        PUSH    H       / SAVE REGS
 2D06 C5                        PUSH    B
 2D07 D5                        PUSH    D       / CERTAINLY SAVE COMMAND!

 2D08 0604                      MVI     B,4     / # OF RETRIES
 2D0A C5                        PUSH    B       / SAVE RETRY COUNTER

                        TOPIO2,
 2D0B CD8125                    CALL    PIO     / ISSUE COMMAND
 2D0E CA1F2D                    JZ      TOPIOX  / 0 --> NO ERROR
 2D11 CD5B2C                    CALL    DELHLF  / DELAY APPROX .5 SEC
 2D14 C1                        POP     B       / GET RETRY COUNTER
 2D15 D1                        POP     D       / GET COMMAND
 2D16 D5                        PUSH    D       / SAVE COMMAND
 2D17 05                        DCR     B       / DONE ?
 2D18 C5                        PUSH    B       / SAVE JUST IN CASE
 2D19 C20B2D                    JNZ     TOPIO2  / 0 --> TIMED OUT

                                EJECT
                **      COME HERE ON HARD ERROR

 2D1C C3EF00                    JMP     EXEC    / QUIT!

                **      SUCCESSFUL

                        TOPIOX,
 2D1F CD9F1B                    CALL    CLRERR  / CLEAR ERROR CONDITION
 2D22 C1                        POP     B       / CLEAN STACK
 2D23 D1                        POP     D
 2D24 C1                        POP     B
 2D25 E1                        POP     H
 2D26 C9                        RET

                                EJECT


                        SUBJOB \        MESSAGES FOR L-D-V

                        MSGBDC,
 2D27 0A                        DB      MSGBCX  / CAN'T DETERMINE CONFIG
 2D28 42414420                  DA      'BAD CONFIG
 2D2C 434F4E46
 2D30 4947
      000A              MSGBCX= .-MSGBDC-1

                        MSGNO2,
 2D32 0C                        DB      MSGNX2  / NOTHING CONNECTED TO PORT 2
 2D33 504F5254                  DA      'PORT 2 EMPTY'
 2D37 20322045
 2D3B 4D505459
      000C              MSGNX2= .-MSGNO2-1
```

```
                    MSGBDR,
2D3F 0A                     DB      MSGBRX  / ILLEGAL RECORD TYPE
2D40 42414420               DA      'BAD RECORD'
2D44 5245434F
2D48 5244
     000A           MSGBRX= .-MSGBDR-1

                    MSGLDG,
2D4A 07                     DB      MSGLDX  / DISPLAY @ START OF LOAD
2D4B 4C4F4144               DA      'LOADING'
2D4F 494E47
     0007           MSGLDX= .-MSGLDG-1

                    MSGLDD,
2D52 09                     DB      MSGLDZ  / @ END OF LOAD
2D53 4C4F4144               DA      'LOAD O.K.'
2D57 204F2E4B
2D5B 2E
     0009           MSGLDZ= .-MSGLDD-1

                    MSGDPG,
2D5C 07                     DB      MSGDPX  / @ START OF DUMP
2D5D 44554D50               DA      'DUMPING'
2D61 494E47
     0007           MSGDPX= .-MSGDPG-1

                    MSGDOK,
2D64 09                     DB      MSGDOX  / @ END OF DUMP
2D65 44554D50               DA      'DUMP O.K.'
2D69 204F2E4B
2D6D 2E
     0009           MSGDOX= .-MSGDOK-1

                            EJECT
                    MSGVFG,
2D6E 09                     DB      MSGVFX  / @ START OF VERIFY
2D6F 56455249               DA      'VERIFYING'
2D73 4659494E
2D77 47
     0009           MSGVFX= .-MSGVFG-1

                    MSGRNM,
2D78 0C                     DB      MSGRNX  / REG-RAM MIS-MATCH
2D79 52454720               DA      'REG NO-MATCH'
2D7D 4E4F2D4D
2D81 41544348
     000C           MSGRNX= .-MSGRNM-1

                    MSGLNM,
2D85 0C                     DB      MSGLNX  / LOGIC RAM MIS-MATCH
2D86 4C434720               DA      'LCG NO-MATCH'
2D8A 4E4F2D4D
2D8E 41544348
     000C           MSGLNX= .-MSGLNM-1

                    MSGCNM,
2D92 0C                     DB      MSGCNX  / COIL RAM MIS-MATCH
2D93 434F4920               DA      'COI NO-MATCH'
2D97 4E4F2D4D
2D9B 41544348
     000C           MSGCNX= .-MSGCNM-1

                    MSGVOK,
2D9F 09                     DB      MSGVKX  / VERIFY OK
2DA0 56455249               DA      'VERIFY OK'
2DA4 4659204F
2DA8 4B
     0009           MSGVKX= .-MSGVOK-1


                            EJECT
                    SUBJOB \        CROSS REFERENCE
```

```
069                 /        END OF FILE: LDV 180 MOD 01
070
071      2DA9       EOLDV=.
072
073                 /        $ FOLLOWS BUT DOES NOT PRINT!!!


ACKTMR   003C   #024-031  345-001
ADDFLG   0000   #031-045  174-031  259-035
ADRCON   60BE   #031-021  119-005
ADREON   FE8E   #031-013  035-005  121-009  160-021  163-010  179-041
                 179-046  182-012  215-090  226-011  227-038  227-045
                 305-013  306-004  336-077  341-017  341-021
ADRSON   FE8C   #031-011  031-013  121-007  160-017  163-008  212-018
                 213-019  215-089  227-043
ADRSYS   60BD   #031-019  275-020
ADRUSE   0002   #031-023  119-037  182-009  213-046  373-028
ADVFLD   000B   #014-013  091-025  291-014
ASCADN   001B   #038-032  177-005  253-034
ASCAST   002A   #038-047  174-036
ASCBAR   0074   #040-121  322-008
ASCBLK   0020   #038-037  092-013  092-015  092-015  092-021  092-021
                 132-071  140-101  143-034  149-011  150-019  153-018
                 154-047  177-005  177-005  197-027  217-030  218-079
                 224-051  245-090  245-096  246-028  248-012  248-046
                 248-048  264-016  266-022  290-012  295-023  302-012
                 305-010  307-011  310-008  329-042  330-058  331-069
                 331-106  333-117  333-129  333-141
ASCC     0043   #039-072  258-020  258-032
ASCCBK   001F   #038-036  092-013  092-014  092-014  092-014  092-014
                 183-036  185-124  193-024  232-014  240-030  244-059
ASCCOL   003A   #039-063  371-011  391-036  408-029
ASCD     0044   #039-073  132-050  132-067  154-042  266-024
ASCDIS   0066   #040-107  156-007
ASCDIV   000A   #038-015  259-044
ASCDOT   002E   #039-051  258-023  258-026  258-029
ASCDSH   0072   #040-119  142-151  166-045  218-058  218-077  224-058
                 234-060  318-038  329-036
ASCLB    0005   #038-010  172-027  174-006  174-014  177-005  238-016
                 252-064  253-003  253-017  253-031  258-009  258-020
                 258-032  320-016
ASCLRE   0060   #040-101  284-005  325-021
ASCMIN   002D   #039-050  174-033  259-038
ASCMPX   000B   #038-016  259-041
ASCN     004E   #039-083  258-032
ASCNAK   00D0   #041-170  107-028  347-028
ASCNBK   001D   #038-034  092-019  092-020  092-020  092-020  092-020
                 184-052  186-131  193-028  232-011  242-004  245-075
ASCO     004F   #039-084  258-032
ASCPLS   002B   #038-048  174-030  259-035
ASCR     0052   #039-087  258-020
ASCRB    0009   #038-014  174-009  177-005  253-011  253-037  258-020
                 258-023  258-026  258-029  258-032
ASCS     0053   #039-088  153-013
ASCSLH   002F   #039-052  174-039
ASCSTX   0002   #041-169  106-013  107-023  344-005
ASCT     0054   #039-089  258-020
ASCTL    0002   #038-007  258-005
ASCTMR   0007   #038-012  258-023  258-026  258-029
ASCTR    0004   #038-009  258-005
ASCUB    0003   #038-008  258-005  258-005  258-005
ASCVBK   001E   #038-035  092-014  092-020  232-017  246-004
ASCZZ    3030   #360-015  408-036
ASC0     0030   #039-053  074-002  075-019  075-032  075-045  076-058
                 118-017  150-021  152-004  167-017  173-063  235-026
                 242-027  242-034  245-102  245-109  251-016  255-022
                 258-023  258-026  258-029  266-013  295-013  297-021
                 298-059  299-008
ASC0UN   0010   #038-021  173-063  173-070  245-109  258-009  258-009
                 258-009
ASC01    3031   #360-018  371-041  408-044
ASC1     0031   #039-054  131-027  152-005  154-033  167-024  168-052
                 175-018  236-013  258-023  258-026  258-029  295-015
ASC2     0032   #039-055  152-006  158-035  167-043  295-017
ASC3     0033   #039-056  152-007  171-046  187-153  264-045  295-019
ASC3UN   0013   #038-024  173-052
```

| | | | | | | | |
|---|---|---|---|---|---|---|---|
| ASC4 | 0034 | #039-057 | 152-008 | 171-038 | 175-022 | 191-006 | 255-007 |
| | | 264-043 | 295-021 | | | | |
| ASC4UN | 0014 | #038-025 | 172-044 | 173-076 | 258-009 | | |
| ASC5 | 0035 | #039-058 | 152-009 | | | | |
| ASC6 | 0036 | #039-059 | 152-010 | | | | |
| ASC7 | 0037 | #039-060 | 152-011 | | | | |
| ASC8 | 0038 | #039-061 | 152-012 | | | | |
| ASC9 | 0039 | #039-062 | 152-013 | | | | |
| ASMCOL | 0006 | #014-021 | 121-014 | 264-023 | 267-037 | | |
| ASMCON | FE7F | #030-034 | 030-036 | 143-048 | 183-043 | 196-026 | 229-028 |
| | | 232-039 | 233-024 | 233-033 | 233-044 | 235-015 | 235-036 |
| | | 238-026 | 240-004 | 241-054 | 241-062 | 241-069 | 243-004 |
| | | 244-046 | | | | | |
| ASMNUM | 0006 | #030-032 | 264-007 | | | | |
| ASMROW | 0080 | #030-026 | 112-006 | 131-019 | 135-040 | 136-064 | 136-078 |
| | | 137-099 | 137-111 | 154-026 | 158-025 | 197-019 | 228-020 |
| | | 264-011 | 285-006 | | | | |
| BADREC | 2BF6 | 396-037 | #397-081 | | | | |
| BCDBN1 | 01A2 * | #073-042 | | | | | |
| BCDBN2 | 0198 | #073-037 | 299-020 | | | | |
| BCDBN3 | 018E | #073-032 | 131-037 | 155-061 | 156-014 | 236-018 | 255-013 |
| | | 264-036 | 297-007 | 300-009 | 301-005 | | |
| BCDBN4 | 0181 | #073-026 | 255-029 | 302-006 | | | |
| BCDSUB | 01A9 | 073-028 | 073-033 | 073-038 | 073-043 | #074-001 | |
| BCDSX | 01C1 | 074-008 | #074-016 | | | | |
| BCDS10 | 01B5 | #074-008 | 074-011 | | | | |
| BCDS20 | 01BD | 074-003 | 074-005 | #074-013 | | | |
| BCDX | 01A8 | 073-029 | 073-034 | 073-039 | #073-045 | | |
| BEEP | 010F | 059-005 | 059-008 | #065-024 | | | |
| BEEP10 | 0114 | #065-027 | 123-038 | | | | |
| BEEP20 | 0116 | 065-025 | #065-029 | | | | |
| BFBASE | 0000 | #025-008 | 025-009 | | | | |
| BFBLKL | 0006 | #025-013 | 025-019 | 025-021 | 025-023 | 026-003 | |
| BFCH | 012E | #070-001 | 079-018 | 108-075 | 123-034 | 344-027 | |
| BFCHX | 0155 | 070-012 | #070-035 | | | | |
| BFCH10 | 0140 | 070-007 | #070-014 | | | | |
| BFINIT | 0124 | #068-001 | 077-010 | 103-004 | 103-009 | 107-042 | 109-103 |
| | | 118-004 | 126-020 | | | | |
| BFIPTR | 0002 | #025-009 | 025-010 | | | | |
| BFLEN | 0004 | #025-011 | 025-012 | 070-002 | 072-024 | | |
| BFOPTR | 0003 | #025-010 | 025-011 | | | | |
| BFUSE | 0005 | #025-012 | 025-013 | 063-007 | 063-010 | 072-002 | 079-004 |
| | | 110-007 | | | | | |
| BNBCD1 | 01FB * | #076-058 | | | | | |
| BNBCD2 | 01E8 | #075-045 | 168-061 | | | | |
| BNBCD3 | 01D5 | #075-032 | 167-040 | 171-050 | 173-057 | 175-026 | |
| BNBCD4 | 01C2 | #075-019 | 120-066 | 170-022 | 194-056 | 214-060 | 253-021 |
| | | 267-029 | 303-025 | 324-023 | | | |
| BN010 | 01C7 | #075-022 | 075-025 | | | | |
| BN020 | 01CF | 075-023 | #075-027 | | | | |
| BN030 | 01DA | #075-035 | 075-038 | | | | |
| BN040 | 01E2 | 075-036 | #075-040 | | | | |
| BN050 | 01ED | #075-048 | 076-051 | | | | |
| BN060 | 01F5 | 076-049 | #076-053 | | | | |
| BN2HX | 2C69 | 371-028 | 371-032 | 371-036 | 372-052 | #404-018 | 411-050 |
| BUFFER | FF70 * | #025-039 | | | | | |
| BURST | 000B | #005-044 | 086-027 | | | | |
| CASBUF | FEC4 | #036-034 | 371-008 | 372-065 | 391-027 | 392-053 | 393-111 |
| | | 396-007 | 396-022 | 396-033 | 397-042 | 399-006 | 399-013 |
| | | 408-026 | | | | | |
| CATHI | 0001 | #041-165 | 142-150 | 156-006 | 166-044 | 218-057 | 218-076 |
| | | 224-057 | 224-073 | 284-013 | 284-016 | 322-008 | 322-010 |
| | | 322-013 | 322-017 | 322-019 | 322-024 | 326-024 | 326-032 |
| | | 326-035 | 326-040 | 329-035 | 331-090 | | |
| CA0011 | 00E4 | #041-154 | 149-008 | 166-055 | 224-074 | 229-035 | 231-097 |
| | | 322-013 | 322-019 | 326-022 | 326-024 | | |
| CA0101 | 00C0 | #041-145 | 284-009 | 325-025 | | | |
| CA0111 | 00D8 | #041-151 | 322-017 | | | | |
| CA1010 | 00CC * | #041-148 | | | | | |
| CA1100 | 00E0 | #041-153 | 149-011 | 172-023 | 174-011 | 177-005 | 238-045 |
| | | 248-043 | 253-013 | 253-039 | 319-058 | 320-012 | 326-030 |
| | | 326-032 | 331-091 | 333-143 | | | |
| CA1101 | 00D0 | #041-149 | 149-008 | 165-032 | 322-010 | 333-131 | |
| CA1110 | 00DC | #041-152 | 166-047 | 217-025 | 217-036 | 224-078 | 322-024 |
| | | 326-036 | 330-052 | 331-097 | 333-119 | | |

| | | | | | | | | |
|---|---|---|---|---|---|---|---|---|
| CA1111 | 00E8 | | #041-155 | 166-052 | 217-023 | 326-041 | 331-094 | 331-108 |
| CHEX8A | 2CE8 | | #410-029 | 410-041 | | | | |
| CHEX80 | 2CE0 | | 372-068 | 393-120 | #410-019 | | | |
| CHOPGO | 2CB1 | | 407-147 | #407-149 | | | | |
| CHOPIT | 2CAA | | 406-098 | 406-106 | 407-124 | 407-132 | #407-145 | |
| CKDASH | 098D | | 138-018 | 139-077 | #142-146 | | | |
| CLKINI | 039E | | 058-006 | #095-001 | | | | |
| CLKINT | 03AB | | 083-032 | #097-001 | | | | |
| CLKI10 | 03A4 | | #095-005 | 095-008 | | | | |
| CLK010 | 03AF | | #097-004 | 097-030 | | | | |
| CLK020 | 03C7 | | #097-022 | 099-008 | 099-012 | 099-024 | 099-038 | |
| CLK030 | 03C8 | | 097-008 | 097-010 | #097-024 | | | |
| CLK100 | 03DE | | 098-010 | #099-004 | | | | |
| CLK200 | 03EB | | 098-011 | #099-012 | | | | |
| CLK300 | 03EE | | 098-012 | #099-016 | | | | |
| CLK400 | 03F4 | | 098-013 | #099-021 | | | | |
| CLK410 | 03F7 | | 099-017 | #099-023 | 099-043 | | | |
| CLK500 | 03FD | | 098-014 | #099-028 | | | | |
| CLK510 | 0408 | | 099-031 | #099-034 | | | | |
| CLK520 | 0409 | * | #099-036 | | | | | |
| CLK600 | 0411 | | 098-015 | #099-042 | | | | |
| CLRERR | 1B9F | | 119-011 | 263-006 | #263-021 | 413-114 | | |
| CMDBFL | 0018 | | #035-007 | 035-009 | | | | |
| CMDBUF | FE90 | | #035-005 | 035-009 | 119-004 | 119-036 | 131-041 | 132-054 |
| | | | 133-033 | 155-052 | 155-065 | 156-019 | 156-041 | 161-035 |
| | | | 163-022 | 182-018 | 183-039 | 183-041 | 183-046 | 184-060 |
| | | | 192-023 | 195-083 | 203-021 | 207-035 | 207-053 | 209-085 |
| | | | 210-032 | 212-021 | 213-023 | 226-017 | 233-039 | 235-034 |
| | | | 235-040 | 235-042 | 236-046 | 237-049 | 237-058 | 237-061 |
| | | | 240-017 | 241-072 | 241-075 | 242-042 | 242-044 | 243-024 |
| | | | 246-041 | 248-024 | 250-056 | 250-068 | 250-078 | 251-024 |
| | | | 251-028 | 251-046 | 255-017 | 255-032 | 265-050 | 267-015 |
| | | | 275-019 | 278-015 | 286-042 | 305-018 | 305-022 | 306-009 |
| | | | 307-022 | 308-010 | 308-024 | 310-012 | 311-005 | 312-052 |
| | | | 313-013 | 314-007 | 314-014 | 344-004 | 344-008 | 344-019 |
| | | | 365-036 | 380-038 | 380-042 | 381-067 | | |
| CMDCUR | 0080 | | #005-010 | 086-013 | | | | |
| CMDDEC | 00C0 | | #042-016 | 203-035 | 206-012 | 248-027 | | |
| CMDDEL | 0060 | | #042-010 | 205-033 | 209-095 | 211-077 | 212-026 | 221-045 |
| | | | 313-016 | | | | | |
| CMDGO | 0090 | | #042-013 | 273-028 | | | | |
| CMDINC | 00B0 | | #042-015 | 246-046 | 307-037 | 308-039 | | |
| CMDINI | 0000 | | #042-014 | 274-051 | 380-015 | | | |
| CMDINS | 0050 | | #042-009 | 226-022 | 305-033 | 306-027 | 310-015 | 311-025 |
| CMDLED | 0070 | | #042-011 | 286-044 | | | | |
| CMDNAK | 00D0 | * | #042-017 | | | | | |
| CMDPRE | 00E0 | | #005-013 | 086-024 | | | | |
| CMDPWR | 0040 | | #042-008 | 278-018 | | | | |
| CMDRED | 0010 | | #042-005 | 119-008 | 156-021 | 161-038 | 163-026 | 213-025 |
| | | | 266-001 | 267-018 | 275-023 | 365-027 | 371-022 | 384-039 |
| CMDRST | 0000 | | #005-006 | 086-001 | | | | |
| CMDSCH | 0030 | | #042-007 | 119-044 | 185-084 | | | |
| CMDST | 0020 | | #005-007 | 086-027 | | | | |
| CMDSTP | 0080 | | #042-012 | 273-007 | 380-010 | | | |
| CMDWRT | 0020 | | #042-006 | 132-060 | 133-047 | 155-067 | 156-045 | 209-070 |
| | | | 244-039 | 250-071 | 255-038 | 312-061 | 381-070 | |
| CMD02 | 0001 | | #042-023 | 119-008 | 132-060 | 133-047 | 155-067 | 156-021 |
| | | | 156-045 | 161-038 | 163-026 | 209-070 | 212-026 | 213-025 |
| | | | 226-022 | 244-039 | 246-046 | 247-057 | 248-027 | 248-038 |
| | | | 250-071 | 255-038 | 266-001 | 267-018 | 275-023 | 312-061 |
| CNVHEX | 2C81 | | 405-053 | #405-062 | | | | |
| COIRAM | 29AF | | 377-090 | #378-105 | | | | |
| COLBKL | 0006 | | #028-019 | 028-024 | 028-025 | 028-026 | 028-027 | 028-028 |
| | | | 028-029 | 028-030 | 028-031 | 028-032 | 028-033 | 028-035 |
| | | | 180-054 | 180-055 | 278-039 | 278-040 | 328-014 | 328-015 |
| | | | 339-020 | | | | | |
| COLDEC | 2500 | | 219-104 | 248-039 | 313-028 | #337-015 | | |
| COLD10 | 2524 | | #338-066 | 338-070 | | | | |
| COLD20 | 2530 | | 338-059 | #338-075 | | | | |
| COLD99 | 2538 | | 338-068 | #338-085 | | | | |
| COLEHI | 0007 | | #028-014 | 028-015 | 207-046 | 211-048 | 248-020 | 250-064 |
| | | | 307-016 | 311-046 | 313-007 | 335-046 | 337-044 | |
| COLELO | 0003 | | #028-015 | 028-016 | | | | |
| COLINC | 24B8 | | 247-058 | 305-038 | 306-039 | 307-042 | 309-053 | 310-020 |
| | | | 311-032 | #334-015 | | | | |
| COLI10 | 24DA | | #335-060 | 335-068 | | | | |

| | | | | | | | |
|---|---|---|---|---|---|---|---|
| COLI20 | 24E6 | 334-037 | #336-072 | | | | |
| COLI99 | 24F6 | 335-063 | #336-095 | | | | |
| COLMSK | 000F | #030-028 | 112-020 | 135-035 | 136-067 | 137-088 | 138-009 |
| | | 138-037 | 139-052 | 165-012 | 180-053 | 180-081 | 201-025 |
| | | 202-013 | 224-088 | 230-063 | 231-089 | 234-053 | 241-048 |
| | | 286-040 | 318-030 | 323-040 | 325-013 | 328-013 | |
| COLSHI | 0000 | #028-012 | 028-013 | | | | |
| COLSLO | 0001 | #028-013 | 028-014 | | | | |
| COLTAB | FDED | #028-021 | 028-023 | 028-037 | 180-055 | 278-039 | 293-016 |
| | | 328-014 | | | | | |
| COLTBA | FE23 | #028-032 | 028-033 | | | | |
| COLTBB | FE29 | #028-033 | 028-035 | | | | |
| COLTBL | 0042 | #028-037 | 293-017 | | | | |
| COLTBX | FE2F | #028-035 | 028-037 | 029-006 | 339-022 | | |
| COLTB1 | FDED | #028-023 | 028-024 | | | | |
| COLTB2 | FDF3 | #028-024 | 028-025 | | | | |
| COLTB3 | FDF9 | #028-025 | 028-026 | | | | |
| COLTB4 | FDFF | #028-026 | 028-027 | | | | |
| COLTB5 | FE05 | #028-027 | 028-028 | | | | |
| COLTB6 | FE0B | #028-028 | 028-029 | | | | |
| COLTB7 | FE11 | #028-029 | 028-030 | | | | |
| COLTB8 | FE17 | #028-030 | 028-031 | | | | |
| COLTB9 | FE1D | #028-031 | 028-032 | | | | |
| COMPB1 | 0043 | #005-017 | 086-004 | | | | |
| COMPB2 | 0014 | #005-019 | 086-006 | | | | |
| COMPB3 | 007B | #005-021 | 086-008 | | | | |
| COMPB4 | 0036 | #005-023 | 086-010 | | | | |
| COMPHI | 1164 | 188-026 | 189-005 | 190-034 | #195-079 | | |
| CONCOL | 295A | 373-033 | #375-003 | | | | |
| CONUSE | 2933 | 373-031 | #374-049 | | | | |
| CONVRT | 2C79 | 404-022 | 404-027 | #405-051 | | | |
| CON4A | 298E | 373-044 | 374-055 | 374-058 | 374-061 | 374-064 | 374-067 |
| | | #376-040 | | | | | |
| CON4AO | 2987 | 375-009 | 375-013 | 375-017 | 375-021 | #375-030 | |
| CON4ER | 297E | 374-071 | #375-023 | | | | |
| CON484 | 2915 | 362-027 | #373-024 | 378-116 | 380-028 | 384-015 | |
| CRLF | 0D0A | #360-025 | 371-006 | 408-027 | | | |
| CRTCTL | 0038 | #002-017 | 054-013 | 086-002 | 086-014 | 086-025 | 086-028 |
| CRTDAT | 0039 | #002-018 | 086-005 | 086-007 | 086-009 | 086-011 | 086-016 |
| | | 086-018 | | | | | |
| CRTINI | 026B | 058-007 | #086-001 | | | | |
| CRTRFH | F804 | #012-012 | 012-017 | 012-019 | 013-038 | 013-039 | 014-004 |
| | | 015-006 | 089-004 | | | | |
| CRTRFX | FD4E | #012-025 | 023-007 | | | | |
| CRTSIR | 0020 | #005-030 | 083-024 | 086-033 | 086-037 | | |
| CRTSTA | 0038 | #002-016 | 083-023 | 086-032 | 086-036 | | |
| CRTSVE | 0004 * | #005-033 | | | | | |
| CRTTMP | 0544 | #012-015 | 012-021 | 012-023 | 015-006 | | |
| CRT010 | 0296 | #086-032 | 086-034 | | | | |
| CRT020 | 029D | #086-036 | 086-038 | | | | |
| CRT50E | FD4E | #012-021 | 012-025 | 013-038 | | | |
| CRT50S | F804 | #012-017 | 013-047 | 013-048 | | | |
| CRT60E | FD4C | #012-023 | 013-039 | | | | |
| CRT60S | F806 | #012-019 | 012-021 | 012-023 | 013-050 | 013-051 | |
| CSFMT2 | 28FB | #372-050 | 372-058 | | | | |
| CSFRMT | 28C9 | 363-004 | #371-001 | | | | |
| CURACT | FE7E | #030-020 | 030-034 | 137-107 | 138-008 | 138-016 | 139-072 |
| | | 140-096 | 140-109 | 140-112 | 142-138 | 158-023 | 165-011 |
| | | 178-012 | 180-052 | 180-079 | 180-087 | 181-100 | 197-016 |
| | | 199-052 | 200-081 | 201-024 | 202-011 | 210-012 | 212-005 |
| | | 212-012 | 217-008 | 219-085 | 223-030 | 228-017 | 229-042 |
| | | 229-049 | 232-003 | 232-020 | 233-048 | 286-039 | 293-043 |
| | | 305-004 | 316-005 | 318-025 | 323-014 | 328-012 | |
| CURCON | FE80 | #030-036 | 030-038 | 137-115 | 140-086 | 141-127 | 178-018 |
| | | 198-012 | 222-067 | 242-015 | 242-039 | 243-008 | 244-049 |
| | | 314-011 | 321-006 | | | | |
| CURDSP | FE7D | #030-018 | 030-020 | 137-108 | 139-067 | 139-071 | 142-136 |
| | | 178-008 | 178-013 | 178-026 | 178-031 | 180-088 | 180-092 |
| | | 223-027 | 223-038 | 231-080 | 234-074 | 238-036 | 238-038 |
| | | 239-054 | 239-056 | 241-047 | 252-073 | 252-075 | 253-025 |
| | | 253-027 | 253-048 | 254-050 | 293-039 | 317-008 | 319-050 |
| | | 325-012 | | | | | |
| CURHOZ | 007F | #005-040 | 086-015 | | | | |
| CURSOR | 052B | #111-028 | 137-105 | 139-069 | 178-033 | 180-090 | 223-040 |
| | | 234-056 | 293-045 | 318-033 | | | |
| CURVER | 0000 | #005-039 | 086-017 | | | | |

| | | | | | | | |
|---|---|---|---|---|---|---|---|
| CUR010 | 0538 | 111-030 | #111-037 | | | | |
| CUR100 | 0547 | 111-032 | 111-040 | #112-004 | 140-098 | 142-147 | 165-015 |
| | | 197-024 | 217-010 | 223-047 | 234-057 | 255-004 | 264-013 |
| | | 317-010 | 318-035 | 320-006 | | | |
| CUR110 | 0561 | #112-020 | 112-031 | | | | |
| CUR120 | 0569 | 112-007 | #112-025 | | | | |
| CUR200 | 0578 | 112-014 | 112-021 | #112-033 | 112-036 | | |
| DCMP | 00F7 | #052-020 | 120-054 | 185-108 | 213-047 | 334-036 | 338-058 |
| | | 339-023 | 339-034 | 368-031 | 378-108 | 380-046 | 382-099 |
| | | 393-129 | | | | | |
| DELDEX | 140E | 223-032 | #225-105 | | | | |
| DELDSH | 1478 | 222-071 | #223-018 | | | | |
| DELD10 | 148E | #223-045 | 224-040 | | | | |
| DELD20 | 1497 | #224-055 | 224-052 | | | | |
| DELD25 | 1400 | 224-059 | #224-061 | | | | |
| DELD30 | 14B2 | 224-077 | #224-079 | | | | |
| DELHEX | 005F | #403-075 | 403-081 | | | | |
| DELHLF | 005B | 273-013 | 273-034 | 362-018 | 399-024 | 400-051 | #403-071 |
| | | 412-092 | | | | | |
| DELTEX | 1474 | 222-057 | #222-075 | | | | |
| DELTIO | 144F | 204-036 | 205-035 | 206-013 | 209-096 | #221-024 | |
| DELT10 | 1460 | 221-043 | #222-051 | | | | |
| DINFLG | 0002 | #032-070 | 173-073 | 175-006 | 237-060 | | |
| DISMSK | F7FF | #032-061 | 132-057 | | | | |
| DISPTR | FE81 | #030-038 | 030-040 | 121-015 | 264-010 | 264-019 | 264-025 |
| | | 237-031 | | | | | |
| DISTMR | 0001 | #014-033 | 121-012 | 267-037 | | | |
| DIVFLG | 0003 | #031-018 | 174-029 | 259-044 | | | |
| DMABLK | 0020 | #012-032 | 090-006 | 090-028 | 091-038 | 092-019 | |
| DMACMD | 00BC | #006-017 | 056-040 | | | | |
| DMAEOR | 00F1 | #012-031 | 090-004 | | | | |
| DMAFAN | 0090 | #012-033 | 090-025 | 091-013 | 091-035 | 092-013 | 092-019 |
| | | 111-033 | 111-035 | 269-037 | 269-039 | 276-002 | 276-004 |
| | | 276-008 | 276-010 | 276-014 | 276-016 | 276-020 | 276-022 |
| | | 276-024 | 276-028 | 276-030 | 276-034 | 276-036 | 276-040 |
| | | 277-042 | | | | | |
| DMAINI | 02B0 | 086-020 | #088-001 | | | | |
| DMAMAS | 0080 | #006-008 | 006-017 | | | | |
| DMAME2 | 0004 | #006-013 | 006-017 | | | | |
| DMAME3 | 0008 | #006-012 | 006-017 | | | | |
| DMAMOD | 0028 | #002-014 | 086-041 | 088-002 | | | |
| DMAREB | 0030 | #006-006 | 088-009 | 088-018 | | | |
| DMAST1 | 036E | 091-015 | #092-004 | 092-006 | | | |
| DMAST2 | 0380 | 091-027 | #092-008 | 092-010 | | | |
| DMAST3 | 0388 | 091-009 | #092-012 | 092-016 | 196-016 | | |
| DMAST4 | 0393 | 091-021 | #092-018 | 092-022 | 196-019 | | |
| DMAS1X | 0011 | 092-004 | #092-006 | | | | |
| DMAS2X | 0007 | 092-008 | #092-010 | | | | |
| DMAS3X | 000A | 092-012 | #092-016 | | | | |
| DMAS4X | 000A | 092-018 | #092-022 | | | | |
| DMA0AD | 0020 * | #002-005 | | | | | |
| DMA010 | 02DE | #089-009 | 089-011 | | | | |
| DMA020 | 02F6 | #089-020 | 089-022 | | | | |
| DMA2AD | 0024 | #002-009 | 088-004 | 088-006 | | | |
| DMA2TC | 0025 | #002-010 | 088-008 | 088-010 | | | |
| DMA3AD | 0026 | #002-011 | 088-013 | 088-015 | | | |
| DMA3TC | 0027 | #002-012 | 088-017 | 088-019 | | | |
| DM50AH | 00F8 | #013-047 | 013-048 | | | | |
| DM50AL | 0004 * | #013-048 | | | | | |
| DM50TC | 0549 | #013-038 | 013-041 | 013-042 | | | |
| DM50TH | 0005 | #013-041 | 013-042 | | | | |
| DM50TL | 0049 * | #013-042 | | | | | |
| DM60AH | 00F8 | #013-050 | 013-051 | 088-005 | 088-014 | | |
| DM60AL | 0006 | #013-051 | 088-003 | 088-012 | | | |
| DM60TC | 0547 | #013-039 | 013-044 | 013-045 | | | |
| DM60TH | 0005 | #013-044 | 013-045 | 088-009 | 088-018 | | |
| DM60TL | 0047 | #013-045 | 088-007 | 088-016 | | | |
| DRGFLG | 0003 | #032-071 | 173-072 | 175-005 | 175-019 | 236-048 | |
| DSPADV | FD0A | #015-020 | 015-022 | 291-013 | 291-017 | | |
| DSPASM | FCB1 | #015-006 | 015-008 | 015-016 | 196-015 | 269-041 | |
| DSPBSY | FC6C | #014-017 | 344-038 | 344-045 | | | |
| DSPCON | FCB3 | #015-008 | 015-010 | 143-043 | 183-035 | 185-123 | 193-023 |
| | | 232-013 | 234-078 | 240-029 | 244-058 | 244-067 | 251-032 |
| DSPERR | FCBB | #015-012 | 015-014 | 099-028 | 113-017 | 113-021 | 263-029 |
| DSPLOG | F808 | #014-004 | 014-017 | 016-004 | 112-008 | 293-032 | 322-007 |

| | | | | | | | |
|---|---|---|---|---|---|---|---|
| DSPNOD | 0007 | #014-006 | 090-023 | 112-017 | 112-028 | 134-069 | 143-044 |
| | | 165-016 | 172-021 | 174-012 | 217-017 | 217-045 | 218-051 |
| | | 218-063 | 218-070 | 224-050 | 225-094 | 225-096 | 225-098 |
| | | 234-059 | 234-079 | 234-081 | 234-084 | 238-010 | 238-014 |
| | | 238-043 | 238-046 | 239-049 | 244-068 | 248-041 | 250-083 |
| | | 252-057 | 252-062 | 253-015 | 253-040 | 282-015 | 282-024 |
| | | 318-037 | 319-055 | 320-009 | 320-014 | 326-019 | |
| DSPNUM | FCFE | #015-016 | 015-018 | 143-035 | 150-018 | 150-033 | 151-056 |
| | | 158-033 | 158-045 | 184-051 | 186-130 | 191-005 | 193-027 |
| | | 196-018 | 232-010 | 234-083 | 235-025 | 236-012 | 236-016 |
| | | 238-018 | 242-003 | 242-026 | 242-033 | 245-074 | 245-088 |
| | | 251-015 | 252-066 | 255-020 | 295-012 | 297-006 | 297-020 |
| | | 298-058 | 299-007 | 299-019 | 300-008 | 301-004 | 302-004 |
| | | 302-011 | | | | | |
| DSPPOW | 0003 | #014-008 | 016-004 | 112-008 | | | |
| DSPREF | FCDA | #015-014 | 112-025 | | | | |
| DSPSHT | FD02 | #015-018 | 015-020 | 153-021 | 290-013 | 290-016 | |
| DSPSTP | FD18 | #015-022 | 015-024 | 118-019 | 194-055 | 214-057 | 303-024 |
| DSPST0 | 1D7F | #276-002 | 276-006 | | | | |
| DSPST1 | 1D8A | #276-008 | 276-012 | | | | |
| DSPST2 | 1D95 | #276-014 | 276-018 | | | | |
| DSPST3 | 1DA1 | #276-020 | 276-026 | | | | |
| DSPST4 | 1DB3 | #276-028 | 276-032 | | | | |
| DSPST5 | 1DBE | #276-034 | 276-038 | | | | |
| DSPST6 | 1DC9 | #276-040 | 277-044 | | | | |
| DSPSUP | 1D7F | 270-049 | #276-001 | | | | |
| DSPS0X | 000A | 276-002 | #276-006 | | | | |
| DSPS1X | 000A | 276-008 | #276-012 | | | | |
| DSPS2X | 000B | 276-014 | #276-018 | | | | |
| DSPS3X | 0011 | 276-020 | #276-026 | | | | |
| DSPS4X | 000A | 276-028 | #276-032 | | | | |
| DSPS5X | 000A | 276-034 | #276-038 | | | | |
| DSPS6X | 000C | 276-040 | #277-044 | | | | |
| DSPTAB | 00DF | #049-012 | 097-020 | 163-039 | 271-020 | | |
| DSPUSE | FD1D | #015-024 | 015-026 | 120-065 | 324-022 | | |
| DSPVAL | FD28 * | #015-026 | | | | | |
| DSPVER | FCB3 | #015-010 | 015-012 | 149-014 | 149-016 | 229-034 | 231-096 |
| | | 232-016 | 238-012 | 238-021 | 246-003 | 246-027 | 248-011 |
| | | 250-085 | 250-089 | 252-060 | 305-009 | 307-010 | 310-007 |
| DUMFLG | 0002 | #031-043 | 171-041 | 172-047 | 235-039 | 251-027 | |
| DUMP | 2810 | 272-015 | #362-001 | | | | |
| DUMP10 | 282D | #362-026 | 363-022 | | | | |
| DUMP15 | 2830 | #362-029 | 363-012 | | | | |
| DUMP2 | 281F | #362-017 | 362-020 | | | | |
| DUMP20 | 285B | 362-032 | #364-020 | 384-020 | | | |
| DUMP25 | 2862 | 362-034 | #365-021 | 384-023 | | | |
| DUMP30 | 2849 | 362-033 | #363-015 | | | | |
| DVR1 | 0058 | #001-019 | 353-026 | | | | |
| DVR2 | 0032 | #001-020 | 353-026 | | | | |
| DVR3 | 0033 | #001-021 | 353-026 | | | | |
| ENDCHK | 4646 | #360-020 | 409-050 | | | | |
| EOCFLG | 0080 | #031-034 | 170-020 | 180-076 | 242-043 | 305-030 | 307-034 |
| EOCHI | 0004 | #028-016 | 028-017 | 165-005 | 203-027 | 246-020 | 247-053 |
| | | 248-033 | 306-034 | 307-004 | 308-046 | | |
| EOCLO | 0005 | #028-017 | 028-019 | 205-017 | 207-046 | 248-020 | 250-076 |
| | | 278-046 | 311-010 | 312-068 | | | |
| EOF | 2CBB | 363-026 | #408-020 | | | | |
| EOLDV | 2DA9 * | #417-071 | | | | | |
| EOUSEG | FEC0 | #036-022 | 368-023 | 373-038 | 376-043 | 381-096 | |
| ERRADI | 0005 | #043-059 | 349-015 | | | | |
| ERRADR | 0004 | #043-058 | 349-013 | | | | |
| ERRCHK | 0003 | #043-057 | 349-009 | | | | |
| ERRCMD | 0006 | #043-060 | 349-017 | | | | |
| ERRCON | 000E | #043-068 | 349-031 | | | | |
| ERRFLD | 000D | #014-015 | 091-011 | 113-018 | 263-030 | | |
| ERRFUL | 0011 | #043-071 | 349-037 | | | | |
| ERRLEN | 000D | #043-067 | 349-029 | | | | |
| ERRMEM | 000B | #043-065 | 349-025 | | | | |
| ERRMSK | 0008 | #043-062 | 349-019 | | | | |
| ERRNOD | 000A | #043-064 | 349-023 | | | | |
| ERRNPD | 000F | #043-069 | 349-033 | | | | |
| ERROR | 057E | #113-016 | 121-021 | 132-078 | 134-078 | 143-024 | 157-006 |
| | | 158-030 | 162-054 | 176-005 | 195-066 | 198-032 | 201-037 |
| | | 216-005 | 256-003 | 261-008 | 262-006 | 271-016 | 274-066 |
| | | 292-006 | 295-027 | 346-048 | 351-018 | 375-025 | 378-127 |
| | | 382-137 | 386-043 | 387-042 | 389-048 | 394-145 | 397-083 |
| | | 402-049 | | | | | |

| | | | | | | | |
|---|---|---|---|---|---|---|---|
| ERROVR | 0002 | #043-056 | 349-007 | | | | |
| ERRPAR | 0001 | #043-055 | 349-005 | | | | |
| ERRSEQ | 0009 | #043-063 | 349-021 | | | | |
| ERRSTP | 000C | #043-066 | 349-027 | | | | |
| ERRSUP | 0010 | #043-070 | 349-035 | | | | |
| ERRTIM | 0007 | #043-061 | 349-011 | | | | |
| ERRTMR | 001E | #024-025 | 099-036 | 113-023 | | | |
| EXEC | 00EF | 058-020 | #063-005 | 363-033 | 375-026 | 378-128 | 380-013 |
| | | 380-018 | 382-130 | 382-138 | 385-083 | 386-044 | 387-043 |
| | | 390-051 | 394-146 | 397-084 | 402-052 | 413-109 | |
| EXEC10 | 00F2 | #063-007 | 063-013 | | | | |
| FACNOR | 0080 | #040-136 | 099-029 | 153-018 | 284-007 | 290-015 | 325-023 |
| FACREV | 0090 | #040-137 | 099-032 | 111-041 | 111-043 | 153-013 | |
| FIELD1 | 0000 | #360-035 | 386-031 | | | | |
| FIELD2 | 0020 | #360-037 | 386-034 | | | | |
| FIXCOL | 255A | 335-067 | 338-069 | #340-014 | | | |
| FIXEON | 256B | 336-096 | 338-086 | #341-013 | | | |
| FIXVER | 2462 | 234-088 | 249-049 | 250-092 | #329-023 | | |
| FIXV05 | 246E | 329-037 | #329-041 | | | | |
| FIXV10 | 2473 | #329-047 | 331-070 | | | | |
| FIXV15 | 247B | 330-050 | #330-057 | | | | |
| FIXV20 | 247E | 329-043 | #331-065 | | | | |
| FIXV30 | 24A0 | 331-092 | #333-114 | | | | |
| FIXV40 | 24A8 | 331-095 | #333-126 | | | | |
| FIXV50 | 24B0 | 331-098 | #333-138 | | | | |
| GETEND | 28B5 | 368-030 | #369-059 | | | | |
| GETHL | 00E7 | #050-009 | 070-028 | 072-019 | 120-052 | 133-023 | 160-025 |
| | | 170-018 | 171-032 | 172-032 | 175-012 | 179-042 | 182-013 |
| | | 185-092 | 185-096 | 185-105 | 193-014 | 194-040 | 203-010 |
| | | 207-050 | 210-024 | 211-050 | 212-019 | 213-020 | 227-039 |
| | | 240-009 | 246-036 | 248-022 | 250-066 | 267-028 | 278-013 |
| | | 303-018 | 305-014 | 306-005 | 307-018 | 308-006 | 310-006 |
| | | 311-048 | 313-009 | 324-016 | 334-035 | 335-049 | 336-078 |
| | | 337-047 | 338-057 | 339-033 | 340-018 | 340-026 | 341-018 |
| | | 368-024 | 373-039 | 380-043 | 382-097 | 393-128 | |
| GETNET | 0C98 | 160-029 | #161-009 | 162-050 | 194-036 | 215-096 | |
| GETSIZ | 2888 | 364-022 | #368-001 | | | | |
| GETSXT | 28BA | 368-032 | #369-068 | | | | |
| GETSX2 | 28C5 | 369-074 | #369-081 | | | | |
| GETSZ2 | 2894 | 368-010 | #368-015 | 369-054 | | | |
| GETSZ5 | 289E * | #368-027 | | | | | |
| GETYPE | 1446 | 199-054 | 200-089 | 201-027 | 202-022 | #220-014 | |
| HLDFLG | 0000 | #031-041 | 171-039 | 172-045 | | | |
| H2BNZ | 2C9B | 406-110 | #407-122 | | | | |
| H2BN2 | 2C98 | 392-054 | 396-008 | 396-034 | 399-007 | #407-117 | 410-031 |
| H2BN4 | 2C84 | 396-023 | 397-045 | #406-090 | | | |
| INPBAS | 00C0 | #031-017 | 267-011 | | | | |
| INPDIS | 0008 | #032-054 | 032-061 | 131-048 | 266-020 | | |
| INPFLG | 0001 | #031-042 | 300-018 | | | | |
| INPSTA | 0004 | #032-053 | 154-048 | 155-055 | 266-015 | | |
| INTFLG | 0002 | #031-036 | 167-020 | 167-036 | | | |
| INTREX | 0265 | 083-017 | 083-025 | #083-036 | | | |
| INTRP | 0245 | 053-008 | #083-001 | | | | |
| INTR10 | 0257 | 083-013 | #083-022 | | | | |
| INTSTA | 0001 | #032-051 | 156-034 | 156-035 | 266-007 | | |
| INTVCL | 0004 | #010-015 | 012-012 | | | | |
| INTVEC | F800 | #010-011 | 012-012 | 053-007 | 058-013 | | |
| IOFLD | 0020 | #031-028 | 131-040 | 155-064 | 156-018 | 265-049 | |
| ISCOIL | 257A | 178-020 | 229-029 | 233-045 | 241-055 | 241-063 | 318-022 |
| | | #342-016 | | | | | |
| KBDBFL | 0010 | #025-030 | 025-037 | 118-002 | 126-018 | | |
| KBDBLK | FDA8 | #025-023 | 026-003 | 063-010 | 118-003 | 123-033 | 126-001 |
| | | 126-019 | | | | | |
| KBDBUF | FF70 | #025-037 | 025-039 | 118-001 | 126-017 | | |
| KBDCMD | 06CD | 063-012 | #126-001 | | | | |
| KBDCMX | 06E5 | 126-003 | #126-017 | | | | |
| KBDIMS | 065B | 121-020 | #121-027 | 121-029 | | | |
| KBDIMX | 0008 | 121-027 | #121-029 | | | | |
| KBDINI | 059F | 058-016 | #118-001 | | | | |
| KBDINT | 0664 | 083-030 | #123-001 | | | | |
| KBDIX | 065A | 121-018 | #121-023 | | | | |
| KBDI10 | 05C8 | #118-021 | 118-024 | | | | |
| KBDI15 | 05CE | #119-004 | 119-010 | | | | |
| KBDI20 | 05FA | #119-029 | 119-031 | | | | |
| KBDI25 | 0613 | #119-044 | 119-046 | | | | |

| | | | | | | | | |
|---|---|---|---|---|---|---|---|---|
| KBDI50 | 0654 | | 120-055 | #121-020 | | | | |
| KBDTAB | 06F2 | | 126-004 | #127-004 | | | | |
| KBDX | 06CC | | 123-041 | 124-050 | #124-060 | | | |
| KBD010 | 066F | | #123-007 | 124-056 | | | | |
| KBD020 | 067C | | #123-015 | 124-049 | | | | |
| KBD021 | 068F | | 123-020 | #123-026 | | | | |
| KBD025 | 06AE | | 123-024 | 123-028 | 123-037 | #123-040 | | |
| KBD030 | 06B2 | | 123-017 | #123-043 | | | | |
| KBD040 | 06BE | | 123-011 | #124-052 | | | | |
| KCLADV | 0004 | | #030-014 | 118-014 | | | | |
| KCLEAR | 0010 | | #030-012 | 118-014 | 150-016 | 150-029 | 196-021 | 227-036 |
| | | | 242-010 | 295-007 | | | | |
| KERROR | 0040 | | #030-010 | 263-011 | 346-050 | | | |
| KEYCLR | 0018 | * | #129-027 | | | | | |
| KEYCOL | 0004 | | #129-007 | 146-047 | | | | |
| KEYDEL | 0020 | * | #130-051 | | | | | |
| KEYDIS | 0024 | * | #130-055 | | | | | |
| KEYDWN | 0008 | | #129-011 | 135-011 | | | | |
| KEYENT | 0000 | * | #129-003 | | | | | |
| KEYERR | 0002 | * | #129-005 | | | | | |
| KEYFOR | 002D | * | #129-048 | | | | | |
| KEYGET | 0017 | * | #129-026 | | | | | |
| KEYHT | 000A | * | #129-013 | | | | | |
| KEYHZ0 | 0022 | | #129-037 | 143-029 | 146-059 | | | |
| KEYHZS | 0021 | | #129-036 | 143-031 | 146-065 | | | |
| KEYLAT | 0003 | | #129-006 | 146-053 | | | | |
| KEYLFT | 0009 | | #129-012 | 135-013 | 138-030 | | | |
| KEYNCR | 0029 | | #129-044 | 145-029 | | | | |
| KEYNEG | 0026 | | #129-041 | 145-041 | | | | |
| KEYNOR | 0028 | | #129-043 | 145-023 | | | | |
| KEYNUA | 0021 | * | #130-052 | | | | | |
| KEYNUB | 0022 | * | #130-053 | | | | | |
| KEYNUC | 0023 | * | #130-054 | | | | | |
| KEYNU1 | 001C | * | #129-031 | | | | | |
| KEYNU2 | 001D | * | #129-032 | | | | | |
| KEYNU3 | 001E | * | #129-033 | | | | | |
| KEYNU4 | 0023 | * | #129-038 | | | | | |
| KEYNU5 | 0024 | * | #129-039 | | | | | |
| KEYNU6 | 0025 | * | #129-040 | | | | | |
| KEYNU7 | 002A | * | #129-045 | | | | | |
| KEYNU8 | 002B | * | #129-046 | | | | | |
| KEYNU9 | 002C | * | #129-047 | | | | | |
| KEYNXT | 0016 | * | #129-025 | | | | | |
| KEYPOS | 0027 | | #129-042 | 145-035 | | | | |
| KEYPRE | 0015 | | #129-024 | 160-011 | | | | |
| KEYRGT | 0007 | * | #129-010 | | | | | |
| KEYSCH | 000E | * | #129-017 | | | | | |
| KEYSP1 | 0027 | * | #130-058 | | | | | |
| KEYSP2 | 0025 | * | #130-056 | | | | | |
| KEYSP3 | 002E | * | #130-049 | | | | | |
| KEYSP4 | 0020 | * | #129-035 | | | | | |
| KEYSP5 | 001F | * | #129-034 | | | | | |
| KEYSP6 | 0010 | * | #129-019 | | | | | |
| KEYSP7 | 000F | * | #129-018 | | | | | |
| KEYSTR | 0026 | * | #130-057 | | | | | |
| KEYSUP | 002F | | #130-050 | 269-029 | | | | |
| KEYUP | 0001 | | #129-004 | 135-009 | | | | |
| KEYVOP | 0006 | | #129-009 | 149-009 | | | | |
| KEYVSH | 0005 | * | #129-008 | | | | | |
| KEY0 | 0011 | | #129-020 | 146-083 | 152-004 | 258-019 | 272-004 | |
| KEY1 | 000B | | #129-014 | 147-102 | 152-005 | 258-028 | 272-006 | |
| KEY2 | 0012 | | #129-021 | 147-095 | 152-006 | 258-025 | 272-008 | |
| KEY3 | 0019 | | #129-028 | 147-089 | 152-007 | 258-022 | 272-010 | |
| KEY4 | 000D | | #129-016 | 147-116 | 152-008 | 272-012 | | |
| KEY5 | 0014 | | #129-023 | 152-009 | 272-014 | | | |
| KEY6 | 001B | | #129-030 | 148-130 | 152-010 | 272-016 | | |
| KEY7 | 000C | | #129-015 | 147-109 | 152-011 | | | |
| KEY8 | 0013 | | #129-022 | 148-136 | 152-012 | 258-031 | | |
| KEY9 | 001A | | #129-029 | 147-123 | 152-013 | | | |
| KF01 | 0762 | | 128-056 | #131-010 | | | | |
| KF01A0 | 0839 | | 134-059 | #134-063 | | | | |
| KF01ER | 07D1 | | 131-030 | #132-077 | | | | |
| KF01NC | 0850 | | 134-077 | #134-081 | 134-083 | | | |
| KF01NX | 0008 | | 134-081 | #134-083 | | | | |
| KF01RR | 0849 | | 133-017 | #134-076 | | | | |
| KF01X | 0848 | | 131-014 | 132-063 | 132-072 | 132-075 | 132-079 | 134-051 |
| | | | #134-072 | | | | | |

```
KF0110   0771      131-012 #131-016
KF0120   0788      131-028 #131-032
KF0130   07AC      132-051 #132-054
KF0140   07CD      132-069 #132-074
KF0150   07DA      131-020 #133-004
KF0175   07FA      133-008  133-011  133-014 #133-019
KF0185   0803     #133-026  133-030
KF0190   080C      133-027 #133-032
KF0195   0831     #134-058  134-061
KF02     0859      127-005  127-011  127-012  127-013 #135-006
KF02CL   094E      138-011 #140-083
KF02LP   0913     #138-023  139-079
KF02X    0980      136-056  136-079  137-117  140-091  140-102 #141-129
KF0205   0875      135-024 #135-032
KF0210   088C      135-041 #135-045
KF0220   0891      135-010 #136-051
KF0230   089F      135-012 #136-060
KF0240   08BC      136-065 #136-078
KF0250   08C4      135-014 #137-085
KF0260   08D7      137-089 #137-095
KF0270   08E6      135-043  135-046  136-076  137-093 #137-103
KF0280   08E7      135-037  136-055  136-069  136-080  137-096  137-100
                  #137-105
KF0285   08FF      137-112 #138-003  139-078
KF0290   0928      138-031 #139-049
KF0292   0936      138-038  139-045  139-054 #139-066
KF0295   0967     #140-108  140-117
KF0296   0979      138-019 #141-123
KF0297   097C      140-118 #141-125
KF03     0997      127-007  127-008  127-037  127-038  127-042  127-043
                   127-044  127-045 #143-005
KF03MX   000B      144-055 #144-057
KF03M1   09EA      143-023 #144-055  144-057  176-004
KF03X    09E6      143-009  143-025 #144-050
KF0310   09A6      143-007 #143-013  150-013
KF0320   09AE     #143-017  143-021
KF0330   09C0      143-018 #143-027
KF0340   09CC      143-030 #143-034
KF0350   09D3     #143-038  143-041
KF0360   09D9      143-032 #143-043
KF04     0AB3      127-009  127-010 #149-005
KF04X    0AD5      149-017 #149-021
KF0410   0AC7      149-010 #149-013
KF0420   0AD2      149-007 #149-019
KF05     0AD6      127-015  127-016  127-017  127-021  127-022  127-023
                   127-024  127-029  127-030  127-031 #150-011
KF05TB   0B21      150-046 #152-004
KF0510   0AF2     #150-024  150-027
KF0520   0B00      150-017 #150-032
KF0530   0B06     #150-036  150-041
KF0540   0B12     #150-048  151-052
KF0550   0B1B      151-049 #151-054
KF06     0B35      127-014 #153-006
KF06X    0B50      153-014 #153-020
KF0610   0B4A      153-010 #153-016
KF07     0B56      128-049 #154-016
KF07ER   0BFE      154-043  156-008 #157-004
KF07MS   0C05      157-004 #157-012  157-014
KF07MX   000C      157-012 #157-014
KF07NX   0008      157-016 #157-018
KF07N1   0C12      132-077  154-035 #157-016  157-018
KF07RR   0C01      154-036 #157-005
KF07X    0C04      154-020  155-069  156-024  156-047 #157-008
KF0705   0B65      154-018 #154-022
KF0707   0B7D      154-034 #154-038
KF0710   0B92      155-049 #155-052
KF0725   0BB2      154-027 #156-003
KF0730   0BE4      156-028 #156-034
KF0735   0BE9      156-032 #156-037
KF08     0C1B      127-027 #158-017
KF08ER   0C37     #158-030  158-036
KF08MX   000B      159-057 #159-059
KF08M1   0C66      158-028 #159-057  159-059
KF08X    0C65      158-021  158-031  158-040 #159-053
KF0805   0C2A      158-019 #158-023
KF0810   0C3D      158-026 #158-033
```

| | | | | | | | |
|---|---|---|---|---|---|---|---|
| KF09 | 0C72 | 127-025 | 127-026 | #160-005 | | | |
| KF09ER | 0CCA | 161-025 | #162-054 | | | | |
| KF09MS | 0F56 | 174-043 | #177-004 | 177-006 | | | |
| KF09MX | 0006 | 177-004 | #177-006 | | | | |
| KF09TB | 0D0A | 163-037 | #164-004 | | | | |
| KF0905 | 0C7F | 160-007 | #160-011 | | | | |
| KF0915 | 0C8D | 160-012 | #160-020 | | | | |
| KF0920 | 0C93 | 160-018 | #160-025 | | | | |
| KF0927 | 0CA8 | 161-016 | 161-020 | #161-029 | | | |
| KF0930 | 0CCE | 161-046 | #163-004 | | | | |
| KF0935 | 0CE9 | #163-019 | 166-066 | 168-064 | | | |
| KF099A | 0F7B | 178-021 | #178-030 | | | | |
| KF0999 | 0F5D | 163-028 | 164-004 | 164-005 | 176-006 | #178-003 | |
| KF10 | 1001 | 127-018 | #182-005 | | | | |
| KF10RG | 10E3 | 187-154 | #190-004 | | | | |
| KF10X | 1157 | 184-057 | 185-086 | 194-043 | #194-058 | 195-067 | |
| KF1005 | 1010 | 182-007 | #182-012 | | | | |
| KF1010 | 1017 | 182-010 | #182-018 | | | | |
| KF1015 | 1041 | 183-037 | #184-051 | | | | |
| KF1017 | 1064 | 184-072 | #184-077 | | | | |
| KF1020 | 1067 | 184-053 | #185-084 | 192-025 | | | |
| KF1025 | 10C8 | 188-014 | #189-004 | | | | |
| KF1030 | 10D5 | 189-007 | #189-015 | | | | |
| KF1040 | 1107 | 190-018 | #191-004 | | | | |
| KF1070 | 110F | 188-019 | 188-021 | 188-027 | 189-010 | 189-017 | 189-021 |
| | | 190-023 | 190-028 | 190-030 | 190-035 | #192-013 | |
| KF1080 | 1119 | 185-125 | 186-132 | 188-028 | 189-009 | 189-022 | 190-036 |
| | | 191-007 | #193-004 | | | | |
| KF1090 | 1134 | 193-025 | 193-029 | #194-035 | | | |
| KF1095 | 114B | 194-046 | #194-050 | | | | |
| KF11 | 1171 | 127-028 | #196-005 | | | | |
| KF1110 | 117B | 196-007 | #196-015 | | | | |
| KF12 | 119D | 128-052 | #197-010 | | | | |
| KF12ER | 13DA | 198-006 | 210-006 | #216-004 | | | |
| KF12NL | 1247 | #201-035 | 202-024 | | | | |
| KF12NM | 115B | 185-109 | 185-117 | #195-064 | | | |
| KF12NV | 11E9 | 198-014 | #198-030 | 199-059 | 199-068 | 199-071 | 200-086 |
| | | 200-091 | | | | | |
| KF1205 | 11B9 | #197-029 | 197-036 | | | | |
| KF1210 | 11C8 | 197-020 | #198-003 | | | | |
| KF1212 | 11F0 | 198-020 | #198-038 | | | | |
| KF1214 | 11F5 | 198-023 | #199-045 | | | | |
| KF1216 | 1217 | 198-026 | #200-076 | | | | |
| KF1220 | 122F | 198-040 | 199-061 | 199-070 | #201-008 | | |
| KF1225 | 1257 | 201-015 | 201-029 | #202-004 | | | |
| KF1230 | 1273 | 202-007 | 202-015 | #203-006 | | | |
| KF1240 | 1296 | 203-031 | #204-013 | | | | |
| KF1242 | 129C | #204-024 | 204-027 | | | | |
| KF1244 | 12A4 | #204-036 | 204-048 | | | | |
| KF1245 | 12B0 | 204-038 | #205-005 | | | | |
| KF1250 | 12CA | 205-024 | #206-004 | | | | |
| KF1260 | 12D6 | 205-029 | #207-019 | | | | |
| KF1264 | 130B | 209-073 | #209-102 | | | | |
| KF1265 | 1310 | 197-012 | #210-003 | | | | |
| KF1270 | 1320 | #210-016 | 212-013 | | | | |
| KF1275 | 135A | 210-028 | #212-004 | | | | |
| KF1280 | 1369 | 212-008 | #212-017 | | | | |
| KF1295 | 1378 | 211-083 | #213-007 | | | | |
| KF1297 | 13BF | 213-036 | #215-074 | | | | |
| KF1298 | 13CB | 213-048 | 214-068 | #215-085 | | | |
| KF13 | 14D3 | 128-058 | #226-005 | | | | |
| KF13MS | 1528 | 226-031 | #227-054 | 227-056 | | | |
| KF13MX | 0005 | 227-054 | #227-056 | | | | |
| KF13X | 1527 | 226-009 | 226-025 | #227-050 | | | |
| KF1305 | 14E2 | 226-007 | #226-011 | | | | |
| KF14 | 152E | 127-004 | #228-005 | | | | |
| KF14ER | 1AFE | 228-015 | 230-074 | 231-104 | 232-012 | 232-015 | 232-018 |
| | | 232-035 | 235-007 | 236-042 | 255-026 | #256-003 | |
| KF14IV | 1AFB | 233-026 | 233-028 | 236-009 | 240-006 | 241-038 | 241-057 |
| | | 241-064 | 251-008 | 255-008 | #256-001 | | |
| KF14M1 | 1B41 | 158-034 | 198-031 | 232-034 | 236-041 | 256-002 | #260-004 |
| | | 260-006 | 271-015 | 295-026 | | | |
| KF14M2 | 1B49 | 232-009 | 255-025 | #260-008 | 260-010 | | |
| KF14M3 | 1B52 | 235-006 | #260-012 | 260-014 | | | |
| KF14M4 | 1B5F | 231-103 | #260-016 | 260-018 | | | |
| KF14M5 | 1B67 | 230-073 | #260-020 | 260-022 | | | |
| KF14NR | 1587 | 229-058 | #230-072 | | | | |

| | | | | | | | |
|---|---|---|---|---|---|---|---|
| KF14NV | 15A8 | 229-036 | #231-102 | | | | |
| KF14VT | 15A0 | 231-084 | #231-095 | | | | |
| KF14X | 1B01 | 228-009 | 233-013 | 233-042 | 234-091 | 235-023 | 237-054 |
| | | 238-005 | 239-057 | 243-021 | 244-041 | 246-005 | 246-031 |
| | | 247-050 | 248-030 | 249-050 | 250-074 | 250-094 | 251-013 |
| | | 252-051 | 254-051 | 255-040 | #256-005 | | |
| KF14Z | 1B02 | 229-043 | 229-057 | 232-004 | 232-033 | #257-011 | |
| KF15 | 1B73 | 127-019 | 127-020 | 127-035 | 127-036 | 128-050 | 128-057 |
| | | 128-059 | #261-007 | | | | |
| KF15MS | 1B7A | 261-007 | #261-013 | 261-015 | | | |
| KF15MX | 0009 | 261-013 | #261-015 | | | | |
| KF16 | 1B84 | 127-032 | 127-033 | 127-034 | 127-039 | 127-040 | 127-041 |
| | | 127-046 | 127-047 | 127-048 | 128-053 | 128-054 | 128-055 |
| | | #262-005 | | | | | |
| KF16MS | 1B8B | 262-005 | #262-011 | 262-013 | | | |
| KF16MX | 000B | 262-011 | #262-013 | | | | |
| KF17 | 1B97 | 127-006 | #263-005 | | | | |
| KF18 | 1BB4 | 100-017 | #264-007 | | | | |
| KF18M1 | 1C7E | 266-032 | #268-046 | 268-048 | | | |
| KF18M2 | 1C82 | 266-034 | #268-050 | 268-052 | | | |
| KF18X | 1C78 | 264-029 | 266-005 | 267-021 | 267-035 | #267-039 | |
| KF1805 | 1BB6 | #264-009 | 264-028 | | | | |
| KF1810 | 1BD2 | 264-022 | #264-025 | | | | |
| KF1815 | 1BDD | 264-017 | #264-031 | | | | |
| KF1816 | 1C2B | 266-023 | #266-026 | | | | |
| KF1820 | 1C2C | 266-010 | 266-014 | #266-028 | | | |
| KF1825 | 1C3D | 266-033 | #266-036 | | | | |
| KF1830 | 1C43 | 264-044 | #267-004 | | | | |
| KF1835 | 1C4A | 264-046 | #267-009 | | | | |
| KF1840 | 1C51 | 267-007 | #267-015 | | | | |
| KF1899 | 1C6C | 266-037 | #267-031 | | | | |
| KF19 | 1C86 | 128-051 | #269-016 | | | | |
| KF19TB | 1CFE | 271-004 | #272-004 | | | | |
| KF19X | 1D13 | 269-020 | 270-062 | 271-017 | #272-021 | 273-024 | 273-046 |
| | | 274-059 | | | | | |
| KF1905 | 1C95 | 269-018 | #269-022 | | | | |
| KF1910 | 1CD1 | #270-052 | 270-060 | | | | |
| KF1920 | 1CE3 | #271-004 | 288-021 | | | | |
| KF1925 | 1CE8 | #271-007 | 271-013 | | | | |
| KF1930 | 1CFC | 271-008 | #271-019 | | | | |
| KF20 | 1DFA | 100-011 | #278-008 | | | | |
| KF20X | 1E9A | 278-010 | 278-020 | #282-029 | | | |
| KF2005 | 1E1C | #278-026 | 282-027 | | | | |
| KF2010 | 1E33 | #278-042 | 278-044 | | | | |
| KF2020 | 1E52 | #280-017 | 280-044 | | | | |
| KF2025 | 1E59 | #280-022 | 280-028 | | | | |
| KF2030 | 1E6C | 280-019 | 280-034 | #280-040 | | | |
| KF2035 | 1E7D | 279-050 | 280-014 | #282-004 | | | |
| KF2040 | 1E8C | 278-038 | #282-018 | | | | |
| KF21 | 1EE1 | 100-005 | #285-005 | | | | |
| KF21X | 1F22 | 285-007 | 285-029 | #286-047 | | | |
| KF2120 | 1EF0 | #285-013 | 285-015 | | | | |
| KF2130 | 1EF5 * | #285-017 | | | | | |
| KF2140 | 1EFA | #285-020 | 285-026 | | | | |
| KF2150 | 1F0B | 285-022 | #286-032 | | | | |
| KM12NL | 124E | 201-036 | #201-040 | 201-042 | | | |
| KM12X1 | 0008 | 201-040 | #201-042 | | | | |
| KNET | 0008 | #030-013 | 163-006 | 198-004 | 210-005 | 214-063 | 227-036 |
| | | 228-012 | 278-009 | | | | |
| KRESET | 0020 | #030-011 | 113-026 | 123-036 | 194-042 | 263-025 | 288-017 |
| | | 288-024 | | | | | |
| KSHIFT | 0080 | #030-009 | 153-009 | 153-012 | 153-017 | 263-025 | 289-013 |
| | | 290-009 | | | | | |
| KSTATE | FE70 | #030-005 | 030-018 | 113-025 | 113-027 | 118-015 | 123-035 |
| | | 150-015 | 150-028 | 150-030 | 153-007 | 163-005 | 163-007 |
| | | 194-041 | 196-020 | 196-022 | 198-003 | 210-004 | 214-062 |
| | | 214-064 | 227-037 | 228-011 | 242-009 | 242-011 | 263-022 |
| | | 269-034 | 278-008 | 288-012 | 288-016 | 288-023 | 289-012 |
| | | 290-008 | 290-010 | 295-006 | 295-008 | 346-049 | 346-051 |
| KSUPER | 0002 | #030-015 | 269-033 | 288-013 | | | |
| KU01 | 1F28 | 131-010 | 135-006 | 143-005 | 149-005 | 150-011 | 153-006 |
| | | 154-016 | 158-017 | 160-005 | 182-005 | 196-005 | 197-010 |
| | | 226-005 | 228-005 | 269-016 | #288-011 | | |
| KU0105 | 1F3E | 288-014 | #288-023 | | | | |
| KU0110 | 1F46 | 288-018 | #288-027 | | | | |
| KU0115 | 1F47 | 288-025 | #288-029 | | | | |

| | | | | | | | |
|---|---|---|---|---|---|---|---|
| KU02 | 1F49 | 131-011 | 143-006 | 149-006 | 150-012 | 154-017 | 158-018 |
| | | 160-006 | 182-006 | 194-045 | 196-006 | 197-011 | 226-006 |
| | | 228-006 | 269-017 | #289-010 | | | |
| KU03 | 1F53 | 113-028 | 141-130 | 144-050 | 194-058 | 196-024 | 213-009 |
| | | #290-007 | | | | | |
| KU04 | 1F68 | 118-012 | 226-032 | 269-046 | 273-023 | 273-045 | 274-058 |
| | | #291-012 | 362-006 | 363-031 | 380-005 | 382-128 | 384-006 |
| | | 385-082 | | | | | |
| KU05 | 1F79 | 131-013 | 143-008 | 149-019 | 154-019 | 158-020 | 160-008 |
| | | 226-008 | 228-008 | 269-019 | #292-005 | | |
| KU05MS | 1F80 | 292-005 | #292-011 | 292-013 | | | |
| KU05MX | 0009 | 292-011 | #292-013 | | | | |
| KU06 | 1F8A | 118-009 | 163-015 | 213-008 | 226-026 | 269-028 | #293-007 |
| KU0610 | 1F90 | #293-011 | 293-014 | | | | |
| KU0620 | 1F9B | #293-019 | 293-022 | | | | |
| KU0630 | 1FA6 | #293-027 | 293-030 | | | | |
| KU0640 | 1FB1 | #293-035 | 293-037 | | | | |
| KU07 | 1FC7 | 158-039 | 184-056 | 233-012 | 235-022 | 237-053 | 243-020 |
| | | 251-012 | #295-001 | | | | |
| KU07ER | 1FF1 | #295-026 | 296-010 | 296-017 | 296-024 | 296-031 | 296-038 |
| | | 296-045 | 297-016 | 297-022 | 298-053 | 299-006 | 299-009 |
| | | 299-011 | 299-027 | 300-005 | 300-014 | 300-017 | 301-012 |
| | | 301-039 | 302-016 | | | | |
| KU07X | 2120 | 295-030 | #302-025 | | | | |
| KU0700 | 1FFC | 295-014 | #296-004 | | | | |
| KU0701 | 200B | 295-016 | #296-014 | | | | |
| KU0702 | 2014 | 295-018 | #296-021 | | | | |
| KU0703 | 201D | 295-020 | #296-028 | | | | |
| KU0704 | 2026 | 295-022 | #296-035 | | | | |
| KU0705 | 202F | 295-024 | #296-042 | | | | |
| KU0710 | 2038 | 296-006 | 296-016 | #297-005 | | | |
| KU0713 | 2053 | 297-014 | #297-024 | | | | |
| KU0715 | 205D | #297-033 | 297-037 | | | | |
| KU0717 | 2065 | 297-035 | #297-042 | | | | |
| KU0719 | 2070 | 297-046 | #298-057 | | | | |
| KU0730 | 207C | 296-023 | #299-004 | | | | |
| KU0735 | 20AA | 299-025 | #299-029 | | | | |
| KU0740 | 20B2 | 296-030 | #300-003 | | | | |
| KU0745 | 20D4 | 296-037 | #301-003 | | | | |
| KU0750 | 20ED | #301-021 | 301-025 | | | | |
| KU0753 | 20F5 | 301-023 | #301-032 | | | | |
| KU0770 | 2100 | 296-009 | #302-004 | | | | |
| KU0780 | 210C | 296-044 | #302-011 | | | | |
| KU0785 | 2113 | #302-015 | 302-019 | | | | |
| KU0799 | 211F | 298-060 | 298-062 | 299-033 | 300-019 | 301-040 | 302-007 |
| | | #302-023 | | | | | |
| KU08 | 2121 | 163-013 | 215-076 | 226-029 | #303-017 | | |
| KU09 | 2133 | 233-041 | 238-004 | 252-049 | #305-001 | | |
| KU09ER | 2176 | 305-037 | #305-042 | 306-031 | 307-041 | 308-043 | 310-019 |
| KU09UP | 22CF | 247-059 | 305-039 | 306-040 | 307-043 | 309-054 | 310-021 |
| | | 311-037 | #314-006 | | | | |
| KU0910 | 215C | #305-025 | 305-027 | | | | |
| KU0915 | 2179 | 305-011 | #306-004 | | | | |
| KU0920 | 2185 | #306-014 | 306-017 | | | | |
| KU0930 | 21AF | 305-007 | #307-004 | | | | |
| KU0931 | 21CF | #307-027 | 307-031 | | | | |
| KU0932 | 21D8 | 307-028 | #307-033 | | | | |
| KU0935 | 21ED | 307-012 | #308-004 | | | | |
| KU0936 | 21FD | #308-016 | 308-018 | | | | |
| KU0937 | 2209 | #308-026 | 308-029 | | | | |
| KU0940 | 2233 | 307-008 | #310-004 | | | | |
| KU0950 | 2254 | 310-009 | #311-004 | | | | |
| KU0955 | 2265 | #311-017 | 311-019 | | | | |
| KU0960 | 22AC | 312-066 | #313-004 | | | | |
| KU099A | 22DF | #314-016 | 314-031 | | | | |
| KU099B | 22EA | 314-021 | #314-024 | | | | |
| KU11 | 2304 | 133-024 | 201-012 | 202-005 | 203-012 | 204-019 | 221-041 |
| | | 235-003 | 240-010 | 246-007 | 285-005 | 308-012 | 311-013 |
| | | #316-005 | 326-014 | | | | |
| KU12 | 230B | 131-016 | 134-066 | 154-022 | 158-042 | 167-009 | 172-017 |
| | | 174-004 | 174-025 | 234-076 | 238-007 | 238-039 | 244-065 |
| | | 245-080 | 248-040 | 250-082 | 252-054 | 253-001 | 253-029 |
| | | 269-036 | #317-008 | 319-052 | 320-005 | 325-016 | 326-018 |
| KU13 | 2313 | 167-007 | 169-008 | #318-010 | | | |
| KU1305 | 2319 | #318-013 | 318-016 | | | | |

| | | | | | | | |
|---|---|---|---|---|---|---|---|
| KU1310 | 2321 | 318-014 | #318-018 | | | | |
| KU1320 | 2331 | #318-029 | 318-047 | | | | |
| KU1325 | 2345 | #318-040 | 318-043 | | | | |
| KU1330 | 234B * | #318-045 | | | | | |
| KU1335 | 2350 | 318-032 | #319-049 | | | | |
| KU1340 | 2354 | 318-023 | #319-052 | | | | |
| KU14 | 2364 | 170-014 | 171-028 | 175-009 | #320-005 | | |
| KU15 | 237D | 241-037 | 244-062 | #321-006 | | | |
| KU15A | 2380 | 240-005 | #321-007 | | | | |
| KU15X | 238B | 321-012 | #321-016 | | | | |
| KU1505 | 238A | 321-009 | #321-014 | | | | |
| KU16 | 238C | 163-017 | 226-034 | #322-007 | | | |
| KU1610 | 239C | #322-016 | 322-021 | | | | |
| KU17 | 23AA | 133-004 | 140-084 | 140-113 | 141-124 | 178-015 | 179-024 |
| | | 244-052 | 314-013 | #323-012 | | | |
| KU17A | 23B1 | 219-091 | 220-018 | 257-012 | #323-019 | | |
| KU1705 | 23B2 | 323-015 | #323-024 | | | | |
| KU1710 | 23BC | #323-035 | 323-037 | | | | |
| KU18 | 23CB | 211-087 | 227-048 | #324-010 | 336-098 | 338-088 | |
| KU19 | 23E3 | 234-089 | 238-023 | 239-051 | 244-070 | 252-070 | 253-022 |
| | | 253-045 | 319-059 | #325-012 | | | |
| KU19X | 2409 | 325-015 | 325-022 | 325-026 | #325-033 | | |
| KU1905 | 23F3 | #325-020 | 325-031 | | | | |
| KU1910 | 2403 | 325-024 | #325-028 | | | | |
| KU20 | 240A | 234-090 | 238-024 | 239-052 | 250-093 | 252-071 | 253-023 |
| | | 253-046 | #326-012 | | | | |
| KU20X | 2442 | 326-016 | 326-025 | 326-038 | #326-044 | | |
| KU2005 | 2426 | 326-023 | #326-027 | | | | |
| KU2010 | 2435 | 326-031 | #326-035 | | | | |
| KU2015 | 243D | 326-033 | #326-040 | | | | |
| KU21 | 2445 | 121-017 | 178-035 | #327-012 | | | |
| KU22 | 2451 | 133-022 | 165-004 | 203-007 | 205-015 | 210-020 | 219-102 |
| | | 240-008 | 246-018 | 305-002 | #328-012 | | |
| KU2210 | 245C | #328-017 | 328-019 | | | | |
| KU9SUB | 22F8 | 305-034 | 306-028 | 307-038 | 308-040 | 310-016 | 311-026 |
| | | #315-013 | | | | | |
| K02SUB | 0985 | 135-018 | 136-051 | 136-060 | 137-085 | #142-136 | |
| K09A00 | 0F4D | 164-027 | 164-028 | 164-029 | 164-030 | 164-031 | 164-032 |
| | | 164-033 | 164-034 | #176-004 | | | |
| K09Z | 0F87 | 168-063 | #179-019 | | | | |
| K09ZX | 1000 | 180-083 | 180-093 | 181-104 | #181-109 | | |
| K09ZZ | 0F92 | 166-065 | #179-034 | | | | |
| K09Z10 | 0FA8 | #180-057 | 180-059 | | | | |
| K09Z20 | 0FBB | 180-062 | 180-066 | #180-070 | | | |
| K09Z25 | 0FBD | 180-068 | #180-073 | | | | |
| K09Z30 | 0FC6 | #180-079 | 181-098 | | | | |
| K09Z35 | 0FD3 | #180-086 | 181-107 | | | | |
| K09Z40 | 0FE5 | 180-077 | #180-095 | | | | |
| K09100 | 0D48 | 164-006 | #165-004 | | | | |
| K09120 | 0D6D | #165-023 | 166-061 | | | | |
| K09130 | 0D7D | 165-028 | #165-032 | | | | |
| K09140 | 0D82 | 165-025 | #166-035 | | | | |
| K09145 | 0D92 | 166-046 | #166-048 | | | | |
| K09150 | 0D96 | 166-037 | #166-052 | | | | |
| K09160 | 0D98 | 165-033 | #166-054 | | | | |
| K09170 | 0D9B | 165-030 | 166-050 | #166-057 | | | |
| K09200 | 0DAA | 164-007 | 164-008 | 164-009 | 164-010 | 164-011 | 164-012 |
| | | 164-013 | 164-014 | #167-003 | | | |
| K09210 | 0DD5 | 167-019 | 167-021 | #167-026 | | | |
| K09220 | 0DE8 | 167-037 | #167-040 | | | | |
| K09230 | 0DEE | 167-023 | #167-043 | | | | |
| K09240 | 0E09 | 167-041 | #168-063 | 169-009 | 170-023 | 171-051 | 173-068 |
| | | 175-027 | | | | | |
| K09300 | 0E0F | 164-015 | 164-016 | #169-004 | | | |
| K09400 | 0E1C | 164-017 | #170-014 | | | | |
| K09405 | 0E1F | #170-016 | 174-020 | | | | |
| K09500 | 0E2E | 164-018 | #171-028 | | | | |
| K09505 | 0E31 | #171-030 | 174-021 | | | | |
| K09510 | 0E4F | 171-042 | #171-046 | | | | |
| K09515 | 0E51 | 171-040 | 171-044 | #171-048 | | | |
| K09600 | 0E59 | 164-019 | 164-020 | 164-021 | 164-022 | #172-004 | 175-007 |
| K09610 | 0E66 | #172-011 | 172-014 | | | | |
| K09620 | 0E6E | 172-012 | #172-016 | | | | |
| K09625 | 0E7C | #172-025 | 174-045 | | | | |
| K09630 | 0EAA | 172-048 | #173-052 | | | | |
| K09640 | 0EAC | 172-046 | 173-050 | #173-054 | 173-074 | 173-077 | |
| K09650 | 0EB5 | #173-062 | 173-067 | | | | |

| | | | | | |
|---|---|---|---|---|---|
| K09660 | 0EC1 | 172-040 | #173-070 | | |
| K09700 | 0ED0 | 164-023 | 164-024 | #174-004 | |
| K09800 | 0EF3 | 164-025 | #174-025 | | |
| K09810 | 0F16 | 174-032 | 174-035 | 174-038 | #174-041 |
| K09900 | 0F23 | 164-026 | #175-004 | | |
| K09905 | 0F45 | 175-021 | #175-024 | | |
| K12SUB | 13DE | #217-003 | 222-064 | | |
| K12S02 | 13FE | 217-024 | 217-026 | #217-035 | |
| K12S04 | 1400 | 217-031 | #217-041 | | |
| K12S10 | 1406 | #218-051 | 218-066 | | |
| K12S15 | 142B | 218-059 | 218-078 | #219-081 | |
| K12S20 | 1431 | #219-090 | 219-098 | | |
| K14M1X | 0007 | 260-004 | #260-006 | | |
| K14M2X | 0008 | 260-008 | #260-010 | | |
| K14M3X | 000C | 260-012 | #260-014 | | |
| K14M4X | 0007 | 260-016 | #260-018 | | |
| K14M5X | 000B | 260-020 | #260-022 | | |
| K14TAB | 1B35 | 251-030 | #259-034 | | |
| K14005 | 153D | 228-007 | #228-011 | | |
| K14010 | 154B | 228-013 | #228-017 | | |
| K14012 | 1574 | #229-055 | 230-067 | | |
| K14014 | 158D | 229-030 | #231-079 | | |
| K14015 | 15AE | 230-065 | 231-091 | 231-098 | #232-003 |
| K14016 | 15E7 | 232-027 | #232-031 | | |
| K14020 | 15E9 | 232-029 | #232-033 | | |
| K14025 | 15F2 | 232-022 | #232-037 | | |
| K14030 | 15FB | #232-041 | 232-044 | | |
| K14035 | 1603 | 232-042 | #233-001 | | |
| K14037 | 1649 | #234-052 | 234-070 | | |
| K14038 | 165C | #234-062 | 234-066 | | |
| K14039 | 1667 | 234-055 | #234-072 | | |
| K14040 | 166C | 233-046 | #234-076 | | |
| K14065 | 160D * | #233-012 | | | |
| K14070 | 1628 | 233-020 | #233-032 | | |
| K14075 | 1694 | 233-004 | #235-003 | | |
| K14080 | 16C2 | 235-028 | #235-031 | | |
| K14085 | 16D9 | 235-017 | #236-006 | | |
| K14090 | 1700 | #236-031 | 236-034 | | |
| K14095 | 1708 | 236-032 | #236-036 | | |
| K14100 | 1723 | 236-014 | #237-052 | | |
| K14110 | 1738 | 235-043 | 237-050 | #238-003 | |
| K14115 | 1772 | #238-030 | 238-033 | | |
| K14120 | 177A | 238-031 | #238-035 | | |
| K14135 | 17AD | 229-044 | 232-005 | #240-003 | |
| K14145 | 17DE * | #241-040 | | | |
| K14146 | 17F4 | 241-050 | #241-061 | | |
| K14147 | 17FD | 241-056 | #241-068 | | |
| K14150 | 180A | 240-031 | #242-003 | | |
| K14151 | 1831 | 242-021 | #242-025 | | |
| K14152 | 183E | 242-017 | 242-019 | #242-032 | |
| K14153 | 1848 | 242-030 | #242-038 | | |
| K14154 | 1856 | 242-023 | 242-028 | 242-035 | #243-004 |
| K14155 | 1860 | 243-006 | #243-010 | | |
| K14156 | 1866 | #243-013 | 243-016 | | |
| K14157 | 186E | 243-014 | #243-018 | | |
| K14158 | 1887 | 242-005 | #244-039 | | |
| K14159 | 189A | 244-048 | #244-050 | | |
| K14160 | 18BD | 244-060 | 244-063 | #245-074 | |
| K14164 | 18E1 | 245-091 | 245-097 | #245-104 | |
| K14165 | 18E7 | 245-103 | #245-108 | 245-114 | |
| K14170 | 18F1 | 245-076 | 245-106 | #246-003 | |
| K14172 | 18FF | #246-011 | 246-013 | | |
| K14174 | 191F | 246-029 | #246-033 | | |
| K14175 | 194C | 246-025 | #248-003 | | |
| K14180 | 199E | 248-013 | 248-018 | #250-056 | |
| K14190 | 19C4 | 247-060 | #250-081 | | |
| K14200 | 19E1 | 235-011 | #251-005 | | |
| K14201 | 19FD | 251-018 | #251-021 | | |
| K14205 | 1A13 | #251-034 | 251-037 | | |
| K14210 | 1A1B | 251-035 | #251-039 | | |
| K14225 | 1AAF * | #253-048 | | | |
| K14900 | 1ABA | 228-021 | #255-004 | | |
| K14905 | 1AE3 | 255-023 | #255-028 | | |
| K18M1X | 0003 | 268-046 | #268-048 | | |
| K18M2X | 0003 | 268-050 | #268-052 | | |

| | | | | | | | | |
|---|---|---|---|---|---|---|---|---|
| K19NG | 1D5D | | 273-018 | 273-040 | #274-064 | | | |
| K19000 | 1D14 | | 272-005 | #273-003 | | | | |
| K191ME | 0007 | | 277-052 | #277-054 | | | | |
| K191MS | 1DD6 | | 273-022 | #277-051 | 277-054 | | | |
| K19100 | 1D15 | | 272-007 | #273-007 | | | | |
| K192ME | 0008 | | 277-057 | #277-059 | | | | |
| K192MS | 1DDF | | 273-044 | #277-056 | 277-059 | | | |
| K19200 | 1D31 | | 272-009 | #273-028 | | | | |
| K193ME | 0007 | | 277-062 | #277-064 | | | | |
| K193MS | 1DE7 | | 274-057 | #277-061 | 277-064 | | | |
| K19300 | 1D4D | | 272-011 | #274-051 | | | | |
| K194ME | 000A | | 277-067 | #277-069 | | | | |
| K194MS | 1DEF | | 274-065 | #277-066 | 277-069 | | | |
| K20SSR | 1EC7 | | 283-012 | #284-004 | | | | |
| K20SSX | 1EE0 | | 284-006 | 284-010 | #284-020 | | | |
| K20SS1 | 1ED7 | | 284-008 | #284-012 | | | | |
| K20SUB | 1EA0 | | 278-033 | 282-016 | #283-004 | | | |
| K20SX | 1EC6 | | 283-027 | #283-033 | | | | |
| K20S05 | 1EA2 | | #283-006 | 283-031 | | | | |
| K20S10 | 1EA5 | | #283-010 | 283-030 | | | | |
| K20S15 | 1EA6 | | #283-012 | 283-015 | | | | |
| K20S20 | 1EB4 | | #283-022 | 283-024 | | | | |
| LASTKY | FE83 | | #030-042 | 031-003 | 118-006 | 123-026 | 123-032 | 124-058 |
| | | | 269-030 | | | | | |
| LEDTMR | 001E | | #024-027 | 286-047 | 327-018 | | | |
| LENCAS | 002F | * | #360-023 | | | | | |
| LENDEC | 0006 | | #042-045 | 222-052 | 248-027 | | | |
| LENDEL | 0006 | | #042-039 | 211-079 | 212-026 | 313-022 | | |
| LENGO | 0004 | | #042-042 | 273-028 | | | | |
| LENINC | 0008 | | #042-044 | 246-046 | | | | |
| LENINI | 0004 | | #042-043 | 274-051 | 380-015 | | | |
| LENINS | 0008 | | #042-038 | 226-022 | 315-018 | | | |
| LENLED | 0005 | | #042-040 | 286-044 | | | | |
| LENNAK | 0005 | * | #042-046 | | | | | |
| LENPWR | 0006 | | #042-037 | 278-018 | | | | |
| LENRED | 0006 | | #042-034 | 119-008 | 156-021 | 161-038 | 163-026 | 213-025 |
| | | | 266-001 | 267-018 | 275-023 | 365-027 | | |
| LENSCH | 000A | | #042-036 | 119-044 | 185-084 | | | |
| LENSTP | 0004 | | #042-041 | 273-007 | 380-010 | | | |
| LENWRT | 000A | | #042-035 | 132-060 | 133-047 | 155-067 | 156-045 | 209-070 |
| | | | 244-039 | 250-071 | 255-038 | 312-061 | 381-070 | |
| LOAD | 29C9 | | 272-013 | #380-001 | | | | |
| LOADER | 2A4B | * | #382-134 | | | | | |
| LOADR2 | 2A4E | | 382-119 | #382-136 | | | | |
| LOAD05 | 29E6 | | #380-026 | 382-108 | | | | |
| LOAD10 | 29EA | | #380-032 | 382-101 | | | | |
| LOAD20 | 29FC | * | #380-045 | | | | | |
| LOAD25 | 2A07 | | 380-047 | #381-065 | | | | |
| LOAD30 | 2A42 | | 380-037 | 382-114 | #382-122 | | | |
| LOGFLD | 0000 | * | #031-027 | | | | | |
| LOGRAM | 29A9 | | 377-088 | #378-099 | | | | |
| L1C01L | F85B | | #016-005 | 017-004 | | | | |
| L1C01U | F80B | | #016-004 | 016-005 | 278-022 | | | |
| L2C01L | F8FB | * | #017-005 | | | | | |
| L2C01U | F8AB | | #017-004 | 017-005 | 269-048 | | | |
| MAJREV | 0041 | | #001-012 | 353-025 | | | | |
| MATROL | 004D | | #029-018 | 293-025 | | | | |
| MATROW | FE2F | | #029-006 | 029-008 | 029-018 | 293-024 | 323-032 | |
| MATROX | FE7C | | #029-016 | 029-018 | 030-005 | | | |
| MATRW1 | FE2F | | #029-008 | 029-009 | | | | |
| MATRW2 | FE3A | | #029-009 | 029-010 | | | | |
| MATRW3 | FE45 | | #029-010 | 029-011 | | | | |
| MATRW4 | FE50 | | #029-011 | 029-012 | | | | |
| MATRW5 | FE5B | | #029-012 | 029-013 | | | | |
| MATRW6 | FE66 | | #029-013 | 029-014 | | | | |
| MATRW7 | FE71 | | #029-014 | 029-016 | | | | |
| MAXBUF | 0010 | | #360-011 | 364-021 | | | | |
| MAXCOL | 000B | | #030-022 | 090-012 | 135-036 | 138-010 | 139-043 | 139-053 |
| | | | 178-025 | 180-082 | 202-014 | 210-011 | 224-089 | 230-064 |
| | | | 231-090 | 234-054 | 241-049 | 264-021 | 267-034 | 278-037 |
| | | | 282-026 | 314-027 | 318-031 | 323-032 | 323-033 | |
| MAXROW | 0007 | | #030-024 | 165-021 | 181-103 | 200-085 | 201-014 | 231-083 |
| | | | 235-005 | 283-004 | 283-004 | 286-032 | 322-014 | |
| MAXTRY | 0004 | | #026-012 | 345-022 | 348-040 | | | |
| MEMSIZ | FE86 | | #031-006 | 031-007 | 119-033 | | | |
| MEMUSE | FE88 | | #031-007 | 031-009 | 120-062 | 324-015 | 324-019 | |

| | | | | | | | |
|---|---|---|---|---|---|---|---|
| MOVBC | 00D7 | #048-010 | 068-001 | 121-006 | 121-008 | 121-010 | 155-053 |
| | | 155-056 | 156-042 | 226-018 | 226-020 | 246-042 | 248-036 |
| | | 312-054 | 312-059 | 365-037 | 371-029 | 371-033 | 371-037 |
| | | 372-053 | 397-074 | 411-052 | | | |
| MOVDE | 00EF | #051-008 | 119-006 | 119-034 | 119-038 | 119-040 | 119-042 |
| | | 120-063 | 131-042 | 132-055 | 132-058 | 133-034 | 133-041 |
| | | 153-045 | 155-022 | 156-043 | 161-036 | 163-009 | 163-011 |
| | | 163-023 | 179-047 | 180-067 | 180-073 | 182-019 | 182-022 |
| | | 182-025 | 185-100 | 192-024 | 194-052 | 203-022 | 206-010 |
| | | 207-055 | 208-063 | 208-066 | 210-033 | 212-022 | 213-024 |
| | | 227-044 | 227-046 | 240-018 | 240-021 | 240-024 | 246-043 |
| | | 247-055 | 248-025 | 250-057 | 250-060 | 250-069 | 255-018 |
| | | 255-033 | 255-036 | 265-051 | 267-016 | 275-021 | 278-016 |
| | | 303-022 | 305-019 | 306-010 | 306-020 | 306-037 | 307-023 |
| | | 308-011 | 308-030 | 310-013 | 311-006 | 312-053 | 313-014 |
| | | 324-020 | 335-053 | 336-084 | 336-091 | 338-051 | 338-079 |
| | | 338-080 | 338-081 | 340-023 | 340-030 | 341-022 | 344-007 |
| | | 371-009 | 371-043 | 376-044 | 396-027 | 397-049 | 408-028 |
| | | 408-038 | 408-039 | 408-040 | 408-045 | 409-051 | |
| MOVSTR | 0103 | #064-030 | 091-010 | 091-016 | 091-022 | 091-030 | 113-022 |
| | | 174-044 | 196-017 | 196-023 | 266-036 | 270-054 | 291-018 |
| | | 344-039 | | | | | |
| MOVS10 | 0106 | #064-034 | 064-039 | 134-070 | 143-045 | 158-046 | 172-022 |
| | | 234-080 | 234-085 | 238-011 | 238-020 | 238-044 | 239-050 |
| | | 244-069 | 245-105 | 252-058 | 252-068 | 253-044 | 319-056 |
| | | 320-010 | | | | | |
| MPXFLG | 0002 | #031-047 | 174-037 | 259-041 | | | |
| MSGADI | 274A | 349-016 | #354-045 | 354-047 | 378-126 | 382-135 | |
| MSGADR | 273D | 349-014 | #354-041 | 354-043 | | | |
| MSGADX | 000C | 354-041 | #354-043 | | | | |
| MSGADY | 000C | 354-045 | #354-047 | | | | |
| MSGBCX | 000A | 414-004 | #414-006 | | | | |
| MSGBDC | 2D27 | 375-024 | #414-003 | 414-006 | | | |
| MSGBDL | 2805 | 349-030 | #356-109 | 356-111 | | | |
| MSGBDR | 2D3F | 382-118 | 397-082 | #414-013 | 414-016 | | |
| MSGBDX | 000A | 356-109 | #356-111 | | | | |
| MSGBRX | 000A | 414-014 | #414-016 | | | | |
| MSGBSX | 0009 | 354-065 | #354-067 | | | | |
| MSGBSY | 2788 | 344-037 | 344-044 | #354-065 | 354-067 | | |
| MSGCHK | 2707 | 346-042 | 349-010 | #353-019 | 353-021 | 393-144 | |
| MSGCHX | 000C | 353-019 | #353-021 | | | | |
| MSGCMD | 27B3 | 349-018 | #355-081 | 355-083 | | | |
| MSGCMX | 000B | 355-081 | #355-083 | | | | |
| MSGCNM | 2D92 | 386-033 | #416-054 | 416-057 | | | |
| MSGCNX | 000C | 416-055 | #416-057 | | | | |
| MSGCON | 27BF | 349-032 | #355-085 | 355-087 | | | |
| MSGCOX | 000B | 355-085 | #355-087 | | | | |
| MSGDOK | 2D64 | 363-030 | #414-033 | 414-036 | | | |
| MSGDOX | 0009 | 414-034 | #414-036 | | | | |
| MSGDPG | 2D5C | 362-005 | #414-028 | 414-031 | | | |
| MSGDPX | 0007 | 414-029 | #414-031 | | | | |
| MSGEOL | 27D7 | 162-052 | #355-093 | 355-095 | | | |
| MSGEOX | 000C | 355-093 | #355-095 | | | | |
| MSGFUL | 277C | 349-038 | #354-061 | 354-063 | | | |
| MSGFUX | 000B | 354-061 | #354-063 | | | | |
| MSGHI | 2714 | 118-011 | #353-023 | 353-027 | | | |
| MSGHIX | 0003 | 353-023 | #353-027 | | | | |
| MSGLDD | 2D52 | 382-127 | #414-023 | 414-026 | | | |
| MSGLDG | 2D4A | 380-004 | #414-018 | 414-021 | | | |
| MSGLDX | 0007 | 414-019 | #414-021 | | | | |
| MSGLDZ | 0009 | 414-024 | #414-026 | | | | |
| MSGLEN | FDB0 | #026-005 | 026-006 | 108-058 | 108-065 | 108-069 | |
| MSGLNM | 2D85 | 386-030 | #416-049 | 416-052 | | | |
| MSGLNX | 000C | 416-050 | #416-052 | | | | |
| MSGMEM | 271D | 349-026 | #353-029 | 353-031 | | | |
| MSGMEX | [illegible] | 353-029 | #353-031 | | | | |
| MSGMSK | [illegible] | [illegible]-020 | #354-049 | [illegible] | | | |
| MSGMSX | [illegible] | [illegible] | #354-051 | | | | |
| MSGNET | 27E4 | 196-005 | 210-003 | [illegible] | #355-[illegible] | 355-099 | |
| MSGNEX | 000A | 355-097 | #355-099 | | | | |
| MSGNOD | 2764 | 349-024 | #354-053 | 354-055 | | | |
| MSGNOX | 000C | 354-053 | #354-055 | | | | |
| MSGNO2 | 2D32 | 387-041 | 389-006 | 401-025 | #414-008 | 414-011 | |
| MSGNPD | 279D | 349-034 | #355-073 | 355-075 | | | |
| MSGNPX | 000B | 355-073 | #355-075 | | | | |

| | | | | | | | |
|---|---|---|---|---|---|---|---|
| MSGNX2 | 000C | 414-009 | #414-011 | | | | |
| MSGOVR | 26FB | 346-034 | 349-008 | #353-015 | 353-017 | | |
| MSGOVX | 000B | 353-015 | #353-017 | 389-034 | | | |
| MSGPAR | 26EE | 346-038 | 349-006 | #353-011 | 353-013 | | |
| MSGPAX | 000D | 353-011 | #353-013 | 389-024 | | | |
| MSGRES | 27F8 | 348-043 | #356-105 | 356-107 | | | |
| MSGREX | 000C | 356-105 | #356-107 | | | | |
| MSGRNM | 2D78 | 386-040 | #416-044 | 416-047 | | | |
| MSGRNX | 000C | 416-045 | #416-047 | | | | |
| MSGRSP | 27A9 | 346-046 | #355-077 | 355-079 | | | |
| MSGRSX | 0009 | 355-077 | #355-079 | | | | |
| MSGSCH | 27EF | 195-065 | #355-101 | 355-103 | | | |
| MSGSCX | 0008 | 355-101 | #355-103 | | | | |
| MSGSEQ | 2792 | 349-022 | #354-069 | 355-071 | | | |
| MSGSEX | 000A | 354-069 | #355-071 | | | | |
| MSGSOL | 27CB | 161-024 | #355-089 | 355-091 | | | |
| MSGSOX | 000B | 355-089 | #355-091 | | | | |
| MSGSTP | 2729 | 349-028 | #353-033 | 353-035 | | | |
| MSGSTX | 000B | 353-033 | #353-035 | | | | |
| MSGSUP | 2771 | 269-045 | 349-036 | #354-057 | 354-059 | | |
| MSGSUX | 000A | 354-057 | #354-059 | | | | |
| MSGTIM | 2735 | 349-012 | #353-037 | 354-039 | | | |
| MSGTIX | 0007 | 353-037 | #354-039 | | | | |
| MSGVFG | 2D4E | 384-005 | #416-039 | 416-042 | | | |
| MSGVFX | 0009 | 416-040 | #416-042 | | | | |
| MSGVKX | 0009 | 416-060 | #416-062 | | | | |
| MSGVOK | 2D9F | 385-081 | #416-059 | 416-062 | | | |
| MULDIS | 0003 | #258-015 | 258-017 | | | | |
| MULKEY | 0000 | #258-013 | 258-014 | | | | |
| MULLN1 | 1B08 | 238-009 | 252-056 | #258-005 | 320-008 | | |
| MULLN2 | 1B0D | 238-048 | 253-042 | #258-009 | | | |
| MULNOD | 0001 | #258-014 | 258-015 | | | | |
| MULRCL | 0007 | 172-009 | 238-027 | #258-017 | | | |
| MULTAB | 1B12 | 172-008 | 238-028 | #258-019 | | | |
| NEWKEY | FE82 | #030-040 | 030-042 | 118-007 | 123-018 | 123-023 | 123-031 |
| | | 269-031 | | | | | |
| NOCALC | 0016 | #008-026 | 147-112 | 147-119 | 147-126 | 148-133 | 190-017 |
| | | 199-069 | 251-043 | | | | |
| NOCCON | 0014 | #008-024 | 174-019 | 190-022 | 199-067 | 242-018 | |
| NOCOIL | 0007 | #008-011 | 133-006 | 133-012 | 146-050 | 342-017 | |
| NOCON | 0013 | #008-023 | 148-139 | 172-039 | 188-013 | 198-025 | 199-060 |
| | | 200-090 | 235-016 | 236-045 | 236-048 | 237-057 | 237-060 |
| | | 258-031 | | | | | |
| NOCPRE | 000D | #008-017 | 148-144 | 198-019 | 235-027 | 242-016 | 251-017 |
| | | 321-008 | | | | | |
| NOCREG | 0015 | #008-025 | 190-029 | 242-022 | 251-027 | | |
| NOCREL | 0004 | #008-008 | 145-032 | | | | |
| NOCTR | 000F | #008-019 | 147-086 | 198-022 | 199-058 | 258-019 | |
| NODBLK | 0040 | #145-020 | 146-063 | 146-069 | 296-043 | | |
| NODCOL | 0009 | #008-013 | 133-006 | 133-012 | 146-074 | | |
| NODCON | 0007 | 134-055 | 134-063 | #145-007 | 145-008 | 232-037 | 243-010 |
| | | 318-010 | 318-018 | | | | |
| NODCST | 0020 | #145-019 | 148-145 | 235-021 | 251-011 | 296-008 | |
| NODDIS | 0001 | 134-063 | #145-005 | 145-006 | 318-018 | | |
| NODHRG | 0010 | #145-018 | 147-087 | 147-093 | 147-099 | 147-106 | 147-113 |
| | | 147-120 | 147-127 | 148-134 | 148-140 | 148-150 | 158-038 |
| | | 235-021 | 237-052 | 251-011 | 296-036 | | |
| NODINP | 0002 | #145-015 | 145-027 | 145-033 | 145-039 | 146-045 | 148-140 |
| | | 158-038 | 296-015 | | | | |
| NODIRG | 0008 | #145-017 | 148-150 | 158-038 | 235-021 | 251-011 | 296-029 |
| NODKEY | 0000 | #145-004 | 145-005 | | | | |
| NODLAT | 000A | #008-014 | 133-009 | 133-015 | 146-080 | 188-020 | 342-020 |
| NODMSK | 007C | #031-039 | 133-044 | 163-031 | 167-004 | 169-005 | 170-020 |
| | | 172-005 | 172-038 | 174-018 | 179-026 | 180-096 | 183-040 |
| | | 185-115 | 188-007 | 190-011 | 241-074 | 314-008 | 314-017 |
| NODOUT | 0001 | #145-014 | 145-027 | 145-033 | 145-039 | 146-045 | 146-051 |
| | | 146-057 | 146-075 | 146-081 | 148-140 | 158-038 | 296-005 |
| NODRCL | 0009 | 134-056 | 143-014 | #145-010 | 148-153 | 232-038 | 243-011 |
| | | 318-011 | | | | | |
| NODSEQ | 0004 | #145-016 | 145-027 | 145-033 | 145-039 | 146-045 | 296-022 |
| NODTAB | 09F6 | 134-055 | 143-013 | #145-023 | 148-153 | 232-037 | 243-010 |
| | | 318-010 | | | | | |
| NODTBL | 0015 | 143-015 | #148-153 | | | | |
| NODTYP | 0006 | #145-006 | 145-007 | | | | |
| NODVAL | 0008 | #145-008 | 145-010 | | | | |

| | | | | | | | | |
|---|---|---|---|---|---|---|---|---|
| NOEOC | 0002 | | #008-006 | 165-007 | 181-097 | 246-033 | 306-019 | 306-036 |
| | | | 308-020 | 308-046 | 314-020 | | | |
| NOEOL | 0001 | | #008-005 | 119-039 | 162-049 | 185-116 | 213-035 | |
| NOHOZO | 000B | | #008-015 | 146-062 | | | | |
| NOHOZS | 000C | | #008-016 | 146-068 | | | | |
| NOLATC | 0008 | | #008-012 | 133-009 | 133-015 | 146-056 | | |
| NONEGT | 0006 | | #008-010 | 145-044 | 233-027 | | | |
| NONULL | 0017 | * | #008-027 | | | | | |
| NOOREL | 0003 | | #008-007 | 145-026 | 186-018 | | | |
| NOPOST | 0005 | | #008-009 | 145-038 | 233-025 | | | |
| NORPRE | 000E | | #008-018 | 148-149 | 190-027 | 235-029 | 242-020 | 251-019 |
| NOSON | 0000 | | #008-004 | 161-045 | 226-019 | | | |
| NOT001 | 0012 | | #008-022 | 147-105 | 258-028 | | | |
| NOT010 | 0011 | | #008-021 | 147-098 | 258-025 | | | |
| NOT100 | 0010 | | #008-020 | 147-092 | 258-022 | | | |
| NSWP | 000F | | #047-015 | 112-010 | 201-021 | 236-024 | 316-007 | 323-028 |
| | | | 404-021 | 406-099 | 407-125 | | | |
| NUM1K | 000E | | #009-007 | 061-013 | 061-017 | | | |
| NXTADR | 2879 | | 363-011 | #366-023 | 381-091 | 385-060 | | |
| NXTREG | 2882 | | 366-027 | #366-038 | | | | |
| NXTSEG | 2A31 | | 382-100 | #382-105 | | | | |
| OUTFLG | 0001 | | #031-035 | 167-018 | | | | |
| OUTHIS | 0020 | * | #032-057 | | | | | |
| OUTSTA | 0002 | | #032-052 | 156-030 | 156-031 | 266-011 | | |
| PADCNT | 0001 | | #012-030 | 089-019 | | | | |
| PARIN | 003E | | #002-027 | 123-009 | | | | |
| PAROUT | 003E | | #002-028 | 054-011 | 065-032 | 086-043 | 099-006 | 123-008 |
| PDIA | 3300 | | #010-023 | 057-014 | | | | |
| PIO | 2581 | | 119-009 | 119-045 | 132-061 | 133-048 | 155-068 | 156-022 |
| | | | 156-046 | 161-039 | 165-027 | 185-085 | 209-071 | 211-080 |
| | | | 212-027 | 213-026 | 222-053 | 226-023 | 244-040 | 246-047 |
| | | | 248-028 | 250-072 | 255-039 | 266-002 | 267-019 | 273-008 |
| | | | 273-029 | 274-052 | 275-024 | 278-019 | 286-045 | 312-062 |
| | | | 313-024 | 315-020 | #344-001 | 380-012 | 380-017 | 412-096 |
| PIOERR | 262F | | 346-037 | 346-041 | 346-045 | #346-048 | 348-044 | |
| PIOTAB | 2693 | | 348-048 | #349-004 | 349-040 | | | |
| PIOTBL | 0011 | | 349-004 | #349-040 | | | | |
| PIOX | 2692 | | 347-031 | #348-054 | | | | |
| PIO010 | 2593 | | #344-013 | 344-016 | | | | |
| PIO020 | 259A | | #344-019 | 344-048 | 345-029 | | | |
| PIO030 | 25A2 | | #344-024 | 344-032 | | | | |
| PIO040 | 25B5 | | #344-037 | 345-007 | | | | |
| PIO050 | 25C1 | | #344-042 | 344-043 | | | | |
| PIO060 | 25D4 | | 344-035 | #345-001 | | | | |
| PIO070 | 25DD | | #345-006 | 345-018 | | | | |
| PIO080 | 25EA | * | #345-012 | | | | | |
| PIO085 | 25F9 | | 345-010 | #345-020 | | | | |
| PIO087 | 2603 | | #345-025 | 348-042 | | | | |
| PIO090 | 260E | | 345-024 | #346-033 | | | | |
| PIO100 | 2641 | | 345-015 | #347-002 | | | | |
| PIO110 | 265F | | #347-017 | 347-023 | | | | |
| PIO120 | 2658 | | 347-029 | #348-046 | | | | |
| PIO130 | 2690 | | 346-054 | #348-051 | | | | |
| PISTAT | 0080 | * | #003-039 | | | | | |
| POBEEP | 0040 | | #003-007 | 065-031 | 099-005 | 123-002 | | |
| POPENB | 0000 | * | #003-026 | | | | | |
| POPEVN | 0001 | * | #003-027 | | | | | |
| POPWR | 0080 | | #003-006 | 054-010 | 065-042 | 123-002 | | |
| POSAVE | FDB4 | | #026-010 | 027-030 | 065-030 | 065-033 | 086-044 | 099-004 |
| | | | 099-007 | 123-001 | | | | |
| PO2STP | 0007 | * | #003-028 | | | | | |
| PPCMD | 0025 | | #007-039 | 103-024 | 107-047 | 110-015 | 345-003 | |
| PPIBFL | 0020 | | #025-028 | 025-035 | 103-002 | 109-101 | | |
| PPIBLK | FD9C | | #025-019 | 025-021 | 103-005 | 108-074 | 109-102 | 347-007 |
| PPIBUF | FFA0 | | #025-035 | 025-036 | 103-001 | 109-100 | | |
| PPICER | 0002 | | #026-023 | 109-093 | 345-027 | 346-044 | | |
| PPICHK | FDB1 | | #026-006 | 026-007 | 107-024 | 108-076 | 108-083 | |
| PPICNT | 0001 | | #026-024 | 106-011 | 107-025 | | | |
| PPIDON | 0020 | | #026-019 | 108-066 | 345-014 | 347-005 | | |
| PPIFCN | 0040 | | #026-018 | 106-008 | 106-016 | | | |
| PPIMSG | 0080 | | #026-017 | 106-005 | 106-007 | | | |
| PPINIT | 0420 | | 058-008 | #103-001 | 344-040 | 346-053 | | |
| PPINT | 0453 | | 083-015 | #105-001 | | | | |
| PPIOVR | 0008 | | #026-021 | 105-025 | 345-027 | 346-056 | | |
| PPIPAR | 0010 | | #026-020 | 105-016 | 345-027 | 346-040 | | |

```
PPIRET   0004   #0??-022   107-097   345-017   345-027
PPISTA   FD0E   #0??-006   026-004   106-012   106-003   106-017   107-026
                 108-060   108-087   109-098   345-012   345-026   345-028
                 346-033   347-004   347-006
PPIX     057A    110-006   110-013  #110-018
PPI010   0465    105-012  #105-019
PPI030   0470    105-021  #106-001
PPI040   0494    106-009  #107-023
PPI045   04CC    106-012  #108-056
PPI050   04D0    106-006  #108-065
PPI060   04DB    107-029   107-051   108-061  #108-073
PPI070   04E0    108-067  #108-083
PPI080   04F9    108-045  #109-093
PPI090   04FF    105-017   105-026  #109-097
PPI100   050E    105-005   106-015   106-018   106-079   108-088  #110-004
PPI110   0524    110-009  #110-015
PPMODE   00FE   #007-036   106-022
PPNULL   0081   #007-041   105-015   387-020
PPOBFL   0020   #025-029   025-036   105-007   107-040
PPOBLK   FDA2   #025-021   025-023   105-008   107-041   110-007   110-010
                 344-020
PPOBUF   FF80   #025-036   025-037   105-006   107-039
PPOCHK   FDB3   #026-008   026-010
PPOSTA   FD0F   #026-004   026-005   105-013   107-043
PU01     2AC7    343-049  #351-001
PU01X    2AE0    351-012  #351-021
PU0110   2AC9   #351-004   351-010
PU0120   2AD8    351-005  #351-014
PU02     2AE1    344-034   344-042   345-006  #352-017
PU02X    2AED    352-021  #352-025
PU0210   2AEC    352-019  #352-023
PWRE10   0049   #057-005   059-006   062-057
PWRE20   006F    058-022  #059-008   059-015
PWRE21   0085   #059-010   059-014
PWRTMR   0002   #024-029   282-029   327-016
PWRUP    003F    046-006  #054-006
PWR010   004C   #054-016   054-021
PWR020   0055 * #056-004
PWR030   005E   #056-009   056-013   056-015
PWR040   006B   #056-018   056-036
PWR050   0071   #056-020   056-029   056-031
P2CKER   2B9D    393-130  #393-143
P2INIT   2ACC    362-012   380-023   384-008  #387-018
P2MODE   0079   #007-037   387-027
P2RDCH   2AED   #389-001   391-035   391-044   391-047   392-080   392-088
                 392-091   392-096   393-098
P2RD0F   2B1F    388-011   389-025   389-035  #389-047
P2RD02   2B0D    389-020  #389-027
P2RD03   2B19    389-030  #389-037
P2RD05   2AF3   #389-007   389-014
P2RIAA   2B57    392-060  #392-067
P2RIO    2B29    380-036   382-113   384-029   385-074  #391-022
P2RIOA   2B59    392-063  #392-073
P2RIO2   2B33   #391-034   391-037
P2RIO3   2B5F   #392-079   392-084
P2TCH    2C35    399-031   399-040  #401-017
P2TCH2   2C39   #401-024   401-033
P2TER    2C51    401-029  #402-046
P2TIO    2BFF    363-005  #399-001   409-053
P2TIO5   2C21   #399-038   399-043
P2TIO7   2C19   #399-029   399-035
RAMHI    FFFF   #009-010   009-013   025-034
RAMLO    F800   #009-009   009-013   010-011   056-004   056-018
RAMSIZ   0800   #009-013   056-005   056-019
RCOUNT   FDB2   #026-007   026-008   344-002   345-020   348-038
RDSYS    1D64    273-014   273-035  #275-014
RDSYSX   1D7F    275-025  #275-030
REFLEN   0004   #014-019   158-044   158-048   159-050   197-026   302-013
REGFLD   0040   #031-029   255-015   267-006
REGMSK   00F0   #034-051   167-048   299-023
REGRAM   2BB1    368-044  #369-052
ROMCHK   00BF    055-008  #061-012
ROMHI    37FF   #009-006   009-007   009-012   061-013
ROMLO    0000   #009-005   009-007   009-012   061-016
```

| | | | | | | | |
|---|---|---|---|---|---|---|---|
| ROMSIZ | 3800 * | #009-012 | | | | | |
| ROMTES | 00C7 | #061-021 | 062-066 | | | | |
| ROMTS1 | 00CC | #061-026 | 061-038 | | | | |
| ROMTS2 | 00E1 | 061-044 | #062-054 | | | | |
| ROWA | 0047 | #012-006 | 012-015 | 012-015 | 012-019 | 012-021 | 012-021 |
| | | 012-023 | 014-004 | 014-004 | 014-017 | 014-017 | 015-006 |
| ROWB | 0050 | #012-007 | 012-015 | 014-017 | 016-005 | 017-004 | 017-005 |
| | | 112-009 | 112-009 | 112-015 | 165-018 | 167-010 | 174-012 |
| | | 174-026 | 174-026 | 174-041 | 174-041 | 217-045 | 218-063 |
| | | 224-070 | 225-096 | 234-081 | 234-086 | 238-014 | 238-046 |
| | | 248-044 | 250-087 | 252-062 | 253-015 | 253-040 | 270-057 |
| | | 283-017 | 320-014 | 322-011 | 326-019 | 326-027 | |
| ROWBEG | 0317 | 090-013 | #090-020 | | | | |
| ROWBMI | 0009 | #027-015 | 027-033 | 027-034 | 027-035 | 027-036 | 027-037 |
| | | 027-038 | 027-039 | 027-041 | 285-010 | 285-011 | 285-017 |
| ROWBLK | 0374 | 089-015 | #091-004 | | | | |
| ROWC | 0045 | #012-008 | 012-015 | 091-004 | | | |
| ROWCNT | 000E | #012-029 | 089-007 | 293-033 | | | |
| ROWCUR | 0005 | #027-013 | 027-014 | | | | |
| ROWD | 004D | #012-009 | 012-015 | 015-006 | 015-016 | 112-026 | 131-046 |
| | | 132-065 | 149-016 | 158-048 | 172-025 | 197-030 | 197-033 |
| | | 229-034 | 231-096 | 238-021 | 246-027 | 248-011 | 250-089 |
| | | 266-017 | 266-030 | 267-023 | 305-009 | 307-010 | 310-007 |
| ROWE | 004E | #012-010 | 012-015 | 015-006 | | | |
| ROWFBK | 0010 * | #027-022 | | | | | |
| ROWFEN | 0040 * | #027-020 | | | | | |
| ROWFLG | 0000 | #027-010 | 027-011 | | | | |
| ROWFMA | 0001 | #027-011 | 027-012 | | | | |
| ROWFMN | 0020 * | #027-021 | | | | | |
| ROWFSN | 0080 | #027-019 | 285-021 | | | | |
| ROWLMA | 0003 | #027-012 | 027-013 | | | | |
| ROWLOG | 0305 | 089-009 | #090-012 | 293-035 | | | |
| ROWL10 | 030A | #090-015 | 090-017 | | | | |
| ROWMSK | 00F0 | #030-030 | 112-005 | 131-018 | 135-028 | 135-039 | 136-054 |
| | | 136-063 | 136-074 | 137-091 | 137-098 | 137-110 | 139-059 |
| | | 154-025 | 158-024 | 181-102 | 197-018 | 200-084 | 228-019 |
| | | 231-082 | 232-024 | 305-005 | 316-006 | 323-027 | |
| ROWNOD | 0317 | 090-015 | #090-023 | | | | |
| ROWN10 | 0319 | 090-021 | #090-025 | 091-005 | 091-012 | 091-024 | 091-026 |
| | | 091-028 | 113-019 | 263-031 | 291-015 | 344-047 | |
| ROWN20 | 031B | #090-027 | 090-030 | 159-051 | 217-018 | 218-062 | 225-095 |
| | | 225-099 | | | | | |
| ROWPAD | 02FE | 089-005 | 089-006 | 089-013 | 089-014 | 089-020 | #090-004 |
| ROWSEQ | 0006 | #027-014 | 027-015 | | | | |
| ROWST1 | 0329 | 089-016 | #091-009 | 269-042 | | | |
| ROWST2 | 0340 | 089-017 | #091-021 | 269-043 | | | |
| ROWST3 | 035B | 091-017 | #091-032 | | | | |
| ROWST4 | 035D | #091-034 | 091-043 | | | | |
| ROWST5 | 0362 | #091-038 | 091-041 | | | | |
| ROWTAB | FDB5 | #027-030 | 027-032 | 027-041 | 285-011 | 293-007 | |
| ROWTBL | 0038 | #027-041 | 293-008 | | | | |
| ROWTBX | FDED | #027-039 | 028-021 | | | | |
| ROWTB1 | FDB5 | #027-032 | 027-033 | | | | |
| ROWTB2 | FDBD | #027-033 | 027-034 | | | | |
| ROWTB3 | FDC5 | #027-034 | 027-035 | | | | |
| ROWTB4 | FDCD | #027-035 | 027-036 | | | | |
| ROWTB5 | FDD5 | #027-036 | 027-037 | | | | |
| ROWTB6 | FDDD | #027-037 | 027-038 | | | | |
| ROWTB7 | FDE5 | #027-038 | 027-039 | 027-041 | | | |
| RSPBFL | 0018 | #035-011 | 036-015 | | | | |
| RSPBUF | FEA8 | #035-009 | 036-015 | 119-012 | 120-051 | 156-037 | 161-044 |
| | | 163-030 | 165-009 | 165-020 | 167-003 | 167-014 | 167-030 |
| | | 167-046 | 169-004 | 170-017 | 171-031 | 172-004 | 172-031 |
| | | 174-017 | 174-028 | 175-004 | 175-011 | 179-025 | 180-075 |
| | | 180-095 | 185-091 | 185-104 | 185-114 | 188-006 | 190-010 |
| | | 195-080 | 213-034 | 266-019 | 266-028 | 267-027 | 275-028 |
| | | 278-023 | 347-009 | 347-026 | 371-025 | 384-037 | |
| SCONF1 | FE84 | #031-003 | 031-004 | 119-013 | 374-050 | | |
| SCONF2 | FE85 | #031-004 | 031-006 | 233-018 | 236-007 | 236-022 | 251-006 |
| | | 297-030 | 299-004 | 300-003 | 301-018 | 375-005 | |
| SEQBAS | 0033 * | #034-050 | | | | | |
| SEQFLG | 0003 | #031-037 | 167-016 | 167-022 | 167-035 | 171-037 | 172-043 |
| | | 184-075 | 243-033 | 299-032 | | | |
| SINFLG | 0000 | #032-068 | 175-020 | 236-045 | | | |
| SPCBRK | 0008 * | #007-021 | | | | | |

| | | | | | | | |
|---|---|---|---|---|---|---|---|
| SPCDTR | 0002 | #007-023 | 345-003 | 391-031 | | | |
| SPCEH | 0080 | #007-017 | 007-042 | | | | |
| SPCER | 0010 | #007-020 | 362-014 | 387-023 | 387-029 | 390-049 | 391-031 |
| | | 393-103 | 399-018 | 400-055 | 402-050 | | |
| SPCIR | 0040 | #007-018 | 103-020 | 387-023 | | | |
| SPCRE | 0004 | #007-022 | 007-039 | 362-014 | 391-031 | 399-018 | |
| SPCRTS | 0020 | #007-019 | 007-039 | 362-014 | 399-018 | | |
| SPCTE | 0001 | #007-024 | 007-039 | 007-042 | 362-014 | 399-018 | |
| SPDFLD | 0060 | #031-030 | 267-013 | | | | |
| SPLBFL | 0040 | #025-027 | 025-034 | 077-008 | 079-006 | | |
| SPLBLK | FD96 | #025-017 | 025-019 | 063-007 | 077-009 | 079-004 | 079-017 |
| | | 081-001 | | | | | |
| SPLBUF | FFC0 | #025-034 | 025-035 | 077-007 | | | |
| SPLDIS | 041D | 099-042 | #100-016 | 100-018 | | | |
| SPLDIX | 0002 | 100-016 | #100-018 | | | | |
| SPLINI | 0200 | 058-005 | #077-007 | 269-022 | | | |
| SPLIX | 022E | 079-009 | #079-024 | | | | |
| SPLI10 | 021D | 079-007 | #079-011 | | | | |
| SPLI15 | 021E | #079-013 | 079-022 | | | | |
| SPLLED | 0417 | 099-016 | #100-004 | 100-006 | | | |
| SPLLEX | 0002 | 100-004 | #100-006 | | | | |
| SPLPWR | 041A | 099-021 | #100-010 | 100-012 | | | |
| SPLPWX | 0002 | 100-010 | #100-012 | | | | |
| SPLRX | 0244 | 081-003 | #081-014 | | | | |
| SPLR10 | 0243 | 081-006 | #081-012 | | | | |
| SPMBRF | 0002 | #007-032 | 007-036 | | | | |
| SPMEVN | 0020 | #007-029 | 007-036 | | | | |
| SPMLEN | 000C | #007-031 | 007-036 | | | | |
| SPMPAR | 0010 | #007-030 | 007-036 | | | | |
| SPMSTP | 00C0 | #007-028 | 007-036 | | | | |
| SPOOLI | 020D | #079-001 | 099-028 | | | | |
| SPOOLR | 022F | 063-009 | #081-001 | | | | |
| SPSDSR | 0080 | #007-006 | 057-013 | 352-018 | 387-036 | 389-010 | 401-028 |
| SPSFE | 0020 | #007-008 | 105-010 | 389-019 | | | |
| SPSOE | 0010 | #007-009 | 105-020 | 389-029 | | | |
| SPSPE | 0008 | #007-010 | 105-010 | 389-019 | | | |
| SPSRRY | 0002 | #007-012 | 083-012 | 105-004 | 389-013 | | |
| SPSSYN | 0040 * | #007-007 | | | | | |
| SPSTE | 0004 * | #007-011 | | | | | |
| SPSTRY | 0001 | #007-013 | 083-012 | 110-005 | 401-032 | | |
| SP1CTL | 003A | #002-020 | 103-016 | 103-018 | 103-021 | 103-023 | 103-025 |
| | | 107-048 | 110-016 | 345-004 | | | |
| SP1IN | 003B | #002-021 | 106-001 | 109-099 | | | |
| SP1OUT | 003B | #002-022 | 110-012 | | | | |
| SP1STA | 003A | #002-019 | 083-009 | 352-017 | | | |
| SP2CTL | 003C | #002-024 | 057-012 | 362-013 | 362-022 | 387-021 | 387-023 |
| | | 387-026 | 387-028 | 387-030 | 387-035 | 390-050 | 391-032 |
| | | 393-104 | 399-019 | 400-056 | 402-051 | | |
| SP2IN | 003D | #002-025 | 389-038 | | | | |
| SP2OUT | 003D | #002-026 | 401-038 | | | | |
| SP2STA | 003C | #002-023 | 389-008 | 401-026 | | | |
| SRCHST | FF0B | #037-051 | 182-030 | 185-095 | 185-099 | 194-039 | |
| SRGFLG | 0001 | #032-069 | 237-057 | | | | |
| STACK | FD8F | #023-007 | 024-005 | 054-006 | 063-005 | | |
| STACKL | 0040 | #023-005 | 023-007 | | | | |
| STEPCL | 2542 | 335-061 | 338-067 | #339-017 | | | |
| STPMSK | 001F | #034-052 | 168-057 | | | | |
| STPNUM | FE8A | #031-009 | 031-011 | 121-005 | 175-013 | 194-051 | 214-059 |
| | | 278-012 | 303-017 | 303-021 | | | |
| SUBFLG | 0001 | #031-046 | 174-034 | 259-038 | | | |
| SUPOPT | 0007 | 270-050 | 271-005 | #277-046 | | | |
| SYSENH | 0002 | #033-022 | 233-019 | 236-008 | 251-007 | 299-005 | 300-004 |
| SYSEOL | 000C * | #033-046 | | | | | |
| SYSRUN | 0080 | #033-027 | 273-038 | | | | |
| SYSSTP | 0010 | #033-030 | 273-017 | | | | |
| SYS064 | 0010 | #033-019 | 236-023 | 375-008 | | | |
| SYS128 | 0020 | #033-018 | 236-023 | 375-012 | | | |
| SYS192 | 0040 | #033-017 | 236-023 | 375-016 | | | |
| SYS256 | 0080 | #033-016 | 236-023 | 375-020 | | | |
| SY0256 | 0008 | #033-009 | 374-054 | | | | |
| SY0512 | 0010 | #033-008 | 374-057 | | | | |
| SY1024 | 0020 | #033-007 | 374-060 | | | | |
| SY2048 | 0040 | #033-006 | 374-063 | | | | |
| SY4096 | 0080 | #033-005 | 374-066 | | | | |

```
TEMP     FEC2 * #036-027
TMRACK   FD90   #024-007  024-008  345-002  345-008  347-003
TMRBEP   FD8F   #024-006  024-007  065-029
TMRCNT   0006   #024-016  095-002  097-029
TMRDIS   FD94   #024-011  024-014  024-016  121-013  267-040  269-024
TMRDSP   03D2    097-016 #098-010
TMRERR   FD93   #024-010  024-011  099-037  113-024  263-028
TMRLED   FD91   #024-008  024-009  269-026  286-048  327-019
TMRPWR   FD92   #024-009  024-010  269-025  282-030  327-017
TMRTAB   FD8F   #024-005  024-006  024-016  095-003  097-001
TMRTBX   FD95   #024-014  025-017
TOPID    2D05    365-039  381-077 #412-087
TOPIDX   2D1F    412-097 #413-113
TOPID2   2D0B   #412-095  412-104
TYPE01   0001   #360-033  396-036
TYPE1    0003   #360-027  362-024  373-030  377-087  380-025  384-011
TYPE2    0002   #360-029  373-032  377-089
TYPE3    0001   #360-031  366-026  368-009  368-043  369-073
UBFCH    0156   #072-001  081-002  081-005  110-011  126-002  347-008
                 347-012  347-018
UBFCHX   0180    072-009 #072-035
UBFCH1   0166    072-006 #072-011
UNFORM   2BA6    380-039  384-032 #396-001
UNFRM2   2BD6   #397-044  397-065
UNFRM5   2BEE    397-052 #397-067
VALERR   29C0    377-094  378-109 #378-125
VALOAD   2999   #377-082  381-057
VALOD5   29B2    378-101 #378-107
VERBUF   FEF3   #036-041  384-031
VERCHK   2AB0    384-030  385-050 #386-027
VERCK5   2AC3    385-075 #386-039
VERCXT   2AC6    386-032  386-035 #386-042
VERIFY   2A54    272-017 #384-001
VEROK    2AA7 * #385-080
VER03    2A60   #384-014  385-069
VER05    2A63   #384-017  385-061
VER10    2A86   #385-047  385-054
VER30    2A9B    384-021 #385-065

000 ERRORS
```

It is also to be understood that the following claims are intended to cover all of the generic and specific features of the invention herein described, and all statements of the scope of the invention which, as a matter of language, might be said to fall therebetween.

Having described the invention, what is claimed is:

1. An improved programmable controller of the type having a mainframe including a central processing unit, associated electronics and memory for solving a user control program, an input/output system for communicating input data from external devices to the mainframe and for transferring output data from the mainframe to the external devices for control thereof in response to the control program, and a programming panel for programming, monitoring and displaying the user selected control program, wherein the improvement comprises:

(A) an improved programming panel having first means for allowing the user to generate a control program in a network format, each network comprising up to I rows and J columns, where I and J are positive integers each greater than one, each network comprising up to I×J nodes where the location of each node is $N_{ij}$, were $i=1, 2 \ldots I$, $j=1, 2, \ldots J$, and where each of at least some of these nodes are designatable by the user as representing an electrical circuit element that can reference other nodes, and having a power output status that is a function of the input power status to the node in combination with the conductivity status of the element, and having second means for allowing the user to generate vertical interconnections between the output of node $N_{i,j}$ with the output of node $N_{i-1,j}$ or with output of node $N_{i+1,j}$, for all existent nodes $N_{i-1,j}$ and $N_{i+1,j}$, where "or" is used in the inclusive sense, and wherein the power input status from node $N_{i,j}$ to node $N_{i,j+1}$ is represented by the following Boolean equation:

$$P_{IN_{i,j}} = P_{OUT_{i,j}} + P_{VU_{i,j}} + P_{VD_{i,j}} \quad (1)$$

where $$P_{OUT_{i,j}} = P_{IN_{i,j-1}} \cdot C_{i,j} \quad (2)$$

where $C_{i,j}$ is the conductivity state of node $N_{i,j}$, where $$P_{VU_{i,j}} = P_{IN_{i+1,j}} \cdot C_{U_{i,j}} \quad (3)$$

where $C_{U_{i,j}}$ is the connectivity state between the output of node $N_{i,j}$ and node $N_{i+1,j}$ where $$P_{VD_{i,j}} = P_{IN_{i-1,j}} \cdot C_{D_{i,j}}, \quad (4)$$

where $C_{D_{i,j}}$ is the connectivity state between the output of node $N_{i,j}$ and node $N_{i-1,j}$;

and where $P_{IN_{i,0}}$ is equal to logic true; and (B) an improved mainframe having means for simultaneously solving equation (1) for each node in each column of the user generated network on a column by column basis.

2. An improved programmable controller of the type having a mainframe including a central processing unit, associated electronics and memory for solving a user control program, and input/output system for communicating input data from external devices to the mainframe and for transferring output data from the mainframe to the external devices for control thereof in response to the control program, and a programming panel for programming, monitoring and displaying the user selected control program, wherein the improvement comprises:

(A) an improved programming panel having first means for allowing the user to generate a control program in a network format, each network comprising up to I rows and J columns, where I and J are positive integers each greater than one, each network comprising up to I×J nodes where the location of each node is $N_{ij}$, where i=1,2, . . . I, j=1,2, . . . J, and where each of at least some of these nodes are designatable by the user as representing an electrical circuit element that can reference other nodes, and having a power output status that is a function of the input power status to the node in combination with the conductivity status of the element, and having second means for allowing the user to generate vertical interconnections between the output of node $N_{i,j}$ with the output of node $N_{i-1,j}$ or with output of node $N_{i+1,j}$, for all existent nodes $N_{i-1,j}$ and $N_{i+1,j}$, where "or" is used in the inclusive sense, and wherein the power input status from node $N_{i,j}$ is represented by the following Boolean equation:

$$P_{IN_{i,j}} = P_{OUT_{i,j}} + P_{OUT_{i-1,j}} \cdot C_{V_{i,j}} + P_{OUT_{i-2,j}} \cdot C_{V_{i-1,j}} \cdot C_{V_{i,j}} + \ldots + P_{OUT_{1,j}} \cdot C_{V_{2,j}} \cdot C_{V_{3,j}} \cdots C_{V_{i,j}} + P_{OUT_{i+1,j}} \cdot C_{V_{i+1,j}} + P_{OUT_{i+2,j}} \cdot C_{V_{i+2,j}} \cdot C_{V_{i+1,j}} + \ldots + P_{OUT_{I,j}} \cdot C_{V_{I,j}} C_{V_{I-1,j}} \cdots C_{V_{i+1,j}} \quad (1)$$

where $$P_{OUT_{i,j}} = P_{IN_{i-1,j-1}} \cdot C_{i,j} \quad (2)$$

where $C_{i,j}$ is the conductivity state of node $N_{i,j}$, where $C_{V_{i,j}}$ is the connectivity state between node $N_{i,j}$ and node $N_{i-1,j}$, and where $P_{IN_{i,0}}$ is equal to logic true; and (B) an improved mainframe having means for simultaneously solving equation (1) for each node in each column of the user generated network on a column by column basis.

3. An improved programmable controller of the type having a mainframe including a central processing unit, associated electronics and memory for solving a user control program comprising a plurality of nodes in a network format, the nodes representing user selectable circuit elements that can reference other nodes, an input/output system for communicating input data from external devices to the mainframe and for transferring output data from the mainframe to the external devices for control thereof in response to the control program, and a programming panel for programming, monitoring and displaying on a cathode ray tube (CRT) at least a portion of the user selected control program, wherein the improvement comprises an improved programming panel and mainframe each having interacting means for performing one of a plurality of search functions containing one or more search parameters as designated by the user so as to display on the programming panel CRT the control program network satisfying the search parameters, wherein the search parameters that can be designated by the user include the searching for the first node of a network, the searching for the first occurrence of a particular contact type of a particular circuit element, the searching for the first occurrence of a particular reference number, the searching for the first occurrence of a particular circuit element having a particular reference number, and the searching for the first occurrence of a particular node.

4. An improved programmable controller as defined in claim 3, wherein the improved programming panel has means allowing the user to generate vertical interconnections between the output of two nodes in adjacent rows of the network, and wherein the search parameters that can be designated by the user include the searching for the first occurrence of a vertical connector, the searching for the first occurrence of a particular contact type of a particular circuit element having a vertical connector and the searching for the first occurrence of a particular reference number having a vertical connector.

5. An improved controller of the type having a mainframe including a central processing unit, associated electronics and memory for solving a user control program comprising a plurality of nodes, an input/output system for communicating input data from external devices to the mainframe and for transferring output data from the mainframe to the external devices for control thereof in response to the control program, and a programming panel, including a screen display with a refresh rate for the screen information, for programming, monitoring and displaying at least a portion of the user selected control program, wherein the improvement comprises an improved programming panel and mainframe wherein the programming panel has a visual screen display and a cursor which can be moved from node to node of the control program as displayed on the visual display, and wherein the programming panel further includes means for indicating to a user the real-time power status of the node upon which the cursor is placed independent of the screen refresh rate.

6. An improved programmable controller as defined in claim 5, wherein the real-time power status indicating means is a light and means for energizing the light in response to the real-time power status of the node.

7. An improved programmable controller as defined in claim 1, wherein the mainframe means for solving equation No. 1 comprises (a) a first series of logic gates, the output of the first logic gates representing the Boolean state of $P_{IN}$ simultaneously for each row i and sequentially for each column j, (b) a second series of logic gates, each second series gate receiving as one input the $P_{OUT}$ state for the corresponding node in the network, the output of each second series gate connected as a first input to the corresponding first series gate, (c) a third series of logic gates, each third series gate receiving as one input the connectivity state between the present node and the node in the previous row and the same column, and as a second input the output of the second series gate in the previous row, if present, the output of each third series gate connected as a second input to the next row second series gate, (d) a fourth series of logic gates, each fourth series gate receiving as one input the $P_{OUT}$ state for the corresponding node in the network, the output of each fourth series gate connected as a second input to the corresponding first series gate, and (e) a fifth series of logic gates, each fifth series gate receiving as one input the connectivity state between the present node and the node in the next row and the same column, and as a second input the output of the fourth series gate for the next row, the output of each fifth series gate connected to the corresponding fourth series gate as a second input 8. An improved programmable controller as defined in claim 2, wherein the mainframe means for solving equation 1 is performed by a group of logic gates which solve the $P_{IN}$ status simultaneously for each row i and in a sequential manner for each column j.

9. An improved programmable controller of the type having a mainframe including a central processing unit, associated electronics and memory for solving a user control program comprising a plurality of nodes in a network format, the nodes representing user selectable circuit elements that can reference other nodes, an input/output system for communicating input data from external devices to the mainframe and for transferring output data from the mainframe to the external devices for control thereof in response to the control program, and a programming panel for programming, monitoring and displaying on a screen at least a portion of the user selected control program, wherein the improvement comprises an improved programming panel and mainframe each having interacting means for performing one or more search functions containing one or more search parameters as designated by the user so as to display on the programming panel screen the control program network satisfying the search parameters, wherein the search parameters that can be designated by the user include one or more of the following: the searching for the first node of a network, the searching for the first occurrence of a particular contact type of a particular circuit element, the searching for the first occurrence of a particular reference number, the searching for the first occurrence of a particular circuit element having a particular reference number, and the searching for the first occurrence of a particular node.

10. An improved programmable controller as defined in claim 9, wherein the improved programming panel has means allowing the user to generate vertical interconnections between the output of two nodes in adjacent rows of the network, and wherein the search parameters that can be designated by the user include one or more of the following: the searching for the first occurrence of a vertical connector, the searching for the first occurrence of a particular contact type of a particular circuit element having a vertical connector, and the searching for the first occurrence of a particular reference number having a vertical connector.

11. An improved programmable controller as defined in claims 9 or 10, wherein the means for performing one or more search functions examines the entire user control program to find whether the search parameters are satisfied and, if the search parameters are satisfied, displaying on the screen the plurality of nodes in the network format in which a specific node satisfies the search parameters and, if the search parameters are not satisfied displaying information on the screen indicating the same.

12. An improved programmable controller as defined in claim 11, wherein the means for performing the search function further generate a cursor on the screen at the specific node satisfying the search parameters.

13. An improved programmable controller as defined in claim 12, wherein the means for performing the search function if the search parameters are satisfied further displays on the screen identifying data of the specific plurality of nodes in a network format in which the search parameters have been satisfied.

14. An improved programmable controller of the type having a mainframe including a central processing unit, associated electronics and memory for solving a user control program, an input/output system for communicating input data from external devices to the mainframe and for transferring output data from the mainframe to the external devices for control thereof in response to the control program, and a programming panel for programming, monitoring and displaying the user selected control program, wherein the improvement comprises:

(A) an improved mainframe having means for solving calculate functions in the user control program wherein at least some of the calculate functions have more than one discrete output designating information concerning the result of the calculate function; and (B) An improved programming panel comprising:

(1) a screen for viewing at least a portion of the control program; and (2) means for allowing the user to generate the control program in a network format, each network comprising up to I rows and J columns, where I and J are positive integers each greater than one, each network comprising up to $I \times J$ nodes where the location of each node is $N_{ij}$, where $i=1, 2, \ldots I$, $j=1, 2, \ldots J$, and where each of at least some of these nodes are designatable by the user as representing an electrical circuit element that can reference other nodes, and having a power output status that is a function of the input power status to the node in combination with the conductivity status of the element, and wherein the calculate functions can be displayed in nodes on the screen.

15. An improved programmable controller as defined in claim 14, wherein the means for solving calculate functions includes means for solving the subtract function with three discrete outputs, a first of the outputs having a first state indicating when the minuend is less than or equal to the subtrahend and a second state indicating when the minuend is greater than the subtrahend, a second output having a first state indicating when the minuend is not equal to the subtrahend and a second state indicating when the minuend is equal to the subtrahend, and a third output having a first state indicating when the minuend is greater than or equal to the subtrahend and a second state when the minuend is less than the subtrahend.

16. An improved programmable controller as defined in claim 14, wherein the means for solving calculate functions includes means for solving the divide function with three discrete outputs, a first of the outputs having a first state indicating when the division to be performed is not possible and a second state indicating when the division to be performed is possible, a second output having a first state indicating when the divisor if multipled by a number equal to the total field of the answer is less than the dividend, and a second state indicating when the dividend is an overflow, and a third output having a first state indicating when the divisor is equal to zero and a second state indicating when the divisor is not equal to zero.

17. An improved programmable controller as defined in claim 14, 15, or 16 wherein the mainframe has means for allowing any or all calculate function discrete outputs to be referenced by electrical circuit elements in other nodes.

18. An improved programmable controller as defined in claim 14, 15, or 16 wherein the mainframe has means for allowing any or all calculate function discrete outputs to represent output data from the mainframe.

* * * * *

UNITED STATES PATENT AND TRADEMARK OFFICE
CERTIFICATE OF CORRECTION

PATENT NO. : 4,292,666

DATED : Sept. 29, 1981

INVENTOR(S) : Lawrence W. Hill et al.

It is certified that error appears in the above-identified patent and that said Letters Patent are hereby corrected as shown below:

Column 45 Line 5 insert the following:

where (2) $P_{OUT_{i,j}} = P_{IN_{i,j-1}} \cdot C_{i,j}$ where $C_{i,j}$ is the conductivity state of node $N_{i,j}$, and where $C_{V_{i,j}}$ is the connectivity state between node $N_{i,j}$ and node $N_{i-1,j}$.

Column 575 Line 36 remove the following:

$P_{OUT_{i,j}} = P_{IN_{i[-1],j-1}} \cdot C_{i,j}$

UNITED STATES PATENT AND TRADEMARK OFFICE
CERTIFICATE OF CORRECTION

PATENT NO. : 4,292,666

DATED : September 29, 1981

INVENTOR(S) : Lawrence W. Hill et al.

It is certified that error appears in the above-identified patent and that said Letters Patent is hereby corrected as shown below:

Insert the following:

$$P_{OUT_{i,j}} = P_{IN_{i,j-1}} \cdot C_{i,j}$$

Signed and Sealed this

*Twenty-eighth* Day of *September 1982*

[SEAL]

*Attest:*

GERALD J. MOSSINGHOFF

*Attesting Officer* *Commissioner of Patents and Trademarks*